US012750234B2

(12) United States Patent
Miyamoto et al.

(10) Patent No.: US 12,750,234 B2
(45) Date of Patent: Sep. 29, 2026

(54) INFORMATION PROCESSOR, MOBILE BODY APPARATUS, AND COMMUNICATION SYSTEM

(71) Applicant: Sony Semiconductor Solutions Corporation, Kanagawa (JP)

(72) Inventors: Takashi Miyamoto, Kanagawa (JP); Hirotake Yamamoto, Kanagawa (JP); Toru Akishita, Tokyo (JP); Hiroo Takahashi, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 340 days.

(21) Appl. No.: 18/037,245

(22) PCT Filed: Jan. 17, 2022

(86) PCT No.: PCT/JP2022/001450

§ 371 (c)(1),
(2) Date: May 16, 2023

(87) PCT Pub. No.: WO2022/172698

PCT Pub. Date: Aug. 18, 2022

(65) Prior Publication Data

US 2024/0007295 A1 Jan. 4, 2024

(30) Foreign Application Priority Data

Feb. 9, 2021 (JP) ................................ 2021-018760
May 31, 2021 (JP) ................................ 2021-091938

(51) Int. Cl.
*H04L 9/32* (2006.01)

(52) U.S. Cl.
CPC .................................. *H04L 9/3242* (2013.01)

(58) Field of Classification Search
CPC .................................................... H04L 9/3242

(Continued)

(56) References Cited

U.S. PATENT DOCUMENTS 5,187,575 A * 2/1993 Lim ......................... H04N 5/46 348/E7.015
7,003,666 B1 * 2/2006 Inoue ...................... G06T 1/005 713/176

(Continued)

FOREIGN PATENT DOCUMENTS

CN 1666454 A 9/2005
CN 102100030 A 6/2011

(Continued)

OTHER PUBLICATIONS

Pappas, Christos, Taeho Lee, Raphael M. Reischuk, Pawel Szalachowski, and Adrian Perrig. "Network transparency for better internet security." IEEE/ACM Transactions on Networking 27, No. 5 (2019): 2028-2042. (Year: 2019).*

(Continued)

*Primary Examiner* — Luu T Pham
*Assistant Examiner* — Walter J Malinowski
(74) *Attorney, Agent, or Firm* — Michael Best & Friedrich LLP

(57) ABSTRACT

An information processor of an aspect of the disclosure includes a protection section protecting first communication between a first device and a second device and second communication between a third device and the second device. The protection section executes the following (1) to (4):

(1) deriving or receiving a first session key;
(2) using the first session key for encryption or decryption and message authentication of the first communication;
(3) using the first communication protected by the first session key to receive a second session key; and
(4) using the second session key for encryption, decryption, or message authentication of the second communication.

(Continued)

Here, the total number of times of communication or the total amount of communication data from the start of use to the end of the use of the second session key differs between the first communication and third communication between the first device and the third device.

20 Claims, 283 Drawing Sheets

(58) Field of Classification Search
USPC .......................................................... 713/161
See application file for complete search history.

(56) References Cited

U.S. PATENT DOCUMENTS

| | | | | |
|---|---|---|---|---|
| 7,096,343 | B1 * | 8/2006 | Berenbaum | G06F 9/3853 712/E9.071 |
| 7,334,247 | B1 * | 2/2008 | Finseth | H04N 21/4627 725/21 |
| 10,212,138 | B1 * | 2/2019 | Diamant | H04L 9/3234 |
| 2003/0079144 | A1 * | 4/2003 | Kakemizu | H04L 67/30 726/29 |
| 2004/0010612 | A1 * | 1/2004 | Pandya | H04L 69/161 709/213 |
| 2004/0085446 | A1 * | 5/2004 | Park | H04N 21/4408 348/E7.056 |
| 2004/0193876 | A1 | 9/2004 | Donley | |
| 2007/0289005 | A1 * | 12/2007 | Kumar | H04L 63/08 726/10 |
| 2008/0127293 | A1 * | 5/2008 | Cohen | G06F 21/00 726/1 |
| 2008/0232589 | A1 * | 9/2008 | Chamberlain | H04L 1/0041 380/275 |
| 2008/0267114 | A1 * | 10/2008 | Mukherjee | H04W 12/082 370/328 |
| 2009/0119509 | A1 * | 5/2009 | Cho | H04L 9/3242 713/171 |
| 2009/0129586 | A1 * | 5/2009 | Miyazaki | H04L 63/20 707/999.005 |
| 2010/0031042 | A1 * | 2/2010 | Di Crescenzo | H04L 9/32 713/168 |
| 2010/0049986 | A1 * | 2/2010 | Watanabe | H04L 9/0643 713/181 |
| 2010/0228980 | A1 * | 9/2010 | Falk | H04W 12/50 713/168 |
| 2010/0306820 | A1 * | 12/2010 | Battistello | H04L 51/212 726/3 |
| 2010/0332723 | A1 * | 12/2010 | Lin | G06F 21/10 726/19 |
| 2011/0113442 | A1 * | 5/2011 | Kikkawa | G09G 5/006 725/25 |
| 2011/0310892 | A1 * | 12/2011 | DiMambro | H04L 49/9042 370/389 |
| 2012/0117642 | A1 * | 5/2012 | Lin | H04L 63/0236 726/13 |
| 2013/0145035 | A1 * | 6/2013 | Pope | H04L 69/161 709/227 |
| 2014/0192976 | A1 * | 7/2014 | Yoon | H04L 9/0861 380/44 |
| 2014/0201849 | A1 * | 7/2014 | Earley | H04L 63/08 726/28 |
| 2015/0317613 | A1 * | 11/2015 | Clark | G06Q 20/12 705/44 |
| 2016/0261754 | A1 * | 9/2016 | Keller | H04M 15/61 |
| 2017/0012956 | A1 * | 1/2017 | Lee | H04L 63/0428 |
| 2018/0109696 | A1 | 4/2018 | Thanigasalam | |
| 2018/0165173 | A1 * | 6/2018 | Lin | G06F 16/285 |
| 2019/0103074 | A1 * | 4/2019 | Chhabra | H04L 9/3242 |
| 2019/0228145 | A1 * | 7/2019 | Shanbhogue | G06F 13/1668 |
| 2020/0145409 | A1 * | 5/2020 | Pochuev | H04L 63/0853 |
| 2022/0083509 | A1 * | 3/2022 | Dhanabalan | H04L 67/06 |
| 2022/0103567 | A1 * | 3/2022 | Amano | H04L 63/0861 |
| 2022/0247683 | A1 * | 8/2022 | Patel | H04L 65/70 |

FOREIGN PATENT DOCUMENTS

| | | | | | |
|---|---|---|---|---|---|
| CN | 102469098 | A | * | 5/2012 | |
| CN | 104486354 | A | * | 4/2015 | H04L 63/062 |
| CN | 107426164 | A | * | 12/2017 | H04L 63/08 |
| CN | 109426814 | A | * | 3/2019 | G06V 10/22 |
| JP | 2008022373 | A | | 1/2008 | |
| JP | 4310041 | B2 | * | 8/2009 | |
| JP | 2014036422 | A | * | 2/2014 | |
| JP | 2014182467 | A | | 9/2014 | |
| JP | 2018182665 | A | | 11/2018 | |
| KR | 101481403 | B1 | | 1/2015 | |
| KR | 20170073045 | A | | 6/2017 | |
| WO | 2016075869 | A1 | | 5/2016 | |

OTHER PUBLICATIONS

Lotto, Alessandro, Francesco Marchiori, Alessandro Brighente, and Mauro Conti. "A survey and comparative analysis of security properties of can authentication protocols." IEEE Communications Surveys & Tutorials (2024). (Year: 2024).*

Dragomir, Dan, Laura Gheorghe, Sergiu Costea, and Alexandru Radovici. "A survey on secure communication protocols for IoT systems." In 2016 international workshop on Secure Internet of Things (SIoT), pp. 47-62. IEEE, 2016. (Year: 2016).*

International Search Report (PCT/ISA/210), International Application No. PCT/JP2022/001450, dated Mar. 29, 2022.

"Secured Messages using SPDM Specification", DSP0277, Version: 1.0.0, DMTF, Sep. 18, 2020.

"Security Protocol and Data Model (SPDM) Specification", DSP0274, Version: 1.1.0, DMTF, Jul. 15, 2020.

* cited by examiner

FIG. 58

| bit assign | Name | Description | Remarks |
|---|---|---|---|
| ePH0[31:24] | eVC | extended Virtual Channel | ·eVC IN EXTENDED HEADER OF C-PHY AND D-PHY<br>·UNUSED (FIXED TO ZERO) IN CCI-FS |
| ePH0[23:16] | eDT | extended Data Type | CCI-FS (I2C, I3C) ADDED |
| ePH0[15] | eCONT | Control Code Indicator | I' b0: NORMAL DATA TRANSFER<br>I' b1: INDICATING CONTROL CODE OF I2C, I3C<br>·AT TIME OF I2C: INDICATING S/Sr/ACK/NACK/P, etc.<br>USED WHEN Clock Stretch |
| ePH0[14:10] | Reserved | Reserved for future definition | Resesved |
| ePH0[9:8] | ePFEN | extended Packet Footer(ePF) Enable bitmap | 32b OR 64b: field FOR Footer EXTENSION |
| ePH0[7:0] | ePHEN | extended Packet Header(ePH) Enable bitmap | field FOR EXTENSION OF extended Packet Header |

| bit assign | Name | Description | Remarks |
|---|---|---|---|
| ePH1[31:16] | Source ID | Source ID, Device ID in which the packet is generated | |
| ePH1[15:0] | Packet Length | Length of Packet Data(unit:Byte) | DATA PACKET LENGTH |

| bit assign | Name | Description | Remarks |
|---|---|---|---|
| ePH2[31:24] | Security Descriptor | Security Descriptor | ADDED WHEN USING Security<br>default: SET TO ZERO |
| ePH2[23:16] | Reserved | Reserved for future definition | Resesved |
| ePH2[15:0] | Message Counter | Message Counter | ·16-bit ROUNDING COUNTER, COUNTING UP IS PERFORMED FOR EACH PACKET HAVING First extended Packet Header; INITIAL VALUE IS ZERO.<br>·INDEPENDENT Message COUNTER IS USED IN COMMUNICATION BY C/D-PHY INCLUDING VC |

FIG. 59

| bit assign | Name | Description | Remarks |
|---|---|---|---|
| ePH3[31:25] | Destination ID | Destination ID. Device ID in which the packet is received finally | Destination ID ADDED(CCI-FS)<br>ADAPT TO Slave Address<br>(TO FINAL DESTINATION) |
| ePH3[24] | Read/Write flag | Read/Write flag is which the packet is received finally | INDICATING Read: 1, Write: 0 |
| ePH3[23:8] | Destination Address | Destination Address is to access register address finally. | REGISTER ADDRESS VALUE OF FINAL DESTINATION IS STORED. |

FIG. 60

| eDT | Description |
| --- | --- |
| 0x00 to 0x07 | synchronization Short Packet Data Types |
| 0x08 to 0x0F | Generic Short Packet Data Types |
| 0x10 to 0x17 | Generic Long Packet Data Types |
| 0x18 to 0x1F | YUV Data |
| 0x20 to 0x26 | RGB Data |
| 0x27 to 0x2F | RAW Data |
| 0x30 to 0x37 | User Defined Byte-based Data |
| 0x38 | USL Command |
| 0x39 to 0x3D | Reserved for future use |
| 0x3E | Extended Packet mode(Use in PH only. Do not use in ePH) |
| 0x3F | For CSI-2 over C-PHY:Reserved for future use<br>For CSI-2 over D-PHY:Reserved for future use |
| 0x40 to 0xBF | Reserved for future use |
| 0xC0 to 0xCF | User Defined Byte-based Data<br>0xC0:For I2C<br>0xC1:For I3C |

FIG. 66

| Addr | bit assign | initial Value | Setting Data | Attribute | Detail | Remarks |
|---|---|---|---|---|---|---|
| 0x000 | [0] | 1' b1 | CCI-FS Capability Register | R0 | 1' b0: THERE IS NOT CCI-FS FUNCTION<br>1' b1: THERE IS CCI-FS FUNCTION | |
| 0x001 | [7:0] | 8' h10 | CCI-FS Version | R0 | Ver 1.0 | |
| 0x002 | [0] | 1' b0 | CCI-FS Enable | RW | CCI-FS FUNCTION ON/OFF SWITCHING | IN A-PHY DIRECT COUPLING CONFIGURATION, USABLE WHILE SWITCHING<br>IN A CASE OF USING IN A-PHY SerDes CONFIGURATION, ADOPT 1' b1 SETTING IN ADVANCE |
| 0x010 | [7:0] | 8' h0 | eVC | RW | ePHO INFORMATION | |
| 0x011 | [7:0] | 8' h0 | eDT | RW | | |
| 0x012 | [7:0] | 2' h0 | ePFEN | RW | | |
| 0x013 | [7:0] | 8' h0 | ePHEN | RW | | |
| 0x020 | [7:1] | 1' h0 | Source ID | R0 | ePH1 INFORMATION | INDICATING ID OF Device ITSELF<br>• AT TIME OF R0: CHARACTERISTIC VALUE IS REGISTERED WHEN MOUNTING.<br>AT TIME OF RW: AT TIME OF 7' H0, CONSIDERED TO<br>• BE ADDRESSED TO ITSELF. SETTING AT AP<br>AS FOR Image Sensor, SETTING is PERFORMED FROM AP SIDE. |
| | [0] | 1' h0 | Read/Write Source | RW | ePH1 INFORMATION | Reserved |
| 0x030 | [7:1] | 7' h0 | Destination ID | RW | ePH3 INFORMATION | |
| | [0] | 1' h0 | Read/Write Dest | RW | ePH3 INFORMATION | |
| 0x031 | [7:0] | 8' h0 | Destination Address [7:0] | RW | ePH3 INFORMATION | |
| 0x032 | [7:0] | 8' h0 | Destination Address [15:8] | RW | ePH3 INFORMATION | |
| 0x033 | [7:0] | 8' h0 | payload Length [7:0] | RW | ePH3 INFORMATION | |
| 0x034 | [15:8] | 8' h0 | payload Length [15:0] | RW | ePH4 INFORMATION | |
| 0x102 | [7:0] | 8' h0 | Read Data Length [7:0] | RW | | (RESTRICTION IS GIVEN BASICALLY WITHIN RANGE OF Payload of A-PHY) |
| 0x103 | [7:0] | 8' h0 | Read Data Length [15:8] | RW | | |
| 0x104 | [0] | 1' h0 | CMD Exec | RW | AFTER COMPLETION OF EXECUTION, AUTOMATICALLY CLEARED | 1'b1:Read not Ready<br>1'b0: Read ready |
| 0x105 | [0] | 1' h0 | Read CMD Status | R0 | 1'b1:Read Ready<br>1'b0: Read not ready | |
| 0x106 | [7:0] | 8' h0 | Read Data [7:0] | R0 | | EXTENSIBLE CONFIGURATION |
| 0x107 | [7:0] | 8' h0 | Read Data [15:8] | R0 | | EXTENSIBLE CONFIGURATION |
| 0x108 | [7:0] | 8' h0 | Read Data [23:16] | R0 | | EXTENSIBLE CONFIGURATION |
| 0x109 | [7:0] | 8' h0 | Read Data [31:24] | R0 | | EXTENSIBLE CONFIGURATION |

FIG. 67

| Addr | bit assign | initial Value | Setting Data | Attribute | Detail | Remarks |
|---|---|---|---|---|---|---|
| | | | | | | |
| 0x110 | [7:1] | 7'h0 | Destination SID (COUPLING DESTINATION) | RW | P2P COUPLING INFORMATION | LOWER DEVICE of #1<br>→ONE WITHOUT REGISTRATION IS DISCARDED; ERROR DETECTION<br>(HOWEVER, End DEVICE IS NOT USED, AS Source ID IS TRANSFERRED BACKWARD) |
| | [0] | 1'h0 | Read/Write | RW | P2P COUPLING INFORMATION | WHEN CCI-FS IS Enable, 1Write IS INEFFECTIVE |
| 0x111 | [7:1] | 8'h0 | Address Register [15:8] (COUPLING DESTINATION) | RW | P2P COUPLING INFORMATION | |
| 0x112 | [7:0] | 8'h0 | Address Register [7:0] (COUPLING DESTINATION) | RW | P2P COUPLING INFORMATION | |
| 0x113 | [7:0] | 8'h0 | Attribution (COUPLING DESTINATION) | RW | P2P COUPLING INFORMATION | 0: 12C<br>1: 13C<br>2: A-PHY<br>OTHER : Reserved |
| 0x114 | [7:0] | 8'h0 | Timeout_No1 [15:8] | RW | P2P COUPLING INFORMATION | TIME SETTING FOR ACCESS TIMEOUT |
| 0x115 | [7:0] | 8'h0 | Timeout_No1 [7:0] | RW | P2P COUPLING INFORMATION | ↑ |
| 0x120 | [7:1] | 8'h0 | Destination_ID (COUPLING DESTINATION) | RW | P2P COUPLING INFORMATION | TIME SETTING FOR ACCESS TIMEOUT |
| | [0] | 1'h0 | Read/Write | RW | P2P COUPLING INFORMATION | TIME SETTING FOR ACCESS TIMEOUT |
| 0x121 | [7:0] | 8'h0 | Address Register [15:8] (COUPLING DESTINATION) | RW | P2P COUPLING INFORMATION | |
| 0x122 | [7:0] | 8'h0 | Address Register [7:8] (COUPLING DESTINATION) | RW | P2P COUPLING INFORMATION | |
| 0x123 | [7:0] | 8'h0 | Attribution (COUPLING DESTINATION) | RW | P2P COUPLING INFORMATION | 0: 12C<br>1: 13C<br>2: A-PHY<br>OTHER : Reserved |
| 0x124 | [7:0] | 8'h00 | Timeout_No2 [15:8] | RW | | TIME SETTING FOR ACCESS TIMEOUT |
| 0x125 | [7:0] | 8'h10 | Timeout_No2 [7:0] | RW | | ↑ |
| | | | | | | LOWER DEVICE OF #3 . . . |

FIG. 68

| Addr | bit assign | initial Value | Setting Data | Attribute | Detail | Remarks |
|---|---|---|---|---|---|---|
| Error-RELATED REGISTERED | | | | | | |
| 0x200 | [0] | 1'h0 | Error Register [0] (CRC) | RW1C | | |
| | [0] | 1'h0 | Error Register [1] (Security) | RW1C | | |
| | [0] | 1'h0 | Error Register [2] (Routing) | RW1C | | |
| | [0] | 1'h0 | Error Register [3] (Timeout) | RW1C | | WHEN Timeout CONFIGURATION IS INSERTED (UPON CONFIRMATION IN Polling, IT MAY BE USED IN COMBINATION, OR MAY NOT BE USED) |
| | [0] | 1'h0 | Error Register [4] (MC) | RW1C | | |
| | [0] | 1'h0 | T. B. D. | RW1C | | |
| Error-RELATED REGISTER (debug) | | | | | | |
| 0x300 | | | | R0 | STORING OF ERROR HEADER-RELATED INFORMATION (first Error) | Footer IS ALSO INSERTED (Payload MAY BE OMITTED, WHILE ONLY KEEPING ePH, ePF) VALUE IS INITIALIZED WHEN Error Registered IS SUBJECT TO 1 Write CLEAR |
| | | | | | | |
| | | | | | | |
| 0x400 | | | | R0 | STORING OF ERROR HEADER-RELATED INFORMATION (Last Error) | Footer IS ALSO INSERTED (Payload MAY BE OMITTED, WHILE ONLY KEEPING ePH, ePF) VALUE IS INITIALIZED WHEN Error Registered IS SUBJECT TO 1 Write CLEAR |
| Error-Injection-RELATED REGISTER (debug) | | | | | | |
| 0x800 | | | Error Injection Enable [0] (ePH0 : 3) | RW | Error INJECTION Enable IN ePHO | |
| | | | Error Injection Enable [0] (ePH0 : 2) | RW | | |
| | | | Error Injection Enable [0] (ePH0 : 1) | RW | | |
| | | | Error Injection Enable [0] (ePH0 : 0) | RW | | |

FIG. 85
Padding Characters
Padding Characters

A

B

| Embedded Data Format Code | Description |
|---|---|
| 0x00 | - |
| 0x07 | - |
| 0x0A | - |
| 0x0B | - |
| 0x0C | - |
| 0x0D | - |
| 0x0E-0x1F | Reserved for future use |
| 0x20-0x2F | Vendor specific |
| 0x30-0xFE | Reserved for future use |
| 0xFF | - |

FIG. 104

CSI-2/CCI extension format example

Enable/disable ePH0 → bit 15
Enable/disable ePH1 → bit 14
Enable/disable ePH2 → bit 0
Enable/disable ePH3 → bit 1
Enable/disable ePH4 → bit 2

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ePH0 | Res | | eVC | | | | | | eDT | | | | | | | | ePFEN | | Reserved(Res) | | | | | | ePHEN | | | | | | | |
| ePH1 | Reserved | | | | | | | | | | | | | | | | Packet Length | | | | | | | | | | | | | | | |
| ePH2 | Security Descriptor | | | | | | | | Reserved | | | | | | | | Message Counter | | | | | | | | | | | | | | | |
| ePH3 | Reserved | | | | | | | | | | | | | | | | Reserved | | | | | | | | | | | | | | | |
| ePH4 | Final destination ID | | | | | | | | | | | | | | | | Source ID | | | | | | | | | | | | | | | |
| ... | ... | | | | | | | | | | | | | | | | | | | | | | | | | | | | | | | |
| ePF1 | MAC[k×32-1:0] | | | | | | | | | | | | | | | | | | | | | | | | | | | | | | | |
| ePF0 | CRC32 | | | | | | | | | | | | | | | | | | | | | | | | | | | | | | | |

FIG. 111

| Security MAC | Description |
|---|---|
| 0x00 | Reserved for future use |
| 0x01 | Line-MAC |
| 0x02 | Frame-MAC |
| 0x03 | Reserved for future use |

FIG. 112

A

| MESSAGE COUNTER | ROLLOVER CYCLE AT 60 fps AND PIXEL ROW OF 2160 |
|---|---|
| 16+16 bits | $2^{32} \div 60 \div 2163 \fallingdotseq 9$ HOURS |
| 20+16 bits | $2^{36} \div 60 \div 2163 \fallingdotseq 6$ DAYS |
| 24+16 bits | $2^{40} \div 60 \div 2163 \fallingdotseq 98$ DAYS |
| 28+16 bits | $2^{44} \div 60 \div 2163 \fallingdotseq 4$ YEARS |
| 32+16 bits | $2^{48} \div 60 \div 2163 \fallingdotseq 69$ YEARS |

B

| FRAME COUNTER | ROLLOVER CYCLE AT 60 fps AND INCREMENT FOR EACH ONE |
|---|---|
| 4+16 bits | $2^{04} \times (2^{16}-1) \div 60 \fallingdotseq 5$ HOURS |
| 8+16 bits | $2^{08} \times (2^{16}-1) \div 60 \fallingdotseq 78$ HOURS |
| 12+16 bits | $2^{12} \times (2^{16}-1) \div 60 \fallingdotseq 52$ DAYS |
| 16+16 bits | $2^{16} \times (2^{16}-1) \div 60 \fallingdotseq 828$ DAYS |
| 20+16 bits | $2^{20} \times (2^{16}-1) \div 60 \fallingdotseq 36$ YEARS |
| 24+16 bits | $2^{24} \times (2^{16}-1) \div 60 \fallingdotseq 581$ YEARS |

FIG. 116

| Security protocol | Description |
|---|---|
| 0x00 | Reserved for future use |
| 0x01 | SPDM |
| 0x02 | HDCP |
| 0x03 | Reserved for future use |

FIG. 149

HD : Hamming Distance

| HD ≥ 1 COUNT | HD = 1 COUNT |
|---|---|
| 0=0000 | 0=0000 |
| 1=0001 | 1=0001 |
| 2=0010 | 2=0011 |
| 3=0011 | 3=0010 |
| 4=0100 | 4=0110 |
| 5=0101 | 5=0111 |
| 6=0110 | 6=0101 |
| 7=0111 | 7=0100 |
| 8=1000 | 8=1100 |
| 9=1001 | 9=1101 |
| 10=1010 | 10=1111 |
| 11=1011 | 11=1110 |
| 12=1100 | 12=1010 |
| 13=1101 | 13=1011 |
| 14=1110 | 14=1001 |
| 15=1111 | 15=1000 |
| 16=0000 | 16=0000 |
| 17=0001 | 17=0001 |
| ... | ... |

FIG. 150

HD : Hamming Distance

| FIRST COUNTER HD ≥ 1 MODE INCREMENT | SECOND COUNTER HD ≥ 1 MODE DECREMENT | SUM OF FIRST COUNTER AND SECOND COUNTER |
|---|---|---|
| 0000 | 1111 | 1111 |
| 0001 | 1110 | 1111 |
| 0010 | 1101 | 1111 |
| 0011 | 1100 | 1111 |
| 0100 | 1011 | 1111 |
| 0101 | 1010 | 1111 |
| 0110 | 1001 | 1111 |
| 0111 | 1000 | 1111 |
| 1000 | 0111 | 1111 |
| 1001 | 0110 | 1111 |
| 1010 | 0101 | 1111 |
| 1011 | 0100 | 1111 |
| 1100 | 0011 | 1111 |
| 1101 | 0010 | 1111 |
| 1110 | 0001 | 1111 |
| 1111 | 0000 | 1111 |
| 0000 | 1111 | 1111 |
| 0001 | 1110 | 1111 |
| ... | ... | ... |

FIG. 151

| FIRST COUNTER HD = 1 MODE INCREMENT | SECOND COUNTER HD = 1 MODE INCREMENT | SUBTRACTED VALUE BETWEEN FIRST COUNTER AND SECOND COUNTER |
|---|---|---|
| 0=0000 | 0=0000 | 0000 |
| 1=0001 | 1=0001 | 0000 |
| 2=0011 | 2≑0011 | 0000 |
| 3=0010 | 3≑0010 | 0000 |
| 4=0110 | 4≑0110 | 0000 |
| 5=0111 | 5≑0111 | 0000 |
| 6=0101 | 6≑0101 | 0000 |
| 7=0100 | 7≑0100 | 0000 |
| 8=1100 | 8≑1100 | 0000 |
| 9=1101 | 9≑1101 | 0000 |
| 10=1111 | 10≑1111 | 0000 |
| 11=1110 | 11≑1110 | 0000 |
| 12=1010 | 12≑1010 | 0000 |
| 13=1011 | 13≑1011 | 0000 |
| 14=1001 | 14≑1001 | 0000 |
| 15=1000 | 15=1000 | 0000 |
| 16=0000 | 16=0000 | 0000 |
| 17=0001 | 17=0001 | 0000 |
| ... | ... | ... |

FIG. 153

| Bit | Name | Description |
|---|---|---|
| ePH2[31:24] | Security Descriptor | Define the encrypted image data and ePF1 block for security. |
| ePH2[23:16] | Warning Descriptor | Define the warning information. |
| ePH2[15:0] | Message Counter | 16 bit wrap counter. The value is set to 0 in the first extension packet. This counter increments the value on every transmission of extended packet. After $2^{16}$-1, the value is set to 0. Each virtual channel has each independent Message Counter. |

FIG. 154

| Bit | Description |
|---|---|
| ePH2[23] | 1'b1 : Fatal warning.<br>1'b0 : No fatal warning. |
| ePH2[22] | 1'b1 : Sensor-internal warning.<br>1'b0 : No sensor-internal warning. |
| ePH2[21] | 1'b1 : Sensor-external warning.<br>1'b0 : No sensor-external warning. |
| ePH2[20] | 1'b1 : Power-source warning.<br>1'b0 : No power-source warning. |
| ePH2[19] | 1'b1 : Clock-source warning.<br>1'b0 : No clock-source warning. |
| ePH2[18] | 1'b1 : The others warning.<br>1'b0 : No the others warning. |
| ePH2[17] | Reserved for future use. |
| ePH2[16] | Reserved for future use. |

FIG. 155

| Bit | Name | Description |
|---|---|---|
| ePH2[23] | Physical attack detection | 1'b1 : Physical attack was detected.<br>1'b0 : Physical attack was not detected. |

FIG. 159

| Bit | Description |
|---|---|
| ePH2[31] | 1'b1 : Transmit encrypted payload.<br>1'b0 : Transmit payload in the clear. |
| ePH2[30] | 1'b1 : Transmit MAC as ePF1.<br>1'b0 : Not transmit MAC as ePF1. |
| ePH2[29] | 1'b1 : Physical attack was detected.<br>1'b0 : Physical attack was not detected. |
| ePH2[28:24] | Reserved for future use. |

FIG. 165

Responder flag fields definitions

| Byte | Bit | Field | Value |
|---|---|---|---|
| 1 | 5 | HBEAT_CAP | If set, Responder supports HEARTBEAT messages |

FIG. 166

HEARTBEAT request message format

| Offset | Field | Bytes | Value |
|---|---|---|---|
| 0 | SPDMVersion | 1 | V1.1 = 0x11 |
| 1 | RequestResponseCode | 1 | 0xE8 = HEARTBEAT Request |
| 2 | Param1 | 1 | Reserved |
| 3 | Param2 | 1 | Reserved |

FIG. 167

HEARTBEAT_ACK response message format

| Offset | Field | Bytes | Value |
|---|---|---|---|
| 0 | SPDMVersion | 1 | V1.1 = 0x11 |
| 1 | RequestResponseCode | 1 | 0x68 = HEARTBEAT_ACK Response |
| 2 | Param1 | 1 | Reserved |
| 3 | Param2 | 1 | Reserved |

FIG. 168

HEARTBEAT_NAK response message format

| Offset | Field | Bytes | Value |
|---|---|---|---|
| 0 | SPDMVersion | 1 | TBD |
| 1 | RequestResponseCode | 1 | TBD = HEARTBEAT_NAK Response |
| 2 | Param1 | 1 | Reserved |
| 3 | Param2 | 1 | Reserved |

FIG. 169

END_SESSION_ACK response message format

| Offset | Field | Bytes | Value |
|---|---|---|---|
| 0 | SPDMVersion | 1 | V1.1 = 0x11 |
| 1 | RequestResponseCode | 1 | 0x6C = END_SESSION_ACK |
| 2 | Param1 | 1 | Reserved |
| 3 | Param2 | 1 | Reserved |

FIG. 171

END_SESSION_NAK response message format

| Offset | Field | Bytes | Value |
|---|---|---|---|
| 0 | SPDMVersion | 1 | TBD |
| 1 | RequestResponseCode | 1 | TBD = END_SESSION_NAK |
| 2 | Param1 | 1 | Reserved |
| 3 | Param2 | 1 | Reserved |

FIG. 176

ERROR response message format

| Offset | Field | Bytes | Value |
|---|---|---|---|
| 0 | SPDMVersion | 1 | TBD |
| 1 | RequestResponseCode | 1 | 0x7F = ERROR |
| 2 | Param1 | 1 | Error code |
| 3 | Param2 | 1 | Error data |
| 4 | ExtendedErrorData | 0-32 | Optional extended data |

FIG. 177

Error Code and Error Data

| Error code | Value | Description | Error data | ExtendedErrorData |
|---|---|---|---|---|
| Reserved | 0x00 | Reserved | Reserved | Reserved |
| Unspecified | 0x06 | Unspecified error occurred | 0x00 | No extended error data is provided |
| Reserved | 0x0b~0x40 | Reserved | Reserved | Reserved |
| Reserved | 0x44~0xFE | Reserved | Reserved | Reserved |
| Vendor/Other Standards Defined | 0xFF | Vendor or Other Standards defined | Shall indicate the registry or standard body using one of the values in the ID column in the Registry or standards body ID table. | See the ExtendedErrorData format for vendor or other standards-defined ERROR response message table for format definition. |

FIG. 178

ExtendedErrorData format for vendor or other standards-defined ERROR response message

| Offset | Field | Bytes | Description |
|---|---|---|---|
| 0 | Len | 1 | Length of the VendorID field. If the ERROR is vendor defined, the value of this field shall equal the Vendor ID Len, as the Registry or standards body ID table describes, of the corresponding registry or standard body name. If the ERROR is defined by a registry or a standard, this field shall be zero (0), which also indicates that the VendorID field is not present. The Error Data field in the ERROR message indicates the registry or standards body name, such as Param2, and is one of the values in the ID column in the Registry or standards body ID table. |
| 1 | VendorID | Len | The value of this field shall indicate the Vendor ID, as assigned by the registry or standards body. The Registry or standards body ID table describes the length of this field. Shall be in little endian format. The registry or standards body name in the ERROR is indicated in the Error Data field, such as Param2, and is one of the values in the ID column in the Registry or standards body ID table. |
| 1+Len | OpaqueErrorData | Variable | Defined by the vendor or other standards. |

FIG. 179

Registry or standards body ID

| ID | Vendor ID length (bytes) | Registry or standards body name | Description |
|---|---|---|---|
| 0x6 | 2 | MIPI | The Manufacturer ID assigned by MIPI identifies the vendor. |

FIG. 180

VENDOR_DEFINED_REQUEST request message format

| Offset | Field | Bytes | Value |
|---|---|---|---|
| 0 | SPDMVersion | 1 | V1.1 = 0x11 |
| 1 | RequestResponseCode | 1 | 0xFE = VENDOR_DEFINED_REQUEST |
| 2 | Param1 | 1 | Reserved |
| 3 | Param2 | 1 | Reserved |
| 4 | StandardID | 2 | Shall indicate the registry or standards body by using one of the values in the ID column in the Registry or standards body ID table. |
| 6 | Len | 1 | Length of the Vendor ID field. If the VendorDefinedRequest is standard defined, Len shall be 0. If the VendorDefinedRequest is vendor-defined, Len shall equal Vendor ID Len, as the Registry or standards body ID table describes. |
| 7 | VendorID | Len | Vendor ID, as assigned by the registry or standards body. Shall be in little endian format. |
| 7+Len | ReqLength | 2 | Length of the VendorDefinedReqPayload. |
| 7+Len+2 | VendorDefinedReqPayload | ReqLength | The standard or vendor shall use this field to send the request payload. |

FIG. 181

VENDOR_DEFINED_RESPONSE response message

| Offset | Field | Bytes | Value |
|---|---|---|---|
| 0 | SPDMVersion | 1 | V1.1 = 0x11 |
| 1 | RequestResponseCode | 1 | 0x7E = VENDOR_DEFINED_RESPONSE |
| 2 | Param1 | 1 | Reserved |
| 3 | Param2 | 1 | Reserved |
| 4 | StandardID | 2 | Shall indicate the registry or standard body using one of the values in the ID column in the Registry or standards body ID table. |
| 6 | Len | 1 | Length of the Vendor ID field. If the VendorDefinedRequest is standards-defined, length shall be 0. If the VendorDefinedRequest is vendor-defined, length shall equal Vendor ID Len, as the Registry or standards body ID table describes. |
| 7 | VendorID | Len | Shall indicate the Vendor ID, as assigned by the registry or standards body. Shall be in little endian format. |
| 7+Len | ReqLength | 2 | Length of the VendorDefinedRespPayload. |
| 7+Len+2 | VendorDefinedRespPayload | ReqLength | Standard or vendor shall use this value to send the response payload. |

FIG. 183

KEY_UPDATE request message format

| Offset | Field | Bytes | Value |
|---|---|---|---|
| 0 | SPDMVersion | 1 | **TBD** |
| 1 | RequestResponseCode | 1 | 0xE9 = KEY_UPDATE Request |
| 2 | Param1 | 1 | Key Operation. See KEY_UPDATE Operations Table. |
| 3 | Param2 | 1 | Tag. This field shall contain a unique number to aid the responder in differentiating between the original and retry request. A retry request shall contain the same tag number as the original. |

KEY_UPDATE_ACK response message format

| Offset | Field | Bytes | Value |
|---|---|---|---|
| 0 | SPDMVersion | 1 | **TBD** |
| 1 | RequestResponseCode | 1 | 0x69 = KEY_UPDATE_ACK Response |
| 2 | Param1 | 1 | Key Operation. This field shall reflect the Key Operation field of the request. |
| 3 | Param2 | 1 | Tag. This field shall reflect the Tag number in the KEY_UPDATE request. |

KEY_UPDATE operations

| Value | Operation | Description |
|---|---|---|
| 0 | Reserved | Reserved |
| 1 | UpdateKey | Update the single-direction key. |
| 2 | UpdateAllKeys | Update keys for both directions. |
| 3 | VerifyNewKey | Ensure the key update is successful and the old keys can be safely discarded. |
| 4 | UpdateExportMaster | Update the Export Master Secret. |
| 5-255 | Reserved | Reserved |

FIG. 185

| Bit | Description |
| --- | --- |
| ePH2[TBD] | 1'b1 : Next session key will be used after the next ePH0.<br>1'b0 : Current session key will be used. |

FIG. 195

| Field | Bits | Value |
|---|---|---|
| KeyUpdateReq | 1 | 1'b1 : Session key update is necessary.<br>1'b0 : Session key update is unnecessary. |
| KeySwitchTiming | 1 | 1'b1 : Next session key will be used after the next frame start.<br>1'b0 : Current session key will be used until the next frame end. |

FIG. 205

| Bit | Description |
|---|---|
| ePH2[TBD] | 1'b1 : Current session key is an odd key.<br>1'b0 : Current session key is an even key. |

| Field | Bits | Value |
|---|---|---|
| EvenOddKey | 1 | 1'b1 : Current session key is an odd key.<br>1'b0 : Current session key is an even key. |

| Bit | Description |
|---|---|
| ePH2[TBD] | 1'b1 : Next session key is an odd key.<br>1'b0 : Next session key is an even key. |

| Field | Bits | Value |
|---|---|---|
| EvenOddKey | 1 | 1'b1 : Next session key is an odd key.<br>1'b0 : Next session key is an even key. |

Countermeasure for replay attack on control plane

| Algorithm | Individual mode |
|---|---|
| GMAC | Unique IV |
| CMAC | Variable message counter |
| HMAC | Variable message counter |

FIG. 219

Write message

| | | | | |
|---|---|---|---|---|
| Write command | MC=0 | MAC(IV+0) | CRC | →Replay is impossible |
| Write command | MC=1 | MAC(IV+1) | CRC | →Replay is impossible |
| | ⋮ | | | |
| Write command | MC=255 | MAC(IV+255) | CRC | →Replay is impossible |
| Write command | MC=0 | MAC(IV+256) | CRC | →Replay is impossible |
| Write command | MC=1 | MAC(IV+257) | CRC | →Replay is impossible |

Countermeasure for replay attack on control plane

| Algorithm | Individual mode |
|---|---|
| GMAC | Unique IV |
| CMAC | Variable message counter |
| HMAC | Variable message counter |

FIG. 222

VENDOR_DEFINED_REQUEST request message example

| Field | Bits | Value |
|---|---|---|
| CCI_MC | 3 | 0b000: CCI Message Counter is 1 byte.<br>0b001: CCI Message Counter is 2 bytes.<br>0b010: CCI Message Counter is 3 bytes.<br>0b011: CCI Message Counter is 4 bytes.<br>0b100: CCI Message Counter is 5 bytes.<br>0b101: CCI Message Counter is 6 bytes.<br>0b110: CCI Message Counter is 7 bytes.<br>0b111: CCI Message Counter is 8 bytes. |

FIG. 224

VENDOR_DEFINED_REQUEST request message example

| Field | Bits | Value |
|---|---|---|
| CCI_MAC | 3 | 0b000: CCI-MAC tag length is 00 bytes.<br>0b001: CCI-MAC tag length is 04 bytes.<br>0b010: CCI-MAC tag length is 08 bytes.<br>0b011: CCI-MAC tag length is 16 bytes.<br>0b100: CCI-MAC tag length is 28 bytes.<br>0b101: CCI-MAC tag length is 32 bytes.<br>0b110: CCI-MAC tag length is 48 bytes.<br>0b111: CCI-MAC tag length is 64 bytes. |

FIG. 226

Countermeasure for replay attack on data plane

| Algorithm | Line-MAC | Frame-MAC |
|---|---|---|
| GCM | Unique IV | Unique IV |
| CCM | Unique IV | Unique IV |
| GMAC | Unique IV | Unique IV |
| CMAC | - | Nonce in embedded data |
| HMAC | - | Nonce in embedded data |

FIG. 228

SecInt only

SecInt and SecEnc

No Security ePF1 MAC

SecInt = Integrity + replay protection

SecEnc = Security Encryption

MAC = Message Authenrication Code

GMAC = Galois MAC

GCM = Galois/Counter Mode

IV = Initialization Vector

FN = Frame Number ePH = extended Packet Header

FS = Frame Start

# = Message Counter (MC) in ePH ePF = extended Packet Footer

Emb = Embedded

Img = Image

FE = Frame End

SA = security Service Association

AEAD = Authenticated Encryption with Associated Data

FIG. 229

Countermeasure for replay attack on data plane

| Algorithm | Line-MAC | Frame-MAC |
|---|---|---|
| GCM | Unique IV | Unique IV |
| CCM | Unique IV | Unique IV |
| GMAC | Unique IV | Unique IV |
| CMAC | - | Nonce in embedded data |
| HMAC | - | Nonce in embedded data |

FIG. 231

Countermeasure for replay attack on data plane

| Algorithm | Line-MAC | Frame-MAC |
|---|---|---|
| GCM | Unique IV | Unique IV |
| CCM | Unique IV | Unique IV |
| GMAC | Unique IV | Unique IV |
| CMAC | - | Nonce in embedded data |
| HMAC | - | Nonce in embedded data |

FIG. 233

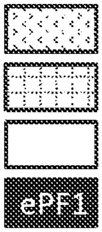

SecInt only

SecInt and SecEnc

No Security

MAC

SecInt = Integrity + replay protection
SecEnc = Security Encryption
MAC = Message Authenrication Code
CMAC = Cipher-based MAC
CTR = Counter
FN = Frame Number
ePH = extended Packet Header
FS = Frame Start
# = Message Counter (MC) in ePH
ePF = extended Packet Footer
Emb = Embedded
Img = Image
FE = Frame End
SA = security Service Association
AES = Advanced Encryption Standard

SSMC PROCESSING

Sensor PROCESSING or Bridge ANOTHER END PROCESSING

FIG. 245

Control plane capability register example

| Field | Bits | Value: Description |
|---|---|---|
| Max_Aggregation_ Extent_Data_Groups | 4 | 0b0000: 1 data group<br>0b0001: 2 data groups<br>0b0010: 4 data groups<br>0b0011: 8 data groups<br>0b0100: 16 data groups<br>0b0101: 32 data groups<br>0b0110: 64 data groups<br>0b0111: 128 data group<br>0b1000: 256 data group<br>0b1001: 512 data groups<br>0b1010: 1024 data groups<br>0b1011: 2048 data groups<br>0b1100: Reserved for future use<br>0b1101: Reserved for future use<br>0b1110: Vendor specific/defined<br>0b1111: Vendor specific/defined |

FIG. 246

Control plane capability register example

| Field | Bits | Value: Description |
|---|---|---|
| Max_Aggregation_Extent_Buffer | 4 | 0b0000: 1 * 128 bytes<br>0b0001: 2 * 128 bytes<br>0b0010: 4 * 128 bytes<br>0b0011: 8 * 128 bytes<br>0b0100: 16 * 128 bytes<br>0b0101: 32 * 128 bytes<br>0b0110: 64 * 128 bytes<br>0b0111: 128 * 128 bytes<br>0b1000: 256 * 128 bytes<br>0b1001: 512 * 128 bytes<br>0b1010: 1024 * 128 bytes<br>0b1011: 2048 * 128 bytes<br>0b1100: Reserved for future use<br>0b1101: Reserved for future use<br>0b1110: Vendor specific/defined<br>0b1111: Vendor specific/defined |

FIG. 251

EXTENDED HEADER example

| Field | Bits | Value: Description |
|---|---|---|
| Transmit_MAC | 1 | 0b0: Do not transmit MAC<br>0b1: Transmit MAC |

FIG. 253

EXTENDED HEADER example

| Field | Bits | Value:Description |
|---|---|---|
| N_Per_Messages_MAC | 1 | 0b0 : Fixed value<br>0b1: Variable value |

FIG. 257

Register definition example / EXTENDED HEADER example

| Field | Bits | Value: Description |
|---|---|---|
| Transmit_CRC | 1 | 0b0: Do not transmit CRC<br>0b1: Transmit CRC |
| Transmit_MAC | 1 | 0b0: Do not transmit MAC<br>0b1: Transmit MAC |
| Transmit_CRC_MAC | 1 | 0b0: Transmit neither CRC nor MAC<br>0b1: Transmit both CRC and MAC |

FIG. 261

Register definition example / EXTENDED HEADER example

| Field | Bits | Value: Description |
|---|---|---|
| Start_Dec | 1 | 0b0: Do not start decryption<br>0b1: Start decryption |

FIG. 267

Capability register example

| Field | Bits | Value: Description |
|---|---|---|
| Command_Execution_ By_Sensor_R (MAC_Policy) | 2 | 0b00: Always(No rejection)<br>0b01: Only when MAC matched<br>0b10: Both policies above<br>0b11: Reserved for future use |

FIG. 268

Vendor defined SPDM message example

| Field | Bits | Value: Description |
|---|---|---|
| Command_Execution_ By_Sensor_W (MAC_Policy) | 1 | 0b0: Always(No rejection)<br>0b1: Only when MAC matched |

FIG. 272

Capability register example

| Field | Bits | Value: Description |
|---|---|---|
| Internal_Sequence_GMAC_R | 2 | 0b00: Internal sequence 0<br>0b01: Internal sequence 1<br>0b10: Initially select either internal sequence 0 or 1<br>0b11: Always select either internal sequence 0 or 1 |
| Internal_Sequence_GCM_R | 2 | 0b00: Internal sequence 0<br>0b01: Internal sequence 1<br>0b10: Initially select either internal sequence 0 or 1<br>0b11: Always select either internal sequence 0 or 1 |
| Internal_Sequence_CCM_R | 2 | 0b00: Internal sequence 0<br>0b01: Internal sequence 1<br>0b10: Initially select either internal sequence 0 or 1<br>0b11: Always select either internal sequence 0 or 1 |

FIG. 273

Vendor defined SPDM message example

| Field | Bits | Value: Description |
|---|---|---|
| Internal_Sequence_GMAC_W | 1 | 0b0: Internal sequence 0<br>0b1: Internal sequence 1 |
| Internal_Sequence_GCM_W | 1 | 0b0: Internal sequence 0<br>0b1: Internal sequence 1 |
| Internal_Sequence_CCM_W | 1 | 0b0: Internal sequence 0<br>0b1: Internal sequence 1 |

FIG. 281

Capability register example

| Field | Bits | Value: Description |
|---|---|---|
| Partial_MAC_1 | 1 | 0b0: Partial-MAC-1 cannot be selected<br>0b1: Partial-MAC-1 can be selected |
| Partial_MAC_2 | 1 | 0b0: Partial-MAC-2 cannot be selected<br>0b1: Partial-MAC-2 can be selected |

FIG. 282

Vendor defined SPDM message example

| Field | Bits | Value: Description |
|---|---|---|
| MAC_Coverage | 2 | 0b00: No MAC<br>0b01: Partial-MAC-1<br>0b10: Partial-MAC-2<br>0b11: Total-MAC |

FIG. 283

EXTENDED HEADER example

| Field | Bits | Value: Description |
|---|---|---|
| MAC_Coverage | 2 | 0b00:No MAC<br>0b01: Partial-MAC-1<br>0b10: Partial-MAC-2<br>0b11: Total-MAC |

FIG. 288

Capability register example

| Field | Bits | Value: Description |
|---|---|---|
| Enc_then_MAC_0 | 1 | 0b0: Encrypt-then-MAC-0 cannot be selected<br>0b1: Encrypt-then-MAC-0 can be selected |
| Enc_then_MAC_1 | 1 | 0b0: Encrypt-then-MAC-0 cannot be selected<br>0b1: Encrypt-then-MAC-0 can be selected |
| MAC_then_Enc | 1 | 0b0: MAC-then-Encrypt cannot be selected<br>0b1: MAC-then-Encrypt can be selected |
| Enc_and_MAC | 1 | 0b0: Encrypt-and-MAC cannot be selected<br>0b1: Encrypt-and-MAC can be selected |

FIG. 289

Vendor defined SPDM message example

| Field | Bits | Value: Description |
|---|---|---|
| Enc_MAC_Policy<br>(MAC_Policy) | 2 | 0b00: MAC only (No encryption)<br>0b01: Encrypt-then-MAC<br>0b10: MAC-then-Encrypt<br>0b11: Encrypt-and-MAC |
| Enc_then_MAC_Policy<br>(MAC_Policy) | 1 | 0b0: Encrypt-then-MAC-0<br>0b1: Encrypt-then-MAC-1 |

FIG. 292

Mode in IV (CCI-mode)

0b00: CCI-mode-1-Read, CCI-mode-3-Read
0b01: CCI-mode-1-Write, CCI-mode-3-Write
0b10: CCI-mode-2-Read
0b11: CCI-mode-2-Write

INFORMATION PROCESSOR, MOBILE BODY APPARATUS, AND COMMUNICATION SYSTEM

TECHNICAL FIELD

The present disclosure relates to an information processor, a mobile body apparatus, and a communication system, and particularly to an information processor, a mobile body apparatus, and a communication system that enable the use of a session key.

BACKGROUND ART

Currently, in a CSI (Camera Serial Interface)-2 ver4.0 for which standardization is in progress, two types are defined: a packet structure using a C-PHY for a physical layer and a packet structure using a D-PHY for a physical layer.

In recent years, the CSI-2 standard has been widely used not only for mobile devices but also for various applications such as vehicle installation and IoT (Internet of Things. As a result, it is assumed that an existing packet structure is not able to adapt to those applications. Therefore, in MIPI (Mobile Industry Processor Interface) alliance, an extended packet having an extended packet structure such as an existing packet header or packet footer has been studied in order to adapt to various applications.

Incidentally, in an SPDM (Security Protocol and Data Model) standard described in NPTL 1, a method for establishing an SPDM session is published. In addition, in an SPDM extension standard described in NPTL 2, a method for applying an SPDM session is published.

CITATION LIST

Non-Patent Literature

NPTL

NPTL 1; "Security Protocol and Data Model (SPDM) Specification", DSP0274, Version: 1.1.0, DMTF, 2020 Jul. 15

NPTL 2: "Secured Messages using SPDM Specification", DSP0277, Version: 1.0.0, DMTF, 2020 Sep. 18

SUMMARY OF THE INVENTION

However, in a case where a session key transmitted or received using an SPDM session is applied to a control-system communication or an image-system communication of MIPI CSI-2 standard or DSI (Display Serial Interface)-2 standard, there are issues in which: a timing to update the session key is unperceivable from a transmission side of the session key; a timing to start using the session key is unperceivable from a reception side of the session key; a replay attack or a falsification attack can be performed on a command or data protected using the session key; or the like. In addition, it is necessary to agree or select a security feature with a communication partner of the control-system communication or the image-system communication. In addition, in a case where message authentication, encryption, or decryption is performed on the control-system communication or the image-system communication, there are various issues upon implementation.

The present disclosure has been made in view of such circumstances, and is directed to solving issues or problems of an information processor, a mobile body apparatus, and a communication system using a session key.

An information processor according to an aspect of the present disclosure includes a protection section that protects first communication between a first device and a second device and second communication between a third device and the second device. The protection section executes the following (1) to (4):

(1) deriving or receiving a first session key;

(2) using the first session key for encryption or decryption and message authentication of the first communication;

(3) using the first communication protected by the first session key to receive a second session key; and (4) using the second session key for encryption, decryption, or message authentication of the second communication.

Here, the total number of times of communication or the total amount of communication data from the start of use to the end of the use of the second session key differs between the first communication and third communication between the first device and the third device.

An information processor according to an aspect of the present disclosure includes a protection section that protects first communication between a first device and a second device and second communication between a third device and the second device. The protection section executes the following (1) to (4):

(1) deriving or receiving a first session key;

(2) using the first session key for encryption or decryption and message authentication of the first communication;

(3) using the first communication protected by the first session key to receive a second session key; and (4) using the second session key for encryption, decryption, or message authentication of the second communication.

Here, the total number of times of communication or the total amount of communication data from the start of use to the end of the use of the second session key differs between the first communication and third communication between the first device and the third device.

A mobile body apparatus according to an aspect of the present disclosure includes a protection section that protects first communication between a first device and a second device and second communication between a third device and the second device. The protection section executes the following (1) to (4):

(1) deriving or receiving a first session key;

(2) using the first session key for encryption or decryption and message authentication of the first communication;

(3) using the first communication protected by the first session key to receive a second session key; and (4) using the second session key for encryption, decryption, or message authentication of the second communication.

Here, the total number of times of communication or the total amount of communication data from the start of use to the end of the use of the second session key differs between the first communication and third communication between the first device and the third device.

A communication system according to an aspect of the present disclosure includes a protection section that protects first communication between a first device and a second device and second communication between a third device and the second device. The protection section executes the following (1) to (4):

(1) deriving or receiving a first session key;

(2) using the first session key for encryption or decryption and message authentication of the first communication;

(3) using the first communication protected by the first session key to receive a second session key; and (4) using the second session key for encryption, decryption, or message authentication of the second communication.

Here, the total number of times of communication or the total amount of communication data from the start of use to the end of the use of the second session key differs between the first communication and third communication between the first device and the third device.

BRIEF DESCRIPTION OF THE DRAWINGS

FIG. 58 is a diagram illustrating details of an extended packet header ePH0, an extended packet header ePH1, and an extended packet header ePH2.

FIG. 59 is a diagram illustrating a detail of an extended packet header ePH3.

FIG. 60 is a diagram of a detail of an extended DT of the extended packet header ePH.

FIG. 66 is a diagram illustrating a register configuration example.

FIG. 67 is a diagram illustrating a register configuration example at the time of Bridge configuration.

FIG. 68 is a diagram illustrating a register configuration example of Error-related registers.

FIG. 104 is a diagram illustrating an example of an extension format of CSI-2 or CCI.

FIG. 111 is a diagram illustrating an example of security MAC information.

FIG. 112 is a diagram illustrating an example of rollover cycles of message count values and frame count values.

FIG. 116 is a diagram illustrating an example of security protocols.

FIG. 120 is a diagram describing a storing method when storing, as a storage pattern, a light emission pattern (light reception pattern) upon implementing a distance measurement sensor of a ToF system by an image sensor.

FIG. 121 is a diagram describing a storing method when storing, as a storage pattern, a light emission pattern (light reception pattern) upon implementing a distance measurement sensor of the ToF system by an image sensor.

FIG. 122 is a flowchart describing interference detection processing (Part 2) by the interference detection section.

FIG. 123 is a flowchart describing fault detection processing by a fault detection section.

FIG. 124 is a flowchart describing abnormality detection processing in a security section by an aggression detection section.

FIG. 125 is a flowchart describing abnormality detection processing by a temperature detection section.

FIG. 126 is a block diagram illustrating a detailed configuration example of an application processor that detects presence or absence of abnormality in an image sensor.

FIG. 127 is a flowchart describing processing of the image sensor at the time when the application processor detects presence or absence of abnormality in the image sensor.

FIG. 128 is a flowchart describing processing of the application processor at the time when the application processor detects presence or absence of abnormality in the image sensor.

FIG. 129 is a diagram illustrating an example of a data structure of image data for describing a position in which a specific message is stored upon implementing high-speed data transmission of a specific message without inhibiting high-speed data transmission of the image data.

FIG. 130 is a flowchart describing processing in a case where the high-speed data transmission of the specific message is executed without inhibiting the high-speed data transmission of the image data.

FIG. 131 is a flowchart describing imaging/transmission processing (Part 1).

Figure 132:
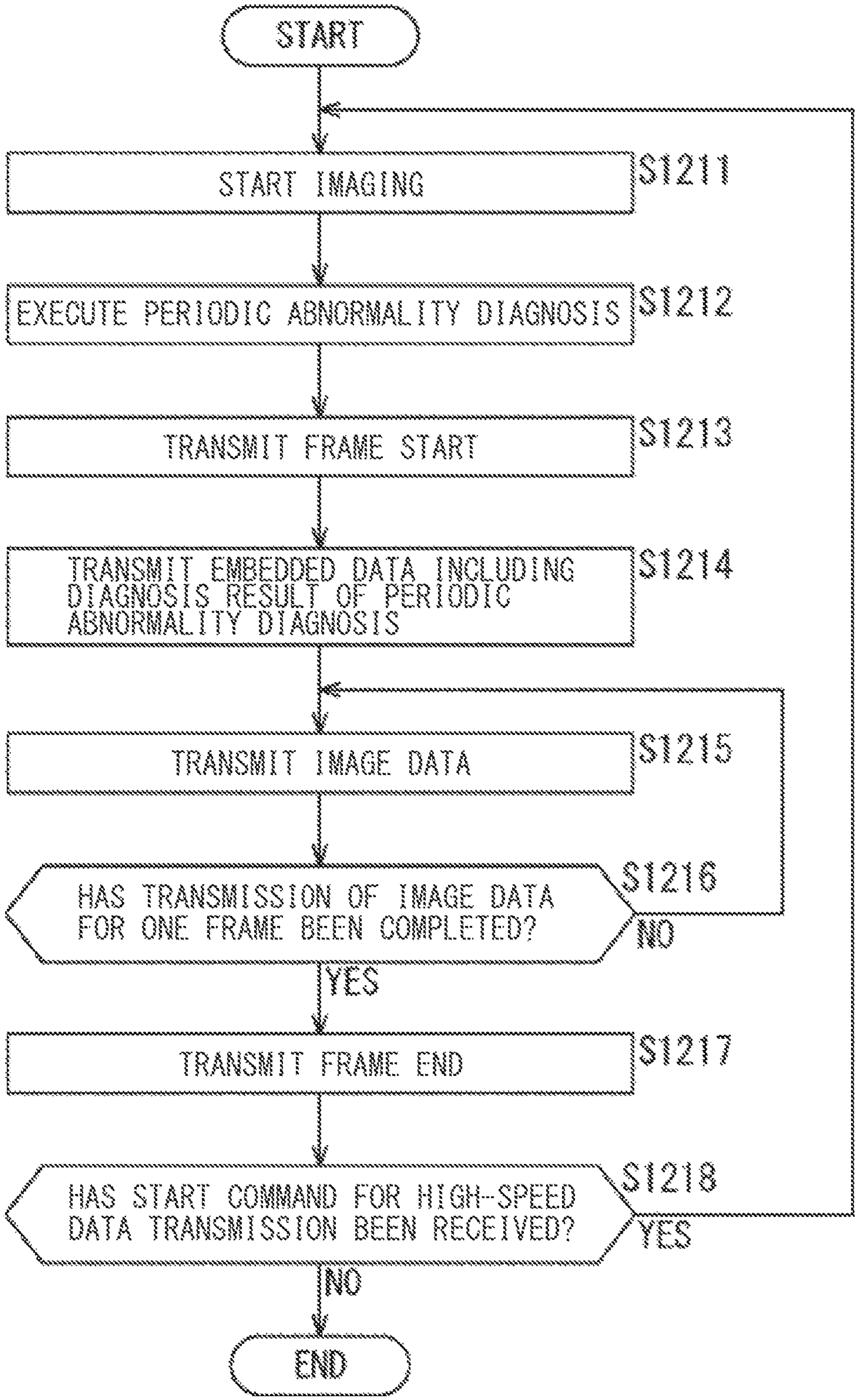

FIG. 132 is a flowchart describing a practical application example of the imaging/transmission processing (Part 1).

Figure 133:
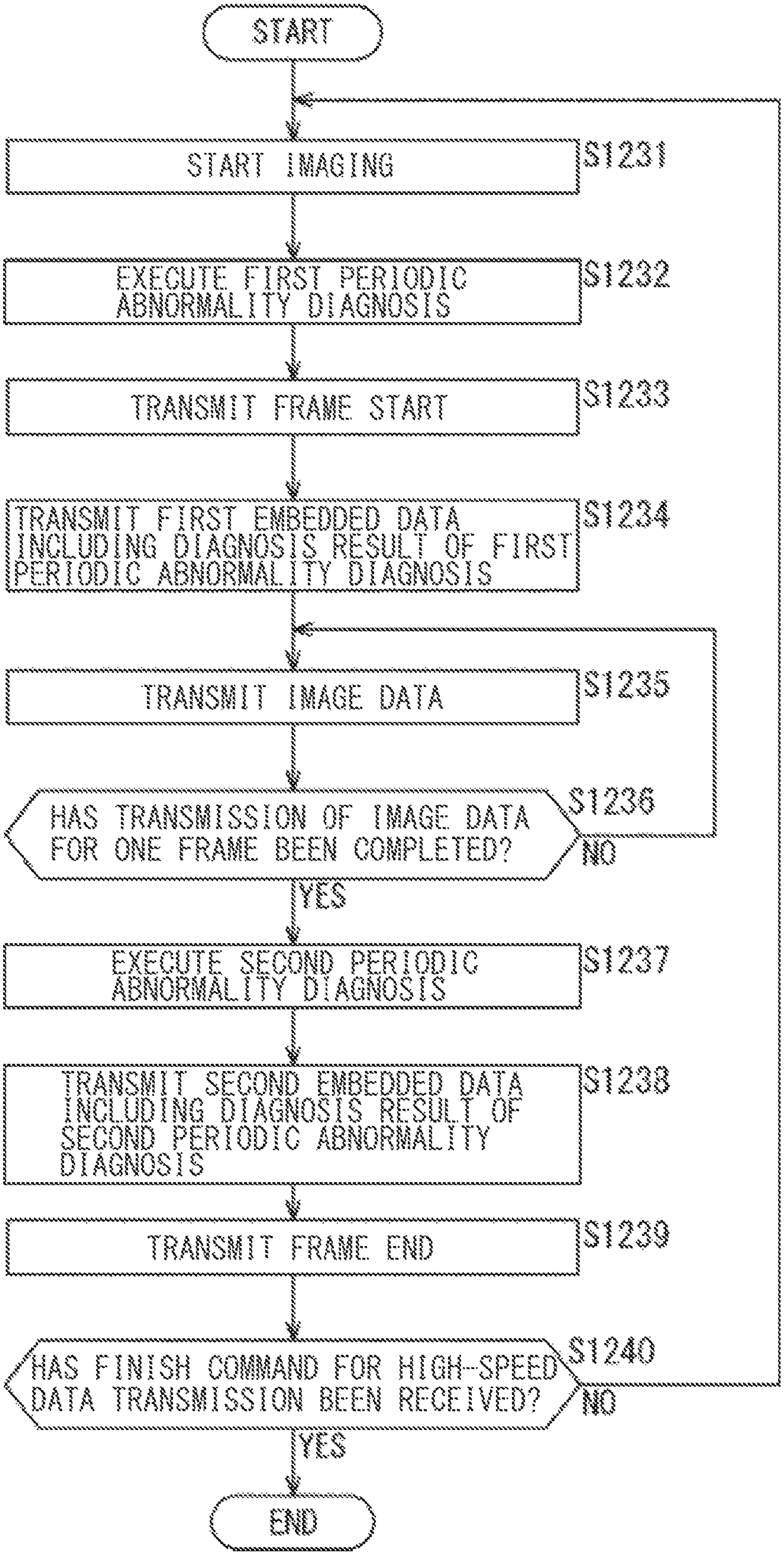

FIG. 133 is a flowchart describing imaging/transmission processing (Part 2).

Figure 134:
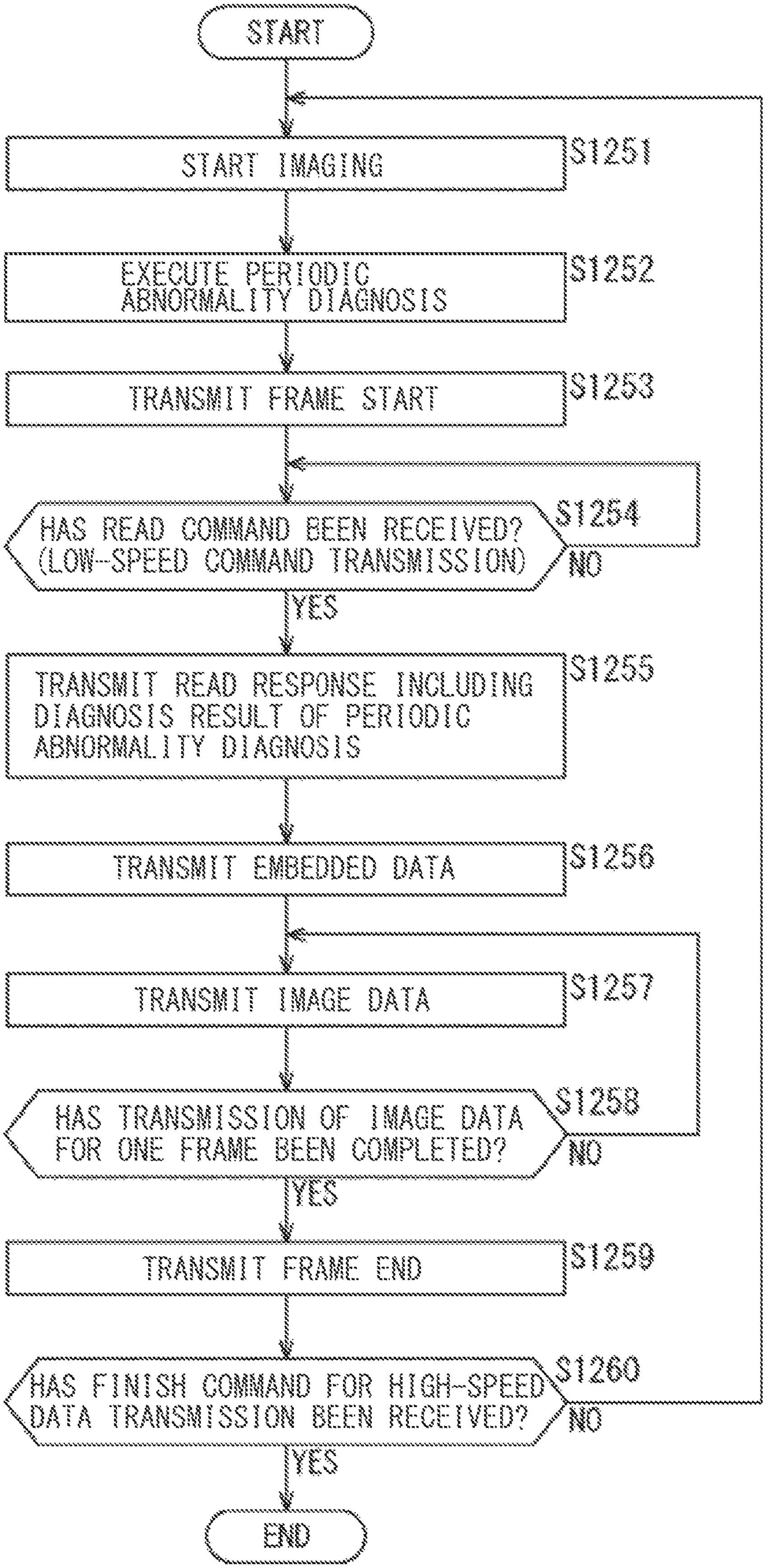

FIG. 134 is a flowchart describing imaging/transmission processing (Part 3) by the image sensor.

Figure 135:
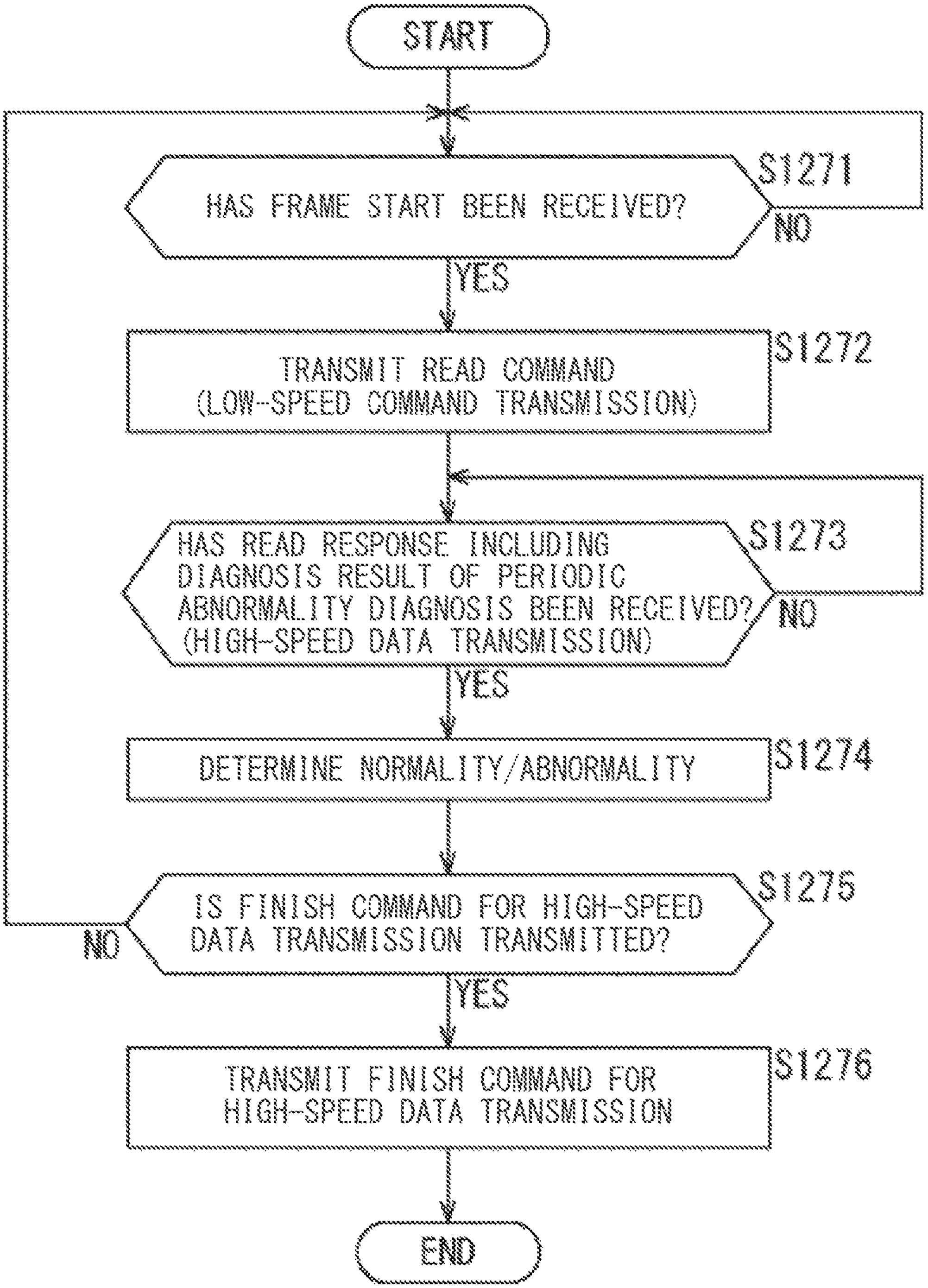

FIG. 135 is a flowchart describing imaging/transmission processing (Part 3) by the application processor.

Figure 136:
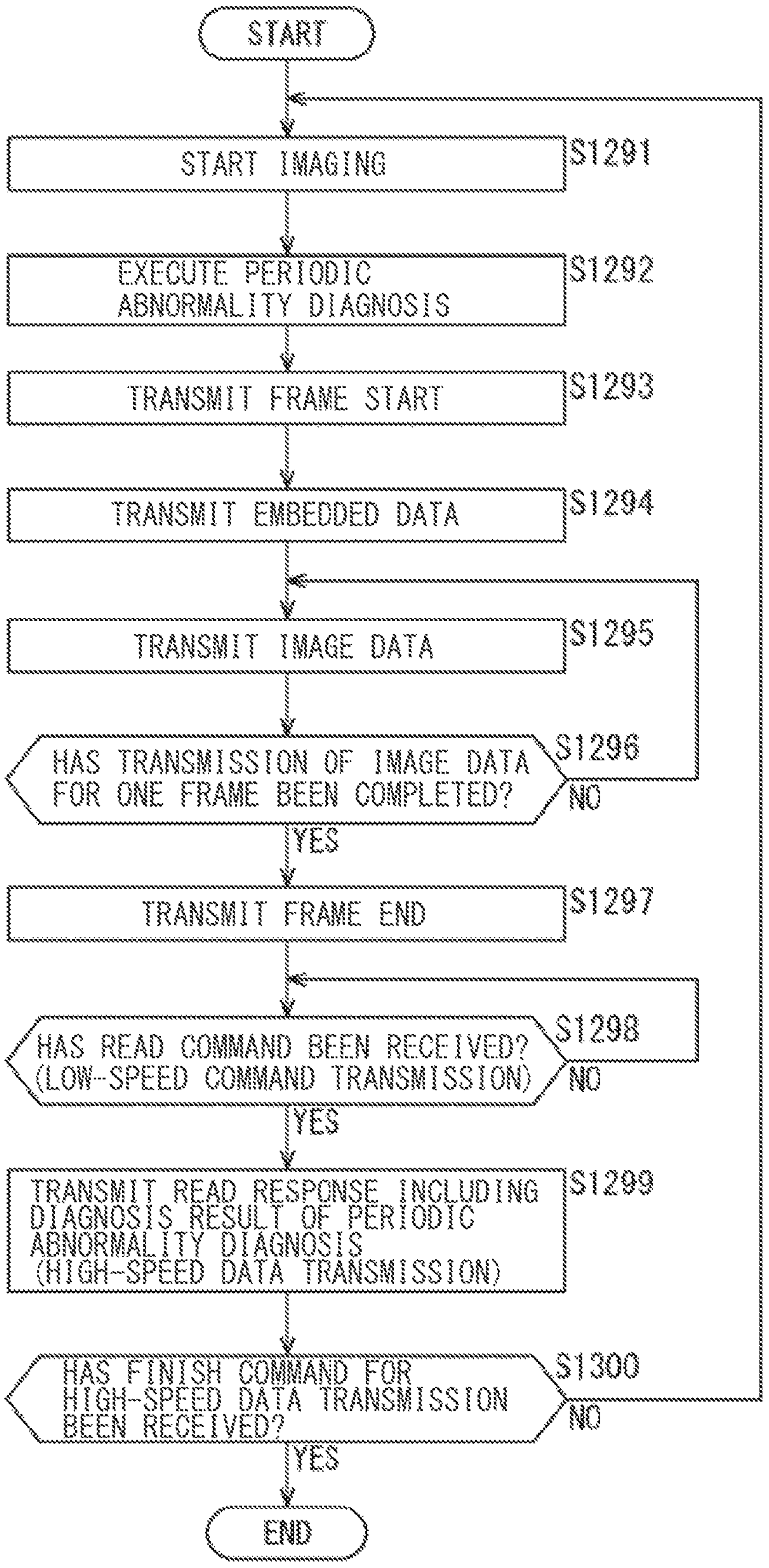

FIG. 136 is a flowchart describing imaging/transmission processing (Part 4) by the image sensor.

Figure 137:
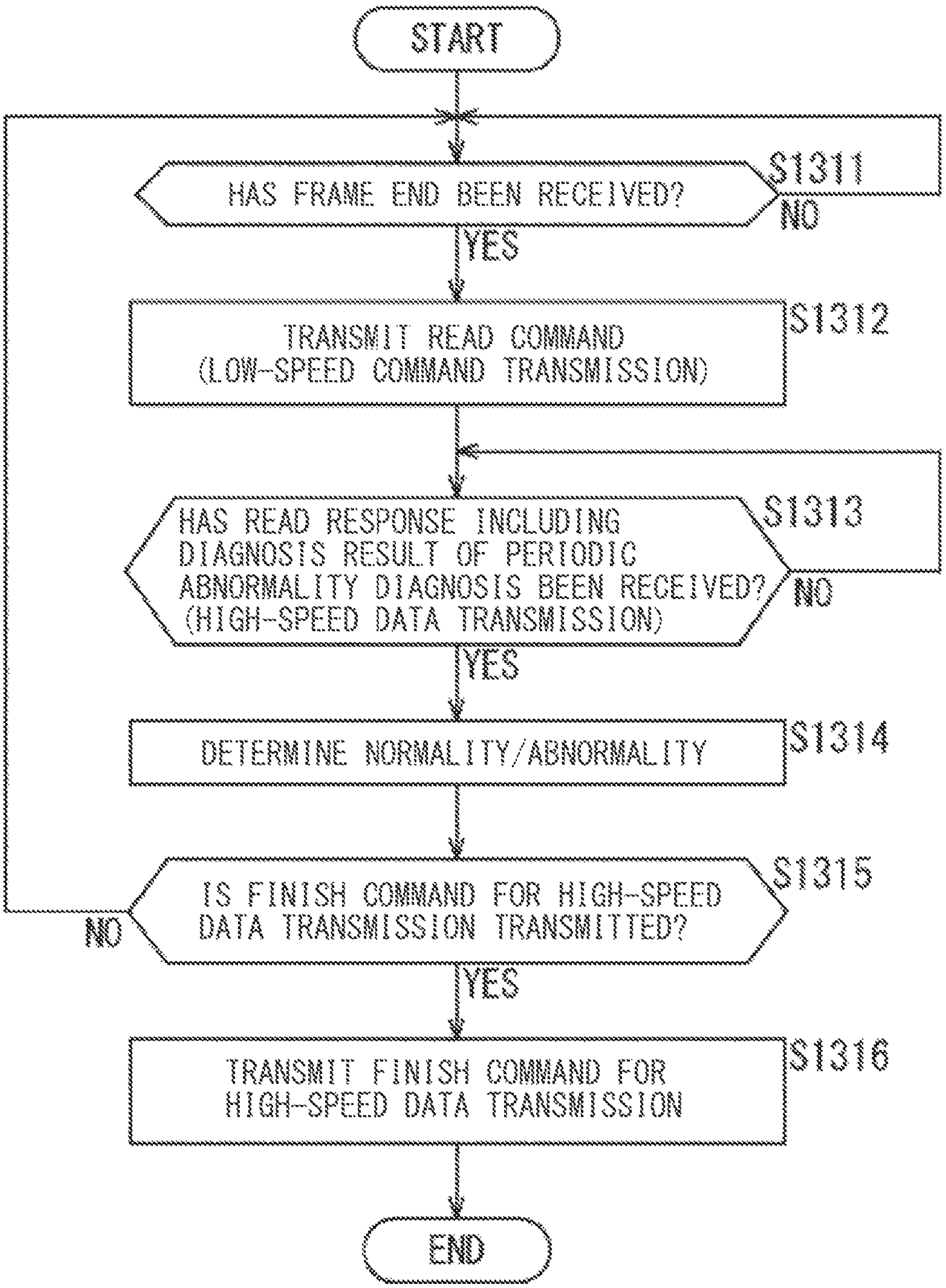

FIG. 137 is a flowchart describing imaging/transmission processing (Part 4) by the application processor.

Figure 138:
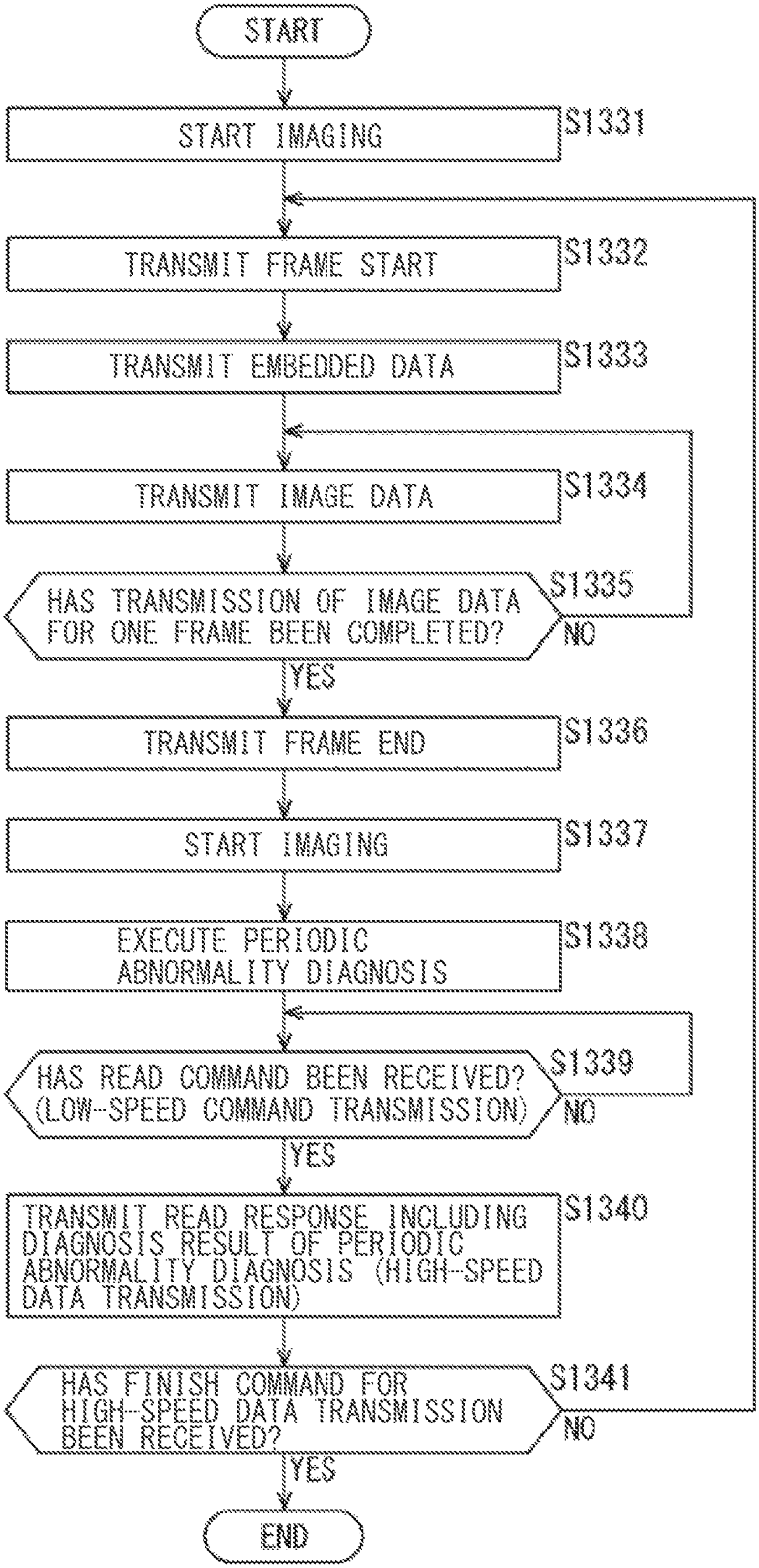

FIG. 138 is a flowchart describing imaging/transmission processing (Part 5) by the image sensor.

Figure 139:
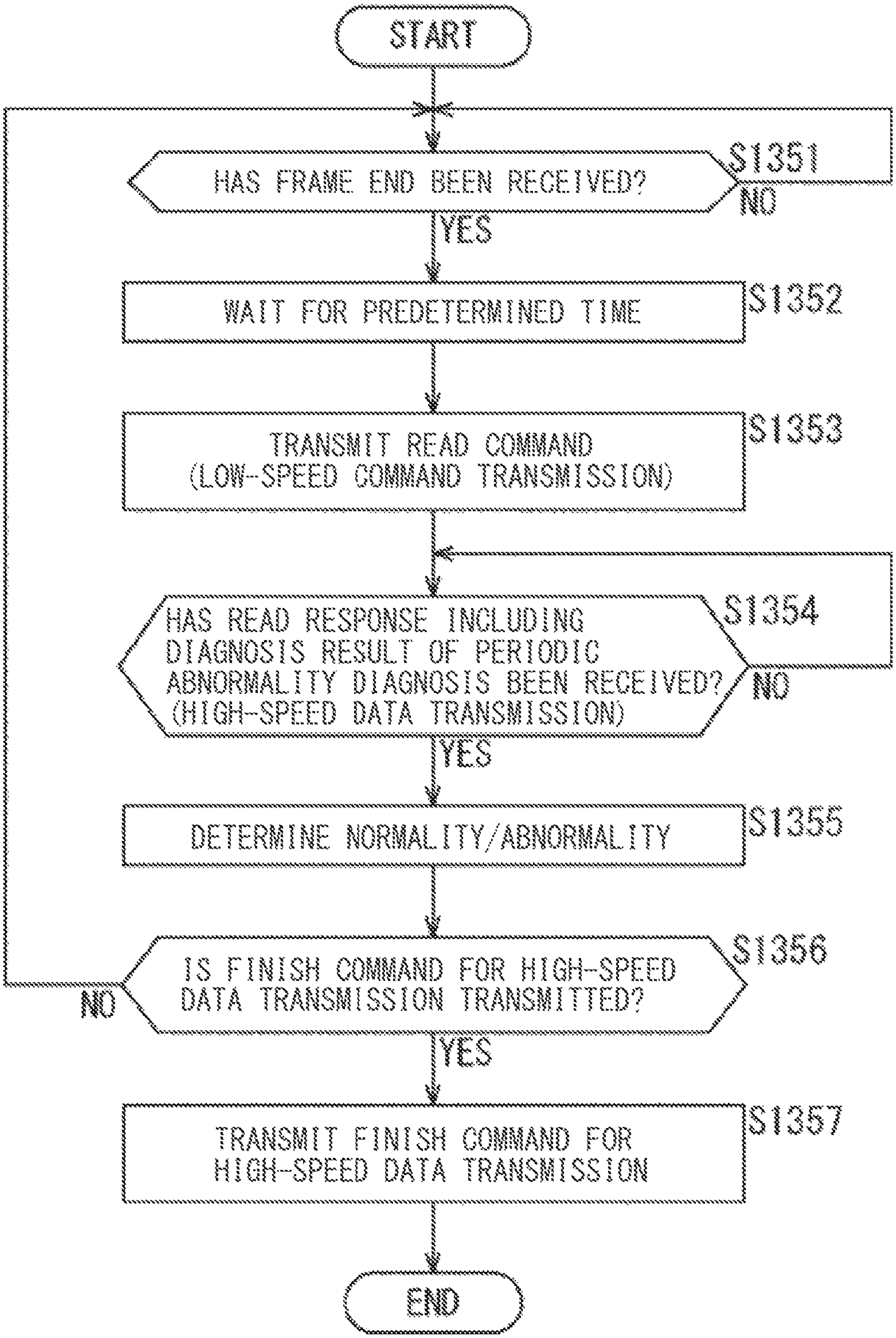

FIG. 139 is a flowchart describing imaging/transmission processing (Part 5) by the application processor.

Figure 140:
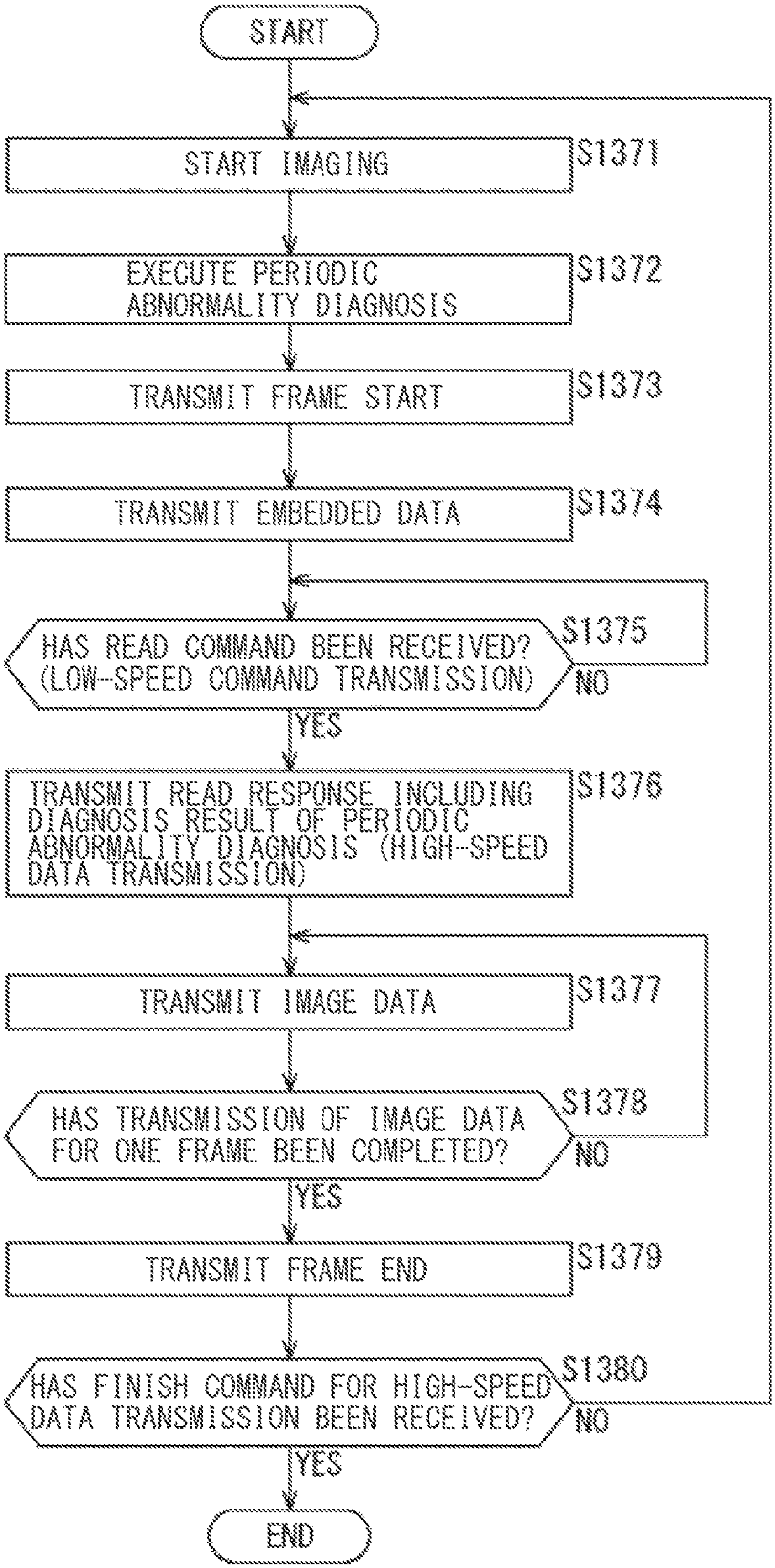

FIG. 140 is a flowchart describing imaging/transmission processing (Part 6) by the image sensor.

Figure 141:
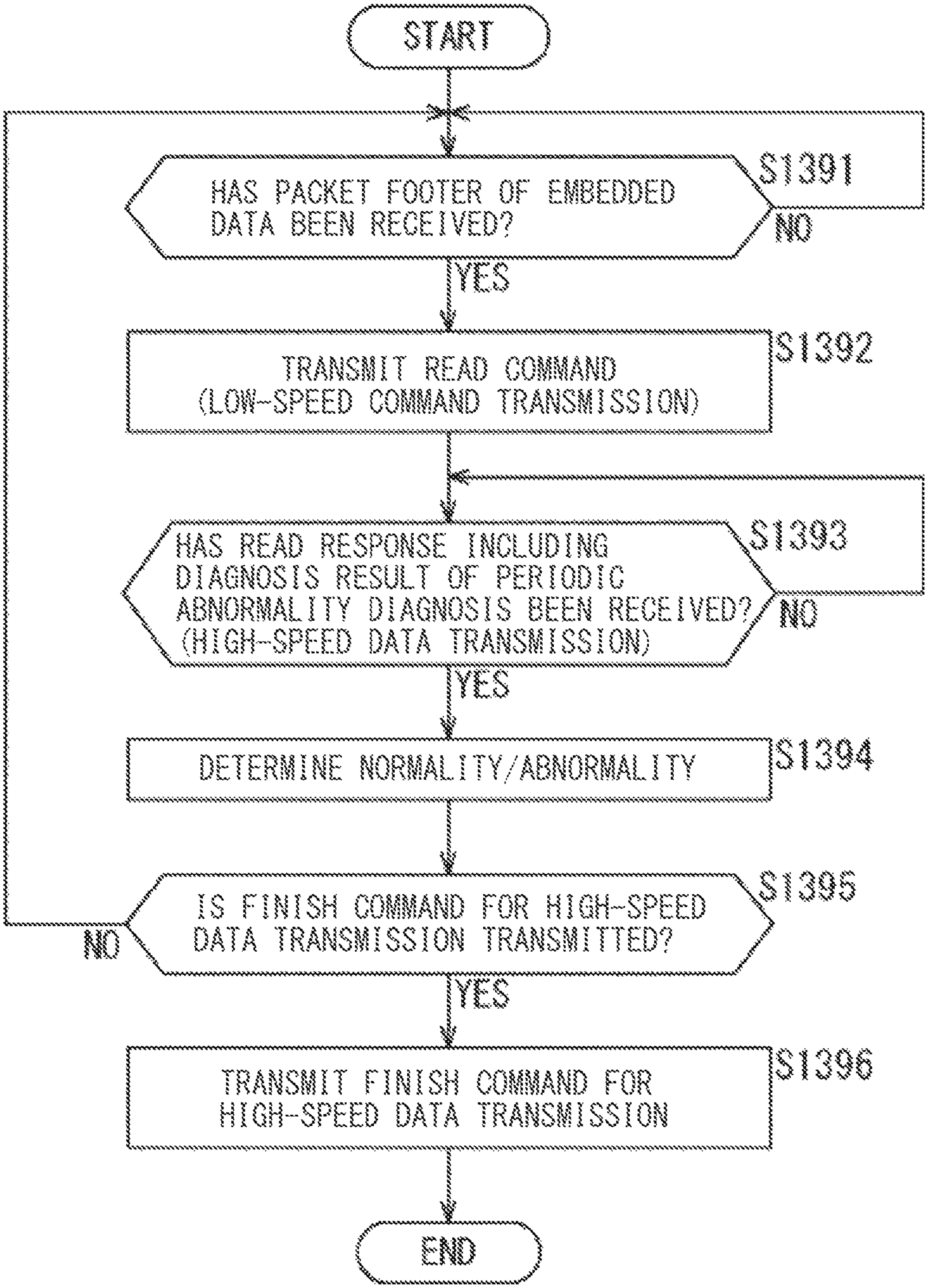

FIG. 141 is a flowchart describing imaging/transmission processing (Part 6) by the application processor.

Figure 142:
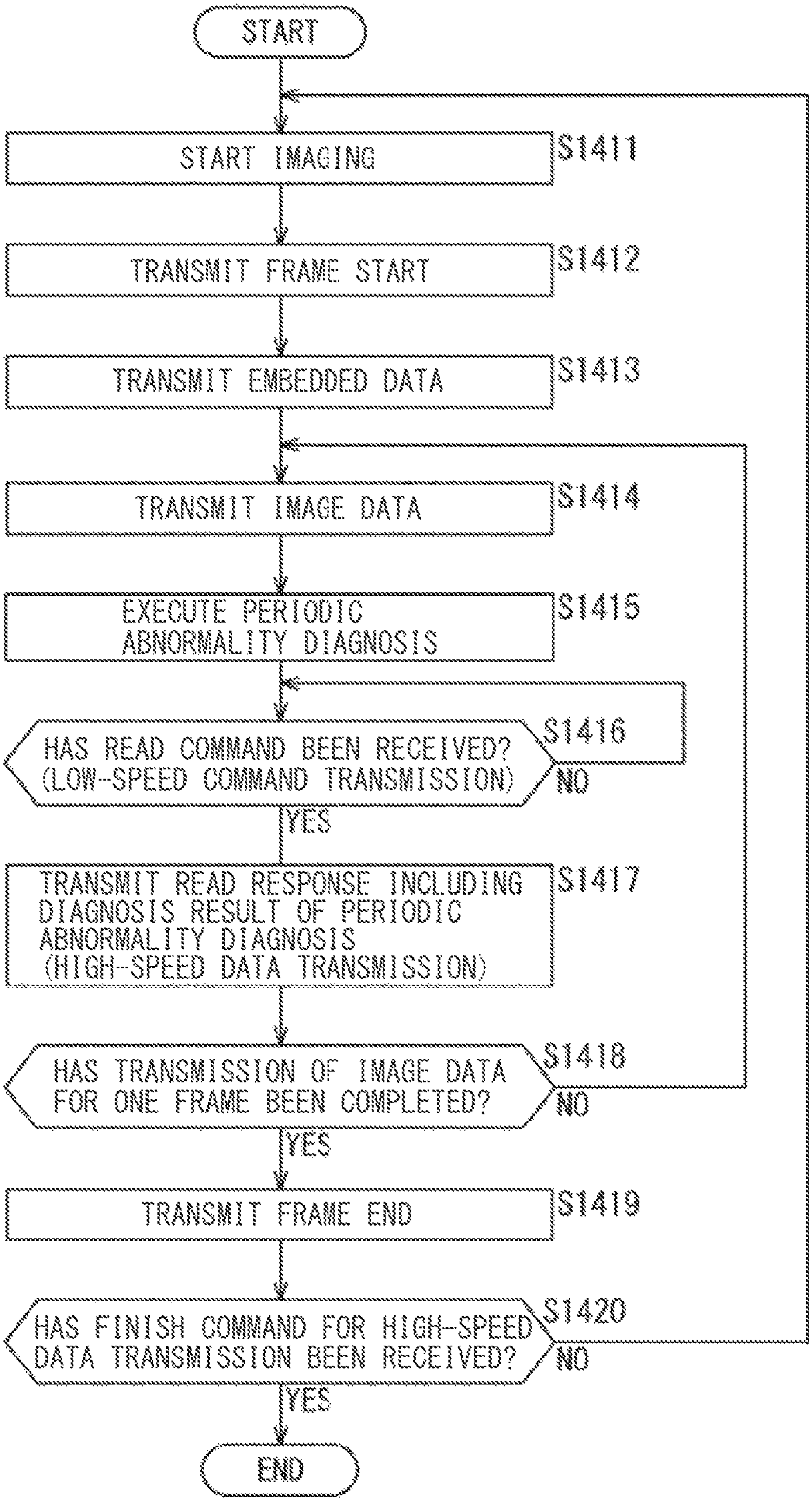

FIG. 142 is a flowchart describing imaging/transmission processing (Part 7) by the image sensor.

Figure 143:
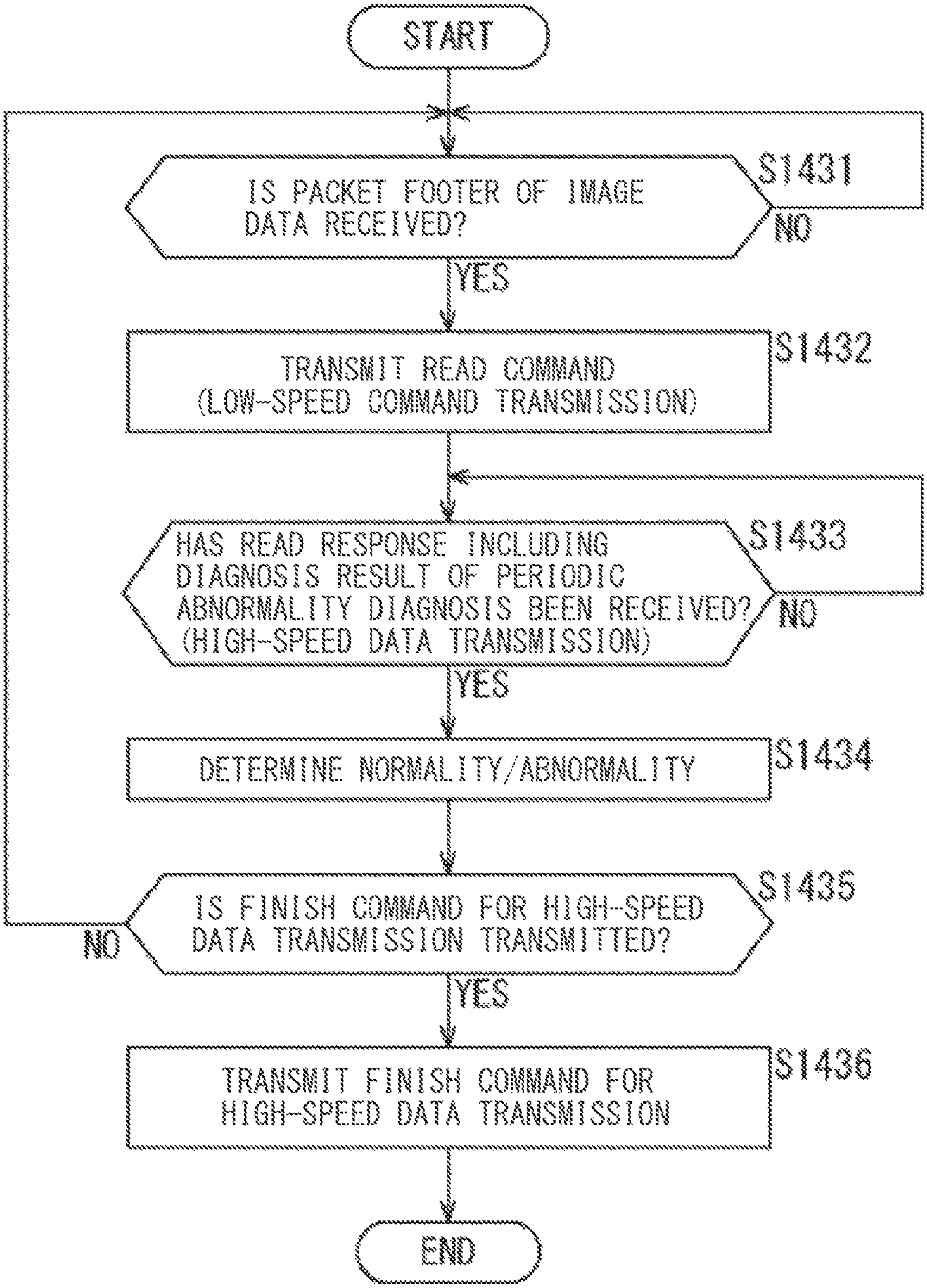

FIG. 143 is a flowchart describing imaging/transmission processing (Part 7) by the application processor.

Figure 144:
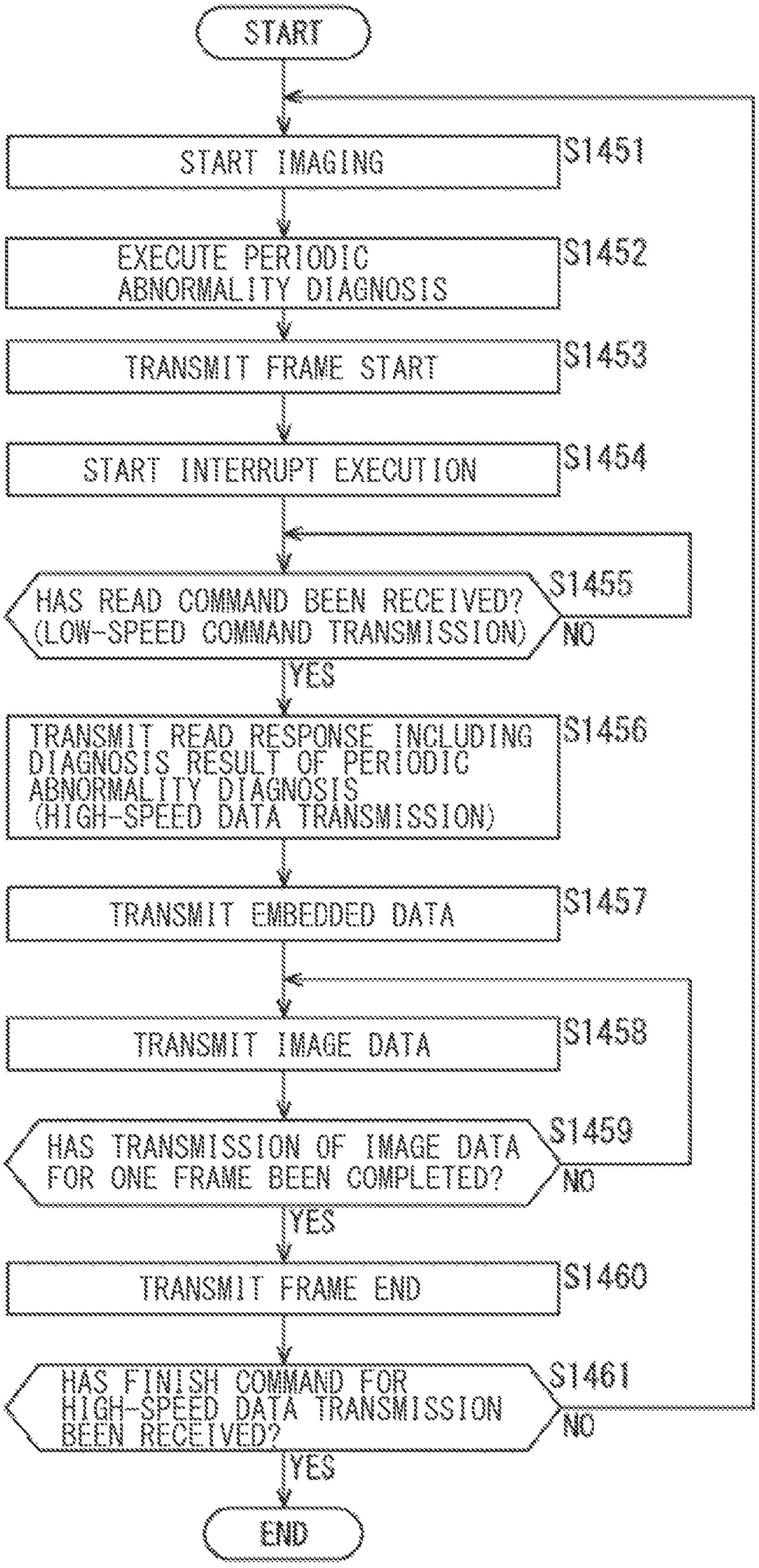

FIG. 144 is a flowchart describing imaging/transmission processing (Part 8) by the image sensor.

Figure 145:
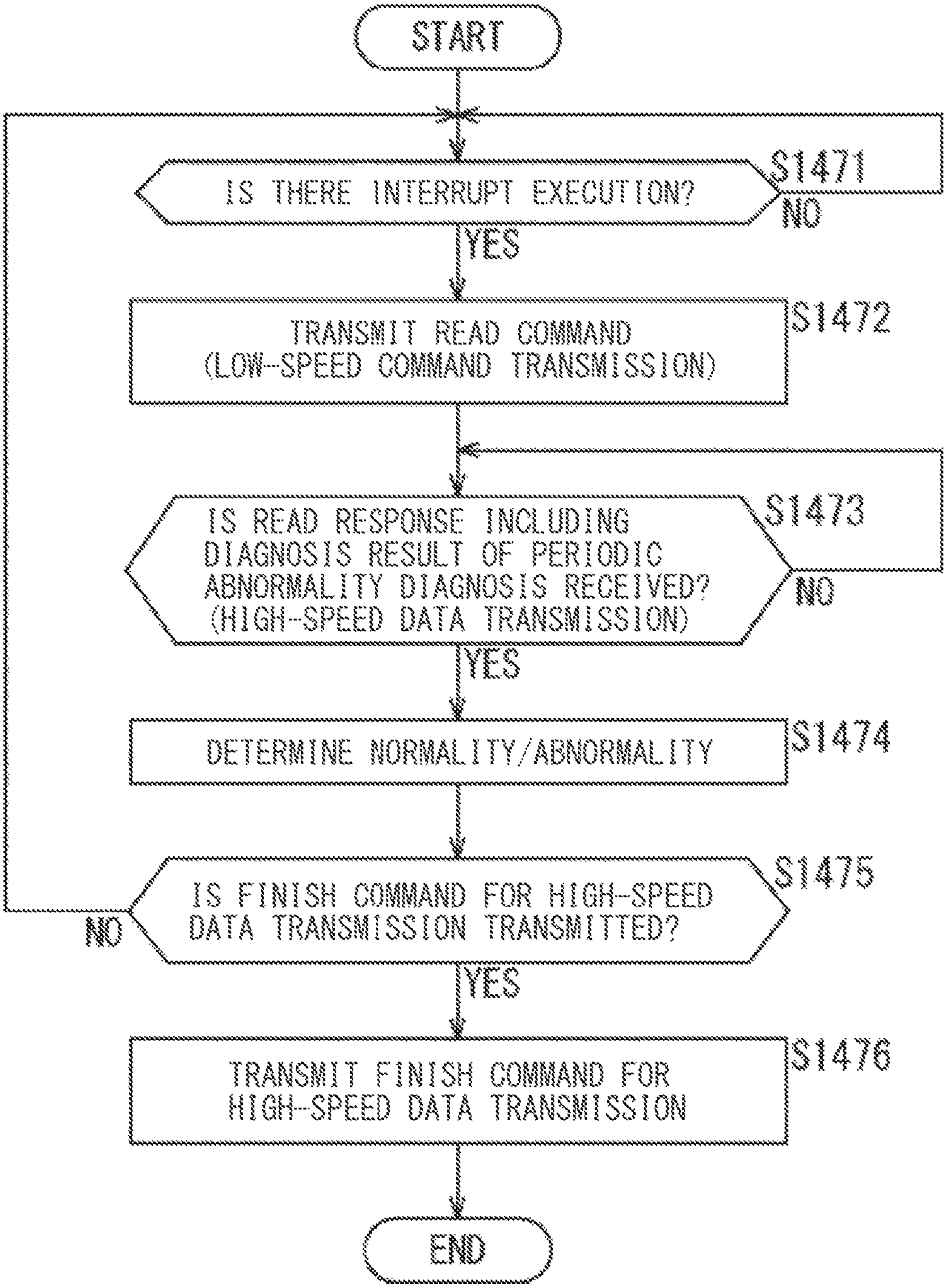

FIG. 145 is a flowchart describing imaging/transmission processing (Part 8) by the application processor.

Figure 146:
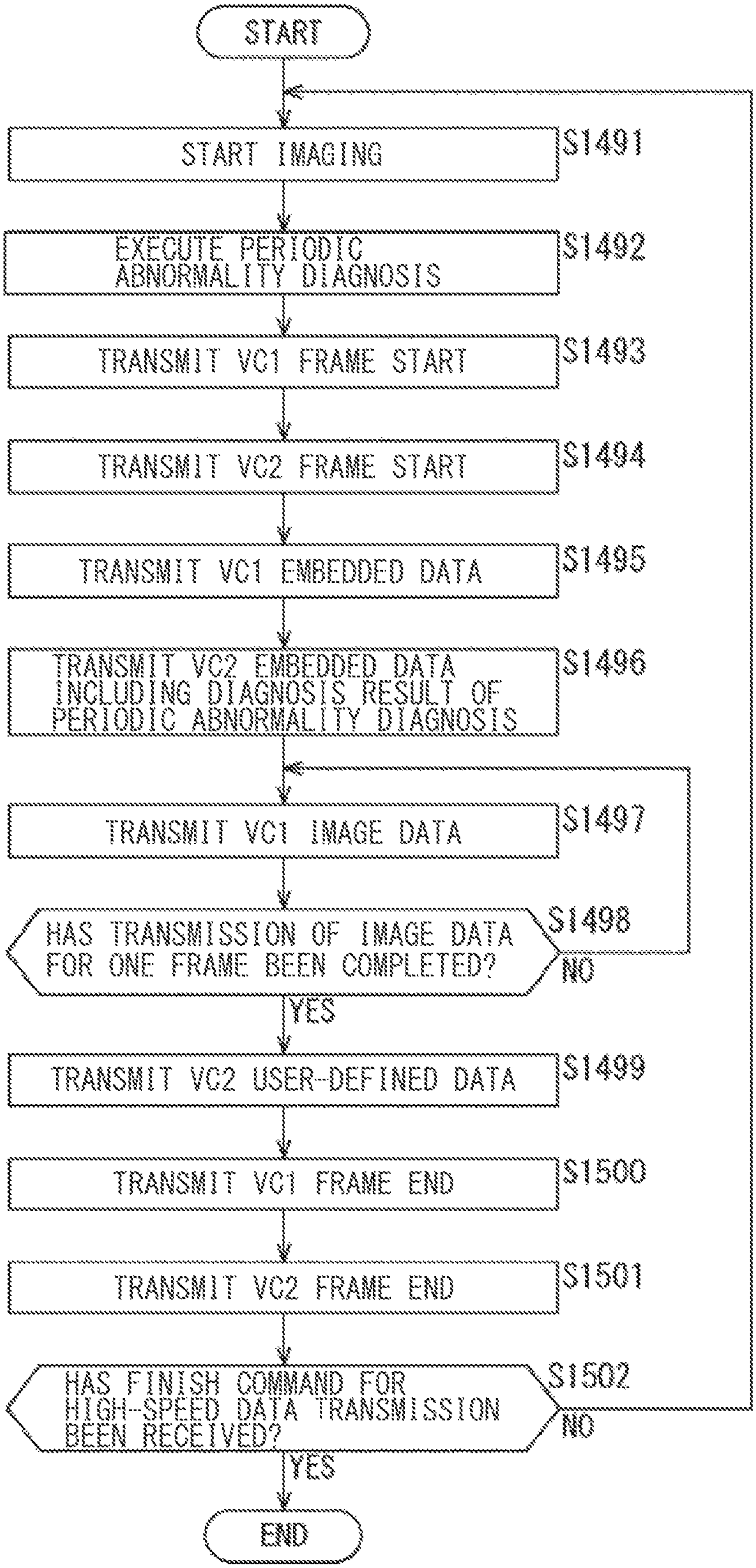

FIG. 146 is a flowchart describing imaging/transmission processing (Part 9).

Figure 147:
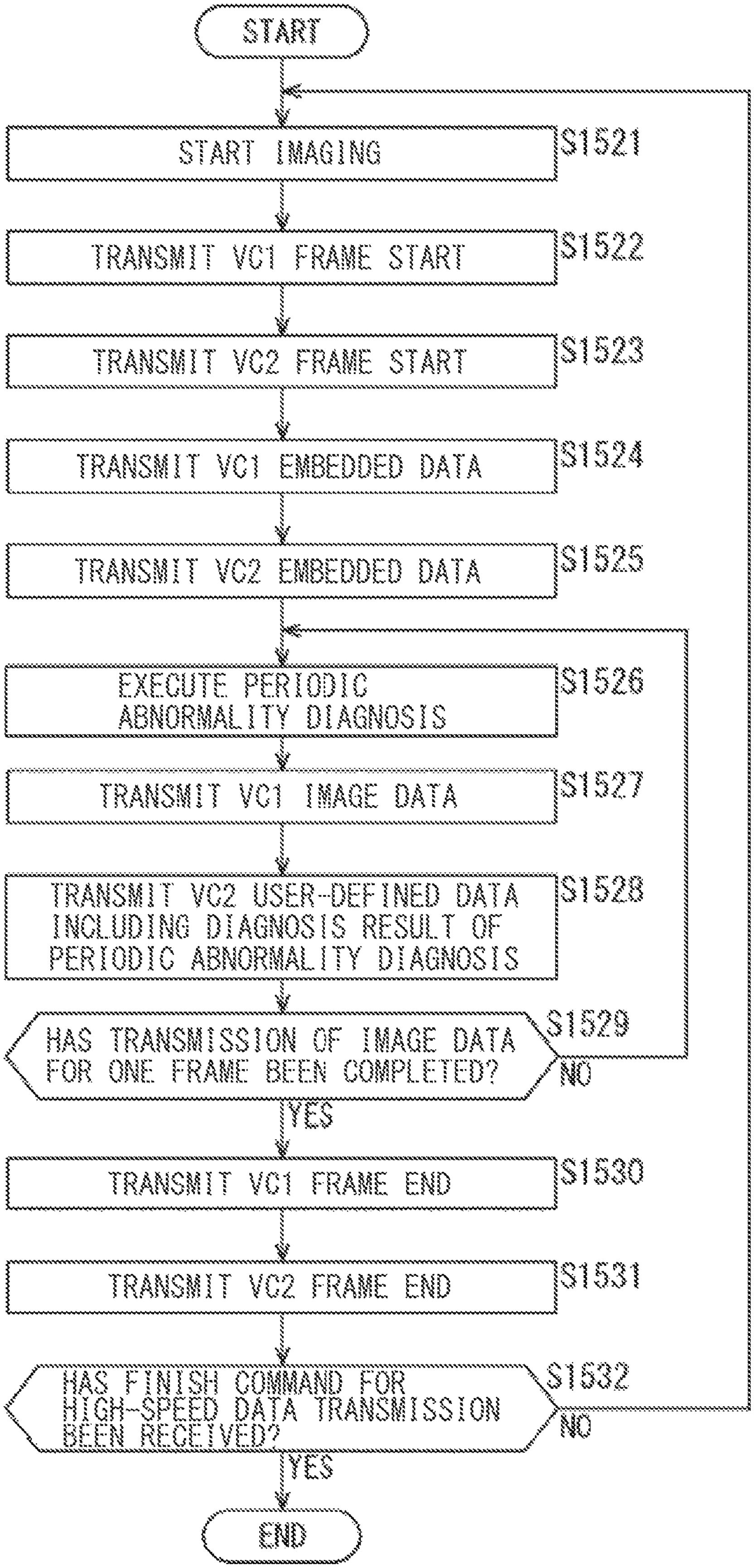

FIG. 147 is a flowchart describing imaging/transmission processing (Part 10).

Figure 148:
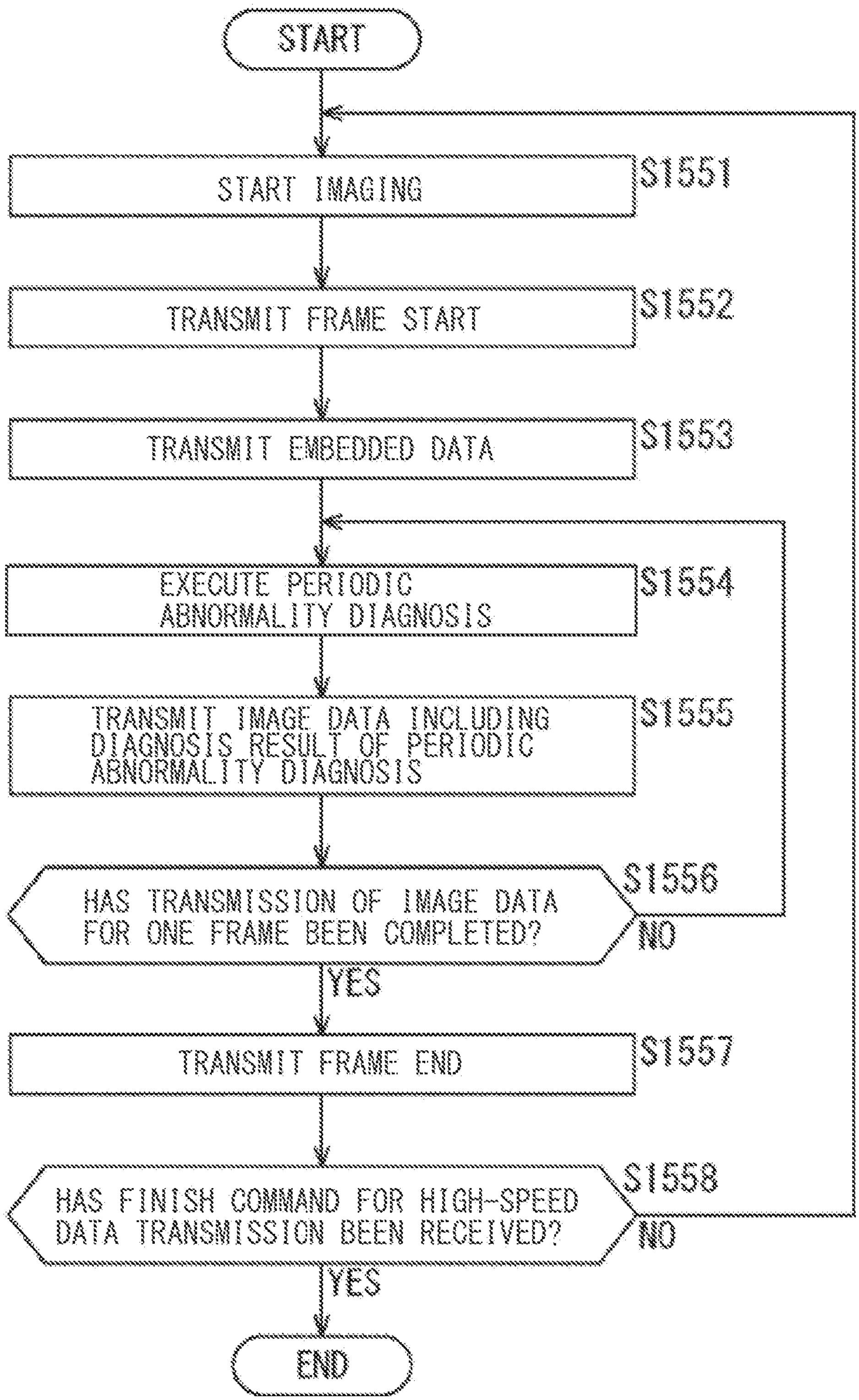

FIG. 148 is a flowchart describing imaging/transmission processing (Part 11).

FIG. 149 is a diagram describing message count values using two types of count values different in hamming distance.

FIG. 150 is a diagram describing a method for detecting presence or absence of falsification or failure of message count values using two types of count values.

FIG. 151 is a diagram describing a method for detecting presence or absence of falsification or failure of message count values using two types of count values.

Figure 152:
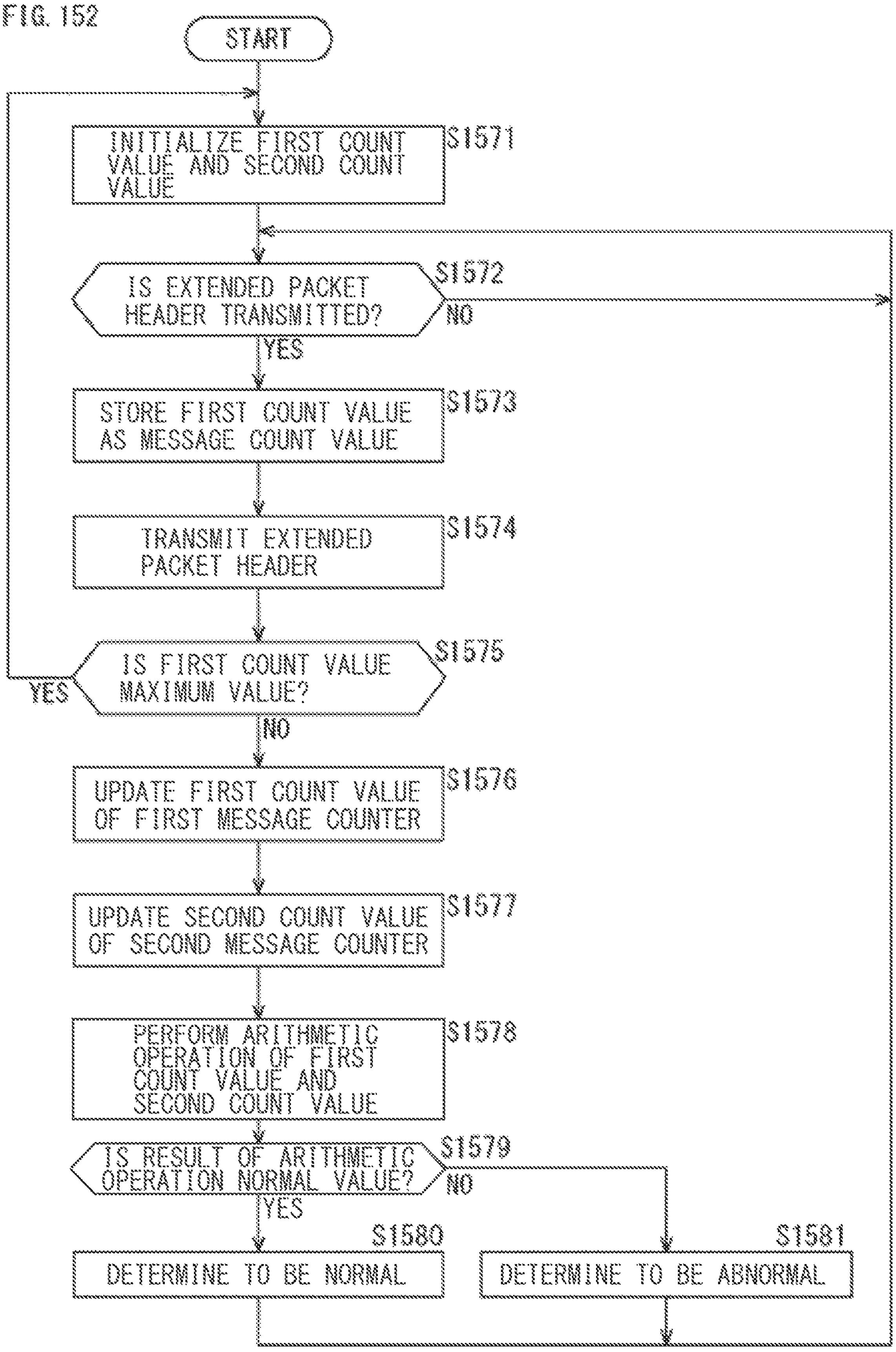

FIG. 152 is a flowchart describing message count processing.

FIG. 153 is a diagram illustrating a configuration example of an extended packet header ePH2 at the time when Warning Descriptor is set in a reserved region (Reserved) in the extended packet header ePH2.

FIG. 154 is a diagram illustrating a description example of identification information using each bit of Warning Descriptor (specific message).

FIG. 155 is a diagram illustrating a configuration example at the time when a warning flash report (e.g., Physical attack detection) is set as a first specific message in an extended packet header.

Figure 156:
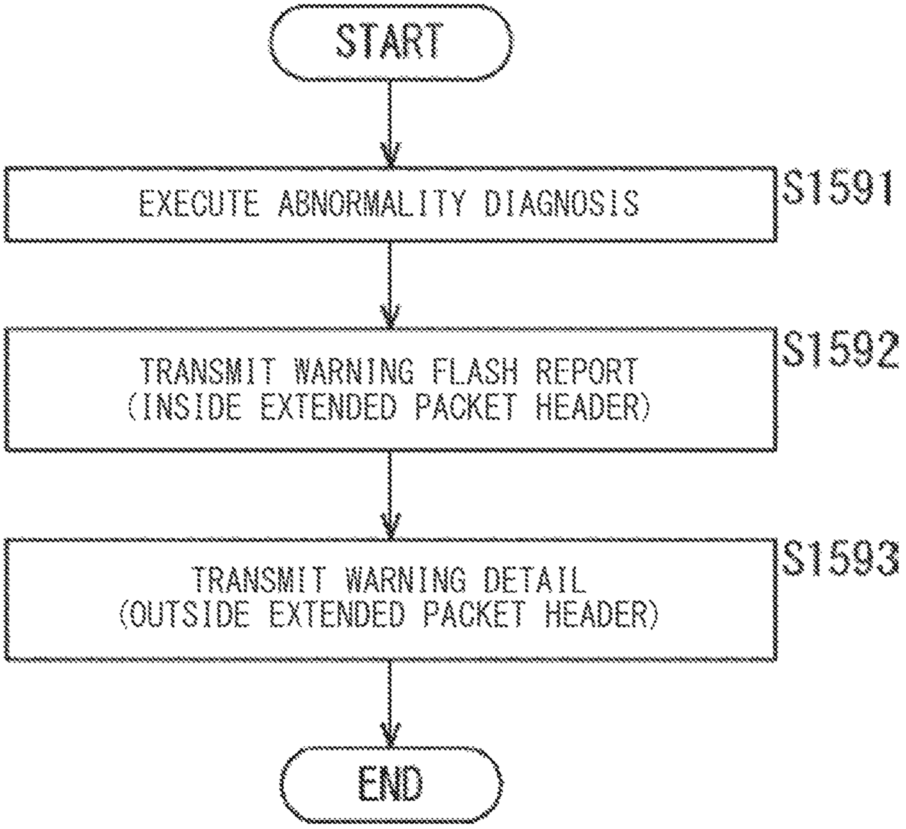

FIG. 156 is a flowchart describing transmission processing for the image sensor at the time when a specific message is separated for transmission.

Figure 157:
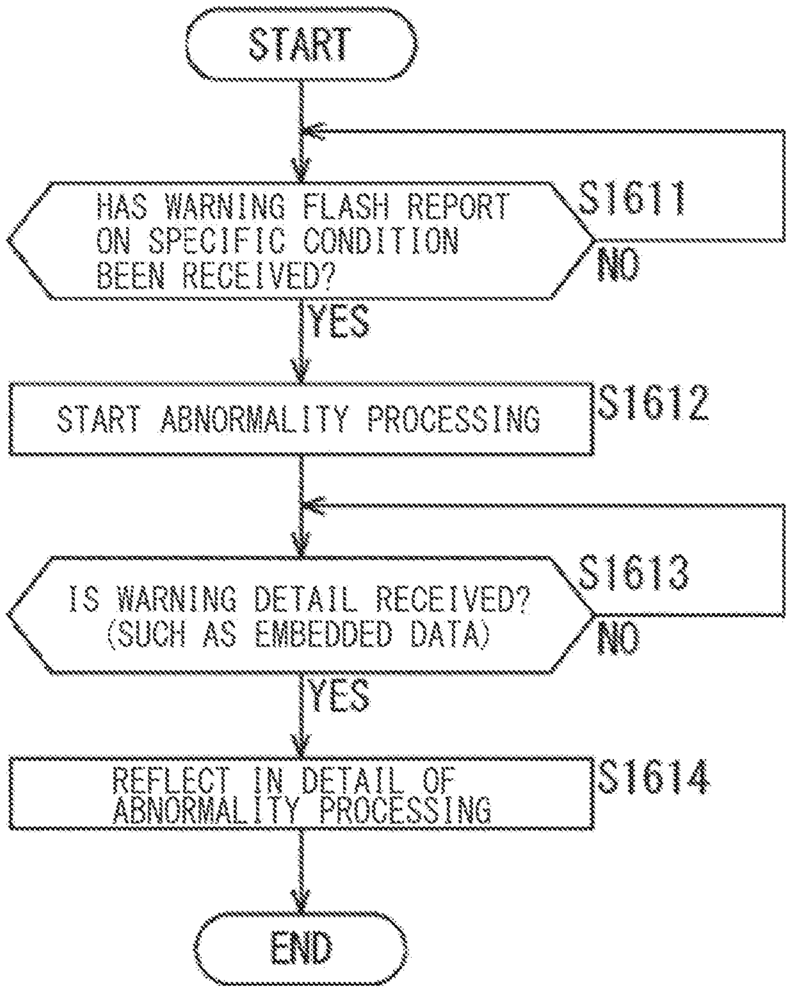

FIG. 157 is a flowchart describing transmission processing for the application processor at the time when the specific message is separated for transmission.

Figure 158:
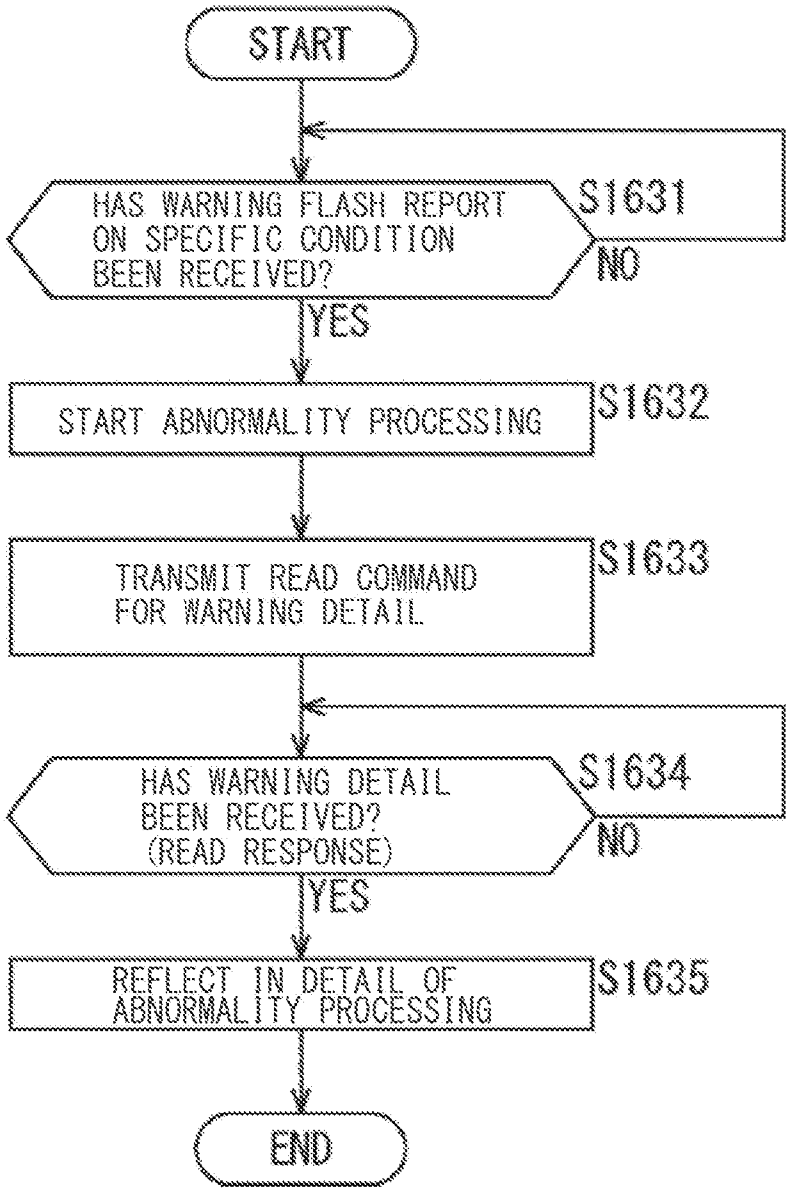

FIG. 158 is a flowchart describing transmission processing at the time when the specific message is separated for transmission in a case where a read command for a warning detail is transmitted after transmission of the warning flash report.

FIG. 159 is a diagram describing a configuration example of Security Descriptor in which one of specific messages is set, such as presence or absence of abnormality inside or outside the image sensor 1211 or presence or absence of interference with or attack on the image sensor 1211.

Figure 160:
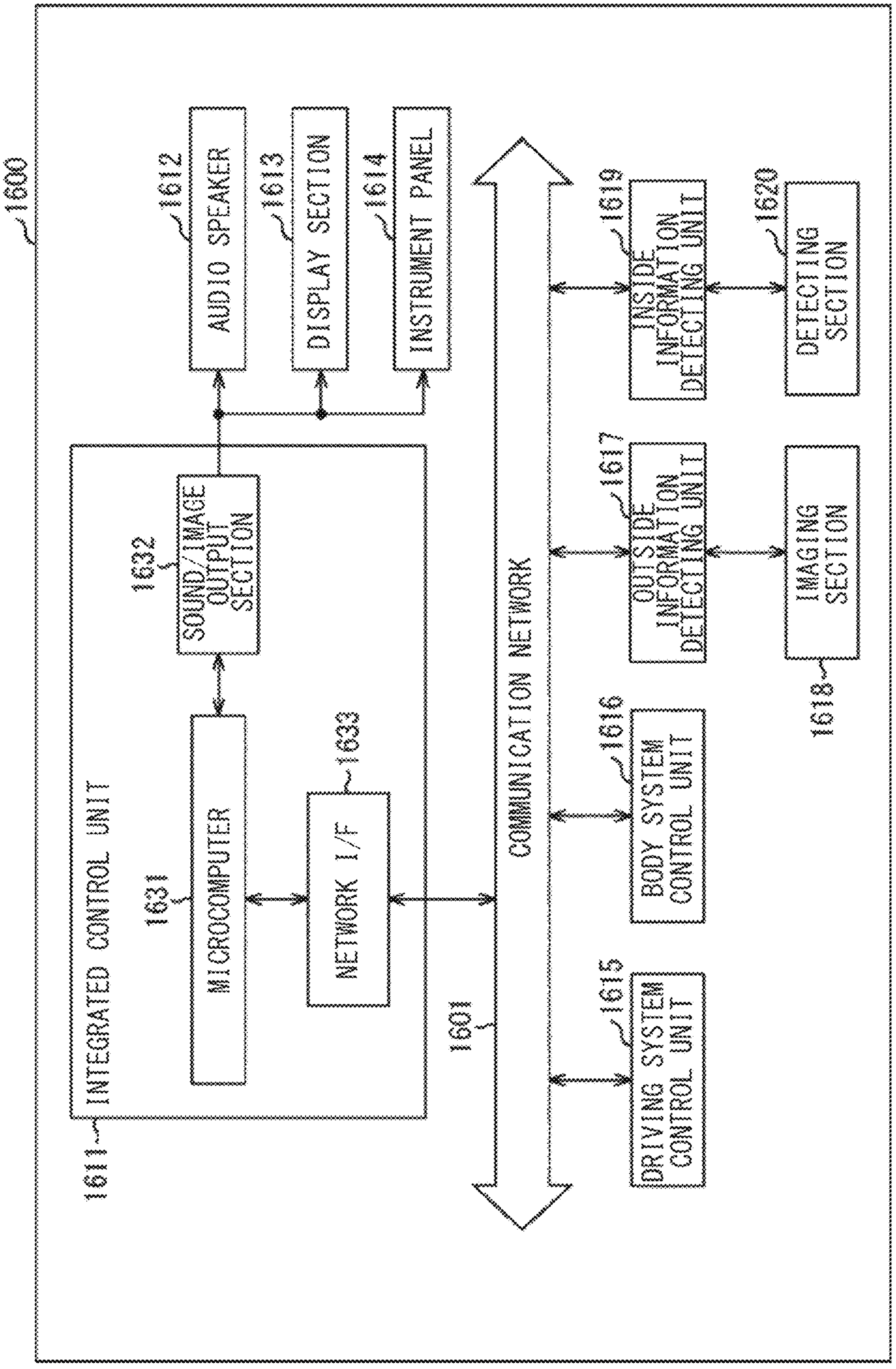

FIG. 160 is a block diagram illustrating a configuration example of a propulsion apparatus mounted with the image sensor and the application processor.

Figure 161:
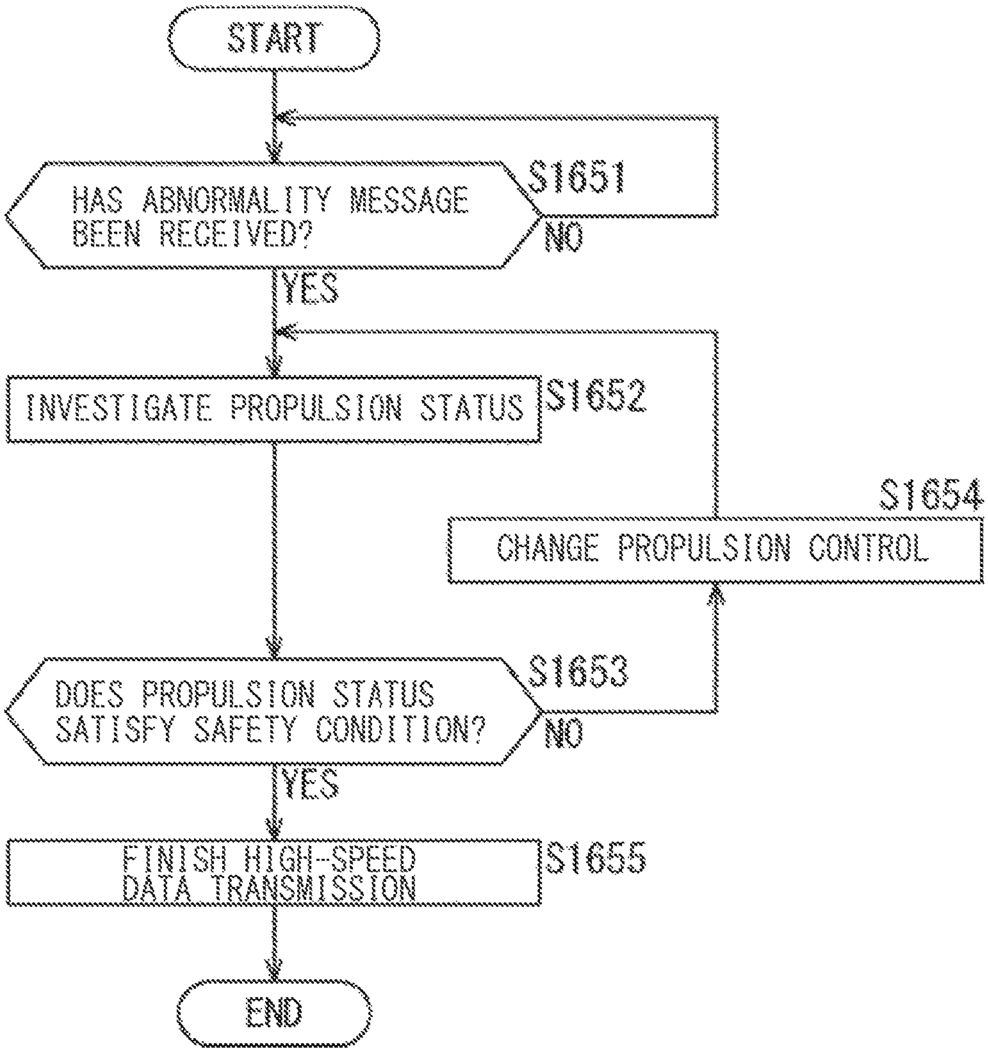

FIG. 161 is a diagram describing propulsion control processing (Part 1) to control propulsion of the propulsion apparatus in FIG. 160.

Figure 162:
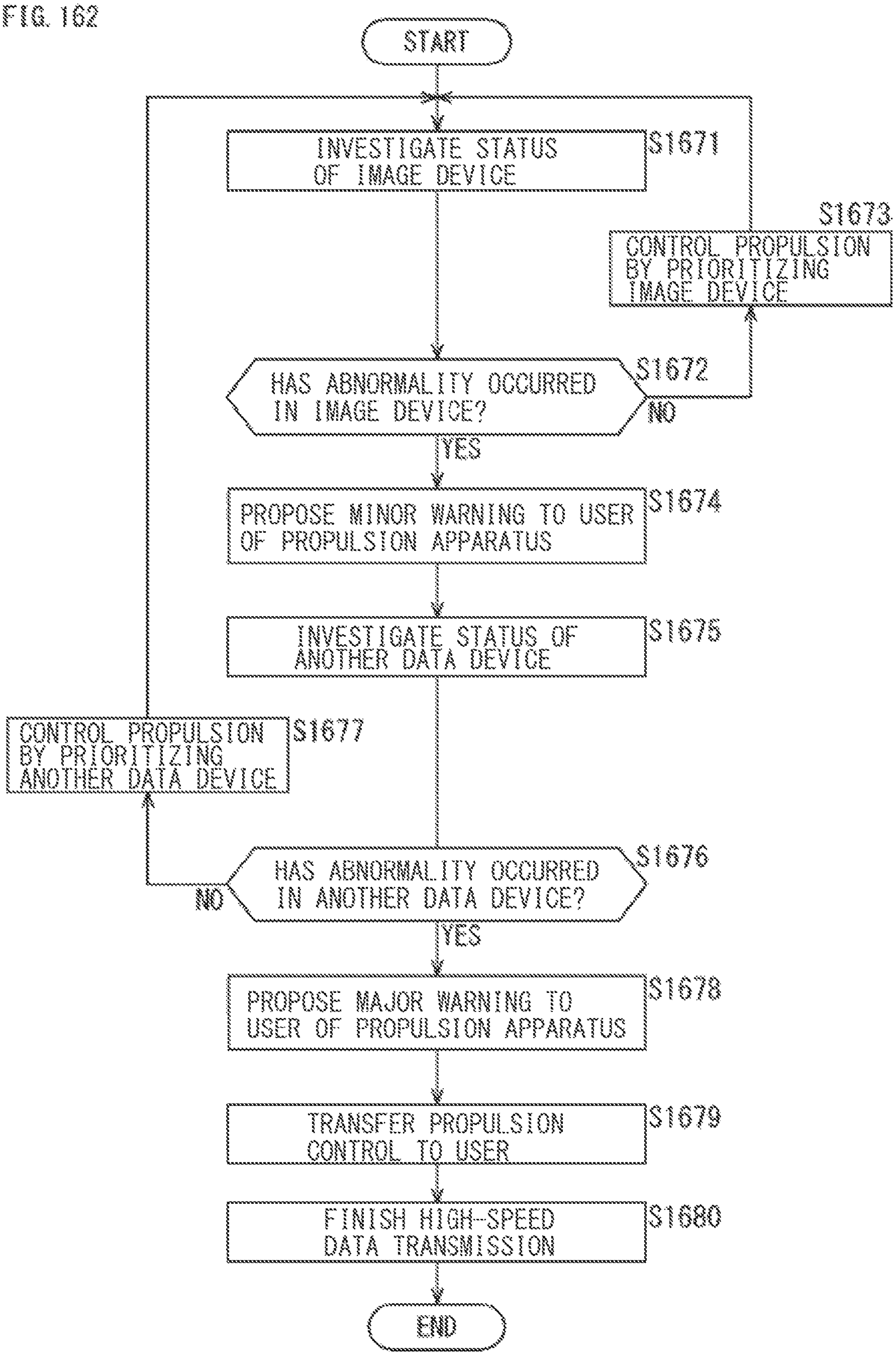

FIG. 162 is a diagram describing propulsion control processing (Part 2) to control the propulsion of the propulsion apparatus in FIG. 160.

Figure 163:
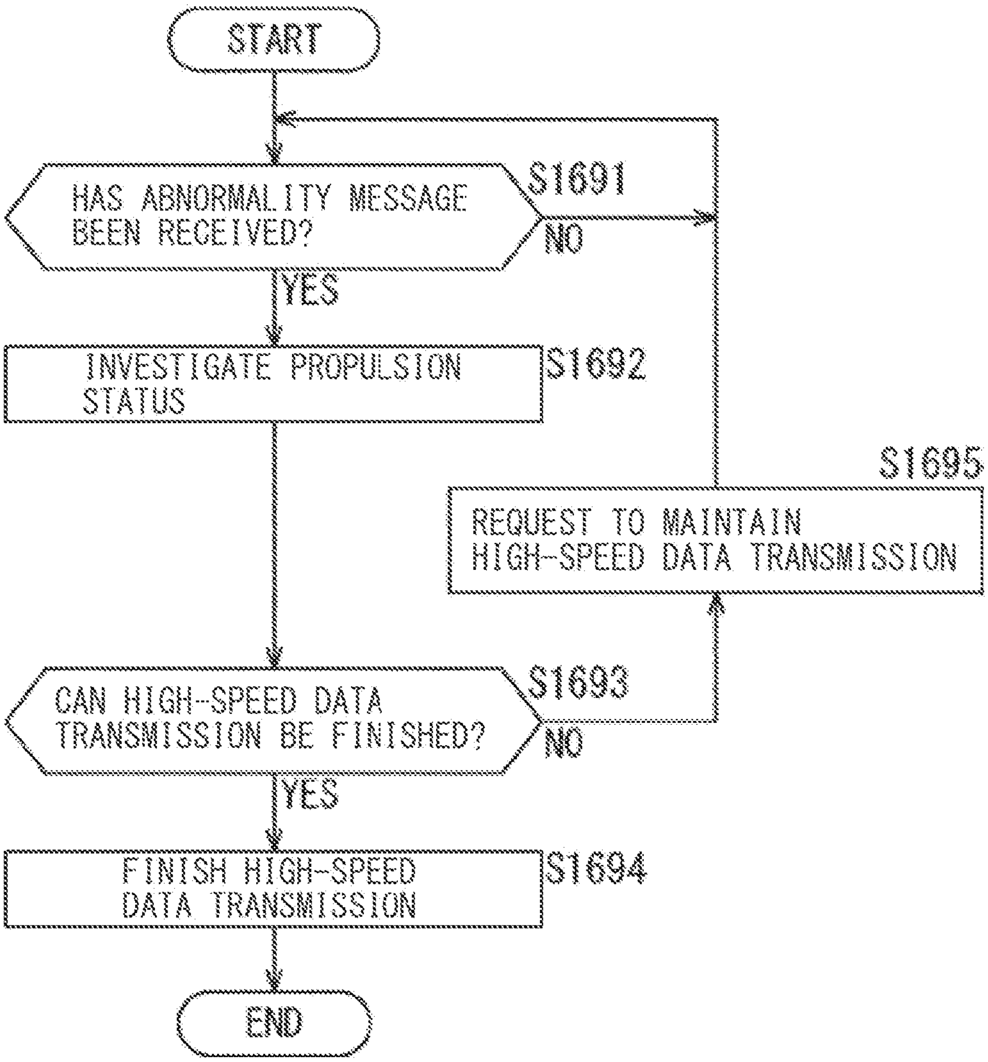

FIG. 163 is a diagram describing propulsion control processing (Part 3) by a microcomputer to control the propulsion of the propulsion apparatus in FIG. 160.

Figure 164:
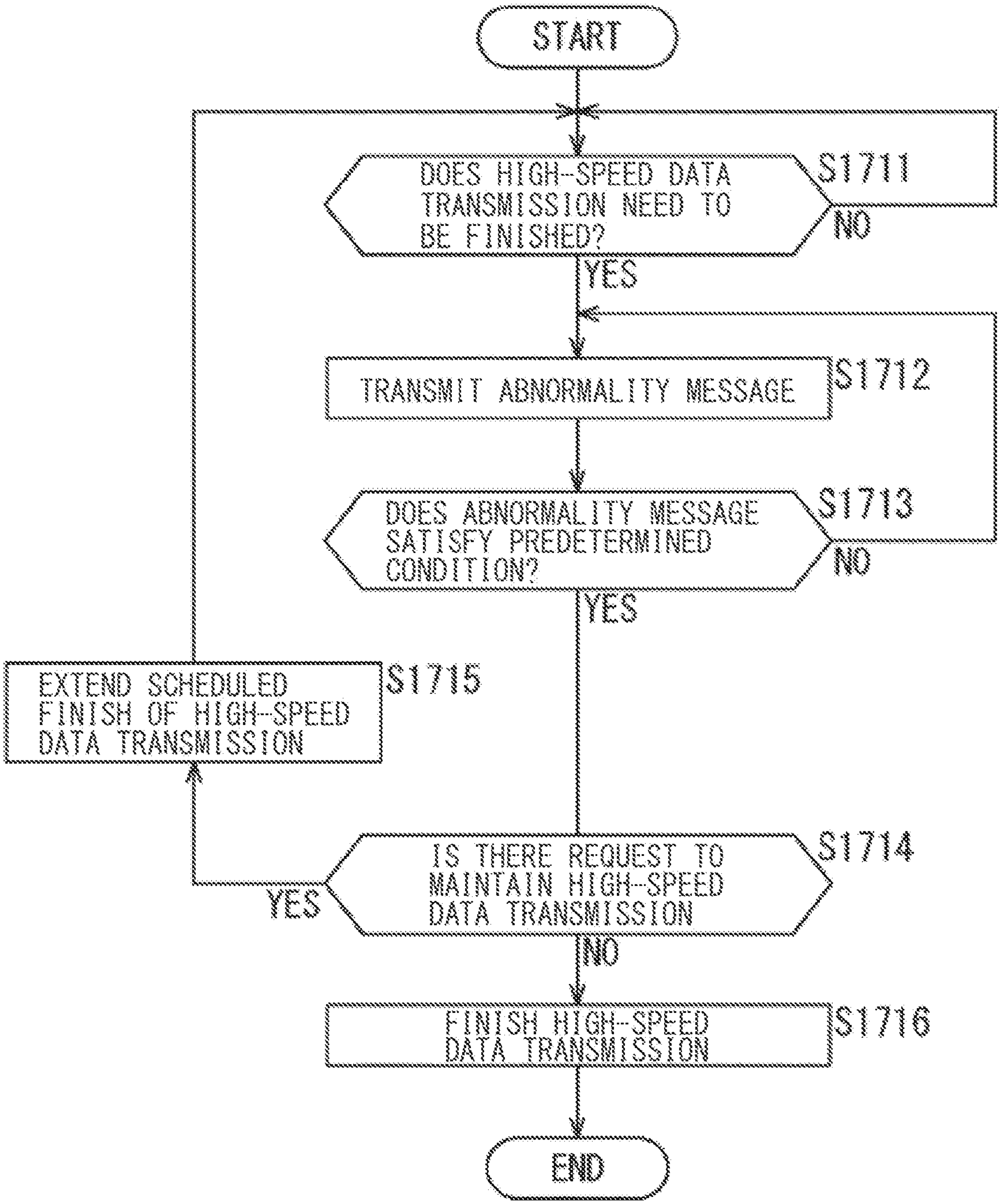

FIG. 164 is a diagram describing propulsion control processing (Part 3) by an imaging section to control the propulsion of the propulsion apparatus in FIG. 160.

FIG. 165 is a diagram describing a configuration example of Responder flag fields definitions to set enablement (HBEAT_CAP=1) or disablement (HBEAT_CAP=0) of HEARTBEAT function.

FIG. 166 is a diagram describing a configuration example of a HEARTBEAT request message.

FIG. 167 is a diagram describing a configuration example of a HEARTBEAT_ACK response message.

FIG. 168 is a diagram describing a configuration example of a HEARTBEAT_NAK response message.

FIG. 169 is a diagram describing a configuration example of an END_SESSION request message.

Figure 170:
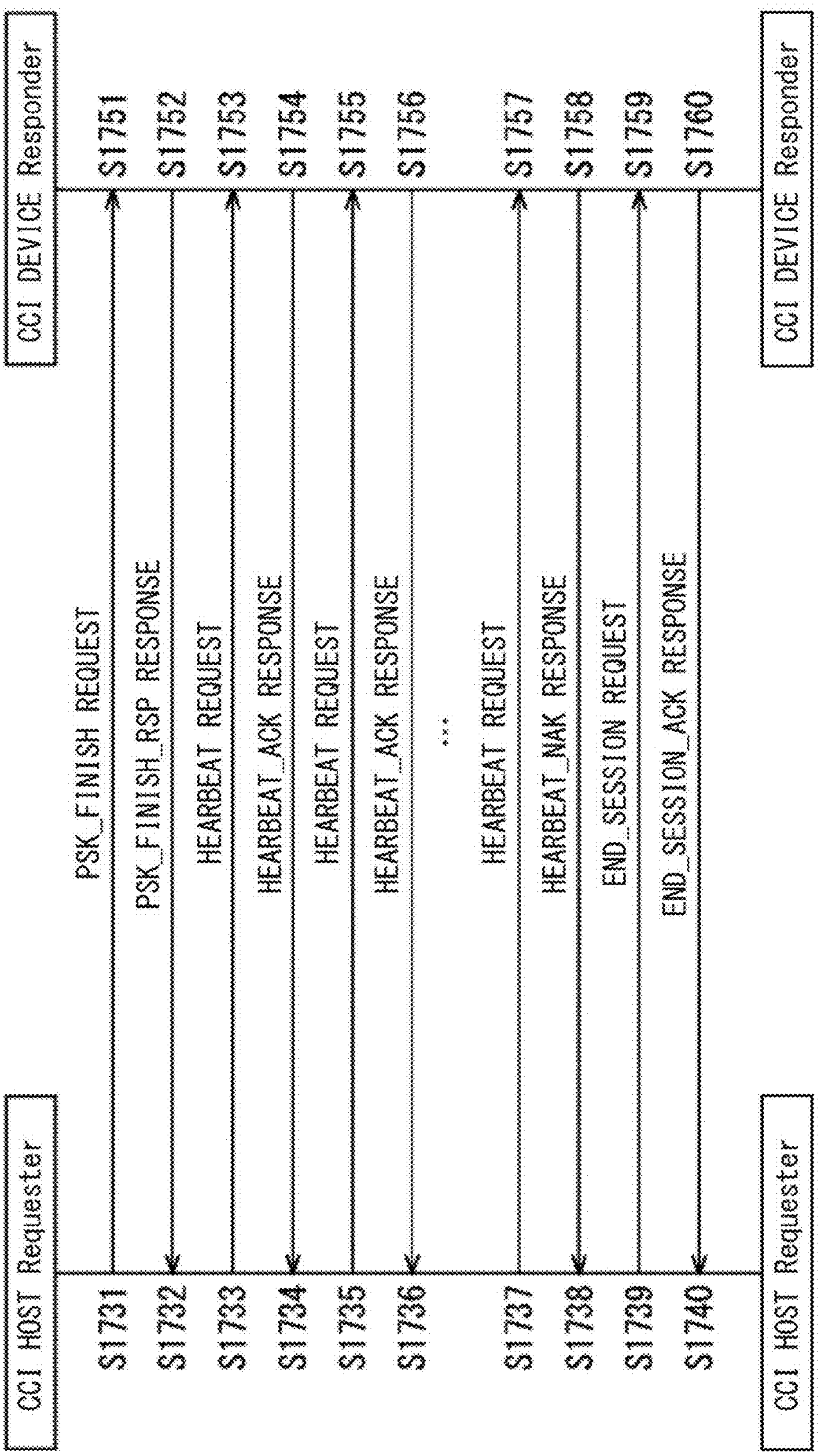

FIG. 170 is a flowchart describing HEARTBEAT processing (Part 1).

FIG. 171 is a diagram describing a configuration example of an END_SESSION_NAK response message.

Figure 172:
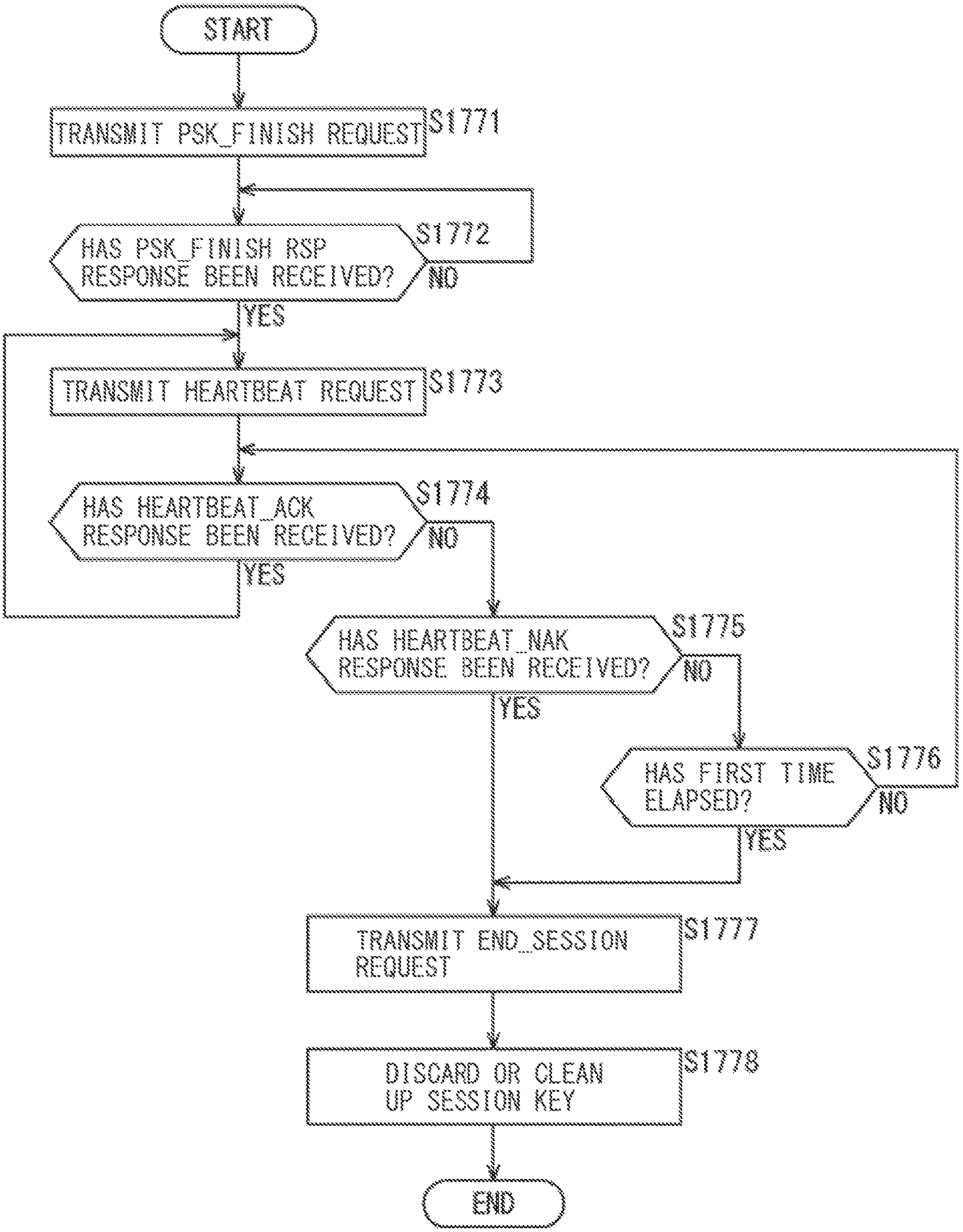

FIG. 172 is a flowchart describing HEARTBEAT processing (Part 2) of a CCI host (requester).

Figure 173:
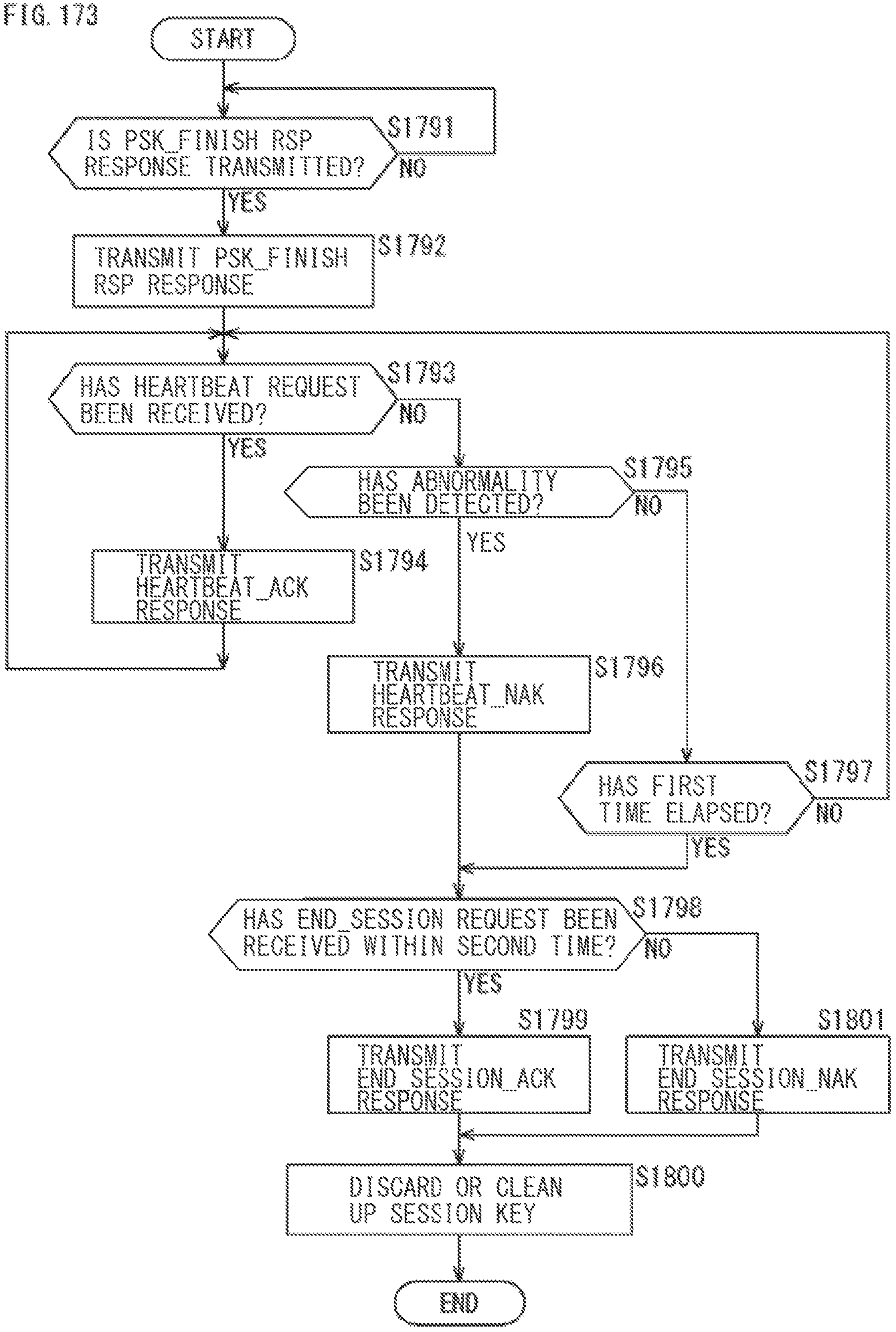

FIG. 173 is a flowchart describing HEARTBEAT processing (Part 2) of a CCI device (responder).

Figure 174:
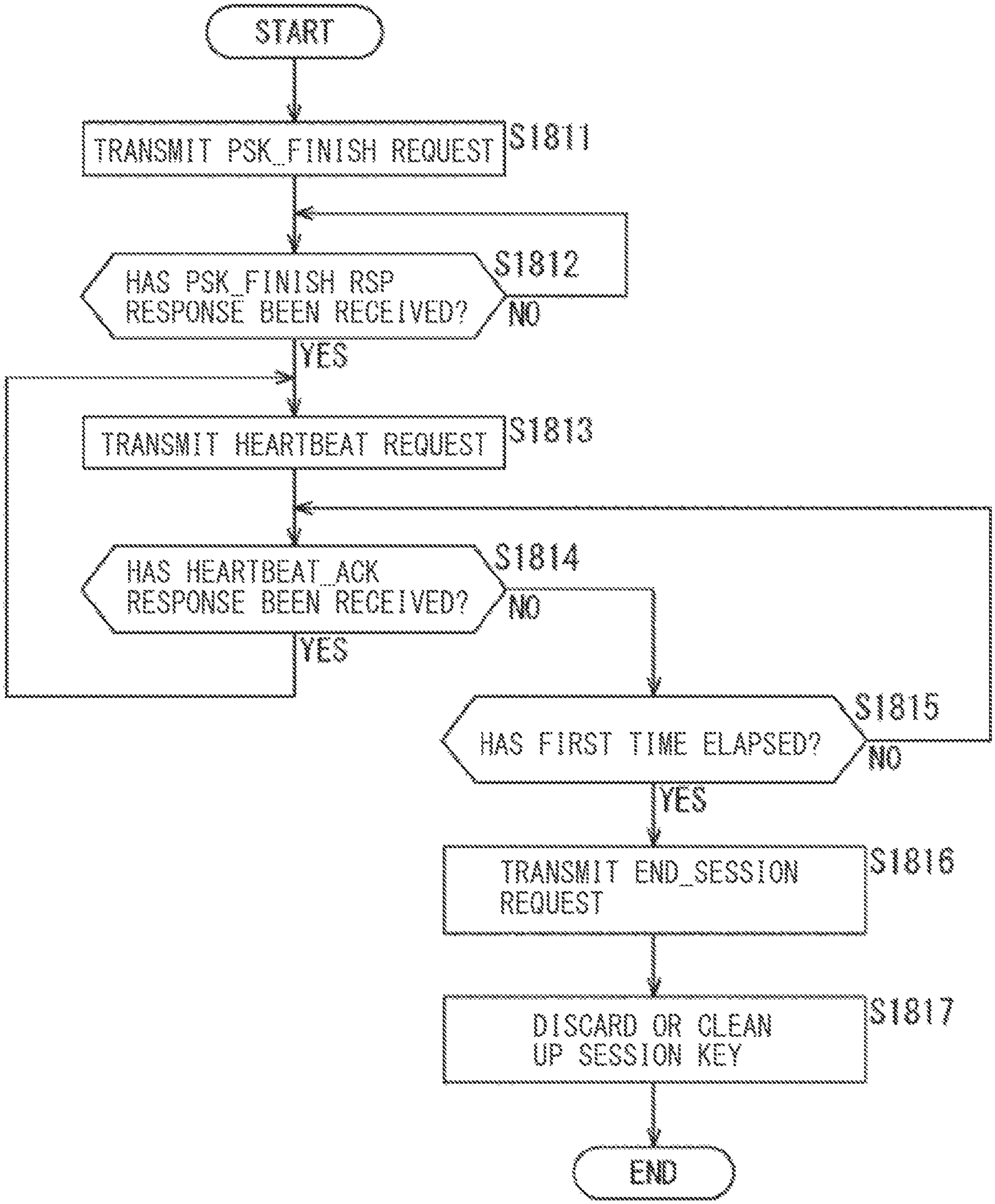

FIG. 174 is a flowchart describing HEARTBEAT processing (Part 3) of the CCI host (requester).

Figure 175:
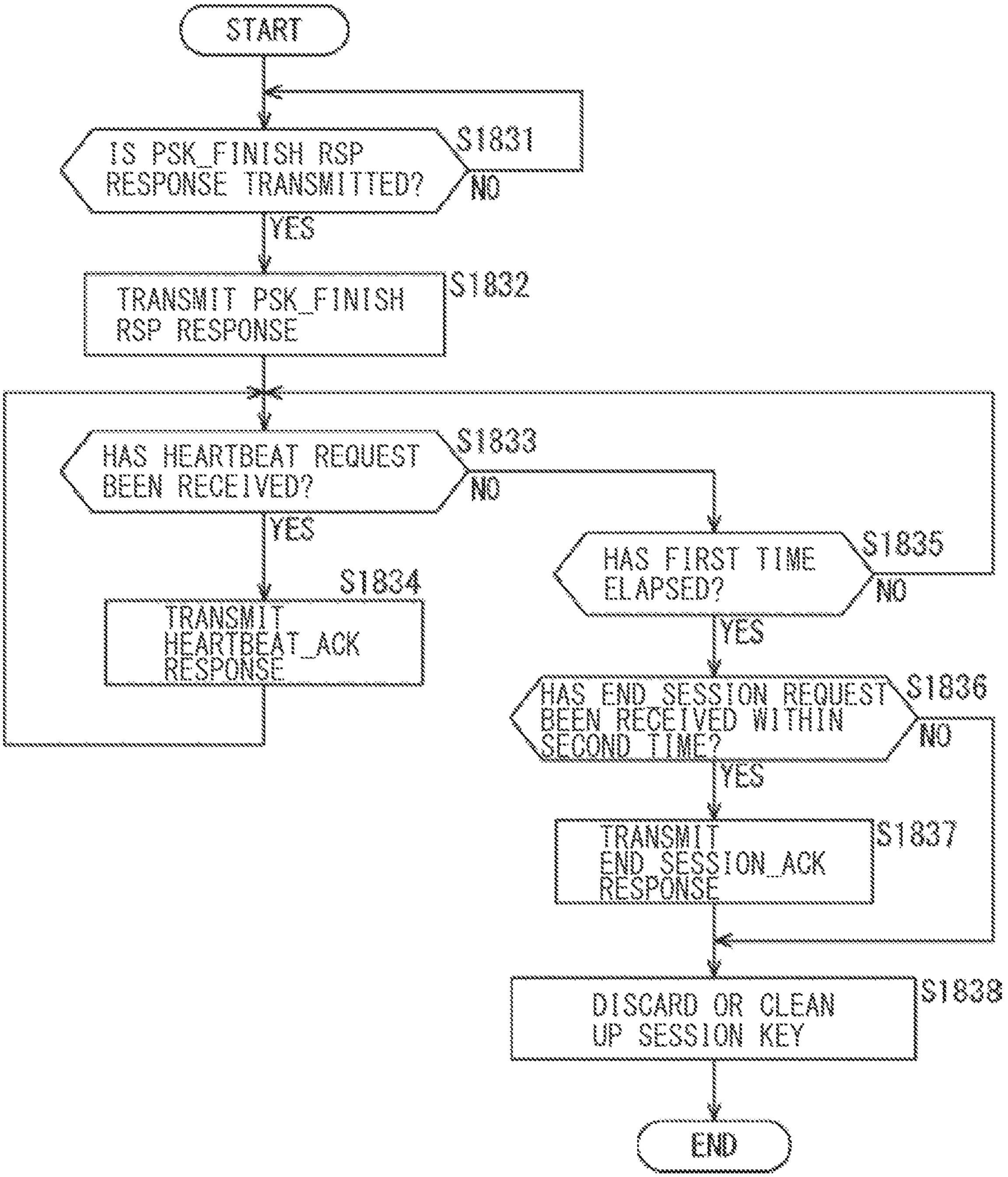

FIG. 175 is a flowchart describing HEARTBEAT processing (Part 3) of the CCI device (responder).

FIG. 176 is a diagram describing a configuration example of an ERROR response message.

FIG. 177 is a diagram describing a setting example of Error code and Error data.

FIG. 178 is a diagram describing a setting example of ExtendedErrorData.

FIG. 179 is a diagram describing a setting example of Registry or standards body ID in a case where pseudo HEARTBEAT function is used.

FIG. 180 is a diagram describing a setting example of a VENDOR_DEFINED_REQUEST request message.

FIG. 181 is a diagram describing a setting example of a VENDOR_DEFINED_RESPONSE response message.

Figure 182:
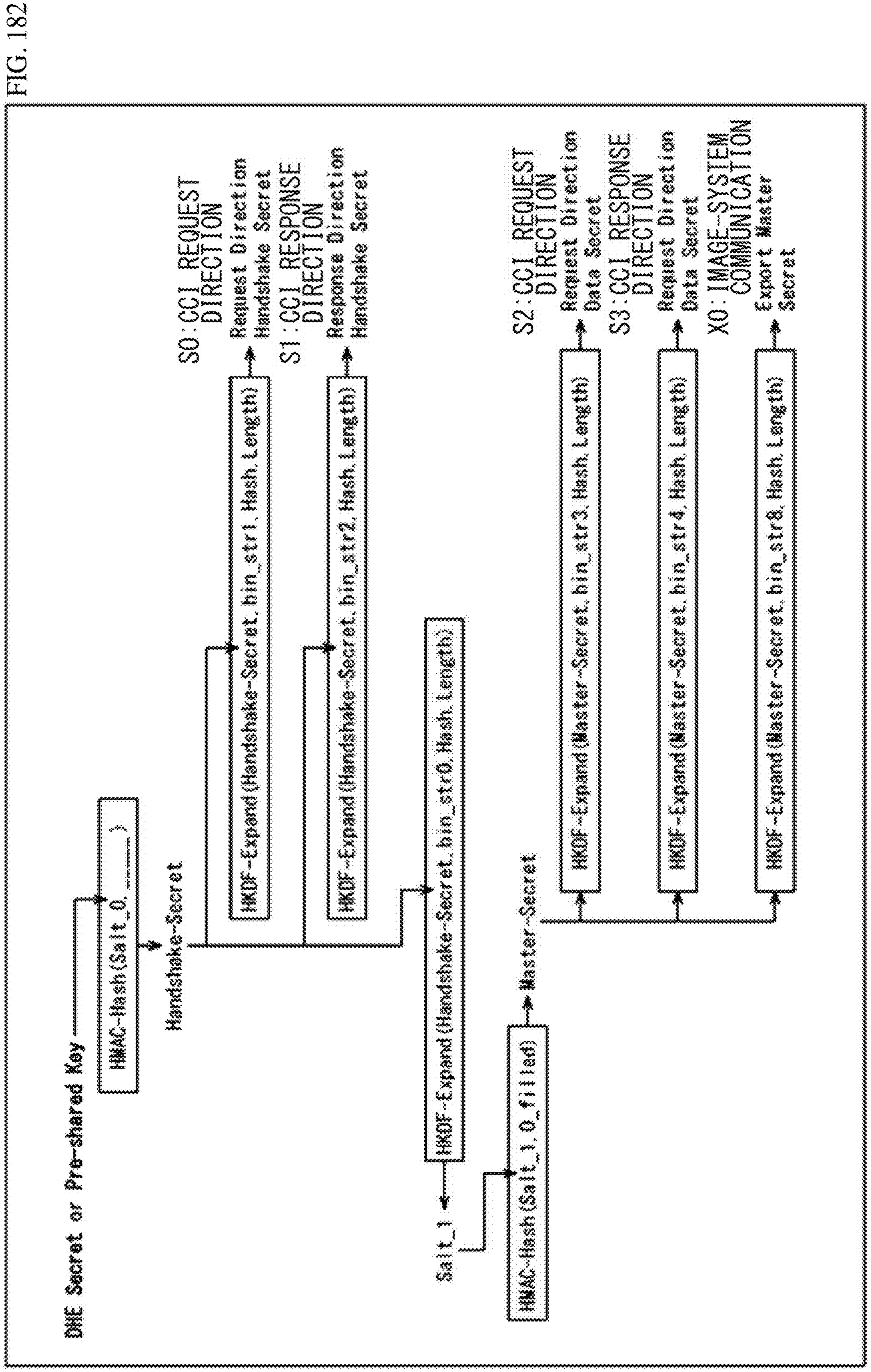

FIG. 182 is a diagram describing a key schedule of SPDM.

FIG. 183 is a diagram illustrating an example of KEY UPDATA_operations.

Figure 184:
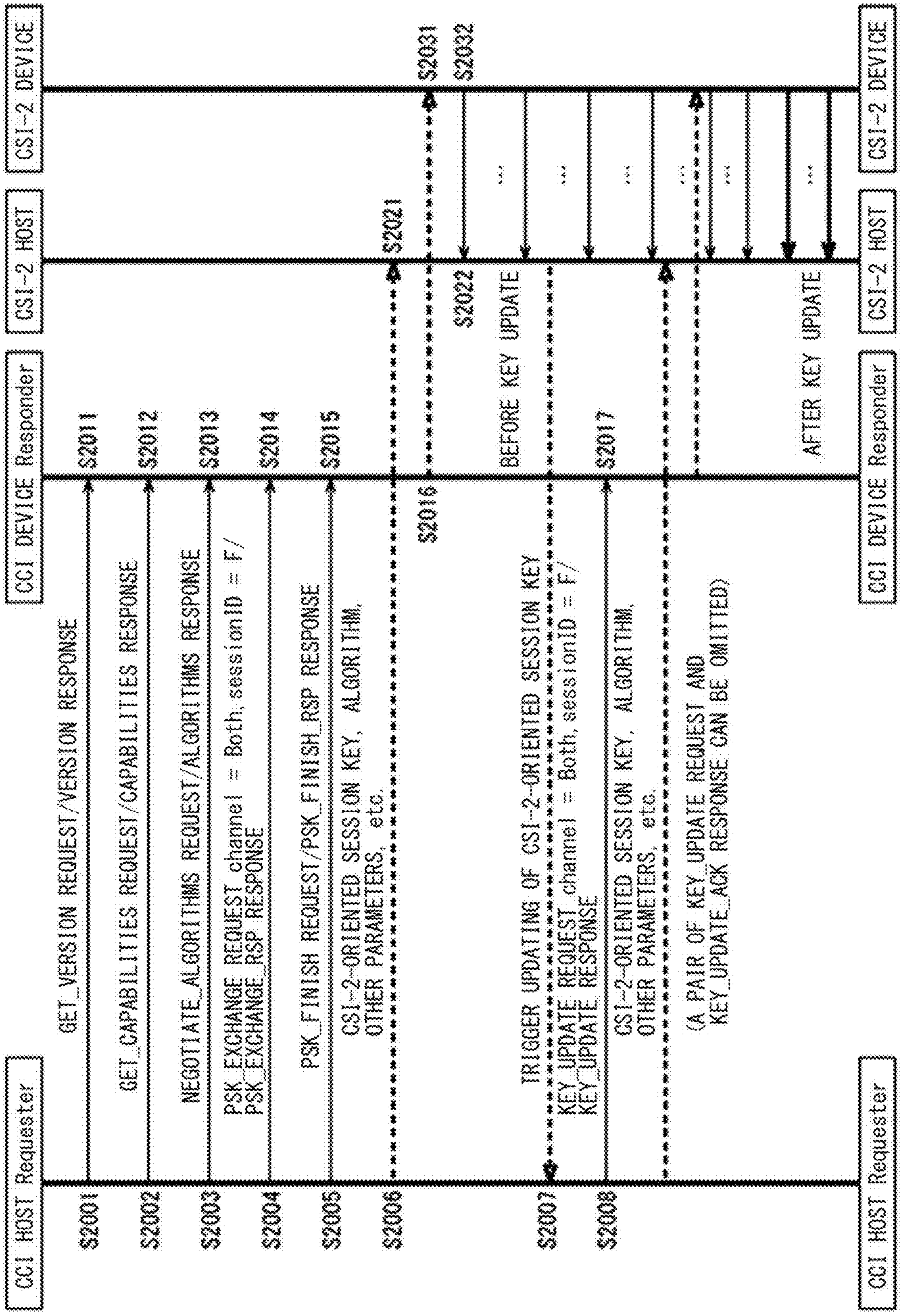

FIG. 184 is a flowchart describing an example of a flow of processing related to key update.

FIG. 185 is a diagram illustrating an example of the ePH2.

Figure 186:
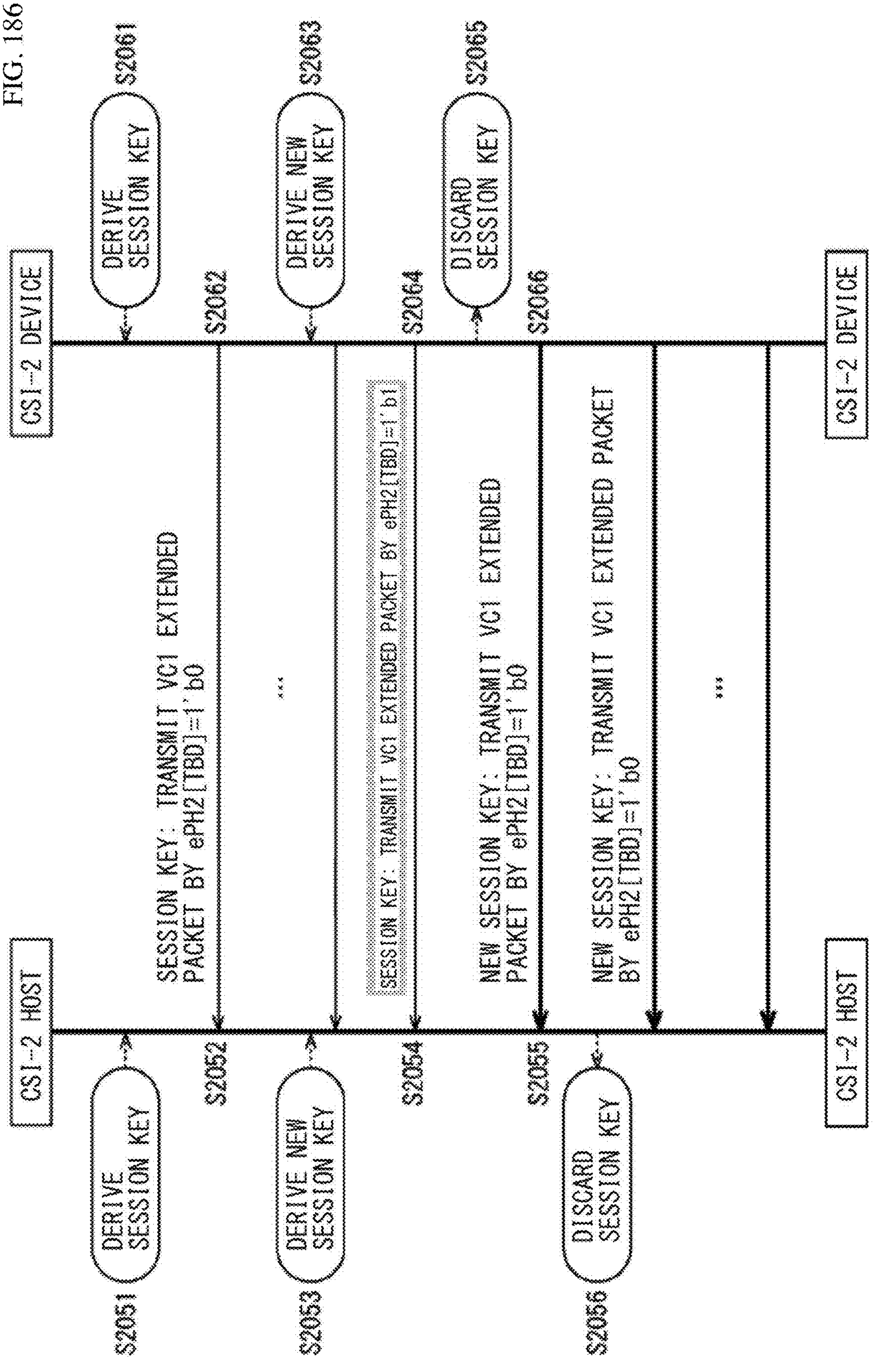

FIG. 186 is a flowchart describing an example of a flow of session key update.

Figure 187:
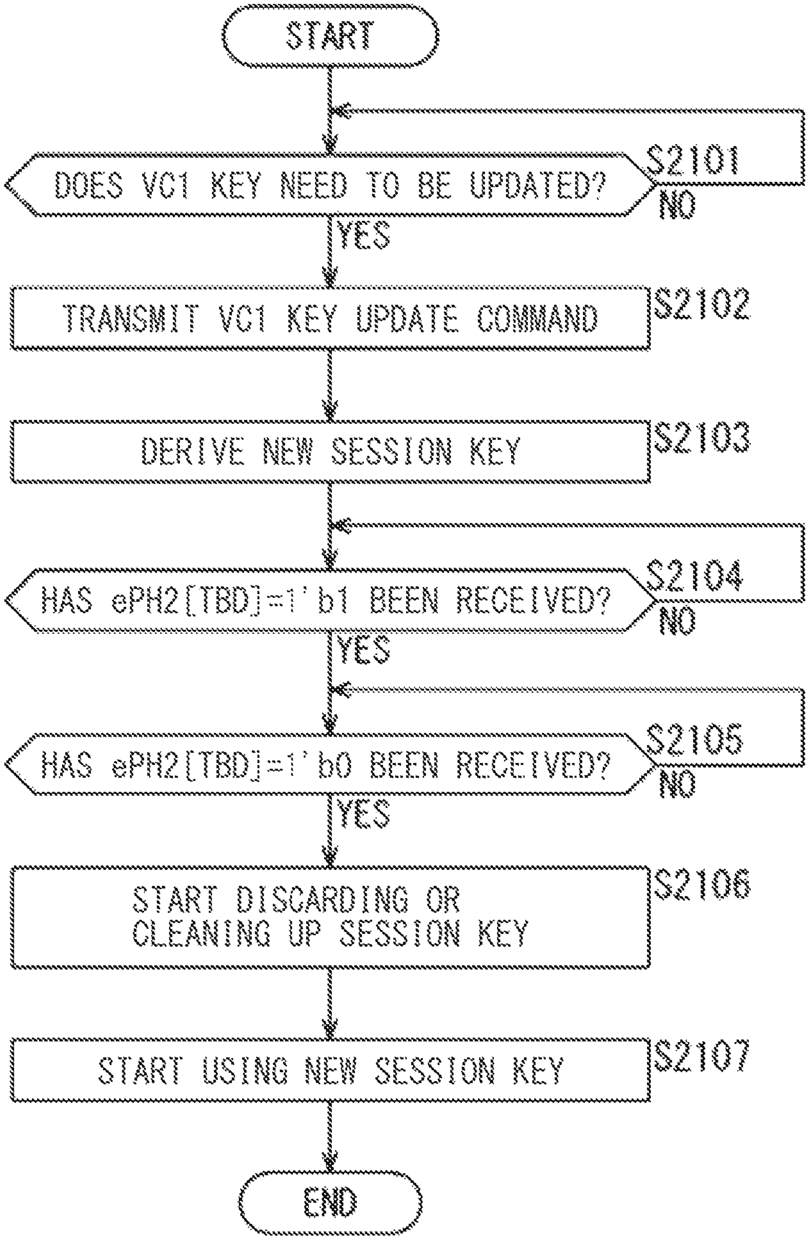

FIG. 187 is a flowchart describing an example of a flow of processor processing.

Figure 188:
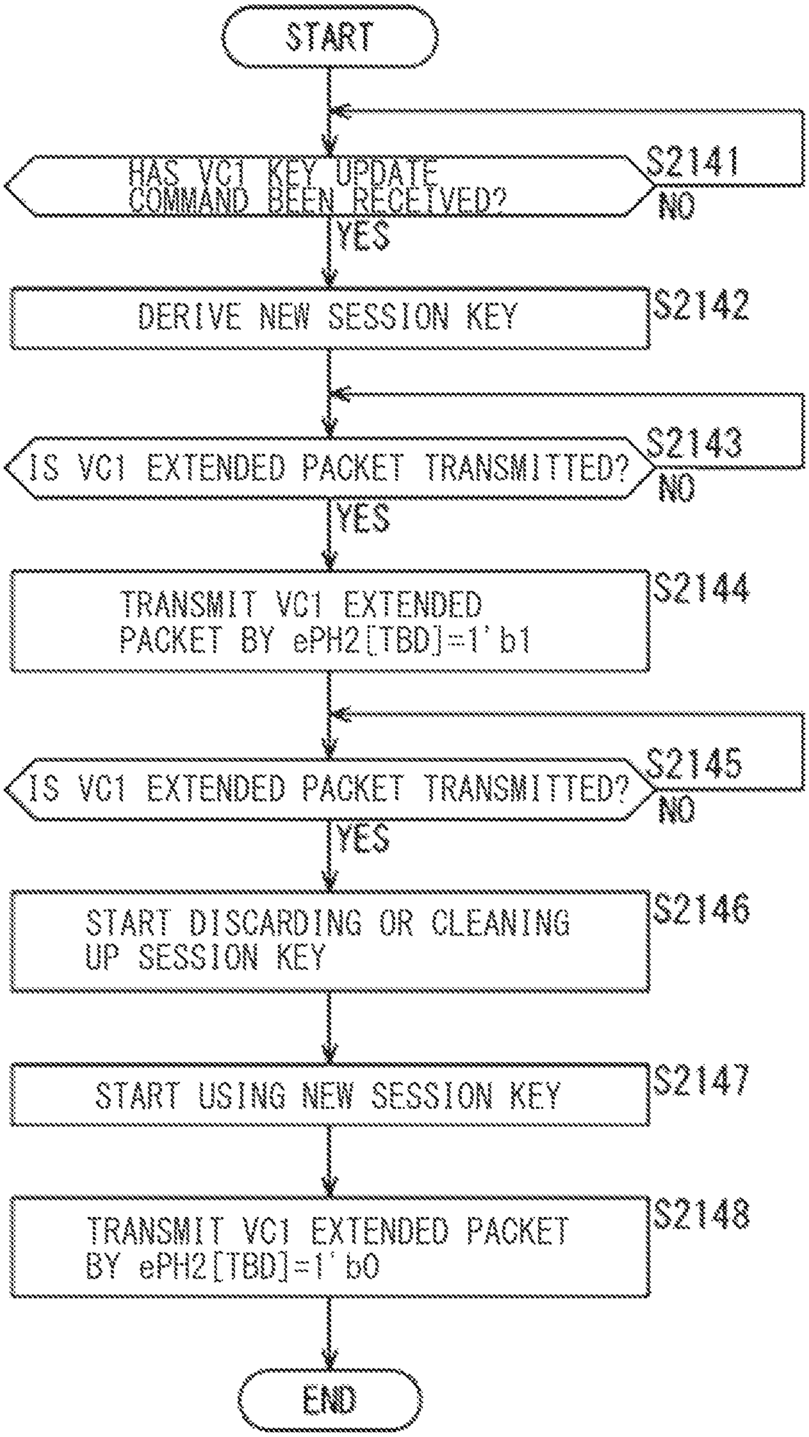

FIG. 188 is a flowchart describing an example of a flow of sensor processing.

Figure 189:
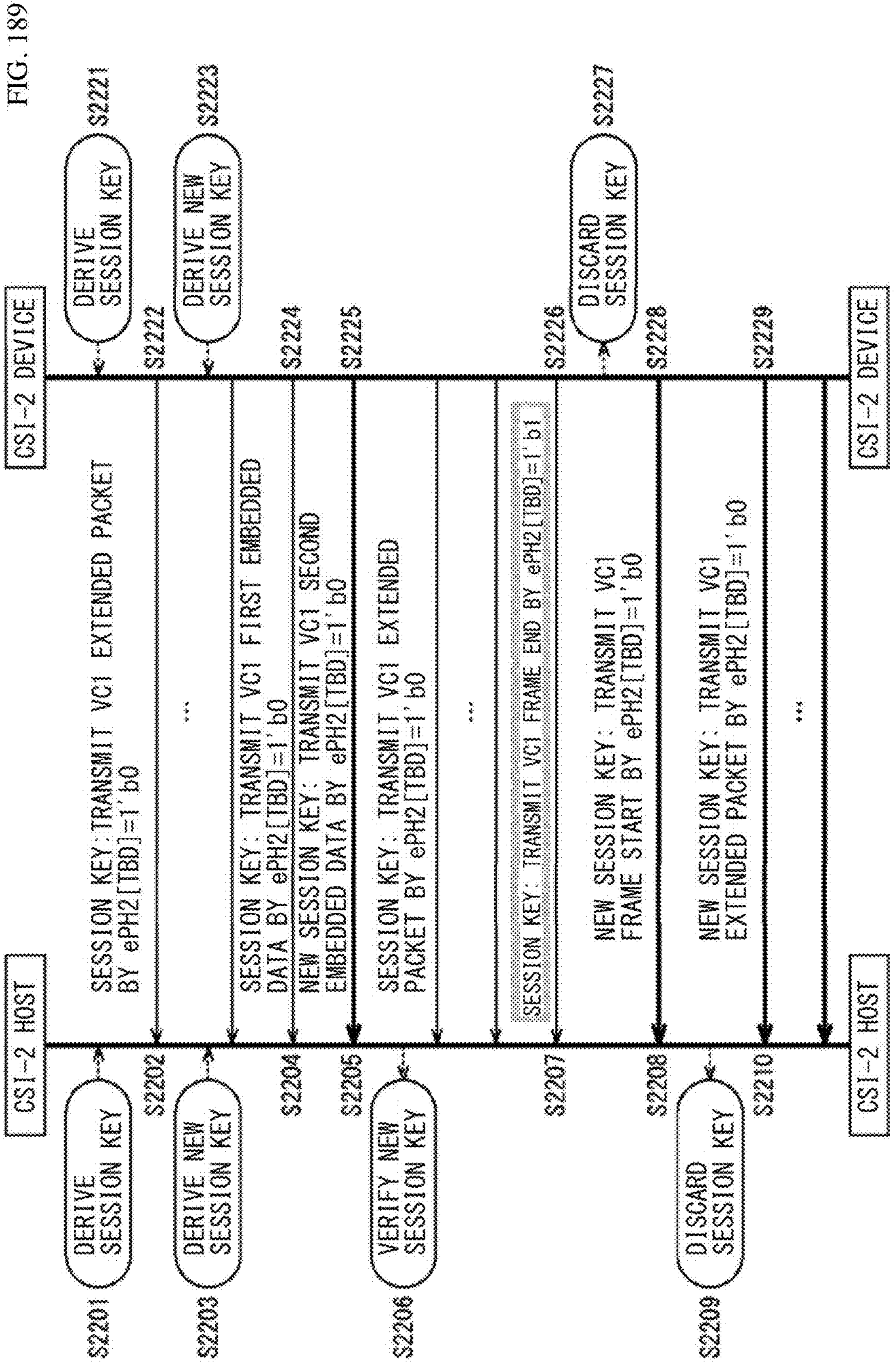

FIG. 189 is a flowchart describing an example of a flow of session key update.

Figure 190:
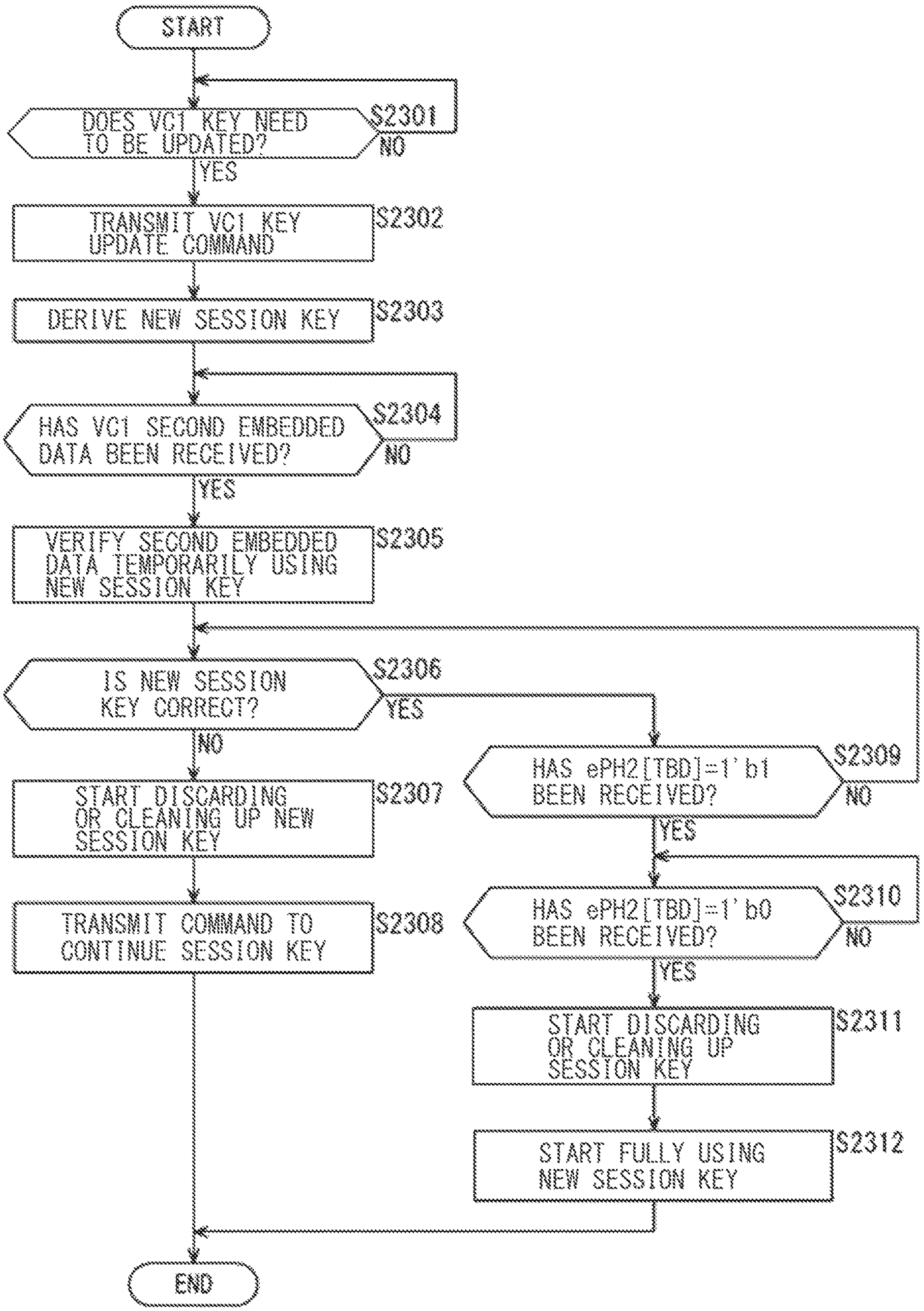

FIG. 190 is a flowchart describing an example of a flow of processor processing.

Figure 191:
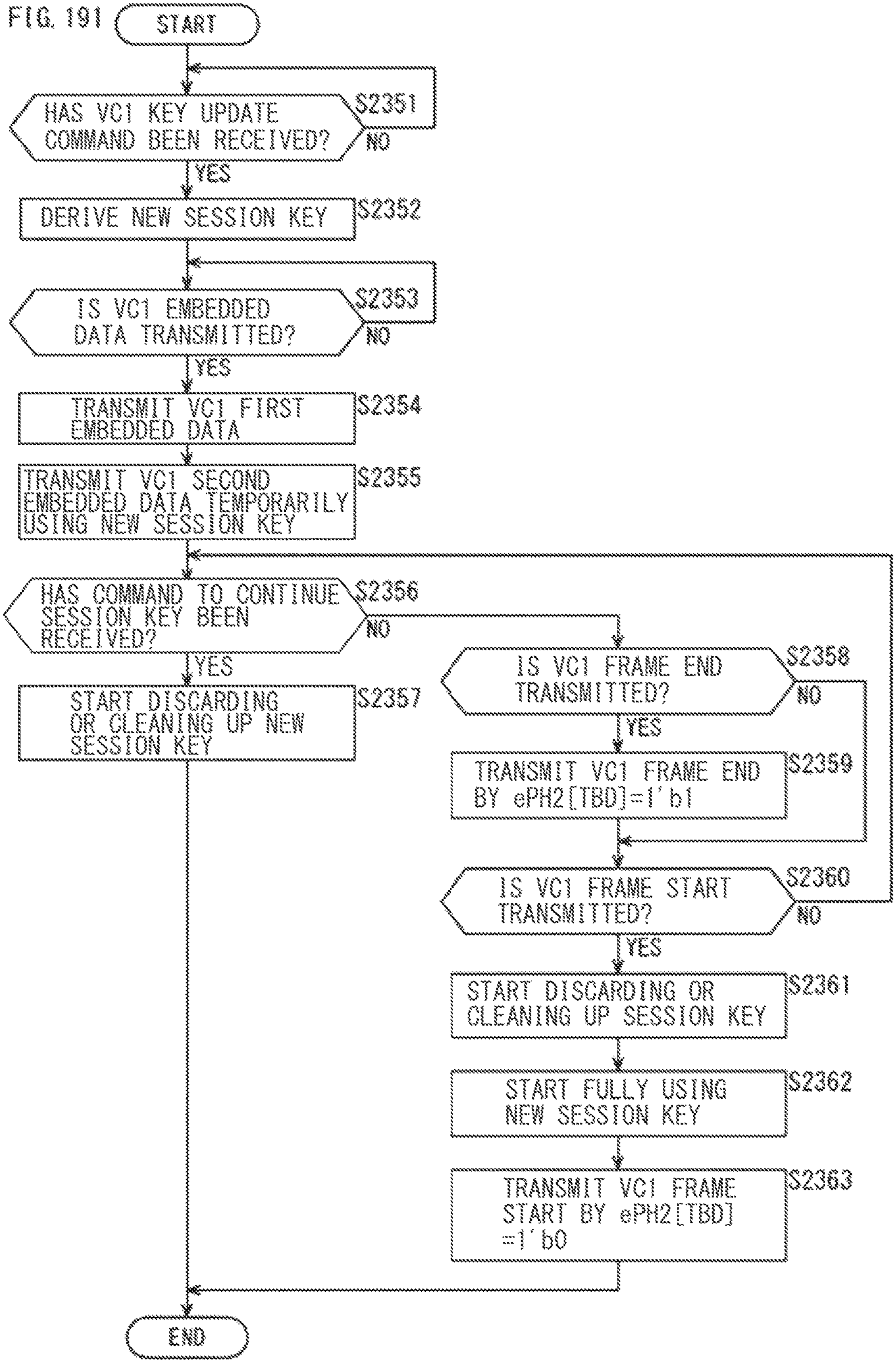

FIG. 191 is a flowchart describing an example of a flow of sensor processing.

Figure 192:
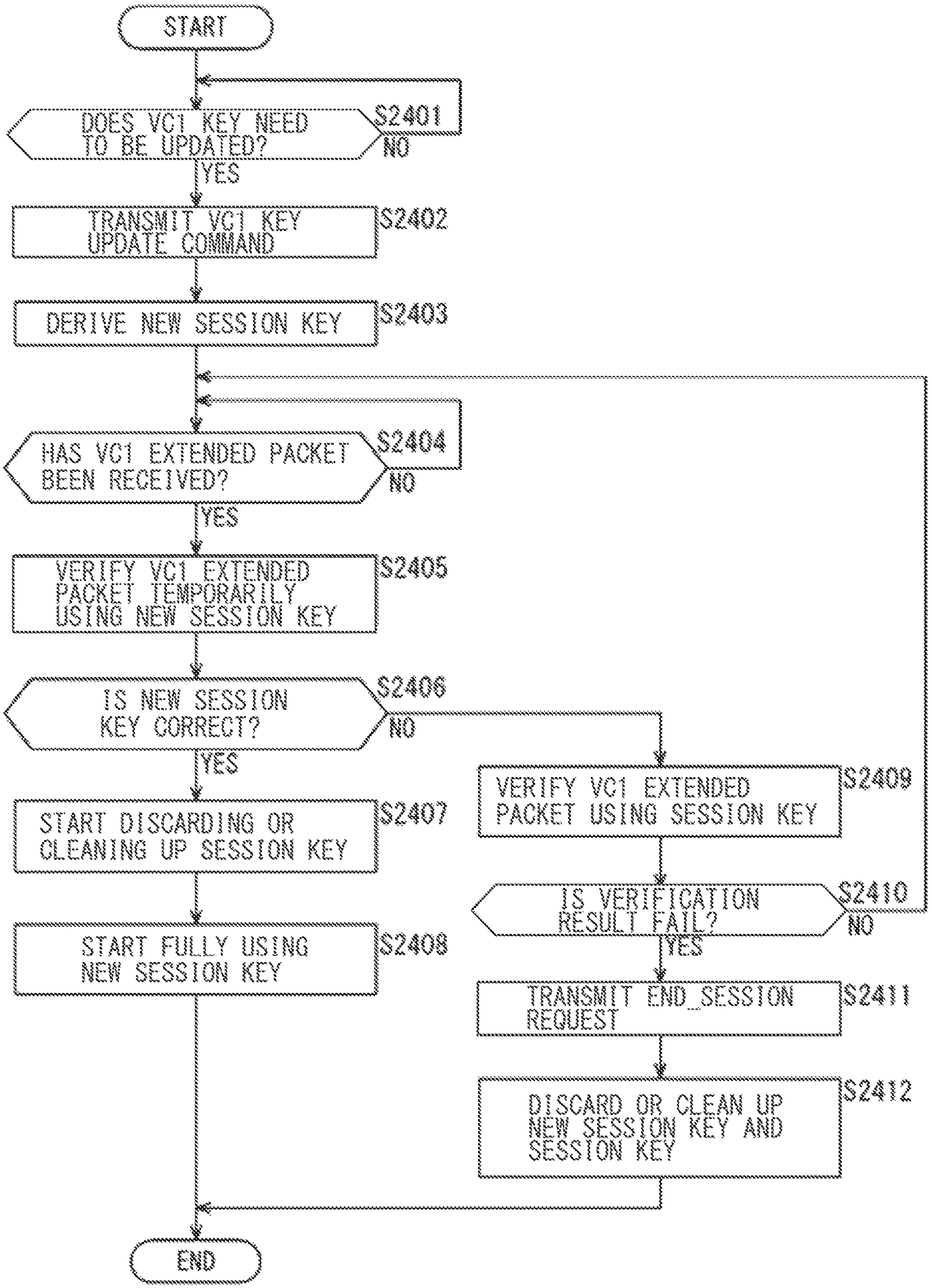

FIG. 192 is a flowchart describing an example of a flow of processor processing.

Figure 193:
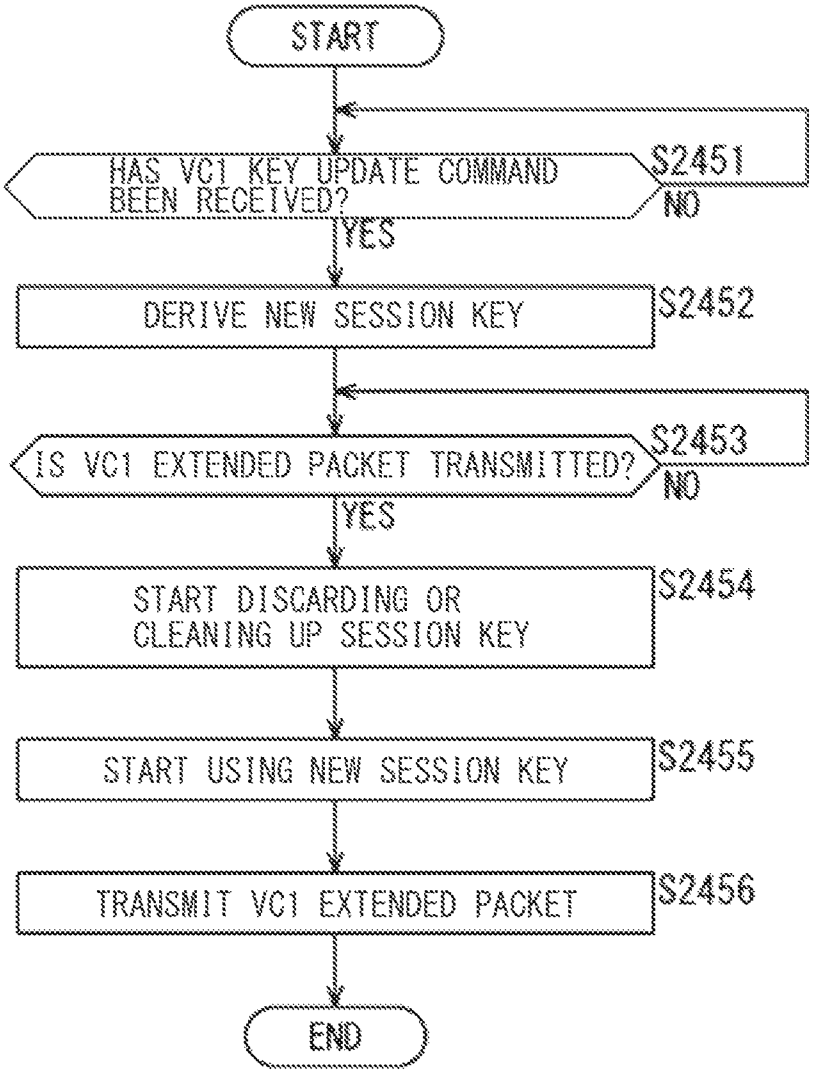

FIG. 193 is a flowchart describing an example of a flow of sensor processing.

Figure 194:
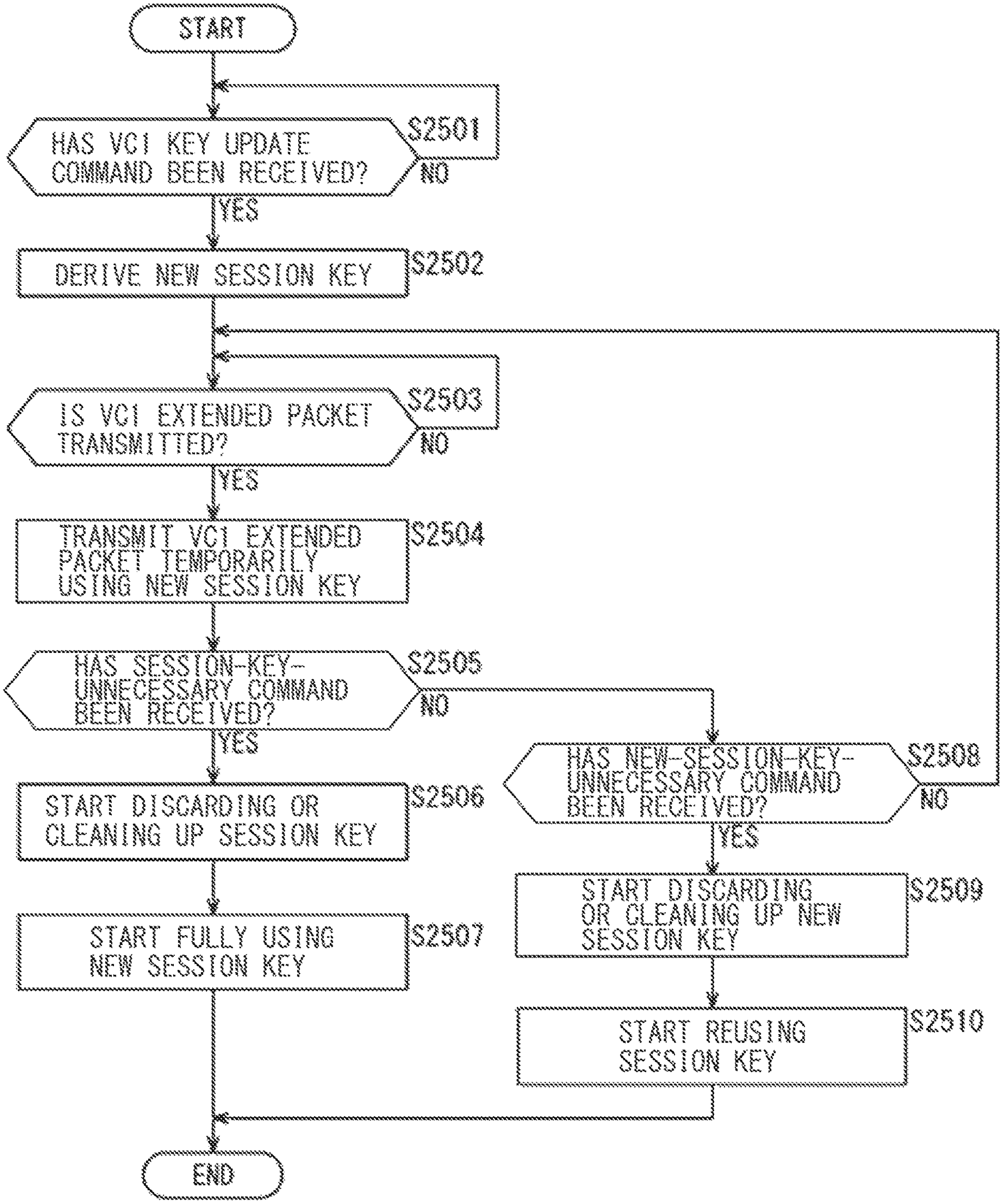

FIG. 194 is a flowchart describing an example of a flow of sensor processing.

FIG. 195 is a diagram illustrating examples of KeyUpdataReq and KeySwitchTiming.

Figure 196:
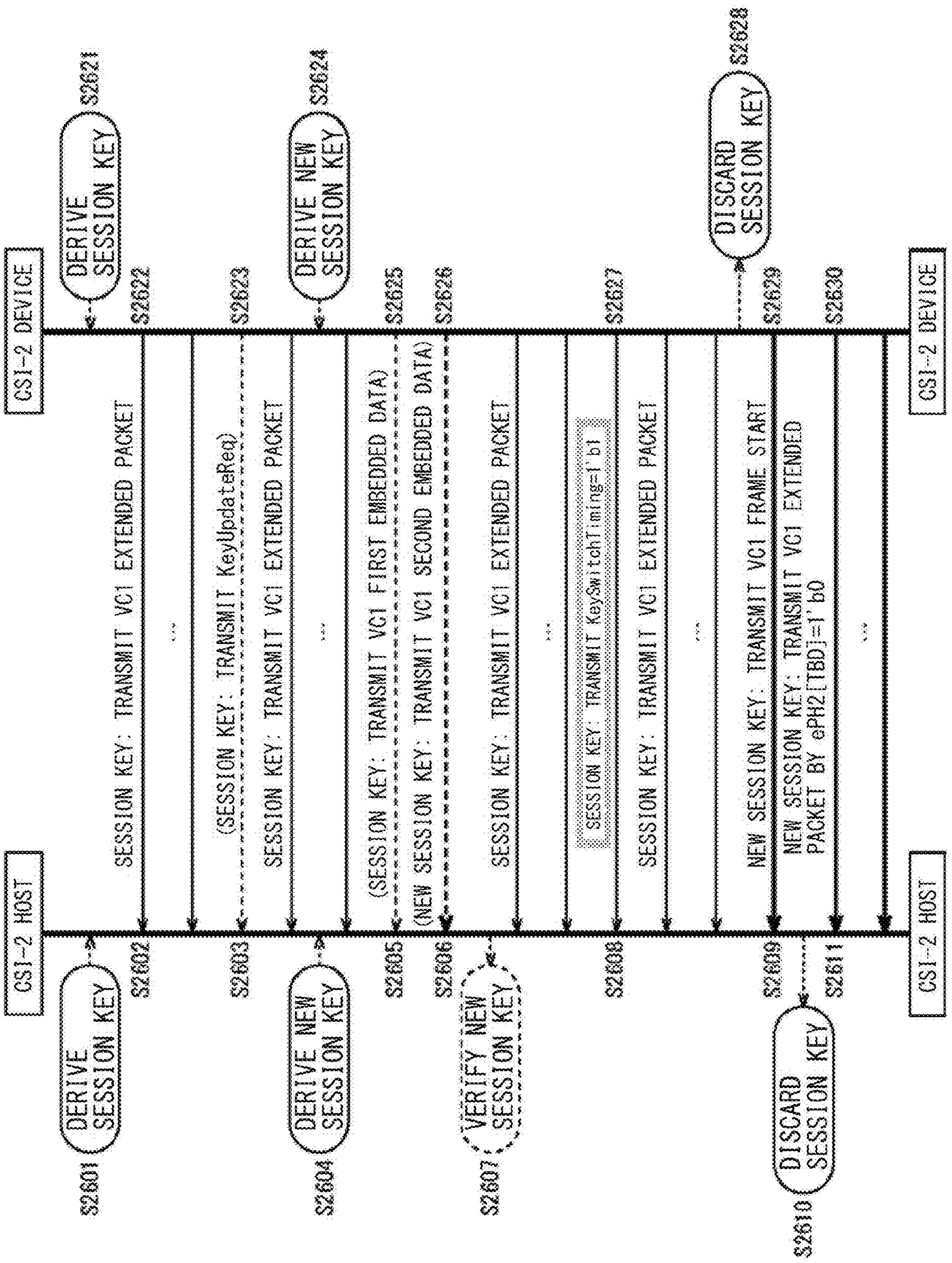

FIG. 196 is a flowchart describing an example of a flow of session key update.

Figure 197:
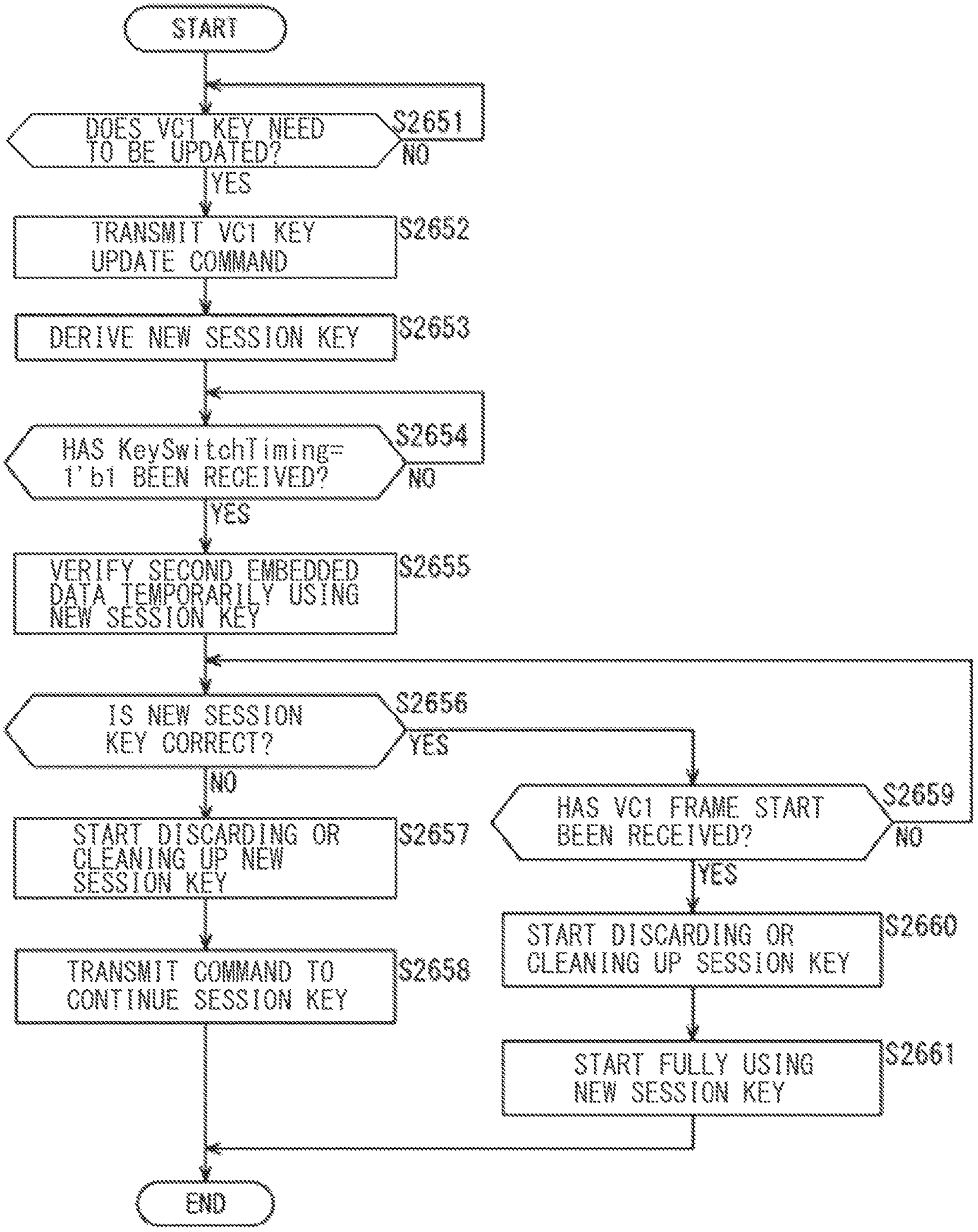

FIG. 197 is a flowchart describing an example of a flow of processor processing.

Figure 198:
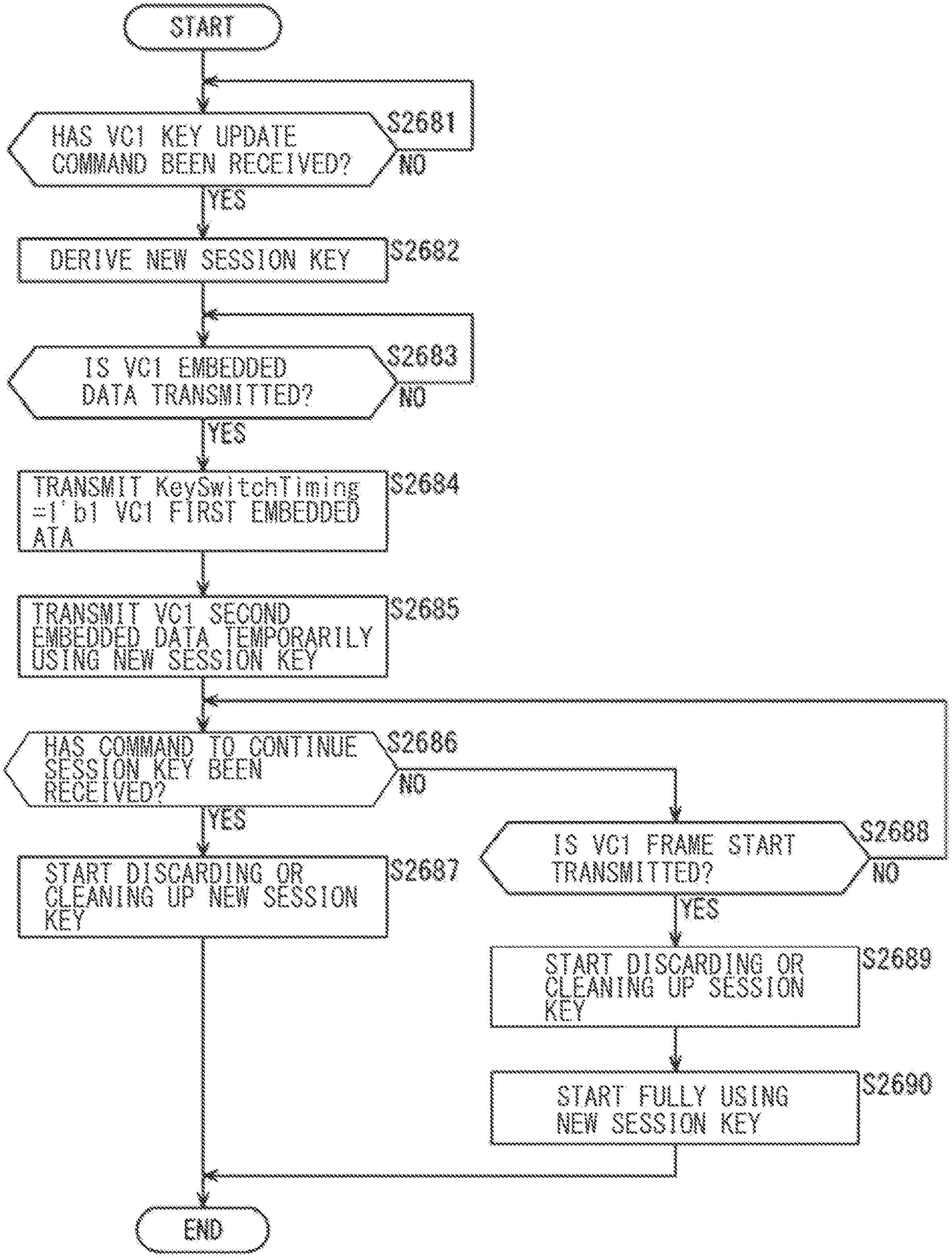

FIG. 198 is a flowchart describing an example of a flow of sensor processing.

Figure 199:
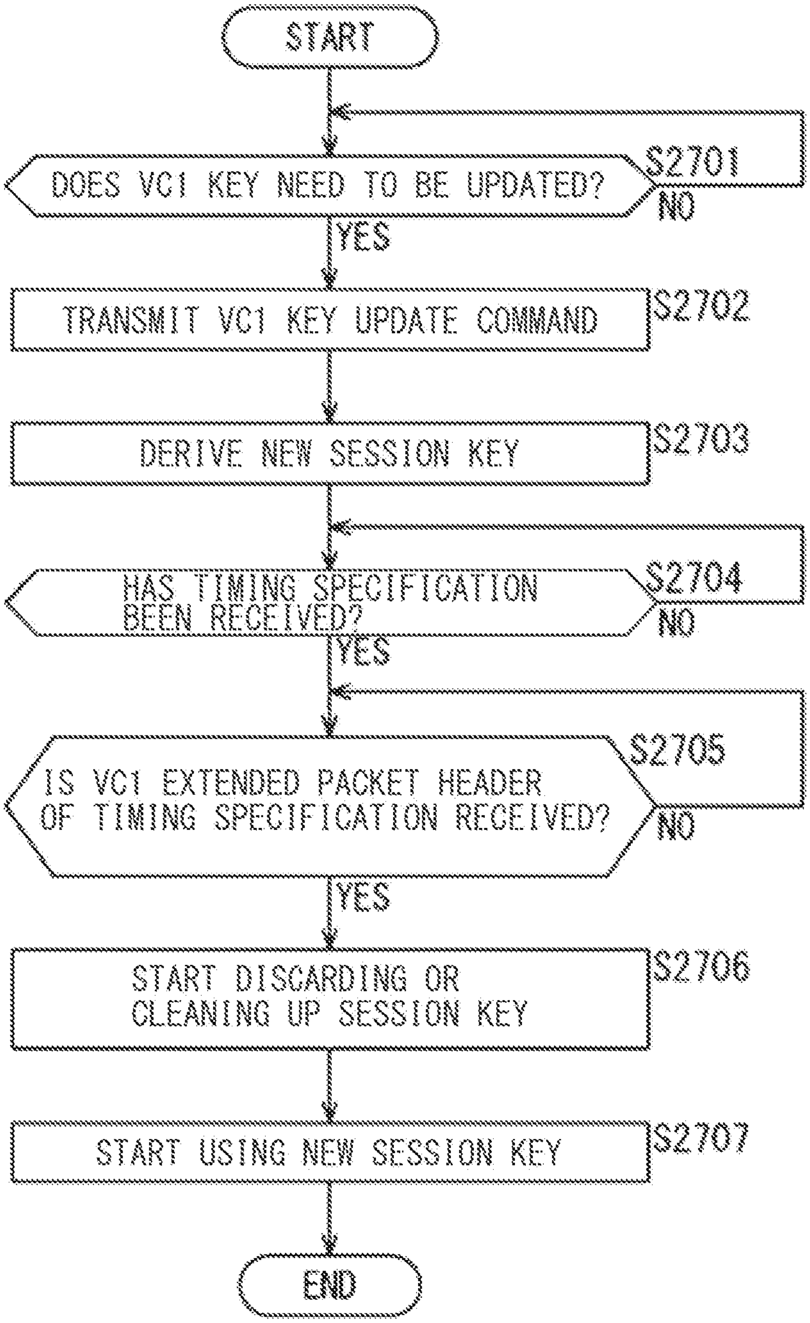

FIG. 199 is a flowchart describing an example of a flow of processor processing.

Figure 200:
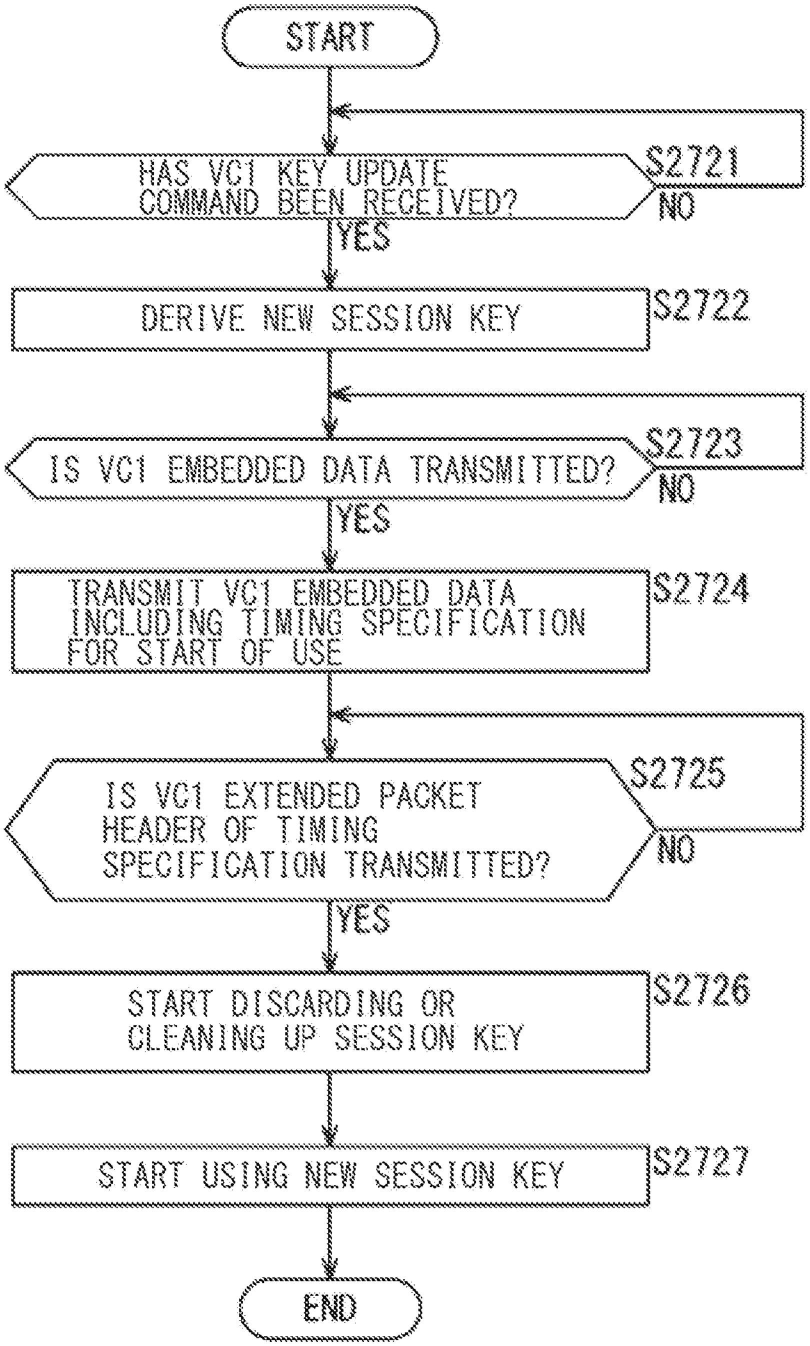

FIG. 200 is a flowchart describing an example of a flow of sensor processing.

Figure 201:
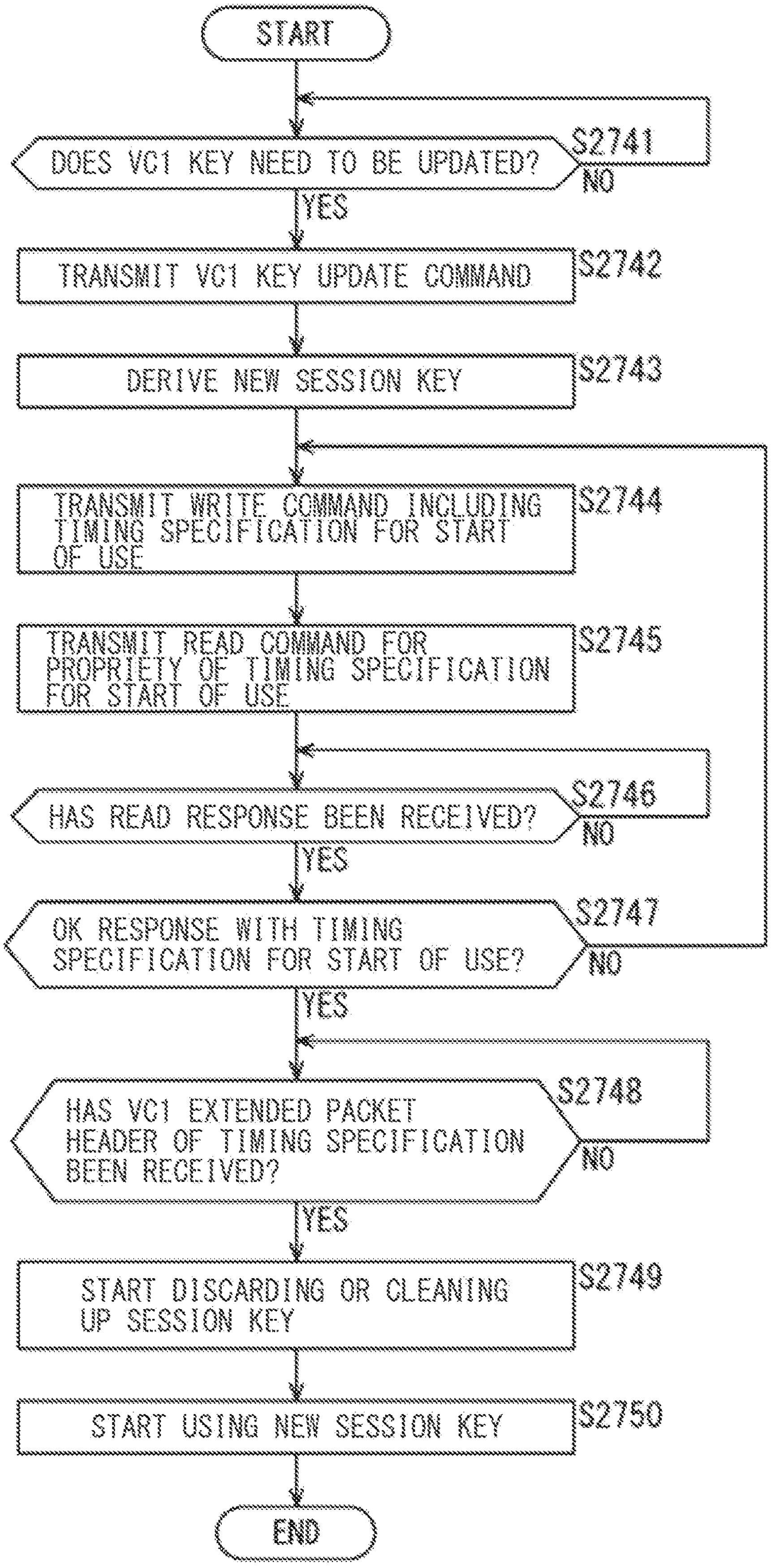

FIG. 201 is a flowchart describing an example of a flow of processor processing.

Figure 202:
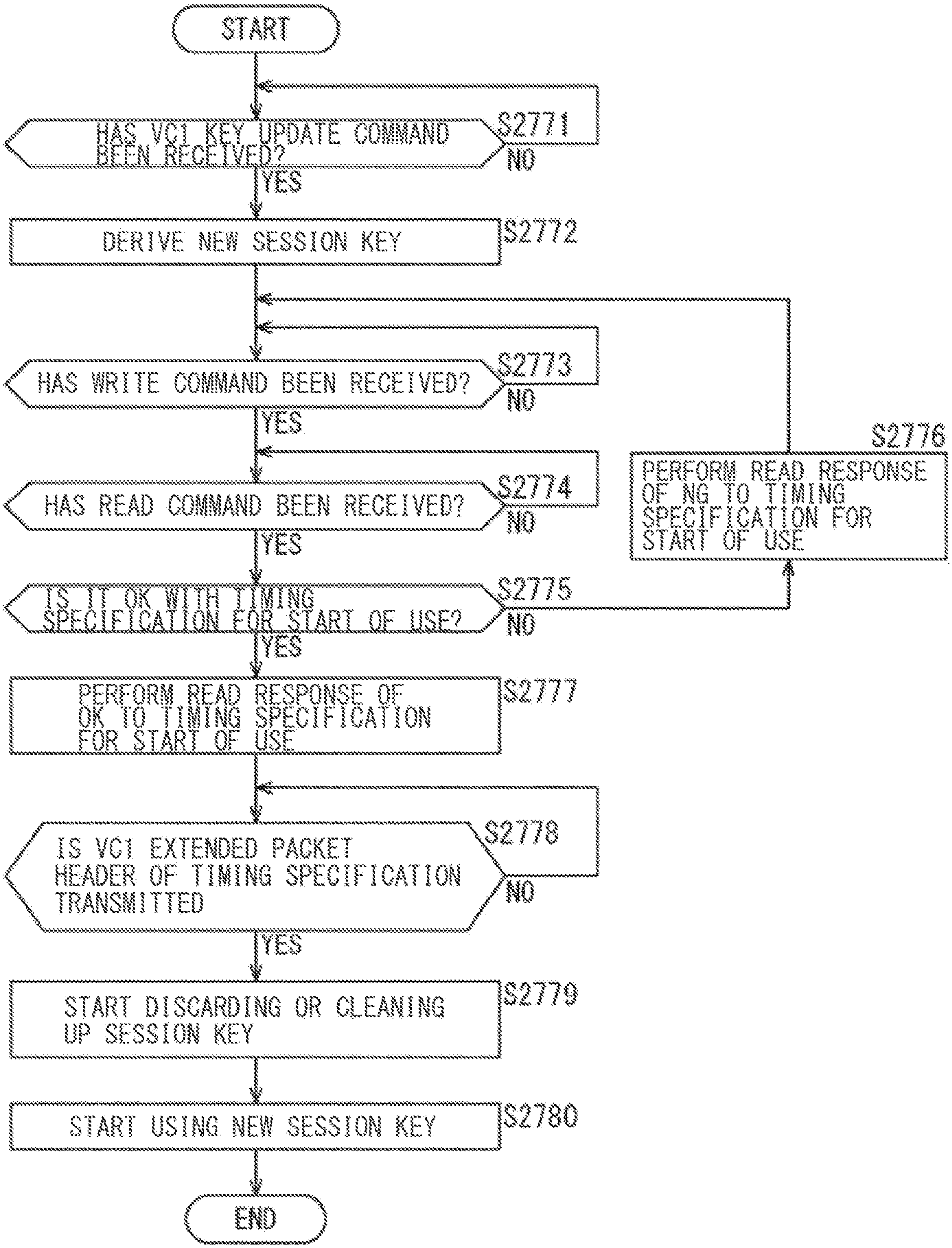
Figure 203:
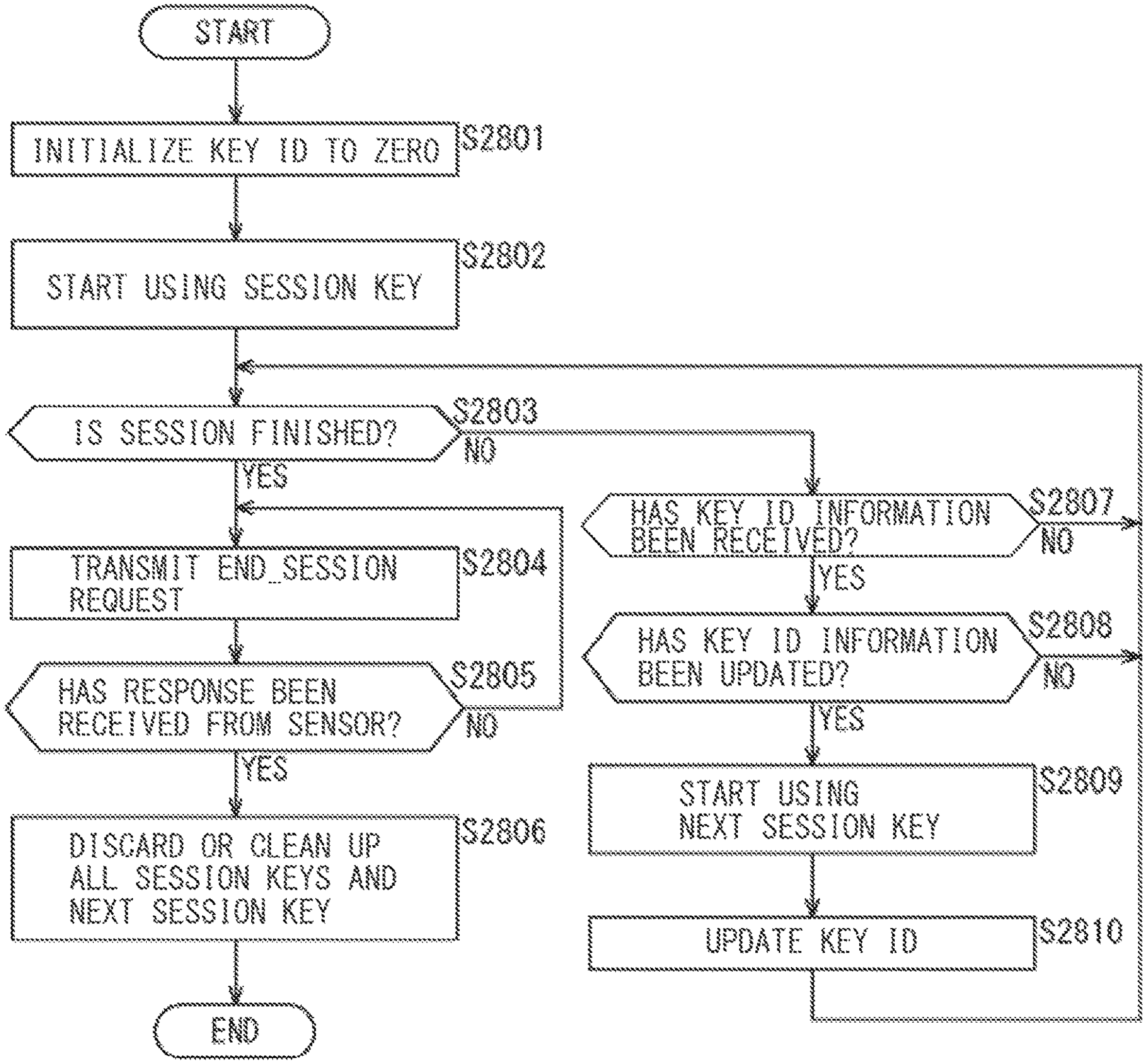

FIG. 202 is a flowchart describing an example of a flow of sensor processing FIG. 203 is a flowchart describing an example of a flow of processor processing.

Figure 204:
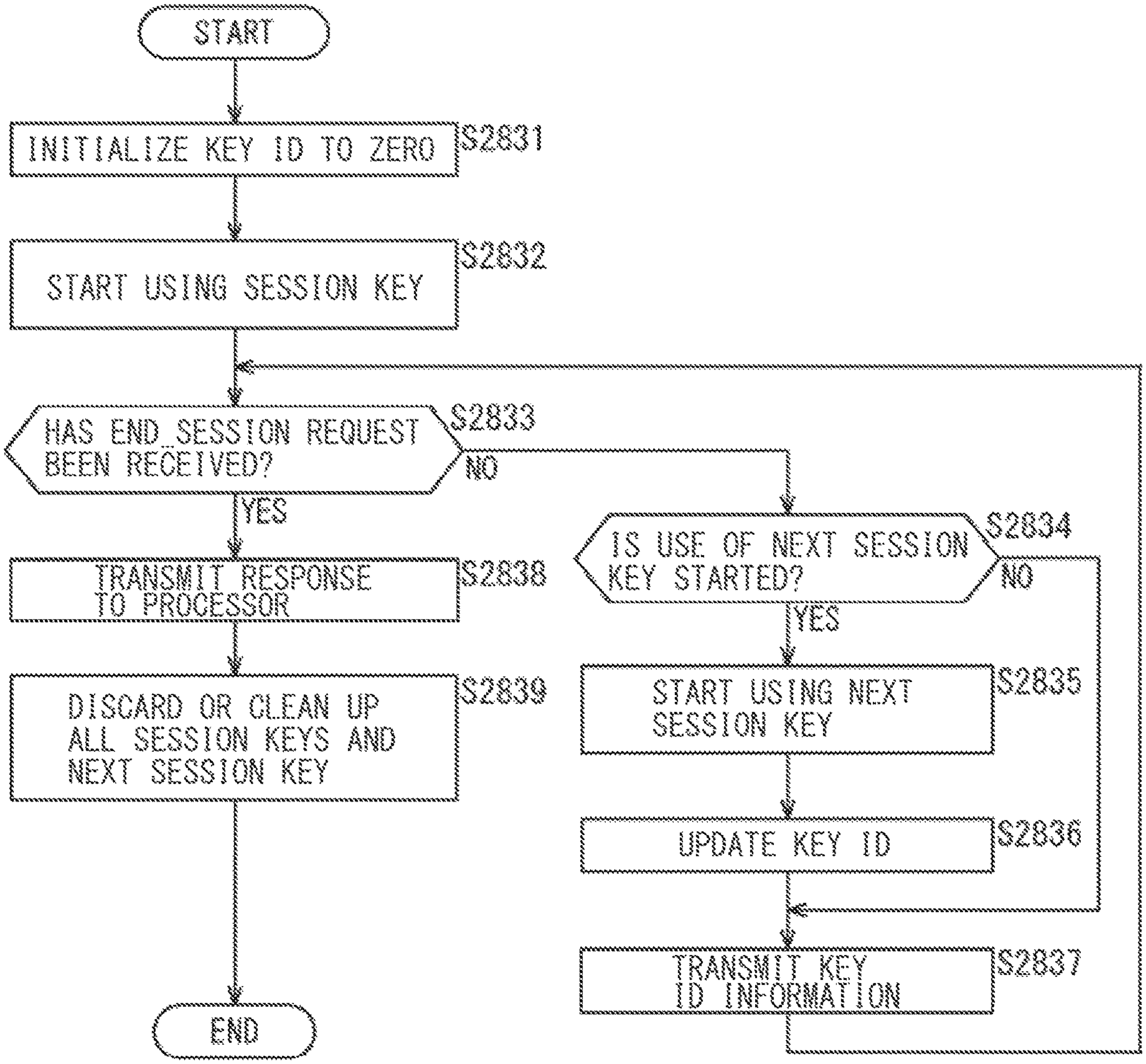

FIG. 204 is a flowchart describing an example of a flow of sensor processing FIG. 205 is a diagram illustrating an example of EvenOddkey.

Figure 206:
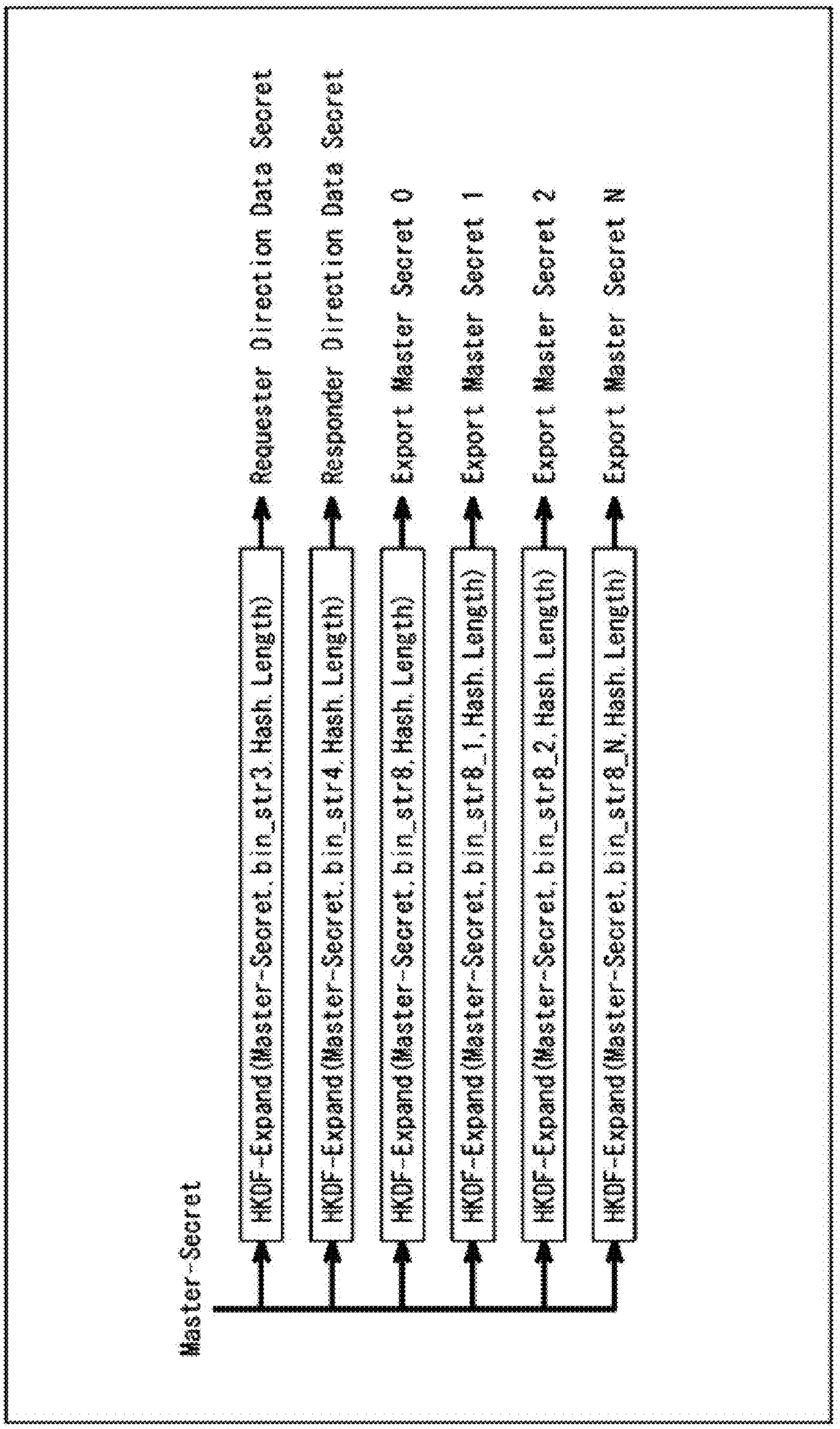

FIG. 206 is a diagram illustrating an example of session key derivation.

Figure 207:
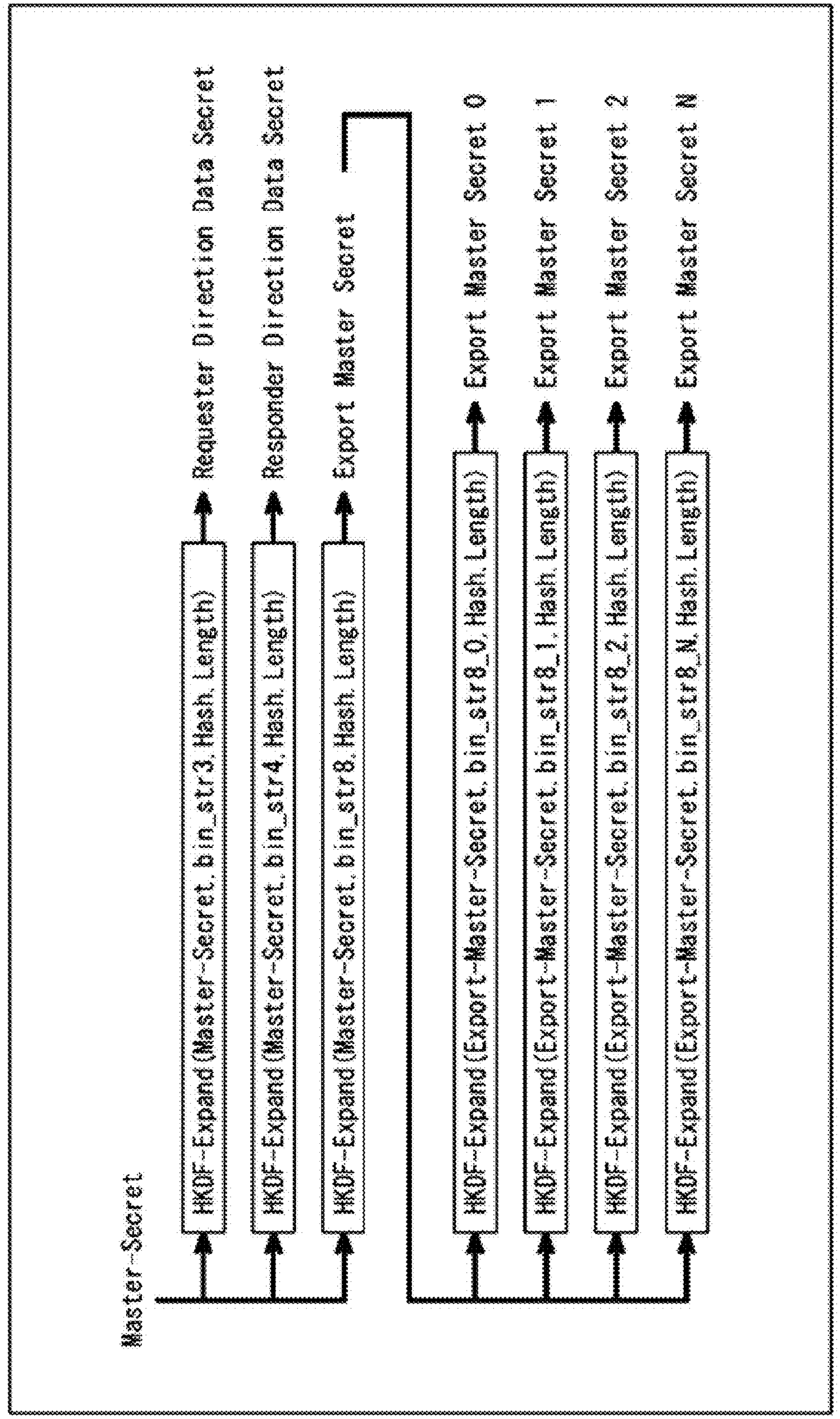

FIG. 207 is a diagram illustrating an example of session key derivation.

Figure 208:
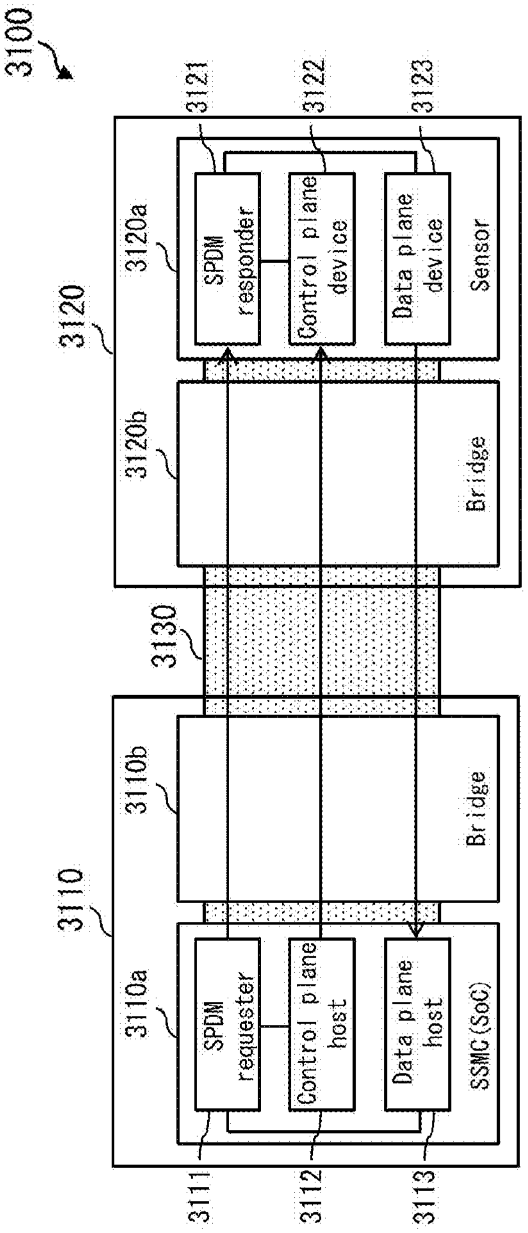

FIG. 208 is a block diagram illustrating a configuration example of a fifth embodiment of a communication system to which the present technology is applied.

Figure 209:
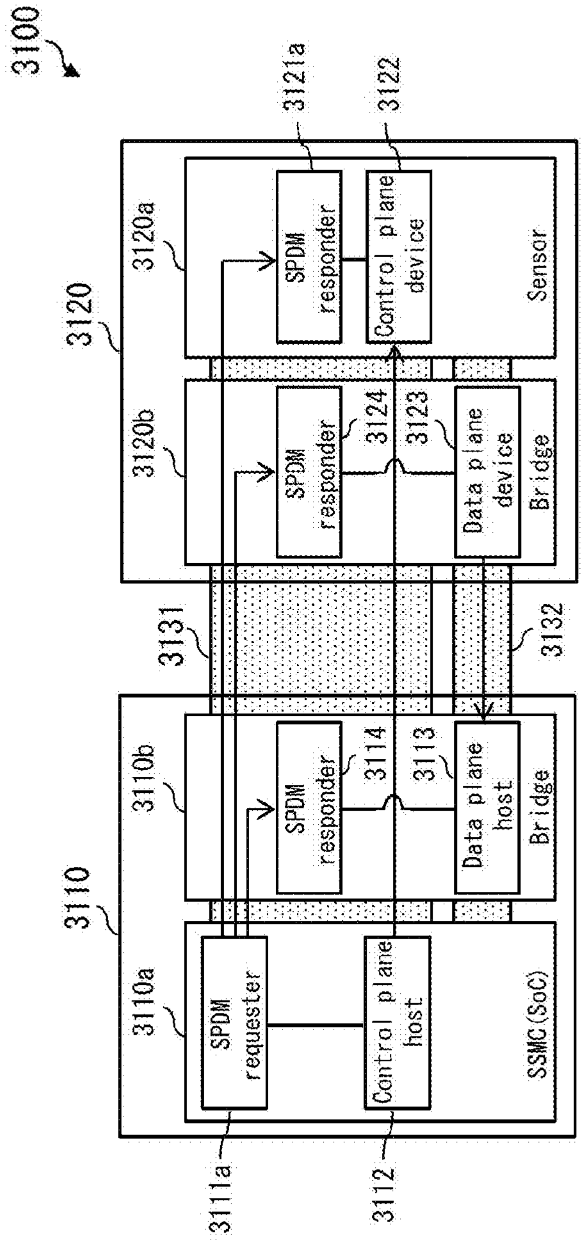

FIG. 209 is a block diagram illustrating a modification example of configurations of the image sensor and the processor.

Figure 210:
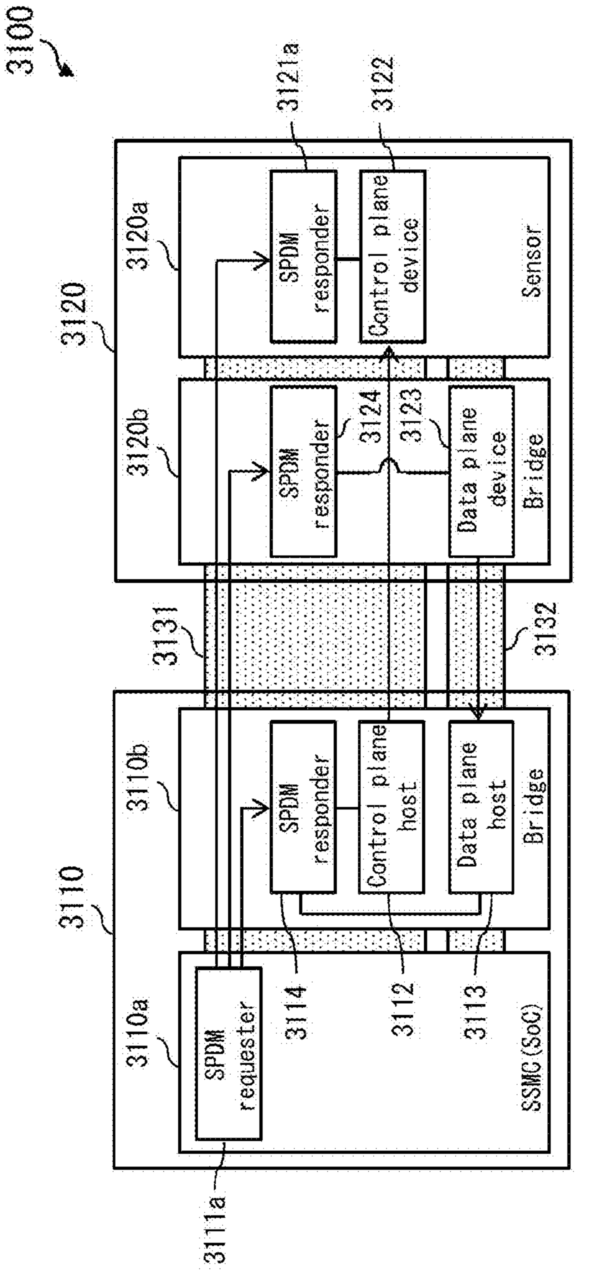

FIG. 210 is a block diagram illustrating a modification example of the configurations of the image sensor and the processor.

Figure 211:
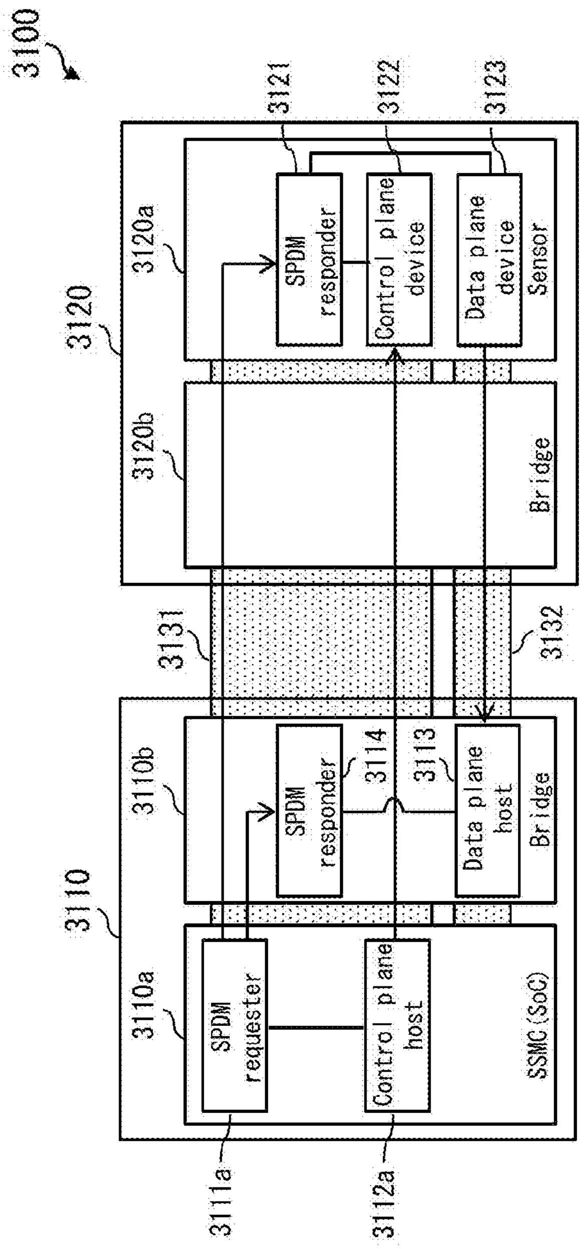

FIG. 211 is a block diagram illustrating a modification example of the configurations of the image sensor and the processor.

Figure 212:
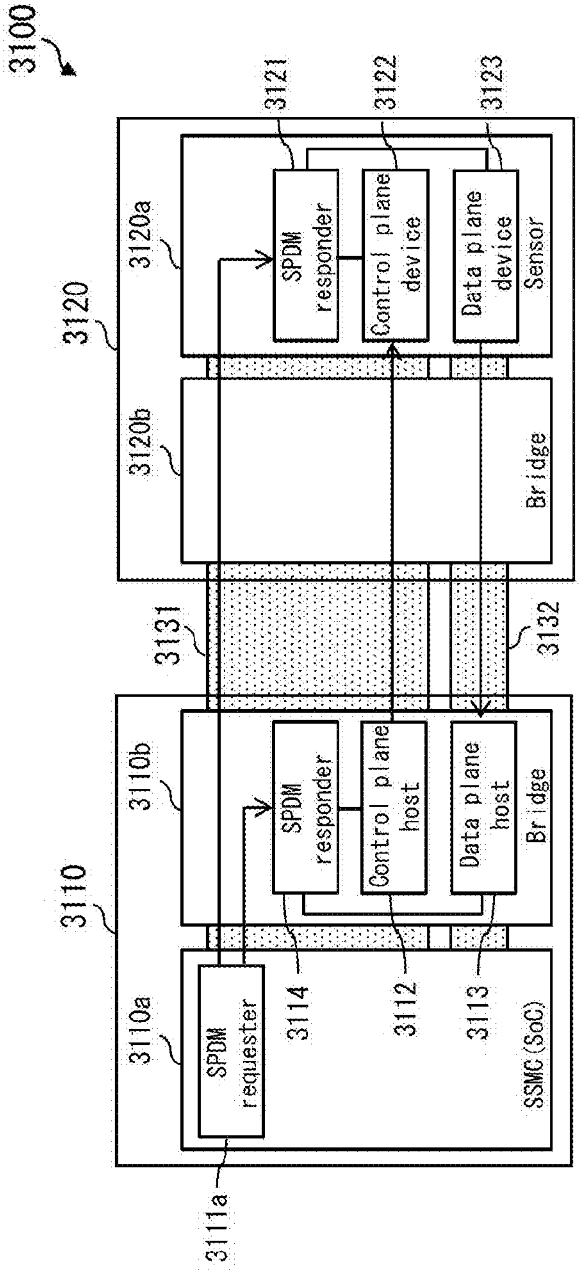

FIG. 212 is a block diagram illustrating a modification example of the configurations of the image sensor and the processor.

Figure 213:
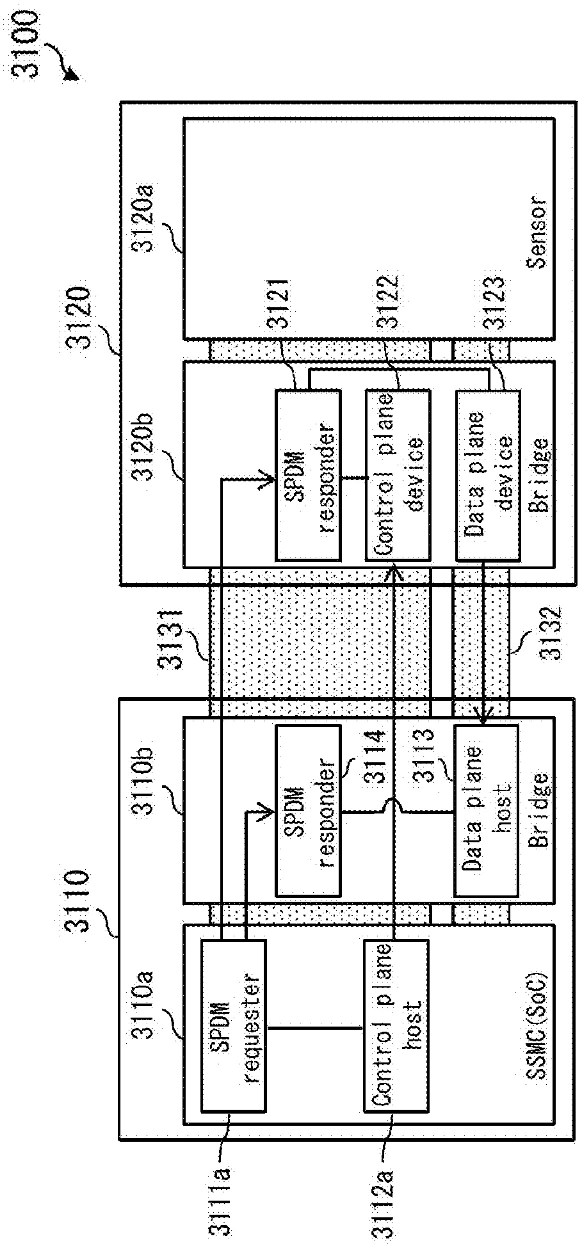

FIG. 213 is a block diagram illustrating a modification example of the configurations of the image sensor and the processor.

Figure 214:
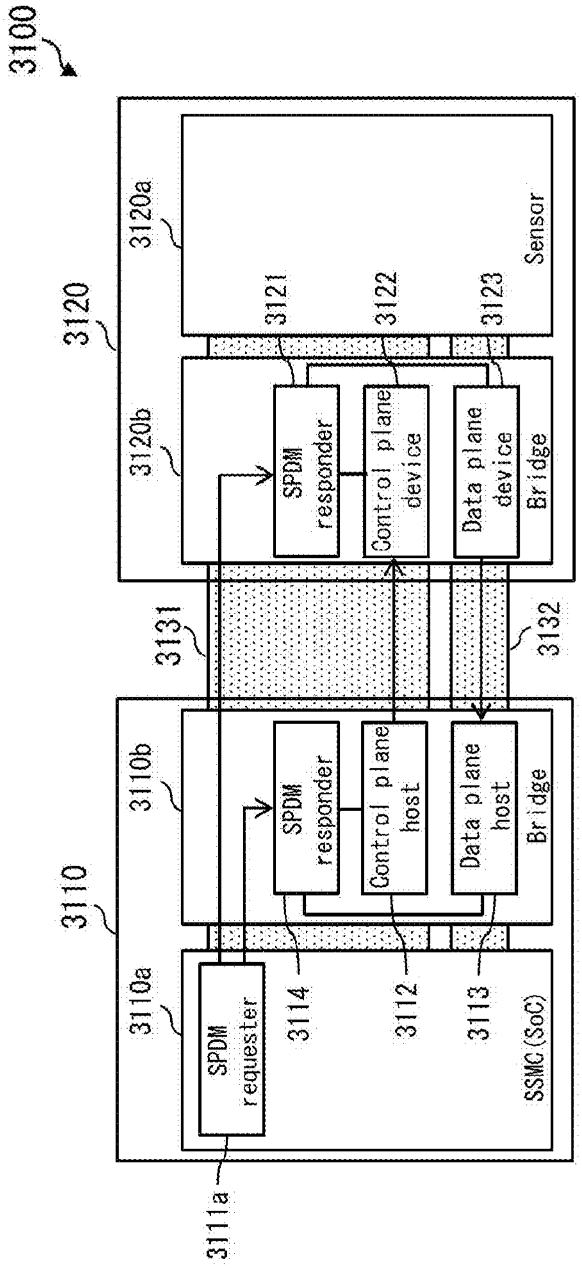

FIG. 214 is a block diagram illustrating a modification example of the configurations of the image sensor and the processor.

Figure 215:
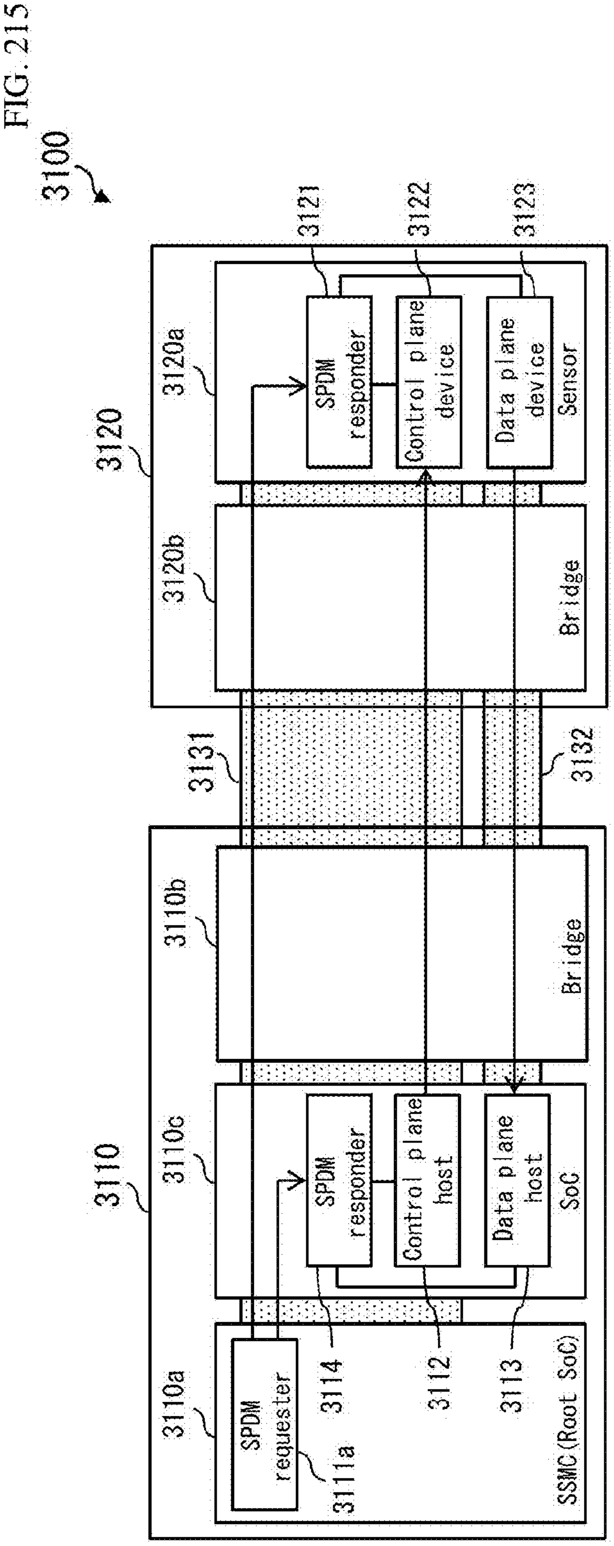

FIG. 215 is a block diagram illustrating a modification example of the configurations of the image sensor and the processor.

Figure 216:
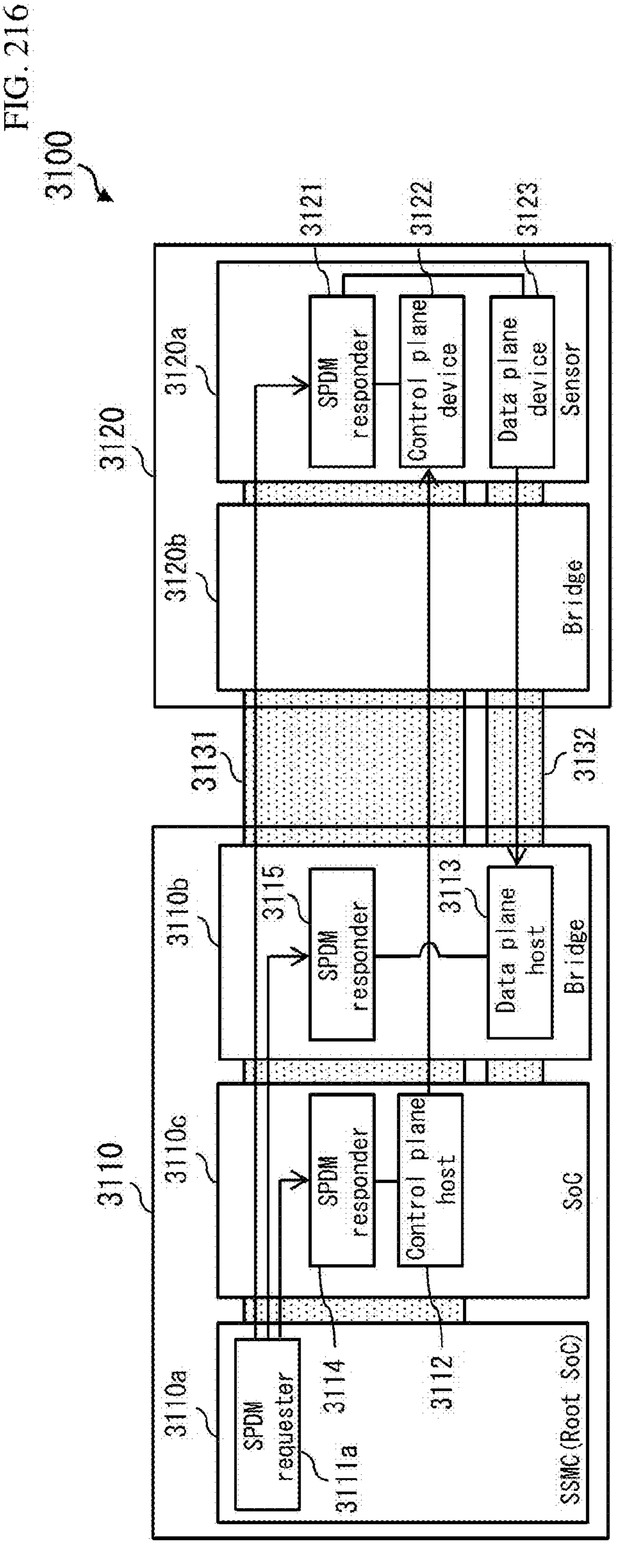

FIG. 216 is a block diagram illustrating a modification example of the configurations of the image sensor and the processor.

Figures 217, 218:
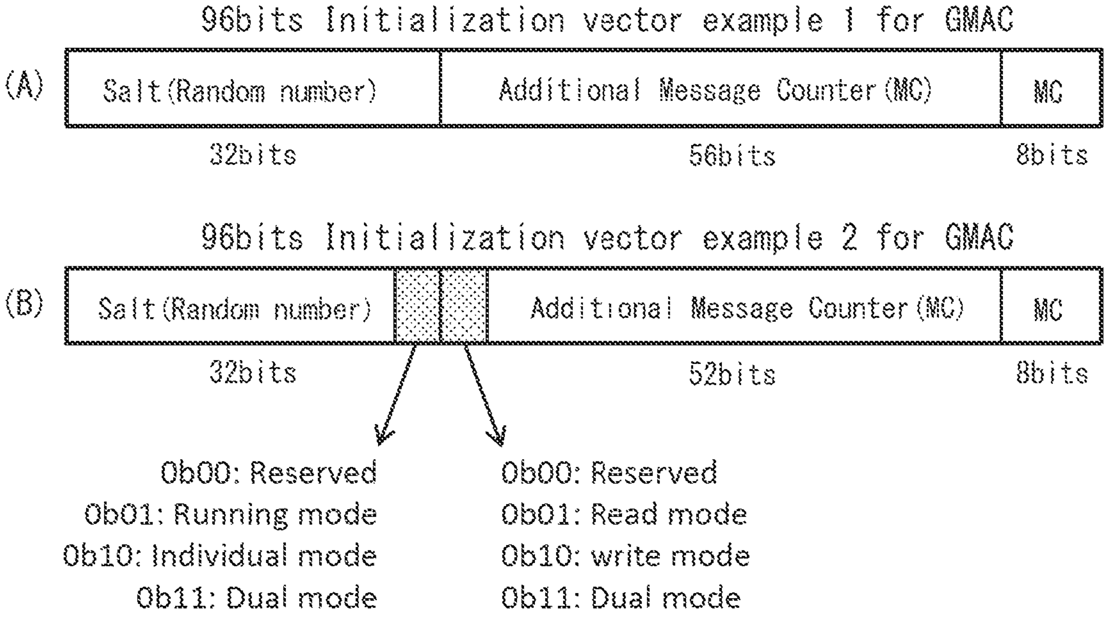

FIG. 217 is a diagram illustrating an example of a countermeasure for a replay attack on control-system communication (Control Plane).

FIG. 218 is a diagram illustrating an example of initialization vectors.

FIG. 219 is a diagram illustrating an example of Write messages.

Figures 220, 221:
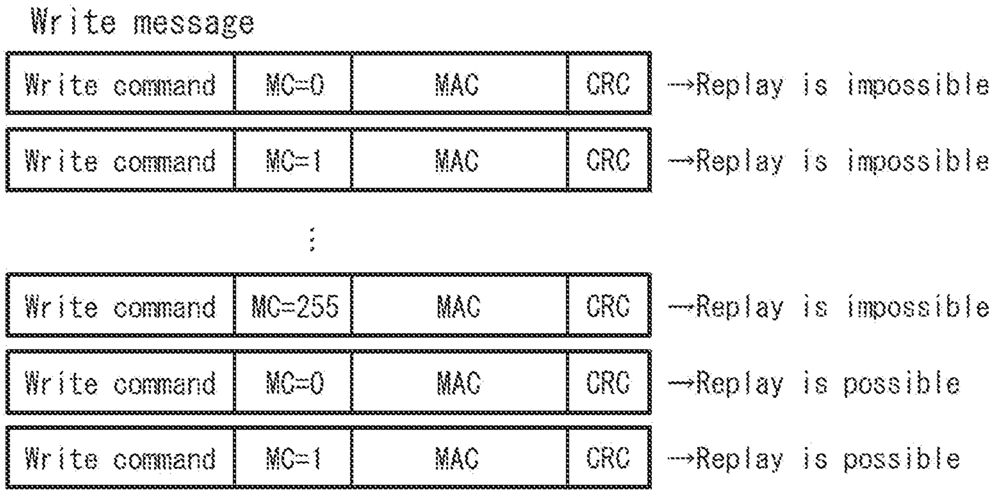

FIG. 220 is a diagram illustrating an example of Write messages.

FIG. 221 is a diagram illustrating an example of a countermeasure for a replay attack on control-system communication (Control Plane).

FIG. 222 is a diagram describing a setting example of the VENDOR_DEFINED_REQUEST request message.

Figure 223:
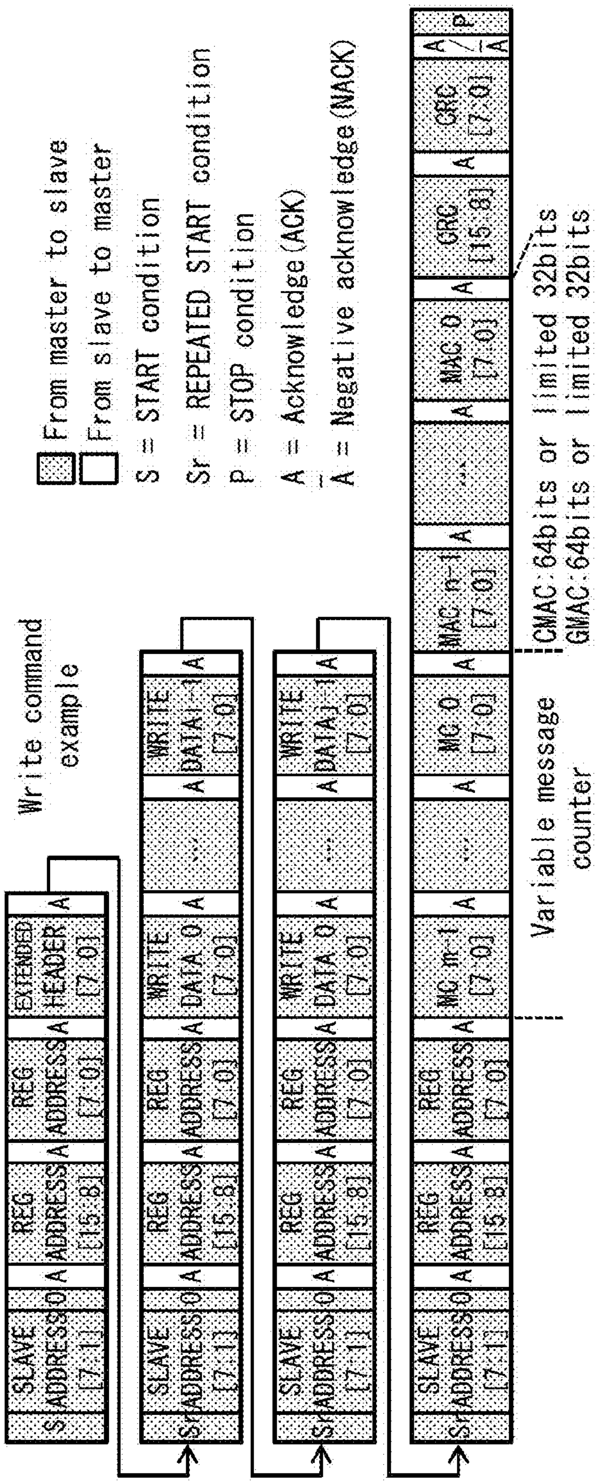

FIG. 223 is a diagram illustrating an example of a packet configuration of write data.

FIG. 224 is a diagram describing a setting example of the VENDOR_DEFINED_REQUEST request message.

Figure 225:
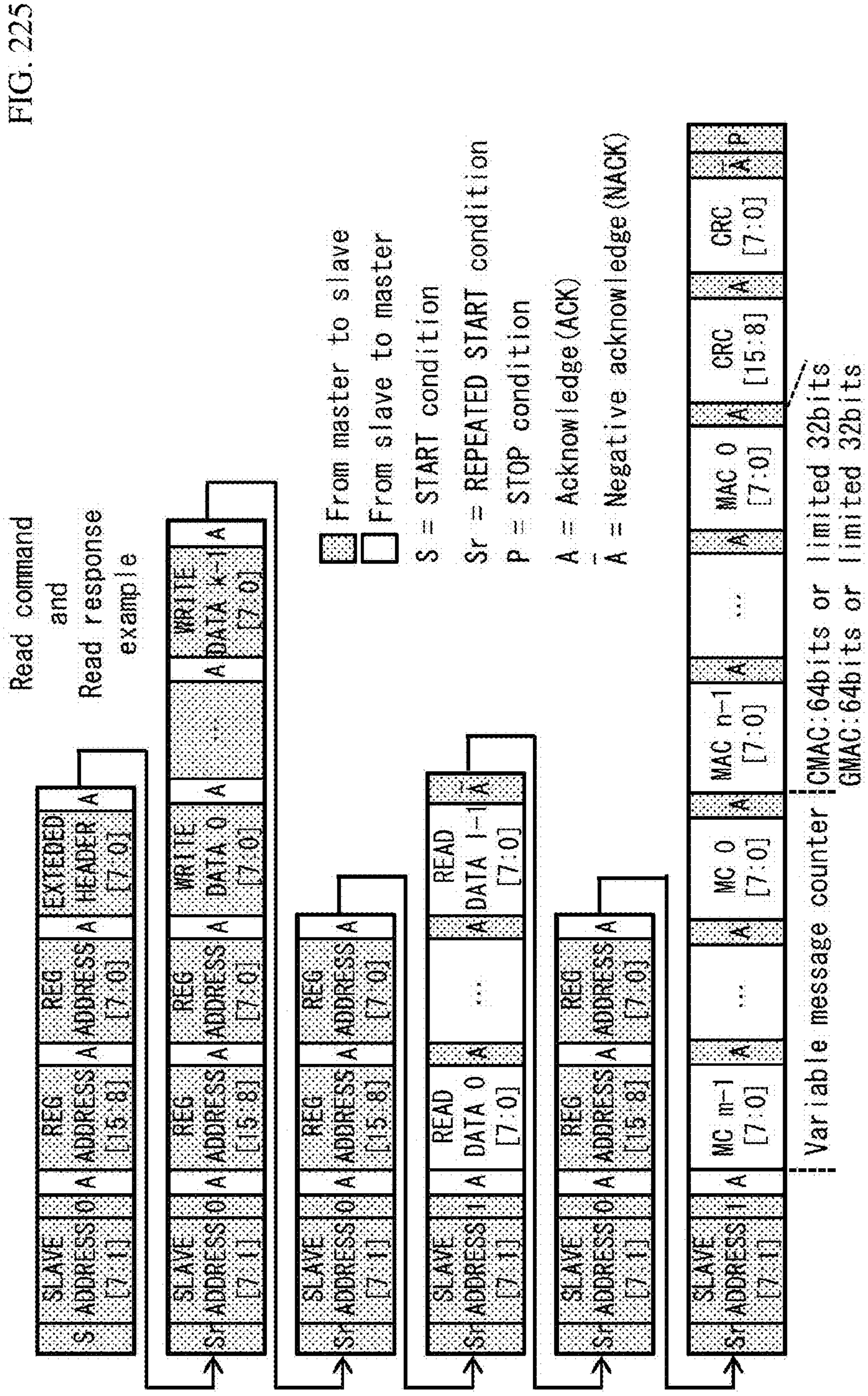

FIG. 225 is a diagram illustrating an example of a packet configuration of read data.

FIG. 226 is a diagram illustrating an example of a countermeasure for a replay attack on image-system communication (Data Plane).

Figure 227:
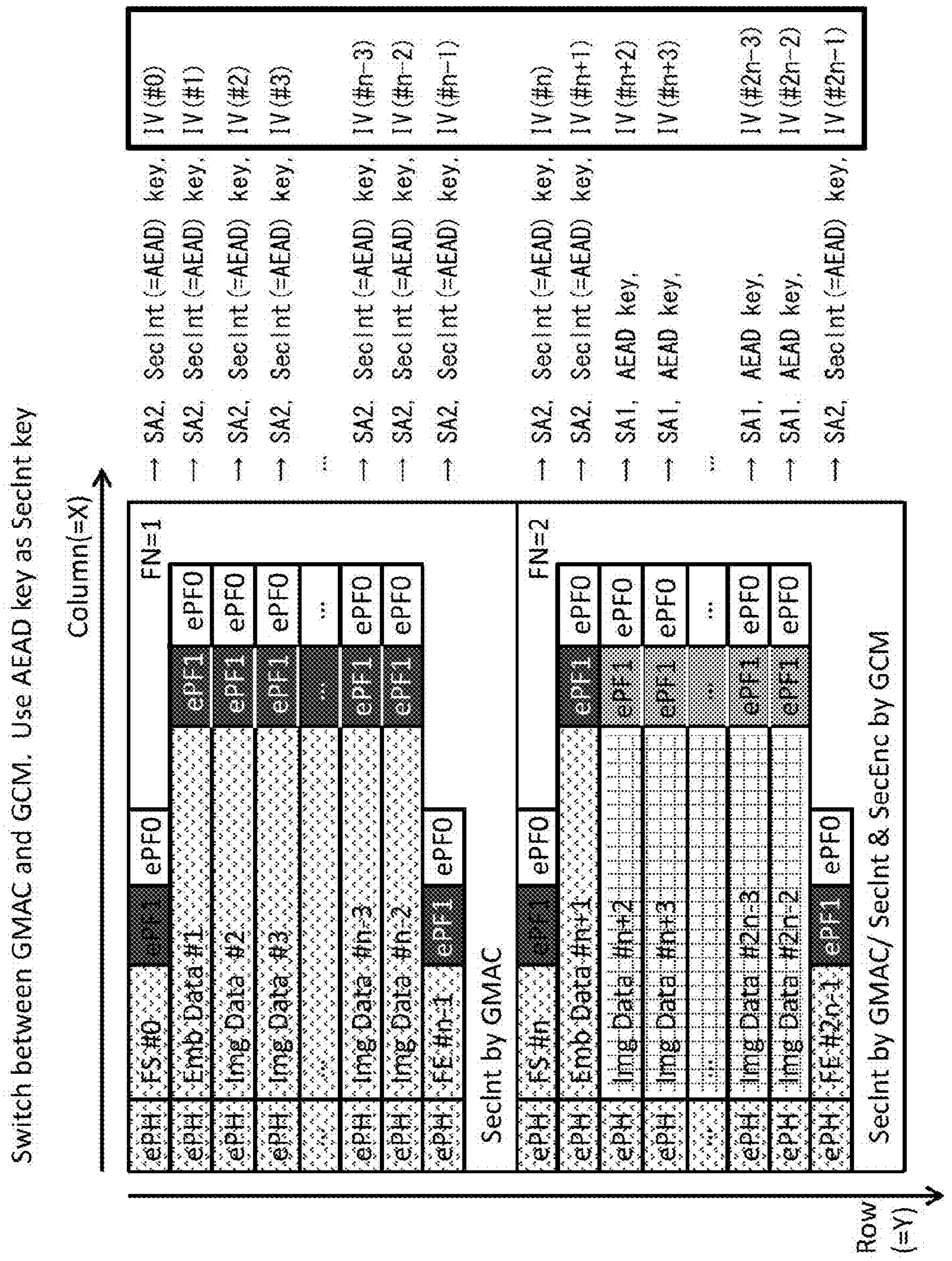

FIG. 227 is a diagram illustrating an example of a data structure of image data.

FIG. 228 is a diagram describing terms in FIG. 227.

FIG. 229 is a diagram illustrating an example of a countermeasure for a replay attack on image-system communication (Data Plane).

Figure 230:
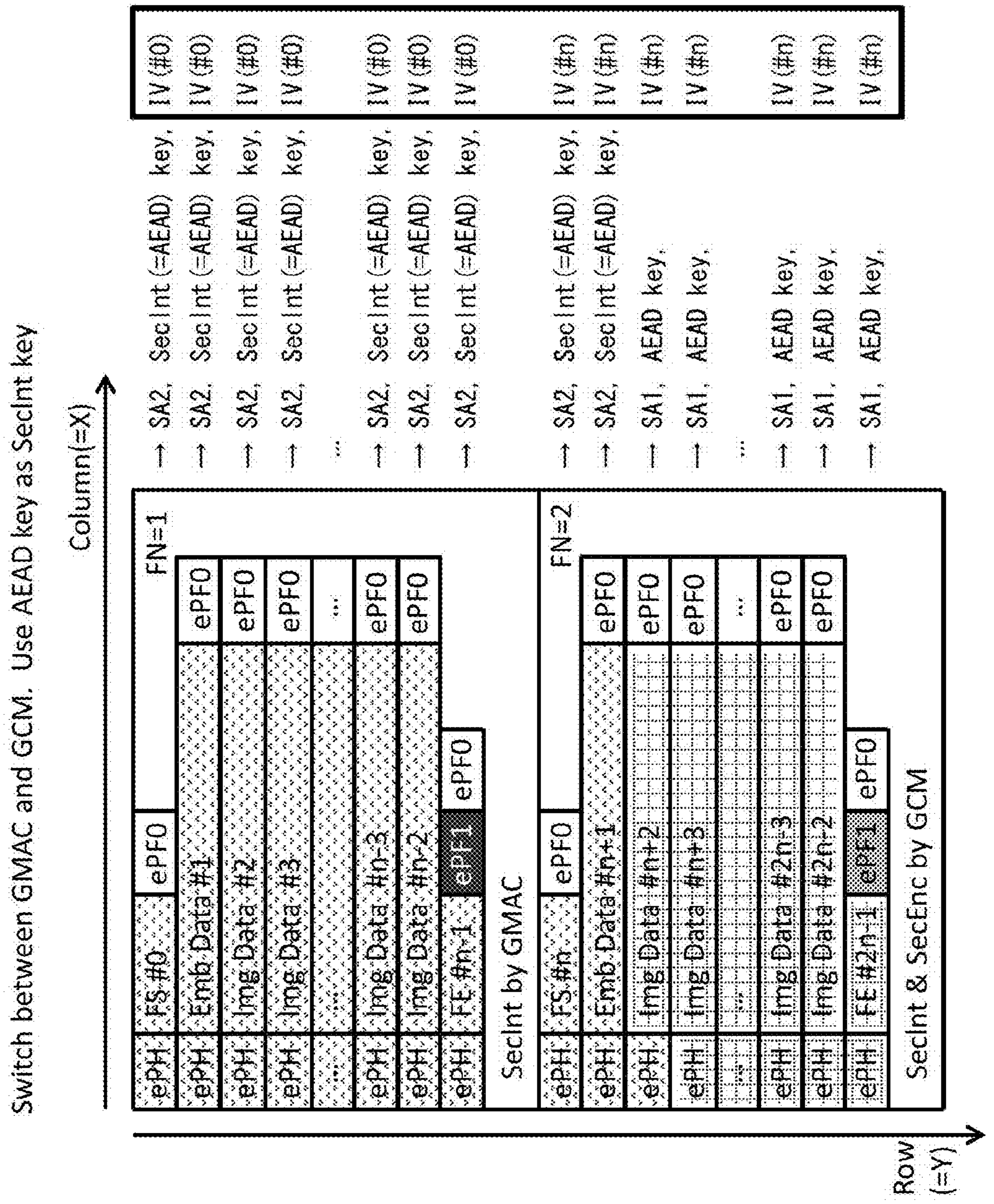

FIG. 230 is a diagram illustrating an example of a data structure of image data.

FIG. 231 is a diagram illustrating an example of a countermeasure for a replay attack on image-system communication (Data Plane).

Figure 232:
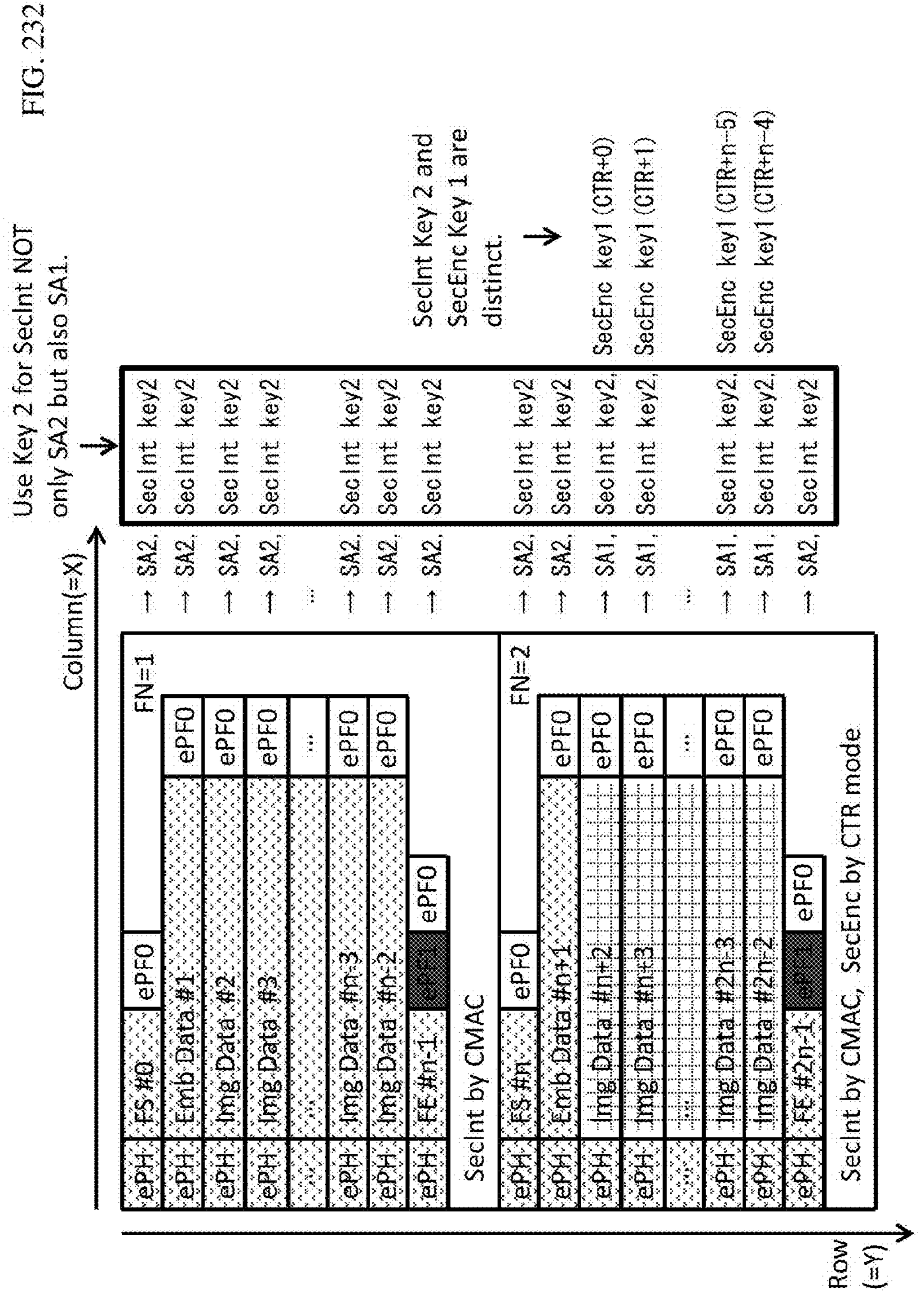

FIG. 232 is a diagram illustrating an example of a data structure of image data.

FIG. 233 is a diagram describing terms in FIG. 232.

Figure 234:
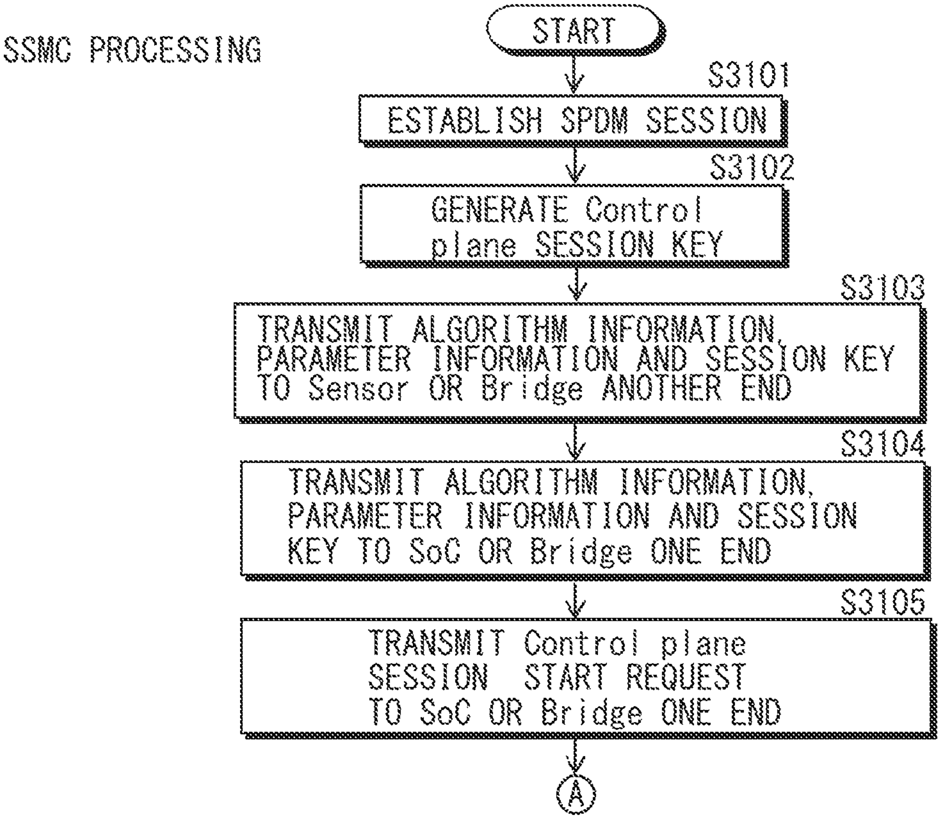

FIG. 234 is a flowchart describing an example of session key generation/transmission processing in SSMC.

Figure 235:
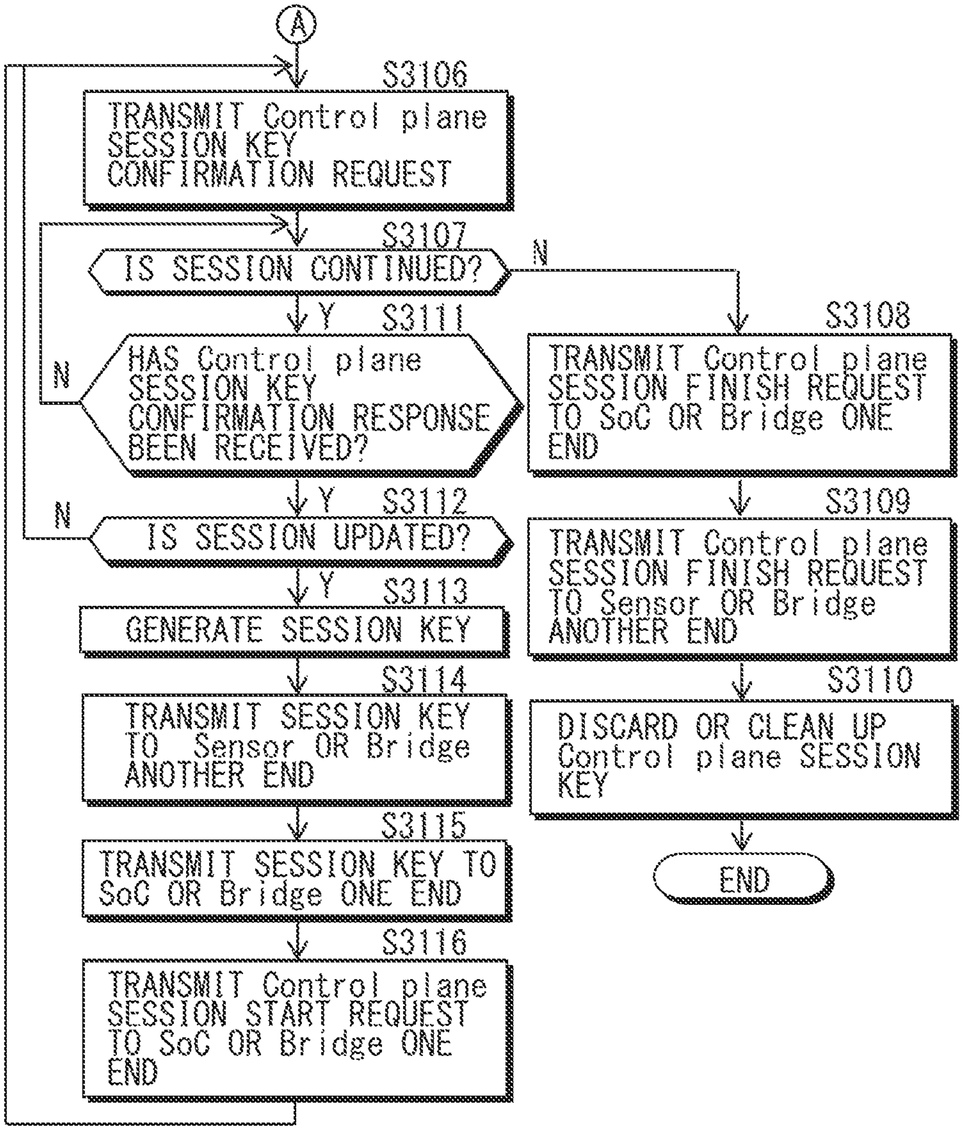

FIG. 235 is a flowchart describing an example of processing subsequent to FIG. 234.

Figure 236:
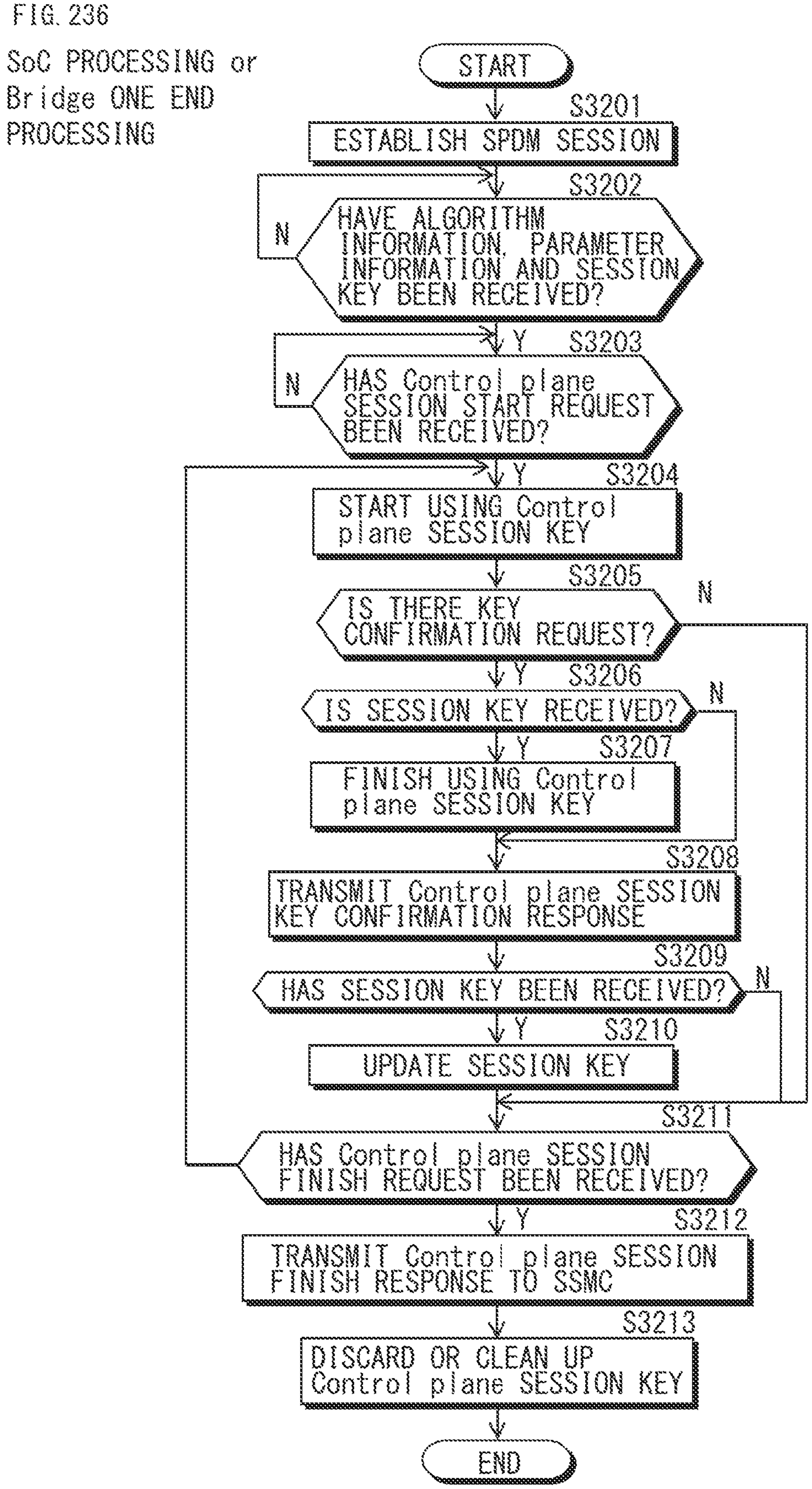

FIG. 236 is a flowchart describing an example of session key update processing at SoC or Bridge one end.

Figure 237:
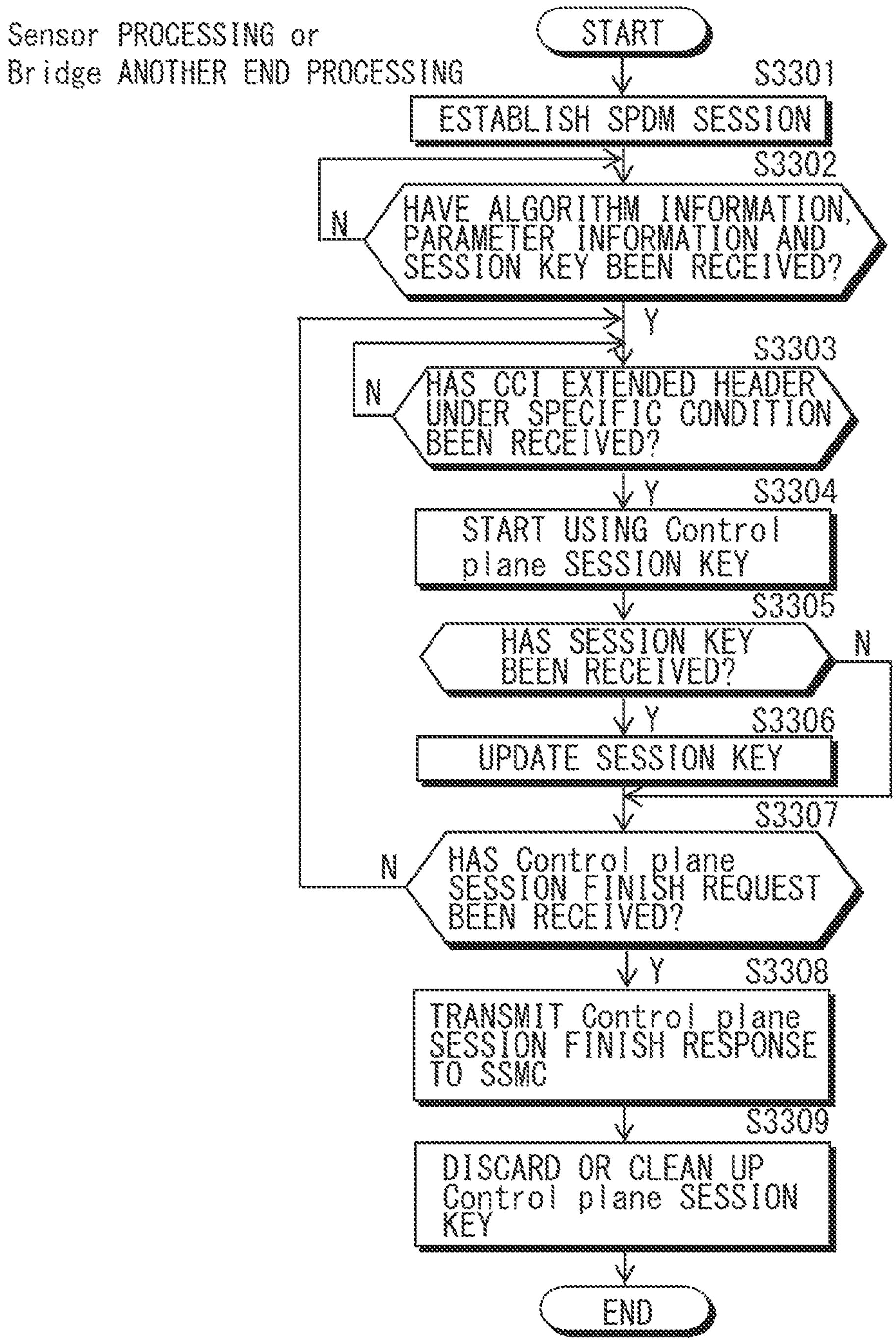

FIG. 237 is a flowchart describing an example of session key update processing at Sensor or Bridge another end.

Figure 238:
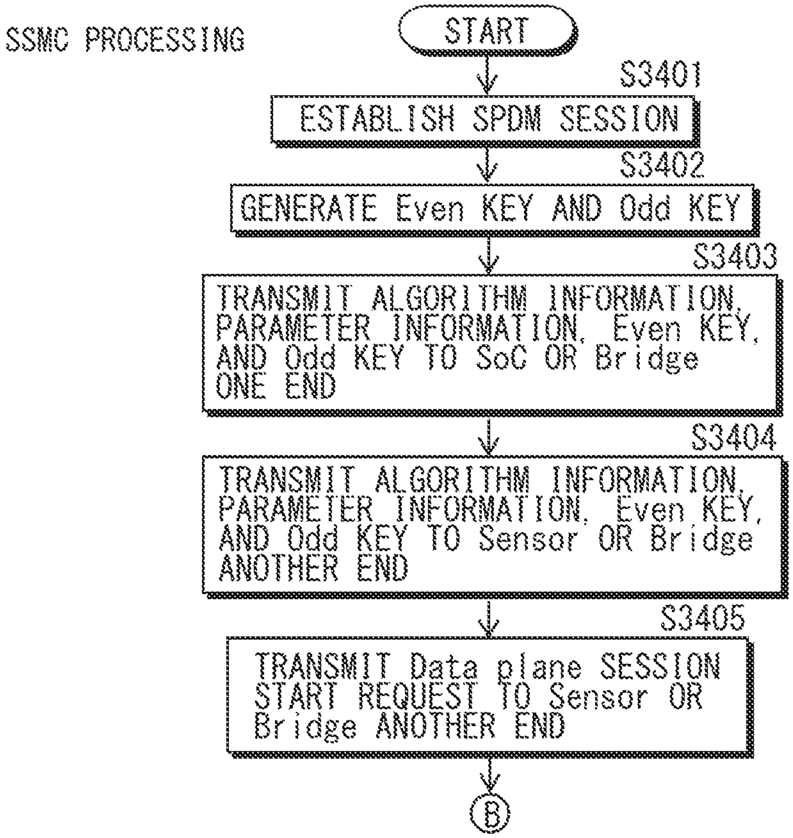

FIG. 238 is a flowchart describing an example of session key generation/transmission processing in SSMC.

Figure 239:
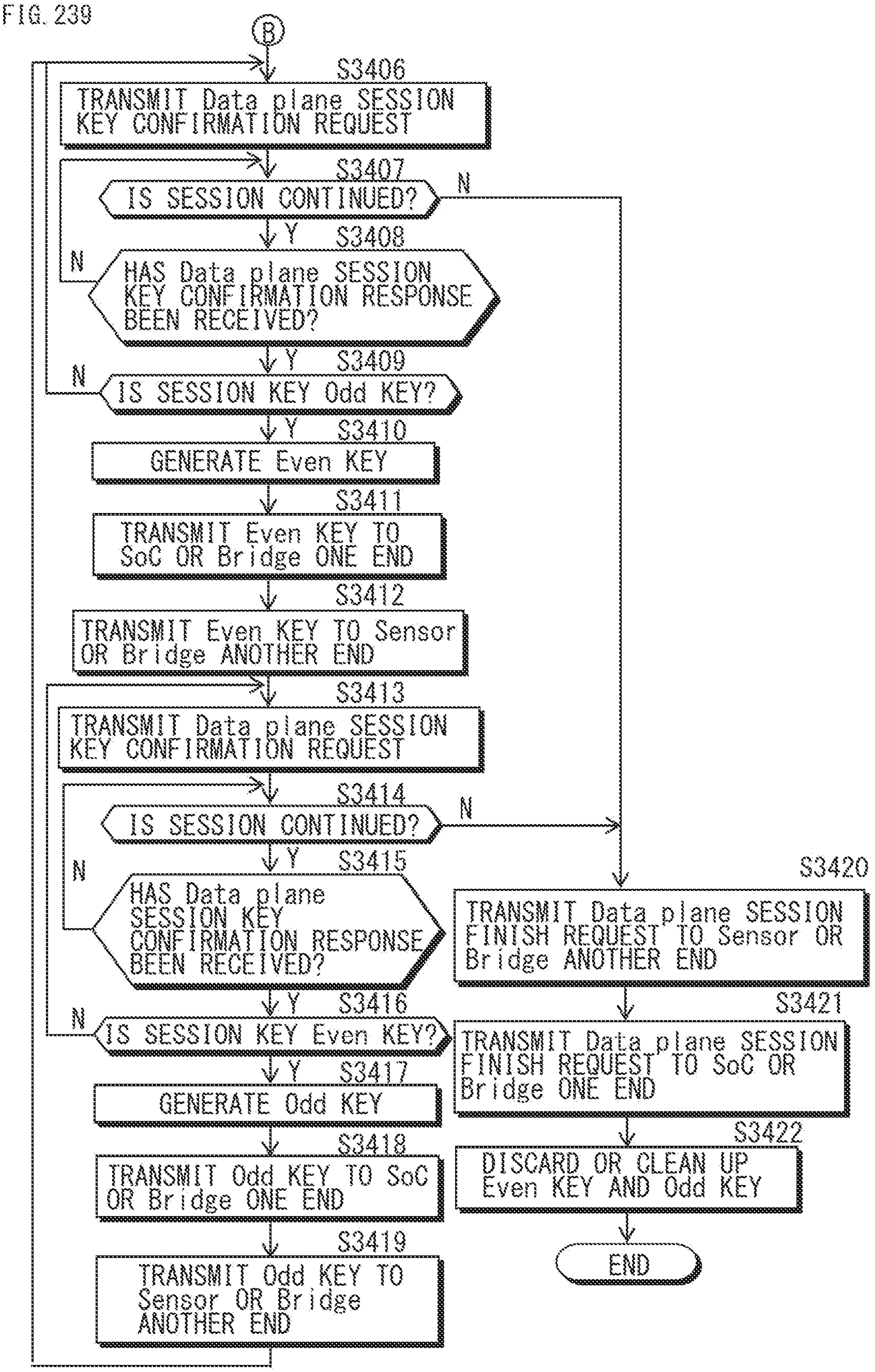

FIG. 239 is a flowchart describing an example of processing subsequent to FIG. 238.

Figure 240:
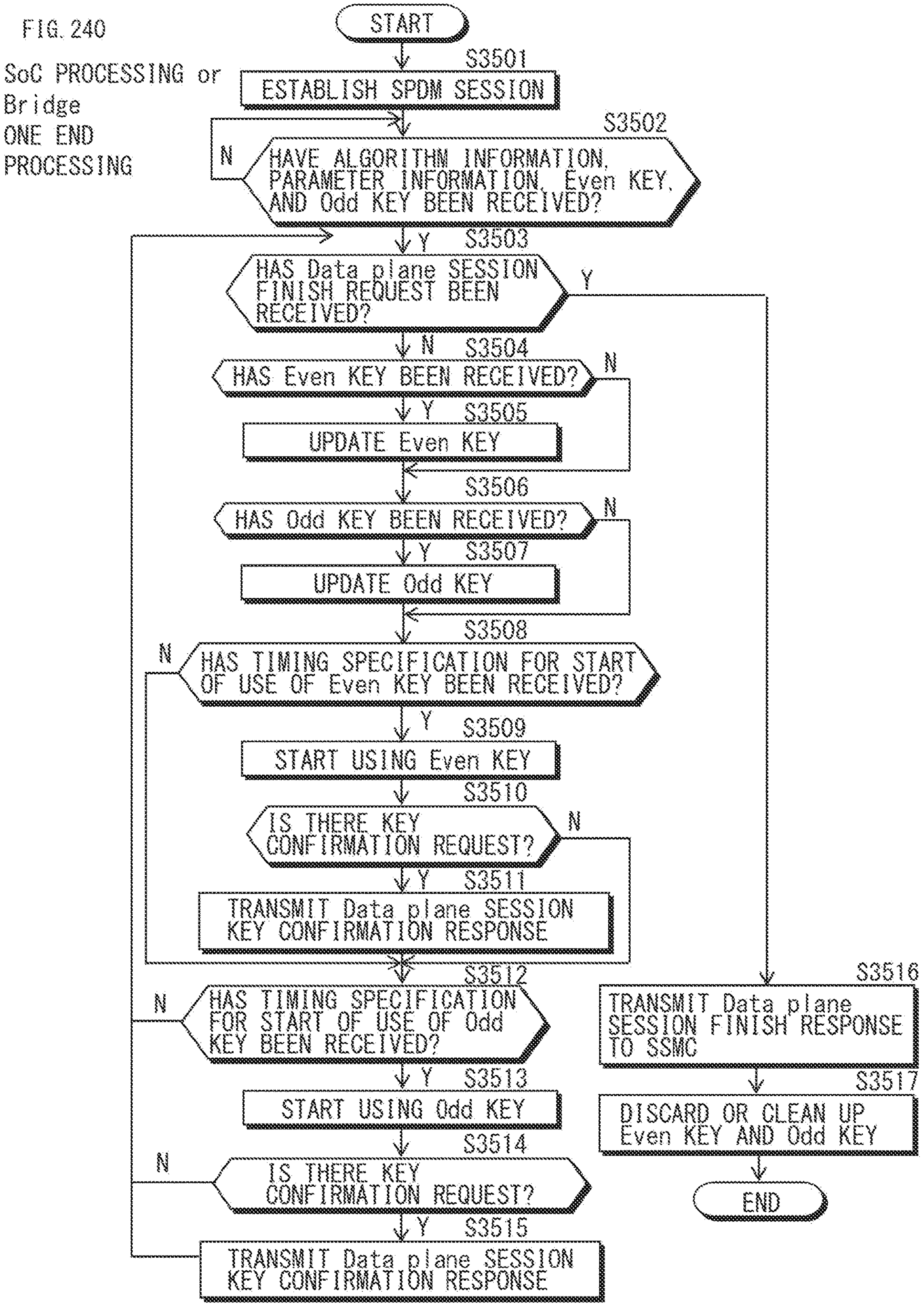

FIG. 240 is a flowchart describing an example of session key update processing at SoC or Bridge one end.

Figure 241:
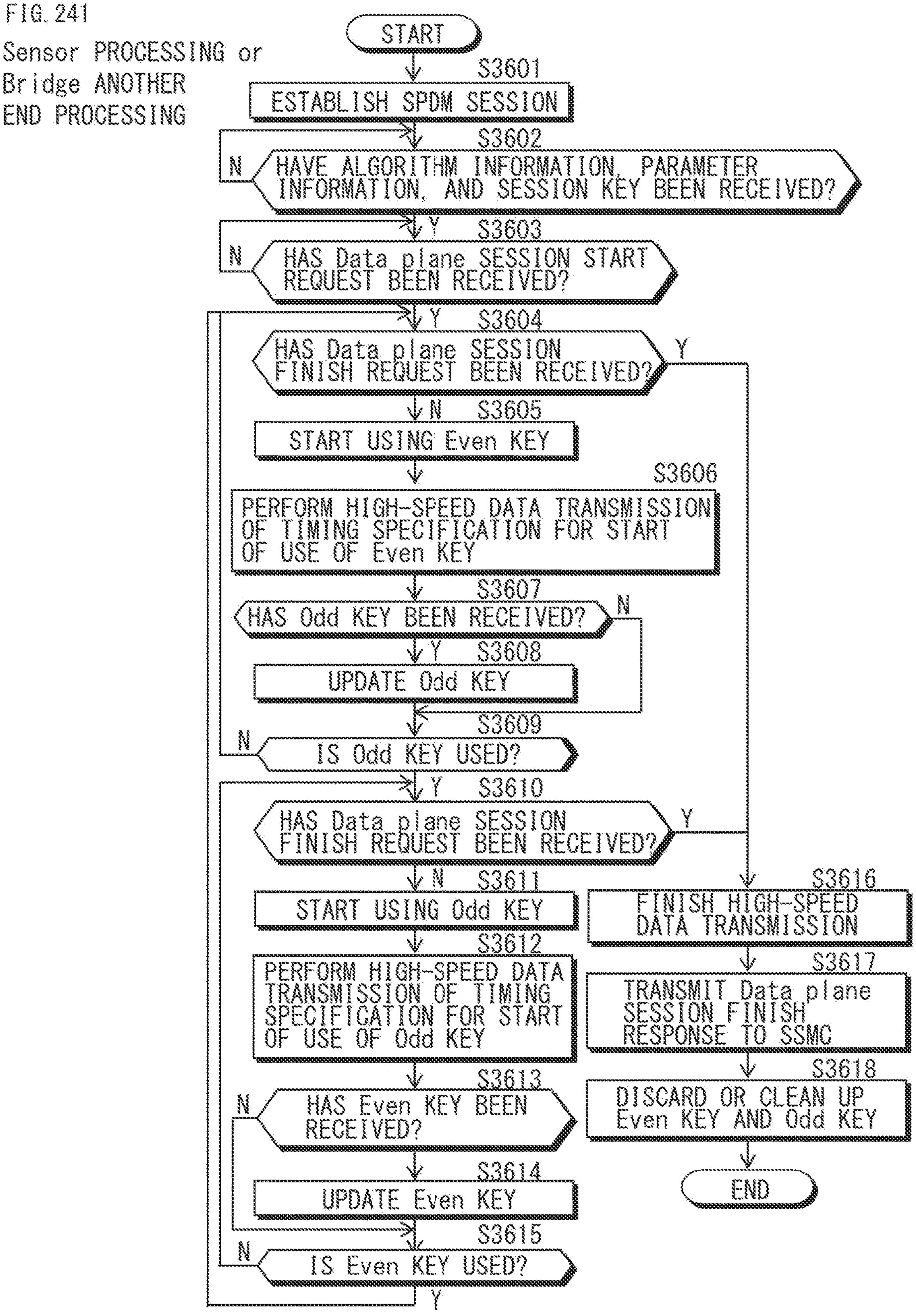

FIG. 241 is a flowchart describing an example of session key update processing at Sensor or Bridge another end.

Figure 242:
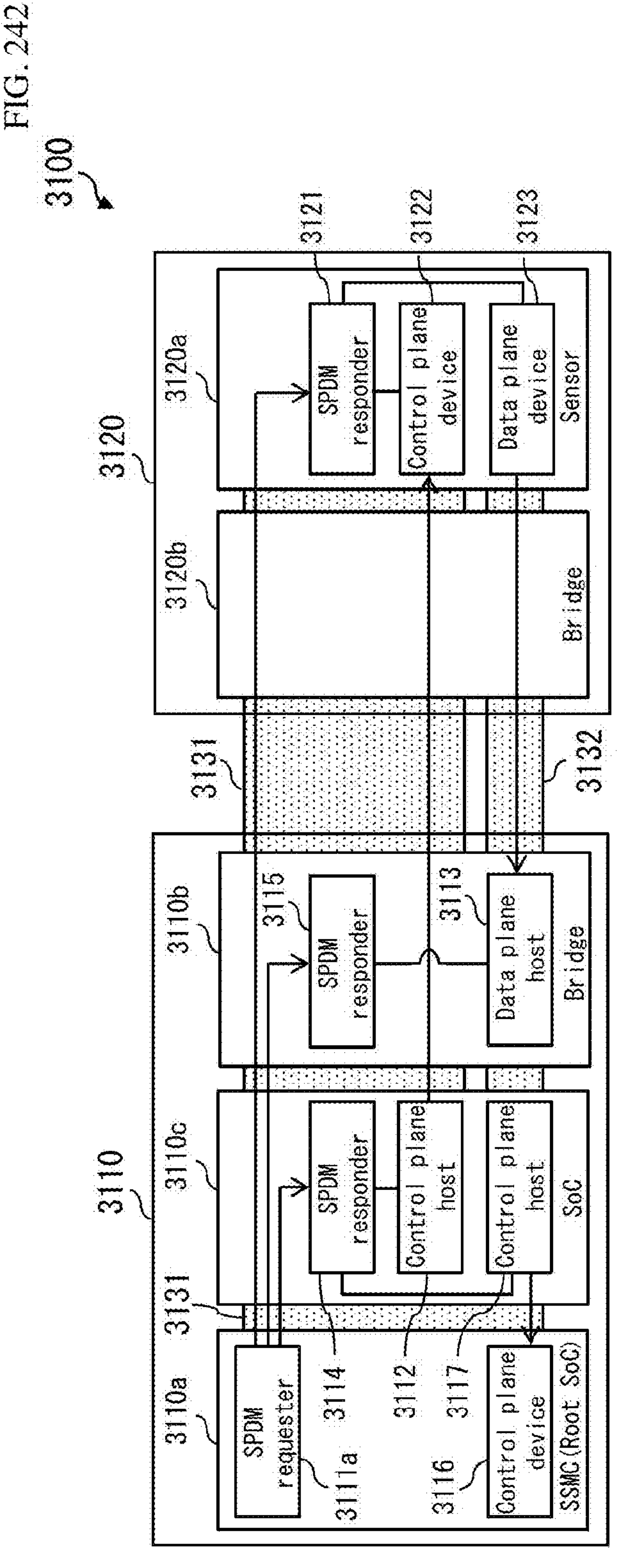

FIG. 242 is a block diagram illustrating a modification example of the configuration in FIG. 208.

Figure 243:
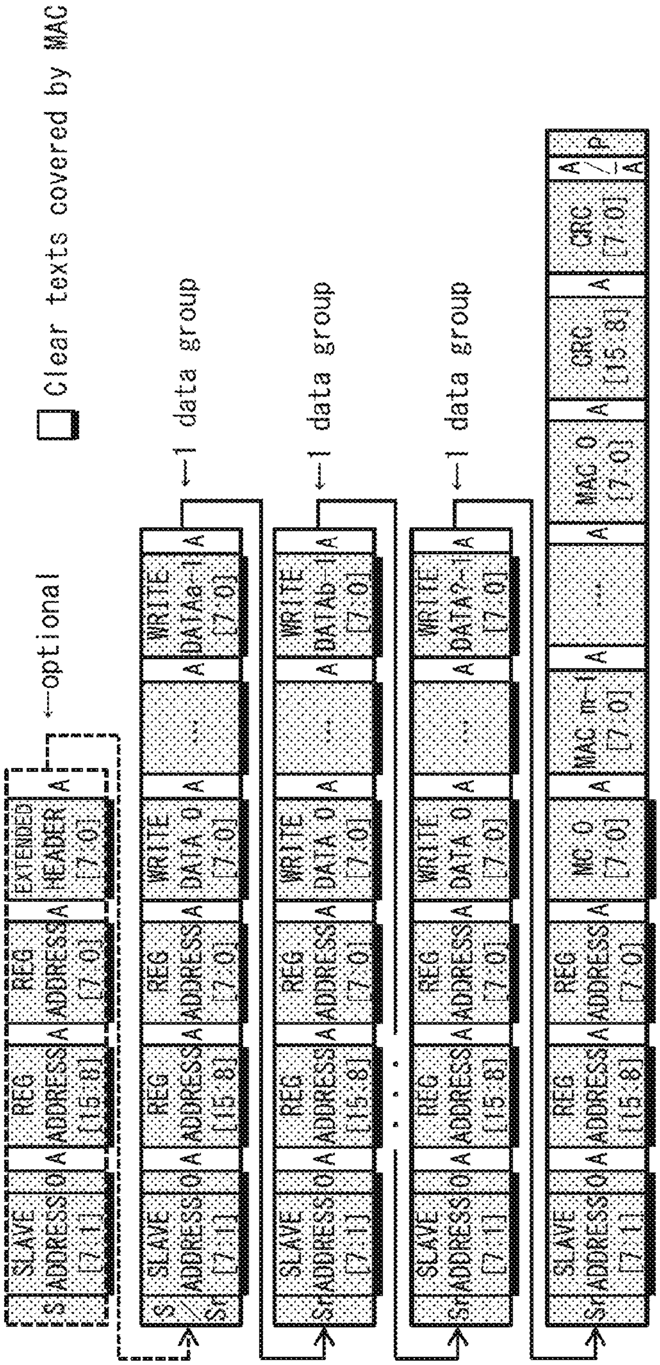

FIG. 243 is a diagram illustrating an example of a packet configuration of write data.

Figure 244:
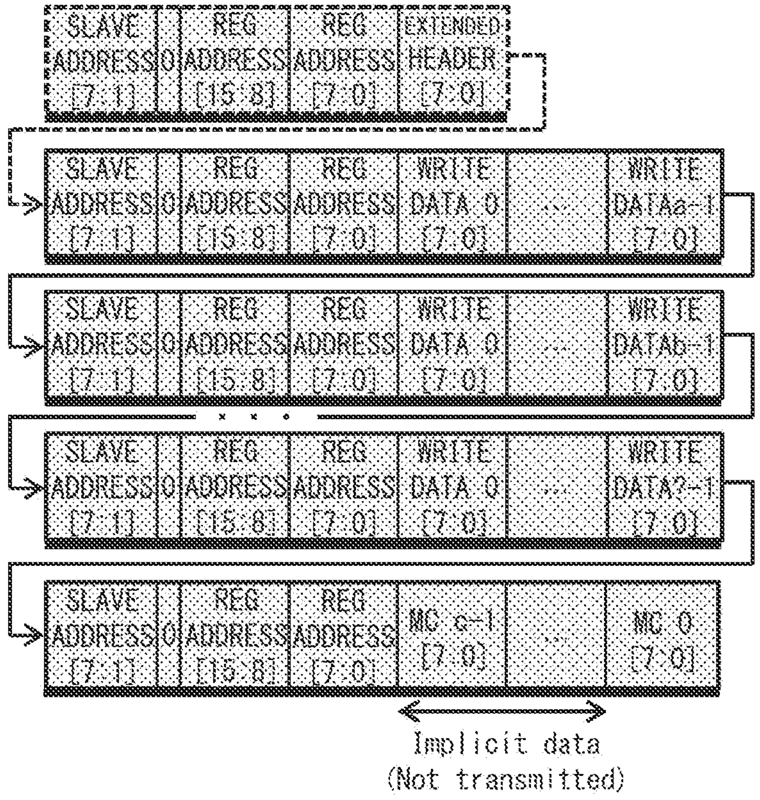

FIG. 244 is a diagram illustrating an example of processing of write data.

FIG. 245 is a diagram illustrating an example of a functional register.

FIG. 246 is a diagram illustrating an example of the functional register.

Figure 247:
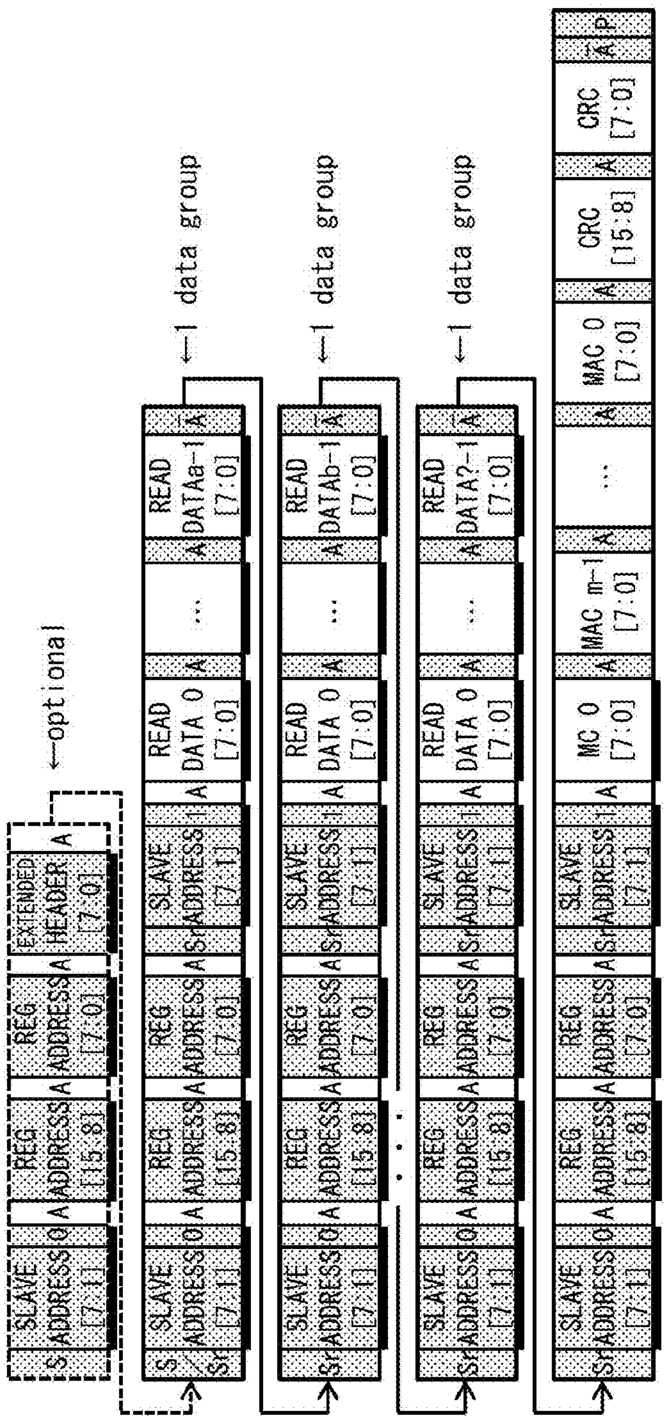

FIG. 247 is a diagram illustrating an example of a packet configuration of read data.

Figure 248:
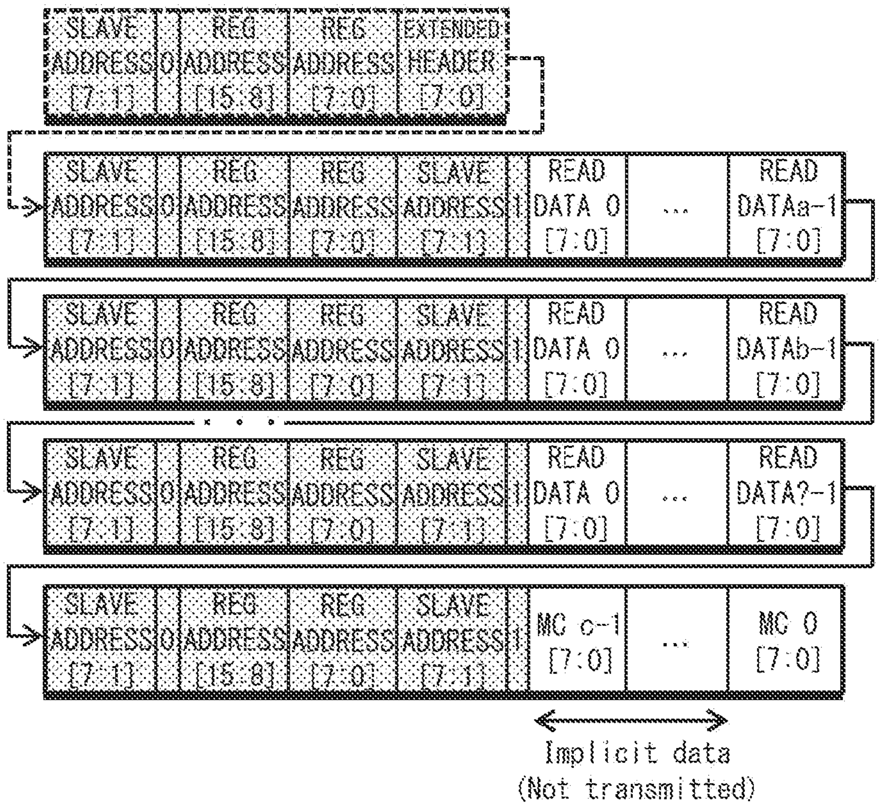

FIG. 248 is a diagram illustrating an example of processing of read data.

Figure 249:
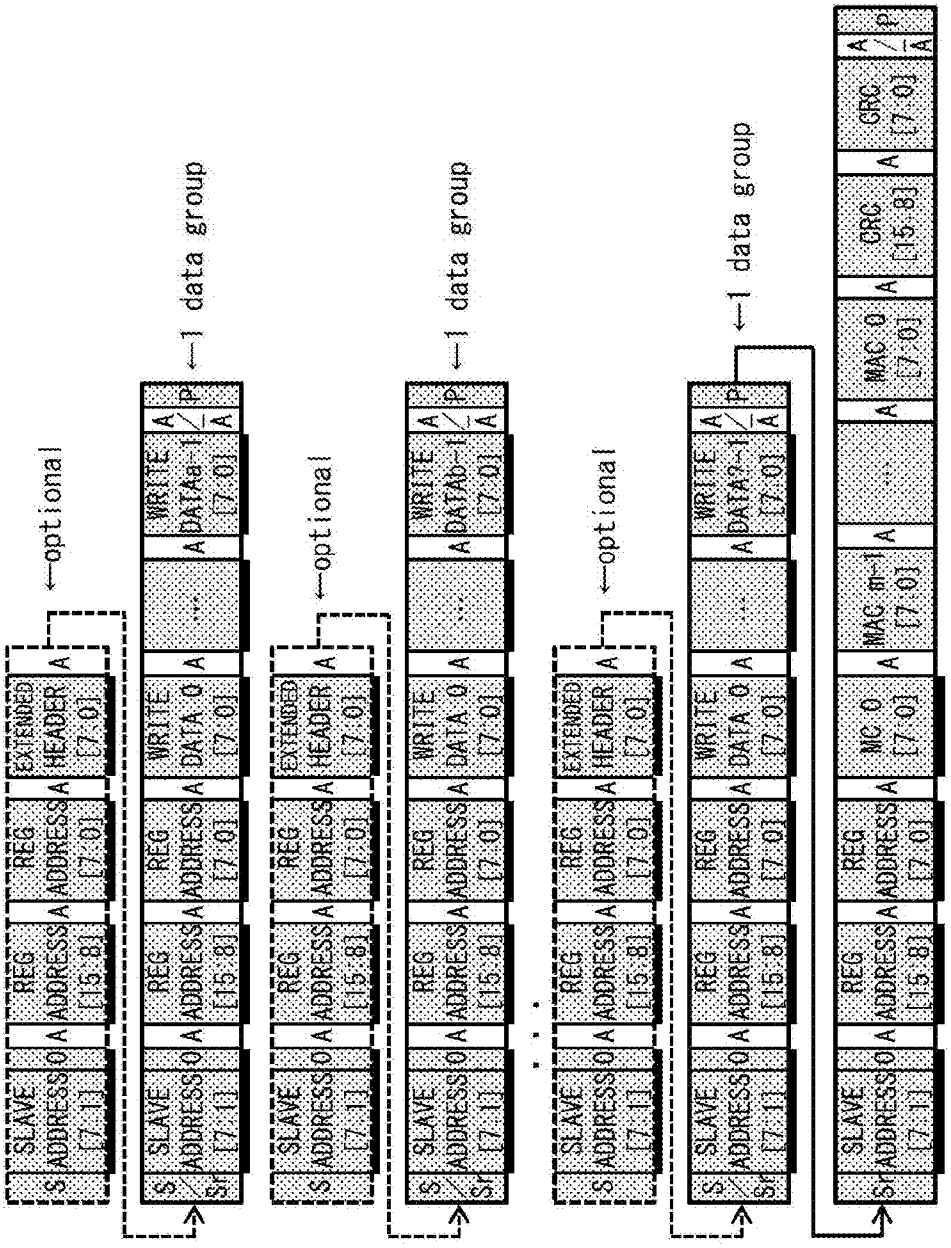

FIG. 249 is a diagram illustrating an example of a packet configuration of write data.

Figure 250:
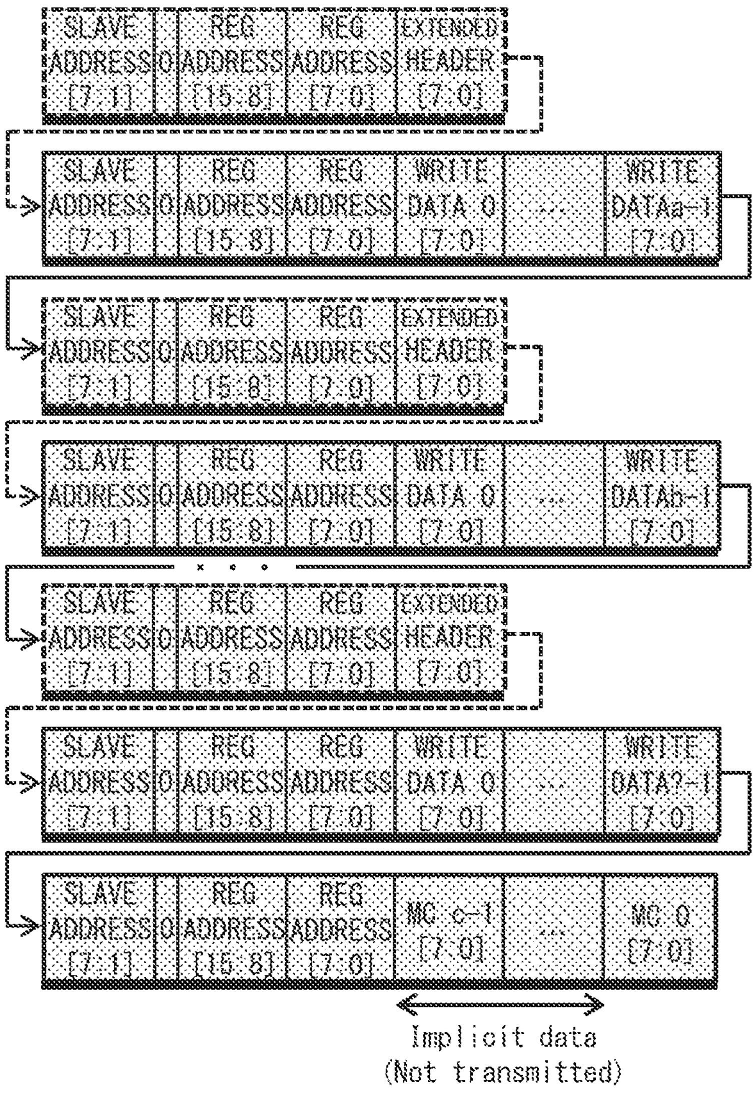

FIG. 250 is a diagram illustrating an example of processing of write data.

FIG. 251 is a diagram illustrating a setting example of EXTENDED HEADER.

Figure 252:
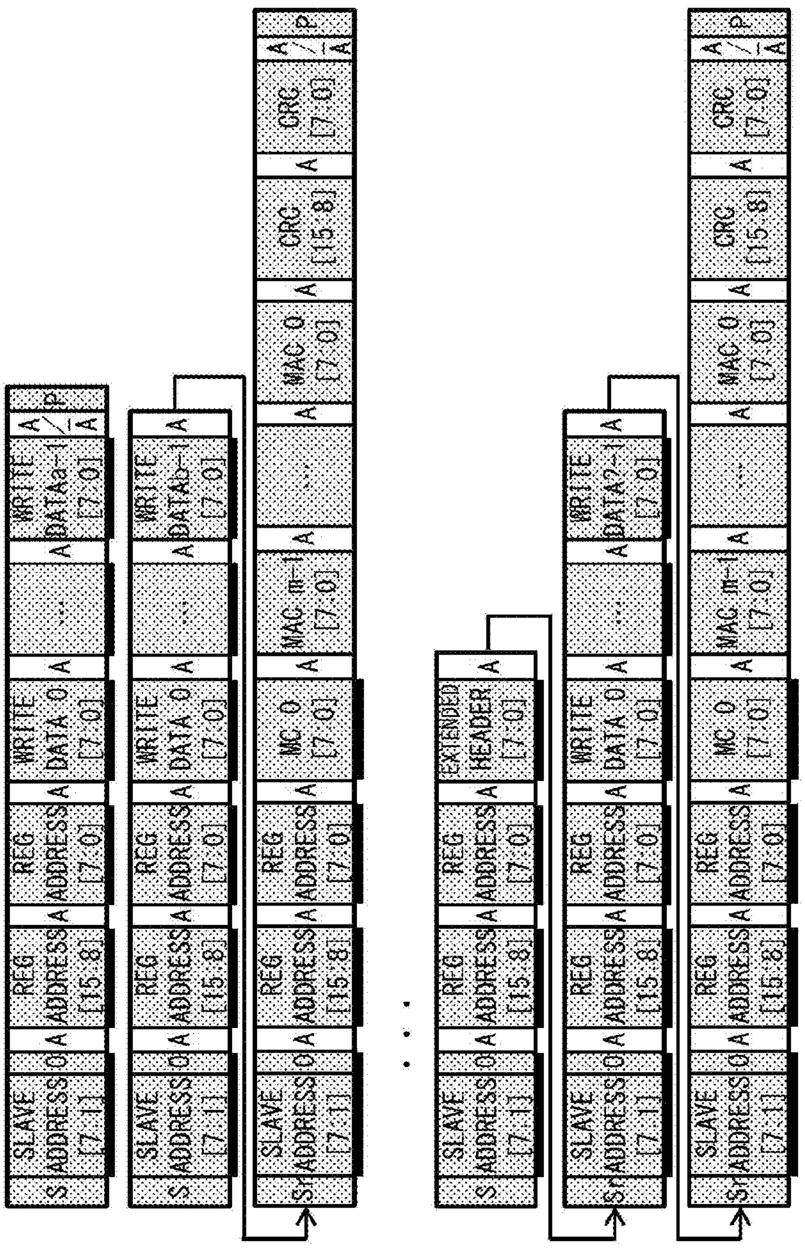

FIG. 252 is a diagram illustrating an example of a packet configuration of write data.

FIG. 253 is a diagram illustrating a setting example of EXTENDED HEADER.

Figure 254:
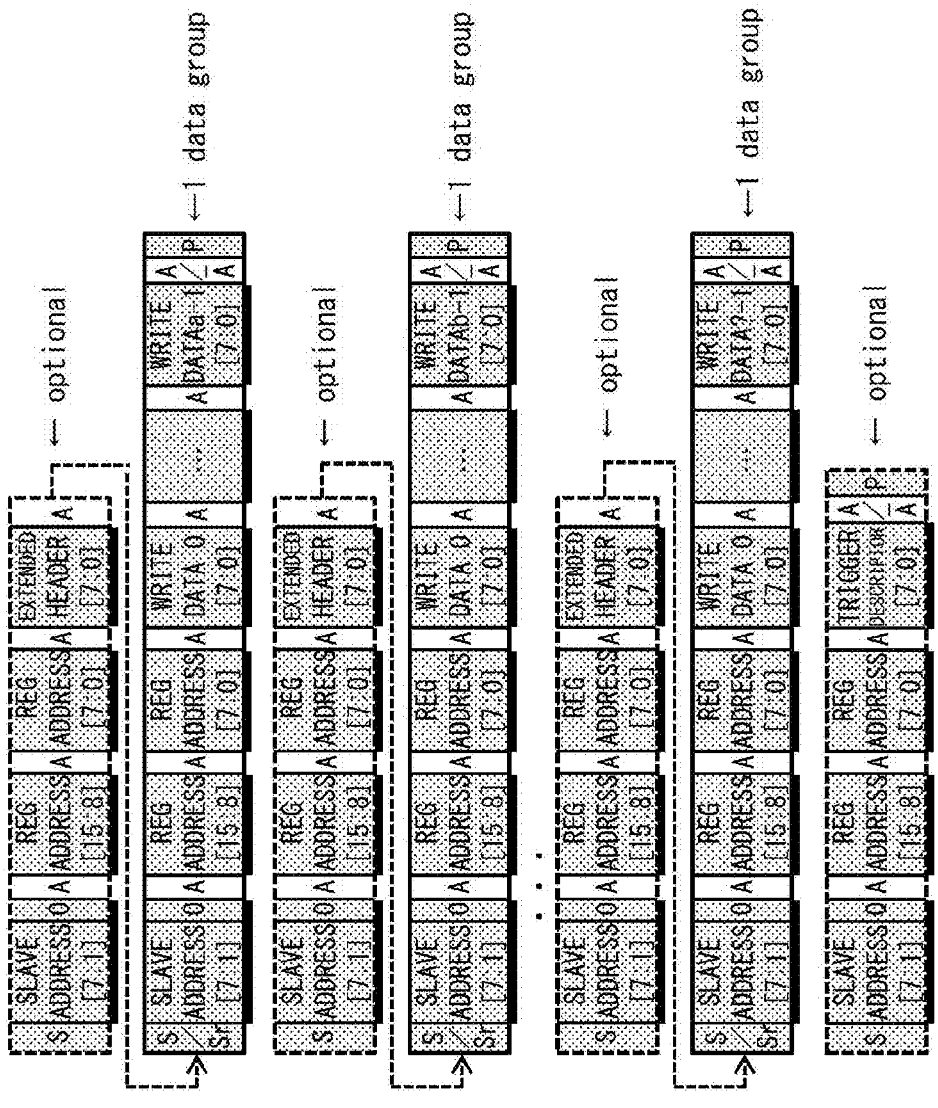

FIG. 254 is a diagram illustrating an example of a packet configuration of write data.

Figure 255:
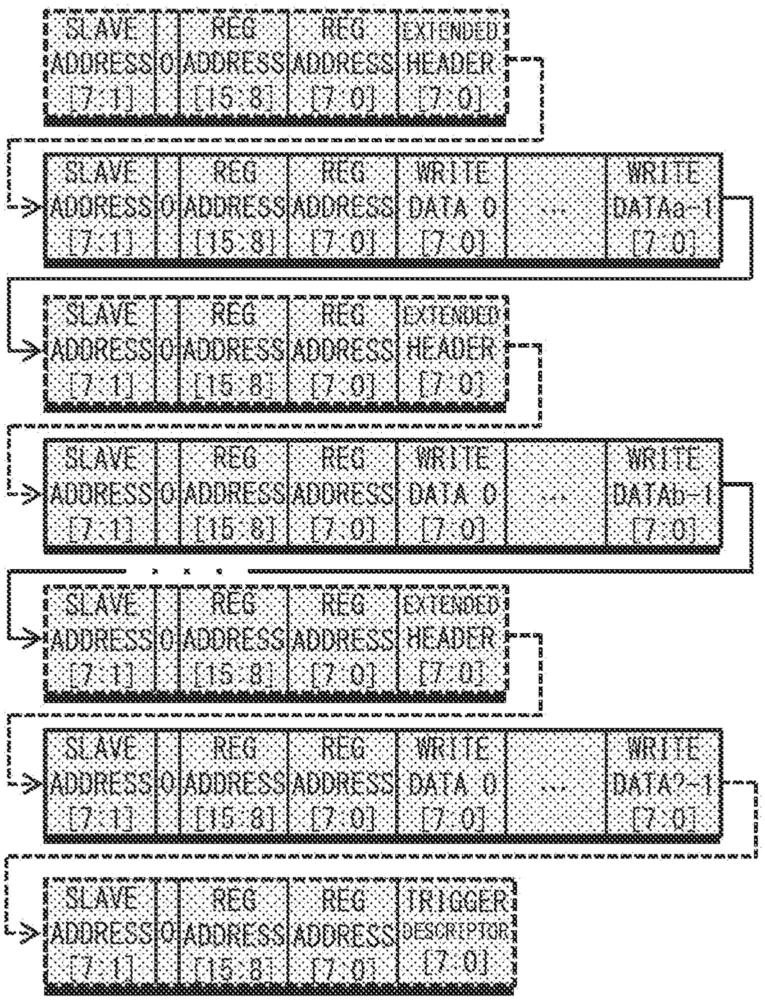

FIG. 255 is a diagram illustrating an example of processing of write data.

Figure 256:
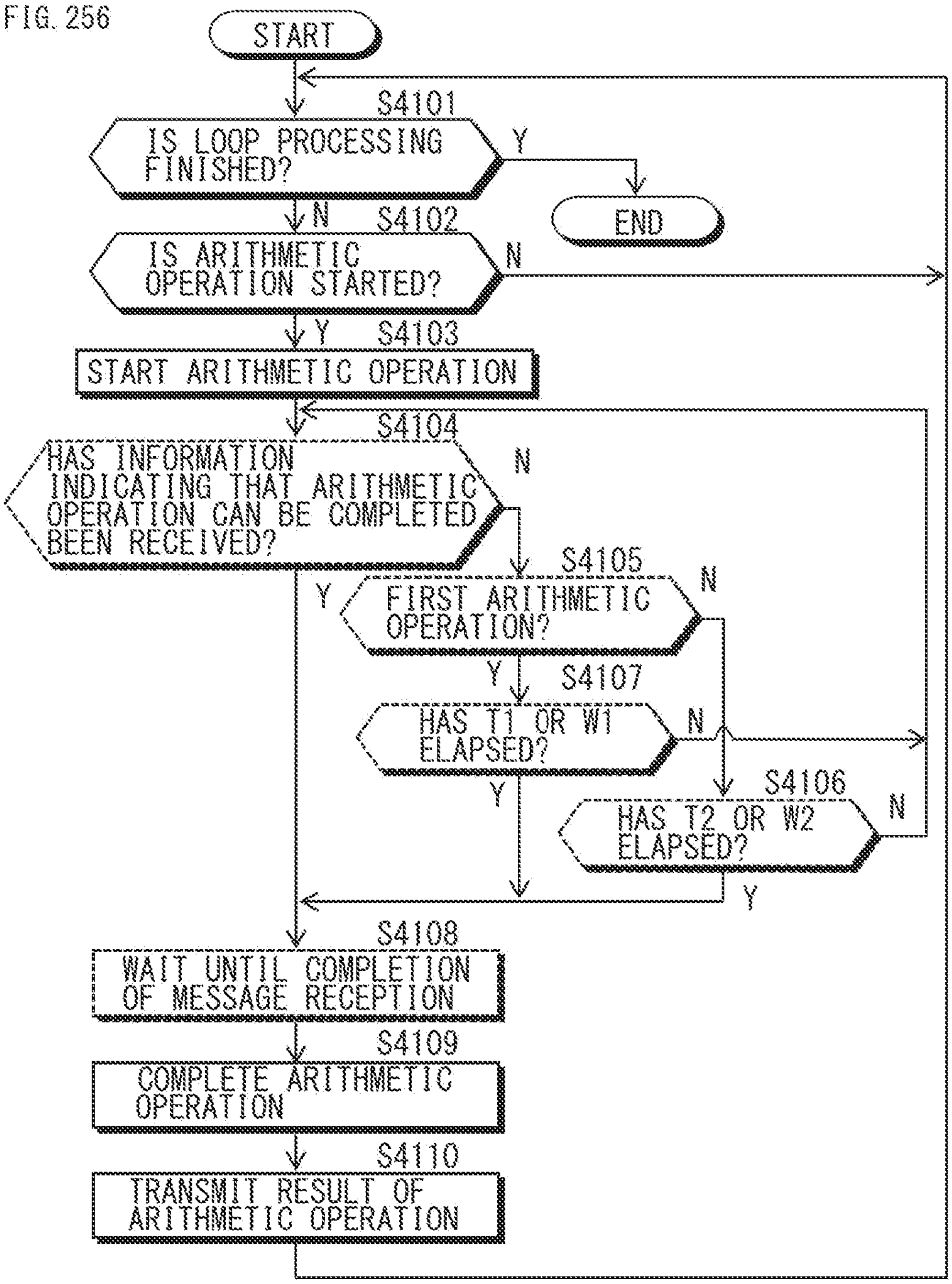

FIG. 256 is a flowchart describing an example of arithmetic processing of MAC or CRC in a second CCI mode.

FIG. 257 is a diagram illustrating setting examples of Register definition and EXTENDED HEADER.

Figure 258:
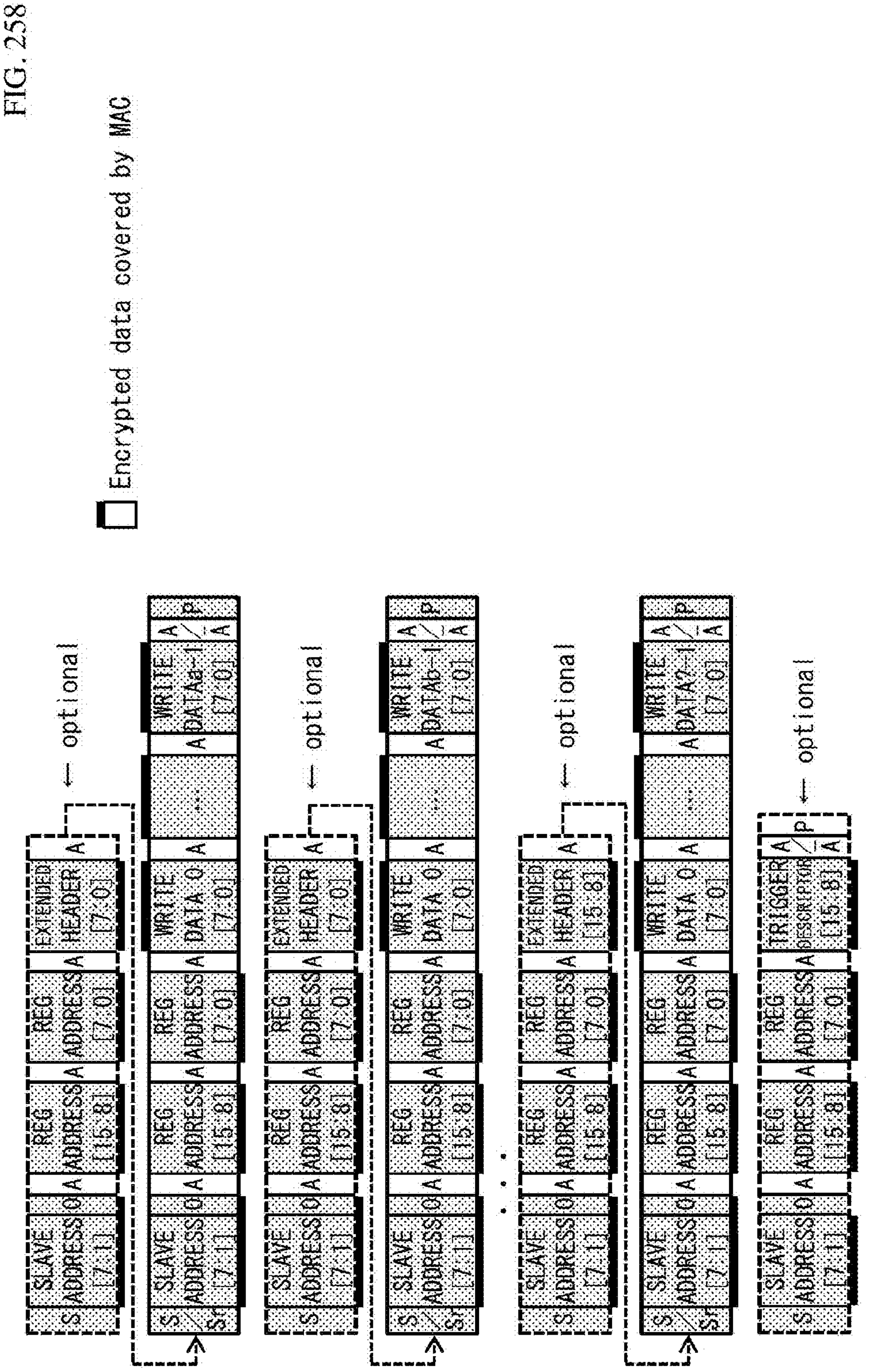

FIG. 258 is a diagram illustrating an example of a packet configuration of write data.

Figure 259:
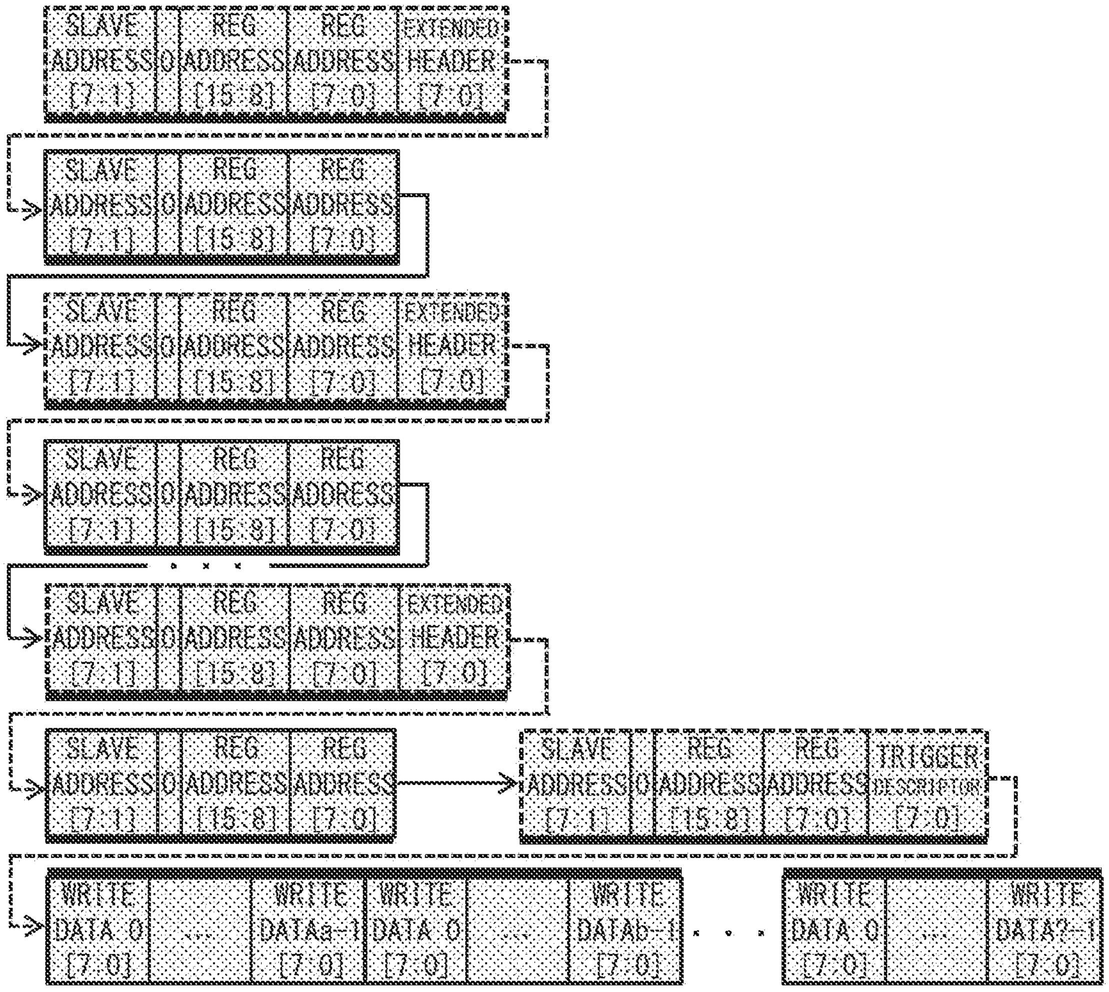

FIG. 259 is a diagram illustrating an example of processing of write data.

Figure 260:
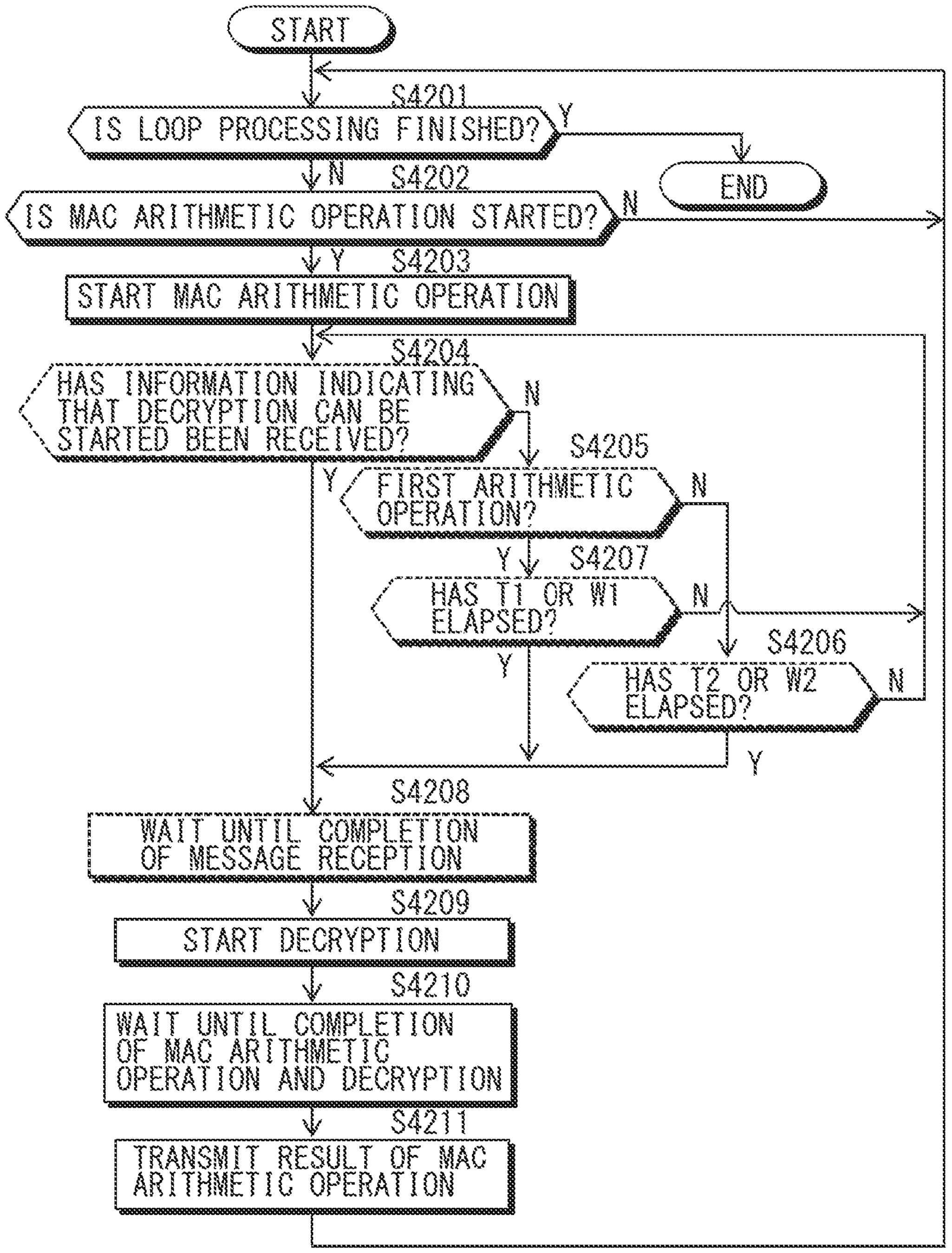

FIG. 260 is a flowchart describing an example of arithmetic processing of GCM or CCM in the second CCI mode.

FIG. 261 is a diagram illustrating setting examples of Register definition and EXTENDED HEADER.

Figure 262:
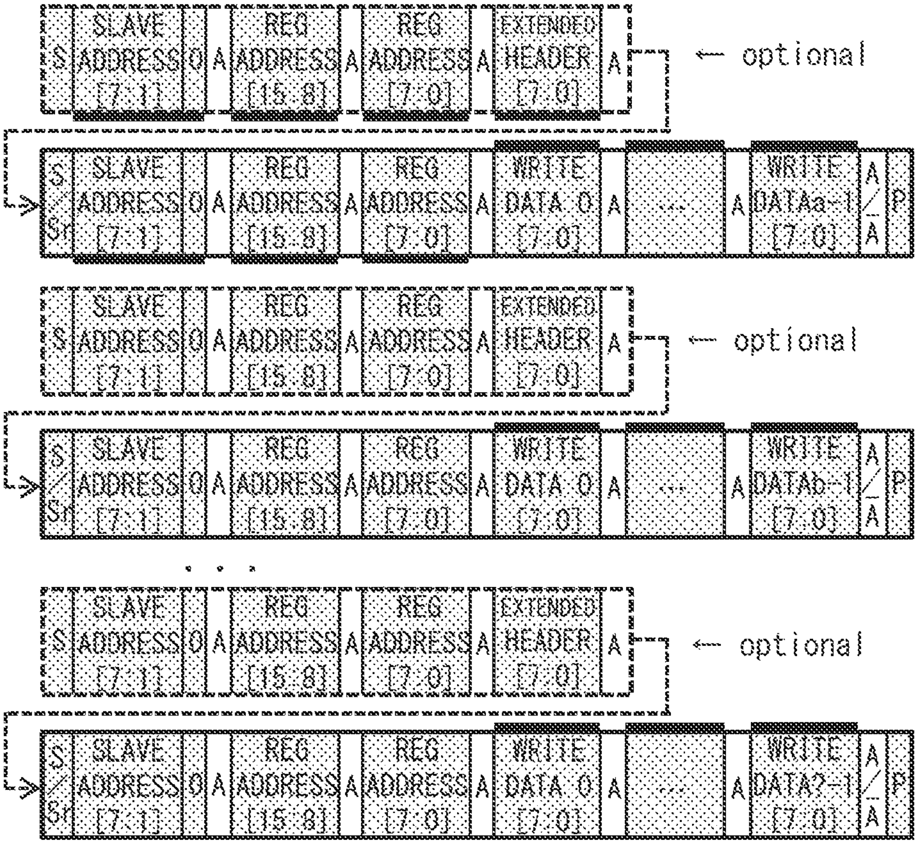

FIG. 262 is a diagram illustrating an example of a packet configuration of write data.

Figure 263:
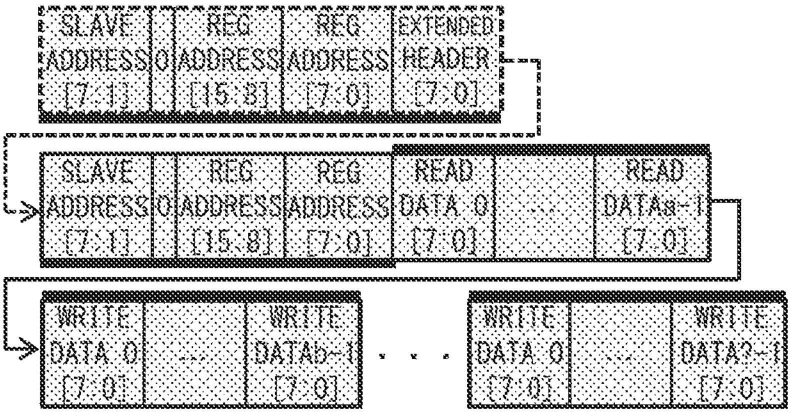

FIG. 263 is a diagram illustrating an example of processing of write data.

Figure 264:
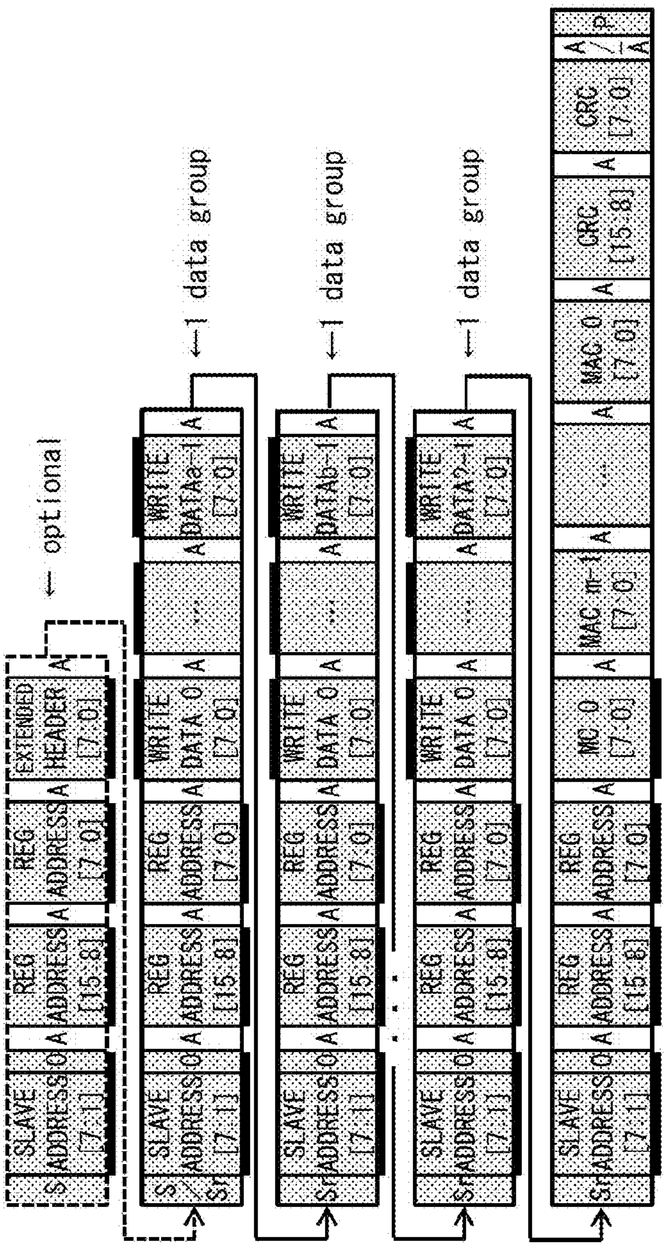

FIG. 264 is a diagram illustrating an example of a packet configuration of write data.

Figure 265:
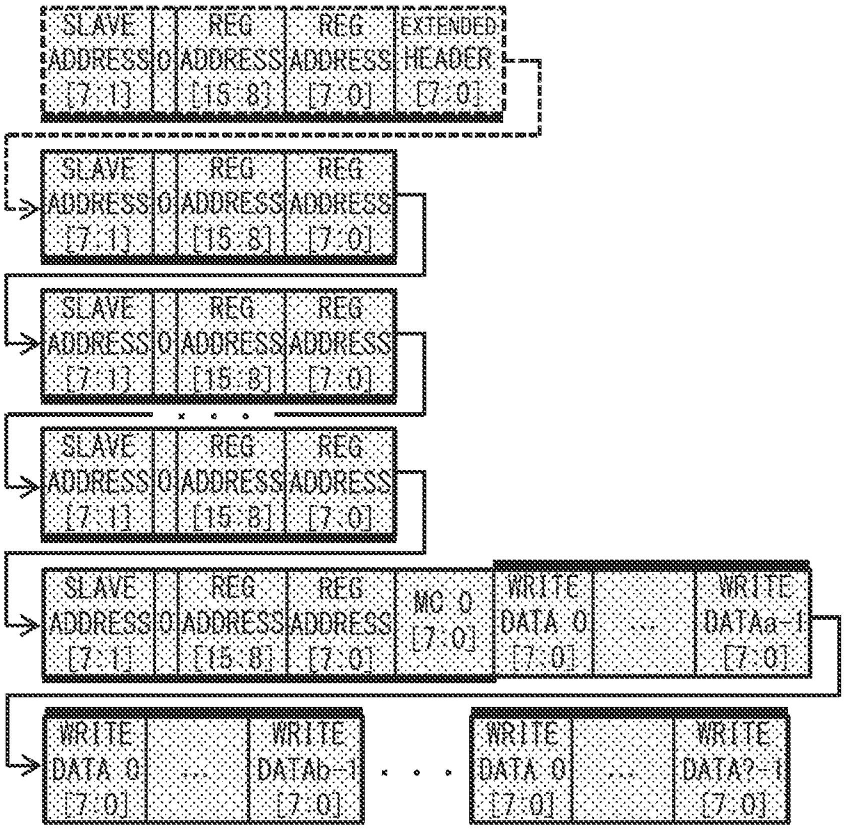

FIG. 265 is a diagram illustrating an example of processing of write data.

Figure 266:
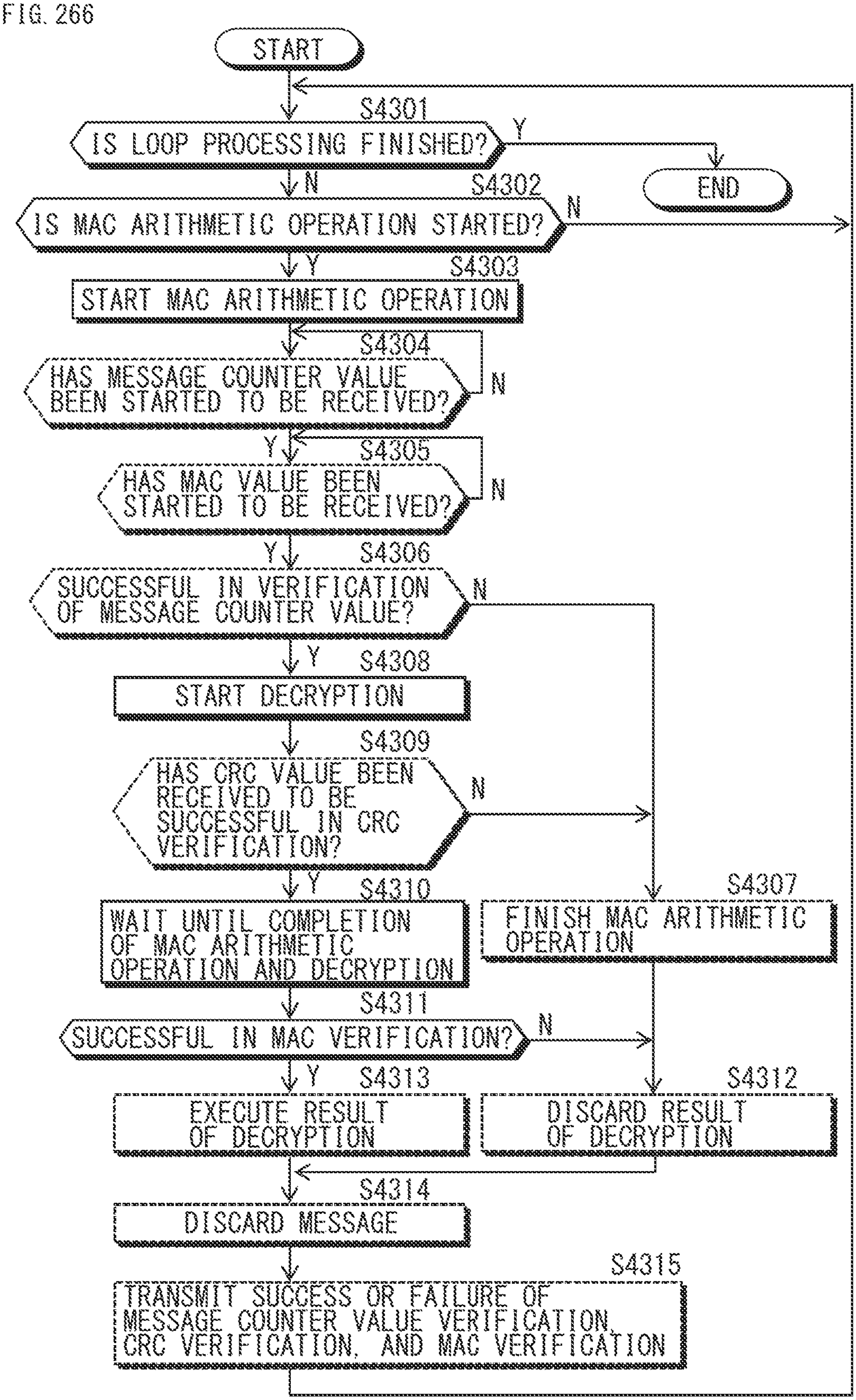

FIG. 266 is a flowchart describing an example of arithmetic processing of GCM or CCM in a first CCI mode.

FIG. 267 is a diagram illustrating a setting example of Capability register.

FIG. 268 is a diagram illustrating a setting example of a Vendor defined SPDM message.

Figure 269:
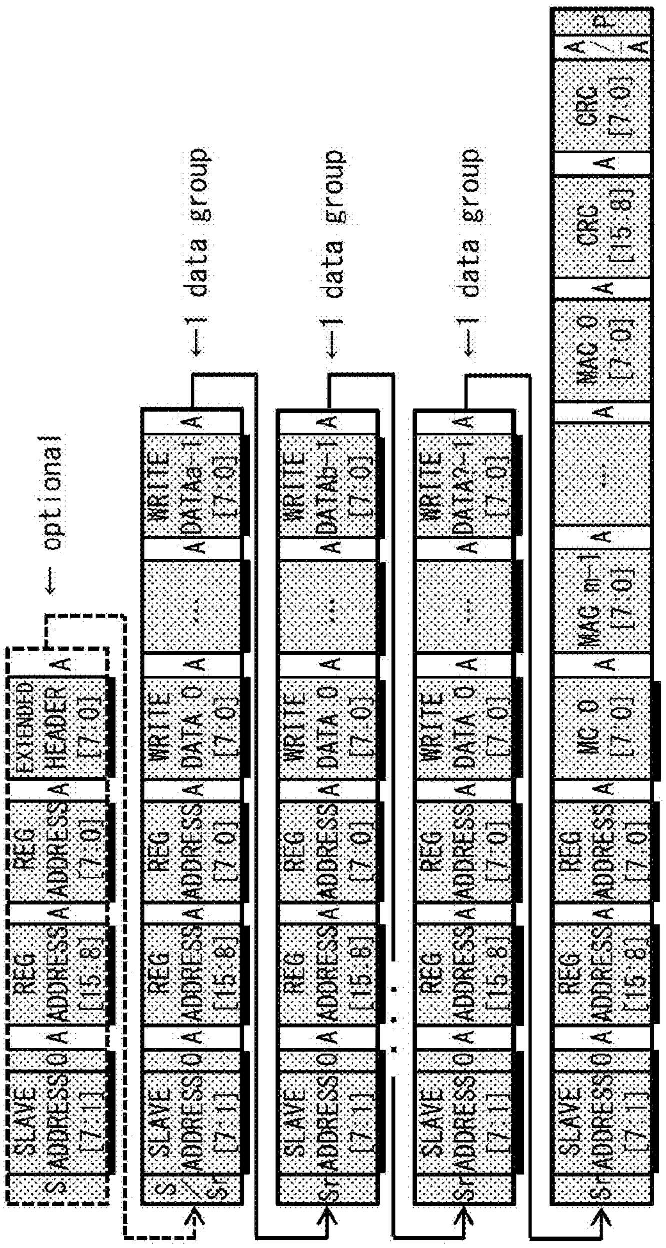

FIG. 269 is a diagram illustrating an example of a packet configuration of write data.

Figure 270:
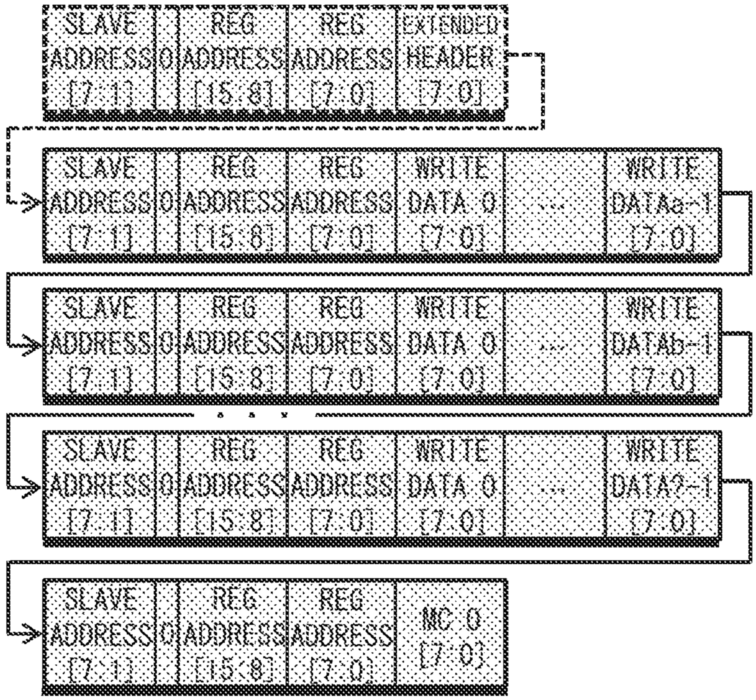

FIG. 270 is a diagram illustrating an example of processing of write data.

Figure 271:
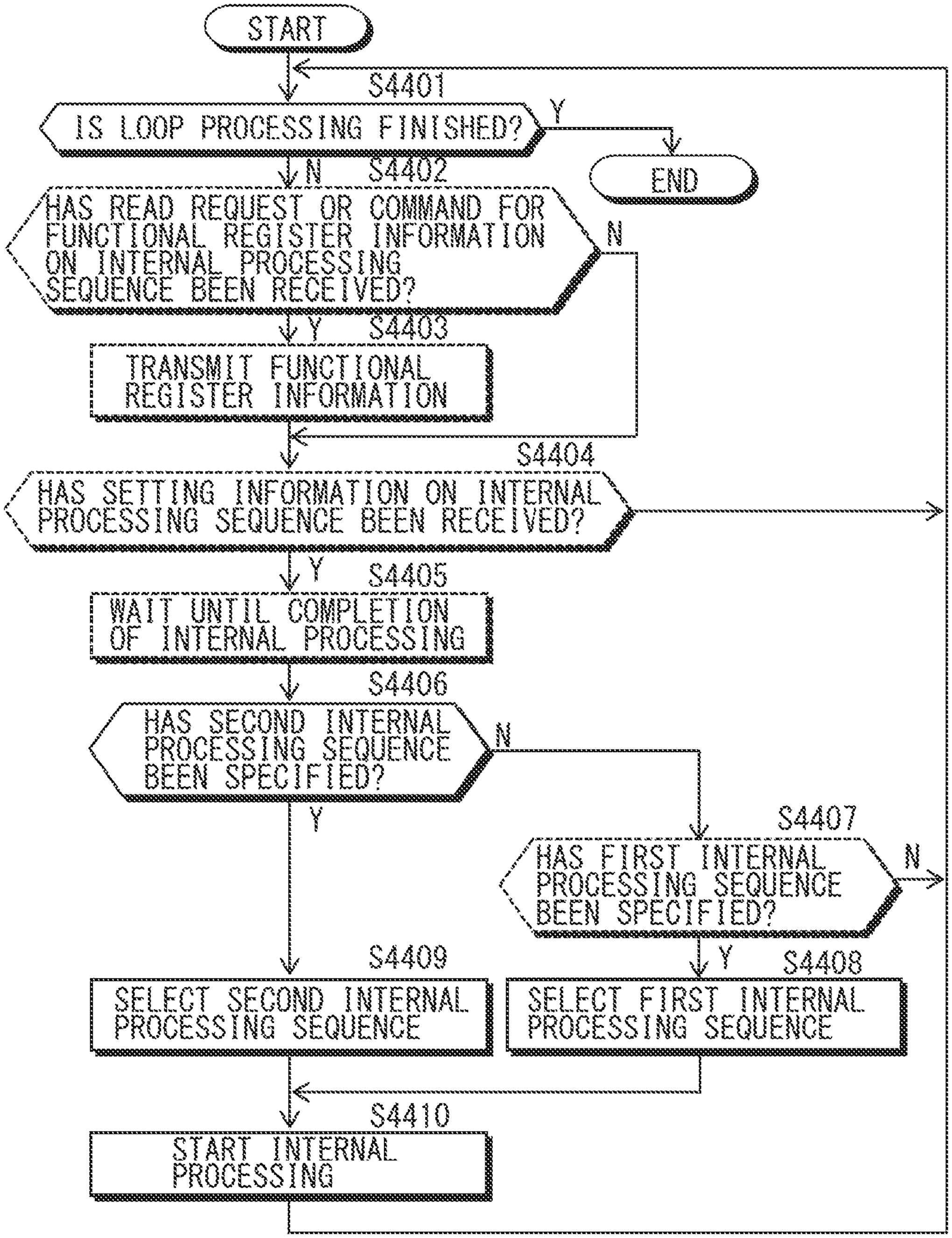

FIG. 271 is a flowchart describing an example of switching of an internal processing sequence.

FIG. 272 is a diagram illustrating a setting example of Capability register.

FIG. 273 is a diagram illustrating a setting example of the Vendor defined SPDM message.

Figure 274:
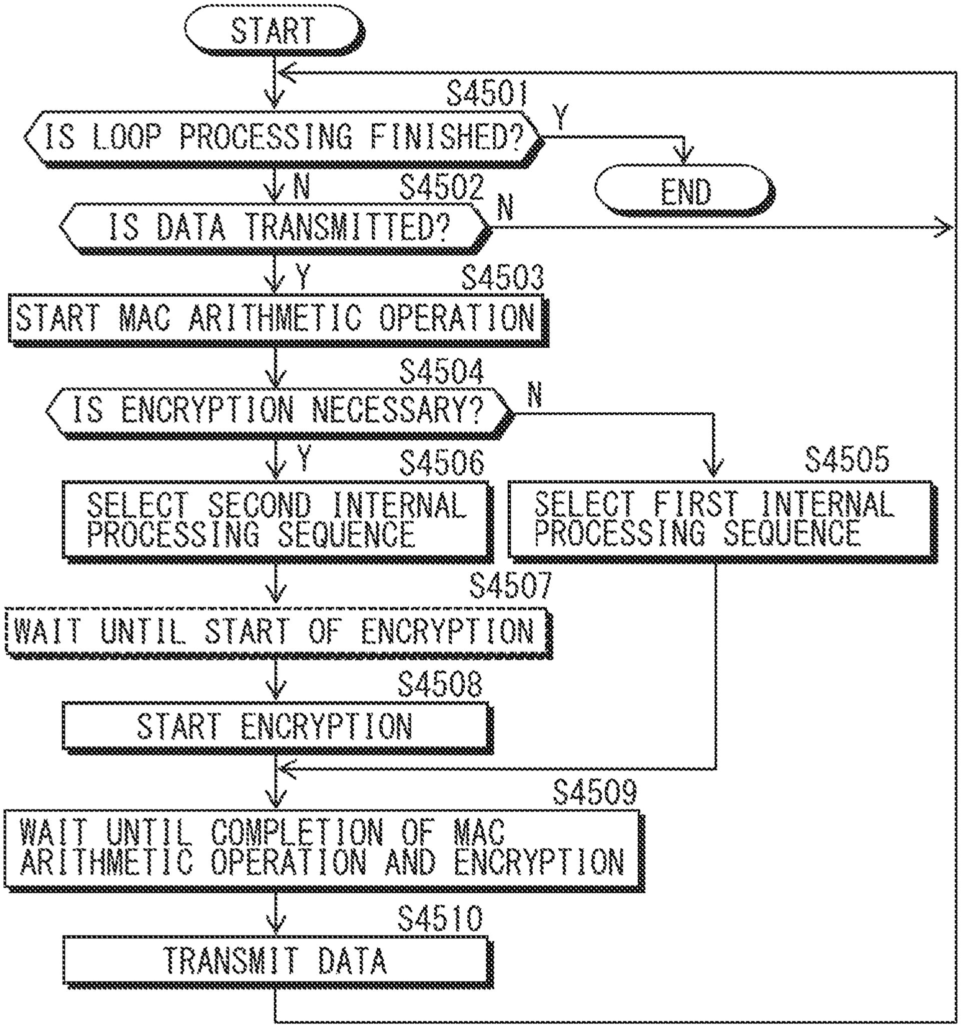

FIG. 274 is a flowchart describing an example of switching of an internal processing sequence.

Figure 275:
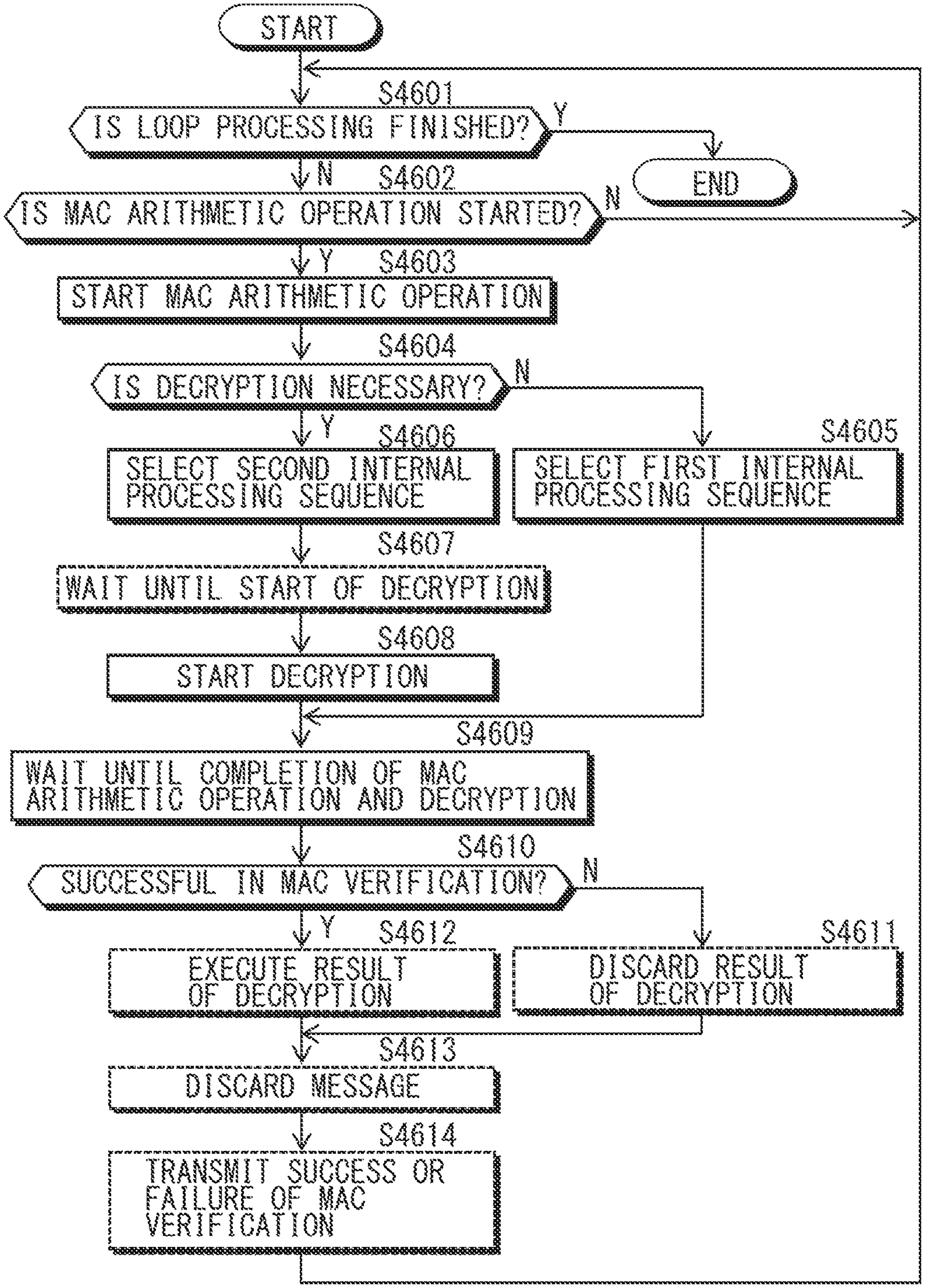

FIG. 275 is a flowchart describing an example of switching of an internal processing sequence.

Figure 276:
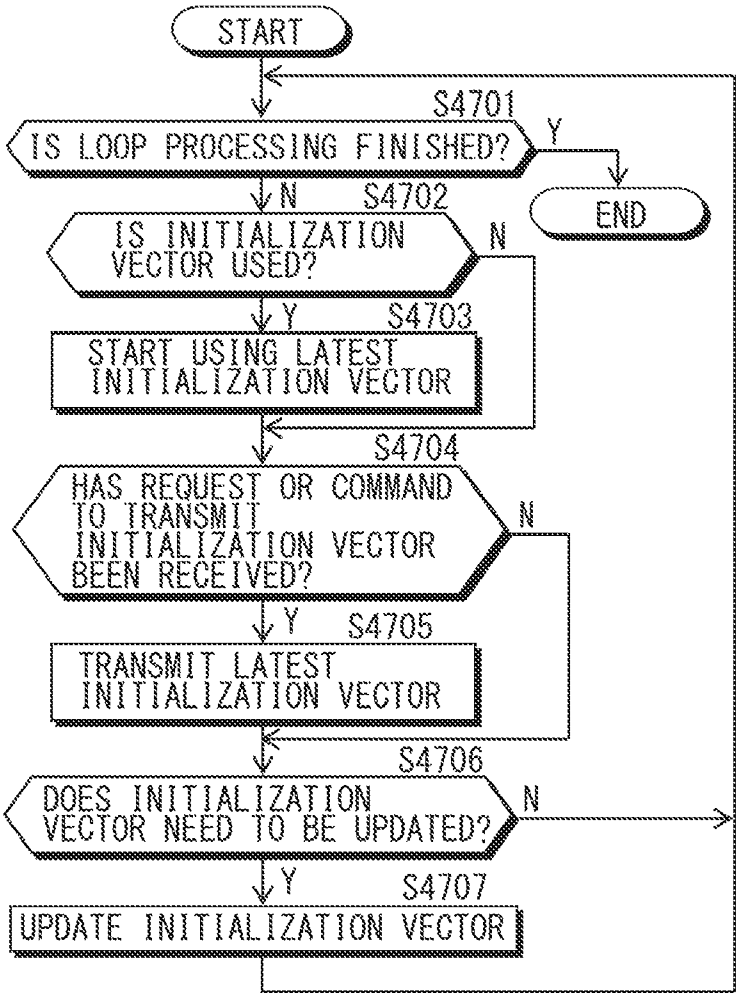

FIG. 276 is a flowchart describing an example of processing to notify an initialization vector.

Figure 277:
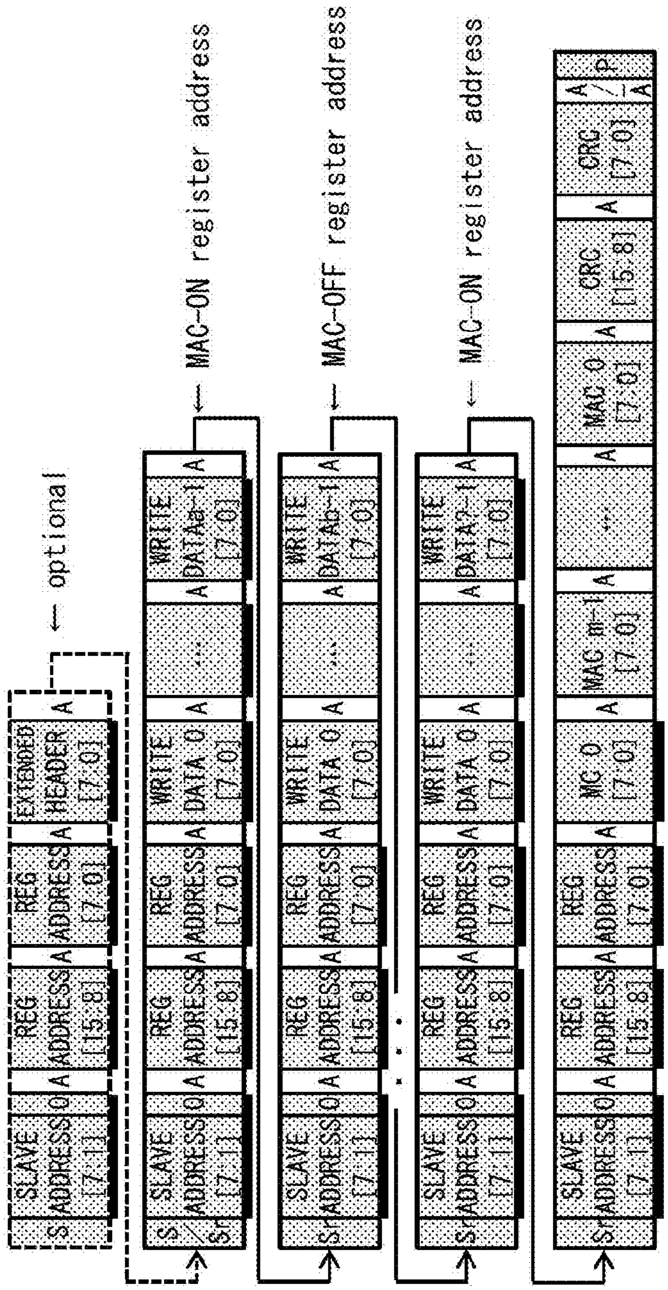

FIG. 277 is a diagram illustrating an example of a packet configuration of write data.

Figure 278:
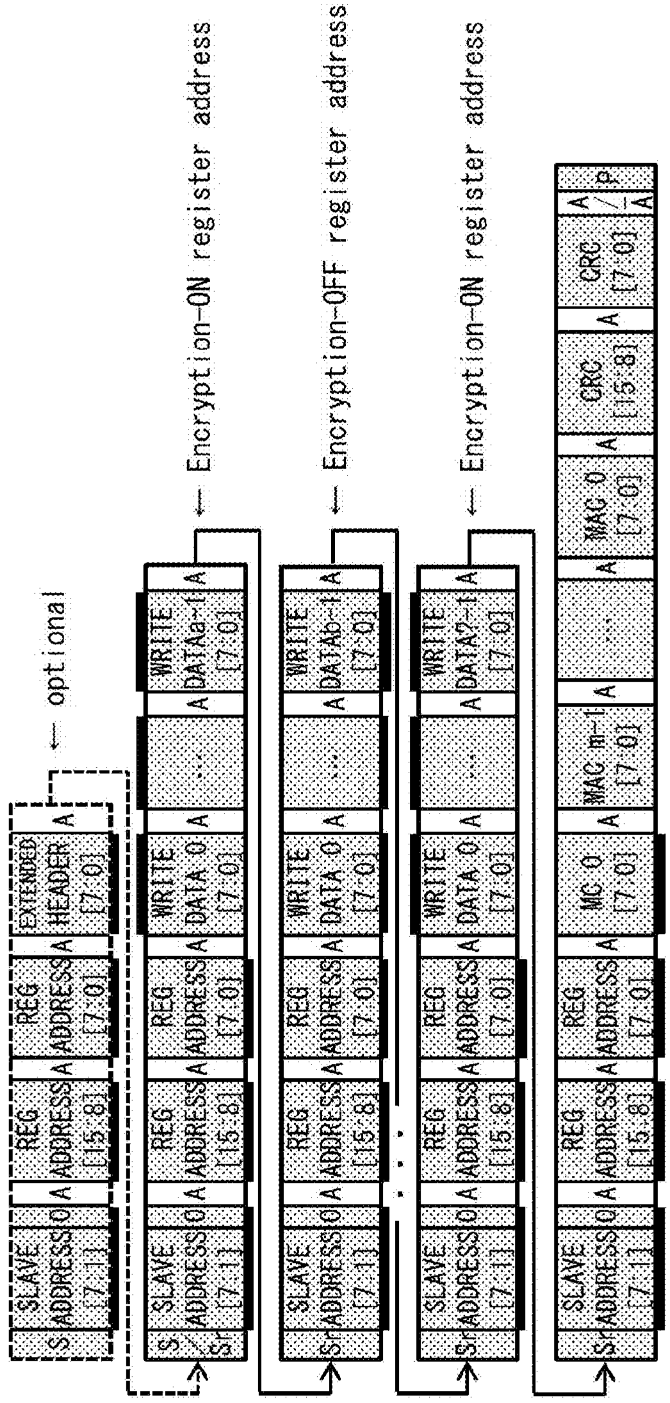

FIG. 278 is a diagram illustrating an example of a packet configuration of write data.

Figure 279:
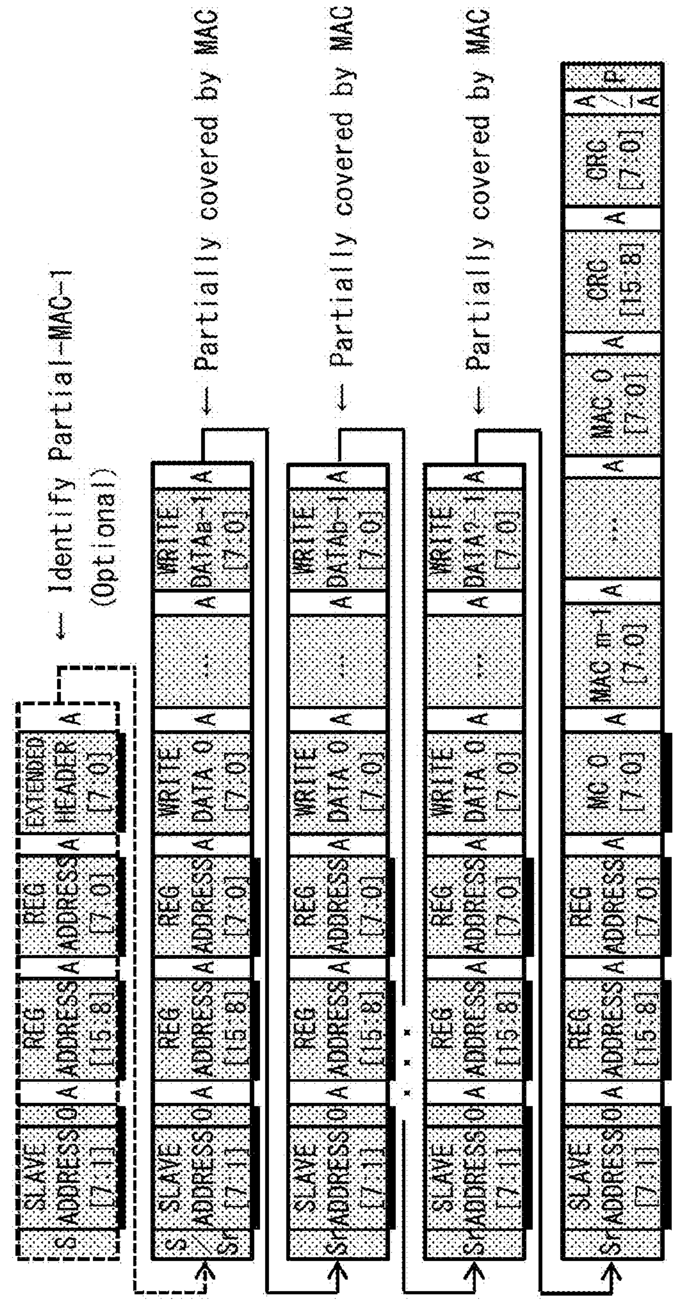

FIG. 279 is a diagram illustrating an example of a packet configuration of write data.

Figure 280:
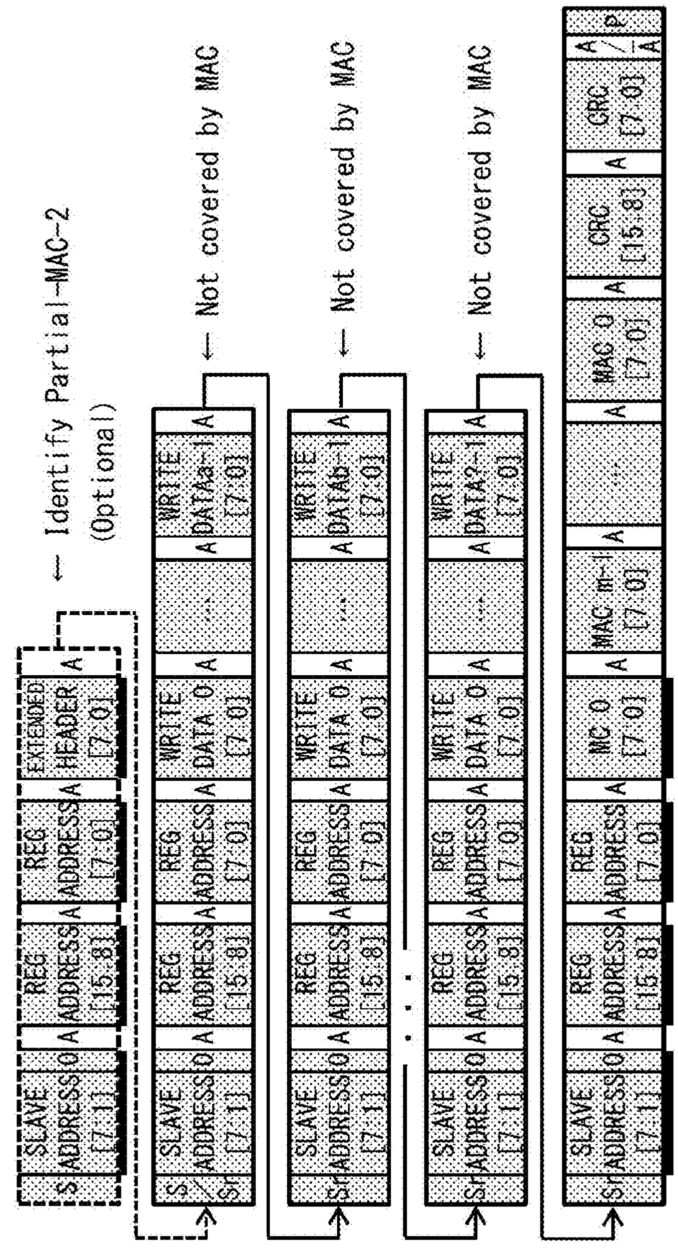

FIG. 280 is a diagram illustrating an example of a packet configuration of write data.

FIG. 281 is a diagram illustrating a setting example of Capability register.

FIG. 282 is a diagram illustrating a setting example of the Vendor defined SPDM message.

FIG. 283 is a diagram illustrating a setting example of EXTENDED HEADER.

Figure 284:
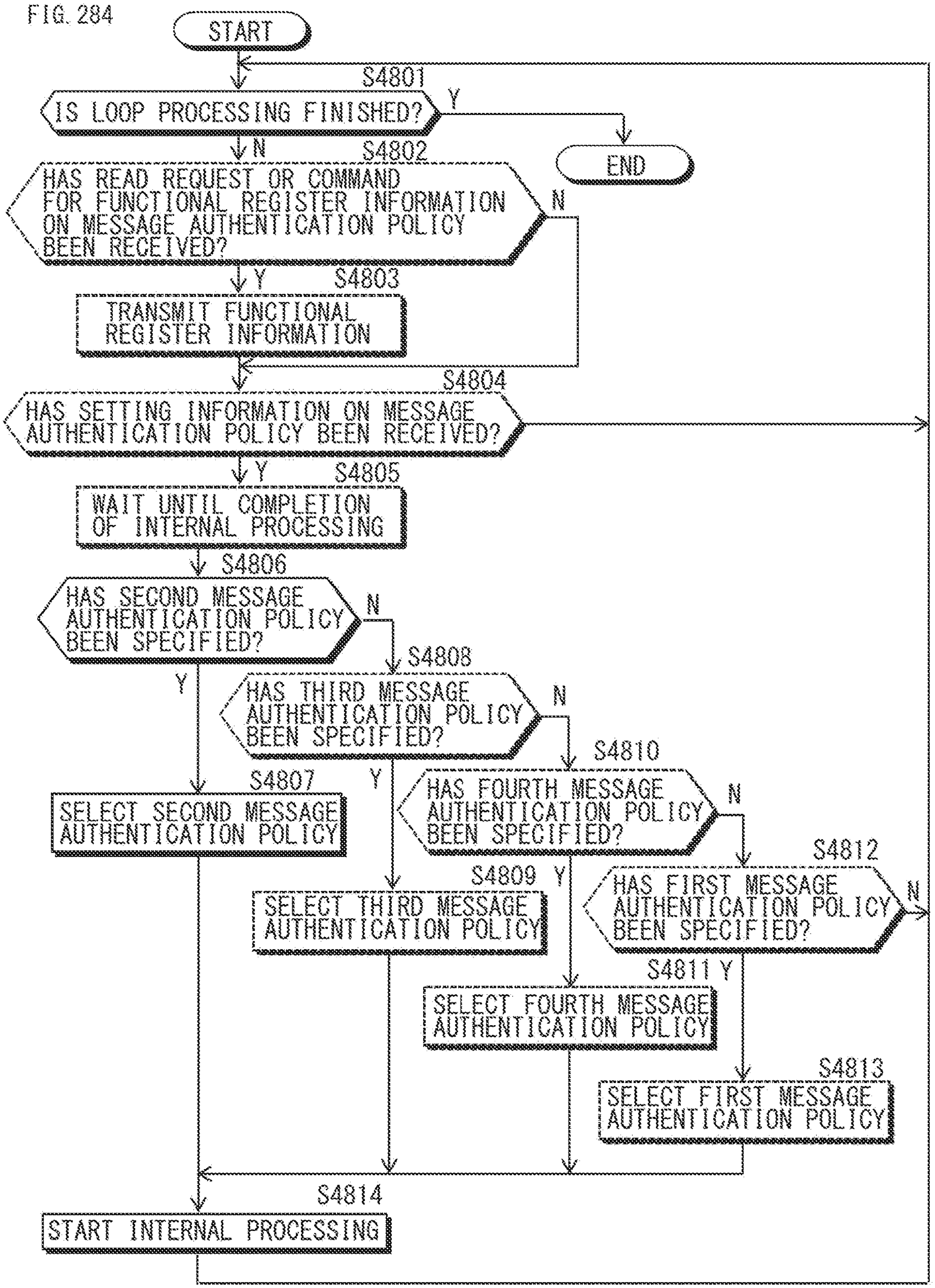

FIG. 284 is a flowchart describing an example of a message authentication procedure.

Figure 285:
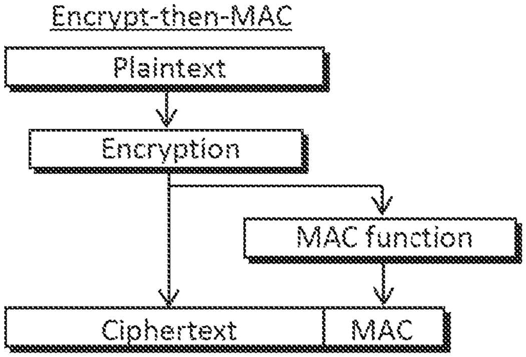

FIG. 285 is a diagram illustrating an example of a message authentication policy.

Figure 286:
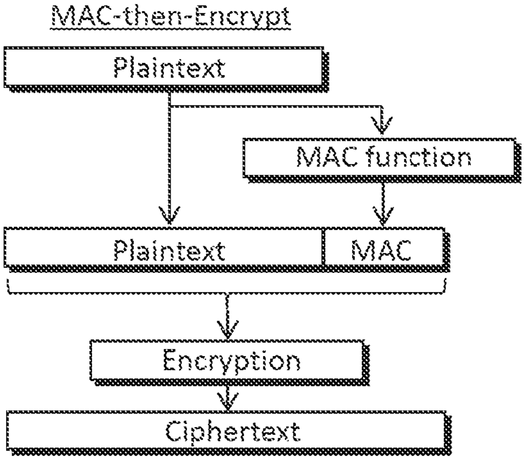

FIG. 286 is a diagram illustrating an example of the message authentication policy.

Figure 287:
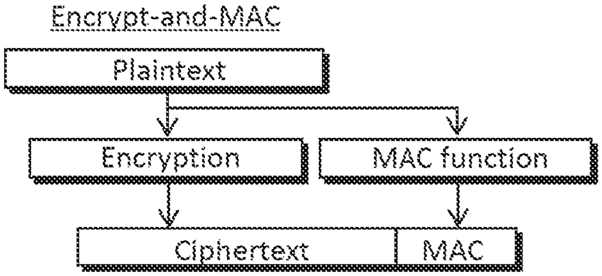

FIG. 287 is a diagram illustrating an example of the message authentication policy.

FIG. 288 is a diagram illustrating a setting example of Capability register.

FIG. 289 is a diagram illustrating a setting example of the Vendor defined SPDM message.

Figure 290:
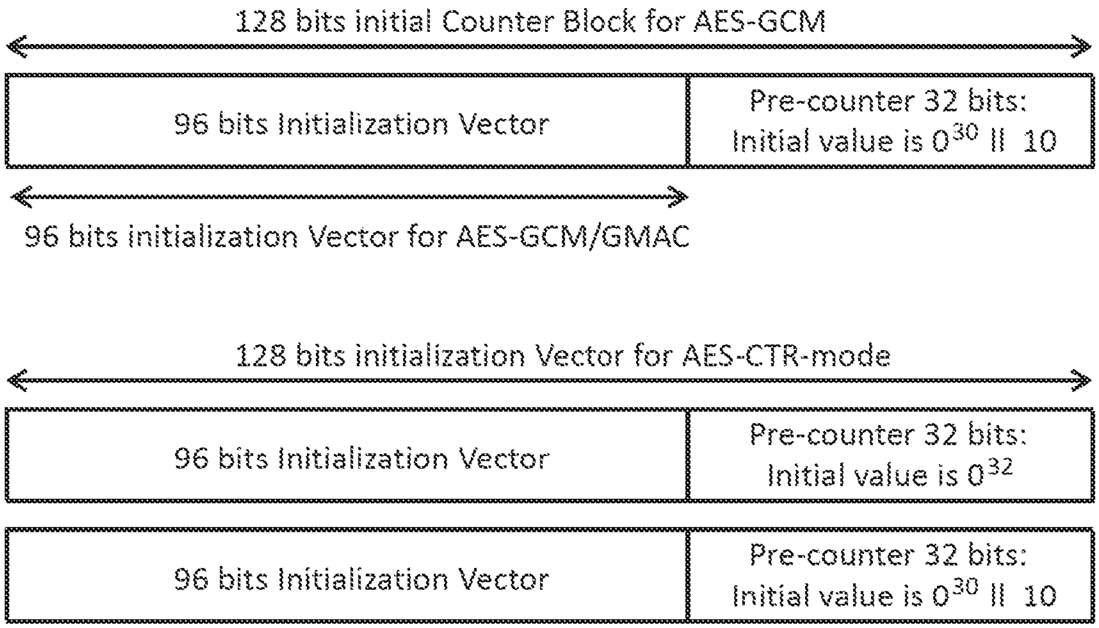

FIG. 290 is a diagram illustrating an example of initialization vectors.

Figure 291:
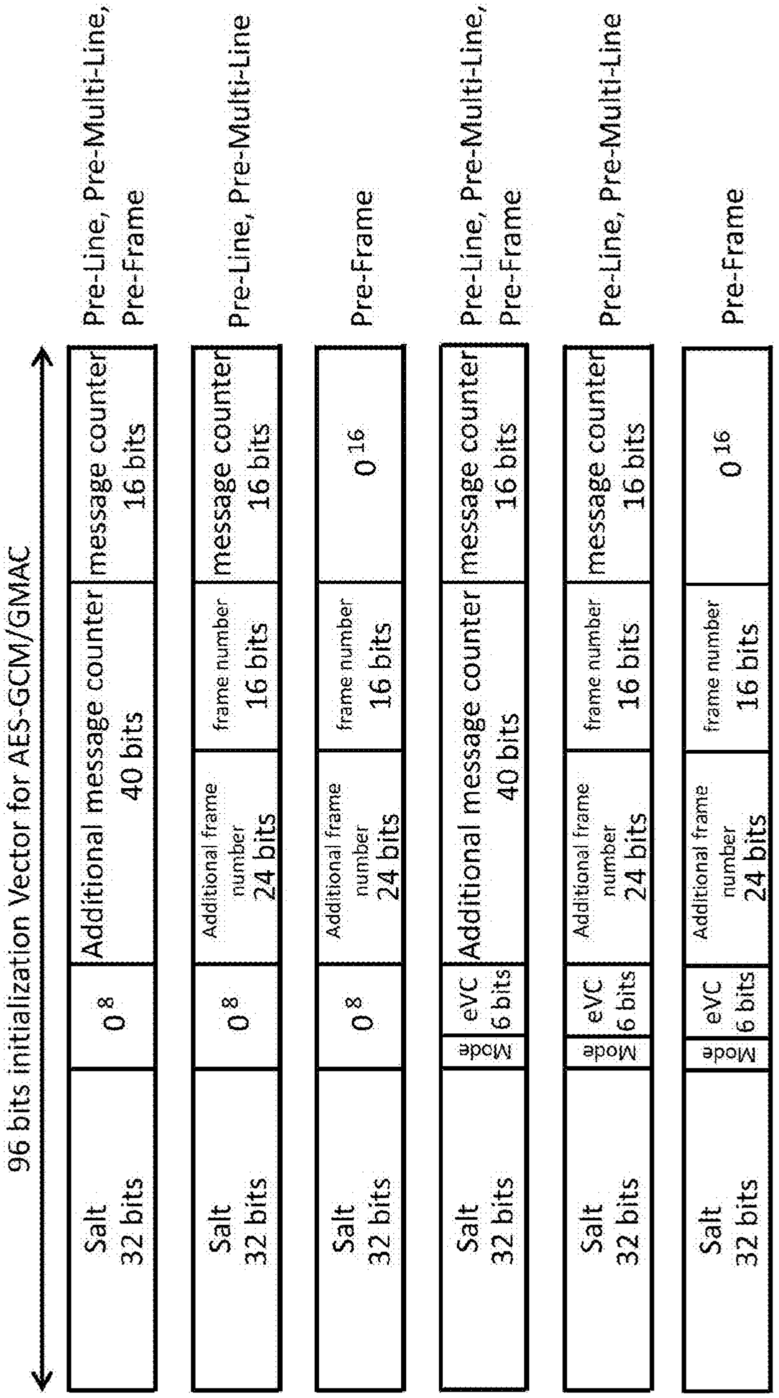

FIG. 291 is a diagram illustrating an example of initialization vectors.

FIG. 292 is a diagram illustrating an example of Mode in IV.

Figure 293:
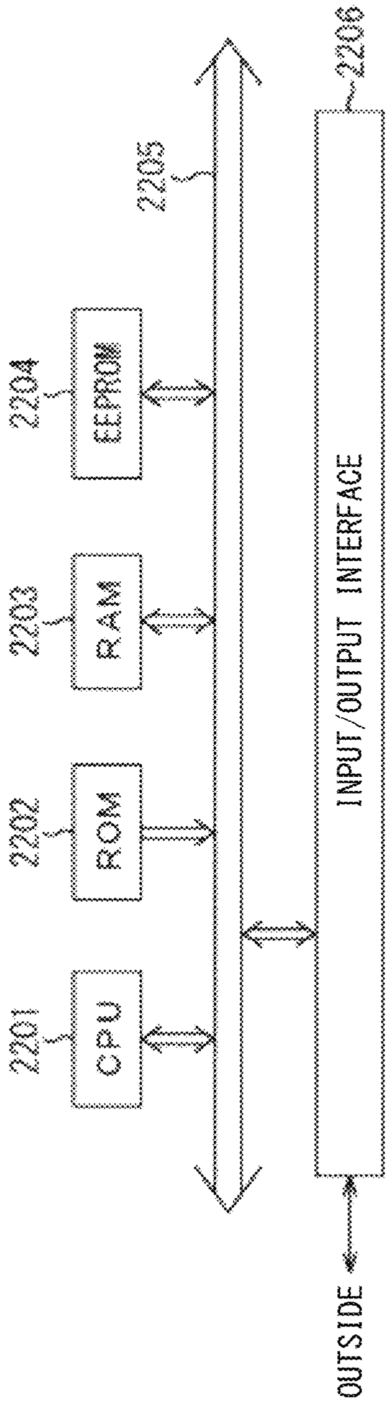

FIG. 293 is a block diagram illustrating a configuration example of an embodiment of a computer to which the present technology is applied.

MODES FOR CARRYING OUT THE INVENTION

Hereinafter, description is given in detail, with reference to the drawings, of specific embodiments to which the present technology is applied.

<Configuration Example of Communication System>

Figure 1:
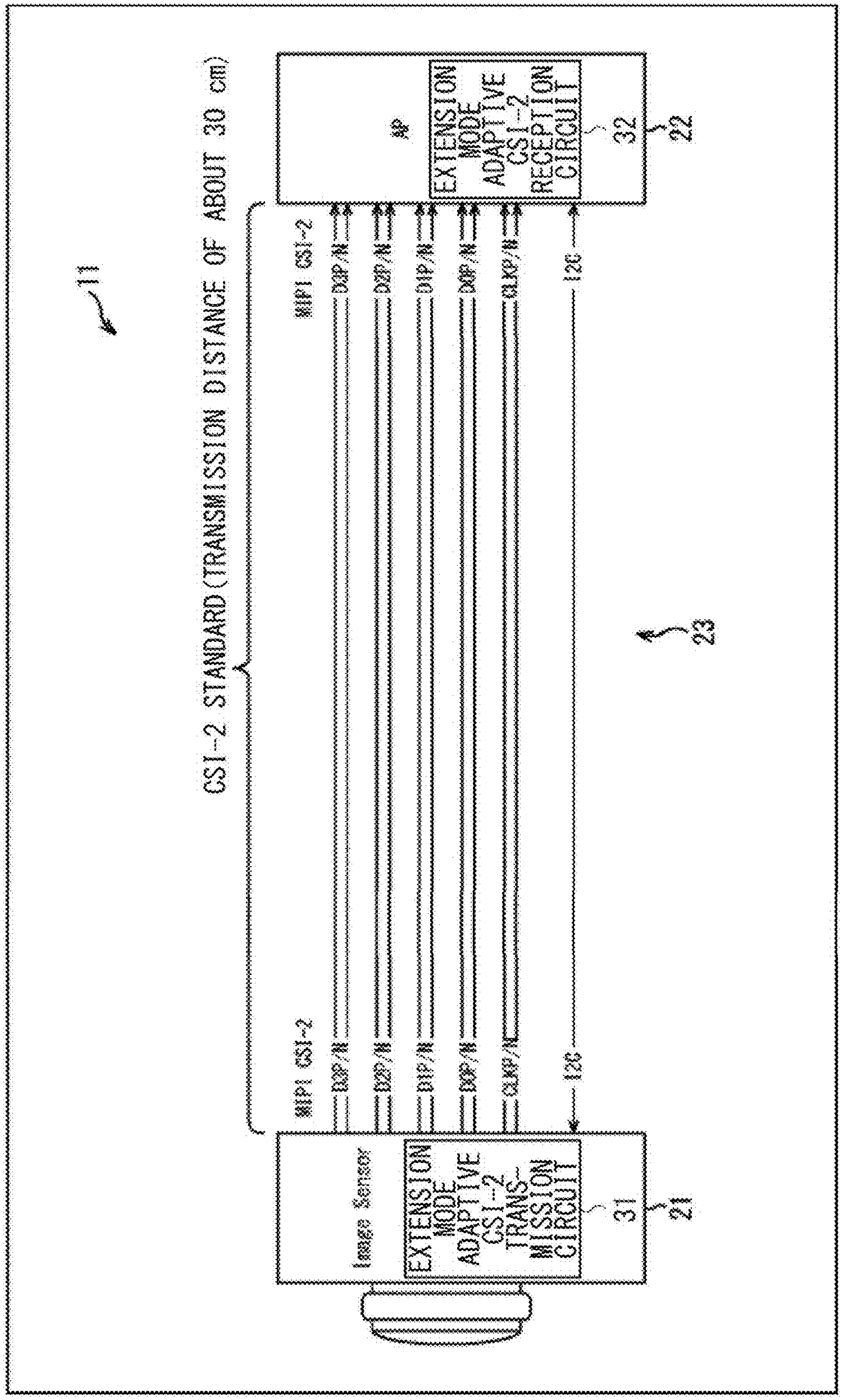
FIG. 1 is a block diagram illustrating a configuration example of a first embodiment of a communication system to which the present technology is applied.

FIG. 1 is a block diagram illustrating a configuration example of a first embodiment of a communication system to which the present technology is applied.

As illustrated in FIG. 1, a communication system 11 has a configuration in which an image sensor 21 and an application processor 22 are coupled to each other via a bus 23. For example, the communication system 11 is used for CSI-2 coupling inside an existing mobile device such as a so-called smartphone.

The image sensor 21 is configured by incorporating an extension mode adaptive CSI-2 transmission circuit 31, for example, together with a lens, an imaging element (neither of which is illustrated), and the like. For example, the image sensor 21 transmits image data of an image acquired by imaging of an imaging element to the application processor 22 by the extension mode adaptive CSI-2 transmission circuit 31.

The application processor 22 is configured by incorporating an extension mode adaptive CSI-2 reception circuit 32 together with LSI (Large Scale Integration). The LSI performs processing corresponding to various applications to be executed by a mobile device including the communication system 11. For example, the application processor 22 receives image data transmitted from the image sensor 21 by the extension mode adaptive CSI-2 reception circuit 32. For example, the application processor 22 performs, on the image data, processing corresponding to the application by the LSI.

The bus 23 is a communication path that transmits a signal in compliance with a CSI-2 standard. In the bus 23, for example, a transmission distance in which the signal is transmissible is about 30 cm. In addition, the bus 23 couples the image sensor 21 and the application processor 22 to each other by multiple signal lines (I2C, CLKP/N, D0P/N, D1P/N, D2P/N, and D3P/N) as illustrated.

The extension mode adaptive CSI-2 transmission circuit 31 and the extension mode adaptive CSI-2 reception circuit 32 are adaptive to communication in an extension mode in which the CSI-2 standard is extended, and are able to transmit and receive signals to and from each other. It is to be noted that description is given later, with reference to FIGS. 9 and 10, of detailed configurations of the extension mode adaptive CSI-2 transmission circuit 31 and the extension mode adaptive CSI-2 reception circuit 32.

Figure 2:
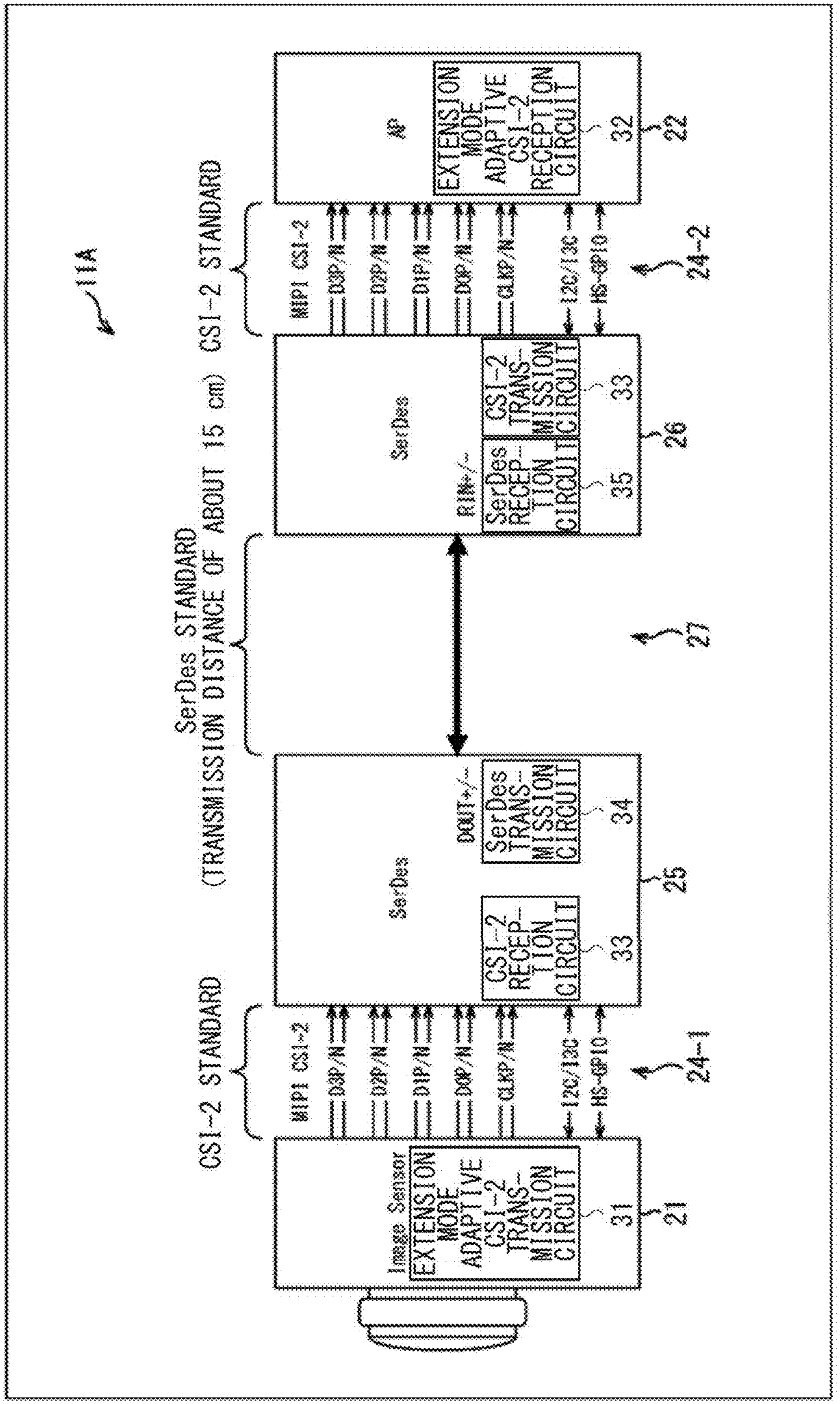
FIG. 2 is a diagram illustrating a configuration example of a second embodiment of the communication system to which the present technology is applied.

FIG. 2 is a block diagram illustrating a configuration example of a second embodiment of a communication system to which the present technology is applied.

As illustrated in FIG. 2, in the communication system 11A, the image sensor 21 and a SerDes device 25 are coupled to each other via a bus 24-1. In the communication system 11A, the application processor 22 and a SerDes device 26 are coupled to each other via a bus 24-2. In the communication system 11A, the SerDes device 25 and the SerDes device 26 are coupled to each other via a bus 27. For example, the communication system 11A is used for coupling in an existing in-vehicle camera.

Here, the image sensor 21 and the application processor 22 are configured in the same manner as the image sensor 21 and the application processor 22 in FIG. 1, and detailed descriptions thereof are omitted.

In the same manner as the bus 23 in FIG. 1, the buses 24-1 and 24-2 are each a communication path that transmits a signa in compliance with the CSI-2 standard, and include multiple signal lines (HS-GPIO, I2C/I3C, CLKP/N, D0P/N, D1P/N, D2P/N, and D3P/N) as illustrated.

The SerDes device 25 includes a CSI-2 reception circuit 33 and a SerDes (Serializer Deserializer) transmission circuit 34. For example, the SerDes device 25 acquires a bit parallel signal transmitted from the image sensor 21 by the CSI-2 reception circuit 33 performing communication in compliance with the normal CSI-2 standard with the extension mode adaptive CSI-2 transmission circuit 31. Then, the SerDes device 25 converts the acquired signal into a bit serial, and transmit the converted signal to the SerDes device 26 by a SerDes transmission circuit 34 communicating with a SerDes reception circuit 35 in one lane.

The SerDes device 26 includes the SerDes reception circuit 35 and a CSI-2 transmission circuit 36. For example, the SerDes device 26 acquires a bit serial signal transmitted by the SerDes reception circuit 35 communicating with the SerDes transmission circuit 34 in one lane. Then, the SerDes device 26 converts the acquired signal into a bit parallel, and transmits the converted signal to the application processor 22 by the CSI-2 transmission circuit 36 communicating with the extension mode adaptive CSI-2 reception circuit 32 in compliance with the normal CSI-2 standard.

The bus 27 is a communication path that transmits a signal in compliance with a standard such as an A-PHY or FPD (Flat Panel Display)-LINK III. In the bus 27, for example, a transmission distance in which a signal is transmissible is a long distance of about 15 m.

Such a long-distance transmissible physical layer interface enables the automotive industry to utilize advanced driving assistance system (ADAS), automated driving system (ADS), and another surround sensor application including a camera and an in-vehicle infotainment (I) display. MIPI A-PHY has an asymmetric data link layer (asymmetric upper layer) of point-to-point topology, and enables the same physical wiring line to be shared by high-speed data transmission, control data, and power. The MIPI A-PHY functions as a basis for an end-to-end system designed to simplify the integration of a camera, a sensor and a display, and, at the same time, also enables functional safety and security to be incorporated.

In the communication system 11 and 11A thus configured, the extension mode adaptive CSI-2 transmission circuit 31 and the extension mode adaptive CSI-2 reception circuit 32 are able to transmit and receive data in a packet having an extended packet structure as described later. This makes it possible to adapt to various applications, e.g., RAW24, Smart ROI (Region of Interest), GLD (Graceful Link Degradation), and the like, as described later.

<First Structure Example of Packet Structure>

Description is given, with reference to FIGS. 3 to 8, of a first structure example of a packet structure of a packet to be used in communication between the extension mode adaptive CSI-2 transmission circuit 31 and the extension mode adaptive CSI-2 reception circuit 32.

Figure 3:
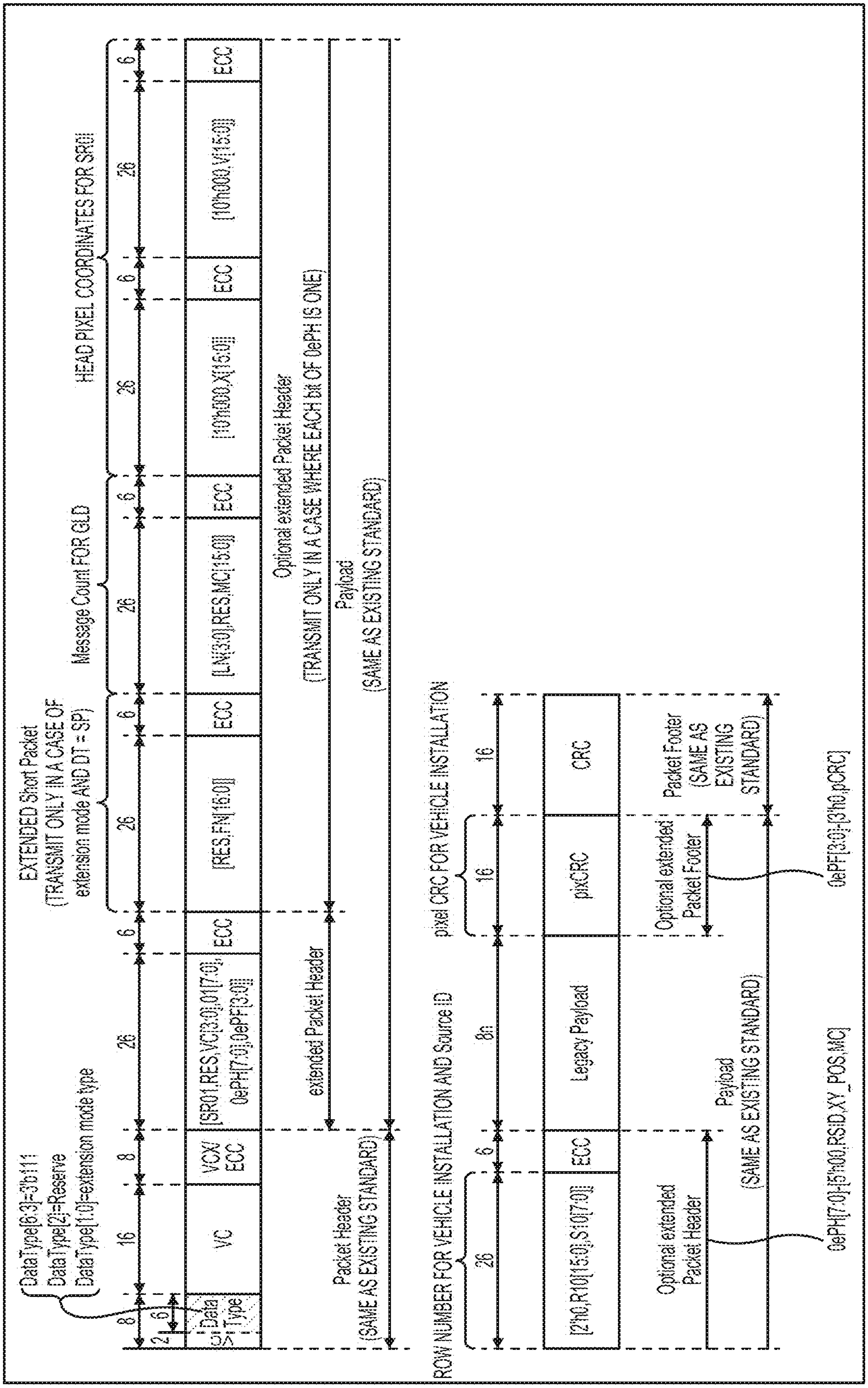
FIG. 3 is a diagram illustrating a first structure example of an overall packet structure of a D-PHY-oriented extended packet.

FIG. 3 illustrates an overall packet structure of a packet (hereinafter, referred to as a D-PHY-oriented extended packet) to be used in a CSI-2 extension mode in a case where the physical layer is a D-PHY.

As illustrated in FIG. 3, the D-PHY-oriented extended packet has a packet header and a packet footer which have the same packet structure as that of the existing CSI-2 standard. For example, the packet header stores VC (VirtualChannel) indicating the number of lines of a virtual channel, data type (DataType) indicating the type of data, and WC (Word Count) indicating the data length of payload, and VCX/ECC. In addition, the packet footer stores CRC (Cyclic Redundancy Check).

Here, in the existing CSI-2 standard, as for the data type to be transmitted in the packet header, 0x38 to x3F are defined as being reserved. Therefore, in the D-PHY-oriented extended packet, an existing data type being reserved is used to newly define setting information for identifying an extension mode on a reception side.

For example, in the case of DataType[5:3]=3'b111, extension mode/DataType[2]=Reserve (RES: Reserved for future extension)/DataType[1:0]=extension mode type (four extension modes prepared) is defined as the data type.

That is, among 0x38 to x3F of the data type defined as the reserve in the existing CSI-2 standard, for example, DataType[5:3] is defined as extension mode setting information, and DataType[1:0] is defined as extension type setting information. The extension mode setting information indicates whether or not the mode is an extension mode; for example, in a case where DataType[5:3] is 3'b111, the mode is indicated to be the extension mode. In addition, in a case where four types of extension mode 0, extension mode 1, extension mode 2, and extension mode 3 are prepared as the types of the extension mode, the extension type setting information indicates which of those types the type of the extension mode is. For example, in a case where DataType [1:0] is 2'b0, the type of the extension mode is indicated to be the extension mode 0.

In the extension mode 0 (DataType[1:0]=2'b00), for example, a packet structure in which the payload is separated into four is defined. That is, the payload in the extension mode 0 is, as illustrated in FIG. 3, separated into an extended packet header (ePH: extended Packet Header), an optional extended packet header (OePH: Optional extended Packet Header), a legacy payload (Legacy Payload), and an optional extended packet footer (OePF: Optional extended Packet Footer). It is to be noted that the extended packet header may be repeatedly transmitted.

The extended packet header is arranged at the head corresponding to a payload of the existing CSI-2 standard, and needs to be surely transmitted in the extension mode. For example, as illustrated, the extended packet header is configured by setting information such as SROI identification flag, extension VC (VirtualChannel), extension DataType, OePH selection flag, and OePF selection flag. Here, 4-bit VC in the existing CSI-2 standard is extended to 8 bits by the extension VC, and 4-bit DataType in the existing CSI-2 standard is extended to 8 bits by the extension DataType.

For example, in the D-PHY-oriented packet, there is already 4-bit VC of the existing packet header, and definition of the extension VC of the extended packet header as 4 bits allows for 8 bits in total. Specifically, it is possible to define as follows: OePH[7:0]={5' h00, RSID, XY_POS, MC}, OePF[3:0]={3'h0, pCRC}, thus making it possible to control ON/OFF of packet transmission necessary for each application.

The optional extended packet header and the optional extended packet footer are selectively transmitted depending on applications.

The legacy payload corresponds to the same payload as that in the existing CSI-2 standard.

In this manner, setting the extended packet header, the optional extended packet header, and the optional extended packet footer as needed makes it possible to transmit data corresponding to various applications. In addition, data transmitted by the extended packet header, the optional extended packet header, and the optional extended packet footer is ECC (Error Correction Code) of 26 bit+6 bit. This makes it possible to suppress an increase in circuit size by appropriating a circuit of an existing packet header and to achieve an improvement in error tolerance.

Figure 4:
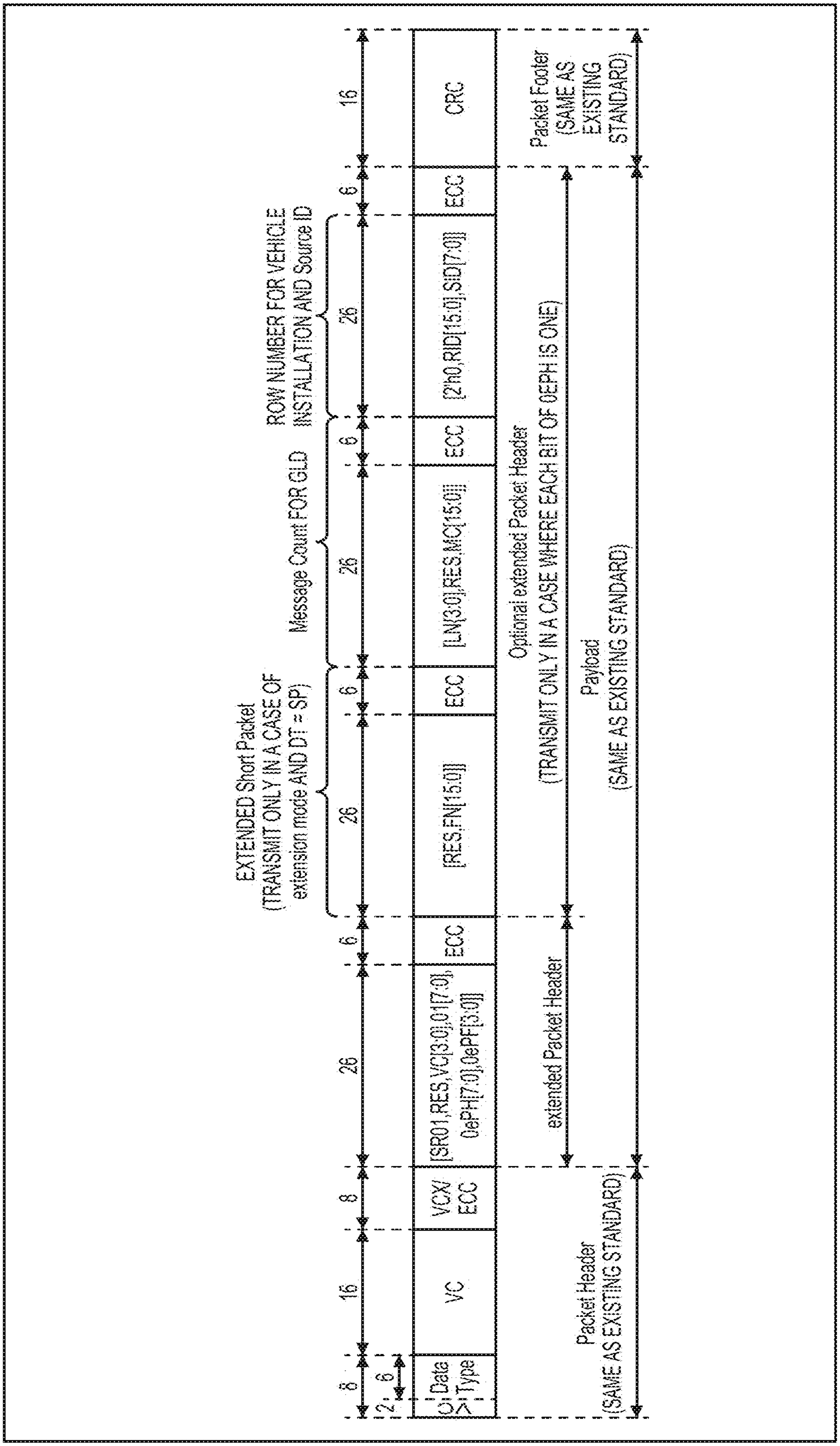
FIG. 4 is a diagram illustrating a first structure example of a packet structure of a D-PHY-oriented extended short packet.
Figure 5:
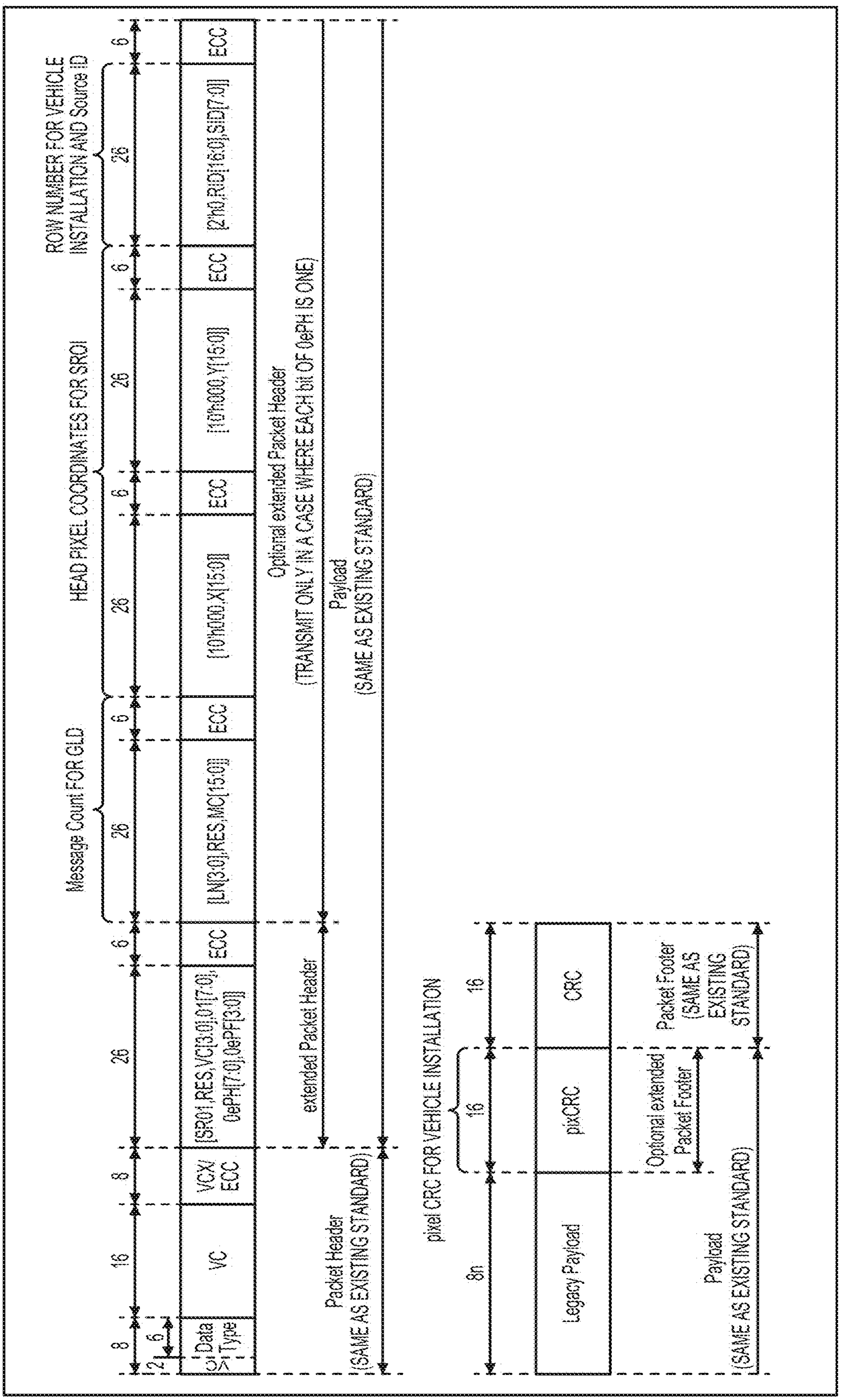
FIG. 5 is a diagram illustrating a first structure example of a packet structure of a D-PHY-oriented extended long packet.

FIG. 4 illustrates, as a specific application example of such a D-PHY-oriented extended packet, a packet structure of a short packet (hereinafter, referred to as a D-PHY-oriented extended short packet) to be used in the CSI-2 extension mode in a case where the physical layer is the D-PHY. Likewise, FIG. 5 illustrates a packet structure of along packet (hereinafter, referred to as a D-PHY-oriented extended long packet) to be used in the CSI-2 extension mode in a case where the physical layer is the D-PHY.

In the D-PHY-oriented extended short-packet as illustrated in FIG. 4, the extension type setting information of the data type stored in the packet header indicates that the type of the extension mode is the extension mode 0 (DT[5:0]=0x1C(5'b111_0_0)). In addition, short packet setting information of the data type stored in the extended packet header indicates a short packet (DT[7:0]=0x00 (Frame Start Code (Short Packet)).

In this manner, in a case of the extension mode and in a case where the data type stored in the extended packet header is DT[7:0]=0x00 to 0x0F, the extended short packet is used, and data including Short Packet Data Field of the extended short packet is surely transmitted to the optional extended packet header. This Short Packet Data Field is the same as that defined in the existing CSI-2 standard.

It is to be noted that when transmitting the extended short packet, MC (MessageCount for GLD) and RSID (row number for vehicle installation and Source ID) among the optional extended packet header may be transmitted; however, the legacy payload and the pCRC are unnecessary, and thus transmission thereof is prohibited. If the legacy payload and the pCRC are transmitted erroneously, they are ignored by the reception side.

In addition, the extended short packet of the packet structure as illustrated in FIG. 4 is able to extend the bit width of the virtual channel and the data type, as compared with the extended short packet in accordance with the existing CSI-2 standard, and thus is able to adapt to various applications defined by the optional extended packet header. In addition, in a case where these function are not necessary, the extended short packet in accordance with the existing CSI-2 standard may be transmitted together with the extended long packet.

In the D-PHY-oriented extended long packet as illustrated in FIG. 5, the extension type setting information of the data type stored in the packet header indicates that the type of the extension mode is the extension mode 0 (DT[5:0]=0x1C (5'b111_0_0)). In addition, the short packet setting information of the data type stored in the extended packet header indicates one other than the short packet (DT[7:0] is one other than 0x00 to 0x0F (=extended LongPackt)). Accordingly, in the extended long packet, data including the Short Packet Data Field is not transmitted.

In addition, in accordance with the setting of the extended packet header, the optional extended packet header, the legacy payload, and the optional extended packet footer are stored in the payload in the existing CSI-2 standard for transmission. As described above, they are stored in the existing payload for transmission, and thus are recognized by the existing SerDes transmission circuit 34 and SerDes reception circuit 35 (FIG. 2) in the same manner as image data transmitted by the existing payload and transmitted as they are to a subsequent stage.

Then, the application processor 22 of the final stage is able to be determined to be the extension mode by the data type DT[5:0] of the packet header. Thus, the application processor 22 is able to interpret contents of the payload in order from the extended packet header and to retrieve data of a desired extension mode.

Figure 6:
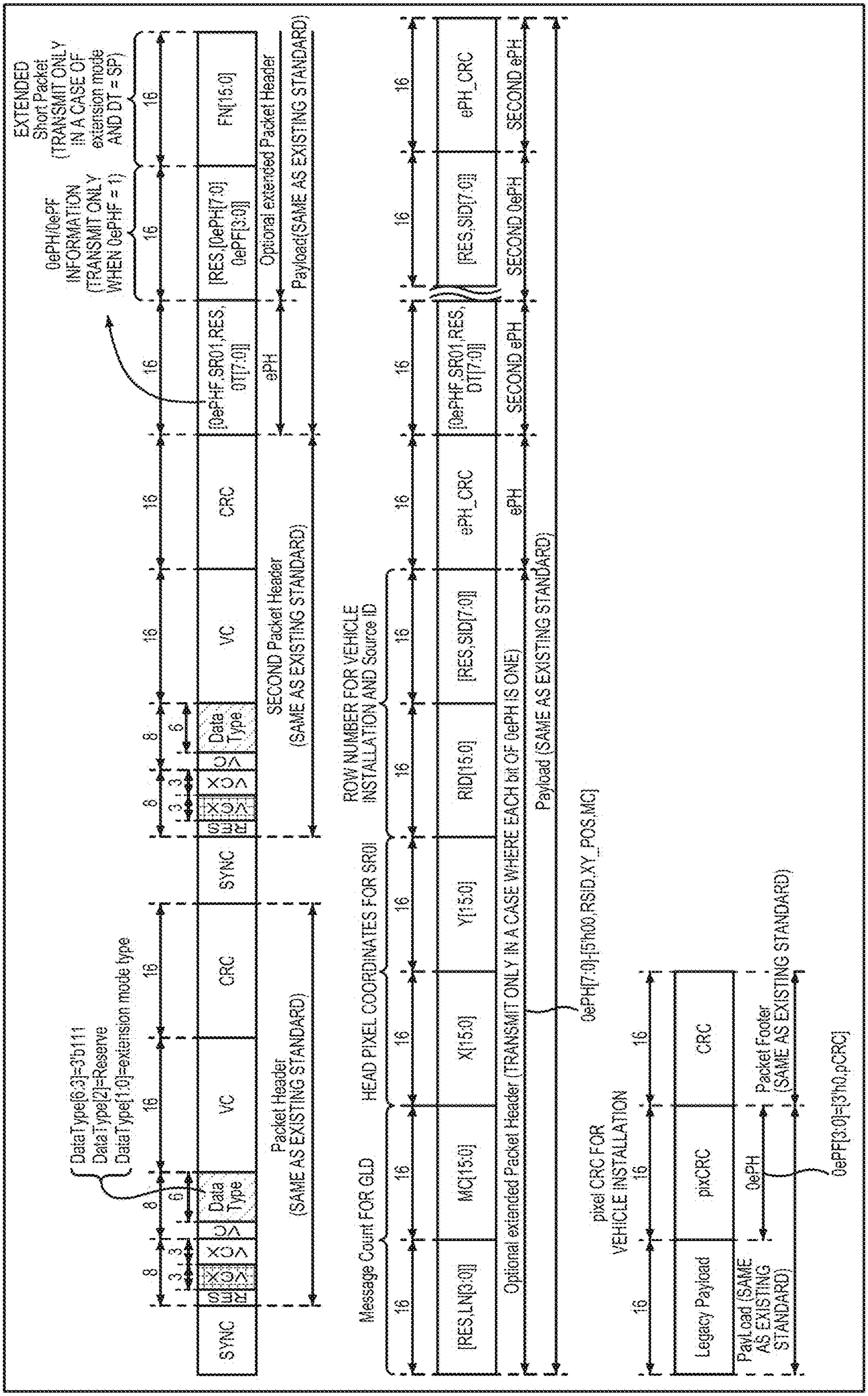
FIG. 6 is a diagram illustrating a first structure example of an overall packet structure of a C-PHY-oriented extended packet.

FIG. 6 illustrates an overall packet structure of a packet (hereinafter, referred to as a C-PHY-oriented extended packet) to be used in the CSI-2 extension mode in a case where the physical layer is the C-PHY. It is to be noted that, in the C-PHY-oriented extended packet illustrated in FIG. 6, description is omitted for the configurations common to those of the D-PHY-oriented extended packet in FIG. 3, and description is given of different configurations.

For example, in the C-PHY-oriented extended packet, in the same manner as the D-PHY-oriented extended packet in FIG. 3, the extension mode is identified by the data type, and all pieces of data corresponding to respective applications to be executed by the application processor 22 are embedded in the payload for transmission.

As illustrated in FIG. 6, in the same manner as a C-PHY-oriented packet in accordance with the existing CSI-2 standard, the C-PHY-oriented extended packet transmits a packet header twice, and arranges pieces of data in the unit of 16 bits for convenience of the C-PHY converting 16 bits into 7 symbols. In addition, the extended packet header is arranged at the head of the payload. However, as for the virtual channel, the head of the existing extended packet header is Reserve because thereof in the case of the C-PHY, and thus the virtual channel is not stored in the extended packet header. It is needless to say that the virtual channel may be stored in the extended packet header in the same manner as the D-PHY-oriented extended packet.

In addition, the optional extended packet header and the optional extended packet footer have a number of bits, and thus a flag of OePHF is prepared; in a case where this flag is one, OePH/OePF information is transmitted next. Then, after ePH information and OePH information, CRC is transmitted as the extended packet header, and a packet header configured in the same manner is repeatedly transmitted twice. In this manner, by employing a structure the same as that of the mechanism of transmitting the existing packet header twice, it is possible to achieve both circuit reusability and error tolerance.

Figure 7:
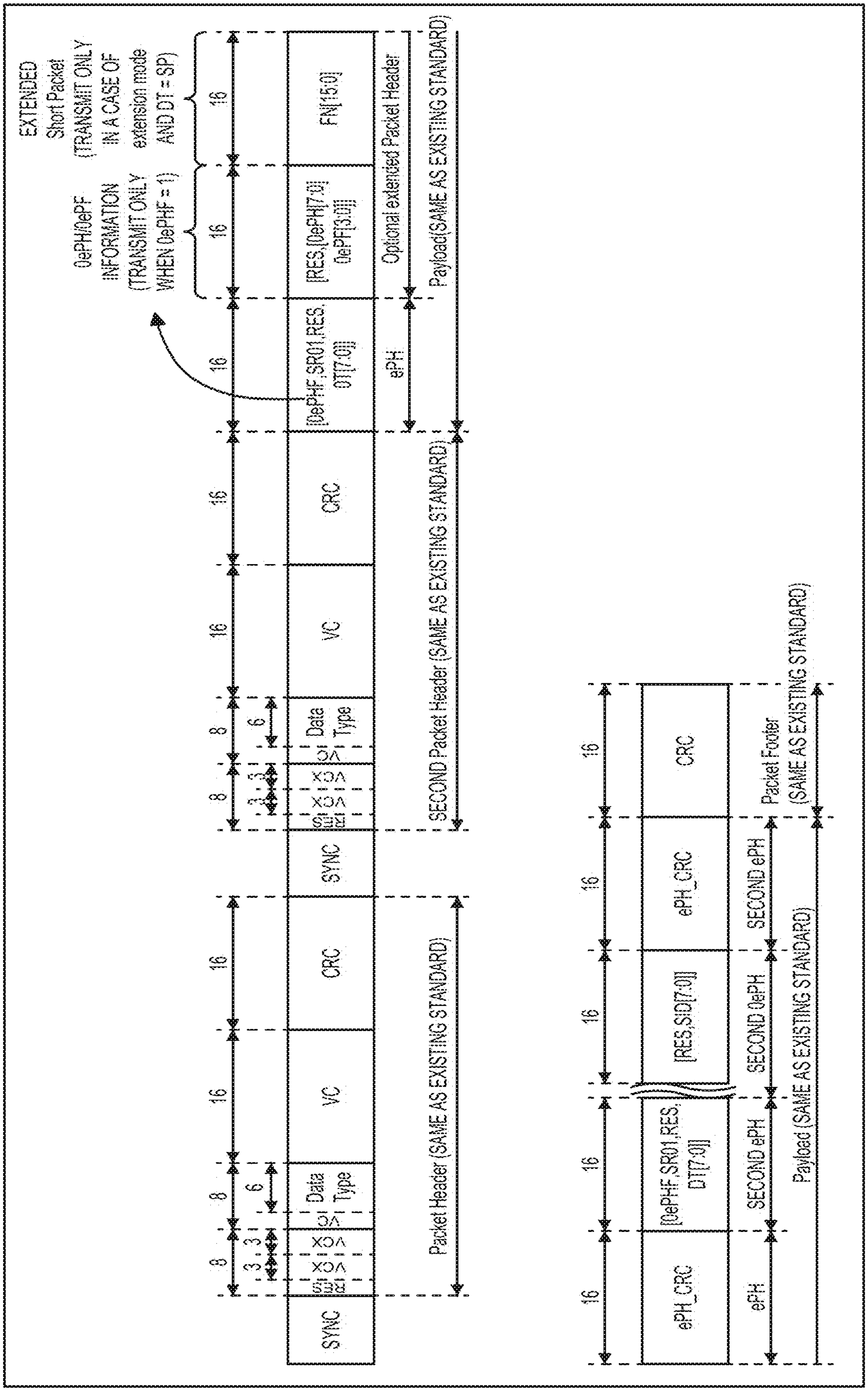
FIG. 7 is a diagram illustrating a first structure example of a packet structure of a C-PHY-oriented extended short packet.

FIG. 7 illustrates, as a specific application example of such a C-PHY-oriented extended packet, a packet structure of a short packet (hereinafter, referred to as a C-PHY-oriented extended short packet) to be used in the CSI-2 extension mode in a case where the physical layer is the C-PHY. Likewise, FIG. 8 illustrates a packet structure of along packet (hereinafter, referred to as a C-PHY-oriented extended long packet) to be used in the CSI-2 extension mode in a case where the physical layer is the C-PHY.

Figure 8:
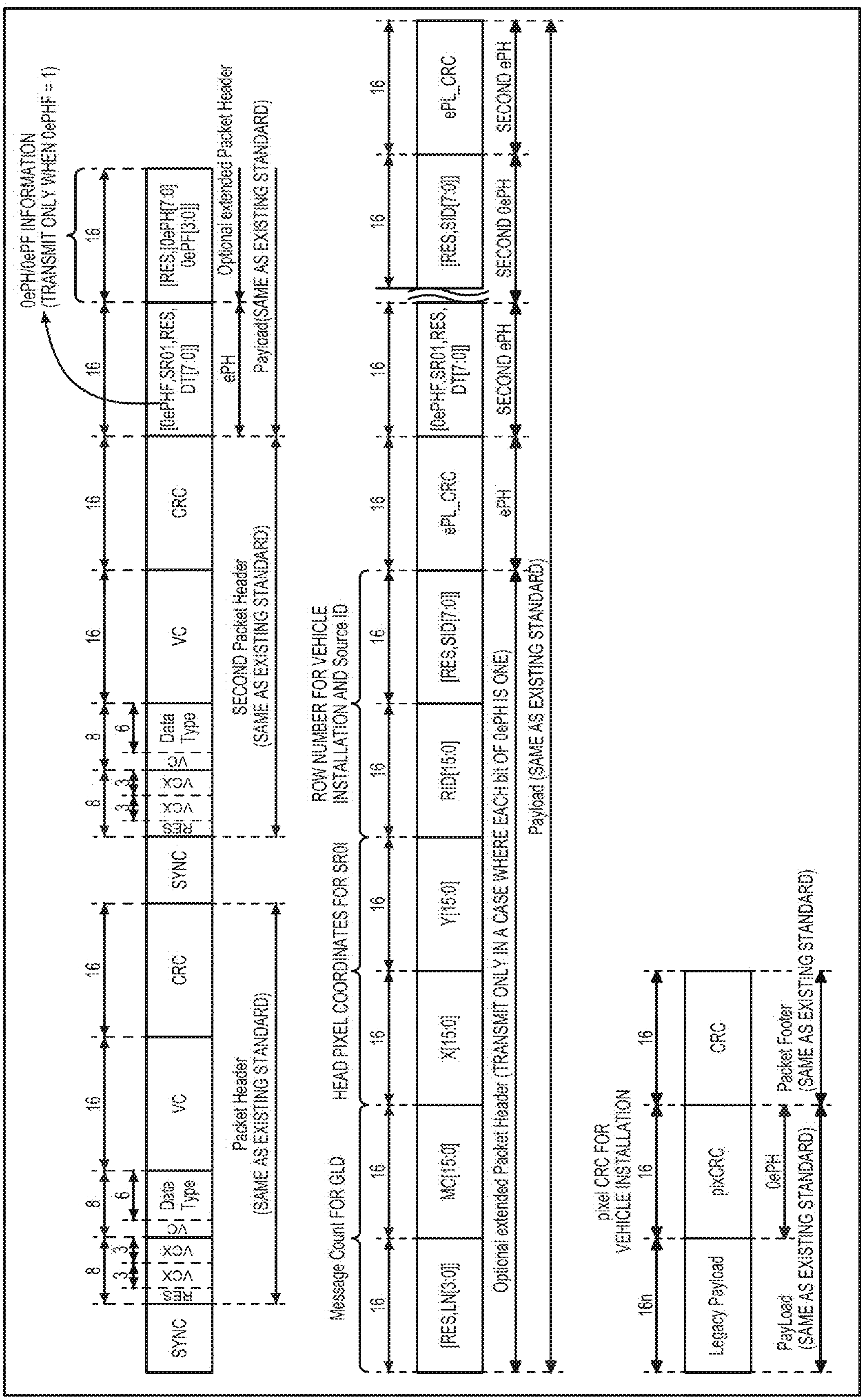
FIG. 8 is a diagram illustrating a first structure example of a packet structure of a C-PHY-oriented extended long packet.

It is to be noted that there is no major difference, in the packet structure, between the C-PHY-oriented extended short packet illustrated in FIG. 7 and the D-PHY-oriented extended short packet illustrated in FIG. 4 and that there is no major difference, in the packet structure, between the C-PHY-oriented extended long packet illustrated in FIG. 8 and the D-PHY-oriented extended long packet illustrated in FIG. 5.

<Configuration Examples of Image Sensor and Application Processor>

(Configuration Example of Image Sensor)

Figure 9:
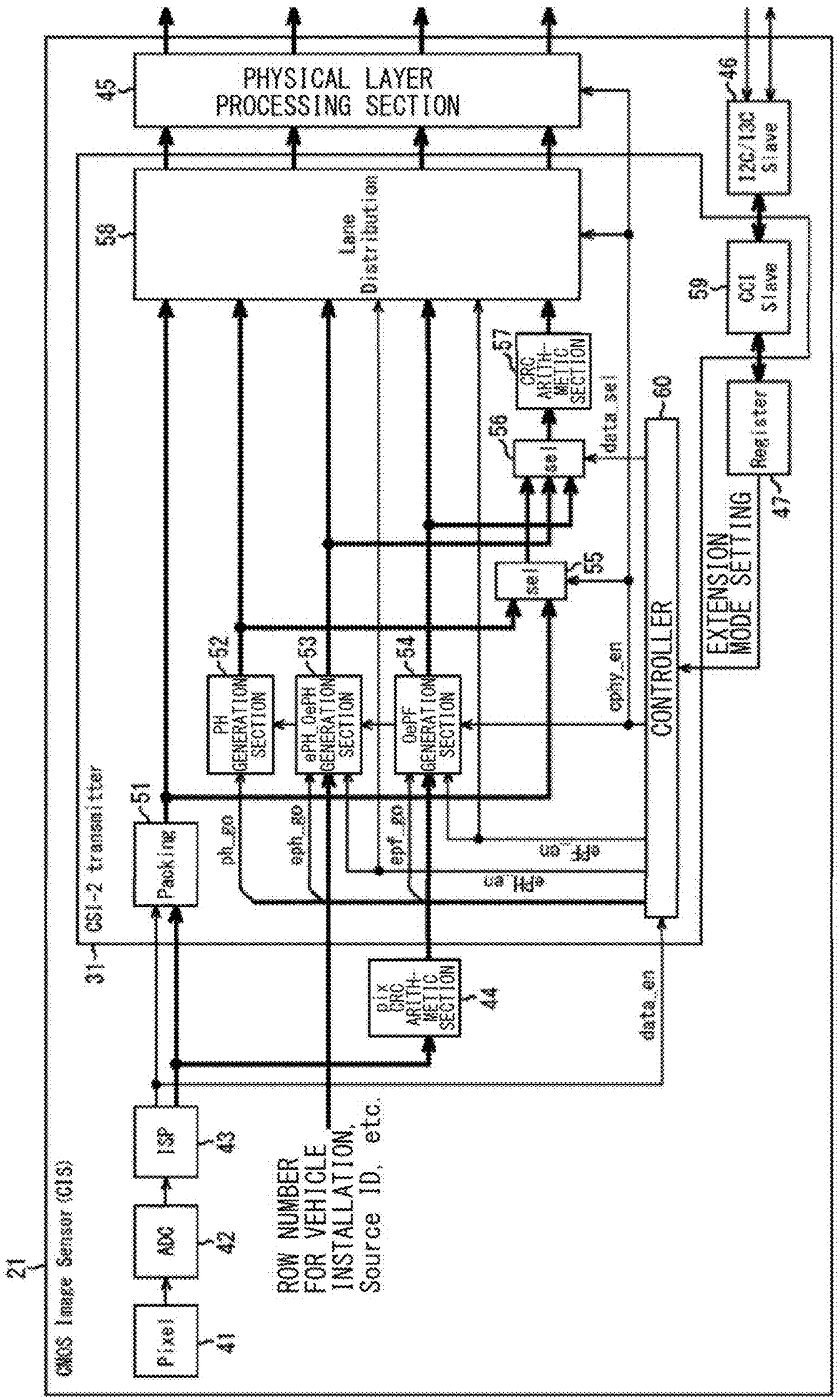
FIG. 9 is a block diagram illustrating a configuration example of an image sensor.

FIG. 9 is a block diagram illustrating a configuration example of the image sensor 21 including the extension mode adaptive CSI-2 transmission circuit 31.

As illustrated in FIG. 9, the image sensor 21 includes, in addition to the extension mode adaptive CSI-2 transmission circuit 31, a pixel 41, an AD converter 42, an image processing section 43, a pixel CRC arithmetic section 44, a physical layer processing section 45, an I2C/I3C slave 46, and a register 47. In addition, the extension mode adaptive CSI-2 transmission circuit 31 includes a packing section 51, a packet header generation section 52, an extended packet header generation section 53, an extended packet footer generation section 54, selection sections 55 and 56, a CRC arithmetic section 57, a lane distribution section 58, a CCI slave 59, and a controller 60.

The pixel 41 outputs an analog pixel signal corresponding to the light amount of received light, and the AD converter (ADC: Analog-to-Digital Converter) 42 digitally converts a pixel signal outputted from the pixel 41 and supplies the pixel signal to the image processing section 43. The image processing section (ISP: Image Signal Processor) 43 supplies the pixel CRC arithmetic section 44 and the packing section 51 with image data obtained by performing various types of image processing on an image based on the pixel signal. In addition, the image processing section 43 supplies the packing section 51 and the controller 60 with data enable signal data_en indicating whether or not the image data is effective The pixel CRC arithmetic section 44 obtains, by an arithmetic operation, CRC for each pixel in image data supplied from the image processing section 43, and supplies the CRC to the extended packet footer generation section 54.

The physical layer processing section 45 is able to execute processing on both physical layers of the C-PHY and the D-PHY. For example, the physical layer processing section 45 executes the processing on the physical layer of the C-PHY in a case where a C-layer enable signal cphy_en is effective, and executes the processing on the physical layer of the D-PHY in a case where the C-layer enable signal cphy_en is ineffective. Then, the physical layer processing section 45 transmits packets divided into four lanes by the lane distribution section 58 to the application processor 22.

The I2C/I3C slave 46 performs communication under the initiative of an I2C/I3C master 72 (FIG. 10) of the application processor 22 on the basis of the standard of I2C (Inter-Integrated Circuit) or I3C (Improved Inter Integrated Circuits).

Various settings transmitted from the application processor 22 are written into the register 47 via the I2C/I3C slave 46 and the CCI slave 59. Here, examples of the setting to be written into the register 47 include a communication setting in compliance with the CSI-2 standard, an extension mode setting indicating the presence or absence of use of the extension mode, and a fixed communication setting necessary for communication in the extension mode.

The packing section 51 performs packing processing to store image data supplied from the image processing section 43 in the payload of the packet, and supplies the payload to the selection section 55 and the lane distribution section 58.

When receiving an instruction on generation of a packet header in accordance with a packet header generation instruction signal ph_go supplied from the controller 60, the packet header generation section 52 generates a packet header, and supplies the packet header to the selection section 55 and the lane distribution section 58.

That is, the packet header generation section 52 generates, in accordance with the existing CSI-2 standard, setting information indicating a set condition for data to be transmitted in a packet, e.g., a packet header storing a data type indicating the type of data. In addition, the packet header generation section 52 stores the extension mode setting information indicating whether or not the extension mode using an extended header is employed, in an unused region defined as being unused in the existing CSI-2 standard in the data type which is the setting information indicating the type of data to be transmitted in the packet. Further, the packet header generation section 52 stores, in the unused region, extension type setting information indicating which type it is among multiple types of extension modes prepared as the extension mode.

In accordance with an extended packet header generation instruction signal eph_go and an extended packet header enable signal ePH_en supplied from the controller 60, the extended packet header generation section 53 generates the extended packet header and the optional extended packet header, respectively, and supplies them to a selection section 56 and the lane distribution section 58. In addition, depending on the application of the image sensor 21, the extended packet header generation section 53 is supplied with a row number for vehicle installation, a source ID (identification), and the like, which are stored in the extended packet header or the optional extended packet header as needed.

That is, the extended packet header generation section 53 generates, aside from the packet header generated by the packet header generation section 52, the extended packet header that stores setting information as illustrated in FIG. 3, for example. Further, in a case of transmitting the optional extended packet header, the extended packet header generation section 53 stores, in the extended packet header, optional extended packet header setting information indicating transmission of the optional extended packet header, as optional extended packet header setting information (OePH[7:0]) indicating whether or not to transmit the optional extended packet header, and generates the optional extended packet header subsequent to the extended packet header.

In accordance with an extended packet footer generation instruction signal epf_go and an extended packet header enable signal ePF_en supplied from the controller 60, the extended packet footer generation section 54 generates the optional extended packet footer, and supplies it to the selection section 56 and the lane distribution section 58.

That is, in a case where the packet to be transmitted in the extension mode is an extended long packet that stores data to be transmitted as a payload in the existing CSI-2 standard, the extended packet footer generation section 54 generates the optional extended packet footer to be arranged subsequent to the legacy payload in which the data is stored.

In addition, the packet header generation section 52, the extended packet header generation section 53, and the extended packet footer generation section 54 are supplied with the C-layer enable signal cphy_en from the controller 60. Then, in a case where it is indicated that the C-layer enable signal cphy_en is effective, the packet header generation section 52 generates a C-PHY-oriented packet header; the extended packet header generation section 53 generates a C-PHY-oriented extended packet header and an optional extended packet header; and the extended packet footer generation section 54 generates a C-PHY optional extended packet footer. Meanwhile, in a case where it is indicated that the C-layer enable signal cphy_en is ineffective, the packet header generation section 52 generates a D-PHY-oriented packet header; the extended packet header generation section 53 generates D-PHY-oriented extended packet header and an optional extended packet header; and the extended packet footer generation section 54 generates a D-PHY optional extended packet footer.

In a case where the C-layer enable signal cphy_en is effective, in accordance with the C-layer enable signal cphy_en supplied from the controller 60, the selection section 55 selects a packet header supplied from the packet header generation section 52, and supplies it to the selection section 56. Meanwhile, in a case where the C-layer enable signal cphy_en is ineffective, the selection section 55 selects a payload supplied from the packing section 51, and supplies it to the selection section 56.

In accordance with a data selection signal data_sel supplied from the controller 60, the selection section 56 selects one of a packet header or a payload selectively supplied via the selection section 55, an extended packet header and an optional extended packet header supplied from the extended packet header generation section 53, and an optional extended packet footer supplied from the extended packet footer generation section 54, and supplies the selected one to the CRC arithmetic section 57.

The CRC arithmetic section 57 determines, by an arithmetic operation, CRC of a packet header, payload, extended packet header, optional extended packet header, or optional extended packet footer selectively supplied via the selection section 56, and supplies the CRC to the lane distribution section 58.

Under the control of the controller 60, the lane distribution section 58 distributes the payload supplied from the packing section 51, the packet header supplied from the packet header generation section 52, the packet header supplied from the packet header generation section 52, the extended packet header and the optional extended packet header supplied from the extended packet header generation section 53, the optional extended packet footer supplied from the extended packet footer generation section 54, and the CRC supplied from the CRC arithmetic section 57 to four lanes in accordance with the CSI-2 standard, and supplies them to the physical layer processing section 45.

The CCI (Camera Control Interface) slave 59 performs communication under the initiative of a CCI master 88 (FIG. 10) of the application processor 22 on the basis of the CSI-2 standard.

The controller 60 reads various settings stored in the register 47, and controls each block of the extension mode adaptive CSI-2 transmission circuit 31 in accordance with the settings. For example, depending on the content of data to be transmitted, the controller 60 controls switching between transmission of a packet of a packet structure in accordance with the existing CSI-2 standard and transmission of a packet of a packet structure during the extension mode.

The image sensor 21 is thus configured, and is able to generate an extended packet of the packet structure as described with reference to FIGS. 3 to 8 for transmission to the application processor 22.

(Configuration Example of Application Processor)

Figure 10:
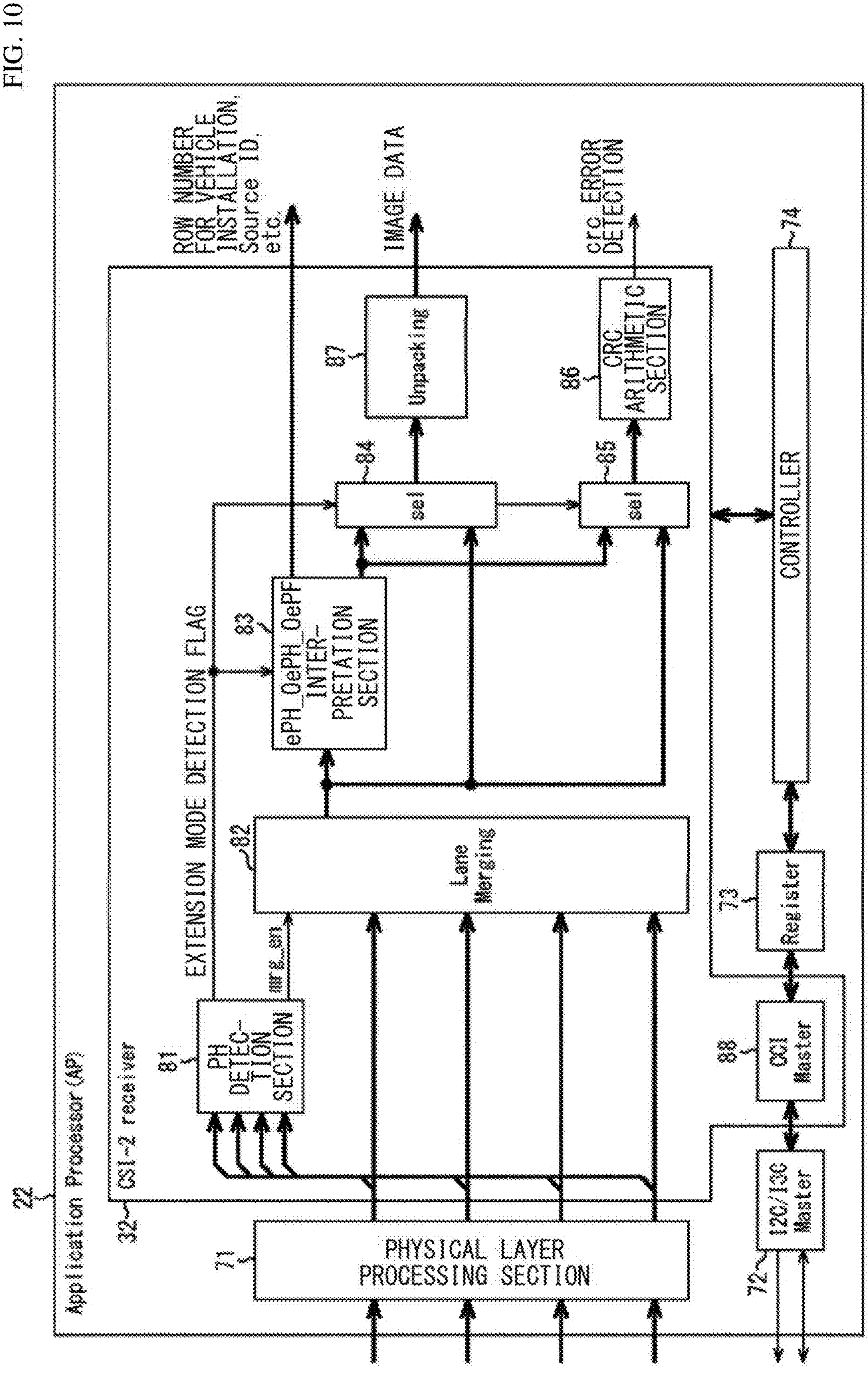
FIG. 10 is a block diagram illustrating a configuration example of an application processor.

FIG. 10 is a block diagram illustrating a configuration example of the application processor 22 including the extension mode adaptive CSI-2 reception circuit 32.

As illustrated in FIG. 10, the application processor 22 includes, in addition to the extension mode adaptive CSI-2 reception circuit 32, a physical layer processing section 71, the I2C/I3C master 72, a register 73, and a controller 74. In addition, the extension mode adaptive CSI-2 reception circuit 32 includes a packet header detection section 81, a lane merging section 82, an interpretation section 83, selection sections 84 and 85, a CRC arithmetic section 86, an unpacking section 87, and the CCI master 88.

The physical layer processing section 71 is able to execute processing on both physical layers of the C-PHY and the D-PHY. As described above, the physical layer processing section 45 of the image sensor 21 performs processing on one physical layer of the C-PHY and the D-PHY, and the physical layer processing section 71 executes the same processing on the physical layer as executed in the physical layer processing section 45.

The I2C/I3C master 72 takes initiative to communicate with the I2C/I3C slave 46 (FIG. 9) of the image sensor 21 on the basis of I2C or I3C standard.

Various settings to be written into the register 47 of the image sensor 21 are recorded by the controller 74 into the register 73.

The controller 74 controls each block of the application processor 22.

The packet header detection section 81 detects a packet header from the packet supplied from the physical layer processing section 71, and confirms the data type stored in the packet header. Then, in a case where the extension mode setting information indicates the extension mode (DataType [5:3]=3'b111) in the data type of the packet header, the packet header detection section 81 supplies the interpretation section 83, the selection section 84, and the selection section 85 with an extension mode detection flag indicating the extension mode. In addition, the packet header detection section 81 supplies the lane merging section 82 with a merger enable signal mrg_en indicating whether or not the merger of the divided four lanes is effective, on the basis of the packet header.

That is, in accordance with the existing CSI-2 standard, the packet header detection section 81 detects a packet header in which setting information (data type, etc.) is stored that indicates a set condition for data to be transmitted in the packet. At this time, in accordance with the extension mode setting information, which indicates whether or not it is the extension mode using the extended header, stored in the unused region defined as being unused in the existing CSI-2 standard, in the data type which is the setting information indicating the type of data to be transmitted in the packet, the packet header detection section 81 outputs the extension mode detection flag to thereby cause switching to be performed between reception of a packet of the packet structure in accordance with the existing CSI-2 standard and reception of a packet of the packet structure during the extension mode. In addition, in accordance with extension mode type information stored in the unused region of the data type defined as being unused in the existing CSI-2 standard, the packet header detection section 81 recognizes which type of the extension mode it is among the multiple types of extension modes prepared as the extension mode.

In a case where the merger enable signal mrg_en supplied from the packet header detection section 81 is effective, the lane merging section 82 merges the packets divided into four lanes supplied from the physical layer processing section 71. Then, the lane merging section 82 supplies the one-lane packet to the interpretation section 83, the selection section 84, and the selection section 85.

In a case where the extension mode detection flag supplied from the packet header detection section 81 indicates the extension mode, the interpretation section 83 reads, from the packet supplied from the lane merging section 82, the extended packet header, the optional extended packet header, and the optional extended packet footer, on the basis of the packet structure of the extension mode. Then, the interpretation section 83 interprets setting information stored in the extended packet header, the optional extended packet header, and the optional extended packet footer.

That is, the interpretation section 83 receives, as the extended header, the extended packet header arranged at the head of the payload in accordance with the existing CSI-2 standard, and interprets the setting information stored in the extended packet header. In addition, in a case where the optional extended packet header setting information stored in the extended packet header indicates transmission of the optional extended packet header to be selectively transmitted depending on the application, the interpretation section 83 receives the optional extended packet header subsequent to the extended packet header, and interprets the setting information stored in the optional extended packet header. Further, in a case where the packet to be transmitted in the extension mode is an extended long packet storing data to be transmitted as a payload in the existing CSI-2 standard, the interpretation section 83 receives the optional extended packet footer arranged subsequent to the legacy payload in which data is stored, and interprets the optional extended packet footer.

Then, the interpretation section 83 reads the row number for vehicle installation, the source ID, and the like stored in the optional extended packet header, for example, and outputs them to an LSI (unillustrated) of a subsequent stage.

It is to be noted that, in a case where the extension mode detection flag supplied from the packet header detection section 81 indicates no extension mode, i.e., in a case where a packet of the existing packet structure is supplied, the interpretation section 83 does not perform the processing as described above, and the processing stops.

In accordance with the extension mode detection flag supplied from the packet header detection section 81, the selection section 84 selectively supplies data to the unpacking section 87 on the basis of the packet structure of the existing packet or the packet structure of the extended packet.

In accordance with the extension mode detection flag supplied from the packet header detection section 81, the selection section 85 selectively supplies data to the CRC arithmetic section 86 on the basis of the packet structure of the existing packet or the packet structure of the extended packet.

The CRC arithmetic section 86 performs an arithmetic operation of CRC of the packet header, the payload, the extended packet header, the optional extended packet header, or the optional extended packet footer selectively supplied via the selection section 85. In a case where a CRC error is detected, the CRC arithmetic section 86 outputs, to an LSI (unillustrated) of a subsequent stage, a crcCRC error detection signal indicating to that effect.

The unpacking section 87 performs unpacking processing to retrieve image data stored in the payload selectively supplied via the selection section 84, and outputs the acquired image data to an LSI (unillustrated) of a subsequent stage.

The CCI master 88 takes initiative to communication with the CCI slave 59 (FIG. 9) of the image sensor 21 on the basis of the CSI-2 standard.

The application processor 22 is thus configured, and is able to receive an extended packet transmitted from the image sensor 21, interpret the setting information stored in the extended packet header, the optional extended packet header, and the optional extended packet footer, and acquire image data.

<Communication Processing>

Description is given, with reference to FIGS. 11 to 14, of communication processing to be performed by the image sensor 21 and the application processor 22.

Figure 11:
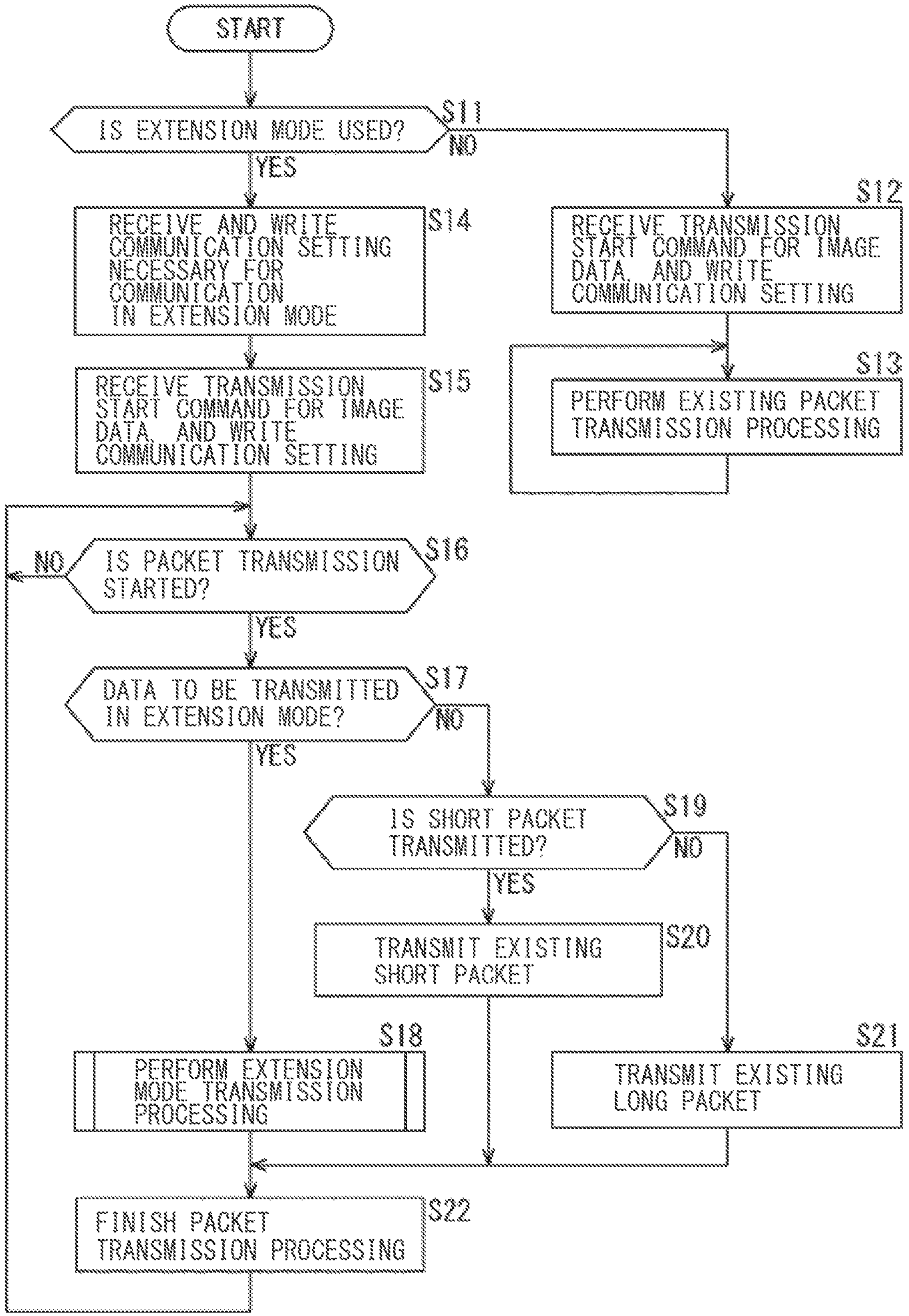
FIG. 11 is a flowchart describing processing in which the image sensor transmits a packet.

FIG. 11 is a flowchart describing processing in which the image sensor 21 transmits a packet.

For example, when the image sensor 21 is coupled to the application processor 22 via the bus 23, processing is started. In step S11, upon starting communication with the application processor 22, the controller 60 determines whether or not to use the extension mode. For example, the controller 60 confirms the extension mode setting stored in the register 47, and determines to use the extension mode in a case where the application processor 22 writes the extension mode setting indicating use of the extension mode.

In step S11, in a case where the controller 60 determines not to use the extension mode, the processing proceeds to step S12.

In step S12, the I2C/I3C slave 46 receives a transmission start command for image data transmitted from the application processor 22 (in step S54 in FIG. 13 described later). Further, the I2C/I3C slave 46 receives a communication setting in accordance with the CSI-2 standard transmitted together with the transmission start command, and writes the received communication setting into the register 47 via the CCI slave 59.

In step S13, on the basis of the communication setting stored in the register 47, existing packet transmission processing is executed, in the image sensor 21, in which a packet of the packet structure in accordance with the existing CSI-2 standard is transmitted to the application processor 22.

Meanwhile, in a case where the controller 60 determines in step S11 to use the extension mode, the processing proceeds to step S14.

In step S14, the I2C/I3C slave 46 receives a fixed communication setting (e.g., lane-by-lane copying of PH/PF at the time of GLD) necessary for communication in the extension mode, and writes it into the register 47 via the CCI slave 59.

In step S15, the I2C/I3C slave 46 receives a transmission start command for image data transmitted from the application processor 22 (in step S57 in FIG. 13 described later). Further, the I2C/I3C slave 46 receives a communication setting in accordance with the CSI-2 standard transmitted together with the transmission start command, and writes it into the register 47 via the CCI slave 59.

In step S16, the controller 60 determines whether or not to start transmitting a packet, and waits for the processing until determination is made to start transmitting a packet.

Then, in a case where determination is made in step S16 to start transmitting the packet, the processing proceeds to step S17, and the controller 60 determines whether or not the data is to be transmitted in the extension mode. Here, the controller 60 determines, depending on the content of the data to be transmitted, that the data is to be transmitted in the extension mode, for example, in a case where the data is to be transmitted in a use case of the application example described later.

In step S17, in a case where the controller 60 determines that the data is to be transmitted in the extension mode, the processing proceeds to step S18, in which extension mode transmission processing (see FIG. 12) to transmit the extended packet corresponding to the extension mode is performed.

Meanwhile, in a case where the controller 60 determines in step S17 that the data is not to be transmitted in the extension mode, the processing proceeds to step S19.

In step S19, the controller 60 determines whether or not to transmit a short packet. For example, the controller 60 determines to transmit a short packet at the start of a frame and at the end of the frame.

In a case where the controller 60 determines in step S19 to transmit a short packet, the processing proceeds to step S20. In step S20, the packet header generation section 52 generates a packet header, and transmits a short packet of the existing packet structure to the application processor 22.

Meanwhile, in a case where the controller 60 determines in step S19 not to transmit a short packet (i.e., transmit a long packet), the processing proceeds to step S21. In step S21, the packing section 51 stores image data in the payload, and the CRC arithmetic section 57 obtains CRC to thereby generate a long packet of the existing packet structure and transmit it to the application processor 22.

After processing in step S18, step S20, or step S21, the processing proceeds to step S22, and the controller 60 finishes the packet transmission processing. Thereafter, the processing returns to step S16, and processing to transmit a packet is repeatedly performed subsequently in the same manner for the next packet.

Figure 12:
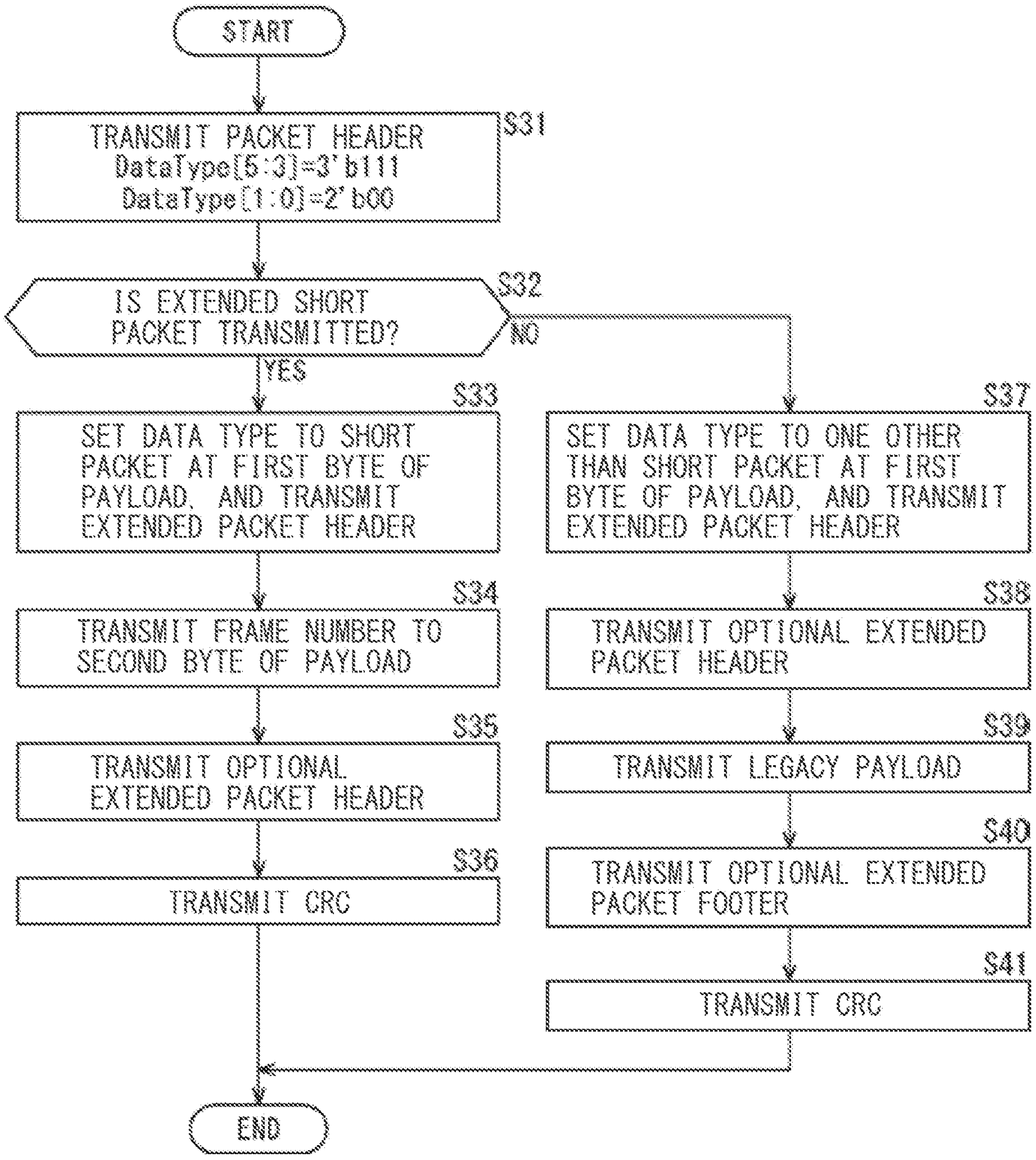
FIG. 12 is a flowchart describing extension mode transmission processing.

FIG. 12 is a flowchart describing extension mode transmission processing to be performed in processing in step S18 in FIG. 11.

In step 531, the packet header generation section 52 generates a packet header that stores VC, data type, WC, and the like, and transmits it to the application processor 22. At this time, the packet header generation section 52 writes, into the data type of the packet header, extension mode setting information (DataType[5:3]=3'b111) indicating the extension mode, and extension type setting information (DataType[1:0]=2'b00) identifying the mode setting of the extension mode as being the extension mode 0.

In step S32, the application processor 22 determines whether or not to transmit an extended short packet. For example, the controller 60 determines to transmit the extended short packet at the start of a frame and at the end of the frame.

In step S32, in a case where the application processor 22 determines to transmit the extended short packet, the processing proceeds to step S33.

In step S33, the extended packet header generation section 53 transmits an extended packet header with the data type (DataType[7:0]) being set as a short packet at the first byte of the payload. At this time, the extended packet header generation section 53 performs various settings (e.g., OePH [7:0], OePF[3:0], etc.) to be stored in the extended packet header.

In step S34, the extended packet header generation section 53 stores a frame number (FN: FrameNumber) at the second byte of the payload for transmission.

In step S35, in accordance with the setting (OePH[7:0]) performed in step S33, the extended packet header generation section 53 generates and transmits an optional extended packet header as illustrated in FIG. 4.

In step S36, the CRC arithmetic section 57 obtains CRC, and transmits it as a packet footer.

Meanwhile, in a case where the application processor 22 determines in step S32 not to transmit the extended short packet (i.e., transmit a long packet), the processing proceeds to step S37.

In step S37, the extended packet header generation section 53 transmits an extended packet header with the data type (DataType[7:0]) being set as one other than a short packet at the first byte of the payload. At this time, the extended packet header generation section 53 performs various settings (e.g., OePH[7:0], OePF[3:0], etc.) to be stored in the extended packet header.

In step S38, in accordance with the setting (OePH[7:0]) performed in step S37, the extended packet header generation section 53 generates and transmits an optional extended packet header as illustrated in FIG. 5.

In step S39, the packing section 51 packs image data supplied from the image processing section 43, and generates and transmits a legacy payload.

In step S40, in accordance with the setting (OePF[3:0]) performed in step S37, the extended packet footer generation section 54 generates and transmits an optional extended packet footer as illustrated in FIG. 4.

In step S41, the CRC arithmetic section 57 obtains CRC, and transmits it as a packet footer.

Then, after processing in step S36 or S41, the extension mode transmission processing is finished.

As described above, the image sensor 21 is able to generate and transmit an extended short packet or an extended long packet.

Figure 13:
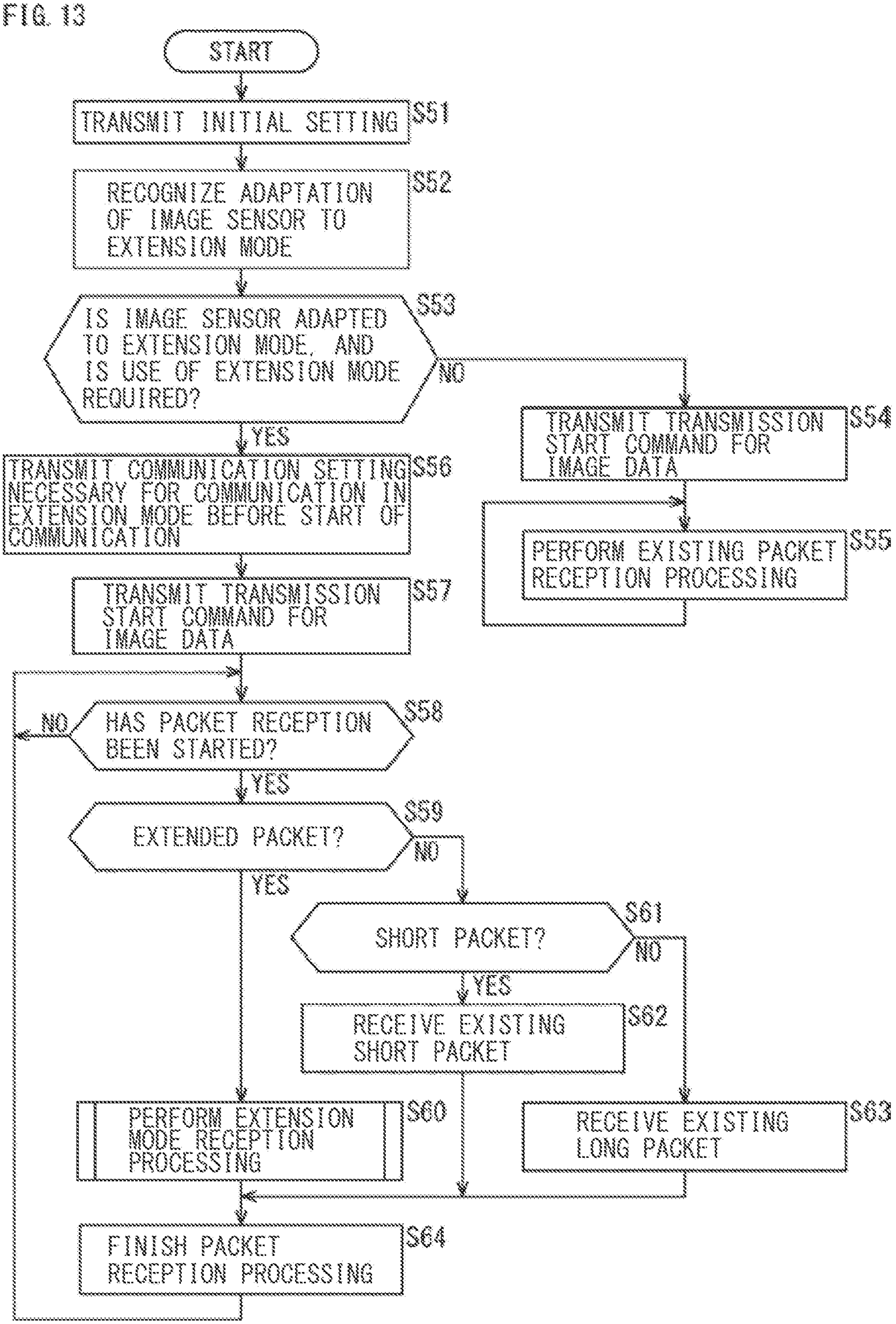
FIG. 13 is a flowchart describing processing in which an application processor receives a packet.

FIG. 13 is a flowchart describing processing in which the application processor 22 receives a packet.

For example, the processing is started when the image sensor 21 is coupled to the application processor 22 via the bus 23. In step S51, the controller 74 writes an initial setting (e.g., whether to use the C-PHY or the D-PHY as the physical layer) of the image sensor 21 into the register 73, and transmits it to the image sensor 21 via the CCI master 88 by the I2C/I3C master 72. This allows the initial setting to be written into the register 47 of the image sensor 21.

In step S52, the controller 74 recognizes whether or not the image sensor 21 is adapted to the extension mode. For example, the controller 74 is able to recognize whether or not the image sensor 21 is adapted to the extension mode by the I2C/I3C master 72 acquiring set values (e.g., extended PH/PF adaptive capability) stored in the register 47 of the image sensor 21. Alternatively, the controller 74 is able to recognize in advance whether or not the image sensor 21 is adapted to the extension mode on the basis of manual inputs, for example.

In step S53, the controller 74 determines whether or not the image sensor 21 is adapted to the extension mode and whether or not the use of the extension mode is required by an application to be executed by the application processor 22.

In a case where the controller 74 determines in step S53 that the image sensor 21 is not adapted to the extension mode or that the use of the extension mode is not required, the processing proceeds to step S54.

In step S54, the controller 74 transmits a transmission start command for image data to the image sensor 21 by the I2C/I3C master 72. At this time, the controller 74 also transmits a communication setting in accordance with the CSI-2 standard.

In step S55, in the application processor 22, existing packet reception processing is performed, in which a packet of the packet structure in accordance with the existing CSI-2 standard is received on the basis of the communication setting transmitted in step S54.

Meanwhile, in a case where the controller 74 determines in step S53 that the image sensor 21 is adapted to the extension mode and that the use of the extension mode is required by an application to be executed by the application processor 22, the processing proceeds to step S56.

In step S56, the I2C/I3C master 72 transmits a fixed communication setting necessary for communication in the extension mode prior to the start of the communication in the extension mode. This allows the fixed communication setting to be written into the register 47 of the image sensor 21 (step S14 in FIG. 11).

In step S57, the controller 74 transmits a transmission start command for image data to the image sensor 21 by the I2C/I3C master 72. At this time, the controller 74 also transmits a communication setting in accordance with the CSI-2 standard.

In step S58, the packet header detection section 81 determines whether or not the reception of the packet has been started by confirming the data supplied from the physical layer processing section 71, and waits for the processing until determination is made that the reception of the packet has been started. For example, in a case where a packet header has been detected from the data supplied from the physical layer processing section 71, the packet header detection section 81 determines that the reception of the packet has been started.

In a case where the packet header detection section 81 determines in step S58 that the reception of the packet has been started, the processing proceeds to step S59.

In step S59, the packet header detection section 81 confirms the data type of the packet header detected in step S58, and determines whether or not the packet having started to be received is an extended packet adaptive to the extension mode. For example, in a case where the extension mode setting information indicates the extension mode (DataType [5:3]=3'b111) in the data type of the packet header, the packet header detection section 81 determines that the packet having started to be received is an extended packet.

In a case where the packet header detection section 81 determines in step S59 that the packet having started to be received is an extended packet, the processing proceeds to step S60, in which extension mode reception processing (see FIG. 14) to receive the extended packet is performed.

Meanwhile, in a case where the packet header detection section 81 determines that the packet having started to be received is not an extended packet, the processing proceeds to step S61.

In step S61, the packet header detection section 81 confirms the data type (DataType[5:0]) of the packet header detected in step S58, and determines whether or not the packet having started to be received is a short packet.

In a case where the packet header detection section 81 determines in step S61 that the packet having started to be received is a short packet, the processing proceeds to step S62. In step S62, the packet header detection section 81 receives a short packet of the existing packet structure transmitted from the image sensor 21.

Meanwhile, in a case where the packet header detection section 81 determines in step S61 that the packet having started to be received is not a short packet (i.e., reception of a long packet has been started), the processing proceeds to step S63. In step S63, the unpacking section 87 receives a payload of the long packet of the existing packet structure transmitted from the image sensor 21 to retrieve image data, and the CRC arithmetic section 86 receives, as CRC, WC+1st byte transmitted subsequent to the packet header.

After the pieces of processing in step S60, step S62, or step S63, the processing proceeds to step S64, and the controller 74 finishes the packet reception processing. Thereafter, the processing returns to S58, and processing to receive a packet is repeatedly performed subsequently in the same manner for the next packet.

Figure 14:
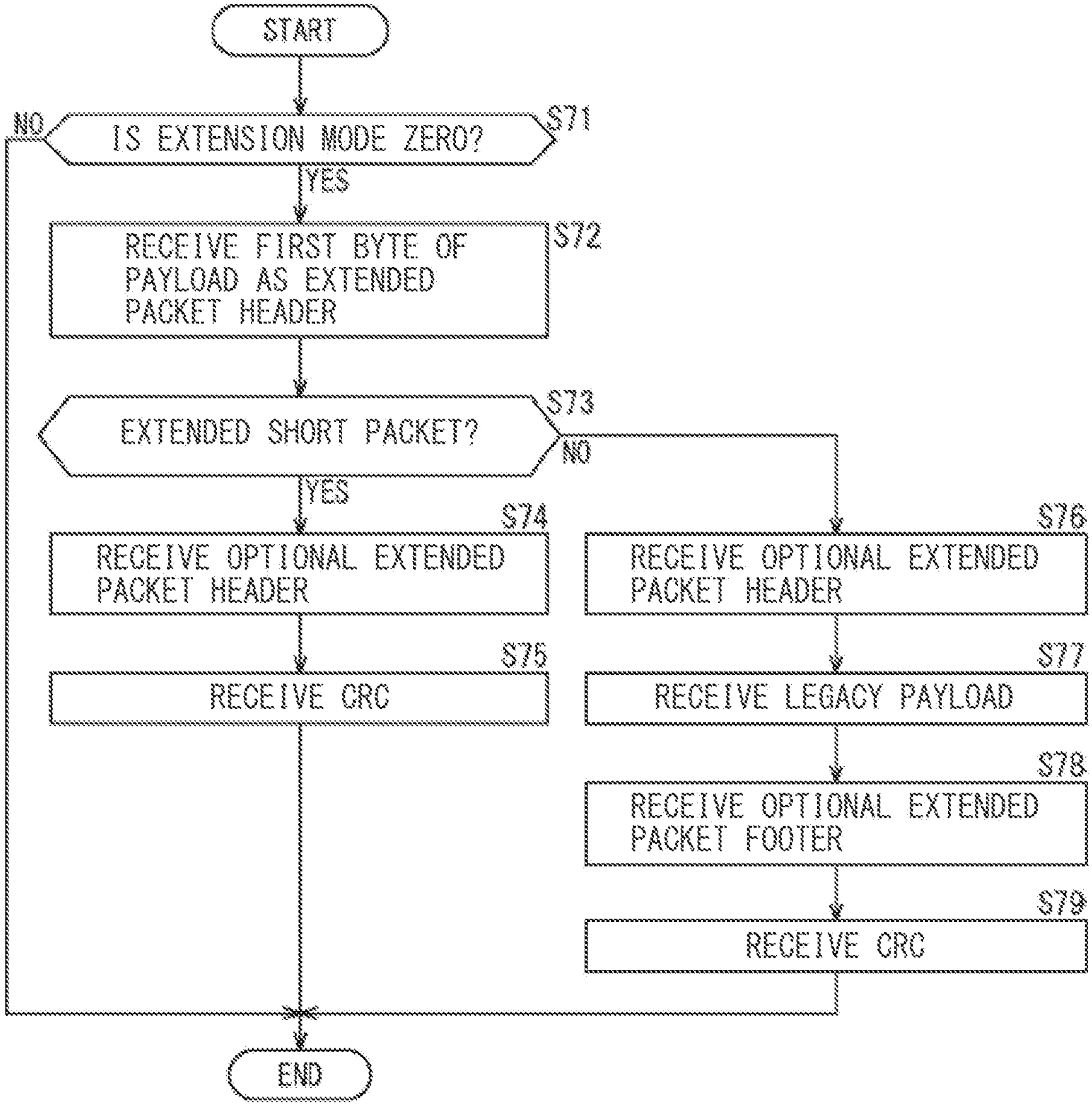
FIG. 14 is a flowchart describing extension mode reception processing.

FIG. 14 is a flowchart describing the extension mode reception processing to be performed in the processing in step S60 in FIG. 13.

In step S71, the packet header detection section 81 determines whether or not the mode setting of the extension mode is the extension mode 0. For example, in a case of indicating that the extension type setting information indicates the extension mode 0 (DataType[1:0]=2'b00) in the data type of the packet header, the packet header detection section 81 determines that the mode setting of the extension mode is the extension mode 0.

In a case where the packet header detection section 81 determines in step S71 that the mode setting of the extension mode is the extension mode 0, the processing proceeds to step S72. In step S72, the interpretation section 83 receives the first byte of the payload as the extended packet header.

In step S73, the interpretation section 83 confirms the data type (DataType[7:0]) of the extended packet header received in step S72, and determines whether or not the packet having started to be received is an extended short packet.

In a case where the interpretation section 83 determines in step S73 that the packet is an extended short packet, the processing proceeds to step S74. In step S74, the interpretation section 83 receives an optional extended packet header in accordance with the setting (OePH[7:0]) stored in the extended packet header received in step S72.

In step S75, the CRC arithmetic section 86 receives, as CRC, WC+1st byte transmitted subsequent to the optional extended packet header.

Meanwhile, in a case where the interpretation section 83 determines in step S73 that the packet is not the extended short packet (i.e., reception of an extended long packet has been started), the processing proceeds to step S76. In step S76, the interpretation section 83 receives the optional extended packet header in accordance with the setting (OePH[7:0]) stored in the extended packet header received in step S72.

In step S77, the unpacking section 87 receives a legacy payload of the extended long packet transmitted from the image sensor 21, and retrieves image data.

In step S78, the interpretation section 83 receives the optional extended packet footer in accordance with the setting (OePF[3:0]) stored in the extended packet header received in step S72.

In step S79, the CRC arithmetic section 86 receives, as CRC, WC+1st byte transmitted subsequent to the optional extended packet footer.

Then, in a case where determination is made in step S71 that the mode setting of the extension mode is not the extension mode 0, the extension mode reception processing is finished after the processing in step S75 or after the processing in step S79.

As described above, the application processor 22 is able to receive the extended short packet or the extended long packet to acquire data.

<Second Structure Example of Packet Structure>

Description is given, with reference to FIGS. 15 to 18, of a second structure example of a packet structure of a packet to be used in communication between the extension mode adaptive CSI-2 transmission circuit 31 and the extension mode adaptive CSI-2 reception circuit 32.

In the above-described first structure example illustrated in FIGS. 3 to 8, the packet header and the packet footer have the same packet structure as that in the existing CSI-2 standard, with emphasis on maintaining compatibility with the existing CSI-2 standard: the extended packet header, the optional extended packet header, and the optional extended packet footer allow the packet structure to be extended. In contrast, in the second structure example described below, the packet header and the packet footer are made different from those in the existing CSI-2 standard, and the extended packet header and the extended packet footer allow the packet structure to be extended.

Figure 15:
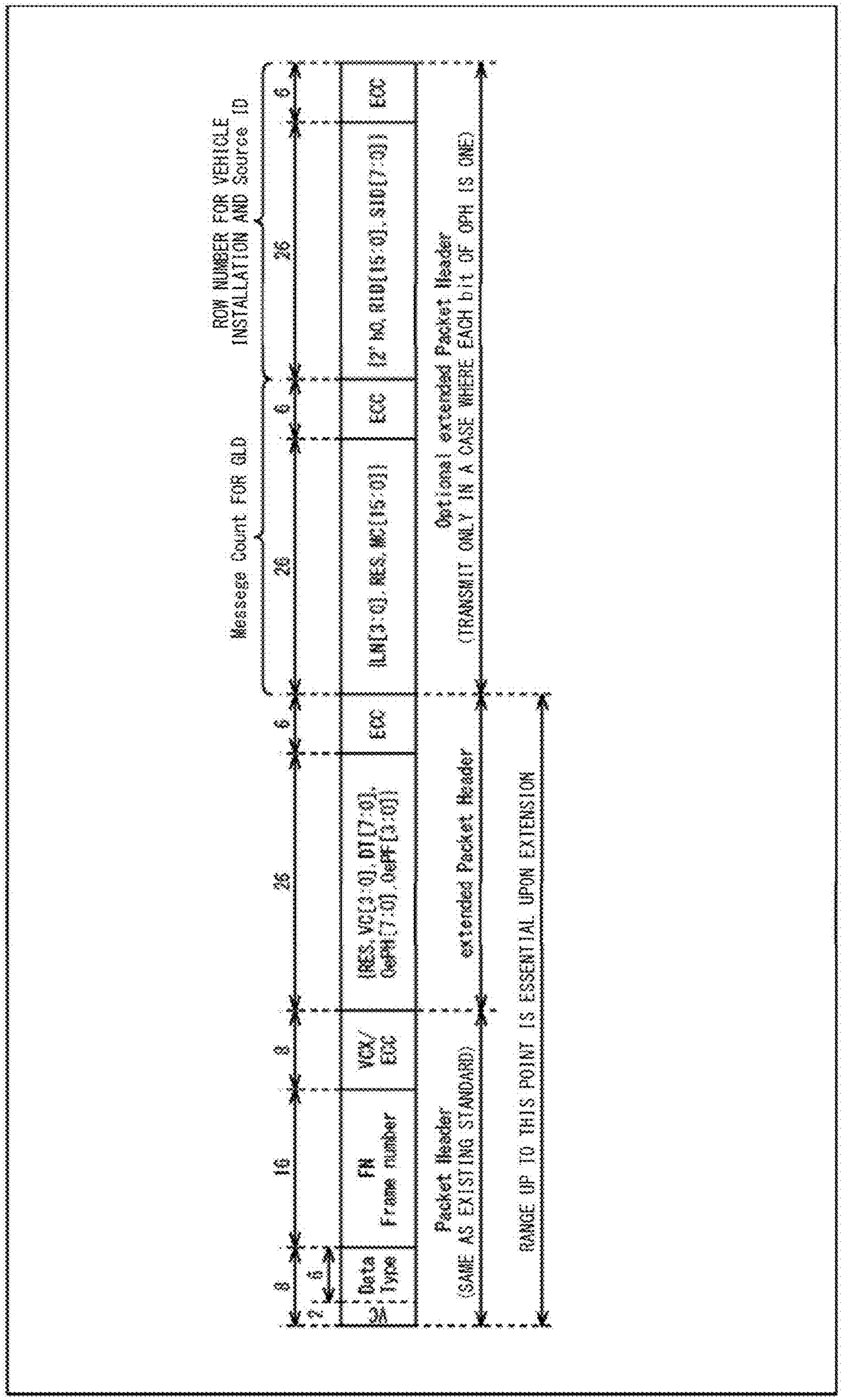
FIG. 15 is a diagram illustrating a second structure example of the overall packet structure of the D-PHY-oriented extended packet.

FIG. 15 illustrates a packet structure of a short packet (hereinafter, referred to as the D-PHY-oriented extended short packet) to be used in the CSI-2 extension mode in a case where the physical layer is the D-PHY.

As for the D-PHY-oriented extended short packet illustrated in FIG. 15, the extension mode is identified by data types stored in the same packet header as that in the existing CSI-2 standard, in the same manner as the D-PHY-oriented extended short packet of the first structure example illustrated in FIG. 4.

Meanwhile, in the D-PHY-oriented extended short packet illustrated in FIG. 15, a frame number is stored in a short packet data field, in the next 16 bits of the data type of the packet header, in the same manner as the short packet in accordance with the existing CSI-2 standard. Then, subsequent to the packet header, an extended packet header configured in the same manner as the extended packet header illustrated in FIG. 4 is transmitted.

Accordingly, the application processor 22 serving as the reception side is able to interpret the data type stored in the extended packet header to determine that a frame number is stored in the data field of the packet header in a case of being an extended short packet.

It is to be noted that the optional extended packet header in the D-PHY-oriented extended short packet illustrated in FIG. 15 is configured in the same manner as the optional extended packet header in the D-PHY-oriented extended short packet of the first structure example illustrated in FIG.

4. However, the optional extended packet header has a packet structure not to be embedded in the payload, and thus need not be supplied with CRC at the end.

Figure 16:
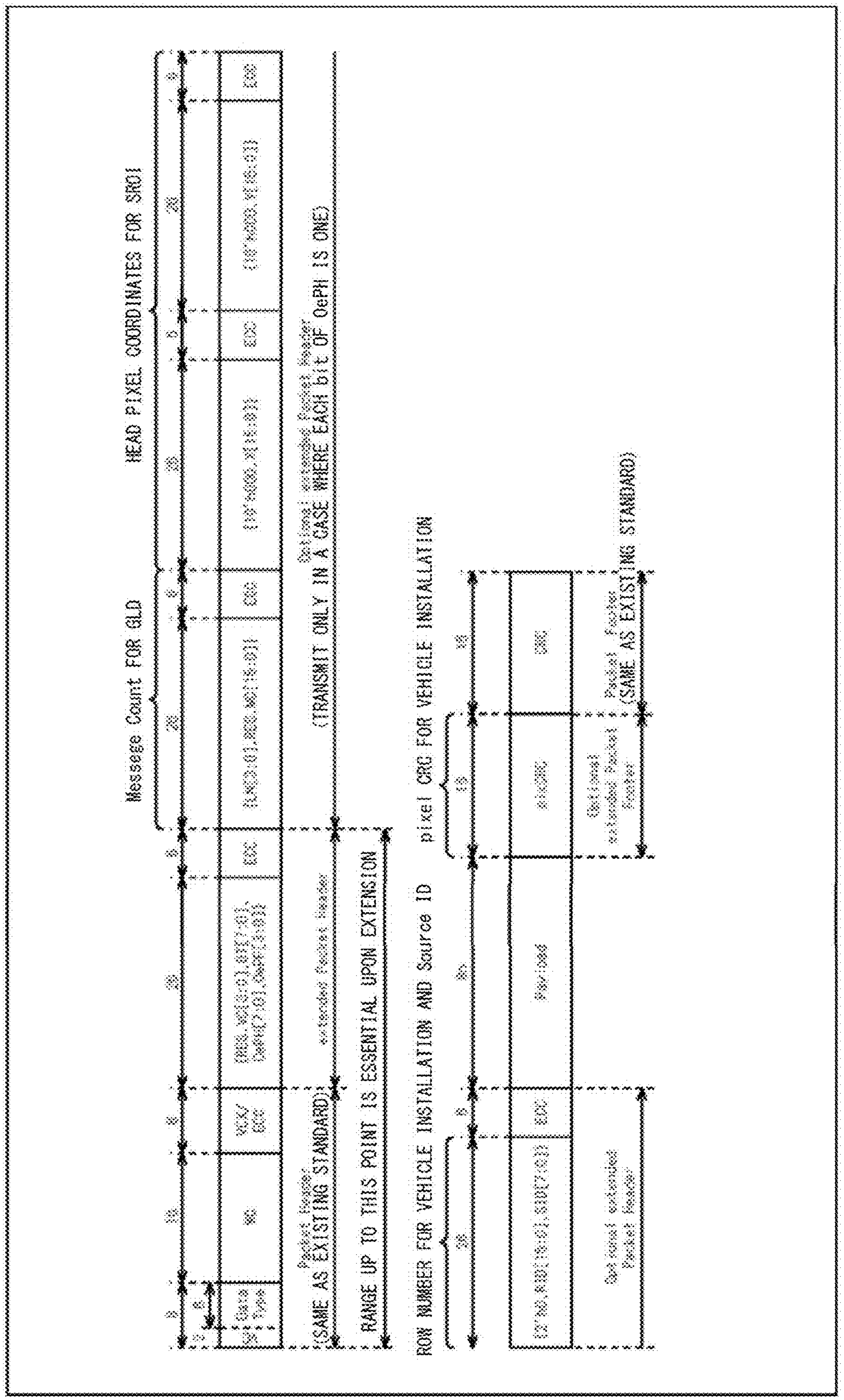
FIG. 16 is a diagram illustrating a second structure example of the packet structure of the D-PHY-oriented extended long packet.

FIG. 16 illustrates a packet structure of a long packet (hereinafter, referred to as the D-PHY-oriented extended long packet) to be used in the CSI-2 extension mode in a case where the physical layer is the D-PHY.

In the D-PHY-oriented extended long packet illustrated in FIG. 16, the extended data is transmitted as a portion of the packet header or the packet footer without being embedded in the payload. Accordingly, WC of the packet header at the head strictly indicates a byte length of the payload in the same manner as the existing standard.

Figure 17:
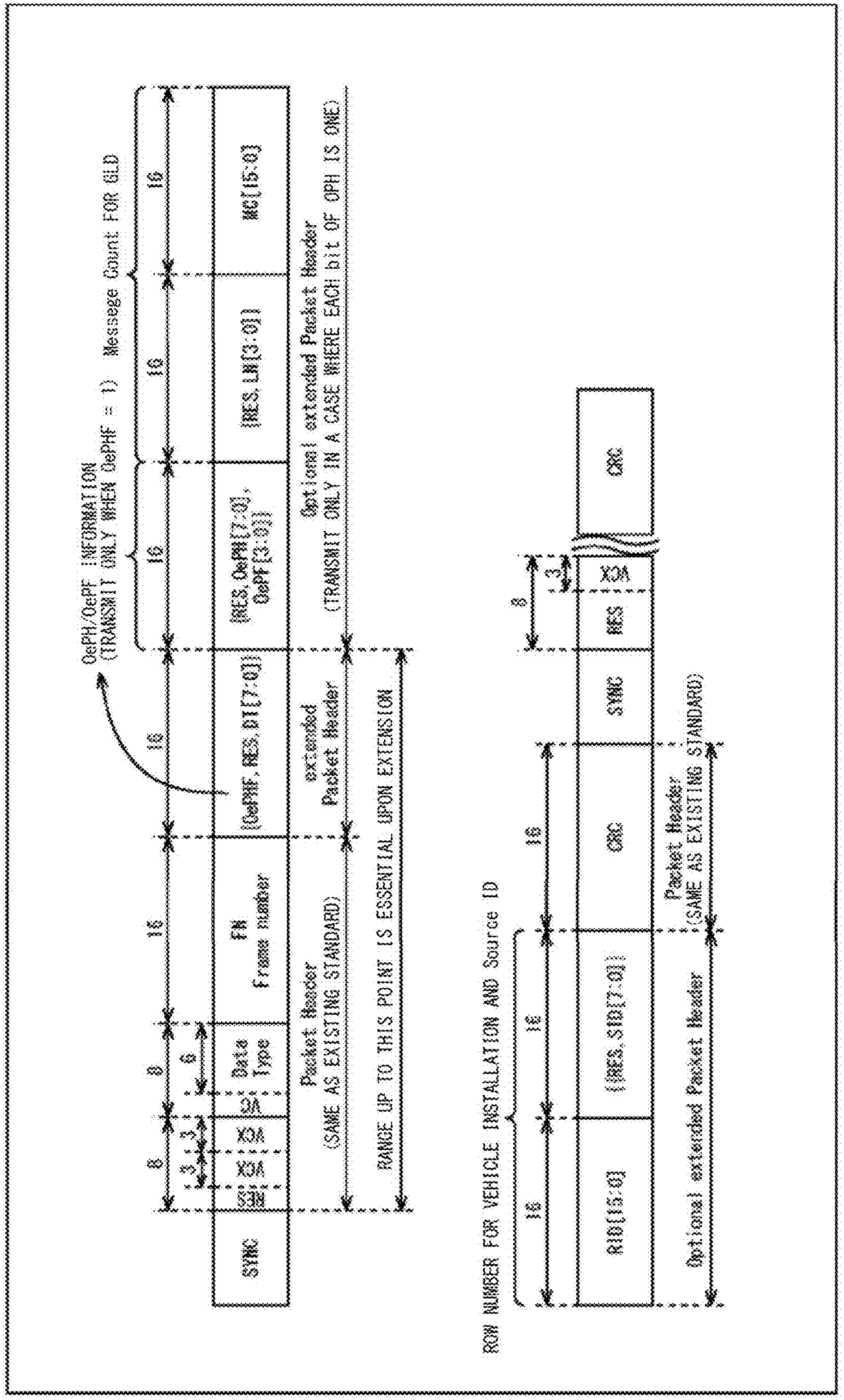
FIG. 17 is a diagram illustrating a second structure example of the packet structure of the C-PHY-oriented extended short packet.

FIG. 17 illustrates a packet structure of a short packet (hereinafter, referred to as the C-PHY-oriented extended short packet) to be used in the CSI-2 extension mode in a case where the physical layer is the C-PHY.

An extended portion of the C-PHY-oriented extended short packet illustrated in FIG. 17 is transmitted strictly as an extension of the packet header in accordance with the existing CSI-2 standard, and thus the extended portion such as the extended packet header is inserted after the frame number. Then, in the same manner as the existing CSI-2 standard, packet header ends with the CRC. Further, the packet structure to transmit them twice with SYNC interposed therebetween is similar to the short packet in accordance with the existing CSI-2 standard.

Figure 18:
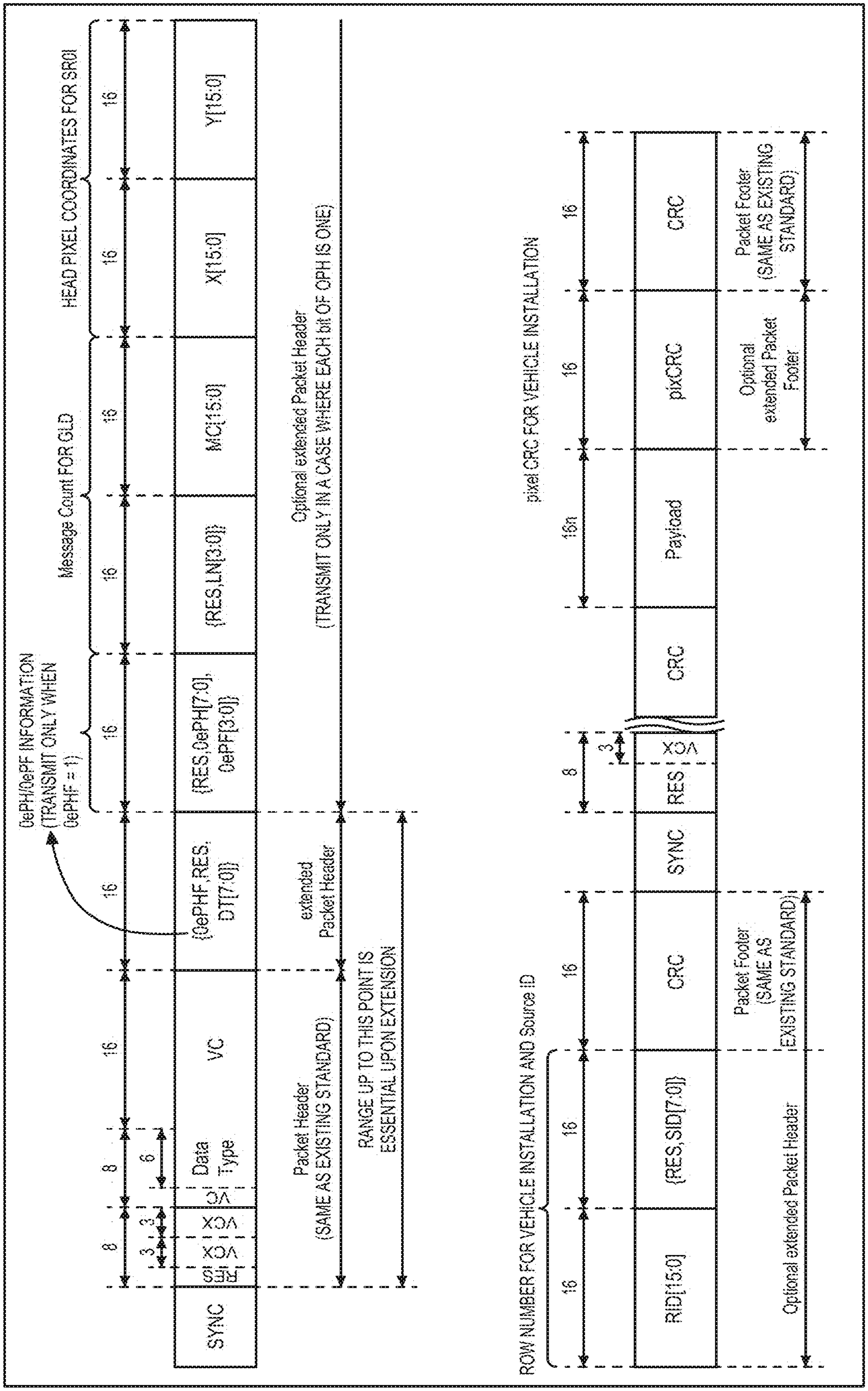
FIG. 18 is a diagram illustrating a second structure example of the packet structure of the C-PHY-oriented extended long packet.

FIG. 18 illustrates a packet structure of a long packet (hereinafter, referred to as the C-PHY-oriented extended long packet) to be used in the CSI-2 extension mode in a case where the physical layer is the C-PHY.

As described above, the C-PHY-oriented extended long packet illustrated in FIG. 18 differs from the C-PHY-oriented extended long packet of the first structure example illustrated in FIG. 8 in that WC of the head packet header strictly indicates a byte length of the payload in the same manner as the existing standard.

As described above, the packet structure of the extended packet of the second structure example illustrated in FIGS. 15 to 18 enables adaptation to various applications as compared with the existing one, in the same manner as the packet structure of the extended packet of the first structure example (FIGS. 3 to 8).

However, the extended packet of the second structure example has a packet structure in which the existing packet header or footer is extended without embedding the extended data in the existing payload. Therefore, in a case of employing the packet structure of the extended packet of the second structure example, it may not be possible to minimize an influence that requires a change from the communication system having been used, as compared with the case of employing the packet structure of the extended packet of the first structure example. That is, for example, the existing SerDes transmission circuit 34 requires a change in the SerDes reception circuit 35 (FIG. 2).

As described above, employing the extended packet of the first structure example makes it possible to adapt to various applications such as vehicle installation, and to construct an in-vehicle system by minimizing the influence that requires a change in the communication system having been used.

In addition, employing the extended packet of the second structure example makes it possible to adapt to various applications such as vehicle installation, although a change is necessary from the communication system having been used.

<Modification Examples of Image Sensor and Application Processor>

(Modification Example of Image Sensor)

Figure 19:
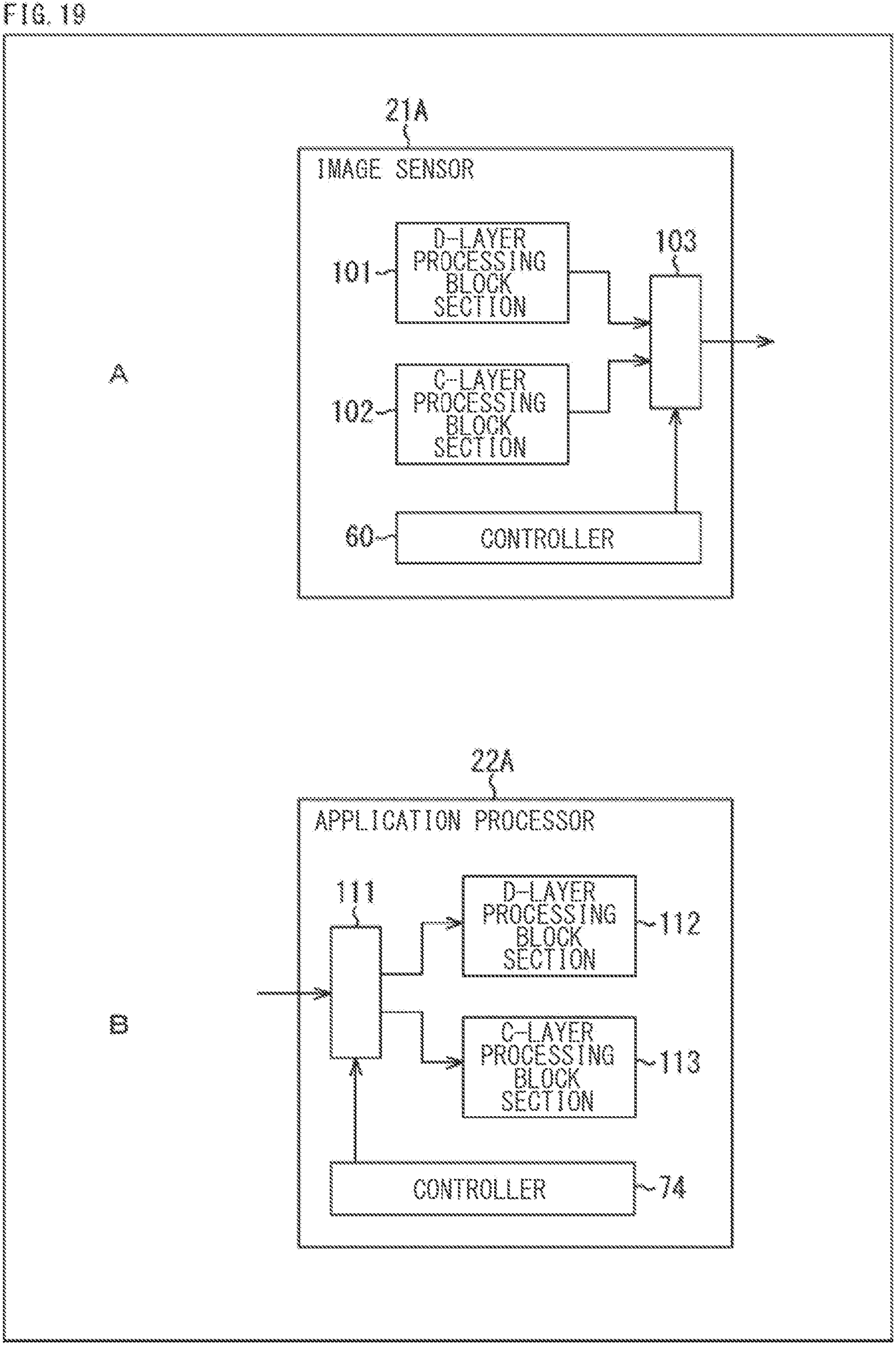
FIG. 19 is a block diagram illustrating a modification example of a configuration for switching a D-PHY and a C-PHY.

Description is given, with reference to FIG. 19, of modification examples of the image sensor and the application processor.

Respective blocks constituting the image sensor 21 in FIG. 9 and the application processor 22 in FIG. 10 described above are configured to be able to perform processing in a manner to be adaptive to both D-PHY and C-PHY-oriented packets. Alternatively, for example, there may be provided both a block that performs processing exclusively for the D-PHY-oriented packet and a block that performs processing exclusively for the C-PHY-oriented packet, with processing being switched for each block.

The image sensor 21A illustrated in A of FIG. 19 includes a D-layer processing block section 101, a C-layer processing block section 102, a switching section 103, and the controller 60.

The D-layer processing block section 101 includes the block that performs processing exclusively for the D-PHY-oriented packet among the blocks constituting the image sensor 21 in FIG. 9. The C-layer processing block section 102 includes the block that performs processing exclusively for the C-PHY-oriented packet among the blocks constituting the image sensor 21 in FIG. 9. Under the control of the controller 60, the switching section 103 outputs the D-PHY-oriented packet generated in the D-layer processing block section 101 in a case where the D-PHY is used for the physical layer, and makes switching to output the C-PHY-oriented packet generated in the C-layer processing block section 102 in a case where the C-PHY is used for the physical layer.

(Modification Example of Application Processor)

An application processor 22A illustrated in B of FIG. 19 includes a switching section 111, a D-layer processing block section 112, a C-layer processing block section 113, and the controller 74.

Under the control of the controller 74, the switching section 111 makes switching to supply a packet transmitted from the image sensor 21A to one of the D-layer processing block section 112 or the C-layer processing block section 113. The D-layer processing block section 112 includes the block that performs processing exclusively for the D-PHY-oriented packet among the blocks constituting the application processor 22 in FIG. 10. The C-layer processing block section 113 includes the block that performs processing exclusively for the C-PHY-oriented packet among the blocks constituting the application processor 22 in FIG. 10.

In the image sensor 21A and the application processor 22A configured in this manner, a physical layer to be used can be set between the controller 60 and the controller 74 prior to the start of communication. Then, for example, in a case where the D-PHY is used for the physical layer, the D-PHY-oriented packet generated in the D-layer processing block section 101 is transmitted via the switching section 103, and is supplied to the D-layer processing block section 112 via the switching section 111 to be processed. In addition, for example, in a case where the C-PHY is used for the physical layer, the C-PHY-oriented packet generated in the C-layer processing block section 102 is transmitted via the switching section 103, and is supplied to the C-layer processing block section 113 via the switching section 111 to be processed.

<Application Example of Extended Packet>

The above-described extended packet is considered being applied to the following use case, for example.

For example, the extended packet is considered being applied to a use case of transmitting a higher-definition image (RAW24).

For example, RAW6, RAW7, RAW8, RAW10, RAW12, RAW14, RAW16, and RAW20 are defined as data types to be stored in the packet header in accordance with the existing CSI-2 standard when transmitting image data in a RAW format. Meanwhile, in recent years, in order to adapt to automated driving using an in-vehicle camera, transmission of a higher-definition image is expected. Therefore, extending the bit count of the data type by applying the extended packet makes it possible, for example, to define higher-definition RAW24 for the data type of the extended packet header.

In addition, the extended packet is considered being applied to the Smart ROI, which is a technique to transmit only an image region of interest on a screen.

For example, many cameras are currently installed in stadiums, airports, or the like. In a case where the entire image captured by these cameras is transmitted from the cameras to a cloud server through a network such as the Internet, it is assumed that a shortage of a bandwidth for the Internet, an increase in the amount of data or the amount of calculation on the cloud side, or the like may occur. Therefore, by cutting out only the image region of interest at the edge (camera side) and transmitting the image region of interest, it is expected to suppress the shortage of a bandwidth for the Internet, the increase in the amount of data or the amount of calculation on the cloud side, or the like.

In a case where such an SROI is transmitted, coordinates of the upper left of a rectangle region (ROI) need be transmitted together in order to convey to the reception side where the image region of interest corresponds to in the entire screen. In addition, data on the entire imaging screen need be transmitted at a predetermined timing by a command from the reception side. Accordingly, for example, the SROI images and the data on the entire image (existing packet header) are present in a mixed manner in the unit of frame.

Therefore, applying the extended packet makes it possible, for example, to transmit coordinate data of 16 bits or more for each of the X coordinate and the Y coordinate.

Further, as for the extended packet, a use case is considered that is applied to GLD where communication is continued by reducing the bandwidth or the number of lanes even in a case where a channel is degraded. It is to be noted that the GLD is a suggestion that is considered in CSI-2 ver3.0.

For example, in automated driving, even when a portion of a cable linking the camera is disconnected upon collision, it is required to continue communication using a cable that is not disconnected and automatically stop a vehicle after evacuating to a safety zone. Therefore, an in-vehicle camera interface needs to be provided with at least a disconnection detecting function, and needs to be supplied with the following information such as: row number (16 bits) indicating on which row the information is on the screen; Source ID (8 bits) indicating from which camera the data is transmitted; and a message counter (16 bits) indicating a transmission number. Further, in a case of being used in combination with the SROI as described above, it is conceivable that these pieces of information are transmitted in the unit of frame.

Therefore, applying the extended packet makes it possible to transmit these pieces of information.

<First Configuration Example Adapted to E2E Protection>

Description is given, with reference to FIGS. 20 to 26, of a configuration example adapted to a regulation prohibiting packet alteration or the like on a transmission path.

For example, in the communication system 11A having the configuration as described above with reference to FIG. 2, in a case where the image sensor 21 and the application processor 22 differ from each other in the interface, it is necessary to convert packets on the transmission path. That is, in a case where the physical layer of the image sensor 21 is the D-PHY and the physical layer of the application processor 22 is the C-PHY, for example, it is necessary to convert packets from the D-PHY-oriented packet to the C-PHY-oriented packet in the SerDes device 26.

As described above, the configuration in which the packet conversion is undesirably performed in the SerDes device 26 violates, for example, a regulation stipulated by ISO26262 (Functional Safety), i.e., a regulation prohibiting packet alteration or the like on the transmission path (hereinafter, referred to as E2E (End-toEnd) protection).

Figure 20:
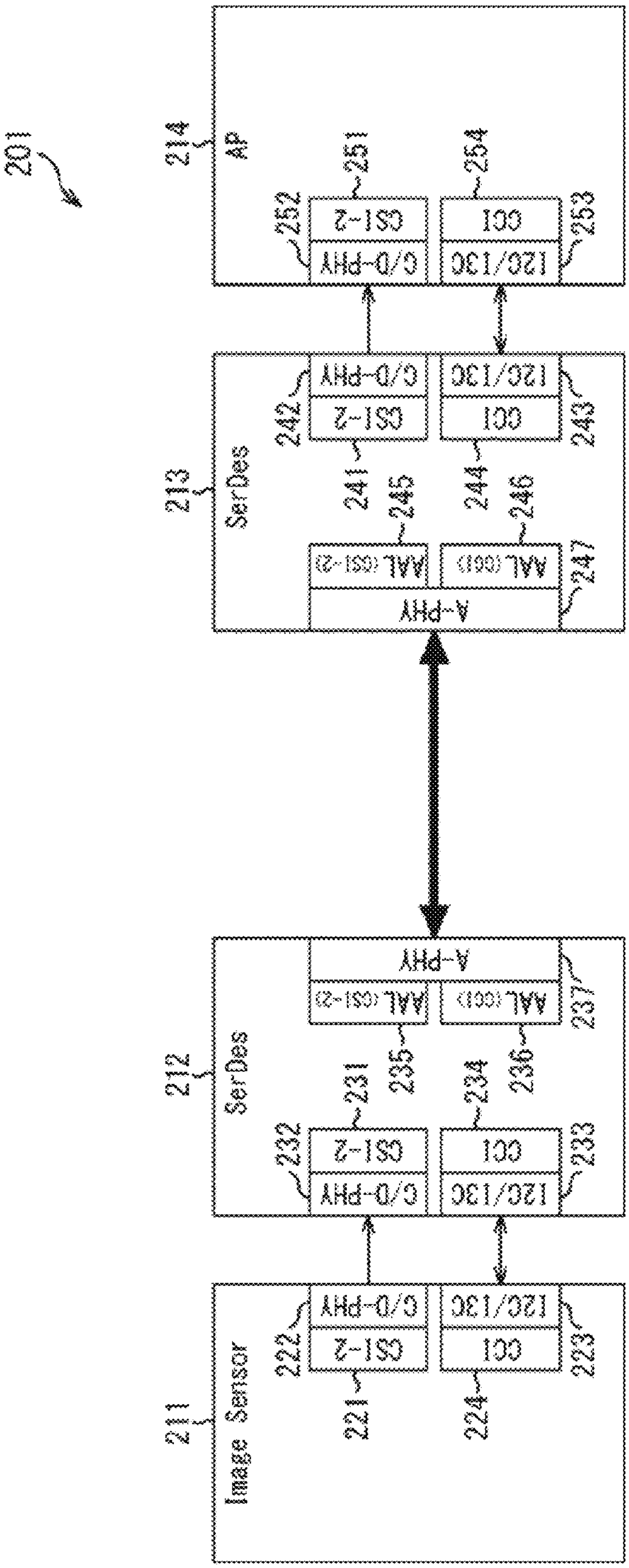
FIG. 20 is a block diagram illustrating a configuration example of a third embodiment of a communication system to which the present technology is applied.

FIG. 20 is a block diagram illustrating a configuration example of a communication system 201 adapted to the E2E protection as a third embodiment of a communication system to which the present technology is applied.

As illustrated in FIG. 20, the communication system 201 has a configuration in which an image sensor 211, a SerDes device 212, a SerDes device 213, and an application processor 214 are coupled to each other. It is to be noted that FIG. 20 exemplifies a case where SERDES is an A-PHY, but also includes a case where they are coupled using another SERDES standard such as FPD-LINK3. Alternatively, in the SERDES standard, communication may be performed on the basis of this SERDES standard while maintaining the CIS-2 format (at least Application Specific payload). In addition, in the SERDES, physical layer processing sections 237 and 247 may include multiple physical layer processing sections of another SERDES standard other than the A-PHY, and may switch the physical layer processing sections depending on applications.

The image sensor 211 includes at least an extension mode adaptive CSI-2 transmission circuit 221, a physical layer processing section adapted to the C-PHY or the D-PHY or both of them (hereinafter, referred to as a C/D-PHY physical layer processing section) 222, a slave adapted to I2C and/or I3C or both of them (hereinafter, referred to as I2C/I3C slave) 223, and a CCI slave 224.

The SerDes device 212 includes at least a CSI-2 reception circuit 231, a C/D-PHY physical layer processing section 232, an I2C/I3C master 233, a CCI master 234, a CSI-2-oriented A-PHY packet generation section 235, a CCI-oriented A-PHY packet transmission/reception section 236, and an A-PHY-adapted physical layer processing section 237. For example, in the SerDes device 212, the C-PHY or D-PHY-oriented packet is converted to the A-PHY-oriented packet, and the conversion is determined on the basis of a register setting or the like.

The SerDes device 213 includes at least a CSI-2 transmission circuit 241, a C/D-PHY physical layer processing section 242, an I2C/I3C slave 243, a CCI slave 244, a CSI-2-oriented A-PHY packet reception section 245, a CCI-oriented A-PHY packet transmission/reception section 246, and an A-PHY-adapted physical layer processing section 247. For example, in the SerDes device 213, the A-PHY-oriented packet is converted to the C-PHY or D-PHY-oriented packet, and the conversion is determined on the basis of a register setting or the like.

The application processor 214 includes at least an extension mode adaptive CSI-2 reception circuit 251, a C/D-PHY physical layer processing section 252, an I2C/I3C master 253, and a CCI master 254.

The communication system 201 is thus configured, and the extended packet of the above-described configuration is transmitted from the image sensor 211 and received by the application processor 214. Here, even when the communication system 201 is configured to allow the physical layer processing section 222 of the image sensor 211 to adapt to the D-PHY and the physical layer processing section 252 of the application processor 22 to adapt to the C-PHY, it is necessary not to violate the E2E protection.

Therefore, the communication system 201 limits the protection range of the E2E protection to Application Specific payload (hereinafter, referred to as AS payload), which is a payload specific to the application, in order to be able to adapt to the E2E protection. That is, the AS payload is prohibited from being changed at the time of converting the A-PHY-oriented packet to the C-PHY or D-PHY-oriented packet or at the time of converting the C-PHY or D-PHY-oriented packet to the A-PHY-oriented packet.

Figure 21:
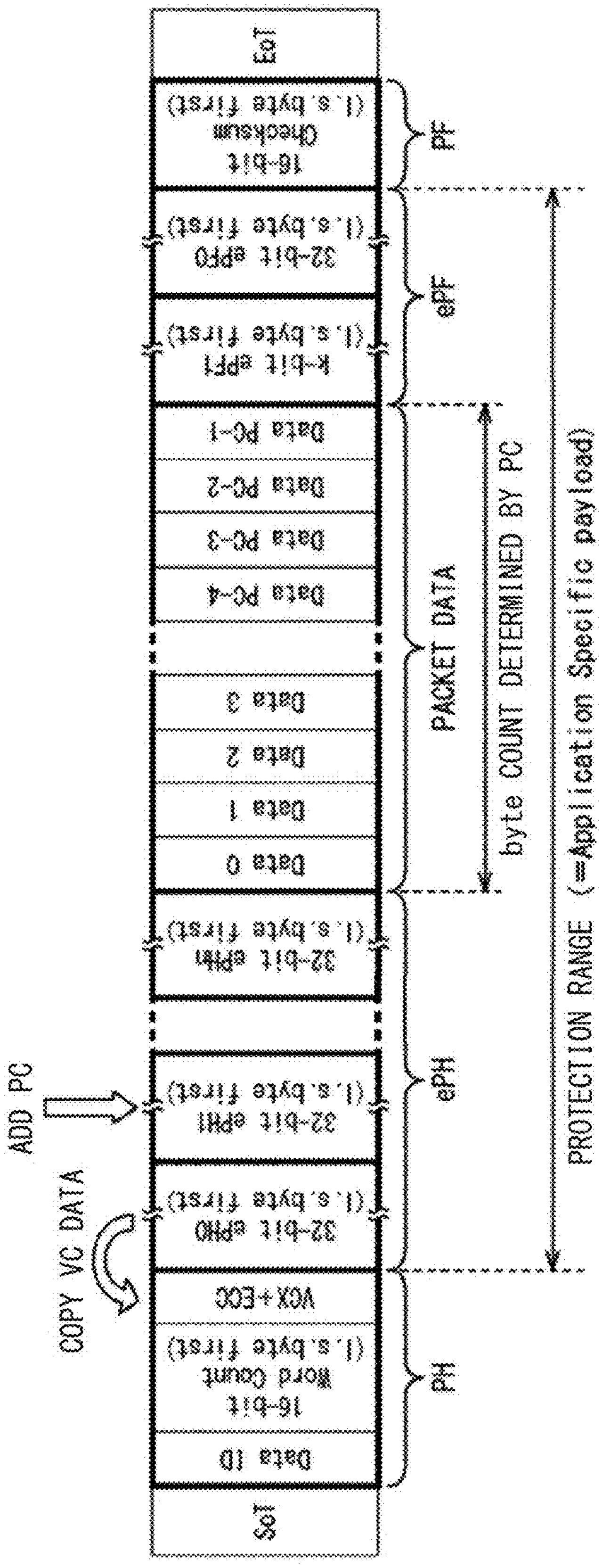
FIG. 21 is a diagram illustrating a structure example of the D-PHY-oriented extended packet corresponding to a regulation of packet modification prohibition.

FIG. 21 illustrates a structure example of a D-PHY-oriented extended packet extended to adapt to the E2E protection.

As illustrated, in the D-PHY-oriented extended packet, the AS payload including the extended packet header (ePH), the packet data, and the extended packet footer (ePF) is limited as a protection range of the E2E protection.

In the extended packet header, there is described predetermined information necessary in a case where the protection range of the E2E protection is limited to the AS payload. For example, as the predetermined information described in the extended packet header, a packet count PC (Packet Count) indicating a data length of data stored in the AS payload is added to enable identification of a data length of the packet data. That is, the packet data has the byte count determined by the packet count PC. In addition, as the predetermined information described in the extended packet header, a virtual channel VC (Virtual Channel) indicating the number of lines of the virtual channels is copied to the existing packet header.

Figure 22:
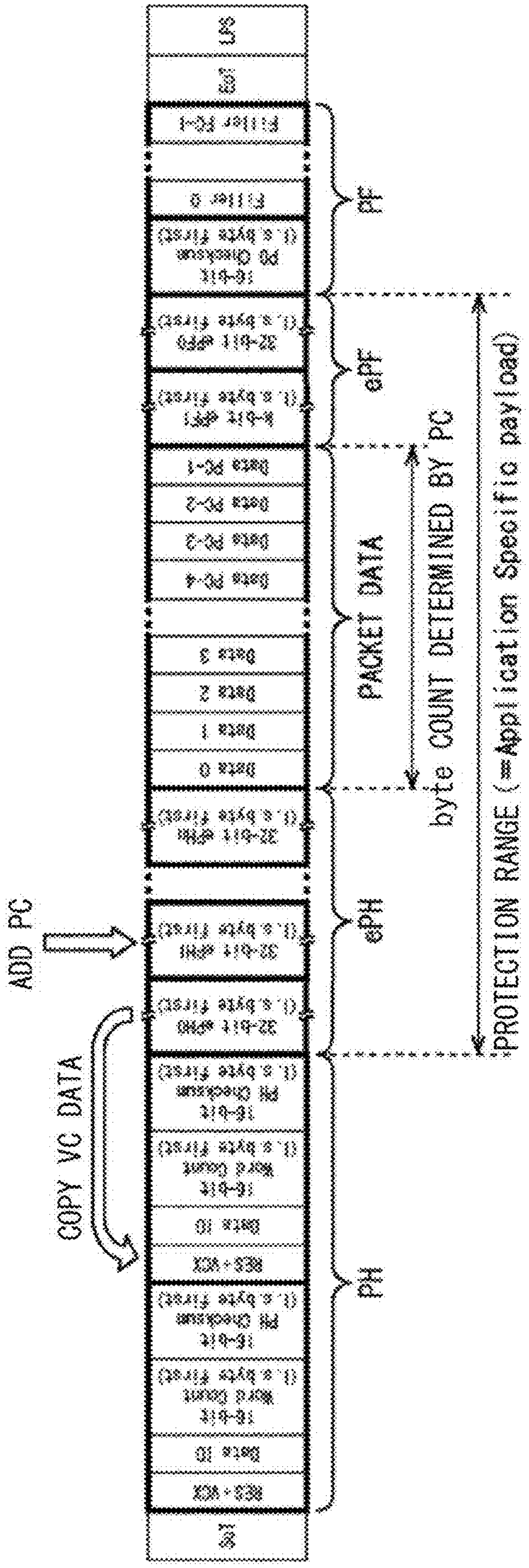
FIG. 22 is a diagram illustrating a structure example of the C-PHY-oriented extended packet corresponding to the regulation of the packet modification prohibition.

FIG. 22 illustrates a structure example of a C-PHY-oriented extended packet extended to adapt to the E2E protection.

As illustrated, in the same manner as the D-PHY-oriented extended packet, in the C-PHY-oriented extended packet, the AS payload including the extended packet header (ePH), the packet data, and the extended packet footer (ePF) is limited as the protection range of the E2E protection. Further, in the same manner as the D-PHY-oriented extended packet, in the extended packet header, there are described the packet count PC and the virtual channel VC as predetermined information necessary in a case where the protection range of the E2E protection is limited to the AS payload.

Figure 23:
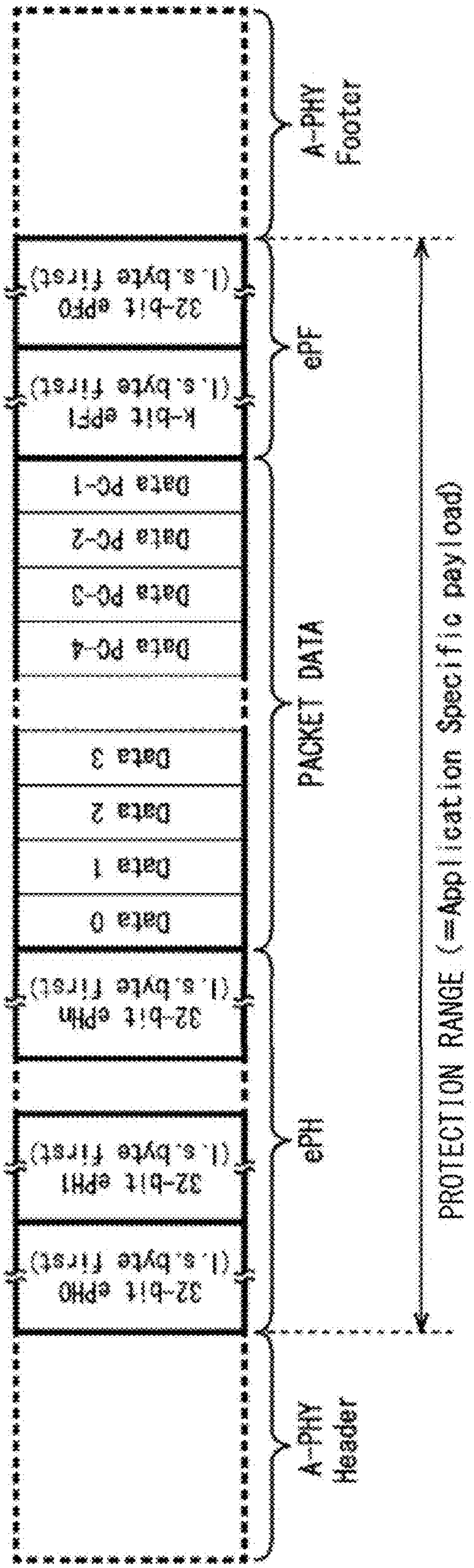
FIG. 23 is a diagram illustrating a structure example of an A-PHY-oriented extended packet corresponding to the regulation of the packet modification prohibition.

FIG. 23 illustrates a structure example of an A-PHY-oriented extended packet extended to adapt to the E2E protection.

As illustrated, also in the A-PHY-oriented extended packet, the AS payload including the extended packet header (ePH), the packet data, and the extended packet footer (ePF) is limited as the protection range of the E2E protection.

Here, as described with reference to FIG. 20, in the communication system 201, the A-PHY-oriented extended packet is generated from the D-PHY or the C-PHY-oriented extended packet transmitted from the image sensor 211 to the SerDes device 212. Accordingly, the packet count PC and the virtual channel VC have already been described in the extended packet header of the A-PHY-oriented extended packet.

Employing such a packet structure enables the communication system 201 to prevent the AS payload from being altered on the transmission path, thus making it possible to comply with the E2E protection. It is to be noted that the packet structures illustrated in FIGS. 21 to 23 can be used by partially replacing them with corresponding packets of the packet structures illustrated in FIGS. 3 to 8 and FIGS. 15 to 18, thus allowing a portion of packet generation to be replaced.

<Packet Transmission/Reception Processing Adapted to E2E Protection>

Figure 24:
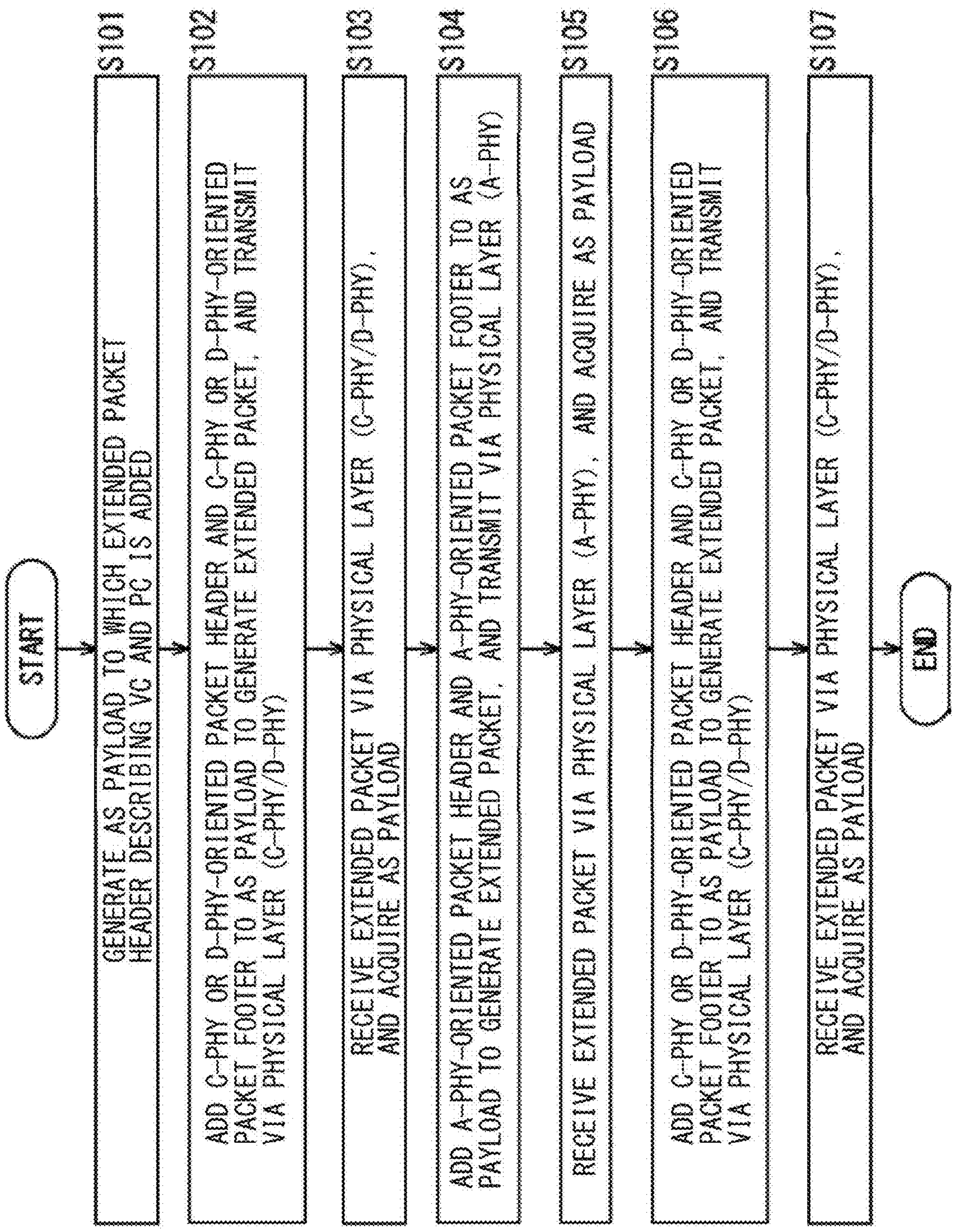
FIG. 24 is a flowchart describing packet transmission/reception processing adapted to the regulation of the packet modification prohibition.

FIG. 24 is a flowchart describing packet transmission/reception processing adapted to the E2E protection.

For example, when data (e.g., image data, etc.) to be stored in the packet data is supplied to the extension mode adaptive CSI-2 transmission circuit 221, the processing is started. Then, in step S101, in the image sensor 211, the extension mode adaptive CSI-2 transmission circuit 221 stores the supplied data in the packet data. Further, the extension mode adaptive CSI-2 transmission circuit 221 generates the extended packet header describing the virtual channel VC and the packet count PC as illustrated in FIG. 21 or 22 described above. Then, the extension mode adaptive CSI-2 transmission circuit 221 generates the AS payload by adding, to the packet data, the extended packet header and the extended packet footer.

In step S102, the extension mode adaptive CSI-2 transmission circuit 221 generates the C-PHY or D-PHY-oriented extended packet by adding, to the AS payload generated in step S101, the C-PHY or D-PHY-oriented packet header or the C-PHY or D-PHY-oriented packet footer. Then, the extension mode adaptive CSI-2 transmission circuit 221 transmits the C-PHY or D-PHY-oriented extended packet to the SerDes device 212 via the C/D-PHY physical layer processing section 222.

In step S103, in the SerDes device 212, the CSI-2 reception circuit 231 receives, via the C/D-PHY physical layer processing section 232, the C-PHY or D-PHY-oriented extended packet transmitted from the image sensor 211 in step S102. Then, the CSI-2 reception circuit 231 acquires the AS payload excluding a packet header and a packet footer from the received extended packet, and supplies the AS payload as it is to the CSI-2-oriented A-PHY packet generation section 235.

In step S104, in the SerDes device 212, the CSI-2-oriented A-PHY packet generation section 235 generates the A-PHY-oriented extended packet by adding an A-PHY-oriented packet header and an A-PHY-oriented packet footer to the AS payload supplied from the CSI-2 reception circuit 231. Then, the CSI-2-oriented A-PHY packet generation section 235 transmits the A-PHY-oriented extended packet to the SerDes device 213 via the A-PHY-adapted physical layer processing section 237.

In step S105, in the SerDes device 213, a CSI-2-oriented A-PHY packet reception section 245 receives the A-PHY-oriented extended packet transmitted from the SerDes device 212 in step S104 via the A-PHY-adapted physical layer processing section 247. Then, the CSI-2-oriented A-PHY packet reception section 245 acquires the AS payload excluding a packet header and a packet footer from the received extended packet, and supplies the AS payload as it is to the CSI-2 transmission circuit 241.

In step S106, the CSI-2 transmission circuit 241 generates a C-PHY or D-PHY-oriented extended packet by adding the C-PHY or D-PHY-oriented packet header and the C-PHY or D-PHY-oriented packet footer to the AS payload supplied from the CSI-2-oriented A-PHY packet reception section 245 in step S105. Then, the CSI-2 transmission circuit 241 transmits the C-PHY or D-PHY-oriented extended packet to the application processor 214 via the C/D-PHY physical layer processing section 242.

In step S107, in the application processor 214, the extension mode adaptive CSI-2 reception circuit 251 receives, via the C/D-PHY physical layer processing section 252, the C-PHY or D-PHY-oriented extended packet transmitted from the SerDes device 213 in step S106. Then, the extension mode adaptive CSI-2 reception circuit 251 acquires the AS payload excluding a packet header and a packet footer from the received extended packet, and outputs various types of data stored in the packet data of the AS payload to an LSI (unillustrated) of a subsequent stage. Thereafter, the packet transmission/reception processing adapted to the E2E protection is finished, and similar processing is repeatedly performed for the next extended packet.

As described above, the communication system 201 is able to transmit and receive the extended packet without altering the AS payload on the transmission path by executing the packet transmission/reception processing adapted to the E2E protection. At this time, for example, even in a case where the physical layer of the image sensor 211 is the D-PHY and the physical layer of the application processor 214 is the C-PHY, i.e., in a case where the respective interfaces are different, it is possible to comply with the E2E protection.

<Detailed Configuration Example of Image Sensor 211>

Figure 25:
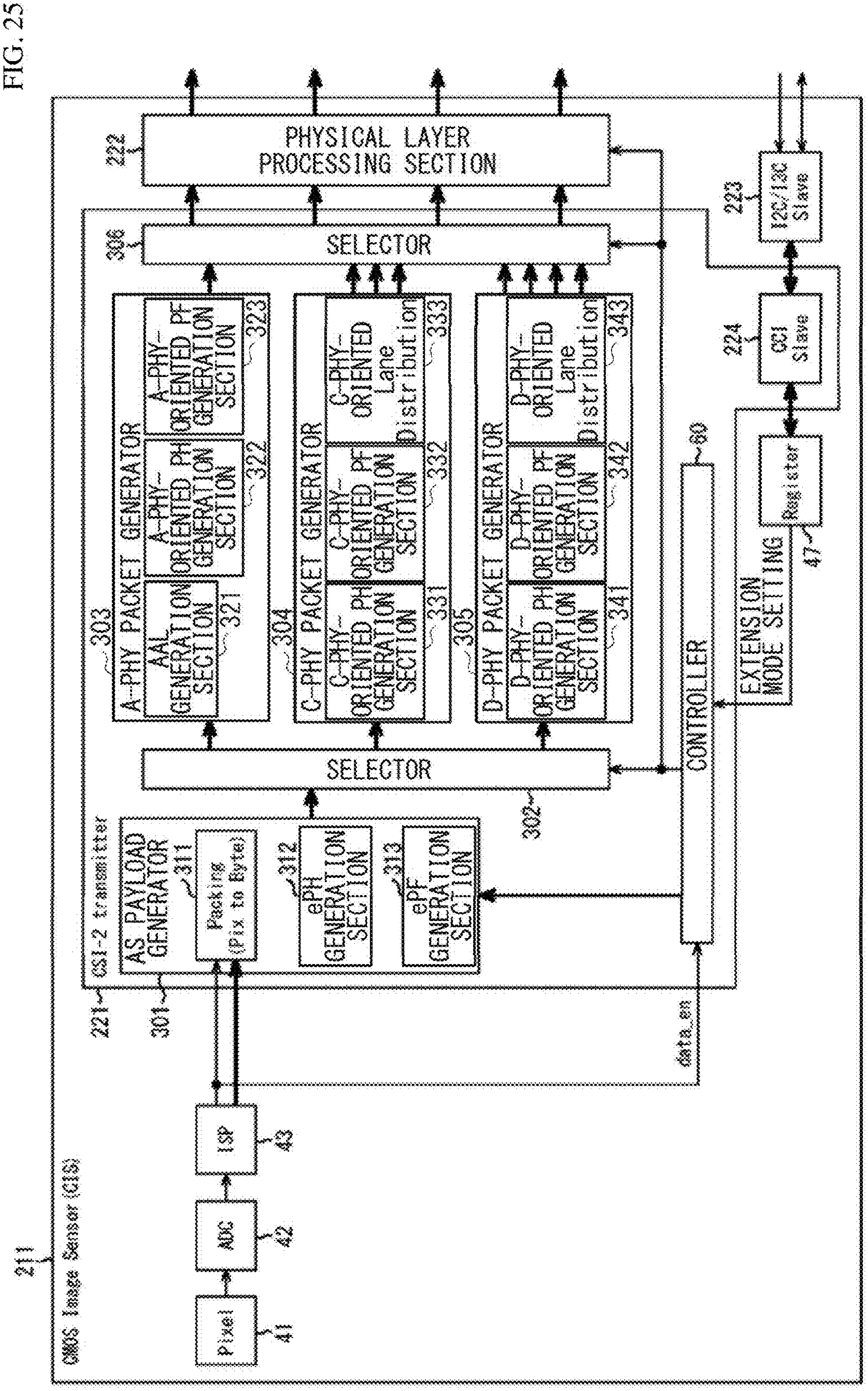
FIG. 25 is a block diagram illustrating a configuration example of an image sensor adapted to the regulation of the packet modification prohibition.

FIG. 25 is a block diagram illustrating a detailed configuration example of the image sensor 211. It is to be noted that, in the image sensor 211 illustrated in FIG. 25, configurations common to those of the image sensor 21 in FIG. 9 are denoted by the same reference numerals, and detailed descriptions thereof are omitted.

That is, in the same manner as the image sensor 21 in FIG. 9, the image sensor 211 includes the pixel 41, the AD converter 42, the image processing section 43, the register 47, and the controller 60. In addition, the image sensor 211 includes the I2C/I3C slave 223 and the CCI slave 224, which correspond to the I2C/I3C slave 46 and the CCI slave 59 in FIG. 9, respectively.

Further, the image sensor 211 includes the extension mode adaptive CSI-2 transmission circuit 221 and the physical layer processing section 222, and the physical layer processing section 222 adapts to the A-PHY, the C-PHY, and the D-PHY.

The extension mode adaptive CSI-2 transmission circuit 221 includes, in addition to the controller 60 and the CCI slave 224, an AS payload generator 301, a selector 302, an A-PHY packet generator 303, a C-PHY packet generator 304, a D-PHY packet generator 305, and a selector 306.

The AS payload generator 301 generates an AS payload limited as a protection range of the E2E protection, and outputs it to the selector 302. For example, the AS payload generator 301 includes a packing section 311, an extended packet header generation section 312, and an extended packet footer generation section 313.

The packing section 311 packs image data supplied, as data to be transmitted, from the image processing section 43, and generates packet data of the byte count determined by the packet count PC. For example, the controller 60 is able to control the byte count of the packet data generated by the packing section 311 in accordance with a set value (e.g., image size, etc.) stored in the register 47.

As described with reference to FIGS. 21 to 23, for example, the extended packet header generation section 312 generates an extended packet header in which the packet count PC and the virtual channel VC are described, and adds it to the packet data. The extended packet footer generation section 313 generates an extended packet footer, and adds it to the packet data.

Under the control of the controller 60, the selector 302 selects one of the A-PHY packet generator 303, the C-PHY packet generator 304, or the D-PHY packet generator 305 provided in parallel, as an output destination of the AS payload supplied from the AS payload generator 301.

The A-PHY packet generator 303 generates an A-PHY-oriented extended packet from the AS payload supplied via the selector 302, and outputs it to the selector 306. For example, the A-PHY packet generator 303 includes an AAL generation section 321, an A-PHY-oriented packet header generation section 322, and an A-PHY-oriented packet footer generation section 323.

For example, the AAL (A-PHY Adaptation Layer) generation section 321 divides the AS payload generated by the AS payload generator 301 into those of every 380 bytes in a hierarchy referred to as Adaptation Layer. Then, the A-PHY-oriented packet header generation section 322 adds the A-PHY-oriented packet header to the divided AS payload, and the A-PHY-oriented packet footer generation section 323 adds the A-PHY-oriented packet footer.

The C-PHY packet generator 304 generates a C-PHY-oriented extended packet from the AS payload supplied via the selector 302, and outputs it to the selector 306. For example, the C-PHY packet generator 304 includes a C-PHY-oriented packet header generation section 331, a C-PHY-oriented packet footer generation section 332, and a C-PHY-oriented lane distribution section 333.

For example, the C-PHY-oriented packet header generation section 331 adds the C-PHY-oriented packet header to the AS payload generated by the AS payload generator 301, and the C-PHY-oriented packet footer generation section 332 adds the C-PHY-oriented packet footer thereto. Then, the C-PHY-oriented lane distribution section 333 distributes the C-PHY-oriented extended packet to three lanes in accordance with the CSI-2 standard.

The D-PHY packet generator 305 generates a D-PHY-oriented extended packet from the AS payload supplied via the selector 302, and outputs it to the selector 306. For example, the D-PHY packet generator 305 includes a D-PHY-oriented packet header generation section 341, a D-PHY-oriented packet footer generation section 342, and a D-PHY-oriented lane distribution section 343.

For example, the D-PHY-oriented packet header generation section 341 adds the D-PHY-oriented packet header to the AS payload generated by the AS payload generator 301, and the D-PHY-oriented packet footer generation section 342 adds the D-PHY-oriented packet footer thereto. Then, the D-PHY-oriented lane distribution section 343 distributes the D-PHY extended packet to four lanes in accordance with the CSI-2 standard.

For example, the D-PHY-oriented packet header generation section 341 adds the D-PHY-oriented packet header to the AS payload generated by the AS payload generator 301, and the D-PHY-oriented packet footer generation section 342 adds the D-PHY-oriented packet footer thereto. Then, the D-PHY-oriented lane distribution section 343 distributes the D-PHY-oriented extended packet to four lanes in accordance with the CSI-2 standard.

Under the control of the controller 60, the selector 306 selects one of the A-PHY packet generator 303, the C-PHY packet generator 304, and the D-PHY packet generator 305 provided in parallel, as an output source of the extended packet to be supplied to the physical layer processing section 222.

Then, in a case where the A-PHY-oriented extended packet is supplied from the A-PHY packet generator 303, the physical layer processing section 222 transmits the A-PHY-oriented extended packet in one lane. In addition, in a case where the C-PHY-oriented extended packet is supplied from the C-PHY packet generator 304, the physical layer processing section 222 transmits the C-PHY-oriented extended packet in three lanes. In addition, in a case where the D-PHY-oriented extended packet is supplied from the D-PHY packet generator 305, the physical layer processing section 222 transmits the D-PHY-oriented extended packet in four lanes.

In the image sensor 211 configured as described above, the extension mode adaptive CSI-2 transmission circuit 221 is configured to allow the AS payload generator 301 to be coupled, via the selector 302, to the A-PHY packet generator 303, the C-PHY packet generator 304, and the D-PHY packet generator 305. This enables the image sensor 211 to generate, in one AS payload generator 301, the AS payload common to the A-PHY-oriented extended packet, the C-PHY-oriented extended packet, and the D-PHY-oriented extended packet. That is, the A-PHY packet generator 303, the C-PHY packet generator 304, and the D-PHY packet generator 305 are able to share the AS payload generator 301, thereby making it possible to achieve a reduction in circuit size. Thus, it is possible to achieve miniaturization of the image sensor 211.

<Detailed Configuration Example of Application Processor 214>

Figure 26:
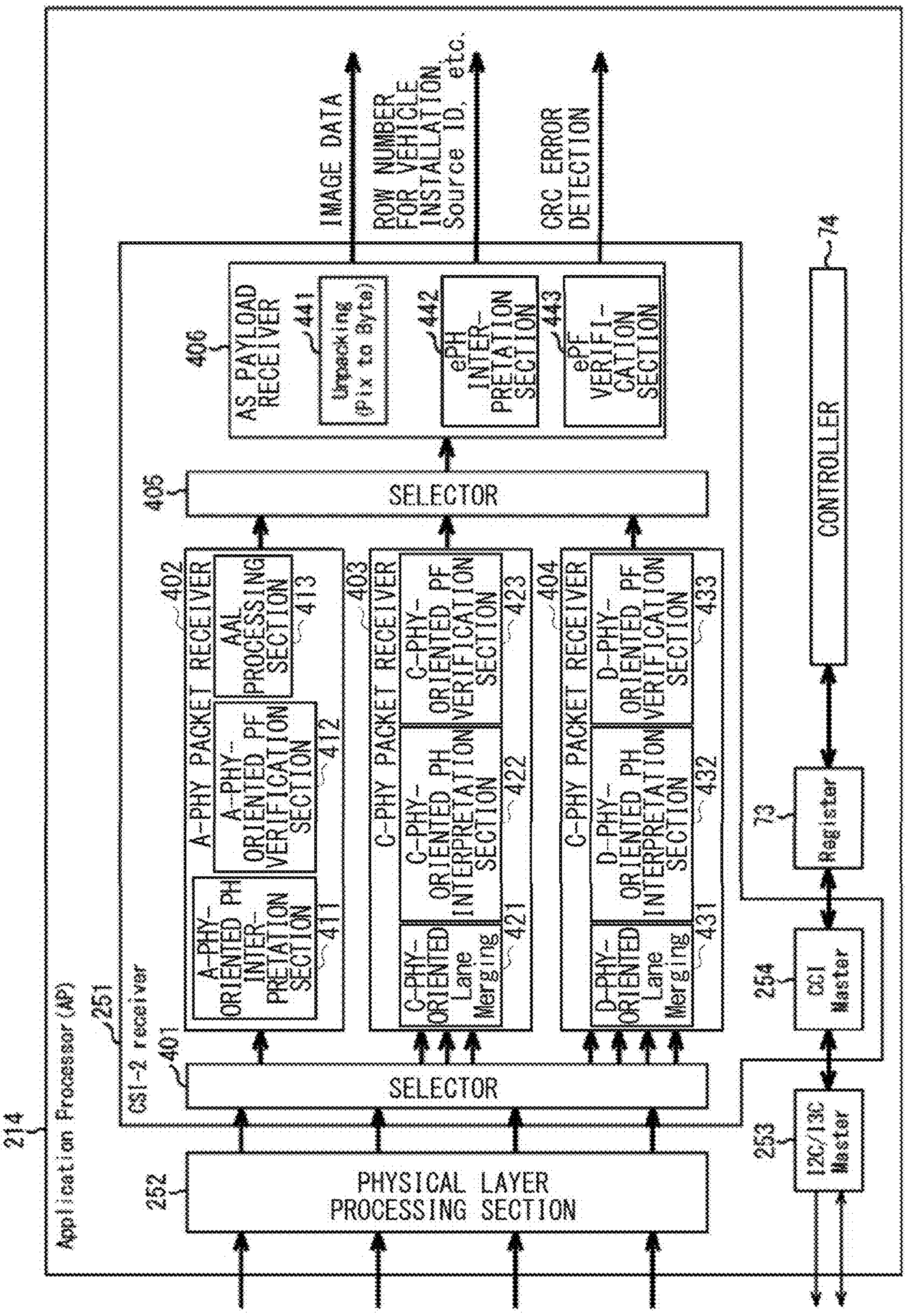
FIG. 26 is a block diagram illustrating a configuration example of an application processor adapted to the regulation of the packet modification prohibition.

FIG. 26 is a block diagram illustrating a detailed configuration example of the application processor 214. It is to be noted that, in the application processor 214 illustrated in FIG. 26, configurations common to those of the application processor 22 in FIG. 10 are denoted by the same reference numerals, and detailed descriptions thereof are omitted.

That is, the application processor 214 includes the register 73 and the controller 74 in the same manner as the application processor 22 in FIG. 10. It is to be noted that the controller 74 may be implemented by software. In addition, the application processor 214 includes the I2C/I3C master 253 and the CCI master 254, which correspond to the I2C/I3C master 72 and the CCI master 88 in FIG. 10, respectively.

Further, the application processor 214 includes the extension mode adaptive CSI-2 reception circuit 251 and the physical layer processing section 252, and the physical layer processing section 252 adapts to the A-PHY, the C-PHY, and the D-PHY.

The extension mode adaptive CSI-2 reception circuit 251 includes, in addition to the CCI master 254, a selector 401, an A-PHY packet receiver 402, a C-PHY packet receiver 403, a D-PHY packet receiver 404, a selector 405, and an AS payload receiver 406.

The selector 401 selects one of the A-PHY packet receiver 402, the C-PHY packet receiver 403, and the D-PHY packet receiver 404 provided in parallel, as an output destination of the extended packet supplied from the physical layer processing section 252.

The A-PHY packet receiver 402 receives the A-PHY-oriented extended packet supplied via the selector 401, and outputs it to the selector 405. For example, the A-PHY packet receiver 402 includes an A-PHY-oriented packet header interpretation section 411, an A-PHY-oriented packet footer verification section 412, and an AAL processing section 413.

For example, the A-PHY-oriented packet header interpretation section 411 interprets the content described in the A-PHY-oriented packet header, and performs processing necessary to receive the A-PHY-oriented extended packet, and the A-PHY-oriented packet footer verification section 412 verifies the presence or absence of an error using the A-PHY-oriented packet footer. Then, the AAL processing section 413 performs processing to combine the divided Adaptation Layers in the AAL generation section 321 in FIG. 25.

The C-PHY packet receiver 403 receives the C-PHY-oriented extended packet supplied via the selector 401, and outputs it to the selector 405. For example, the C-PHY packet receiver 403 includes a C-PHY-oriented lane merging section 421, a C-PHY-oriented packet header interpretation section 422, and a C-PHY-oriented packet footer verification section 423.

For example, the C-PHY-oriented lane merging section 421 merges C-PHY-oriented extended packets distributed in three lanes in accordance with the CSI-2 standard and provided via the physical layer processing section 252. Then, the C-PHY-oriented packet header interpretation section 422 interprets the content described in the C-PHY-oriented packet header, and performs processing necessary to receive the C-PHY-oriented extended packet, and the C-PHY-oriented packet footer verification section 423 verifies the presence or absence of an error using the C-PHY-oriented packet footer.

The D-PHY packet receiver 404 receives the D-PHY-oriented extended packet supplied via the selector 401, and outputs it to the selector 405. For example, the D-PHY packet receiver 404 includes a D-PHY-oriented lane merging section 431, a D-PHY-oriented packet header interpretation section 432, and a D-PHY-oriented packet footer verification section 433.

For example, the D-PHY-oriented lane merging section 431 merges D-PHY-oriented extended packets distributed in four lanes in accordance with the CSI-2 standard and provided via the physical layer processing section 252. Then, the D-PHY-oriented packet header interpretation section 432 interprets the content described in the D-PHY-oriented packet header and performs processing necessary to receive the D-PHY-oriented extended packet, and the D-PHY-oriented packet footer verification section 433 verifies the presence or absence of an error using the D-PHY-oriented packet footer.

The selector 405 selects one of the A-PHY packet receiver 402, the C-PHY packet receiver 403, and the D-PHY packet receiver 404 provided in parallel, as an output source of the extended packet to be supplied to the AS payload receiver 406.

In a manner corresponding to the AS payload generator 301 in FIG. 25, the AS payload receiver 406 includes an unpacking section 441, an extended packet header interpretation section 442, and an extended packet footer verification section 443. The unpacking section 441 unpacks the image data packed by the packing section 311. The extended packet header interpretation section 442 interprets the extended packet header generated in the extended packet header generation section 312, and reads the packet count PC and the virtual channel VC, for example. The extended packet footer verification section 443 verifies the presence or absence of an error using the extended packet footer added by the extended packet footer generation section 313. Then, the AS payload receiver 406 outputs various types of data stored in the packet data supplied via the selector 405, e.g., image data, row number for vehicle installation, Source ID, etc., a CRC error, and the like to an LSI (unillustrated) of a subsequent stage.

In the application processor 214 configured as described above, the extension mode adaptive CSI-2 reception circuit 251 is configured to allow the AS payload receiver 406 to be coupled, via the selector 405, to the A-PHY packet receiver 402, the C-PHY packet receiver 403, and the D-PHY packet receiver 404. This enables the application processor 214 to receive, in one AS payload receiver 406, the AS payload common to the A-PHY-oriented extended packet, the C-PHY-oriented extended packet, and the D-PHY-oriented extended packet. That is, the A-PHY packet receiver 402, the C-PHY packet receiver 403, and the D-PHY packet receiver 404 are able to share the AS payload receiver 406, thereby making it possible to achieve a reduction in circuit size. Thus, it is possible to achieve miniaturization of the application processor 214.

<Second Configuration Example Adapted to E2E Protection>

Description is given, with reference to FIGS. 27 to 74, of a second configuration example adapted to E2E Protection.

<Configuration Example of A-PHY Direct Coupling Configuration>

A communication system 501 illustrated in FIG. 27 has a direct coupling configuration in which an image sensor 511 and an application processor 512 are directly coupled to each other by the A-PHY (not via the SerDes device as described later with reference to FIG. 40).

The image sensor 511 includes an A-PHY processing section 521, a CSIA processing section 522, a CSI2 processing section 523, a CSI2-FS processing section 524, a CCI processing section 525, a CCI-FS processing section 526, and a register 527.

The A-PHY processing section 521 is implemented with the CCI processing section 525 as an upper layer, and is coupled to an A-PHY processing section 531 of the application processor 512 by the MIPI A-PHY to transmit and receive the extended packet header ePH and the extended packet footer ePF.

For example, the CCI-FS processing section 526 compares Destination ID included in the extended packet header ePH and ID (Source ID) of the image sensor 511 with each other to determine whether or not the image sensor 511 is accessed.

The application processor 512 includes the A-PHY processing section 531, a CSIA processing section 532, a CSI2 processing section 533, a CSI2-FS processing section 534, a CCI processing section 535, a CCI-FS processing section 536, a register 537, and a CCI-FS switch 538.

The A-PHY processing section 531 is implemented with the CCI processing section 535 as an upper layer, and is coupled to the A-PHY processing section 521 of the image sensor 511 by the MIPI A-PHY to transmit and receive the extended packet header ePH and the extended packet footer ePF.

For example, the CCI-FS processing section 536 compares Destination ID included in the extended packet header ePH and ID (Source ID) of the application processor 512 with each other to determine whether or not the application processor 512 is accessed.

For example, the CCI-FS processing section 536 compares Destination ID included in the extended packet header ePH with ID (Source ID of the application processor 512, and determines whether or not the application processor 512 is accessed.

The CCI-FS switch 538 performs switching to allow data to be transmitted and received via the CCI-FS processing section 536 in a case where the CCI-FS processing section 536 is enabled, and to allow data to be transmitted and received not via the CCI-FS processing section 536 in a case where the CCI-FS processing section 536 is disabled.

Description is given, with reference to FIGS. 28 to 32, of transfer of a read command and read data in the communication system 501.

Figure 28:
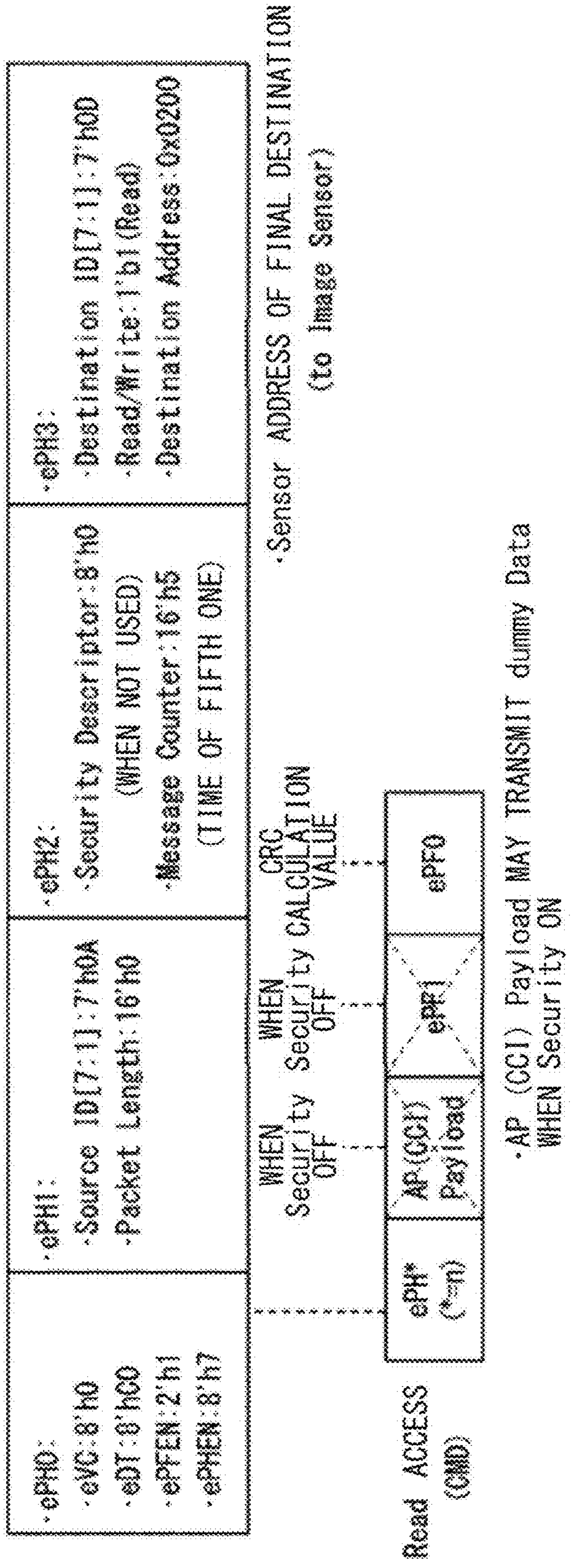
FIG. 28 is a diagram illustrating an example of a packet configuration of a read command generated on a side of the application processor.

FIG. 28 illustrates an example of a packet configuration of a read command generated in the CCI-FS processing section 536 of the application processor 512 during read access.

As illustrated in FIG. 28, the read command is configured by an extended packet header ePH*(*=n), an AP (CCI) payload, an extended packet footer ePF1, and an extended packet footer ePF0.

The extended packet header ePH*(*=n) includes, as illustrated, extended packet headers ePH0 to ePH3.

The extended packet header ePH0 stores extension VC, extension DT, extension PFEN, and extension PHEN. For example, the extension DT is information indicating a CCI protocol (I2C), and the extension DT is used to perform routing processing.

The extended packet header ePH1 stores Source ID[7:1] and Packet Length. For example, the Source ID is information indicating a transmission source of the CCI protocol (I2C), and response processing is performed on the basis of the Source ID. The Packet Length is information indicating a data length.

The extended packet header ePH2 stores Security Descriptor and Message Counter. The Security Descriptor indicates whether or not security is used, and indicates "8'h0" in a case where the security is not used. The Message Counter is information indicating the order of packets, and indicates count values by which messages are counted; the fifth message indicates "16'h5".

The extended packet header ePH3 stores Destination ID [7:1], Read/Write, and Destination Address. The Destination ID [7:1] indicates a slave address of the CCI processing section 525 of the image sensor 511, and is "7'h0D" in the illustrated example. For example, the Destination ID is information indicating a transmission destination of the CCI protocol (I2C), and routing is performed and a communication path is referenced on the basis of the Destination ID. The Read/Write indicates reading or writing of data, and indicates "1'b1" in the case of reading. The Destination Address indicates an address of the register 527 of the image sensor 511 to be the final destination, and is "0x0200" in the illustrated example.

The AP (CCI) payload stores, for example, various types of data (Data0[7:0]). The AP (CCI) payload is not transmitted when the security is off, and may store and transmit dummy data when the security is on.

The extended packet footer ePF1 is not transmitted when the security is off.

The extended packet footer ePF0 stores CRC calculation values.

In the application processor 512, the read command of such a packet structure is generated in the CCI-FS processing section 536, and is supplied to the A-PHY processing section 531.

Figure 29:
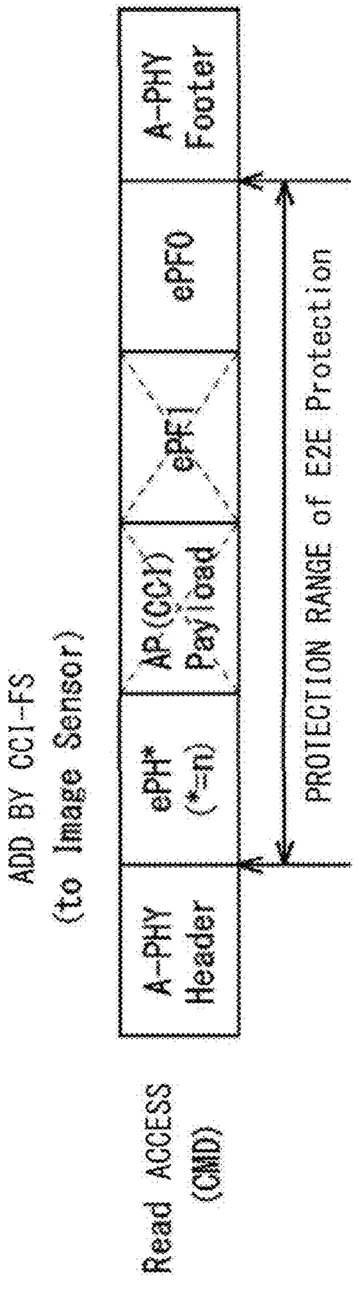
FIG. 29 is a diagram illustrating an example of a packet configuration of a read command to be subject to A-PHY transfer.

FIG. 29 illustrates an example of a packet configuration of the read command to be outputted from the A-PHY processing section 531 of the application processor 512 during the read access.

As illustrated in FIG. 29, the A-PHY processing section 531 adds an A-PHY header and an A-PHY footer using, as a protection range of the E2E Protection, the read command supplied from the CCI-FS processing section 536.

The read command of such a packet structure is subject to the A-PHY transfer by the APHY processing section 531 of the application processor 512. Then, in the image sensor 511, the A-PHY processing section 521 removes the A-PHY header and the A-PHY footer from the read command. Thereafter, the read command is supplied to the CCI-FS processing section 526 via the CCI processing section 525 of the slave address "7'h0D" indicated by the Destination ID.

Figure 30:
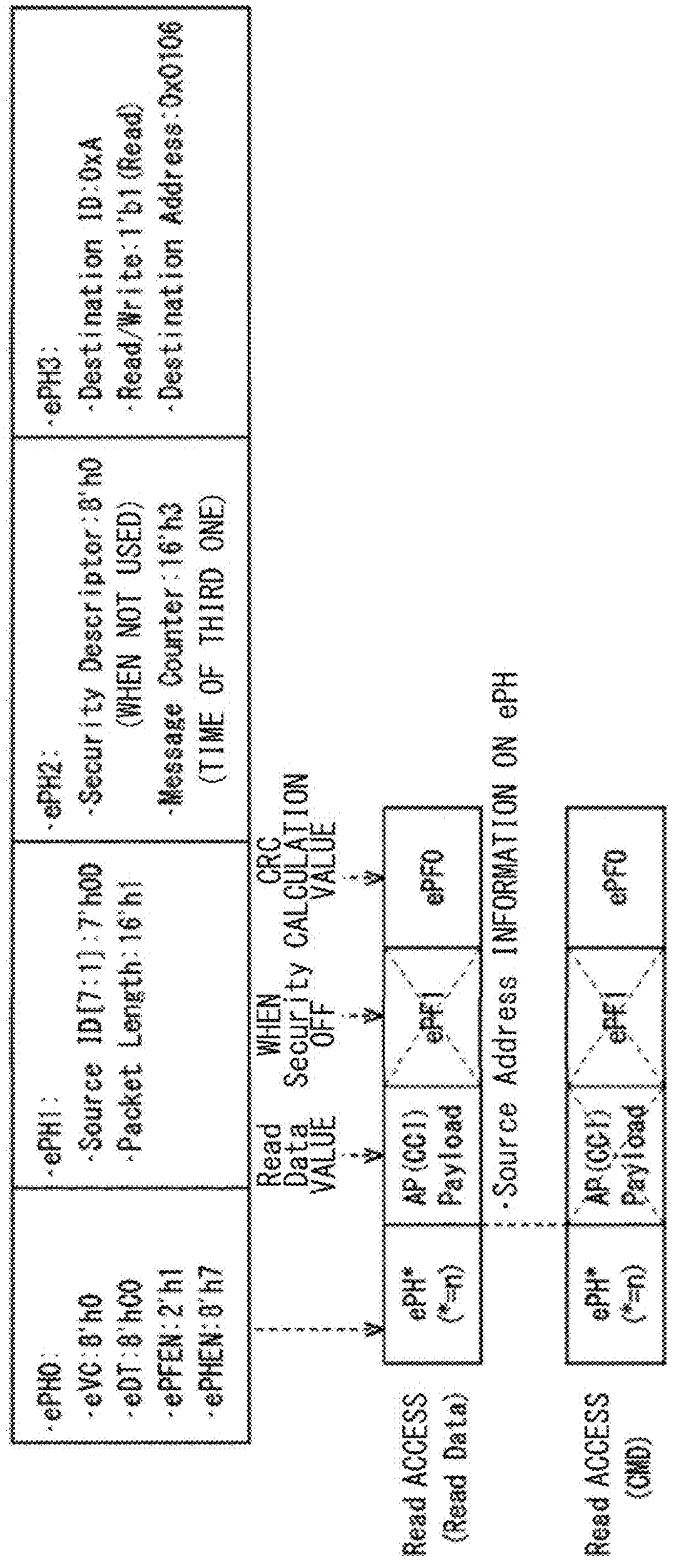
FIG. 30 is a diagram illustrating an example of packet configurations of a read command and read data on a side of the image sensor.

FIG. 30 illustrates an example of packet structures of a read command to be supplied to the CCI-FS processing section 526 and read data to be generated in the CCI-FS processing section 526 during the read access.

As illustrated in FIG. 30, the read command of the packet structure just as illustrated in FIG. 28, i.e., the read command set as the protection range of the E2E Protection in the APHY transfer is supplied to the CCI-FS processing section 526.

The read data is configured by the extended packet header the ePH*(*=n), the AP (CCI) payload, the extended packet footer ePF1, and the extended packet footer ePF0, as illustrated. Further, the AP (CCI) payload stores read data values read from the address "0x0200" of the register 527 indicated by the source address information (Destination Address) of the extended packet header ePH of the read command.

In the image sensor 511, the read data of such a packet structure is generated in the CCI-FS processing section 526, and is supplied to the A-PHY processing section 521.

Figure 31:
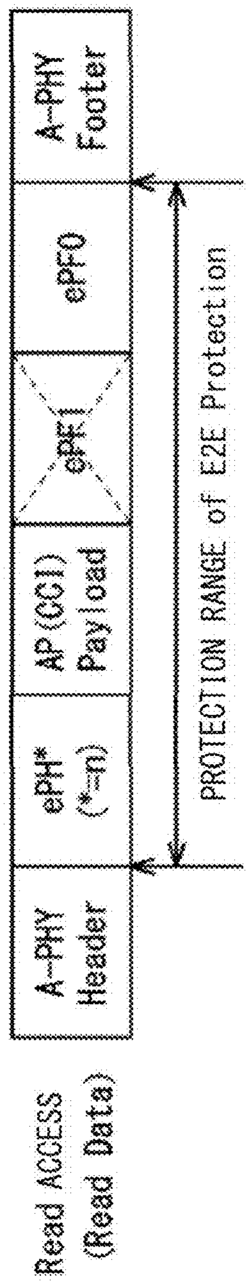
FIG. 31 is a diagram illustrating an example of a packet configuration of read data be subject to the A-PHY transfer.

FIG. 31 illustrates an example of a packet configuration of the read data to be outputted from the A-PHY processing section 521 of the image sensor 511 during the read access.

As illustrated in FIG. 31, the A-PHY processing section 521 adds an A-PHY header and an A-PHY footer using the read data supplied from the CCI-FS processing section 526 as a protection range of the E2E Protection.

The read data of such a packet structure is subject to the A-PHY transfer by the APHY processing section 521 of the image sensor 511. Then, in the application processor 512, the A-PHY processing section 521 removes the A-PHY header and the A-PHY footer from the read data, and the read data is supplied to the CCI-FS processing section 536.

Figure 32:
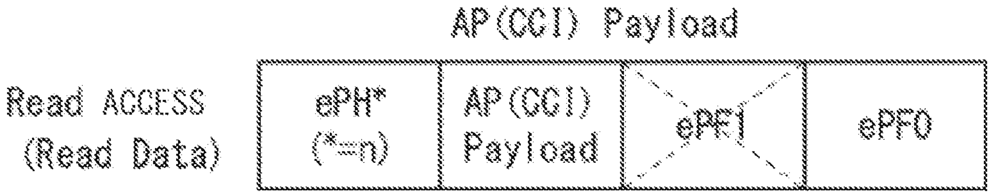
FIG. 32 is a diagram illustrating an example of a packet configuration of read data acquired on a side of the application processor.

FIG. 32 illustrates an example of a packet structure of the read data to be supplied to the CCI-FS processing section 536 during the read access.

As illustrated in FIG. 32, the read data of the packet structure just as illustrated in FIG. 30, i.e., the read data set as the protection range of the E2E Protection in the A-PHY transfer is supplied to the CCI-FS processing section 536.

Figure 33:
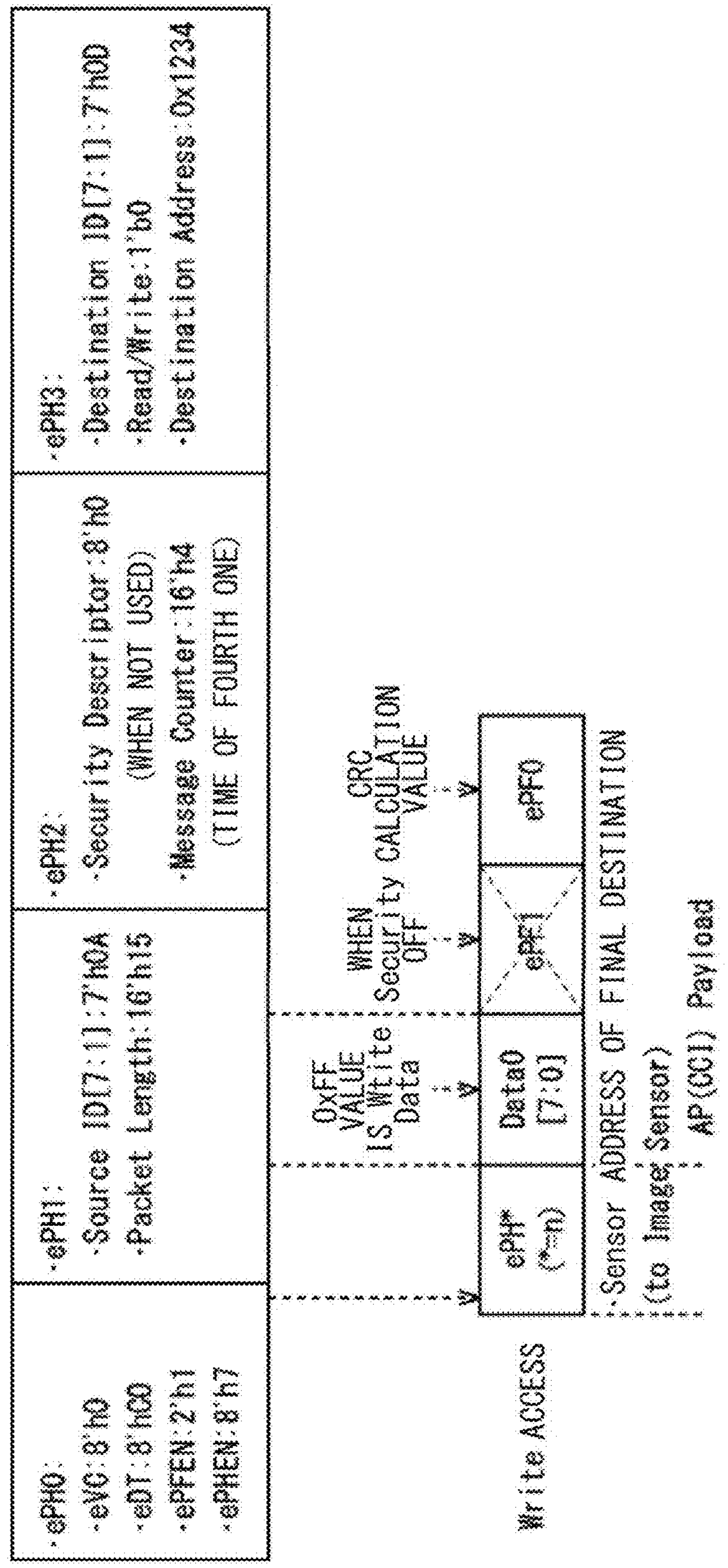
FIG. 33 is a diagram illustrating an example of a packet configuration of write data generated on the side of the application processor.
Figure 34:
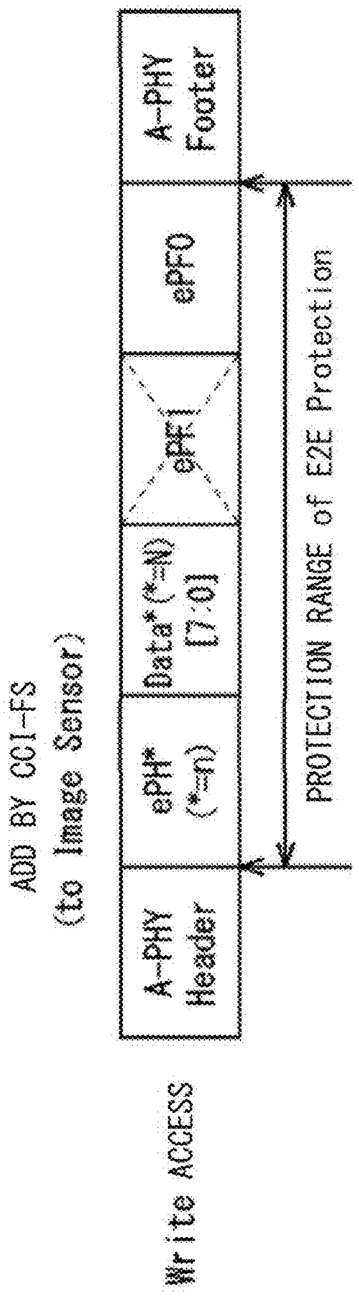
FIG. 34 is a diagram illustrating an example of a packet configuration of write data be subject to the A-PHY transfer.
Figure 35:
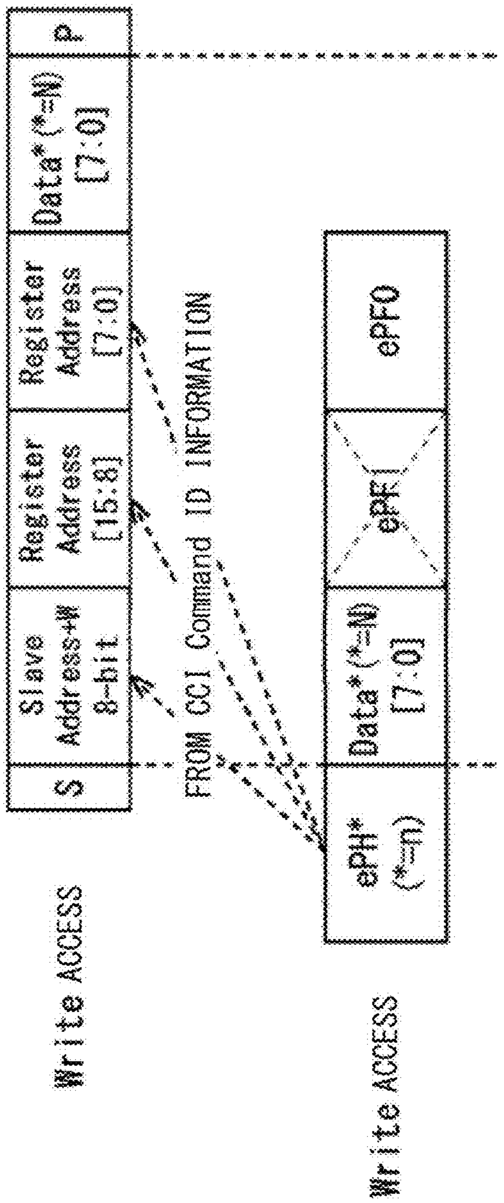
FIG. 35 is a diagram illustrating an example of a packet configuration of write data acquired on the side of the image sensor.

Description is given, with reference to FIGS. 33 to 35, of write data transfer in the communication system 501. It is to be noted that description is given by assuming an access from a state where the CCI-FS processing section 526 on a side of the image sensor 511 is enabled.

FIG. 33 illustrates an example of a packet configuration of write data to be generated in the CCI-FS processing section 536 of the application processor 512 during write access.

As illustrated in FIG. 33, the write data is configured by the extended packet header the ePH*(*=n), AP (CCI) payload (write data), the extended packet footer ePF1, and the extended packet footer ePF0.

The extended packet header ePH*(*=n) includes the extended packet headers ePH0 to ePH3, as illustrated.

The extended packet header ePH0 stores the extension VC, the extension DT, the extension PFEN, and the extension PHEN.

The extended packet header ePH1 stores the Source ID[7:1] and the Packet Length.

The extended packet header ePH2 stores the Security Descriptor and the Message Counter. The Security Descriptor indicates whether or not security is used, and indicates "8'h0" in a case where the security is not used. The Message Counter indicates count values by which messages are counted; the fourth message indicates "16'h4".

The extended packet header ePH3 stores the Destination ID [7:1], the Read/Write, and the Destination Address. The Destination ID [7:1] indicates a slave address of the CCI processing section 525 of the image sensor 511, and is "7'h0D" in the illustrated example. The Read/Write indicates reading or writing of data, and indicates "1'b0" in the case of writing. The Destination Address indicates an address of the register 527 of the image sensor 511 to be the final destination, and is "0x1234" in the illustrated example.

The AP (CCI) payload stores data (Data0[7:0]) to be written into the image sensor 511, and a value of 0xFF is the write data.

The extended packet footer ePF1 is not transmitted when the security is off

The extended packet footer ePF0 stores CRC calculation values.

In the application processor 512, the write data of such a packet structure is generated in the CCI-FS processing section 536, and is supplied to the A-PHY processing section 531.

FIG. 34 illustrates an example of a packet configuration of the write data to be outputted from the A-PHY processing section 531 of the application processor 512 during the write access.

As illustrated in FIG. 34, the A-PHY processing section 531 adds an A-PHY header and an A-PHY footer using the write data supplied from the CCI-FS processing section 536 as a protection range of the E2E Protection.

The write data of such a packet structure is subject to the A-PHY transfer by the A-PHY processing section 531 of the application processor 512. Then, in the image sensor 511, the A-PHY processing section 521 removes the A-PHY header and the A-PHY footer from the write data. Thereafter, the write data is supplied to the CCI-FS processing section 526 via the CCI processing section 525 of the slave address "7'h0D" indicated by the Destination ID.

FIG. 35 illustrates an example of a packet structure of the write data to be supplied to the CCI-FS processing section 526 during the write access.

As illustrated in FIG. 35, the write data of the packet structure just as illustrated in FIG. 33, i.e., the write data set as the protection range of the E2E Protection in the A-PHY transfer is supplied to the CCI-FS processing section 526. Then, the CCI-FS processing section 526 writes the data stored in the AP(CCI) payload, from the address "0x1234" of the register 527 indicated by CCI command ID information, i.e., source address information (Destination Address) of the extended packet header ePH of the read command.

Figure 36:
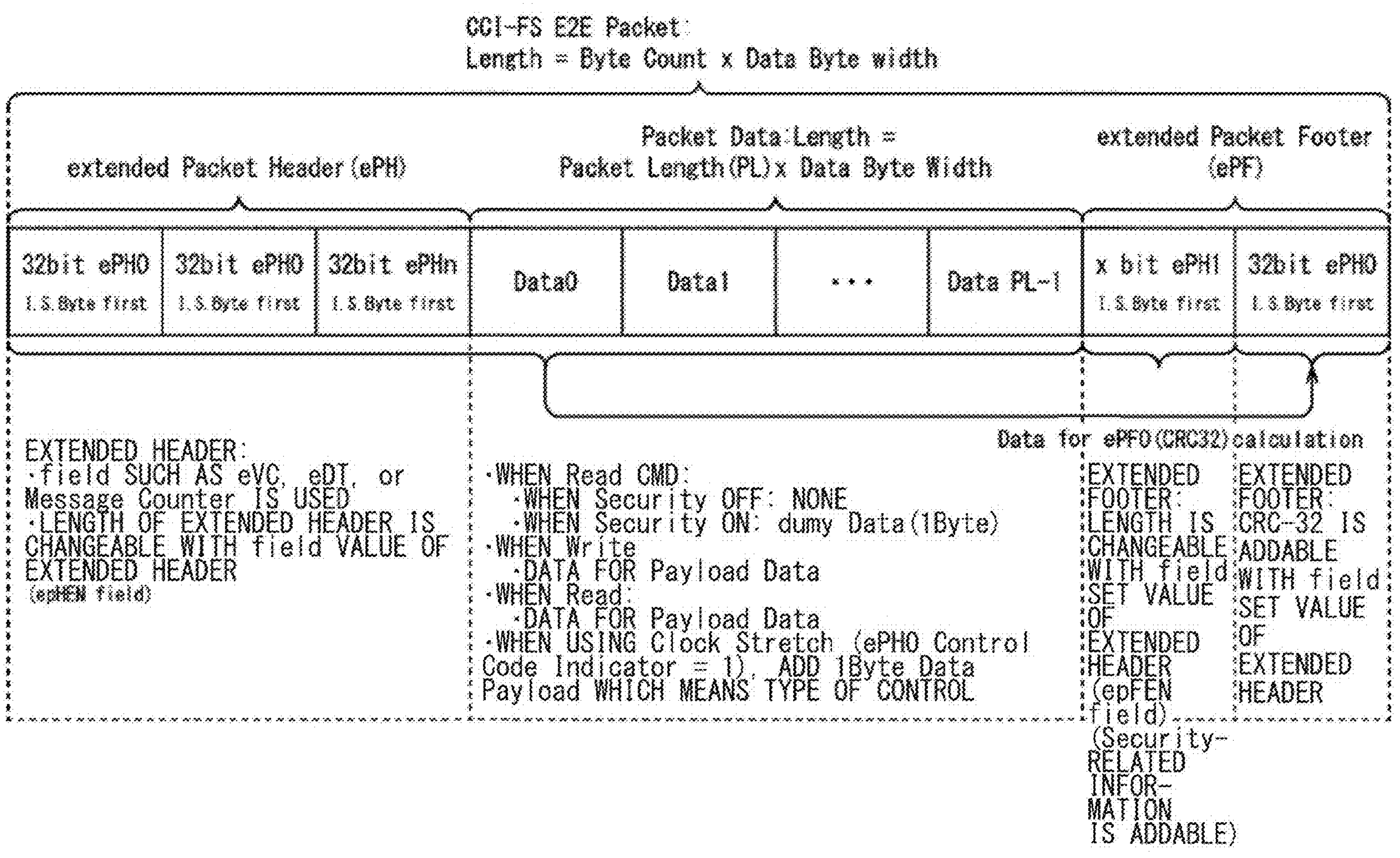
FIG. 36 is a diagram describing an overview of an extended packet header ePH and an extended packet footer ePF.

Description is given, with reference to FIG. 36, of an overview of the extended packet header ePH and the extended packet footer ePF.

As illustrated in FIG. 36, the CCI-FS E2E packet is configured by the extended packet header ePH, the packet data, and the extended packet footer ePF, and a packet length thereof is Length=Byte Count x Data Byte width.

A field such as the extension VC, the extension DT, or the Message Counter is used as the extended packet header ePH. It is possible to change the length of the extended packet header ePH using a field value (epFEN field) of the extended packet header ePH.

The packet data is configured by, for example, PL pieces of data (Data 0 to ata PL-1), and a length thereof is Length=Packet Length (PL)×Data Byte Width. In the case of a read command, the data is not stored in the packet data when the security is off; 1-byte dummy data is stored in the packet data when the security is on. In the case of write access, write data for the payload data is stored in the packet data. In the case of read access, read data for the payload data is stored in the packet data. When using Clock Stretch (ePH0 Control Code Indicator=1), 1-byte data payload meaning the type of control is added to the packet data.

It is possible to change a length of the extended packet footer ePF1 using a field set value (epFEN field) of the extended packet header ePH. In addition, it is possible to add security-related information.

It is possible to add CRC-32 calculated from the packet data to the extended packet footer ePF0 using the field set value of the extended packet header ePH.

<Processing Example of Communication Processing>

Figure 27:
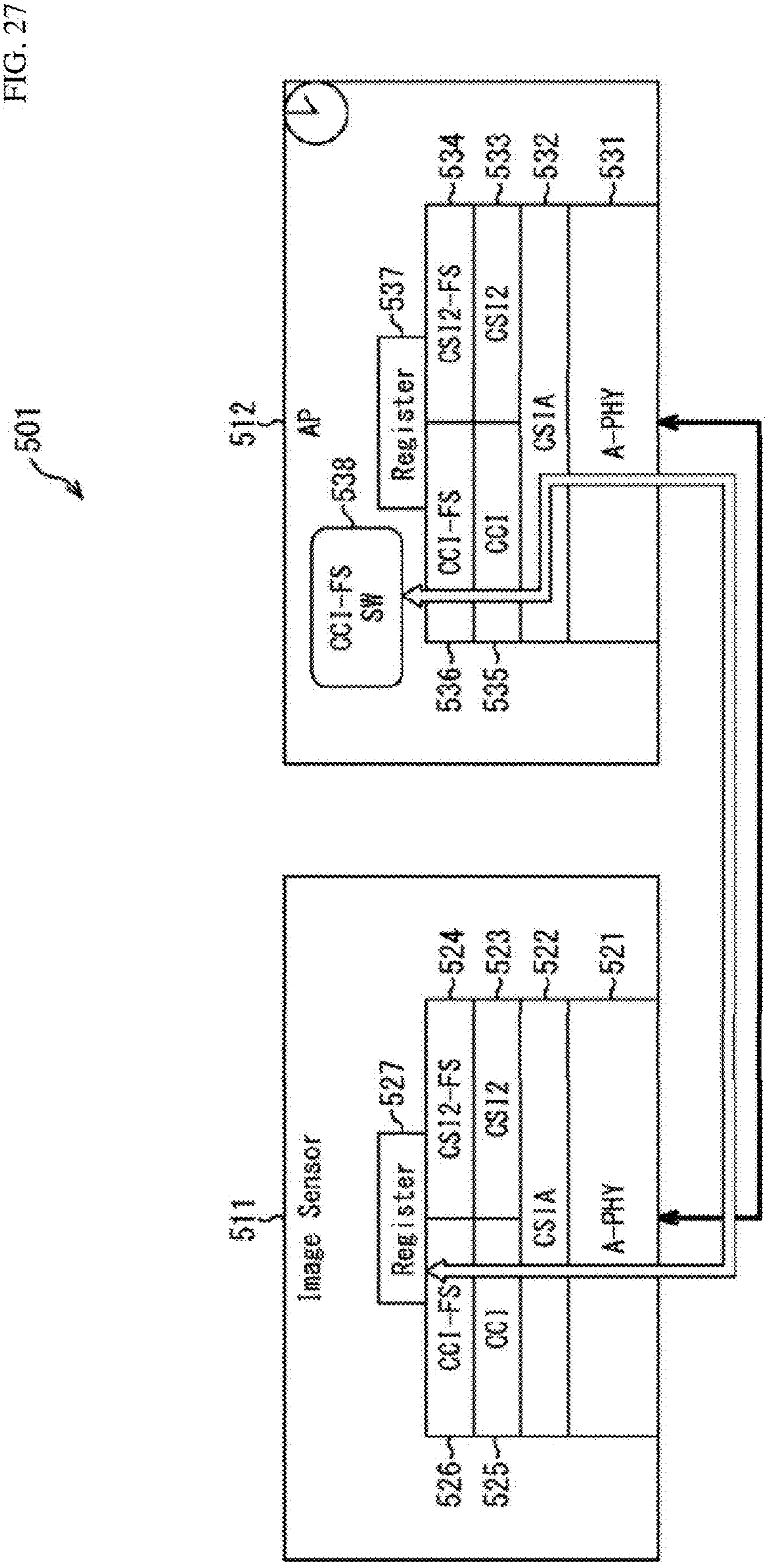
FIG. 27 is a block diagram of a configuration example of a communication system in which the image sensor and the application processor are configured to be directly coupled to each other.
Figure 37:
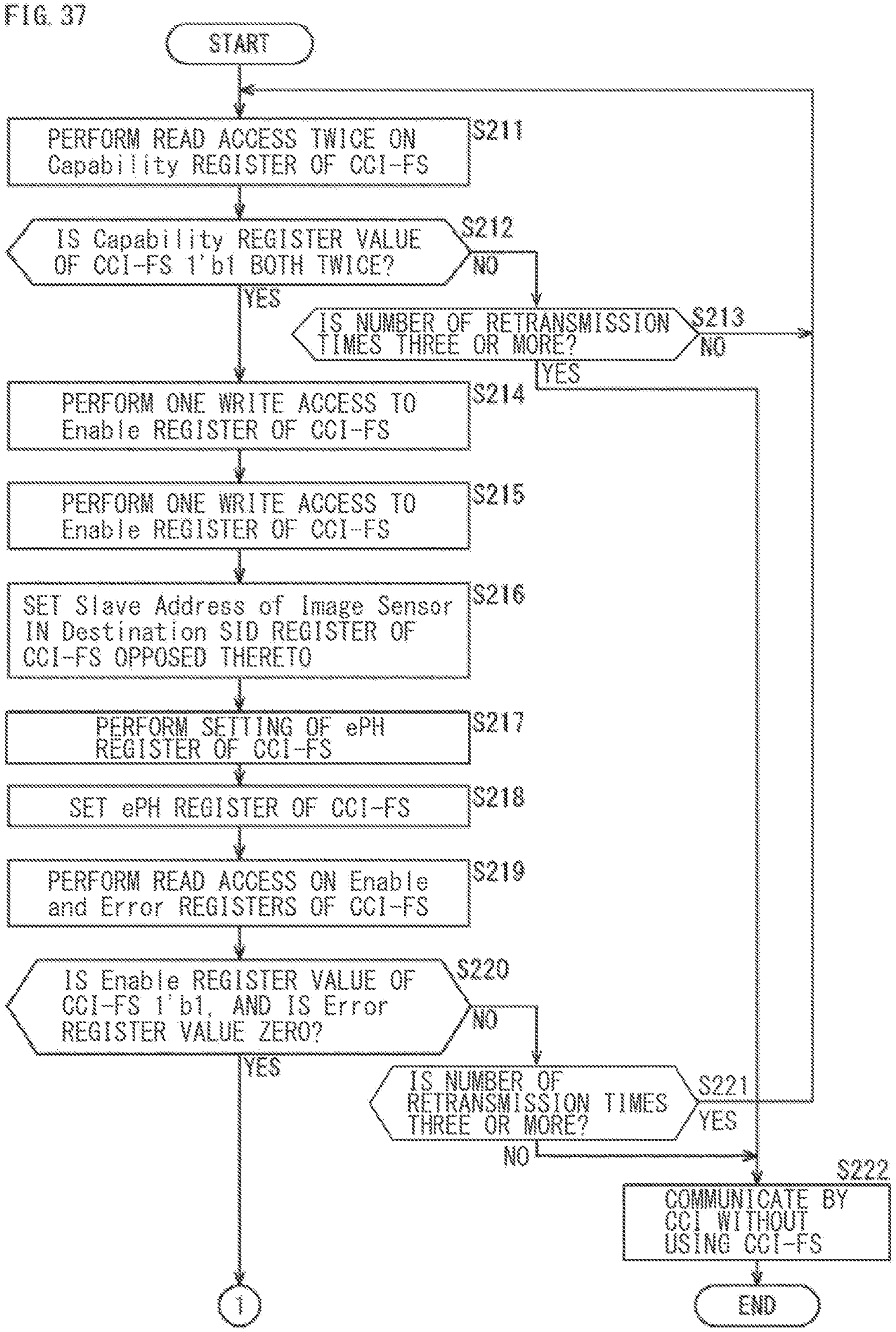
FIG. 37 is a flowchart describing an initial setting and a confirmation operation of communication processing using CCI-FS.
Figure 38:
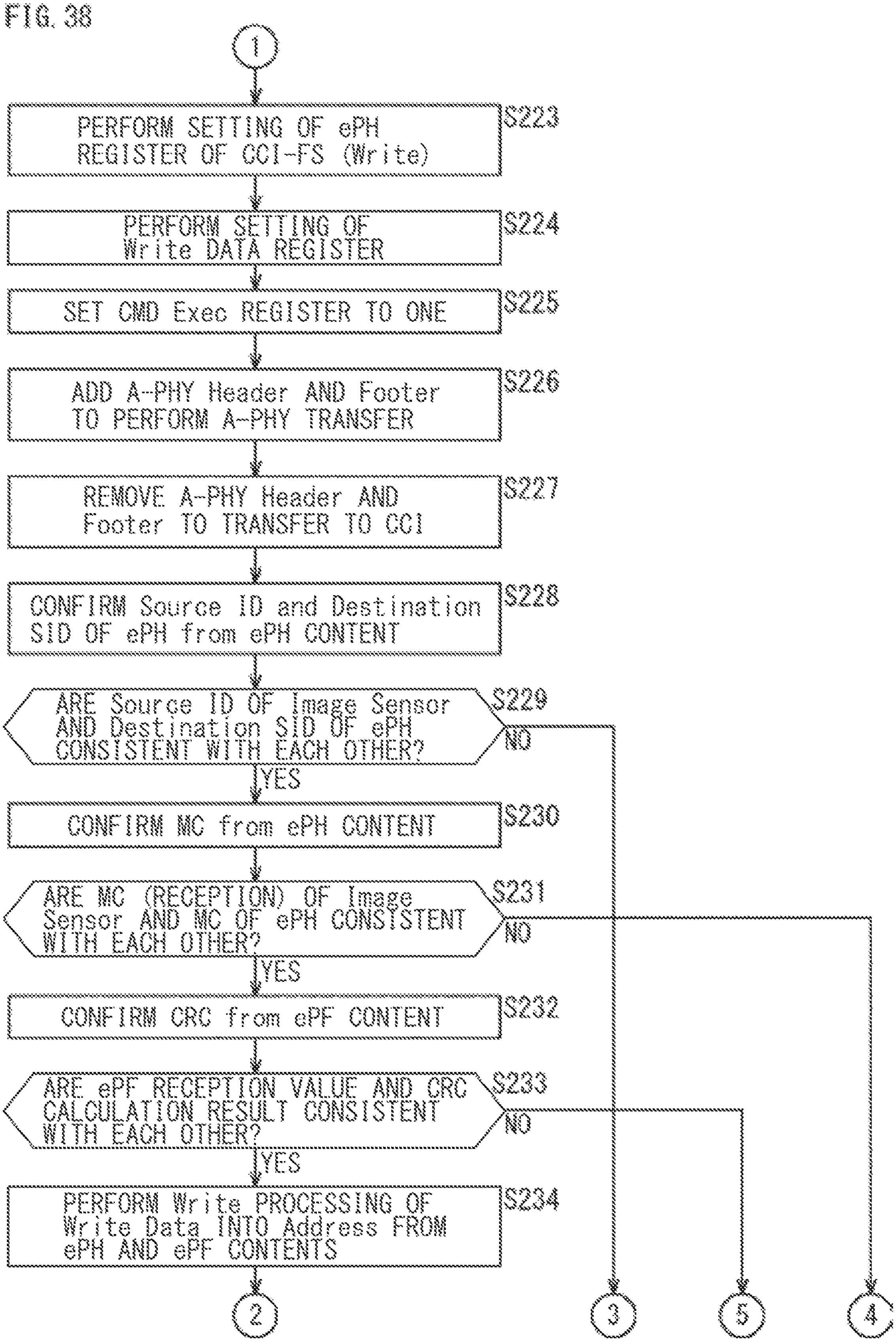
FIG. 38 is a flowchart describing a write operation using the CCI-FS.
Figure 39:
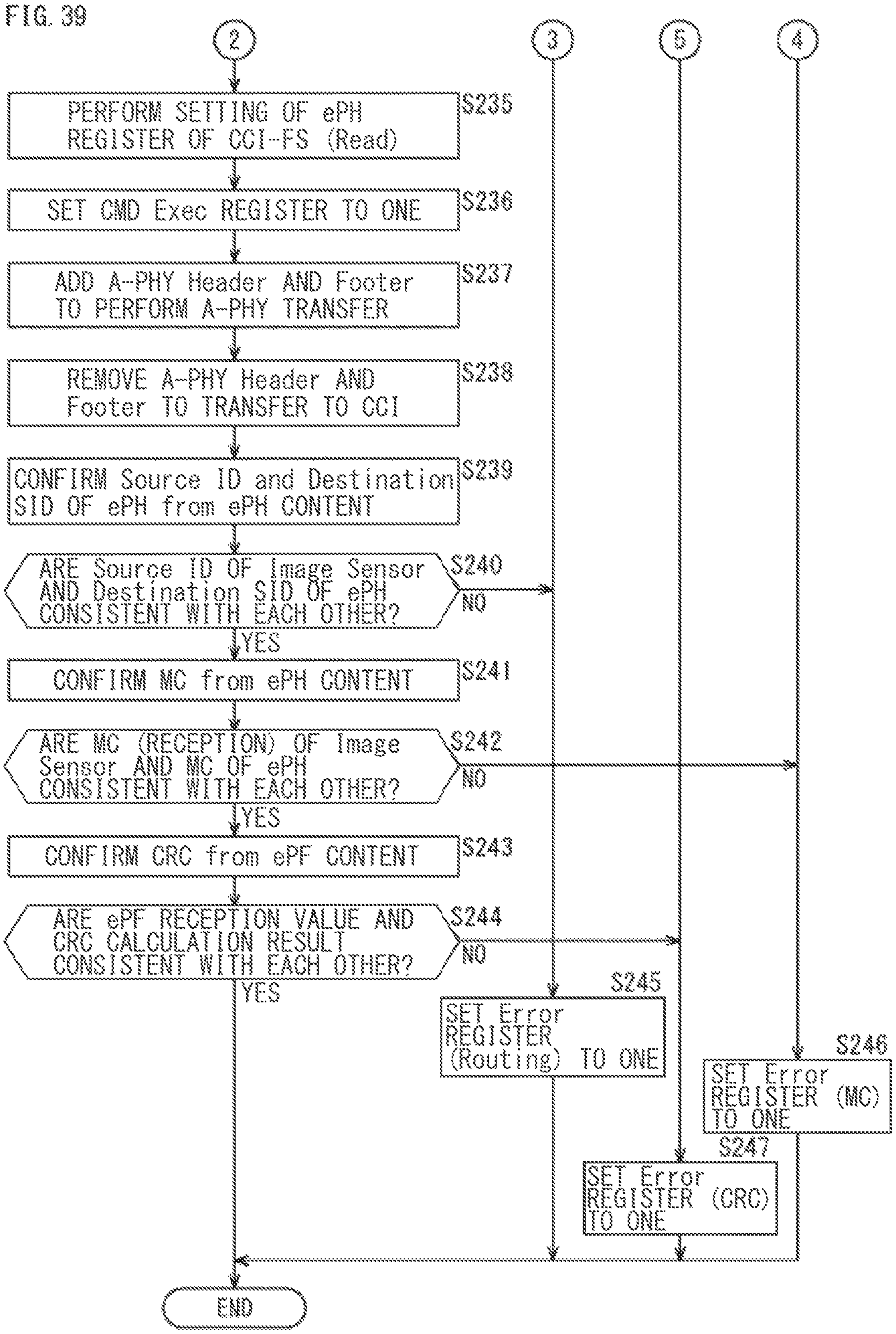
FIG. 39 is a flowchart describing a read operation using the CCI-FS.

Description is given, with reference to flowcharts of FIGS. 37 to 39, of communication processing using CCI-FS performed in the communication system 501 illustrated in FIG. 27.

As illustrated in FIG. 37, in steps S211 to S222, an initial setting and a confirmation operation are performed.

In step S211, read access is performed twice on a Capability register of the CCI-FS processing section 526 from the application processor 512 to the image sensor 511. It is to be noted that the number of times of performing the read access is not limited to two, and may be set optionally in terms of functional safety, for example, and the number of times of performing the read access may be one or multiple times of three or more.

In step S212, in the application processor 512, the CSI2-FS processing section 524 determines whether or not a Capability register value of the CCI-FS processing section 526 is 1'b1 both twice as to results of the read access in step S211. In a case where determination is made in step S212 that the Capability register value of the CCI-FS processing section 526 is not 1'b1 both twice, the processing proceeds to step S213.

In step S213, in the application processor 512, the CSI2-FS processing section 524 determines whether or not the number of times of retransmission is three times or more. It is to be noted that the number of times of retransmission is not limited to three, and may be set to any number of times; the same applies to the number of times of retransmission described below. In a case where determination is made in step S213 that the number of times of retransmission is not three or more (once or twice), the processing returns to step S211, and subsequently similar processing is repeatedly performed.

Meanwhile, in a case where determination is made in step S212 that the Capability register value of the CCI-FS processing section 526 is 1'b1 both twice, the processing proceeds to 214.

In step S214, one write access is performed on an Enable register of the CCI-FS processing section 526 from the application processor 512 to the image sensor 511.

In step S215, in the image sensor 511, the CCI-FS processing section 526 performs one write access on the Enable register of the CCI-FS processing section 536 of the application processor 512.

In step S216, a slave address of the image sensor 511 is set in a Destination SID register of the CCI-FS processing section 536 of the application processor 512 opposed thereto.

In step S217, an ePH register of the CCI-FS processing section 536 of the application processor 512 is set.

In step S218, an ePH register of the CCI-FS processing section 526 is set from the application processor 512 to the image sensor 511.

In step S219, read access is performed on the Enable register and an Error register of the CCI-FS processing section 526 from the application processor 512 to the image sensor 511.

In step S220, in the application processor 512, the CCI-FS processing section 536 determines whether or not an Enable register value of the CCI-FS processing section 526 is 1'b1 and an Error register value is zero as to results of the read access in step S219.

In a case where determination is made in step S220 that the Enable register value of the CCI-FS processing section 526 is not 1'b1 or that the Error register value is not zero, the processing proceeds to step S221.

In step S221, in the application processor 512, the CSI2-FS processing section 524 determines whether or not the number of times of retransmission is three or more. In a case where determination is made in step S221 that the number of times of retransmission is three or more, the processing returns to step S211, and subsequently similar processing is repeatedly performed.

Meanwhile, in a case where determination is made in step S213 that the number of times of retransmission is three or more, or in a case where determination is made in step S221 that the number of times of retransmission is not three or more (once or twice), the processing proceeds to step S222.

In step S222, communication is performed by the CCI without using the CCI-FS, and then the communication processing is finished.

Meanwhile, in a case where determination is made in step S220 that the Enable register value of the CCI-FS processing section 526 is 1'b1 and the Error register value is zero, the processing proceeds to step S223.

As illustrated in FIG. 38, in steps S223 to S234, a write operation using the CCI-FS is performed.

In step S223, the CCI-FS processing section 536 of the application processor 512 sets the ePH register to perform the write operation.

In step S224, the CCI-FS processing section 536 of the application processor 512 sets a write data register.

In step S225, the CCI-FS processing section 536 of the application processor 512 sets a command execution register to one.

In step S226, in the application processor 512, the A-PHY processing section 531 performs the A-PHY transfer by adding the A-PHY header and the A-PHY footer using, as a protection range of the E2E Protection, the write data generated by the CCI-FS processing section 536, as illustrated in FIG. 34 described above.

In step S227, in the image sensor 511, the A-PHY processing section 521 removes the A-PHY header and the A-PHY footer from the write data, and supplies the protection range of the E2E Protection to the CCIFS processing section 526.

In step S228, in the image sensor 511, the CCI-FS processing section 526 confirms, from a content of the extended packet header ePH, a Source ID of the image sensor 511 and a Destination SID of the extended packet header ePH.

In step S229, in the image sensor 511, the CCI-FS processing section 526 determines whether or not the Source ID of the image sensor 511 confirmed in step S228 and the Destination SID of the extended packet header ePH are consistent with each other.

In a case where determination is made in step S229 that the Source ID of the image sensor 511 and the Destination SID of the extended packet header ePH are consistent with each other, the processing proceeds to step S230.

In step S230, in the image sensor 511, the CCI-FS processing section 526 confirms the Message Counter from the content of the extended packet header ePH.

In step S231, in the image sensor 511, the CCI-FS processing section 526 determines whether or not the Message Counter (reception) of the image sensor 511 confirmed in step S230 and a Message Counter of the extended packet header ePH are consistent with each other.

In a case where determination is made in step S231 that the Message Counter (reception) of the image sensor 511 and the Message Counter of the extended packet header ePH are consistent with each other, the processing proceeds to step S232.

In step S232, in the image sensor 511, the CCI-FS processing section 526 confirms CRC from the content of the extended packet footer ePF.

In step S233, in the image sensor 511, the CCI-FS processing section 526 determines whether or not a reception value (ePF0) of the extended packet footer ePF confirmed in step S232 and a CRC calculation result calculated in the CCI-FS processing section 526 are consistent with each other.

In a case where determination is made in step S233 that the reception value (ePF0) of the extended packet footer ePF and the CRC calculation result are consistent with each other, the processing proceeds to step S234.

In step S234, in the image sensor 511, the CCI-FS processing section 526 performs write processing to write the write data into an address of the register 527, from the contents of the extended packet header ePH and the extended packet footer ePF. Thereafter, the processing proceeds to step S235.

As illustrated in FIG. 39, in steps S235 to S247, a read operation using the CCI-FS is performed.

In step S235, in the application processor 512, the CCI-FS processing section 536 sets the ePH register to allow a read operation to be performed.

In step S236, in the application processor 512, the CCI-FS processing section 536 sets a command execution register to one.

In step S237, in the application processor 512, the A-PHY processing section 531 performs the A-PHY transfer by adding the A-PHY header and the A-PHY footer using, as a protection range of the E2E Protection, the write data generated by the CCI-FS processing section 536, as illustrated in FIG. 29 described above.

In step S238, in the image sensor 511, the A-PHY processing section 521 removes the A-PHY header and the A-PHY footer from the write data, and supplies the protection range of the E2E Protection to the CCI-FS processing section 526.

In step S239, in the image sensor 511, the CCI-FS processing section 526 confirms, from the content of the extended packet header ePH, the Source ID of the image sensor 511 and the Destination SID of the extended packet header ePH.

In step S240, in the image sensor 511, the CCI-FS processing section 526 determines whether or not the Source ID of the image sensor 511 confirmed in step S239 and the Destination SID of the extended packet header ePH are consistent with each other.

In a case where determination is made in step S240 that the Source ID of the image sensor 511 and the Destination SID of the extended packet header ePH are consistent with each other, the processing proceeds to step S241.

In step S241, in the image sensor 511, the CCI-FS processing section 526 confirms the Message Counter from the content of the extended packet header ePH.

In step S242, in the image sensor 511, the CCI-FS processing section 526 determines whether or not the Message Counter (reception) of the image sensor 511 confirmed in step S241 and the Message Counter of the extended packet header ePH are consistent with each other.

In a case where determination is made in step S242 that the Message Counter (reception) of the image sensor 511 and the Message Counter of the extended packet header ePH are consistent with each other, the processing proceeds to step S243.

In step S243, in the image sensor 511, the CCI-FS processing section 526 confirms CRC from the content of the extended packet footer ePF.

In step S244, in the image sensor 511, the CCI-FS processing section 526 determines whether or not the reception value (ePF0) of the extended packet footer ePF confirmed in step S243 and the CRC calculation result calculated in the CCI-FS processing section 526 are consistent with each other.

In a case where determination is made in step S244 that the reception value (ePF0) of the extended packet footer ePF and the CRC calculation result are consistent with each other, the processing is finished.

Meanwhile, in a case where determination is made, in step S229 in FIG. 38 or in step S240 in FIG. 39, that the Source ID of the image sensor 511 and the Destination SID of the extended packet header ePH are not consistent with each other, the processing proceeds to step S245.

In step S245, an Error register (Routing) on the side of the image sensor 511 is set to one, and thereafter the processing is finished.

Meanwhile, in a case where determination is made, in step S231 in FIG. 38 or in step S242 in FIG. 39, that the Message Counter (reception) of the image sensor 511 and the Message Counter of the extended packet header ePH are not consistent with each other, the processing proceeds to step S246.

In step S246, an Error register (MC) on the side of the image sensor 511 is set to one, and thereafter the processing is finished.

Meanwhile, in a case where determination is made, in step S233 in FIG. 38 or in step S244 in FIG. 39, that the reception value (ePF0) of the extended packet footer ePF and the CRC calculation result are not consistent with each other, the processing proceeds to step S247.

In step S247, an Error register (CRC) on the side of the image sensor 511 is set to one, and thereafter the processing is finished.

<Configuration Example of SerDes Coupling Configuration>

Figure 40:
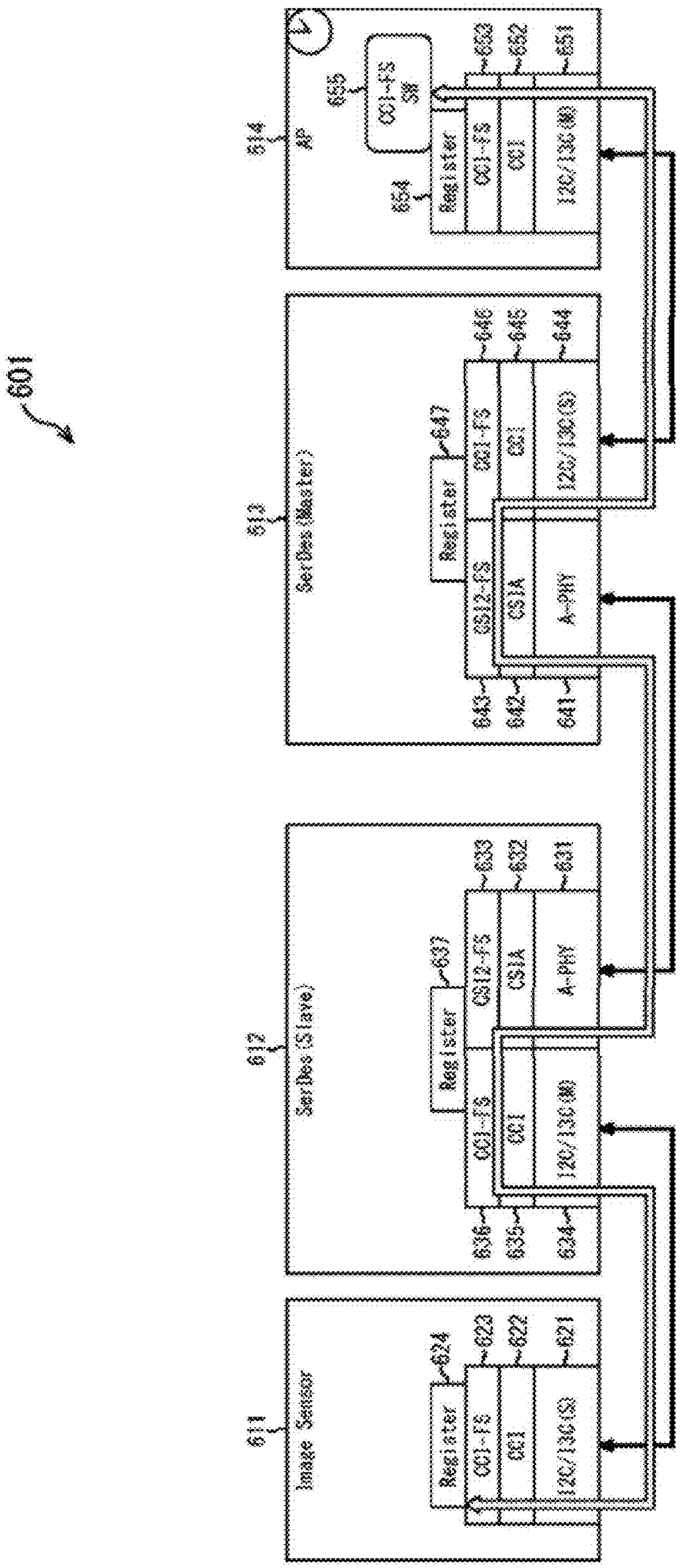
FIG. 40 is a block diagram illustrating a configuration example of a communication system in which the image sensor and the application processor are configured to be coupled by SerDes.

A communication system 601 illustrated in FIG. 40 has a SerDes coupling configuration in which an image sensor 611 and an application processor 614 are coupled to each other via a SerDes device 612 serving as a slave side and a SerDes device 613 serving as a master side.

The image sensor 611 includes an I2C/I3C slave 621, a CCI processing section 622, a CSI2-FS processing section 623, and a register 624.

The SerDes device 612 on the slave side includes an A-PHY processing section 631, a CSIA processing section 632, a CSI2-FS processing section 633, an I2C/I3C master 634, a CCI processing section 635, a CCI-FS processing section 636, and a register 637.

The SerDes device 613 on the master side includes an A-PHY processing section 641, a CSIA processing section 642, a CSI2-FS processing section 643, an I2C/I3C slave 644, a CCI processing section 645, a CCI-FS processing section 646, and a register 647.

The application processor 614 includes an I2C/I3C master 651, a CCI processing section 652, a CCIFS processing section 653, a register 654, and a CCI-FS switch 655.

It is to be noted that, in the SerDes coupling configuration as illustrated in FIG. 40, in a case where the CCI configuration or the CCI-FS configuration is implemented as an upper protocol, another SerDes standard may be used. For example, various SerDes-related standards such as PCIE, USB, DisplayPort, HDMI (registered trademark), LVDS, and FPD-LINK are applicable by implementing configurations of the extended packet header ePH, the extended packet footer ePF1, and the extended packet footer ePF0 as illustrated in FIG. 41 in a Payload from an Application Layer or an upper layer corresponding to a layer therebelow.

Description is given, with reference to FIGS. 41 to 49, of transfer of a read command and read data in the communication system 601.

Figure 41:
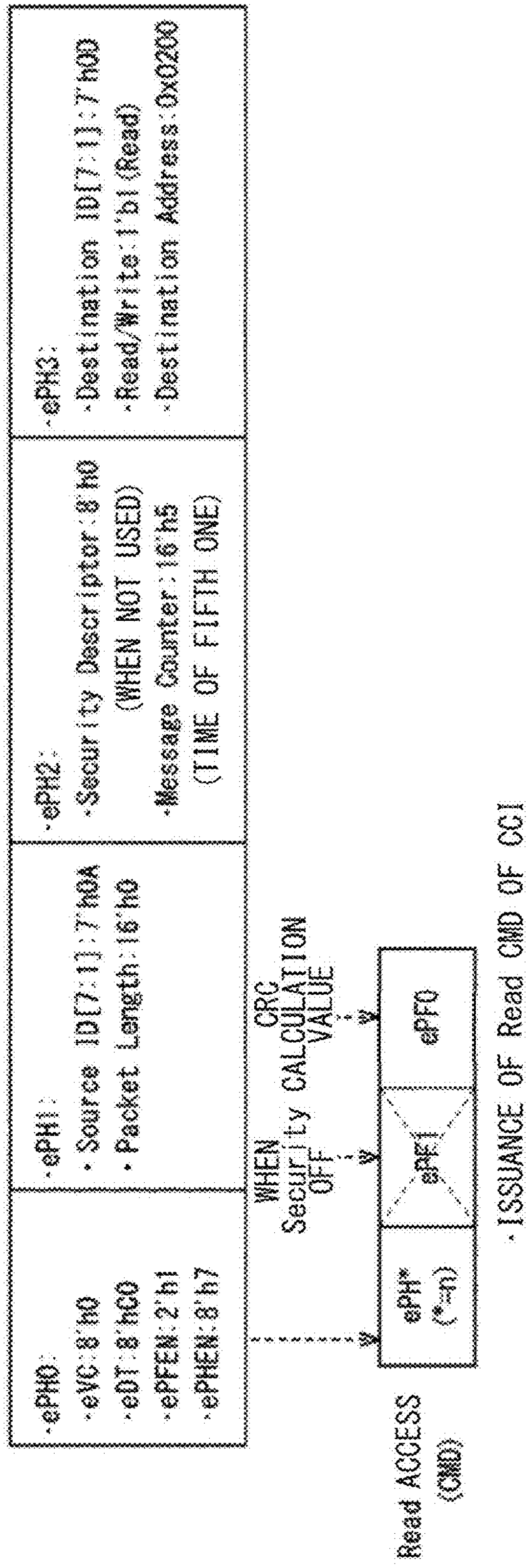
FIG. 41 is a diagram illustrating an example of a packet configuration of a read command generated on the side of the application processor.

FIG. 41 illustrates an example of a packet configuration of a read command to be generated in the CCI-FS processing section 653 of the application processor 614 during the read access.

As illustrated in FIG. 41, the read command is configured by the extended packet header ePH*(*=n), the extended packet footer ePF1, and the extended packet footer ePF0. It is to be noted that the details thereof are similar to those of the read command described above with reference to FIG. 28.

In the application processor 614, the read command of such a packet structure is generated in the CCI-FS processing section 653, and is supplied to the I2C/I3C master 651.

Figure 42:
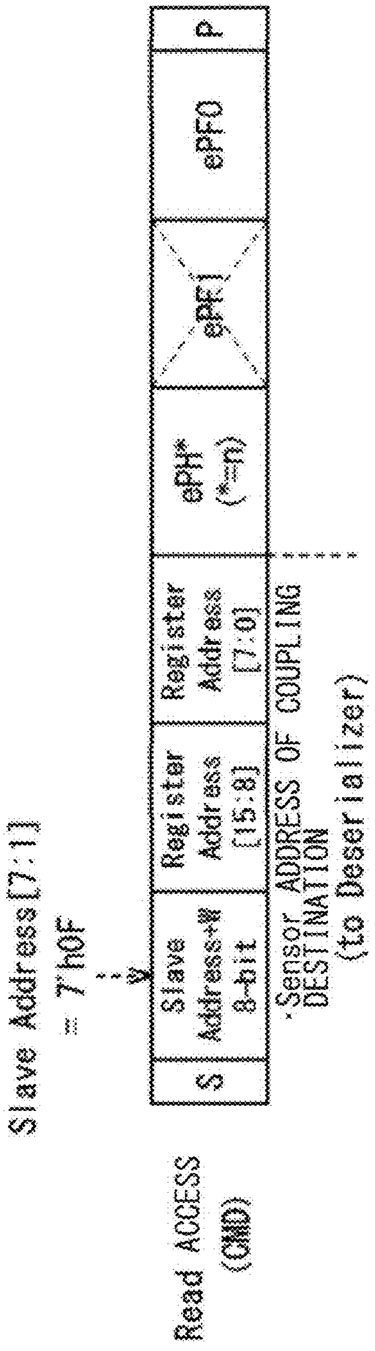
FIG. 42 is a diagram illustrating an example of a packet configuration of a read command to be outputted by I2C/I3C.

FIG. 42 illustrates an example of a packet configuration of the read command to be outputted from the I2C/I3C master 651 of the application processor 614 during the read access.

As illustrated in FIG. 42, subsequent to a start condition S, the I2C/I3C master 651 transmits a sensor address of the coupling destination, i.e., an address (Slave Address+W 8-bit) of the CCI processing section 645 of the SerDes device 613 on the master side in the configuration illustrated in FIG. 40. In the example illustrated in FIG. 42, the address of the CCI processing section 645 is Slave Address [7:1]=7'h0F. Subsequent to the address, register addresses (Register Address [15:8] and Register Address [7:0]) of the register 647 of the SerDes device 613 on the master side are transmitted. Subsequent to the extended packet header ePH*(*=n), the extended packet footer ePF1, and the extended packet footer ePF0, the I2C/I3C master 651 finally transmits a stop condition P.

The read command of such a packet structure is transferred by I2C/I3C from the I2C/I3C master 651 of the application processor 614. In the SerDes device 613 on the master side, the I2C/I3C slave 644 acquires a read command (the extended packet header ePH*(*=n), the extended packet footer ePF 1, and the extended packet footer ePF0). The read command is supplied to the CCI processing section 645 of the Slave Address [7:1]=7'h0F, and then supplied to the A-PHY processing section 641 via the CCI-FS processing section 646, the CSI2-FS processing section 643, and the CSIA processing section 642.

Figure 43:
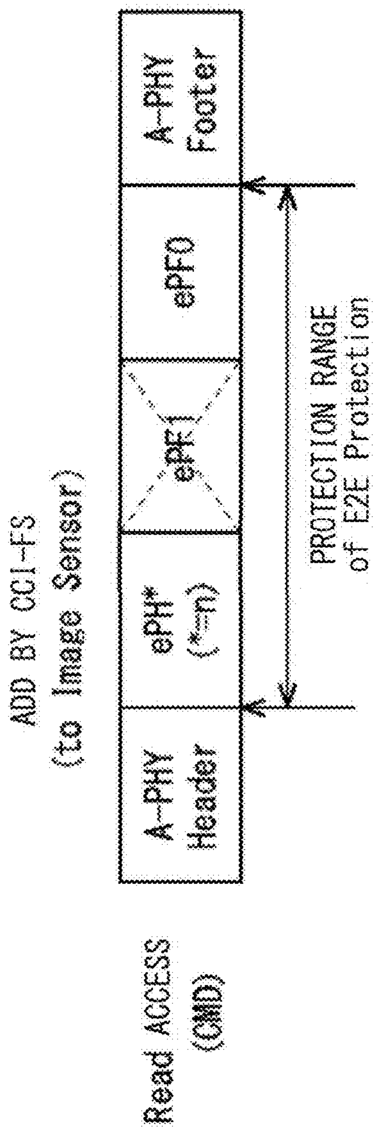
FIG. 43 is a diagram illustrating an example of a packet configuration of a read command to be subject to the A-PHY transfer.

FIG. 43 illustrates an example of a packet configuration of the read command to be outputted from the A-PHY processing section 641 of the SerDes device 613 on the master side during the read access.

As illustrated in FIG. 43, the A-PHY processing section 641 adds an A-PHY header and an A-PHY footer using the read command acquired by the I2C/I3C slave 644 as a protection range of the E2E Protection. It is to be noted that an address of the CCI processing section 635 of the SerDes device 613 on the master side, e.g., Slave Address [7:1]=7'h0E is added to the extended packet header ePH*(*=n) in the CSI2-FS processing section 643.

The read command of such a packet structure is subject to the A-PHY transfer by the A-PHY processing section 641 of the SerDes device 613 on the master side. In the SerDes device 612 on the slave side, the A-PHY processing section 631 removes the A-PHY header and the A-PHY footer from the read command. The read command is supplied to the CCI processing section 635 of the slave address “7'h0E” indicated by the Destination ID via the CSIA processing section 632, the CSI2-FS processing section 633, and the CCI-FS processing section 636, and then supplied to the I2C/I3C master 634.

Figure 44:
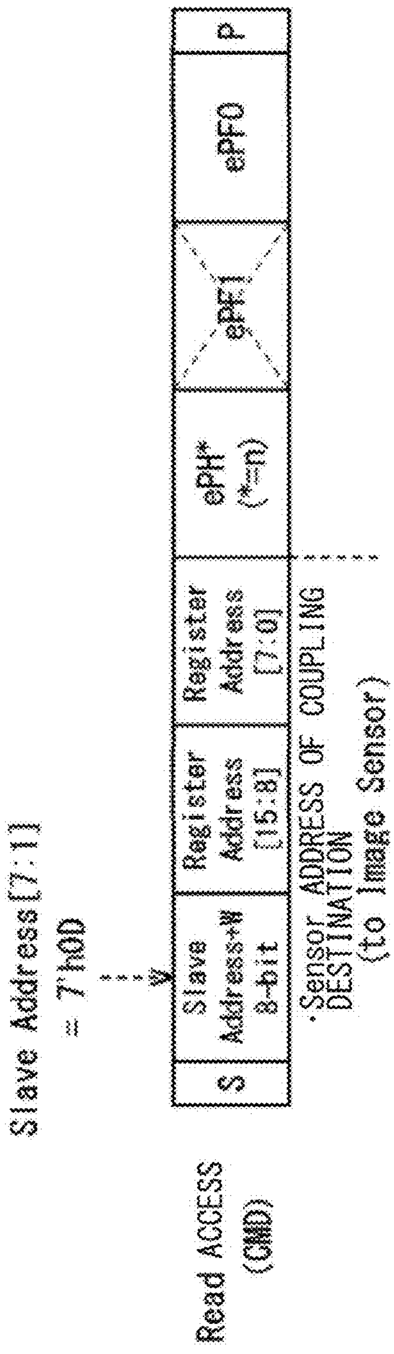
FIG. 44 is a diagram illustrating an example of a packet configuration of read data generated by a SerDes device on a slave side.

FIG. 44 illustrates an example of a packet configuration of the read command to be outputted from the I2C/I3C master 634 during the read access.

As illustrated in FIG. 44, subsequent to the start condition S, the I2C/I3C master 634 transmits a sensor address of the coupling destination, i.e., an address (Slave Address+W 8-bit) of the CCI processing section 622 of the image sensor 611 in the configuration illustrated in FIG. 40. In the example illustrated in FIG. 44, the address of the CCI processing section 622 is Slave Address [7:1]=7'h0D. Subsequent to the address, register addresses (Register Address [15:8] and Register Address [7:0]) of the register 624 of the image sensor 611 are transmitted. Subsequent to the extended packet header ePH*(*=n), the extended packet footer ePF1, and the extended packet footer ePF0, the I2C/I3C master 634 finally transmits the stop condition P.

The read command of such a packet structure is transferred by I2C/I3C from the I2C/I3C master 634 of the SerDes device 612 on the slave side. Then, in the image sensor 611, the I2C/I3C slave 621 acquires a read command (the extended packet header ePH*(*=n), the extended packet footer ePF1, and the extended packet footer ePF0). The read command is supplied to the CSI2-FS processing section 623 via the CCI processing section 622 of the Slave Address [7:1]=7'h0D.

Figure 45:
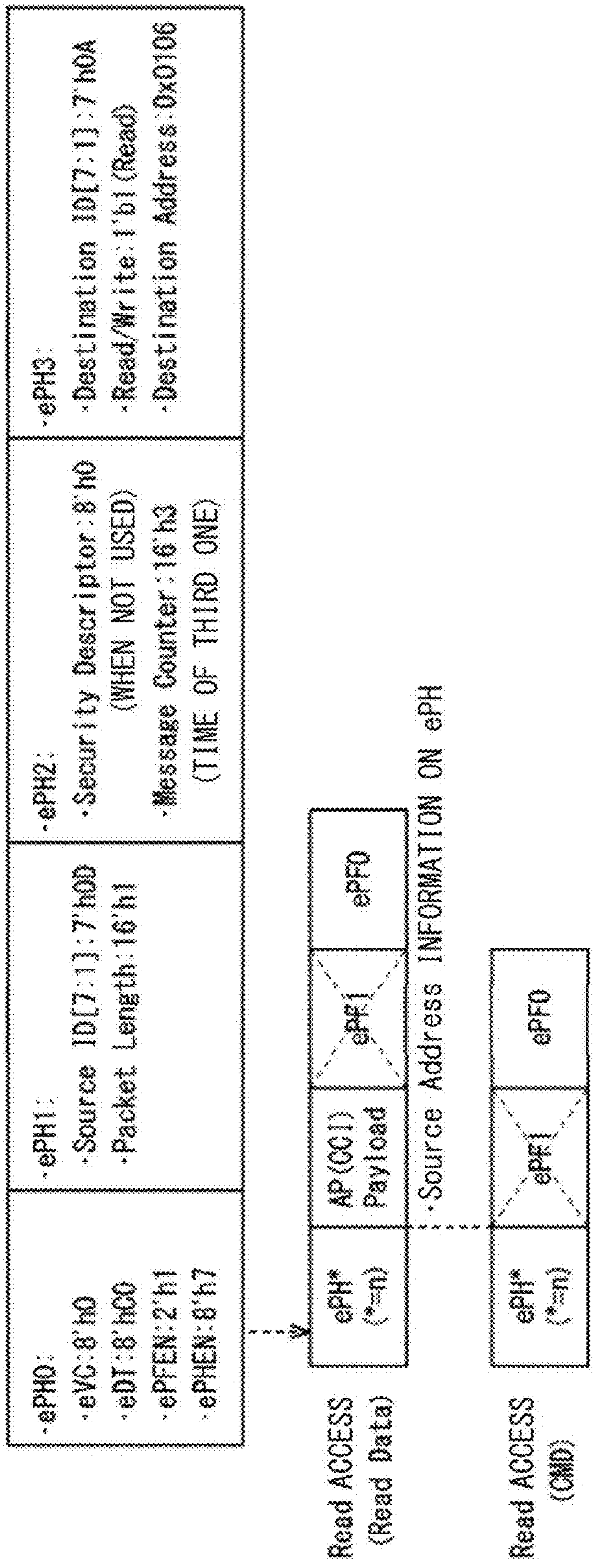
FIG. 45 is a diagram illustrating an example of packet configurations of a read command and read data on the side of the image sensor.

FIG. 45 illustrates an example of packet structures of the read command to be supplied to the CSI2-FS processing section 623 and read data to be generated in the CSI2-FS processing section 623 during the read access.

As illustrated in FIG. 45, the read command of the packet structure just as illustrated in FIG. 41, i.e., the read command set as the protection range of the E2E Protection in the APHY transfer is supplied to the CSI2-FS processing section 623.

The read data is configured by the extended packet header the ePH*(*=n), the AP (CCI) payload, the extended packet footer ePF1, and the extended packet footer ePF0, as illustrated. Further, the AP (CCI) payload stores read data values read from the address "0x0200" of the register 624 indicated by the source address information (Destination Address) of the extended packet header ePH of the read command.

In the image sensor 611, the read data of such a packet structure is generated in the CCI-FS processing section 623, and is supplied to the I2C/I3C slave 621 via the CCI processing section 622.

Figure 46:
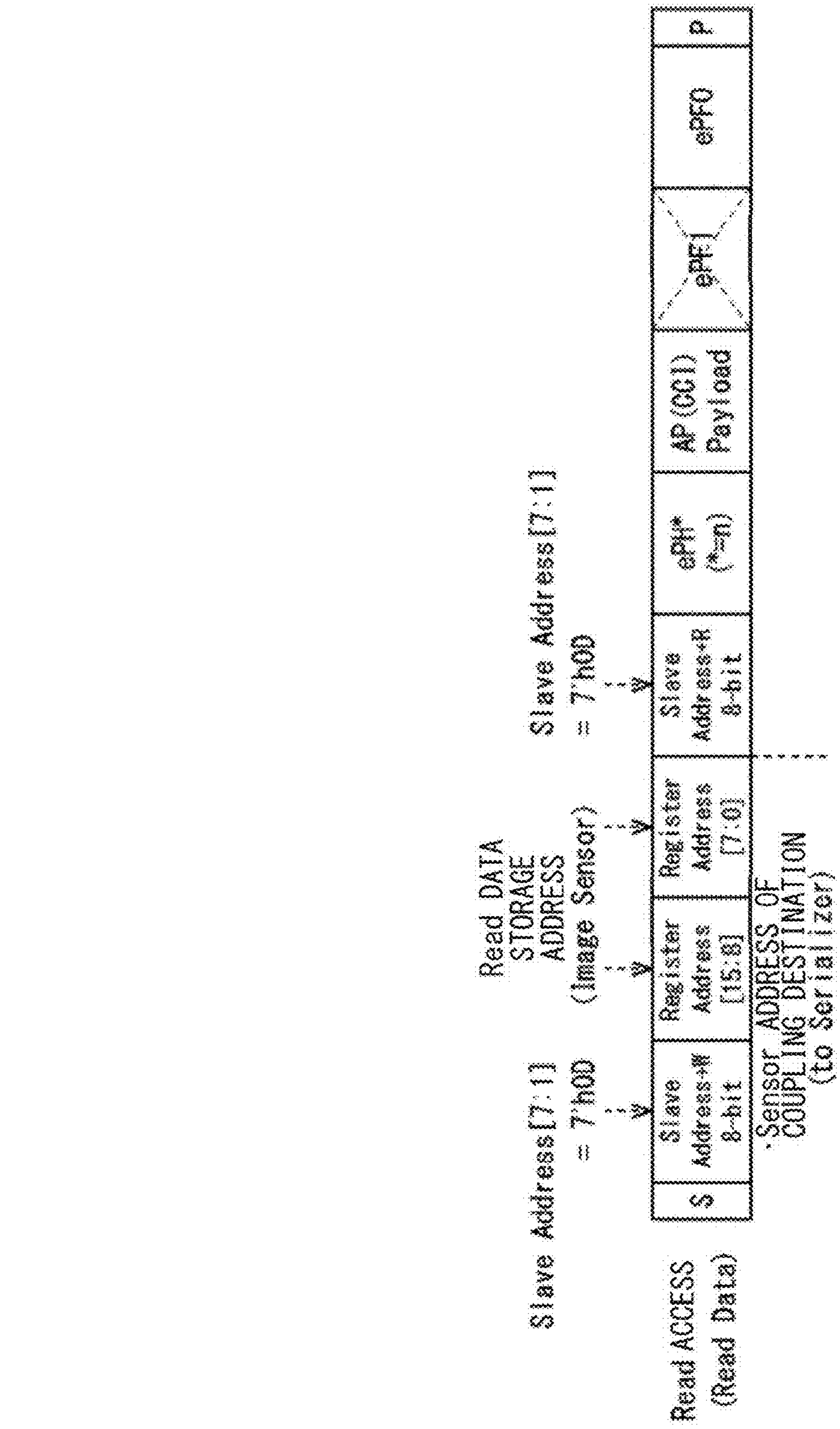
FIG. 46 is a diagram illustrating an example of a packet configuration of read data to be outputted by a I2C/I3C.

FIG. 46 illustrates an example of a packet configuration of the read data to be outputted from the I2C/I3C slave 621 of the image sensor 611 during the read access.

As illustrated in FIG. 46, subsequent to the start condition S, the I2C/I3C slave 621 transmits a sensor address of the coupling destination, i.e., an address (Slave Address+W 8-bit) of the I2C/I3C master 634 of the SerDes device 612 on the slave side in the configuration illustrated in FIG. 40. In the example illustrated in FIG. 46, the address of the I2C/I3C master 634 is the Slave Address [7:1]=7'h0D. Subsequent to the address, a storage address of the read data (address of the register 624 of the image sensor 611) is transmitted, and an address (Slave Address+R 8-bit) of the I2C/I3C master 634 of the SerDes device 612 on the slave side is transmitted. After the I2C/I3C slave 621 transmits the extended packet header ePH*(*=n), the AP (CCI) payload, the extended packet footer ePF1, and the extended packet footer ePF0, the stop condition P is finally transmitted.

The read command of such a packet structure is transferred by I2C/I3C from the I2C/I3C slave 621 of the image sensor 611. In the SerDes device 612 on the slave side, the I2C/I3C master 634 acquires read data (the extended packet header ePH*(*=n), the AP (CCI) payload, the extended packet footer ePF1, and the extended packet footer ePF0). The read data is supplied to the CCI processing section 635 of the Slave Address [7:1]=7'h0E, and then supplied to the A-PHY processing section 631 via the CCI-FS processing section 636, the CSI2-FS processing section 633, and the CSIA processing section 632.

Figure 47:
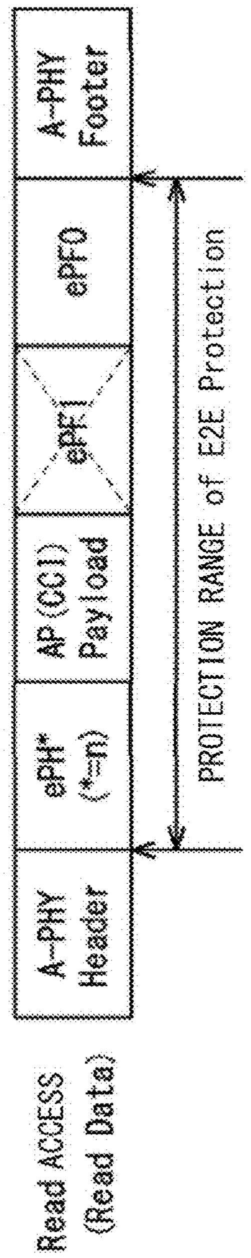
FIG. 47 is a diagram illustrating an example of a packet configuration of read data to be subject to the A-PHY transfer.

FIG. 47 illustrates an example of a packet configuration of the read data to be outputted from the A-PHY processing section 631 of the SerDes device 612 on the slave side during the read access.

As illustrated in FIG. 47, the A-PHY processing section 631 adds an A-PHY header and an A-PHY footer using the read data acquired by the I2C/I3C master 634 as a protection range of the E2E Protection.

The read data of such a packet structure is subject to the A-PHY transfer by the A-PHY processing section 631 of the SerDes device 612 on the slave side. Then, in the SerDes device 613 on the master side, the A-PHY processing section 641 removes the A-PHY header and the A-PHY footer from the read data. The read data is supplied to the I2C/I3C slave 644 via the CSIA processing section 642, the CSI2-FS processing section 643, the CCI-FS processing section 646, and the CCI processing section 635.

Figure 48:
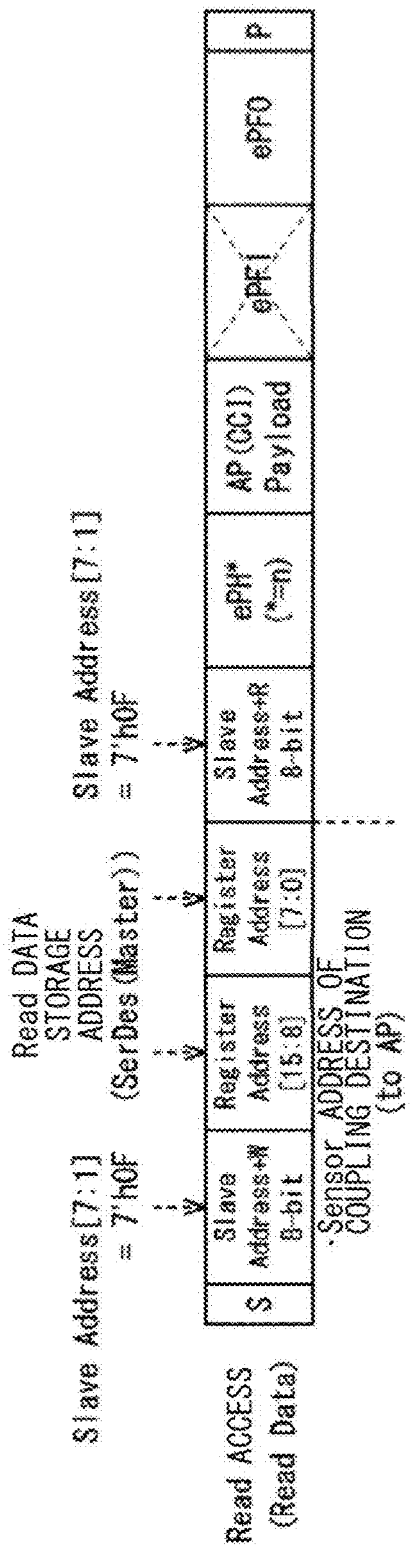
FIG. 48 is a diagram illustrating an example of a packet configuration of read data to be outputted by the I2C/I3C.

FIG. 48 illustrates an example of a packet configuration of the read data to be outputted from the I2C/I3C slave 644 of the SerDes device 613 on the master side during the read access.

As illustrated in FIG. 48, subsequent to the start condition S, the I2C/I3C slave 644 transmits a sensor address of the coupling destination, i.e., an address (Slave Address+W 8-bit) of the CCI processing section 635 of the SerDes device 613 on the master side in the configuration illustrated in FIG. 40. In the example illustrated in FIG. 48, the address of the CCI processing section 635 is the Slave Address [7:1]=7'h0F. Subsequent to the address, register addresses (Register Address [15:8] and Register Address [7:0]) of the register 647 of the SerDes device 613 on the master side are transmitted, and an address (Slave Address+R 8-bit) of the CCI processing section 635 is transmitted. Subsequently, the I2C/I3C slave 644 transmits the extended packet header ePH*(*=n), the AP (CCI) payload, the extended packet footer ePF1, and the extended packet footer ePF0, and then the stop condition P is finally transmitted.

The read data of such a packet structure is transferred by I2C/I3C from the I2C/I3C slave 644 of the SerDes device 613 on the master side. Then, in the application processor 614, the I2C/I3C master 651 acquires a read command (the extended packet header ePH*(*=n), the extended packet footer ePF1, and the extended packet footer ePF0), and supplies the read command to the CCI processing section 653.

Figure 49:
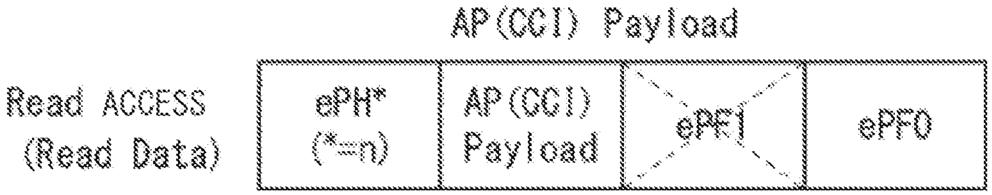
FIG. 49 is a diagram illustrating an example of a packet configuration of read data acquired on the side of the application processor.

FIG. 49 illustrates an example of a packet structure of the read data to be supplied to the CCI-FS processing section 653 during the read access.

As illustrated in FIG. 49, the read data of the packet structure just as illustrated in FIG. 45, i.e., the read data set as the protection range of the E2E Protection in the A-PHY transfer is supplied to the CCI-FS processing section 653.

<Processing Example of Communication Processing>

Description is given, with reference to flowcharts of FIGS. 50 to 57, of communication processing using the CCI-FS to be performed in the communication system 601 illustrated in FIG. 40.

Figure 50:
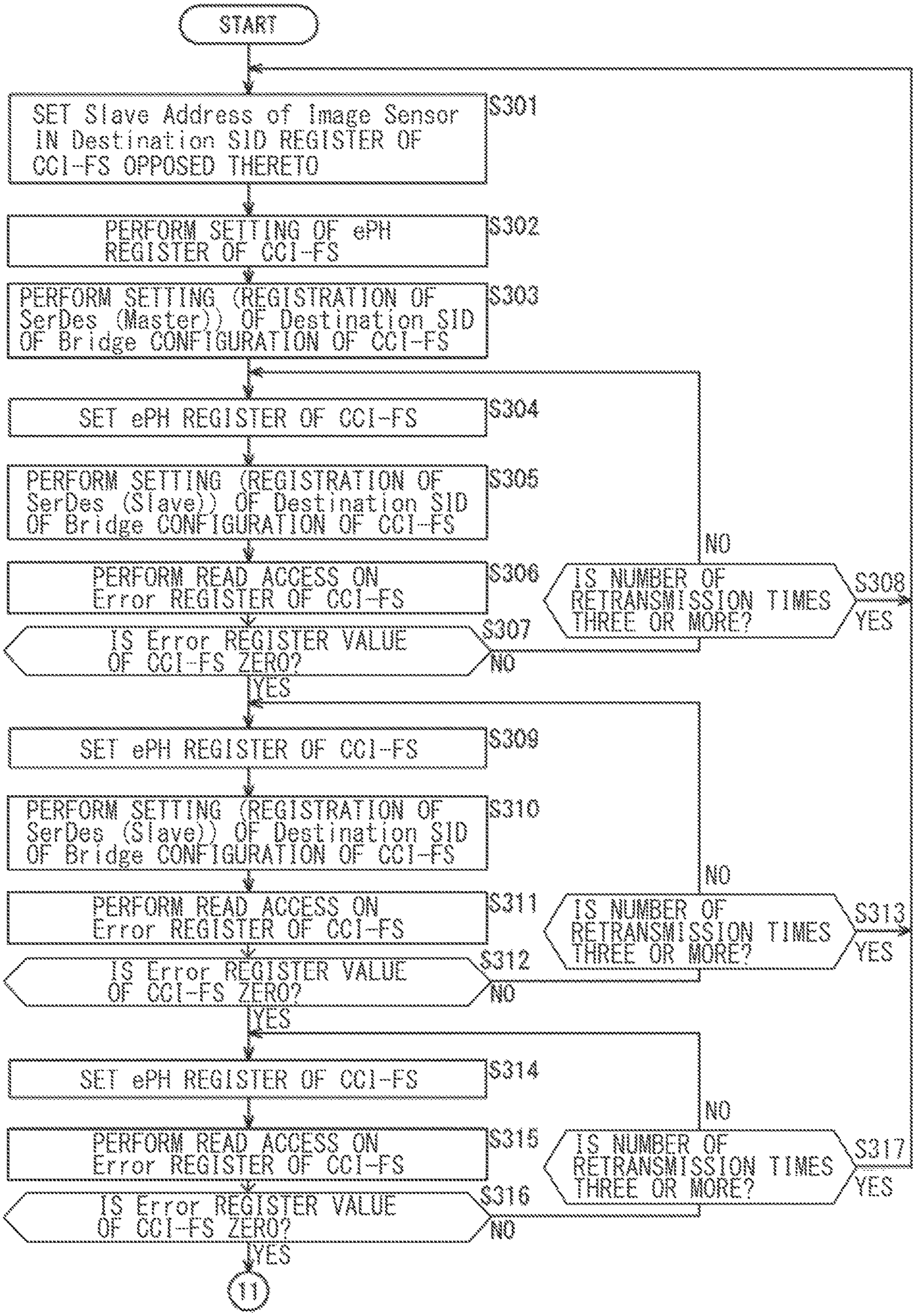
FIG. 50 is a flowchart describing an initial setting and a confirmation operation of communication processing using the CCI-FS.

As illustrated in FIG. 50, in steps S301 to S317, an initial setting and a confirmation operation are performed.

In step S301, a slave address of the image sensor 611 is set in a Destination SID register of the CCI-FS processing section 653 of the application processor 614 opposed thereto.

In step S302, the ePH register of the CCI-FS processing section 653 of the application processor 614 is set.

In step S303, the Destination SID of Bridge configuration of the CCI-FS processing section 653 of the application processor 614 is set, and the SerDes device 613 on the master side is registered. Here, it is assumed that Address, attribution, and Timeout_no1 register are also set in the same manner, and that settings are performed in the same manner.

In step S304, the ePH register of the CCI-FS processing section 643 is set from the application processor 614 to the SerDes device 613 on the master side.

In step S305, the Destination SID of Bridge configuration of the CCI-FS processing section 643 is set from the application processor 614 to the SerDes device 613 on the master side, and the SerDes device 612 on the slave side is registered.

In step S306, read access is performed on an Error register of the CCI-FS processing section 643 from the application processor 614 to the SerDes device 613 on the master side.

In step S307, in the application processor 614, the CCI-FS processing section 653 determines, as a result of the read access in step S306, whether or not a register value of the Error register of a CCIFS processing section 643 of the SerDes device 613 on the master side is zero.

In a case where determination is made in step S307 that the register value of the Error register of the CCI-FS processing section 643 of the SerDes device 613 on the master side is not zero (other than zero), the processing proceeds to step S308.

In step S308, in the application processor 614, the CCI-FS processing section 653 determines whether or not the number of times of retransmission is three or more; in a case where determination is made that the number of times of retransmission is not three or more (one or two), the processing returns to step S304, and subsequently similar processing is repeatedly performed.

Meanwhile, in a case where determination is made in step S307 that the register value of the Error register of the CCI-FS processing section 643 of the SerDes device 613 on the master side is zero, the processing proceeds to step S309.

In step S309, the ePH register of the CCI-FS processing section 636 is set from the application processor 614 to the SerDes device 612 on the slave side.

In step S310, the Destination SID of Bridge configuration of the CCI-FS processing section 636 is set from the application processor 614 to the SerDes device 612 on the slave side, and the SerDes device 612 on the slave side is registered.

In step S311, read access is performed on an Error register of the CCI-FS processing section 636 from the application processor 614 to the SerDes device 612 on the slave side.

In step S312, in the application processor 614, the CCI-FS processing section 653 determines, as a result of the read access in step S311, whether or not a register value of the Error register of the CCI-FS processing section 636 of the SerDes device 612 on the slave side is zero.

In a case where determination is made in step S312 that the register value of the Error register of the CCI-FS processing section 636 of the SerDes device 612 on the slave side is not zero (other than zero), the processing proceeds to step S313.

In step S313, in the application processor 614, the CCI-FS processing section 653 determines whether or not the number of times of retransmission is three or more; in a case where determination is made that the number of times of retransmission is not three or more (one or two), the processing returns to step S309, and subsequently similar processing is repeatedly performed.

Meanwhile, in a case where determination is made in step S312 that the register value of the Error register of the CCI-FS processing section 636 of the SerDes device 612 on the slave side is zero, the processing proceeds to step S314.

In step S314, the ePH register of the CCI-FS processing section 623 is set from the application processor 614 to the image sensor 611.

In step S315, read access is performed on an Error register of the CCI-FS processing section 623 from the application processor 614 to the image sensor 611.

In step S316, in the application processor 614, the CCI-FS processing section 653 determines, as a result of the read access in step S315, whether or not a register value of the Error register of the CCI-FS processing section 623 of the image sensor 611 is zero.

In a case where determination is made in step S316 that the register value of the Error register of the CCI-FS processing section 623 of the image sensor 611 is not zero (other than zero), the processing proceeds to step S317.

In step S317, in the application processor 614, the CCI-FS processing section 653 determines whether or not the number of times of retransmission is three or more; in a case where determination is made that the number of times of retransmission is not three or more (one or two), the processing returns to step S314, and subsequently similar processing is repeatedly performed.

Here, in step S308, step S313, or step S317, in a case where determination is made that the number of times of retransmission is three or more, the processing returns to step S301, and subsequently similar processing is repeatedly performed.

Meanwhile, in a case where determination is made in step S316 that the register value of the Error register of the CCI-FS processing section 623 of the image sensor 611 is zero, the processing proceeds to step S318.

Figure 51:
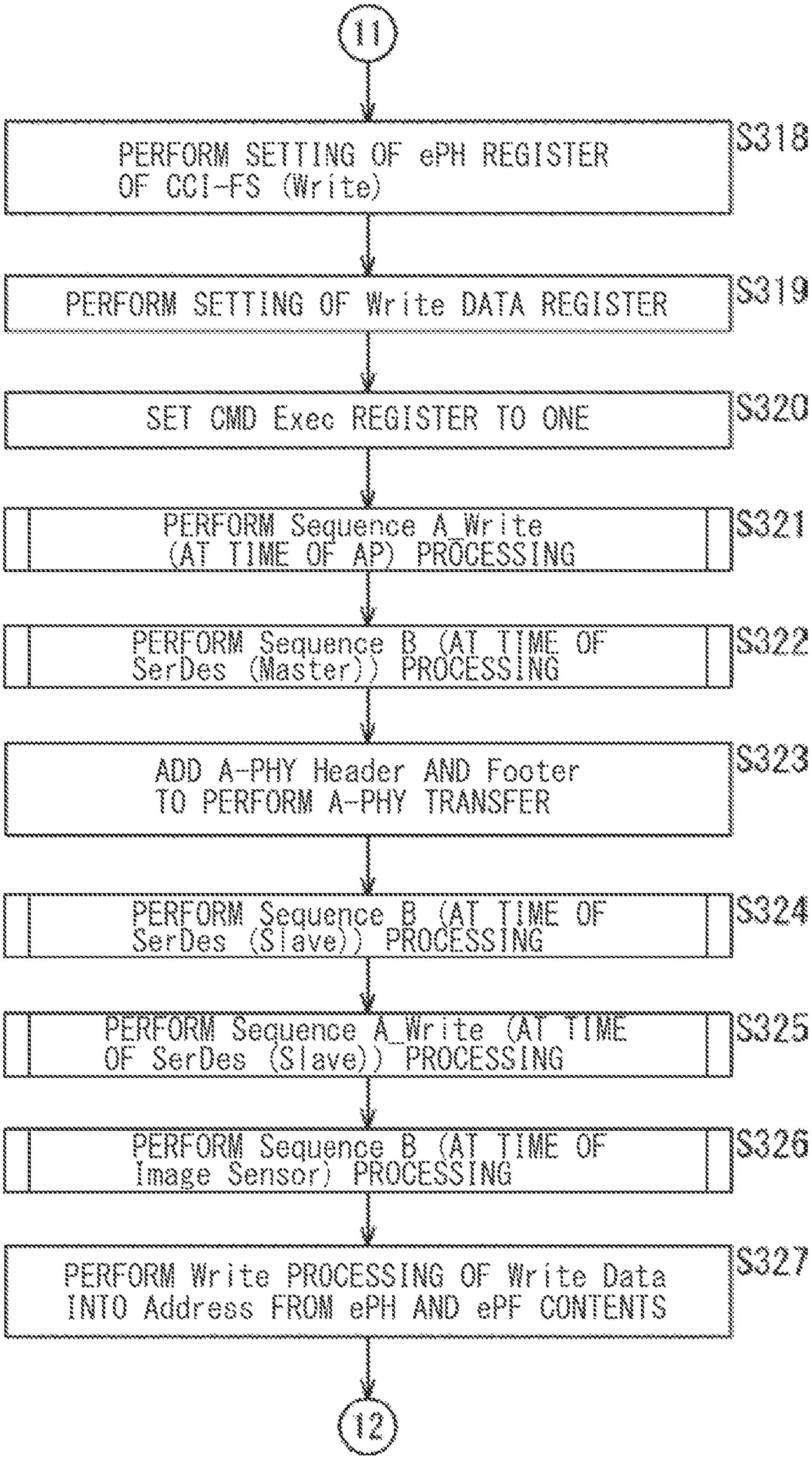
FIG. 51 is a flowchart describing a write operation using the CCI-FS.

As illustrated in FIG. 51, in steps S318 to S327, a write operation using the CCI-FS is performed.

In step S318, the CCI-FS processing section 653 of the application processor 614 sets the ePH register to perform the write operation.

In step S319, the CCI-FS processing section 653 of the application processor 614 sets a write data register.

In step S320, the CCI-FS processing section 653 of the application processor 614 sets a command execution register to one, and issues a write command.

In step S321, the application processor 614 performs Sequence A_Write (at the time of AP) processing described later with reference to FIG. 53.

In step S322, the SerDes device 613 on the master side performs Sequence B (at the time of SerDes (Master)) processing described later with reference to FIG. 56. It is to be noted that description is given, in FIG. 56, of the Sequence B (at the time of SerDes (Slave)) processing to be executed by the SerDes device 612 on the slave side; however, it is also possible for the SerDes device 613 on the master side to execute similar processing using each corresponding block.

In step S323, the A-PHY processing section 641 performs A-PHY transfer by adding an A-PHY header and an A-PHY footer, from the extension DT of the extended packet header ePH of the SerDes device 613 on the master side via the CSI2-FS processing section 643 and the CSIA processing section 642.

In step S324, the SerDes device 612 on the slave side performs the Sequence B (at the time of SerDes (Slave)) processing described later with reference to FIG. 56.

In step S325, the SerDes device 612 on the slave side performs the Sequence A_Write (at the time of SerDes (Slave)) processing described later with reference to FIG. 53. It is to be noted that description is given, in FIG. 53, of the Sequence A_Write (at the time of AP) processing to be executed by the application processor 614; however, it is also possible for the SerDes device 612 on the slave side to execute similar processing using each corresponding block.

In step S326, the image sensor 611 performs the Sequence B (at the time of Image Sensor) processing described later with reference to FIG. 56. It is to be noted that description is given, in FIG. 56, of the Sequence B (at the time of SerDes (Slave)) processing to be executed by the SerDes device 612 on the slave side; however, it is also possible for the image sensor 611 to execute similar processing using each corresponding block.

In step S327, in the image sensor 611, the CCI-FS processing section 623 performs write processing to write the write data into an address of the register 624, from the contents of the extended packet header ePH and the extended packet footer ePF. Thereafter, the processing proceeds to step S328.

Figure 52:
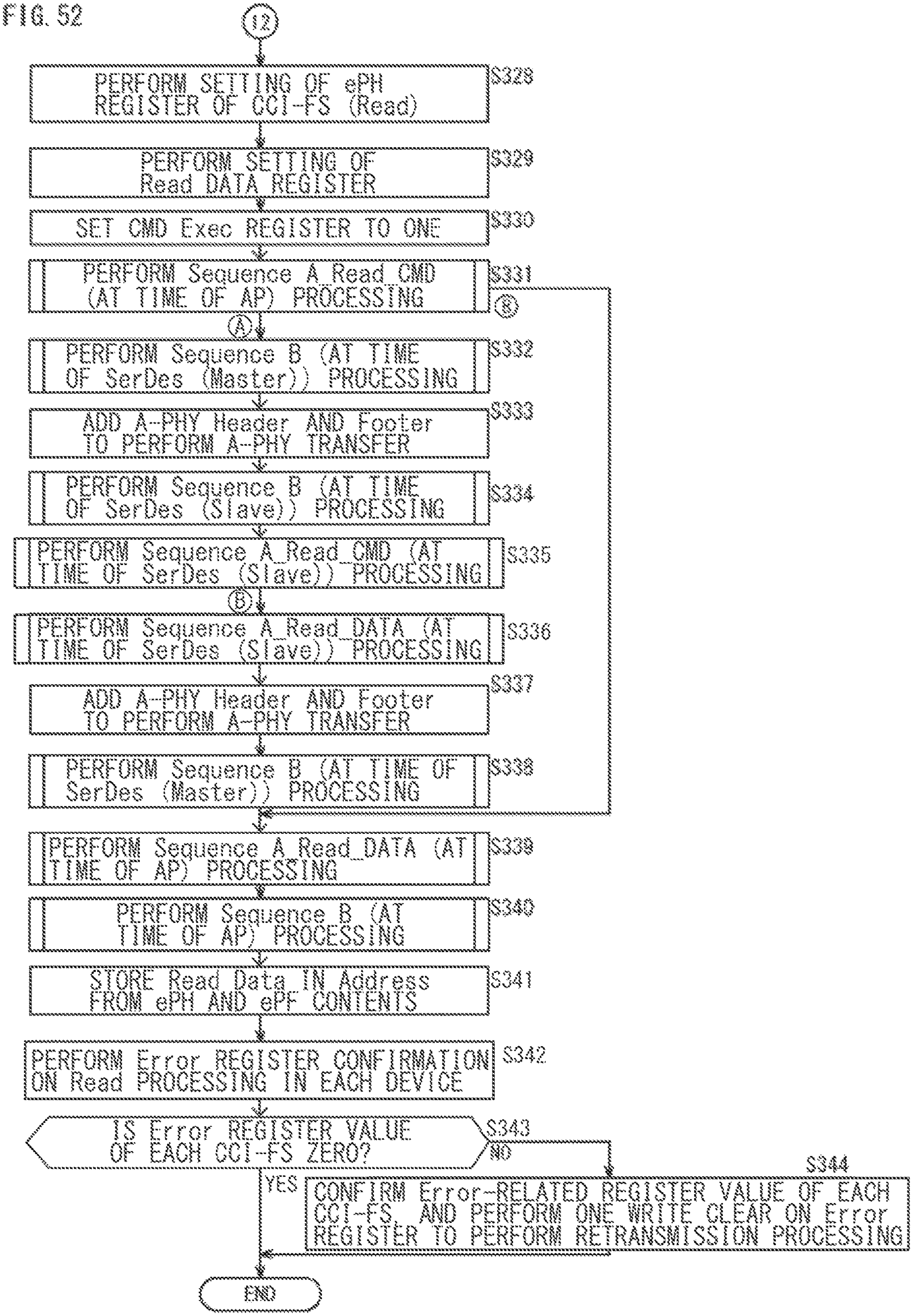
FIG. 52 is a flowchart describing a read operation using the CCI-FS.

As illustrated in FIG. 52, in steps S328 to S344, a read operation using the CCI-FS is performed.

In step S328, the CCI-FS processing section 653 of the application processor 614 sets the ePH register to perform the read operation.

In step S329, the CCI-FS processing section 653 of the application processor 614 sets a read data register.

In step S330, the CCI-FS processing section 653 of the application processor 614 sets a command execution register to one, and issues a read command.

In step S331, the application processor 614 performs Sequence A_Read_CMD (at the time of AP) processing described later with reference to FIG. 54. Here, in the Sequence A_Read_CMD (at the time of AP) processing, two branched pieces of processing are performed in parallel; the processing proceeds to step S332 in accordance with Branch A, and the processing proceeds to step S339 in accordance with Branch B.

In step S332, the SerDes device 613 on the master side performs the Sequence B (at the time of SerDes (Master)) processing described later with reference to FIG. 56. It is to be noted that description is given, in FIG. 56, of the Sequence B (at the time of SerDes (Slave)) processing to be executed by the SerDes device 612 on the slave side; however, it is also possible for the SerDes device 613 on the master side to execute similar processing using each corresponding block.

In step S333, the A-PHY processing section 641 performs A-PHY transfer by adding an A-PHY header and an A-PHY footer, from the extension DT of the extended packet header ePH of the SerDes device 613 on the master side via the CSI2-FS processing section 643 and the CSIA processing section 642.

In step S334, the SerDes device 612 on the slave side performs the Sequence B (at the time of SerDes (Slave)) processing described later with reference to FIG. 56.

In step S355, the SerDes device 612 on the slave side performs the Sequence A_Read_CMD (at the time of SerDes (Slave)) processing described later with reference to FIG. 54. It is to be noted that description is given, in FIG. 54, of the Sequence A_Read_CMD (at the time of AP) processing to be executed in the application processor 614; however, it is also possible for the SerDes device 612 on the slave side to execute similar processing using each corresponding block. Here, in the Sequence A_Read_CMD (SerDes (Slave) processing, of two branched pieces of processing, the processing does not proceed to Branch A, but the processing proceeds to step S336 in accordance with Branch B.

In step S336, the SerDes device 612 on the slave side performs Sequence A_Read_Data (at the time of SerDes (Slave)) processing described later with reference to FIG. 57. It is to be noted that description is given, in FIG. 57, of the Sequence A_Read_Data (at the time of AP) processing to be executed in the application processor 614; however, it is also possible for the SerDes device 612 on the slave side to execute similar processing using each corresponding block.

In step S337, the A-PHY processing section 631 performs A-PHY transfer by adding an A-PHY header and an A-PHY footer, from the extension DT of the extended packet header ePH of the SerDes device 612 on the slave side via the CSI2-FS processing section 633 and the CSIA processing section 632.

In step S338, the SerDes device 613 on the master side performs the Sequence B (at the time of SerDes (Master)) processing described later with reference to FIG. 56. It is to be noted that description is given, in FIG. 56, of the Sequence B (at the time of SerDes (Slave)) processing to be executed in the SerDes device 612 on the slave side; however, it is also possible for the SerDes device 613 on the master side to execute similar processing using each corresponding block.

In step S339, the application processor 614 performs the Sequence A_Read_Data (at the time of AP) processing described later with reference to FIG. 57.

In step S340, the application processor 614 performs the Sequence B (at the time of AP) processing described later with reference to FIG. 56. It is to be noted that description is given, in FIG. 56, of the Sequence B (at the time of SerDes (Slave)) processing to be executed in the SerDes device 612 on the slave side; however, it is also possible for the application processor 614 to execute similar processing using each corresponding block.

In step S341, in the application processor 614, the CCI-FS processing section 653 stores read data in an address of the register 654, from the contents of the extended packet header ePH and the extended packet footer ePF.

In step S342, Error register confirmation is performed on the above-described read processing in the image sensor 611, the SerDes device 612 on the slave side, the SerDes device 613 on the master side, and the application processor 614.

In step S343, the image sensor 611, the devices (the SerDes device 612 on the slave side, the SerDes device 613 on the master side, and the application processor 614) determine whether or not register values of the Error registers of the respective CCI-FS processing sections are zero.

In a case where determination is made in step S343 that the register values of all of the CCI-FS processing sections are not zero (there is a register value other than zero in any of them), the processing proceeds to step S344.

In step S344, an Error-related register value of the CCI-FS processing section of which the register value is not zero is confirmed, and the Error register is subject to one write clear to perform retransmission processing.

Meanwhile, in a case where determination is made in step S343 that the register values of all of the CCI-FS processing sections are zero, or after processing in step S344, the processing is finished.

Figure 53:
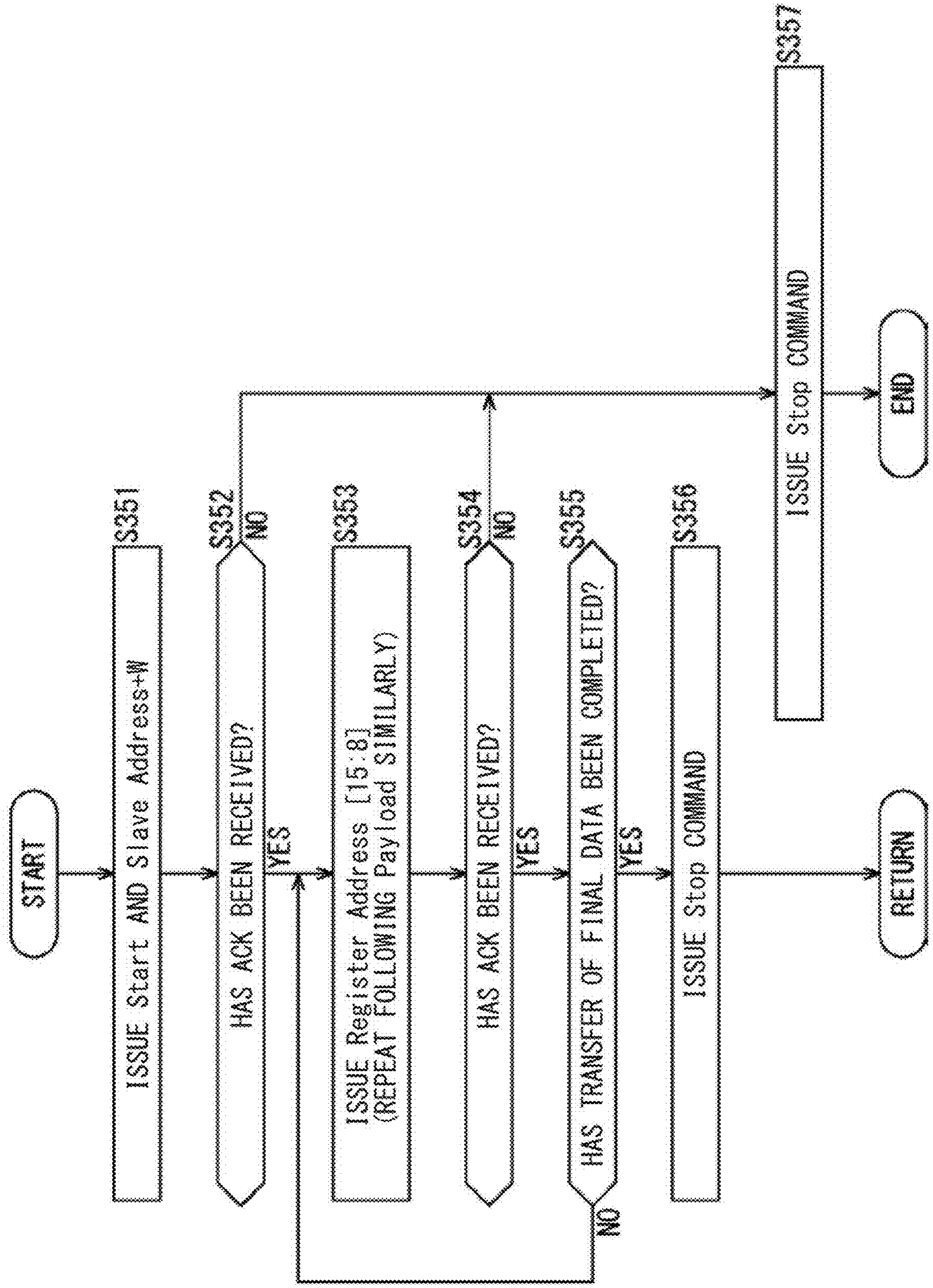
FIG. 53 is a flowchart describing Sequence A_Write (at the time of AP) processing.

FIG. 53 is a flowchart describing the Sequence A_Write (at the time of AP) processing performed in step S321 in FIG. 51. It is to be noted that description is given, in FIG. 53, by exemplifying the processing to be performed by the application processor 614; however, the Sequence A_Write (at the time of SerDes (Slave)) processing in step S325 in FIG. 51 is also performed in the same manner.

In step S351, in the application processor 614, the I2C/I3C master 651 issues a start command and a slave address (Slave Address+W8-bit illustrated in FIG. 42).

In step S352, in the application processor 614, determination is made as to whether or not the I2C/I3C master 651 has received an ACK response from the I2C/I3C slave 644 of the SerDes device 613 on the master side. In a case where determination is made in step S352 that the ACK response from the I2C/I3C slave 644 of the SerDes device 613 on the master side has been received, the processing proceeds to step S353.

In step S353, in the application processor 614, the I2C/I3C master 651 issues a register address (Register Address [15:8] illustrated in FIG. 42). Here, every time the processing in step S353 is repeatedly performed, a payload equal to or smaller than the register address is transmitted, as illustrated in FIG. 42.

In step S354, in the application processor 614, determination is made as to whether or not the I2C/I3C master 651 has received an ACK response from the I2C/I3C slave 644 of the SerDes device 613 on the master side. In a case where determination is made in step S354 that the ACK response from the I2C/I3C slave 644 of the SerDes device 613 on the master side has been received, the processing proceeds to step S355

In step S355, in the application processor 614, the I2C/I3C master 651 determines whether or not transfer of final data has been completed. In a case where determination is made in step S355 that the transfer of the final data has not been completed, the processing returns to step S353, and subsequently similar processing is repeatedly performed.

Meanwhile, in a case where determination is made in step S355 that the transfer of the final data has been completed, the processing proceeds to step S356. In step S356, in the application processor 614, the I2C/I3C master 651 issues a stop command. This causes the Sequence A_Write (at the time of AP) processing to be finished, and the processing returns to step S322 in FIG. 51.

Meanwhile, in a case where determination is made in step S352 or S354 that the ACK response from the I2C/I3C slave 644 of the SerDes device 613 on the master side has not been received, the processing proceeds to step S357. In step S357, in the application processor 614, the I2C/I3C master 651 issues a stop command. In this case, the Sequence A_Write (at the time of AP) processing is finished, and the communication processing itself is finished.

Figure 54:
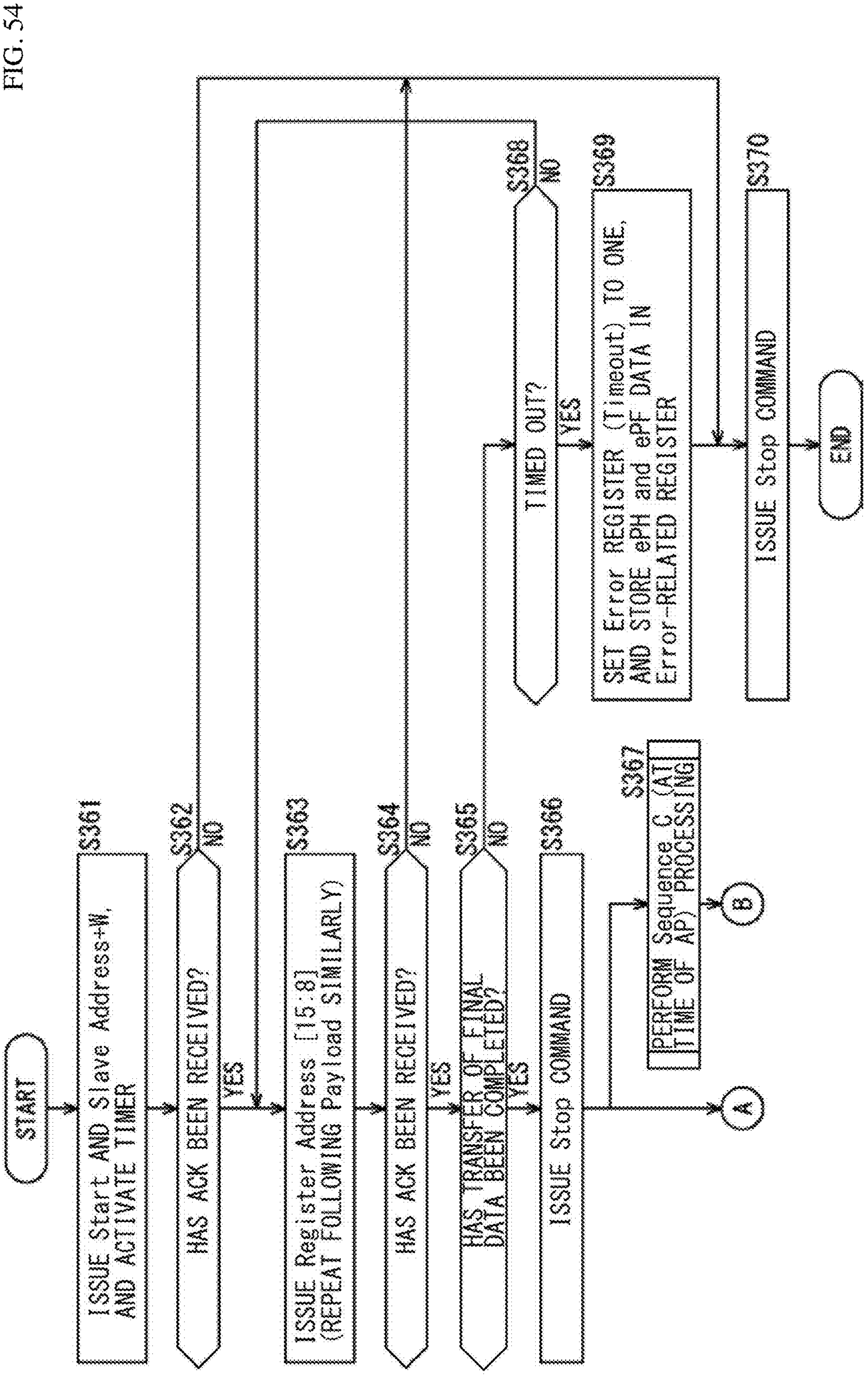
FIG. 54 is a flowchart describing Sequence A_Read_CMD (at the time of AP) processing.

FIG. 54 is a flowchart describing the Sequence A_Read_CMD (at the time of AP) processing to be performed in step S331 in FIG. 52. It is to be noted that description is given, in FIG. 54, by exemplifying the processing performed by the application processor 614; however, the Sequence A_Read_CMD (at the time of SerDes (Slave)) processing in step S335 in FIG. 52 is also performed in the same manner.

In step S361, in the application processor 614, the I2C/I3C master 651 issues a start command and a slave address (Slave Address+W8-bit illustrated in FIG. 42), and activate a timer.

In step S362, in the application processor 614, determination is made as to whether or not the I2C/I3C master 651 has received an ACK response from the I2C/I3C slave 644 of the SerDes device 613 on the master side. In a case where determination is made in step S362 that the ACK response from the I2C/I3C slave 644 of the SerDes device 613 on the master side has been received, the processing proceeds to step S363.

In step S363, in the application processor 614, the I2C/I3C master 651 issues a register address (Register Address [15:8] illustrated in FIG. 42). Here, every time processing in step S363 is repeatedly performed, transmission of a payload equal to or smaller than the register address is transmitted, as illustrated in FIG. 42.

In step S364, in the application processor 614, determination is made as to whether or not the I2C/I3C master 651 has received an ACK response from the I2C/I3C slave 644 of the SerDes device 613 on the master side.

In a case where determination is made in step S364 that the ACK response from the I2C/I3C slave 644 of the SerDes device 613 on the master side has been received, the processing proceeds to step S365

In step S365, in the application processor 614, the I2C/I3C master 651 determines whether or not transfer of final data has been completed.

In a case where determination is made in step S365 that the transfer of the final data has been completed, the processing proceeds to step S366.

In step S366, in the application processor 614, the I2C/I3C master 651 issues a stop command. Thereafter, the processing is branched into two, and the processing proceeds to step S332 in FIG. 52 in accordance with Branch A. Meanwhile, Sequence C (at the time of AP) processing (see FIG. 55 described later) is performed in step S367 in accordance with Branch B, and then the processing proceeds to step S339 in FIG. 52.

Meanwhile, in a case where determination is made in step S365 that the transfer of the final data has not been completed, the processing proceeds to step S368.

In step S368, in the application processor 614, the I2C/I3C master 651 determines whether or not the timer started in step S361 has timed out. In a case where determination is made in step S368 that the timer has not timed out, the processing returns to step S363, and subsequently similar processing is repeatedly performed.

Meanwhile, in a case where determination is made in step S368 that the timer has timed out, the processing proceeds to step S369.

In step S369, the application processor 614 sets one to an Error register (Timeout), and stores data of the extended packet header ePH and the extended packet footer ePF in the Error-related register.

After the processing in step S369, or in a case where determination is made in step S362 or S364 that the ACK response from the I2C/I3C slave 644 of the SerDes device 613 on the master side has not been received, the processing proceeds to step S370.

In step S370, in the application processor 614, the I2C/I3C master 651 issues a stop command. In this case, the Sequence A_Read_CMD (at the time of AP) processing is finished, and the communication processing itself is finished.

Figure 55:
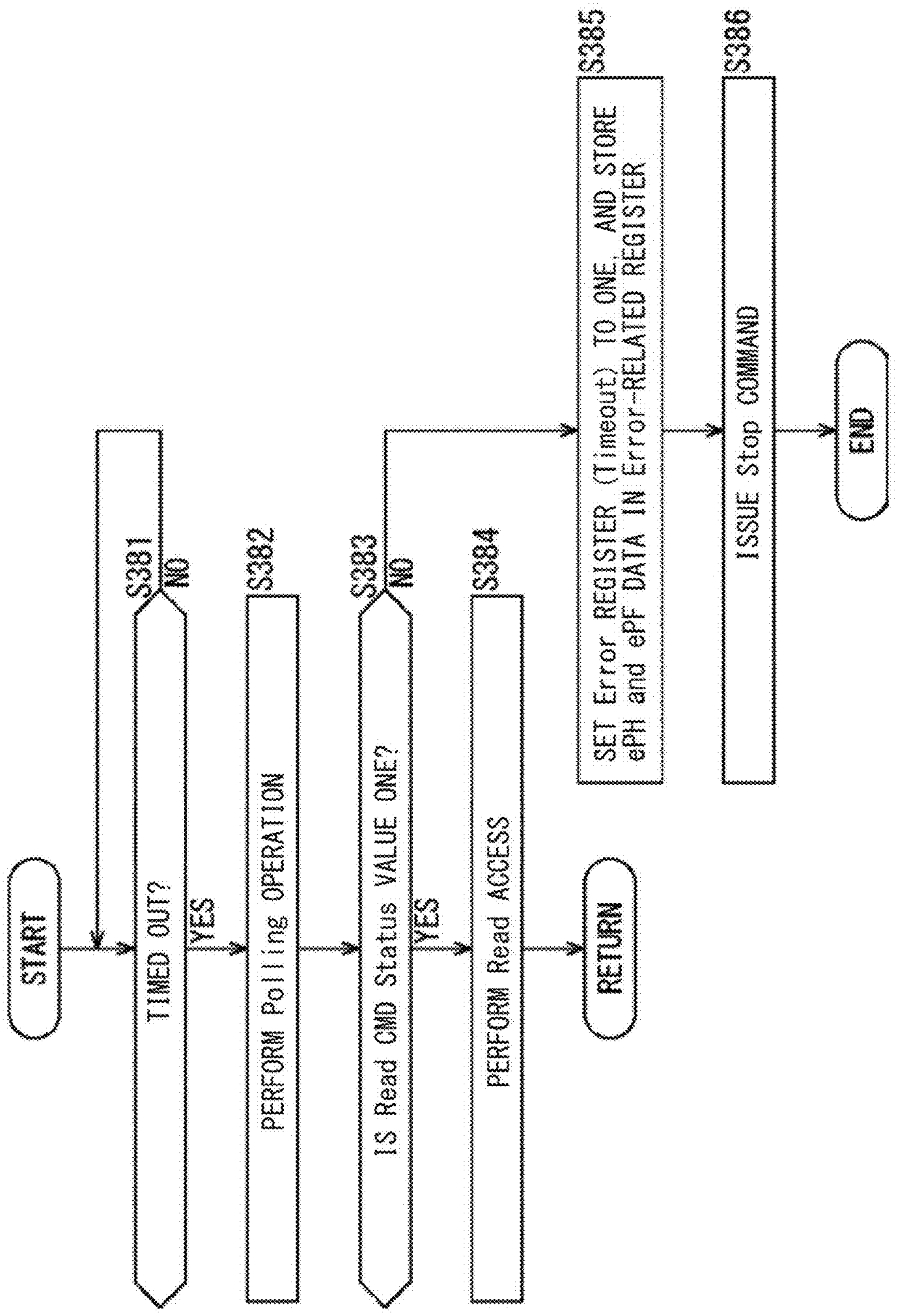
FIG. 55 is a flowchart describing Sequence C (at the time of AP) processing.

FIG. 55 is a flowchart describing the Sequence C (at the time of AP) processing to be performed in step S367 in FIG. 54. It is to be noted that description is given, in FIG. 55, by exemplifying the processing to be performed by the application processor 614; however, it is also possible for SerDes device 612 on the slave side to perform similar processing.

In step S381, in the application processor 614, the I2C/I3C master 651 determines whether or not the timer started in step S361 in FIG. 54 has timed out, and the processing is waited until determination is made that the timer has timed out. In a case where determination is made in step S381 that the timer has timed out, the processing proceeds to step S382; in the application processor 614, the I2C/I3C master 651 performs a polling operation.

In step S383, in the application processor 614, the I2C/I3C master 651 determines whether or not a Status register value of the read command is one.

In a case where determination is made in step S383 that the Status register value of the read command is one, the processing proceeds to step S384. In step S384, the application processor 614 performs read access, and then the processing returns to step S339 in FIG. 52.

Meanwhile, in a case where determination is made in step S383 that the Status register value of the read command is not one (other than one), the processing proceeds to step S385. In step S385, the application processor 614 sets one to the Error register (Timeout), and stores data of the extended packet header ePH and the extended packet footer ePF in the Error-related register.

In step S386, in the application processor 614, the I2C/I3C master 651 issues a stop command. In this case, the Sequence C (at the time of AP) processing is finished, and the communication processing itself is finished.

Figure 56:
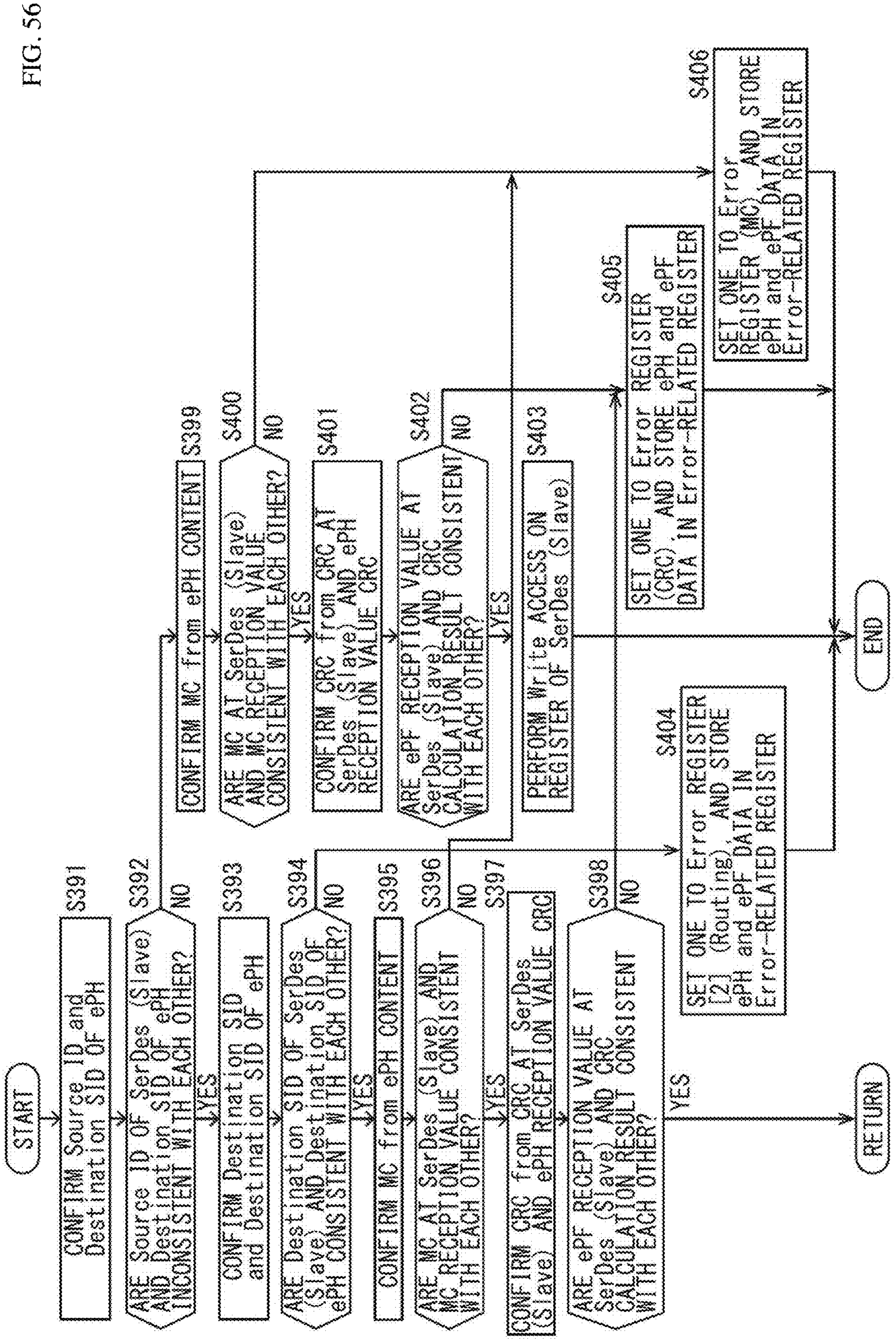
FIG. 56 is a flowchart describing Sequence B (at the time of SerDes (Slave)) processing.

FIG. 56 is a flowchart describing the Sequence B (at the time of SerDes (Slave)) processing to be performed in steps S324 and S334 in FIG. 51. It is to be noted that description is given, in FIG. 56, by exemplifying the processing performed by the SerDes device 612 on the slave side; however, the Sequence B (at the time of SerDes (Master)) in step S322 in FIG. 51, the Sequence B (at the time of Image Sensor) processing in step S326 in FIG. 51, and the Sequence B (at the time of SerDes (Master)) processing in step S332 in FIG. 52 are also performed in the same manner.

In step S391, in the SerDes device 612 on the slave side, the CCI-FS processing section 636 confirms Source ID of the SerDes device 612 on the slave side and Destination SID of the extended packet header ePH.

In step S392, in the SerDes device 612 on the slave side, the CCI-FS processing section 636 determines whether or not the Source ID of the SerDes device 612 on the slave side and the Destination SID of the extended packet header ePH are inconsistent with each other.

In a case where determination is made in step S392 that the Source ID of the SerDes device 612 on the slave side and the Destination SID of the extended packet header ePH are inconsistent with each other, the processing proceeds to step S393.

In step S393, in the SerDes device 612 on the slave side, the CCI-FS processing section 636 confirms Destination SID of the SerDes device 612 on the slave side and the Destination SID of the extended packet header ePH.

In step S394, in the SerDes device 612 on the slave side, the CCI-FS processing section 636 determines whether or not the Source ID of the SerDes device 612 on the slave side and the Destination SID of the extended packet header ePH are consistent with each other.

In a case where determination is made in step S394 that the Source ID of the SerDes device 612 on the slave side and the Destination SID of the extended packet header ePH are consistent with each other, the processing proceeds to step S395.

In step S395, in the SerDes device 612 on the slave side, the CCI-FS processing section 636 confirms Message Counter from the content of the extended packet header ePH.

In step S396, in the SerDes device 612 on the slave side, the CCI-FS processing section 636 determines whether or not the Message Counter at the SerDes device 612 on the slave side and the reception value of the Message Counter confirmed from the content of the extended packet header ePH are consistent with each other.

In a case where determination is made in step S396 that the Message Counter at the SerDes device 612 on the slave side and the reception value of the Message Counter confirmed from the content of the extended packet header ePH are consistent with each other, the processing proceeds to step S397.

In step S397, in the SerDes device 612 on the slave side, the CCI-FS processing section 636 confirms a CRC calculation result calculated from the extended packet header ePH in the SerDes device 612 on the slave side and the reception value (ePF0) of the extended packet footer ePF.

In step S398, determination is made as to whether or not the reception value (ePF0) of the extended packet footer ePF and the CRC calculation result are consistent with each other; in a case where determination is made that they are consistent with each other, the processing returns to step S325 in FIG. 51.

Meanwhile, in a case where determination is made in step S392 that the Source ID of the SerDes device 612 on the slave side and the Destination SID of the extended packet header ePH are not inconsistent (consistent) with each other, the processing proceeds to step S399.

In steps S399 to S402, pieces of processing similar to those in steps S395 to S398 are performed.

In step S402, in a case where determination is made that the reception value (ePF0) of the extended packet footer ePF and the CRC calculation result are consistent with each other, the processing proceeds to step S403. In step S403, write access is performed on the register 637 of the SerDes device 612 on the slave side.

In a case where determination is made in step S394 that the Source ID of the SerDes device 612 on the slave side and the Destination SID of the extended packet header ePH are not consistent with each other, the processing proceeds to step S404. In step S404, in the SerDes device 612 on the slave side, the CCI-FS processing section 636 sets one to Error register [2] (Routing), and stores data of the extended packet header ePH and the extended packet footer ePF in the Error-related register.

In a case where determination is made in step S398 or S402 that the reception value (ePF0) of the extended packet footer ePF and the CRC calculation result are not consistent with each other, the processing proceeds to step S405. In step S405, in the SerDes device 612 on the slave side, the CCI-FS processing section 636 sets one to the Error register (CRC), and stores data of the extended packet header ePH and the extended packet footer ePF in the Error-related register.

In a case where determination is made in step S396 or S400 that the Message Counter at the SerDes device 612 on the slave side and the reception value of the Message Counter confirmed from the content of the extended packet header ePH are not consistent with each other, the processing proceeds to step S406. In step S406, in the SerDes device 612 on the slave side, the CCI-FS processing section 636 sets one to the Error register (MC), and stores data of the extended packet header ePH and the extended packet footer ePF in the Error-related register.

After processing in steps S403 to step S406, the Sequence B (at the time of SerDes (Slave)) processing is finished, and the communication processing itself is finished.

It is to be noted, a combination of the following is envisioned: the CRC calculation may be performed only on the E2E Protection as a target; an error is detected in each device, and a packet is discarded/not discarded.

Figure 57:
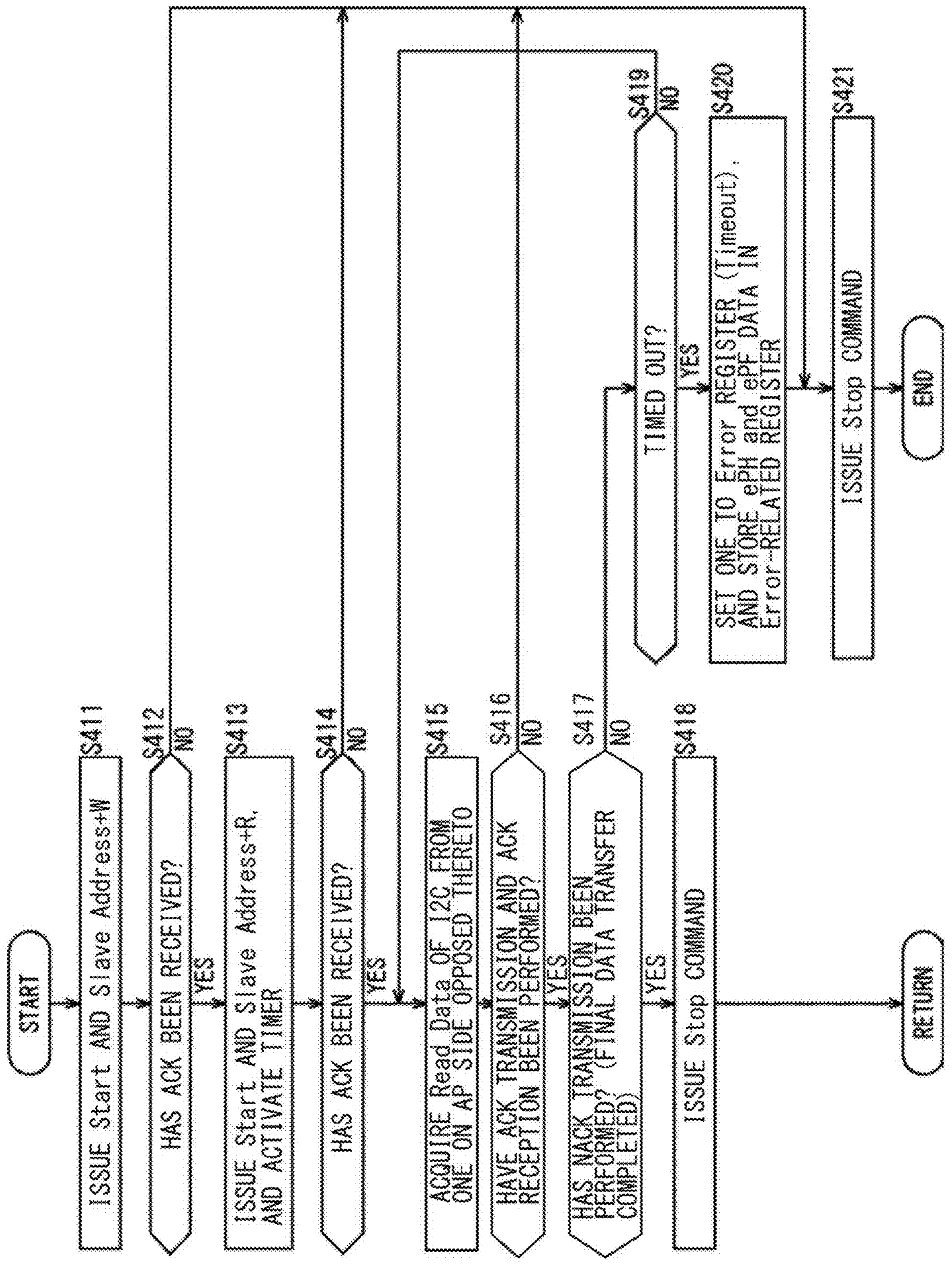
FIG. 57 is a flowchart describing Sequence A_Read_Data (at the time of AP) processing.

FIG. 57 is a flowchart describing the Sequence A_Read_Data (at the time of AP) processing performed in step S339 in FIG. 52. It is to be noted that description is given, in FIG. 57, by exemplifying the processing to be performed by the application processor 614; however, the Sequence A_Read_Data (at the time of SerDes (Slave) processing in step S336 in FIG. 52 is also performed in the same manner.

In step S411, in the application processor 614, the I2C/I3C master 651 issues a start command and a slave address (Slave Address+W8-bit illustrated in FIG. 48).

In step S412, in the application processor 614, determination is made as to whether or not the I2C/I3C master 651 has received an ACK response from the I2C/I3C slave 644 of the SerDes device 613 on the master side. In a case where determination is made in step S412 that the ACK response from the I2C/I3C slave 644 of the SerDes device 613 on the master side has been received, the processing proceeds to step S413.

In step S413, in the application processor 614, the I2C/I3C master 651 issues a start command and a slave address (Slave Address+R8-bit illustrated in FIG. 48), and activate a timer.

In step S414, in the application processor 614, determination is made as to whether or not the I2C/I3C master 651 has received an ACK response from the I2C/I3C slave 644 of the SerDes device 613 on the master side. In a case where determination is made in step S414 that the ACK response from the I2C/I3C slave 644 of the SerDes device 613 on the master side has been received, the processing proceeds to step S415.

In step S415, in the application processor 614, the I2C/I3C master 651 acquires read data from the I2C/I3C slave 644 opposed to a side of the application processor 614.

In step S416, determination is made as to whether or not the I2C/I3C master 651 of the application processor 614 has performed ACK transmission and ACK reception has been performed in the I2C/I3C slave 644 opposed to the side of the application processor 614.

In a case where determination is made in step S416 that the I2C/I3C master 651 of the application processor 614 has performed the ACK transmission and the ACK reception has been performed in the I2C/I3C slave 644 opposed to the side of the application processor 614, the processing proceeds to step S417.

In step S417, determination is made as to whether or not the I2C/I3C master 651 of the application processor 614 has performed NACK transmission in association with completion of the transfer of the final data.

In a case where determination is made in step S417 that the NACK transmission has been performed, the processing proceeds to step S418. In step S418, in the application processor 614, the I2C/I3C master 651 issues a stop command. This causes the Sequence A_Read_Data (at the time of AP) processing to be finished, and the processing returns to step S340 in FIG. 52

Meanwhile, in a case where determination is made in step S417 that the NACK transmission has not been performed, the processing proceeds to step S419.

In step S419, in the application processor 614, the I2C/I3C master 651 determines whether or not the timer started in step S413 has timed out. In a case where determination is made in step S419 that the timer has not timed out, the processing returns to step S415, and subsequently similar processing is repeatedly performed.

Meanwhile, in a case where determination is made in step S419 that the timer has timed out, the processing proceeds to step S420.

In step S420, the application processor 614 sets one to the Error register (Timeout), and stores data of the extended packet header ePH and the extended packet footer ePF in the Error-related register.

After the processing in step S420, or in a case where determination is made in step S414 that the ACK response from the I2C/I3C slave 644 of the SerDes device 613 on the master side has not been received, the processing proceeds to step S421. Likewise, in a case where determination is made in step S416 that the I2C/I3C master 651 of the application processor 614 has not performed the ACK transmission or that the ACK reception has not been performed in the I2C/I3C slave 644 opposed to the side of the application processor 614, the processing proceeds to step S421.

In step S421, in the application processor 614, the I2C/I3C master 651 issues a stop command. In this case, the Sequence A_Read_Data (at the time of AP) processing is finished, and the communication processing itself is finished.

Here, the access timing from the I2C/I3C master 634 to the I2C/I3C slave 621 during the output of the I2C/I3C slave 621 (see FIG. 46), and the access timing from the I2C/I3C master 651 to the I2C/I3C slave 644 during the output of the I2C/I3C slave 644 of the SerDes device 613 on the master side (see FIG. 48) have three combinations described as follows.

In the first access timing, polling is performed until read data is acquired, and the I2C/I3C master starts read processing after completion of preparation of read data reading.

In the second access timing, the I2C/I3C master starts read processing after elapse of a certain period of time.

In the third access timing, Clock Stretch method (see FIG. 72 described later) is used, and the I2C/I3C master starts read processing after elapse of a certain period of time; on that occasion, there are a mode in which read data is transmitted in a batch and a mode in which read data is transmitted separately (asserting Clock Stretch Mode signal).

<Configuration Example of Extended Packet Header ePH>

FIGS. 58 to 60 are each a diagram illustrating a configuration example of the extended packet header ePH.

FIG. 58 illustrates detailed configuration examples of the extended packet header ePH0, the extended packet header ePH1, and the extended packet header ePH2. As for the addition of the extended packet header ePH as illustrated, the content of the extended packet header ePH is defined by appropriating the ePH structure at the C-PHY and the D-PHY for the CCI-FS.

FIG. 59 illustrates a detailed configuration example of the extended packet header ePH3. As for the addition of the extended packet header ePH as illustrated, the content of the extended packet header ePH is defined for the CCI-FS.

FIG. 60 illustrates a detailed configuration example of the extension DT of the extended packet header ePH. For example, "0xC0:For I2C" and "0xC1:For I3C" are added to the data type of the extended packet header ePH in order to adapt to the CCI-FS.

<Circuit Configuration Example of I2C>

Figure 61:
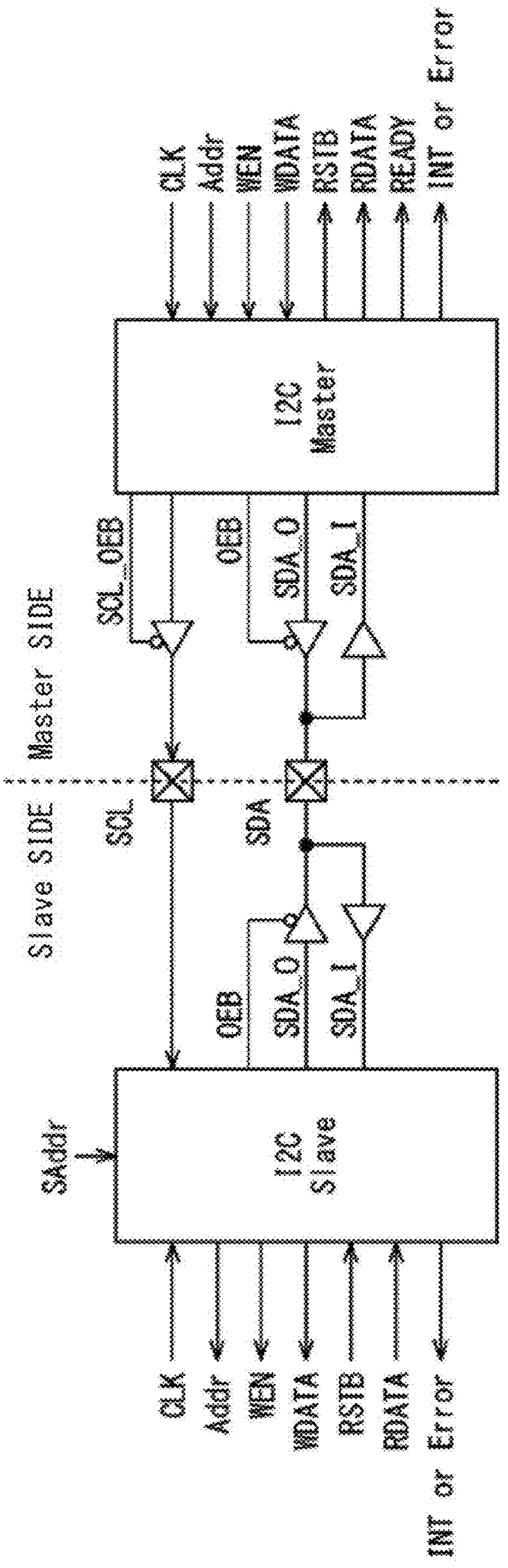
FIG. 61 is a block diagram illustrating a configuration example of an existing I2C in hardware.

FIG. 61 illustrates a configuration example of existing I2C in hardware. For example, a configuration example of the I2C is illustrated in the case of a bus coupling configuration at an upper level during hardware implementation; a configuration enabling reception of AKC/NACK from the upper layer may be employed on the slave side. It is needless to say that only one example is illustrated, and the upper bus configuration need not necessarily coincide therewith.

Figure 62:
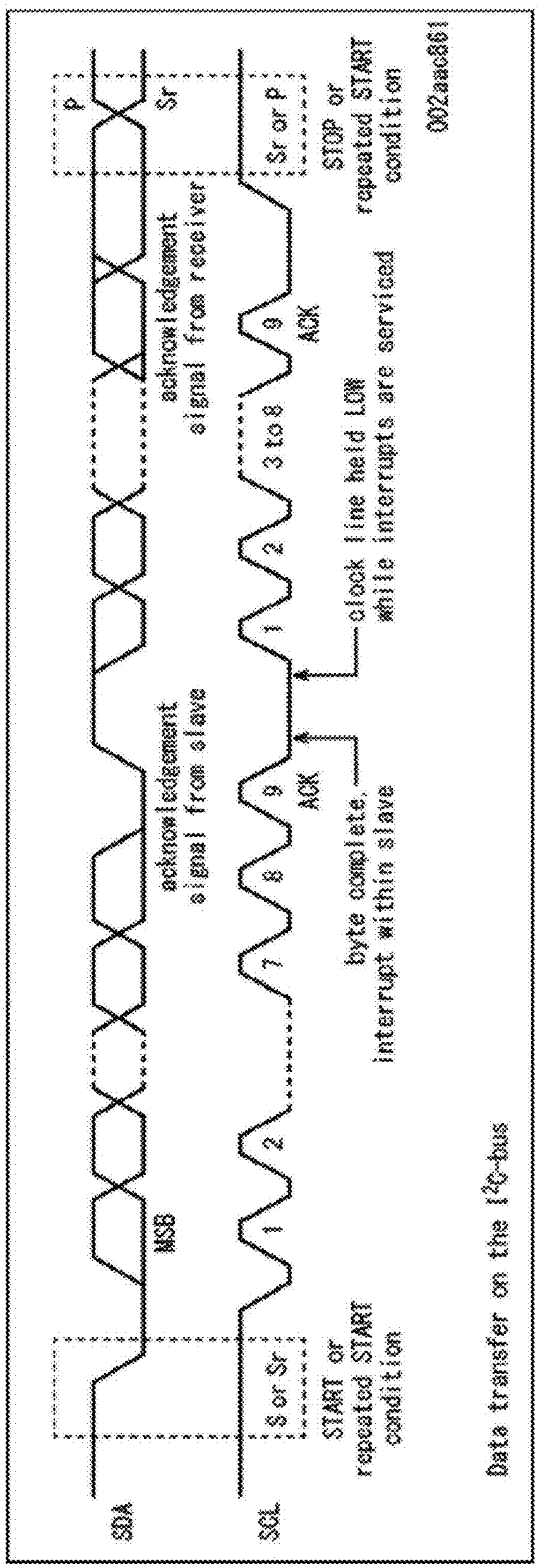
FIG. 62 is a diagram illustrating an example of a waveform during data transfer on an I2C bus.

FIG. 62 illustrates a waveform during data transfer on an I2C bus. It is to be noted that the I2C bus standard and CCI(I2C) shall be equivalent.

<Configuration Example Related to CCI in Communication System 701>

Figure 63:
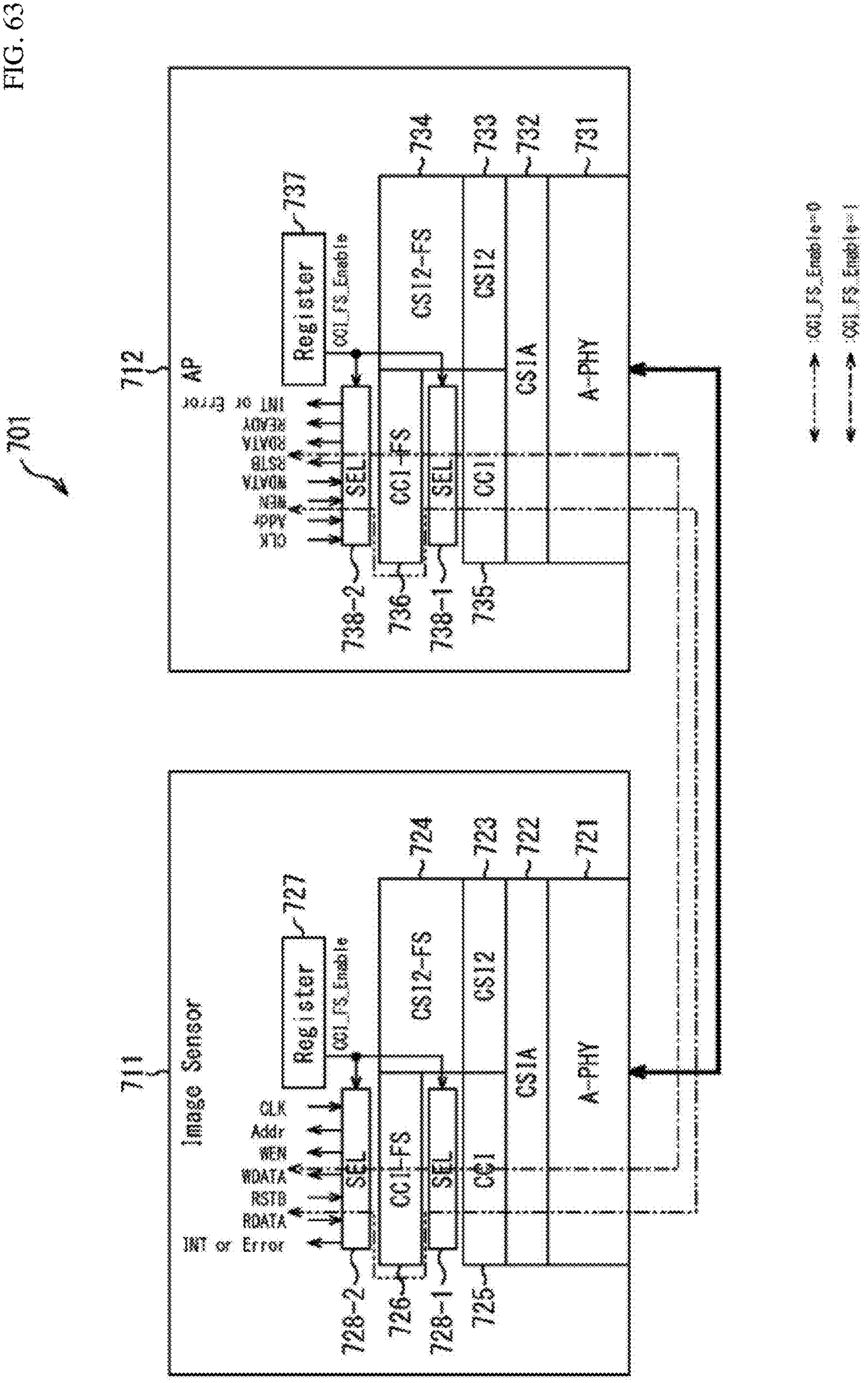
FIG. 63 is a block diagram illustrating a configuration example of a communication system of A-PHY direct coupling configuration related to CCI.

FIG. 63 is a block diagram illustrating a configuration example related to CCI in a communication system 701 of A-PHY direct coupling, in the same manner as the communication system 501 illustrated in FIG. 27 described above.

As illustrated in FIG. 63, in the communication system 701, an image sensor 711 and an application processor 712 are directly coupled to each other by the A-PHY.

The image sensor 711 includes an A-PHY processing section 721, a CSIA processing section 722, the CSI2 processing section 523, a CSI2-FS processing section 724, a CCI processing section 725, a CCI-FS processing section 726, a register 727, and selectors 728-1 and 728-2. As illustrated, the selectors 728-1 and 728-2 are disposed to sandwich the CCI-FS processing section 726, and are able to switch enablement/disablement of the CCI-FS processing section 726 in accordance with a CCI_FS_Enable signal of the register 727.

The application processor 712 includes an A-PHY processing section 731, a CSIA processing section 732, a CSI2 processing section 733, a CSI2-FS processing section 734, a CCI processing section 735, a CCI-FS processing section 736, a register 737, and selectors 738-1 and 738-2. As illustrated, the selectors 738-1 and 738-2 are disposed to sandwich the CCI-FS processing section 736, and are able to switch enablement/disablement of the CCI-FS processing section 736 in accordance with a CCI_FS_Enable signal of the register 737.

For example, in a case where the CCI_FS_Enable signal indicates that the CCI-FS is enabled (CCI_FS_Enable=1), data is transmitted and received via the CCI-FS processing section 726 and the CCI-FS processing section 736, as illustrated by an arrow of alternate long and short dash line. Meanwhile, in a case where the CCI_FS_Enable signal indicates that the CCI-FS is disabled (CCI_FS_Enable=0), data is transmitted and received not via the CCI-FS processing section 726 and the CCI-FS processing section 736, as illustrated by an arrow of alternate long and two short dashes line.

<Coupling Mode of Network>

Figure 64:
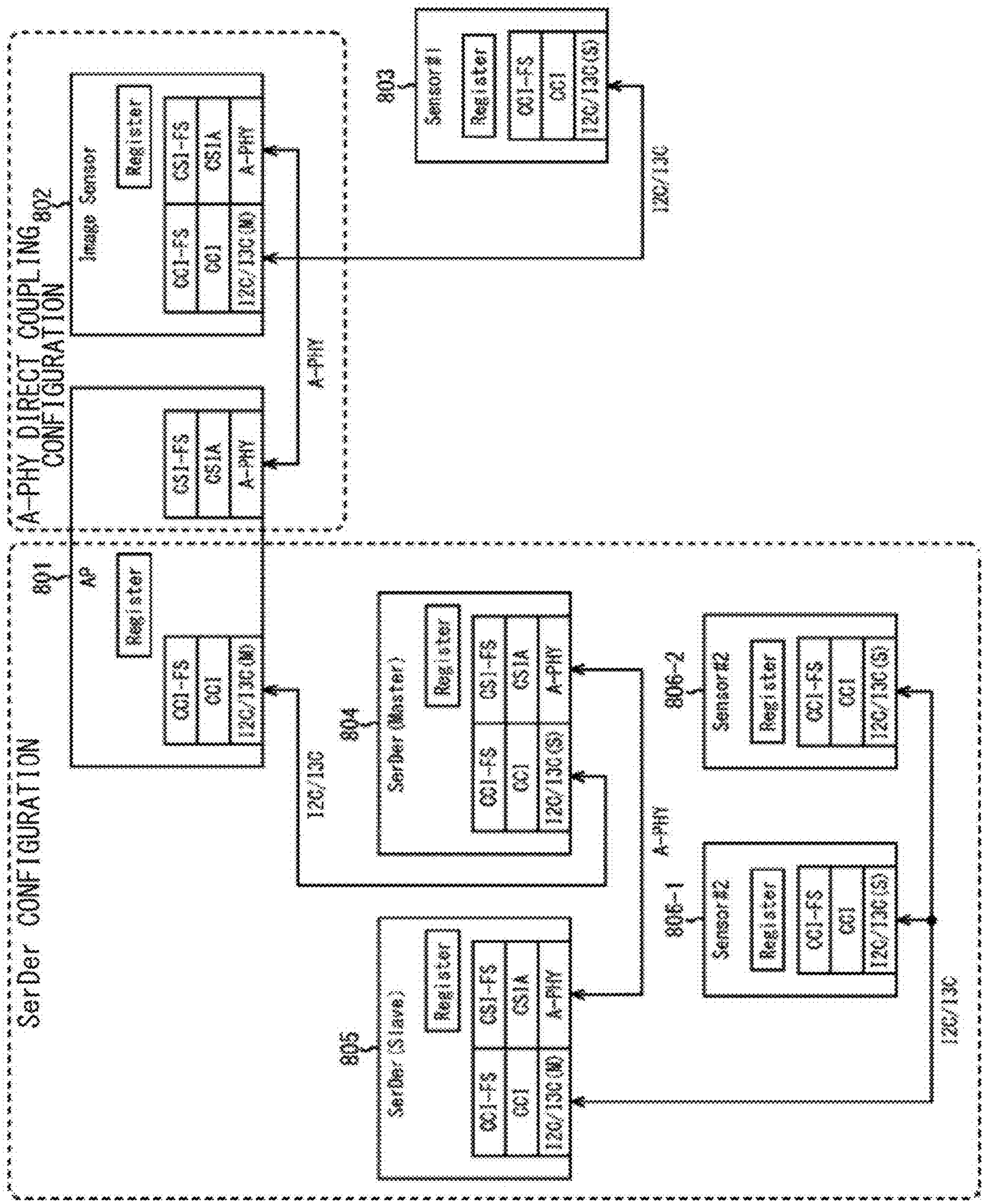
FIG. 64 is a diagram illustrating an example of a network coupling mode.

FIG. 64 illustrates an example of a coupling mode (topology) of networks of A-PHY direct coupling configuration and SerDes coupling configuration.

A coupling mode can be configured in which an application processor 801 is directly coupled to the image sensor 802 via the A-PHY, and the image sensor 802 is coupled to a sensor 803 via I2C/I3C.

The application processor 801 is coupled to a SerDes device 804 on the master side via the I2C/I3C, and the SerDes device 804 on the master side and a SerDes device 805 on the slave side are coupled to each other via the A-PHY. A coupling mode can be configured in which the SerDes device 805 on the slave side is coupled to two sensors 806-1 and 806-2 via the I2C/I3C.

<Circuit Configuration of CCI-FS Processing Section>

Figure 65:
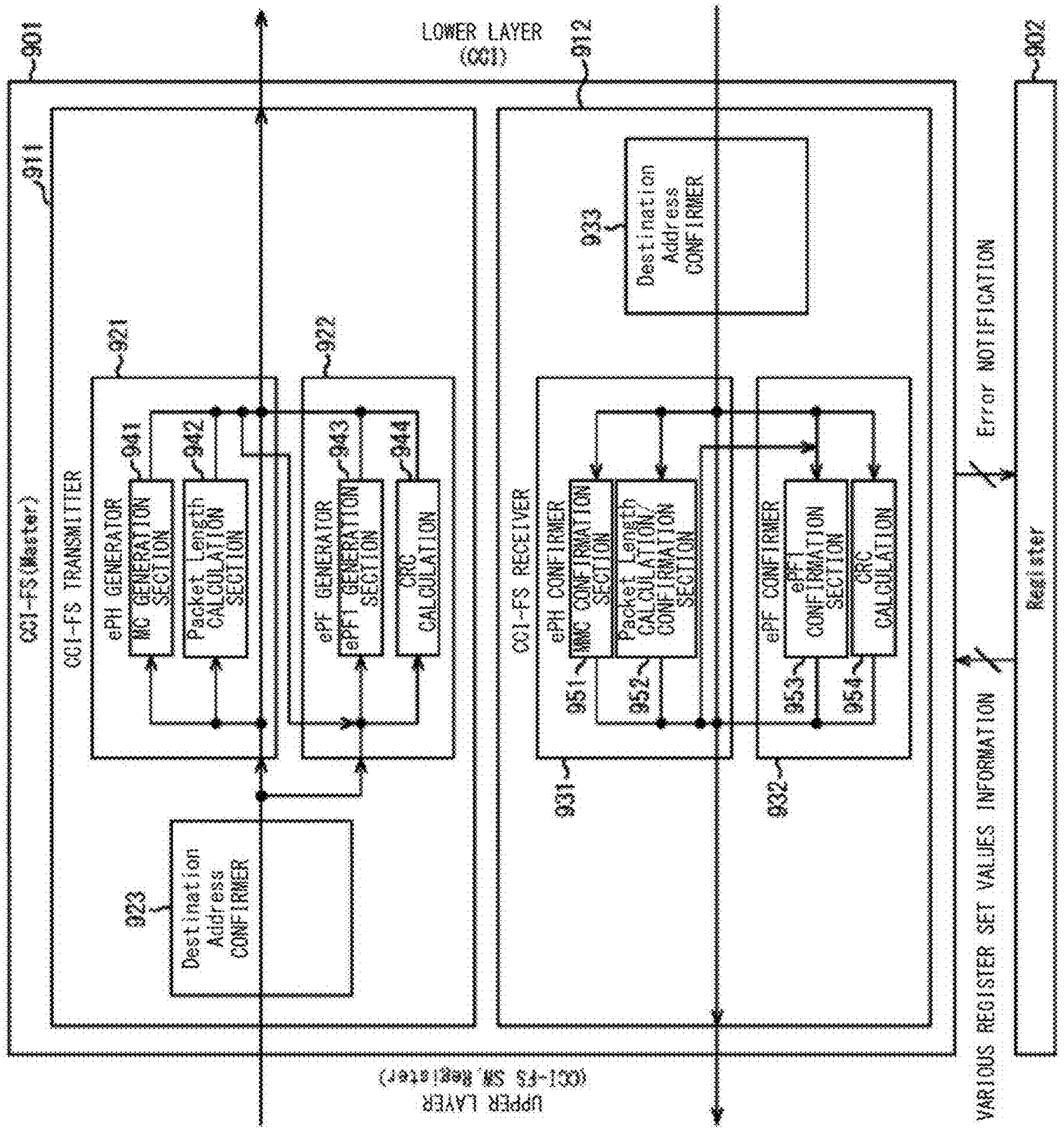
FIG. 65 is a block diagram illustrating an example of a circuit configuration of a CCI-FS processing section.

FIG. 65 is a block diagram illustrating an example of a circuit configuration of the CCI-FS processing section. A CCIFS processing section 901 and a register 902 illustrated in FIG. 65 have a configuration common to the CCI-FS processing section and the register included in each of the devices described above.

As illustrated in FIG. 65, the CCI-FS processor 901 includes, in an upper layer, a CCI-FS switch, a register, or the like, and includes, in a lower layer, a CCI processing section. The CCI-FS processor 901 includes a CCI-FS transmitter 911 and a CCI-FS receiver 912. Various types of register set value information are supplied from the register 902 to the CCI-FS processor 901, and Error notification is supplied from the CCI-FS processor 901 to the register 902.

The CCI-FS transmitter 911 includes an extended packet header ePH generator 921, an extended packet footer ePF generator 922, and a Destination Address confirmer 923.

The extended packet header ePH generator 921 includes an MC generation section 941 that generates Message Counter, and a packet Length calculation section 942 that calculates a packet length. The extended packet footer ePF generator 922 includes an extended packet footer ePF1 generation section 943 that generates the extended packet footer ePF1, and a CRC calculation section 944 that calculates CRC stored in the extended packet footer ePF0.

The CCI-FS receiver 912 includes an extended packet header ePH confirmer 931, an extended packet footer ePF confirmer 932, and a Destination Address confirmer 933.

The extended packet header ePH confirmer 931 includes an MC confirmation section 951 that confirms the Message Counter, and a Packet Length calculation/confirmation section 952 that calculates and confirms a packet length. The extended packet footer ePF confirmer 932 includes an extended packet footer ePF1 confirmation section 953 that confirms the extended packet footer ePF1, and a CRC calculation section 954 that calculates CRC stored in the extended packet footer ePF0.

The CCI-FS processor 901 enables the CCI-FS transmitter 911 to confirm the Destination Address of data from the upper layer, generate the extended packet header ePH and the extended packet footer ePF to add them to the data, and supply the data to the lower layer. The CCI-FS processor 901 enables the CCI-FS receiver 912 to confirm Destination Address of data from the lower layer, confirm the extended packet header ePH and the extended packet footer ePF, and supply them to the upper layer.

Now, description is given of an operation of the CCI-FS processing section of the respective devices constituting the communication system 601 of the configuration example of the SerDes coupling configuration illustrated in FIG. 40 described above.

The application processor 614 has Source ID indicating its own device in the extended packet header ePH in the application processor 614. In addition, the CCI-FS processing section 653 adds the above-described information and information having the Destination ID indicating a target device to be accessed.

The SerDes device 612 on the slave side and the SerDes device 613 on the master side each have Source ID indicating its own device through prior setting or as a characteristic value. The CCI-FS processing section 636 and the CCI-FS processing section 646 perform prior setting on the above-described information and on the information having the Destination ID indicating a coupling device and a target device.

In addition, the CCI-FS processing section 636 and the CCI-FS processing section 646 each compare Destination ID of the received extended packet header ePH and its own ID (Source ID) with each other to determine whether it is an access to itself or (Destination ID) indicating a target device. For example, when the Destination ID of the received extended packet header ePH and its own ID (Source ID) are consistent with each other, self register access is performed as an access to an intermediate device (SerDes device). Meanwhile, when the Destination ID of the received extended packet header ePH and its own ID (Source ID) are not consistent with each other, data is transferred toward the coupled device (Destination ID) as an access to a device of a subsequent stage.

As described above, the data is transferred to the Source ID and the Destination ID embedded in the extended packet header ePH, the intermediate device (SerDes device), or the target device, on the basis of the Source ID being preset or of characteristic value and information on the preset coupling destination, and access is performed toward the target device.

The CSI2-FS processing section 623 of the image sensor 611 performs its own register access as an access to the image sensor 611 when the Destination ID of the received extended packet header ePH and its own ID (Source ID) are consistent with each other.

In this manner, the Source ID of each device is able to use a characteristic value, a preset value, or a combination thereof for each device.

FIGS. 66 to 68 are each a diagram illustrating a detailed configuration example of the register 902.

FIG. 66 illustrates details of the register 902 from an address 0x000 to an address 0x109. FIG. 67 illustrates a configuration example at the time of Bridge configuration, as details of the register 902 from an address 0x110 to an address 0x125.

FIG. 68 illustrates Error-related registers, as details of the register 902 for an address 0x200. FIG. 68 illustrates an Error-related register (debug), as details of the register 902 for an address 0x300 and an address 0x400. FIG. 68 illustrates an Error Injection-related register (debug), as details of the register 902 for an address 0x800.

<Modification Example of Extended Packet Header ePH>

Figure 69:
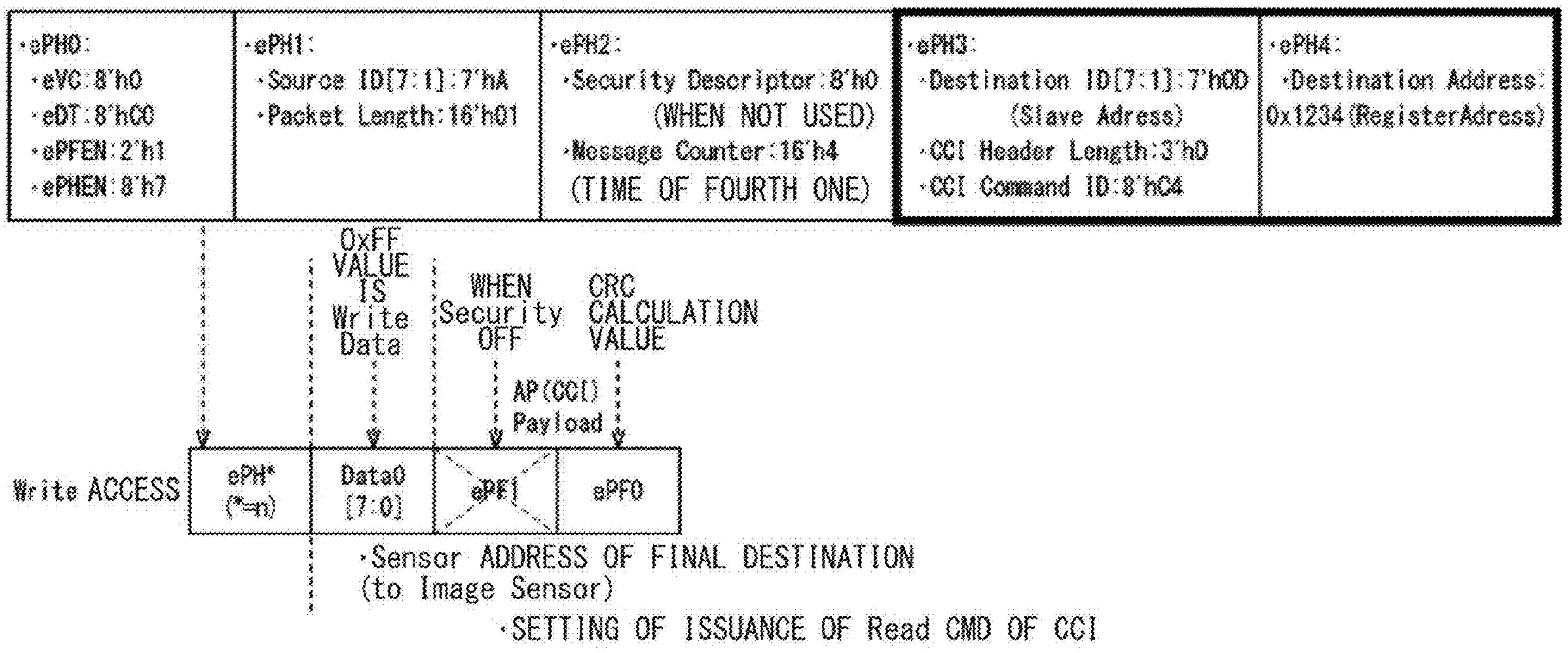
FIG. 69 is a diagram illustrating modification example of the extended packet header ePH in a packet configuration of write data generated on the side of the application processor.
Figure 70:
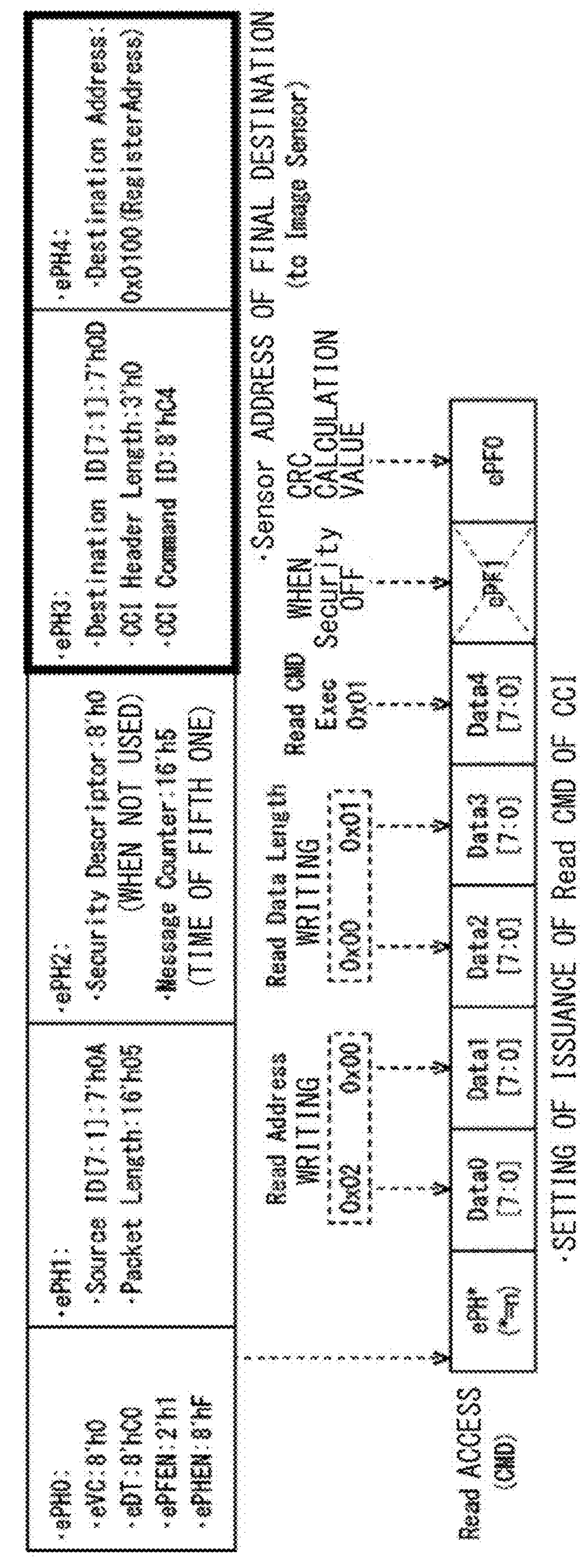
FIG. 70 is a diagram illustrating a modification example of the extended packet header ePH in a packet configuration of a read command generated on the side of the application processor.

Description is given, with reference to FIGS. 69 and 70, of a modification example of the extended packet header ePH.

FIG. 69 illustrates a modification example of the extended packet header ePH in a packet configuration of write data to be generated by the CCI-FS processing section 536 of the application processor 512 during write access, as described above with reference to FIG. 33. The extended packet header ePH illustrated in FIG. 69 differs from the configuration example illustrated above in FIG. 33 in the configuration of the extended packet header ePH3 and an extended packet header ePH4.

FIG. 70 illustrates a modification example of the extended packet header ePH in a packet configuration of write data to be generated in the CCI-FS processing section 536 of the application processor 512 during read access, as described above with reference to FIG. 28. The extended packet header ePH illustrated in FIG. 70 differs from the configuration example illustrated above in FIG. 28 in the configuration of the extended packet header ePH3 and the extended packet header ePH4.

For example, in the extended packet header ePH illustrated in FIGS. 69 and 70, the following combination is envisaged depending on the implementation.

Read address information may be stored in the extended packet header ePH or in an AP (CCI) payload. Length information may be stored in the extended packet header ePH or in the AP (CCI) payload. CMD information may be stored in CCI Command ID of the extended packet header ePH. On the basis of the CCI Command ID, information on the start, restart, and finish of a command is referenced. CCI Header Length may be used to store CCI information (e.g., Slave Address, etc.) in the AP (CCI) payload. The CCI Header Length is information indicating the header length of the CCI protocol (I2C).

Figure 71:
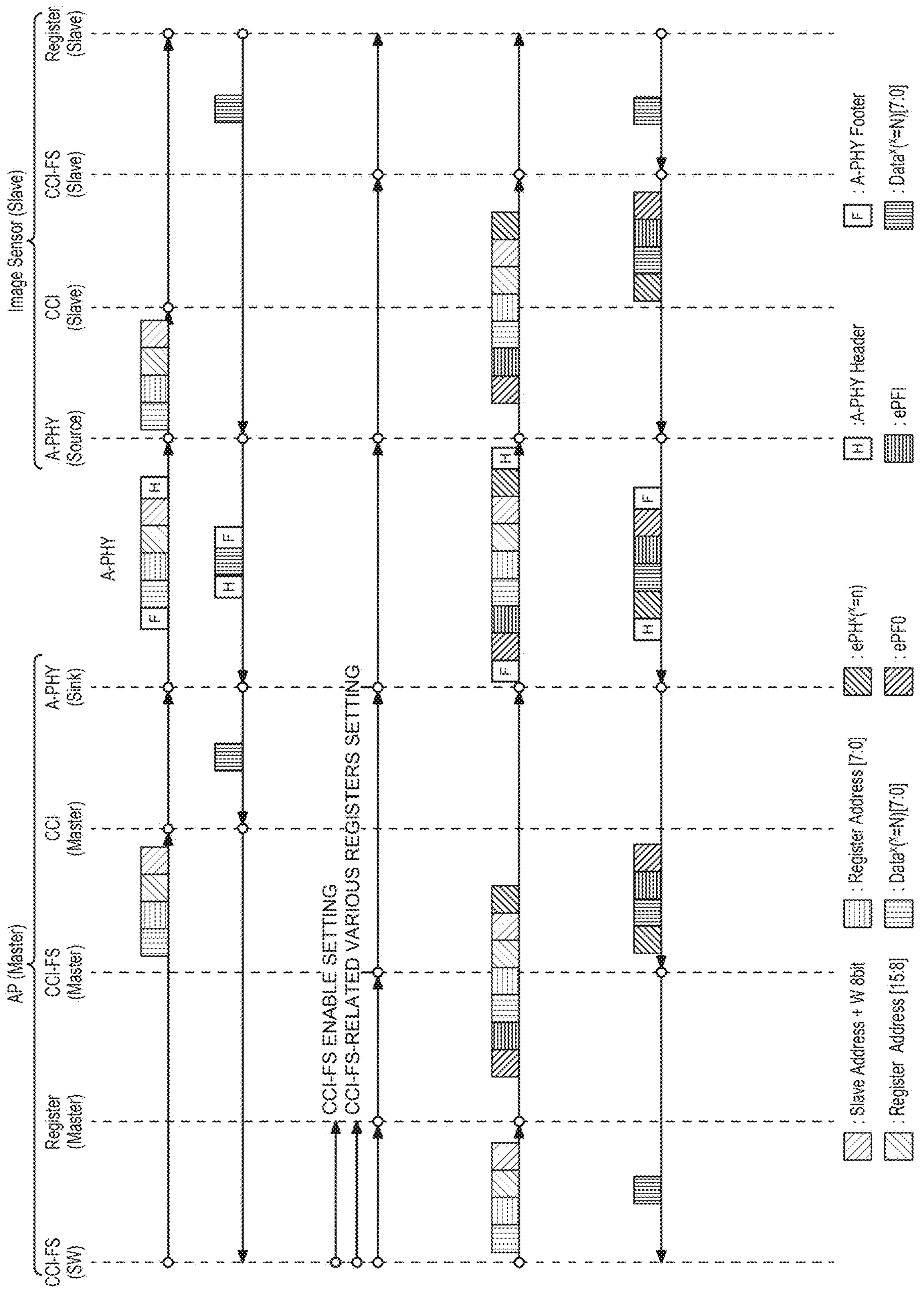
FIG. 71 is a diagram illustrating a flow between the application processor and the image sensor in the A-PHY direct coupling configuration.

FIG. 71 is a diagram describing a flow between the image sensor 511 and the application processor 512 in the A-PHY direct coupling configuration as illustrated in FIG. 27.

In the application processor 512, the CCI-FS switch 538 issues a read command and a write command. The CCI-FS switch 538 supplies the CCI processing section 535 with a slave address (Slave Address+W 8 bit), register address a (Register Address [15:8], a Register Address [7:0], and data (Data*(*=N) [7:0]). The CCI processing section 535 converts them to the AP(CCI) payload, and supplies it to the A-PHY processing section 531. The A-PHY processing section 531 adds an A-PHY header and an A-PHY footer to the AP (CCI) payload, and performs A-PHY transfer to the image sensor 511.

In the image sensor 511, the A-PHY processing section 521 removes the A-PHY header and the A-PHY footer, and supplies the AP (CCI) payload to the CCI processing section 525. The CCI processing section 525 converts the AP (CCI) payload, writes, on the basis of a content thereof, data into the register 527 in accordance with the write command, and reads the data from the register 527 in accordance with the read command.

At this time, an initial setting of CCI-FS Enable is performed by the CCI processing section 525, and bus conversion of a register interface, AHB bus, and the like is performed. In addition, the CCI-FS Enable setting is confirmed through the CCI processing section 525 or the CCI-FS processing section 526.

The CCI processing section 525 converts read data (Data* (*=M)[7:0]) read from the register 527 in response to the read command to the AP (CCI) payload, and supplies it to the A-PHY processing section 521. The A-PHY processing section 521 adds an A-PHY header and an A-PHY footer to the AP (CCI) payload, and performs A-PHY transfer to the application processor 512.

In the application processor 512, the A-PHY processing section 531 removes the A-PHY header and the APHY footer, and supplies the AP (CCI) payload to the CCI processing section 535. The CCI processing section 535 converts the AP(CCI) payload, and supplies the read data (Data*(*=M)[7:0]) to the CCI-FS switch 538.

The CCI-FS switch 538 performs CCI-FS Enable setting and various CCI-FS-related register settings for register 537. At this time, register access is dependent on the implementation. The CCI-FS switch 538 performs various CCI-FS-related register settings for the register 527 via the register 537, the CCI-FS processing section 536, the A-PHY processing section 531, the A-PHY processing section 521, and the CCI-FS processing section 526.

In the application processor 512, the CCI-FS switch 538 issues a read command. The CCI-FS switch 538 supplies the register 537 with the slave address (Slave Address+W 8 bit), register addresses (Register Address [15:8], Register Address [7:0]), and data (Data*(*=N) [7:0]). The CCI-FS processing section 536 converts them to the AP (CCI) payload, and adds the extended packet header ePH*(*=n), the extended packet footer ePF1, and the extended packet footer ePF0 thereto, and supplies them to the A-PHY processing section 531. The A-PHY processing section 531 adds an A-PHY header and an A-PHY footer thereto, and performs A-PHY transfer to the image sensor 511.

In the image sensor 511, the A-PHY processing section 521 removes the A-PHY header and the A-PHY footer, and supplies the CCI-FS processing section 526 with the extended packet header ePH*(*=n), the AP (CCI) payload, the extended packet footer ePF1, and the extended packet footer ePF0. The CCI-FS processing section 526 converts the AP (CCI) payload, and reads, on the basis of the content thereof, data from the register 527 in accordance with the read command. At this time, register access is dependent on the implementation, and bus conversion of a register interfaces, an AHB bus, a CCI interface, and the like is performed.

The CCI-FS processing section 526 converts the read data (Data*(*=M)[7:0]) read from the register 527 in response to read command to the AP (CCI) payload, and adds the extended packet header ePH*(*=n), the extended packet footer ePF1, and the extended packet footer ePF0 thereto, and supplies them to the A-PHY processing section 521. The A-PHY processing section 521 adds an A-PHY header and an A-PHY footer thereto, and performs A-PHY transfer to the application processor 512.

In the application processor 512, the A-PHY processing section 531 removes the A-PHY header and the A-PHY footer, and supplies the CCI-FS processing section 536 with the extended packet header ePH*(*=n), the AP (CCI) payload, the extended packet footer ePF1, and the extended packet footer ePF0. The CCIFS processing section 536 converts the AP(CCI) payload, and supplies the read data (Data*(*=M)[7:0]) to the CCI-FS switch 538.

It is to be noted that the description has been given of the above flow by exemplifying the I2C/I3C command generation using hardware; however, aside from those described above, there are the following combinations.

In the case of software, as for the I2C/I3C generation using software, Slave Address, Register address, Payload, ACK response reception, transmission, and various control codes (S, Sr, ACK, NACK, and P) are generated by software (e.g., GPIO-controlled image). As for the I2C/I3C command generation using software, CPU bus setting is used to issue the Slave Address, the Register and the Payload from a CPU in response to ACK reception.

In the case of hardware, as for as for the I2C/I3C generation using hardware, setting to transfer to HW IP of I2C/I3C and data setting are performed. The various control codes perform automatic response using hardware. As for the I2C/I3C command generation using hardware, data is set by the setting to transfer to the HW IP of I2C/I3C, and the transmission is performed by a command. The various control codes perform automatic response using the hardware.

Figure 72:
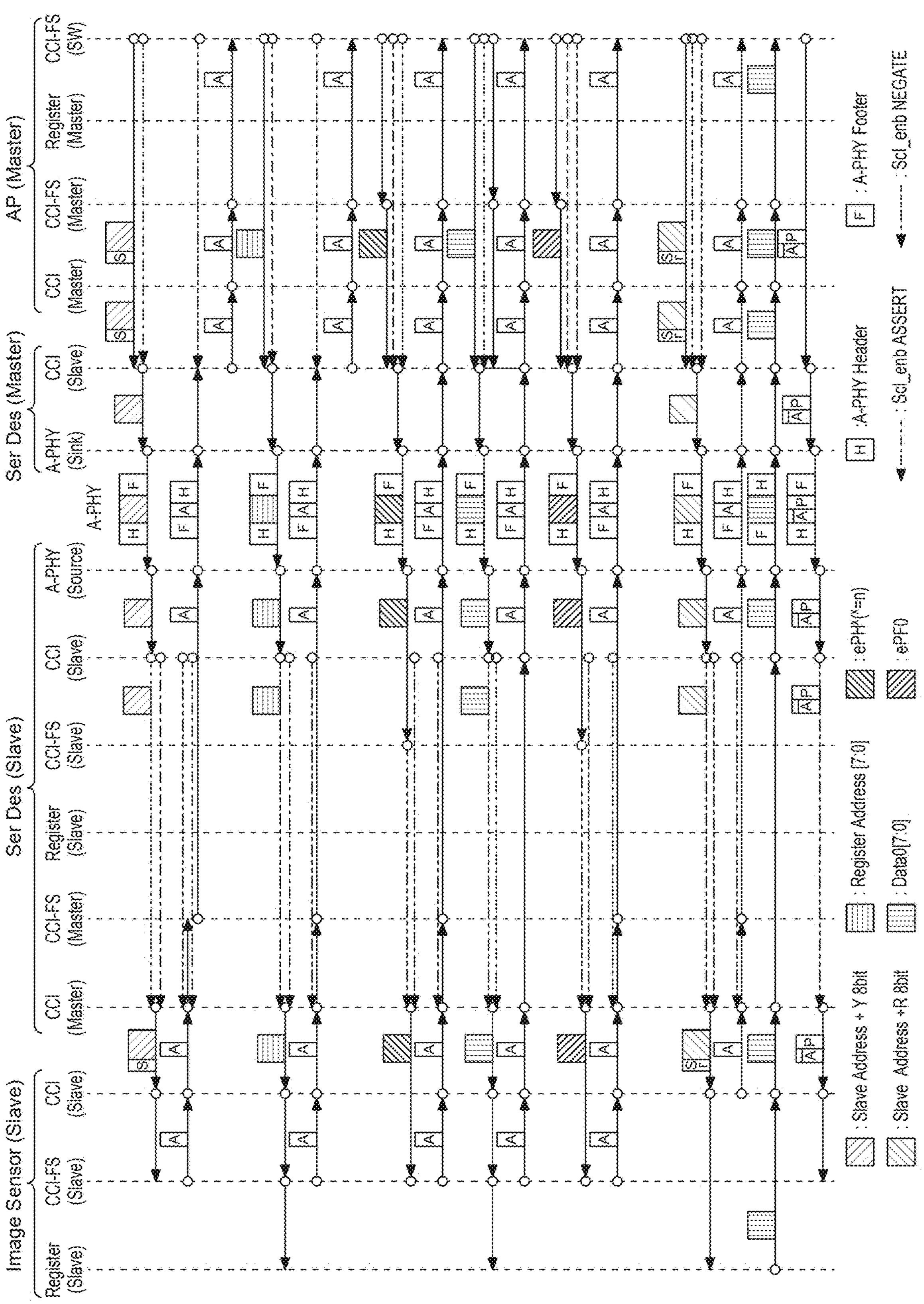
FIG. 72 is a diagram describing a flow using Clock Stretch method.

FIG. 72 is a diagram describing a flow using the Clock Stretch method in Write access and Read access between the image sensor 611 and the application processor 614 in the SerDes coupling configuration as illustrated in FIG. 40.

The CCI-FS switch 655 of the application processor 614 supplies a start command and a write command (Slave Address+W 8 bit) to the CCI processing section 645 of the SerDes device 613 on the master side, and asserts an Scl_enb signal. In the SerDes device 613 on the master side, the CCI processing section 645 supplies the write command to the A-PHY processing section 641, and the A-PHY processing section 641 adds an A-PHY header and an A-PHY footer to the write command, and performs A-PHY transfer to the SerDes device 612 on the slave side.

In the SerDes device 612 on the slave side, the A-PHY processing section 631 removes the A-PHY header and the A-PHY footer, and supplies the write command to the CCI processing section 635 (Slave). The CCI processing section 635 (Slave)negates the Scl_enb signal, and supplies the write command to the CCI processing section 635 (Master). Here, the CCI processing section 635 that communicates with a side of the SerDes device 613 on the master side to function as a slave is referred to as the CCI processing section 635 (Slave), and the CCI processing section 635 that communicates with a side of the image sensor 611 to function as a master is referred to as the CCI processing section 635 (Master).

The CCI processing section 635 (Master) transmits a start command and a write command to the image sensor 611.

In the image sensor 611, the CCI processing section 622 receives the start command and the write command, and supplies them to the CSI2-FS processing section 623. The CSI2-FS processing section 623 supplies an ACK response indicating successful reception thereof to the CCI processing section 622, and the CCI processing section 622 transmits the ACK response to the SerDes device 612 on the slave side.

In the SerDes device 612 on the slave side, the CCI processing section 635 (Master) receives the ACK response, and supplies the ACK response to the CCI-FS processing section 636 when the Scl_enb signal is negated from the CCI processing section 635 (Slave). Thereafter, the CCI processing section 635 (Slave) asserts the Scl_enb signal to the CCI processing section 635 (Master).

The CCI-FS processing section 636 supplies the ACK response to the A-PHY processing section 631. The A-PHY processing section 631 adds an A-PHY header and an A-PHY footer to the ACK response, and performs A-PHY transfer to the SerDes device 613 on the master side.

In the SerDes device 613 on the master side, the A-PHY processing section 641 removes the A-PHY header and the A-PHY footer, and supplies the ACK response to the CCI processing section 645. When the CCI-FS switch 655 of the application processor 614 negates the Scl_enb signal to the CCI processing section 645, the CCI processing section 645 transmits the ACK response to the application processor 614.

In the application processor 614, the CCI processing section 652 receives the ACK response, and supplies it to the CCI-FS switch 655 via the CCI-FS processing section 653.

The CCI-FS switch 655 of the application processor 614 supplies a register address (Register Address [7:0]) to the CCI processing section 645 of the SerDes device 613 on the master side, and asserts the Scl_enb signal. In the SerDes device 613 on the master side, the CCI processing section 645 supplies the register address to the A-PHY processing section 641, and the A-PHY processing section 641 adds an A-PHY header and an A-PHY footer to the register address, and performs A-PHY transfer to the SerDes device 612 on the slave side.

In the SerDes device 612 on the slave side, the A-PHY processing section 631 removes the A-PHY header and the A-PHY footer, and supplies the register address to the CCI processing section 635 (Slave). The CCI processing section 635 (Slave)negates the Scl_enb signal, and supplies the register address to the CCI processing section 635 (Master). The CCI processing section 635 (Master) transmits the register address to the image sensor 611. Thereafter, the CCI processing section 635 (Slave) asserts the Scl_enb signal to the CCI processing section 635 (Master).

In the image sensor 611, the CCI processing section 622 receives the register address, and supplies it to the CSI2-FS processing section 623. The CSI2-FS processing section 623 supplies an ACK response indicating successful reception thereof to the CCI processing section 622, and the CCI processing section 622 transmits the ACK response to the SerDes device 612 on the slave side.

Thereafter, in the same manner as the processing described above, the ACK response is supplied up to the CCI-FS switch 655.

In the application processor 614, the CCI-FS processing section 653 transmits the extended packet header ePH*(*=n) to the SerDes device 613 on the master side under the control of the CCI-FS switch 655.

In the SerDes device 613 on the master side, the CCI processing section 645 receives the extended packet header ePH*(*=n), and supplies the extended packet header ePH*(*=n) to the A-PHY processing section 641 when the Scl_enb signal is asserted from the CCI-FS switch 655. Thereafter, the CCI-FS switch 655 negates the Scl_enb signal to the CCI processing section 645. The A-PHY processing section 641 adds an A-PHY header and an A-PHY footer to the extended packet header ePH*(*=n), and performs A-PHY transfer to the SerDes device 612 on the slave side.

In the SerDes device 612 on the slave side, the A-PHY processing section 631 removes the A-PHY header and the A-PHY footer, and supplies the extended packet header ePH*(*=n) to the CCI-FS processing section 636. The CCI-FS processing section 636 negates the Scl_enb signal, and supplies the extended packet header ePH*(*=n) to the CCI processing section 635 (Master). The CCI processing section 635 (Master) transmits the extended packet header ePH*(*=n) to the image sensor 611. Thereafter, the CCI processing section 635 (Slave) asserts the Scl_enb signal to the CCI processing section 635 (Master).

In the image sensor 611, the CSI2-FS processing section 623 receives the extended packet header ePH*(*=n). The CSI2-FS processing section 623 supplies an ACK response indicating successful reception thereof to the CCI processing section 622, and the CCI processing section 622 transmits the ACK response to the SerDes device 612 on the slave side.

Thereafter, in the same manner as the processing described above, the ACK response is supplied up to the CCI-FS switch 655.

The CCI-FS switch 655 of the application processor 614 supplies write data (Data0[7:0]) to the CCI processing section 645 of the SerDes device 613 on the master side, and asserts the Scl_enb signal. In the SerDes device 613 on the master side, the CCI processing section 645 supplies the write data to the A-PHY processing section 641, and the A-PHY processing section 641 adds an A-PHY header and an A-PHY footer to the write data and performs A-PHY transfer to the SerDes device 612 on the slave side.

In the SerDes device 613 on the master side, the CCI processing section 645 receives the write data, and supplies the write data to the A-PHY processing section 641 when the Scl_enb signal is asserted from the CCI-FS switch 655. Thereafter, a CSI2-FS processing section 653 negates the Scl_enb signal to the CCI processing section 645 under the control of the CCI-FS switch 655. The A-PHY processing section 641 adds an A-PHY header and an A-PHY footer to the write data, and performs A-PHY transfer to the SerDes device 612 on the slave side.

In the SerDes device 612 on the slave side, the A-PHY processing section 631 removes the A-PHY header and the A-PHY footer, and supplies the write data to the CCI processing section 635. The CCI processing section 635 negates the Scl_enb signal, and supplies the write data to the CCI processing section 635 (Master). The CCI processing section 635 (Master) transmits the write data to the image sensor 611. Thereafter, the CCI processing section 635 (Slave) asserts the Scl_enb signal to the CCI processing section 635 (Master).

In the image sensor 611, the CCI processing section 622 receives the write data and supplies it to the CSI2-FS processing section 623, and the CSI2-FS processing section 623 writes the write data into the register 624. The CSI2-FS processing section 623 supplies an ACK response indicating successful writing of the write data to the CCI processing section 622, and the CCI processing section 622 transmits the ACK response to the SerDes device 612 on the slave side.

Thereafter, in the same manner as the processing described above, the ACK response is supplied up to the CCI-FS switch 655.

In the application processor 614, the CCI-FS processing section 653 transmits the extended packet footer ePF0 to the SerDes device 613 on the master side under the control of the CCI-FS switch 655.

In the SerDes device 613 on the master side, the CCI processing section 645 receives the extended packet footer ePF0, and supplies the extended packet footer ePF0 to the A-PHY processing section 641 when the Scl_enb signal is asserted from the CCI-FS switch 655. Thereafter, the CCI-FS switch 655 negates the Scl_enb signal to the CCI processing section 645. The A-PHY processing section 641 adds an A-PHY header and an A-PHY footer to the extended packet footer ePF0, and performs A-PHY transfer to the SerDes device 612 on the slave side.

In the SerDes device 612 on the slave side, the A-PHY processing section 631 removes the A-PHY header and the A-PHY footer, and supplies the extended packet footer ePF0 to the CCI-FS processing section 636. The CCI-FS processing section 636 negates the Scl_enb signal, and supplies the extended packet footer ePF0 to the CCI processing section 635 (Master). The CCI processing section 635 (Master) transmits the extended packet footer ePF0 to the image sensor 611. Thereafter, the CCI processing section 635 (Slave) asserts the Scl_enb signal to the CCI processing section 635 (Master).

In the image sensor 611, the CSI2-FS processing section 623 receives the extended packet footer ePF0. The CSI2-FS processing section 623 supplies an ACK response indicating successful reception thereof to the CCI processing section 622, and the CCI processing section 622 transmits the ACK response to the SerDes device 612 on the slave side.

Thereafter, in the same manner as the processing described above, the ACK response is supplied up to the CCI-FS switch 655.

The CCI-FS switch 655 of the application processor 614 supplies a repeat start command and a read command (Slave Address+R 8 bit) to the CCI processing section 645 of the SerDes device 613 on the master side, and asserts the Scl_enb signal. In the SerDes device 613 on the master side, the CCI processing section 645 supplies the read command to the A-PHY processing section 641, and the A-PHY processing section 641 adds an A-PHY header and an A-PHY footer to the read command, and performs A-PHY transfer to the SerDes device 612 on the slave side.

In the SerDes device 612 on the slave side, the A-PHY processing section 631 removes the A-PHY header and the A-PHY footer, and supplies the read command to the CCI processing section 635 (Slave). The CCI processing section 635 (Slave) negates the Scl_enb signal, and supplies the read command to the CCI processing section 635 (Master). The CCI processing section 635 (Master) transmits the repeat start command and the read command to the image sensor 611.

In the image sensor 611, the CCI processing section 622 receives the repeat start command and read command, and accesses the register 624. The CCI processing section 622 transmits an ACK response indicating successful reception thereof to the SerDes device 612 on the slave side.

Thereafter, in the same manner as the processing described above, the ACK response is supplied up to the CCI-FS switch 655.

In the image sensor 611, the CCI processing section 622 reads read data (Data0[7:0]) from the register 624, and transmits it to the SerDes device 612 on the slave side.

In the SerDes device 612 on the slave side, the CCI processing section 635 (Master) receives the read data and supplies it to the CCI processing section 635 (Slave), and the CCI processing section 635 (Slave) supplies the read data to the A-PHY processing section 631. The A-PHY processing section 631 adds an A-PHY header and an A-PHY footer to the read data, and performs A-PHY transfer to the SerDes device 613 on the master side.

In the SerDes device 613 on the master side, the A-PHY processing section 641 removes the A-PHY header and the A-PHY footer and supplies the read data to the CCI processing section 645, and the CCI processing section 645 transmits the read data to the application processor 614.

In the application processor 614, the CCI processing section 652 receives the read data, and supplies it to the CCI-FS switch 655 via the CCI-FS processing section 653.

The CCI-FS switch 655 transmits a NACK response and a stop command to the CCI processing section 645. The CCI processing section 645 supplies the NACK response and the stop command to the A-PHY processing section 641. The A-PHY processing section 641 adds an A-PHY header and an A-PHY footer to the NACK response and the stop command, and performs A-PHY transfer to the SerDes device 612 on the slave side.

In the SerDes device 612 on the slave side, the A-PHY processing section 631 removes the A-PHY header and the A-PHY footer, and supplies the NACK response and the stop command to the CCI processing section 635 (Slave). The CCI processing section 635 (Slave) supplies the NACK response and the stop command to the CCI processing section 635 (Master), and the CCI processing section 635 (Master) transmits the NACK response and the stop command to the image sensor 611.

In the image sensor 611, the CCI processing section 622 receives the NACK response and the stop command, and supplies them to the CSI2-FS processing section 623.

It is to be noted that, in the flow described in FIG. 72, the I2C control command such as the start, the repeat start, the ACK response, the NACK response, or the stop sets the Control Code Indicator of the extended packet header ePH0 to one, and indicates each code allocated to a Payload of 1 Byte.

<Detailed Configuration Example of Image Sensor and Application Processor>

(Detailed Configuration Example of Image Sensor)

Figure 73:
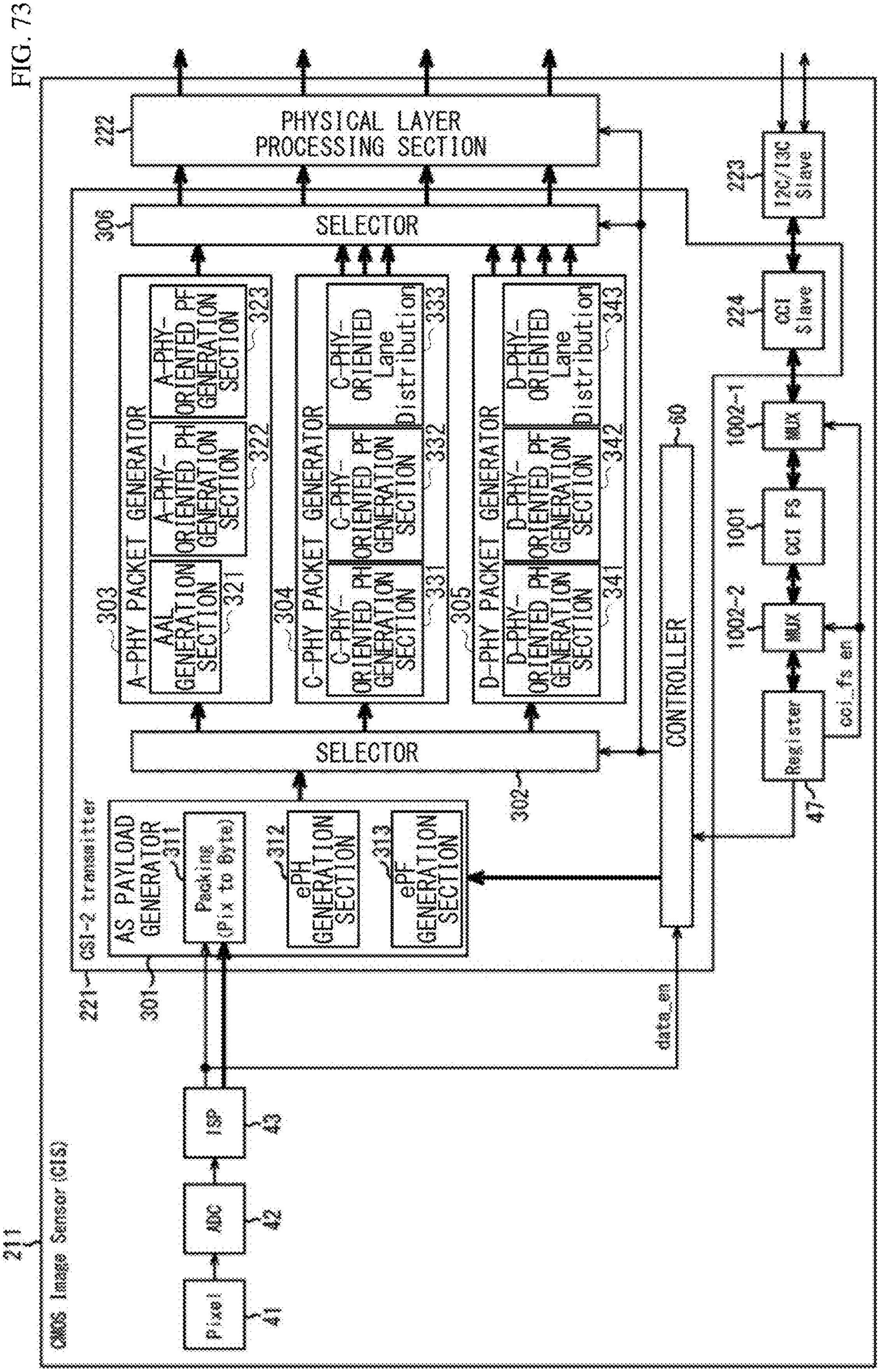
FIG. 73 is a block diagram illustrating a detailed configuration example of an image sensor including the CCI-FS processing section.

FIG. 73 is a block diagram illustrating a configuration example of a configuration of the image sensor 211 illustrated in FIG. 25 described above including a CCI-FS processor 1001. It is to be noted that, in the image sensor 211 illustrated in FIG. 73, configurations common to those of the image sensor 211 illustrated in FIG. 25 are denoted by the same reference numerals, and descriptions thereof are omitted.

As illustrated in FIG. 73, the CCI-FS processor 1001 is disposed between the CCI slave 224 and the register 47, and MUX sections 1002-1 and 1002-2 are disposed to sandwich the CCI-FS processor 1001. The MUX sections 1002-1 and 1002-2 transmit and receive data via the CCI-FS processor 1001 in a case where the CCI-FS processor 1001 is enabled in accordance with a cci_fs_en signal supplied from the register 47. Meanwhile, the MUX sections 1002-1 and 1002-2 transmit and receive data not via the CCI-FS processor 1001 in a case where the CCI-FS processor 1001 is disabled in accordance with the cci_fs_en signal supplied from the register 47.

(Detailed Configuration Example of Application Processor)

Figure 74:
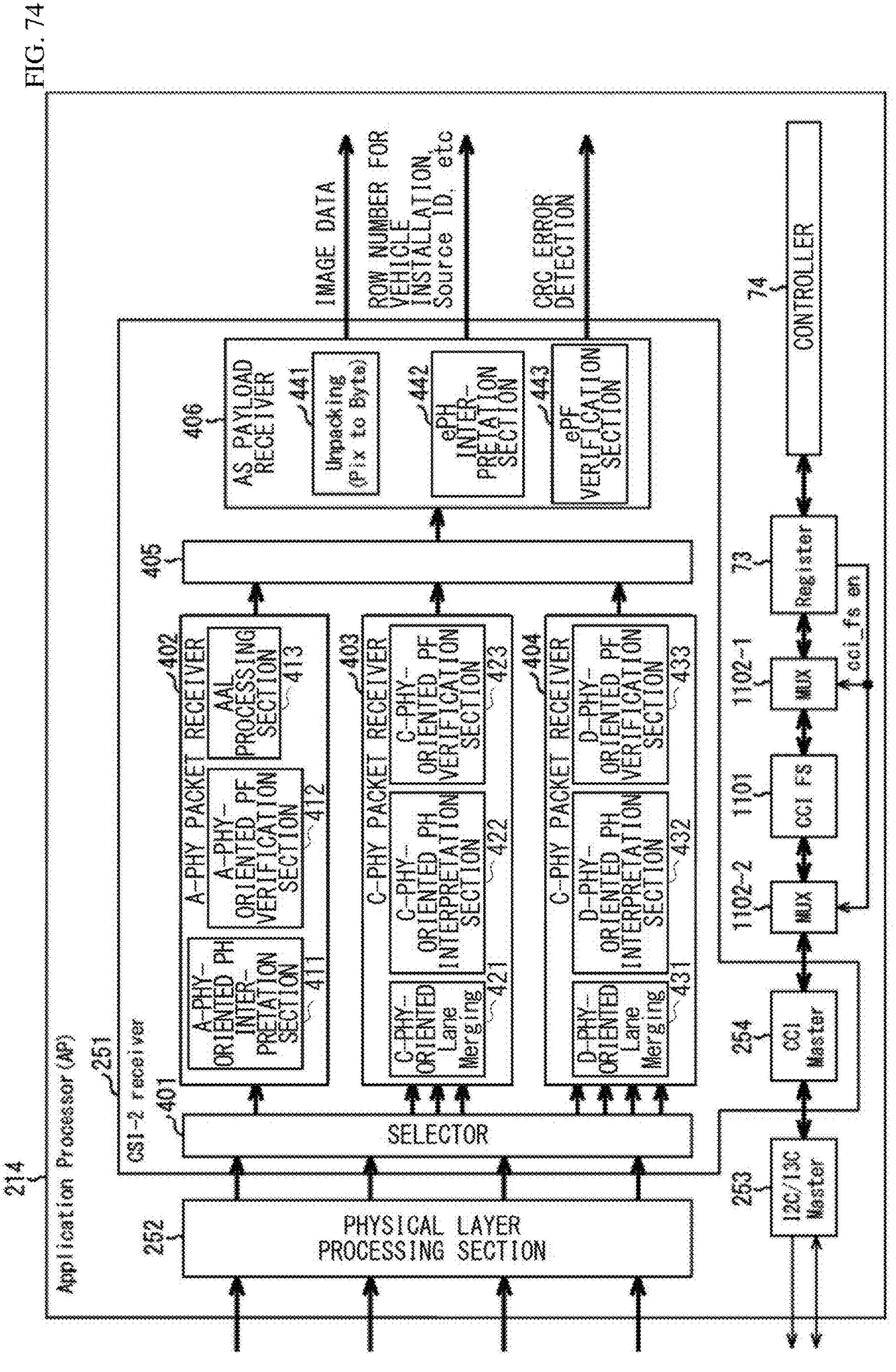
FIG. 74 is a block diagram illustrating a detailed configuration example of an application processor including the CCI-FS processing section.

FIG. 74 is a block diagram illustrating a configuration example of a configuration of the application processor 214 illustrated in FIG. 26 described above including a CCI-FS processor 1101. It is to be noted that, in the application processor 214 illustrated in FIG. 74, configurations common to those of the application processor 214 illustrated in FIG. 26 are denoted by the same reference numerals, and descriptions thereof are omitted.

As illustrated in FIG. 74, the CCI-FS processor 1101 is disposed between the CCI master 254 and the register 73, and MUX sections 1102-1 and 1102-2 are disposed to sandwich the CCI-FS processor 1101. The MUX sections 1102-1 and 1102-2 transmit and receive data via the CCI-FS processor 1101 in a case where the CCI-FS processor 1101 is enabled in accordance with a cci_fs_en signal supplied from the register 73. Meanwhile, the MUX sections 1102-1 and 1102-2 transmit and receive data not via the CCI-FS processor 1101 in a case where the CCI-FS processor 1101 is disabled in accordance with the cci_fs_en signal supplied from the register 73.

It is to be noted that, as for the method for implementing each field in the configuration of the extended packet header ePH, the following configuration may also be employed. The extension VC is unused in Safe CCI. (similar configuration is used to match Header field and extended header-related in MIPI). In the extension DT, data may be embedded in bus command-related information from the upper level, or implementation configuration for setting of a signal line from register setting may be used. Although Protocol is described in I2C, similar approach can be performed also in SDR mode of I3C.

<Configuration Example of Communication System>

Description is given, with reference to FIGS. 75 to 117, of a fourth embodiment of a communication system to which the present technology is applied.

Figure 75:
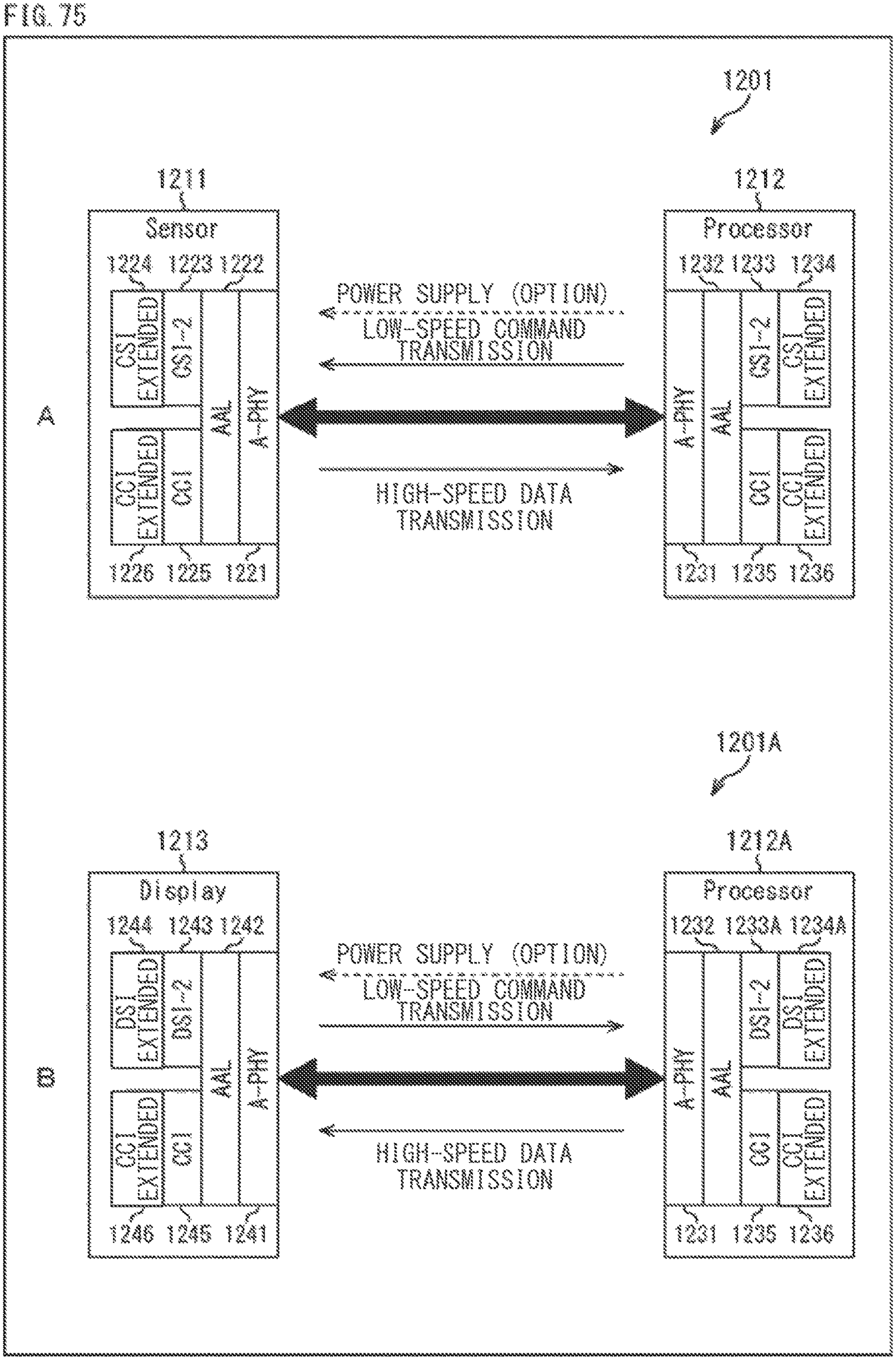
FIG. 75 is a block diagram illustrating a configuration example of a fourth embodiment of a communication system to which the present technology is applied.

FIG. 75 is a block diagram illustrating the communication system of the fourth embodiment. A of FIG. 75 illustrates a communication system 1201 of a first variation, and B of FIG. 75 illustrates a communication system 1201A of a second variation.

The communication system 1201 illustrated in A of FIG. 75 has a configuration in which an image sensor 1211 and an application processor 1212 are directly coupled to each other.

The image sensor 1211 has a configuration in which, on an A-PHY layer 1221 is disposed an ALL layer 1222, on which there are disposed a CSI-2 transmission section 1223 and a CSI extended section 1224, and a CCI slave 1225 and a CCI extended section 1226. The CSI-2 transmission section 1223 is provided with the CSI extended section 1224, and the CCI slave 1225 is provided with the CCI extended section 1226, thereby enabling the image sensor 1211 to adapt to respective extended standards.

The application processor 1212 has a configuration in which, on an A-PHY layer 1231 is disposed an ALL layer 1232, on which there are disposed a CSI-2 reception section 1233 and a CSI extended section 1234, and a CCI master 1235 and a CCI extended section 1236. The CSI-2 reception section 1233 is provided with the CSI extended section 1234, and the CCI master 1235 is provided with the CCI extended section 1236, thereby enabling the application processor 1212 to adapt to respective extended standards. It is to be noted that the CSI extension may be referred to as Camera Service Extensions (CSE).

The communication system 1201A illustrated in B of FIG. 75 has a configuration in which a display 1213 and an application processor 1212A are coupled to each other. It is to be noted that the application processor 1212A includes a DSI-2 transmission section 1233A and a DSI extended section 1234A instead of the CSI-2 reception section 1233 and CSI extended section 1234 of the application processor 1212 in A of FIG. 75 and that configurations of other blocks are common to those of the application processor 1212.

The display 1213 has a configuration in which, on an A-PHY layer 1241 is disposed an ALL layer 1242, on which there are disposed a DSI-2 reception section 1243 and a DSI extended section 1244, and a CCI slave 1245 and a CCI extended section 1246. The DSI-2 reception section 1243 is provided with the DSI extended section 1244, and the CCI slave 1245 is provided with the CCI extended section 1246, thereby enabling the display 1213 to adapt to respective extended standards. It is to be noted that the DSI extension may be referred to as Display Service Extensions (DSE).

The communication systems 1201 and 1201A thus configured are able to perform at least high-speed data transmission to transmit data of a frame including image data in one direction, and low-speed command transmission to transmit a command related to the high-speed data transmission in an opposite direction (however, transmitting a command itself may be referred to as command transmission, or transmitting a response to a command may be referred to as command transmission). For example, in the low-speed command transmission, a high-speed data transmission start command to request start of the high-speed data transmission is at least transmitted, but this may not be the case. In addition, the high-speed data transmission is faster than the low-speed command transmission, and is started in response to reception of the high-speed data transmission start command; however, this may not be the case.

However, the communication system 1201 in which a communication partner of the application processor 1212 is the image sensor 1211 and the communication system 1201A in which a communication partner of the application processor 1212A is the display 1213 differ from each other in directions of the high-speed data transmission and the low-speed command transmission. That is, in the communication system 1201, image data is transmitted from the image sensor 1211 to the application processor 1212, whereas, in the communication system 1201A, image data is transmitted from the application processor 1212A to the display 1213.

In the A-PHY of the physical layer standard, the high-speed data transmission and the low-speed command transmission are transmitted via a portion or all of a common communication path. In addition, the A-PHY supports options that enable some or all of power supply from the application processor 1212 to the image sensor 1211 and power supply from the application processor 1212A to the display 1213 to be transmitted via a common communication path.

Incidentally, for example, the low-speed command transmission complies with CCI of the CSI-2 standard, and communication is performed on the basis of the I2C or I3C standard. At this time, it is possible for the low-speed command transmission to transmit a command by sharing not only independent I2C or I3C physical layers but also some or all of the physical layers of the D-PHY, the C-PHY, and the A-PHY. Meanwhile, the high-speed data transmission transmits data via some or all of the physical layers of any of the D-PHY, the C-PHY, and the A-PHY.

It is to be noted that, in a case of complying with Unified Serial Link (USL) within the CSI-2 standard, for example, it is possible for the low-speed command transmission to transmit a command via some or all of the physical layers of any of the D-PHY or the C-PHY. That is, it is possible for the high-speed data transmission and the low-speed command transmission to transmit some or all of the physical layers of any of the D-PHY, the C-PHY, the A-PHY, the I2C, and the I3C.

It is to be noted that although the description has been given, in FIG. 75, of the example of the configuration including the application processors 1212 and 1201A, the communication systems 1201 and 1201A may be configured to be provided with an electronic control unit (ECU: Electronic Control Unit), for example. That is, no limitation is made to the application processor 1212 as long as a processor is employed that is able to communicate with the image sensor 1211, the display 1213, or the like by direct coupling or indirect coupling. In addition, a configuration may also be employed that includes various sensors other than the image sensor 1211.

The communication systems 1201 and 1201A thus configured employ a method of transmitting a nonce value or an initialization vector configuration including a nonce value as described below.

Specifically, a particular common-key cryptographic algorithm (e.g., AES-GCM/GMAC) requires an initialization vector including the nonce value. Therefore, a rule for setting the initialization vector and the nonce value is agreed upon in advance between the image sensor 1211 and the application processor 1212 or between the display 1213 and the application processor 1212A.

However, when a misrecognition or falsification of a nonce value occurs inside each of the image sensor 1211, the application processors 1212 and 1201A, and the display 1213, the decryption of encrypted image data, message authentication, and the like are unsuccessful thereafter. Therefore, in order to avoid a failure in which image data is not transmitted normally, a countermeasure technique for the misrecognition and falsification of a nonce value is necessary.

Meanwhile, it is necessary to define an initialization vector suitable for a CSI standard or a DSI standard, as a new security specification for an MIPI Camera Serial Interface (CSI) standard or an MIPI Display Serial Interface (DSI) standard. Therefore, the present technology discloses a method of transmitting a nonce value or an initialization vector configuration including a nonce value, suitable for an imaging device in compliance with a CSI standard including the image sensor 1211 or a display apparatus in compliance with a DSI standard including the display 1213.

It is to be noted that although description is given below of processing to be performed between the image sensor 1211 and the application processor 1212, similar processing can also be performed between the display 1213 and the application processor 1212A.

<Detailed Configuration Example of Image Sensor in FIG. 75>

Figure 76:
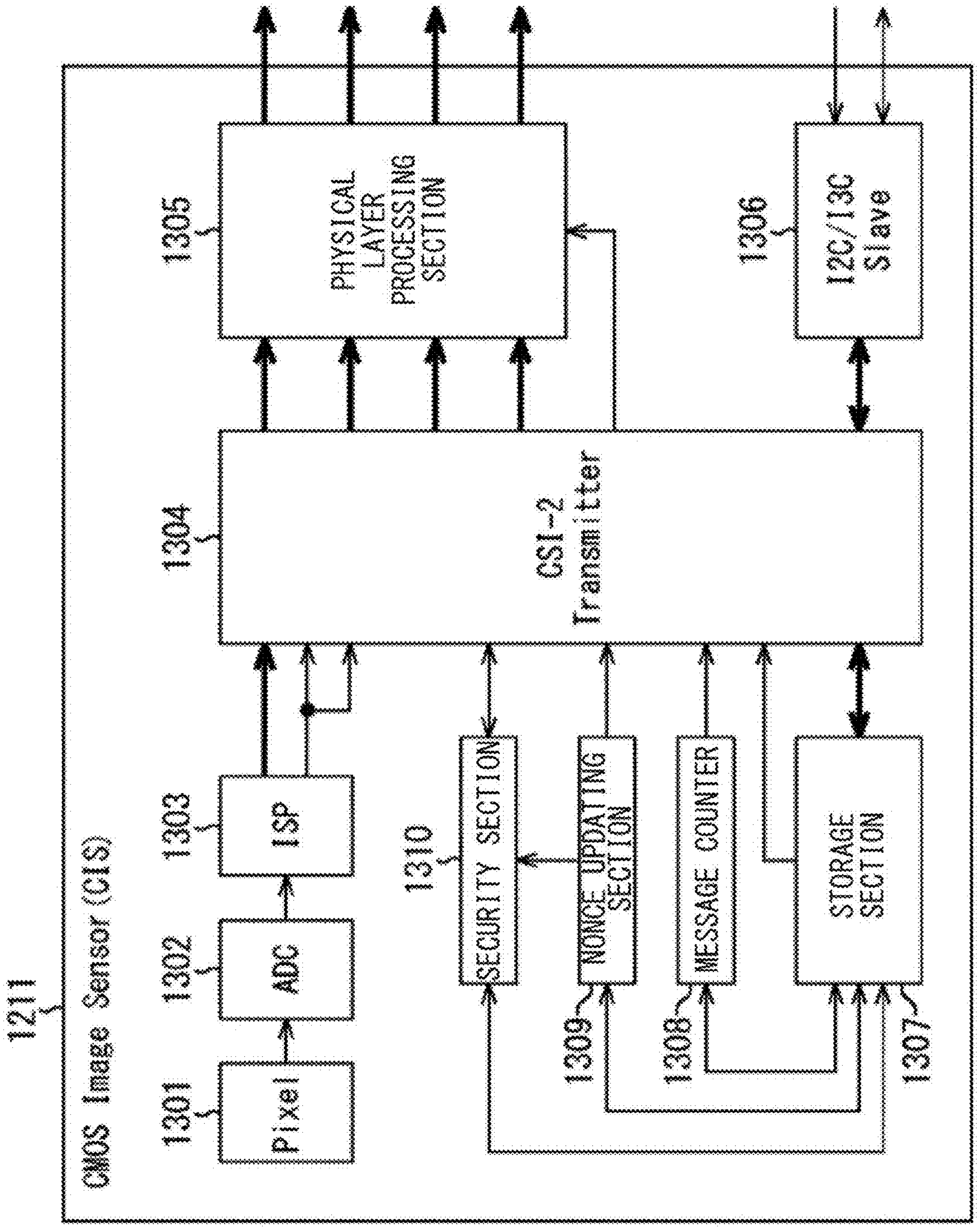
FIG. 76 is a block diagram illustrating a detailed configuration example of an image sensor.

FIG. 76 is a block diagram illustrating a detailed configuration example of the image sensor 1211.

The image sensor 1211 includes a pixel 1301, an AD converter 1302, an image processing section 1303, an extension mode adaptive CSI-2 transmission circuit 1304, a physical layer processing section 1305, an I2C/I3C slave 1306, a storage section 1307, a message counter 1308, a nonce updating section 1309, and a security section 1310. It is to be noted that the pixel 1301, the AD converter 1302, the image processing section 1303, the extension mode adaptive CSI-2 transmission circuit 1304, the physical layer processing section 1305, the I2C/I3C slave 1306, and the storage section 1307 are configured in the same manner as the corresponding respective blocks in other embodiments described above, and detailed descriptions thereof are omitted.

The message counter 1308 updates a message count value inside the image sensor 1211 every time an extended packet satisfying a predetermined count condition is transmitted.

The security section 1310 derives a session key inside the image sensor 1211, and generates, using the session key, first protected data (e.g., a complete arithmetic value subject to an arithmetic operation to protect completeness, or encryption data encrypted to protect confidentiality) of data to be subject to high-speed data transmission.

The nonce updating section 1309 updates a nonce (nonce; number used once) value inside the image sensor 1211 every time the security section 1310 generates the first protected data.

The image sensor 1211 thus configured performs high-speed data transmission of some or all of nonce values and some or all of message count values to the application processor 1212. For example, the some or all of nonce values may each be a count value or a random number. In addition, some or all of nonce values are stored outside the extended packet header for transmission, and image data is stored inside the packet data for transmission.

In the image sensor 1211, the message counter 1308 and the nonce updating section 1309 may be configured separately or integrally. For example, in a case where the message counter 1308 and the nonce updating section 1309 are configured separately, a nonce value and a message count value can be updated asynchronously. This makes it possible to enhance the flexibility of the nonce value and the message count value.

Meanwhile, in a case where the message counter 1308 and the nonce updating section 1309 are configured integrally, the nonce value and the message count value can be updated synchronously. In that case, when a count value is used as a nonce value, the message count value is shared with some or all of nonce values, thereby making it possible to save a bit width of the message counter 1308. That is, the message counter 1308 may be a portion or all of the nonce updating section 1309, and a portion or all thereof can be commonalized with the nonce updating section 1309.

<Detailed Configuration Example of Application Processor in FIG. 75>

Figure 77:
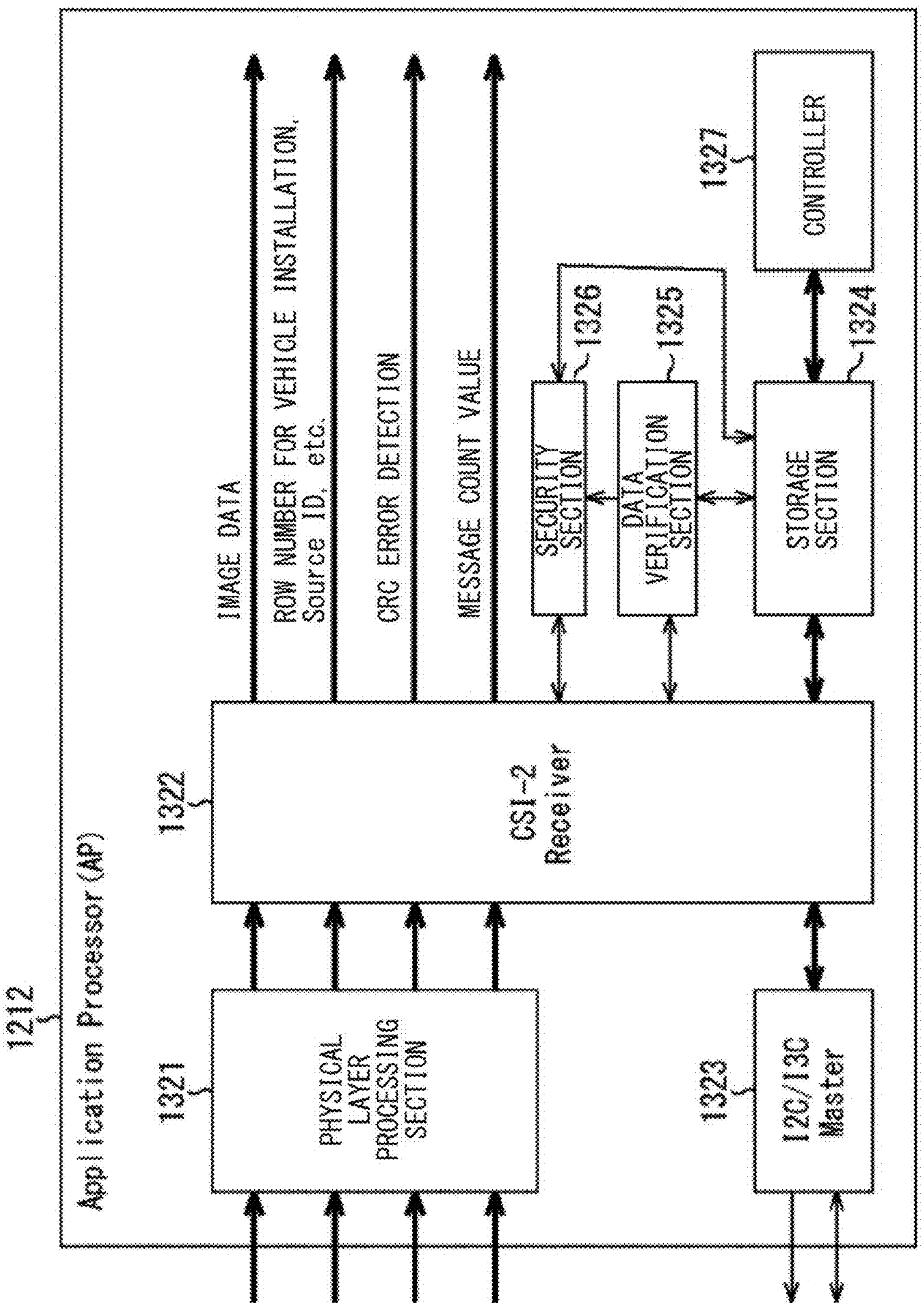
FIG. 77 is a block diagram illustrating a detailed configuration example of an application processor.

FIG. 77 is a block diagram illustrating a detailed configuration example of the application processor 1212.

The application processor 1212 includes a physical layer processing section 1321, an extension mode adaptive CSI-2 reception circuit 1322, an I2C/I3C master 1323, a storage section 1324, a data verification section 1325, a security section 1326, and a controller 1327. It is to be noted that the physical layer processing section 1321, the extension mode adaptive CSI-2 reception circuit 1322, the I2C/I3C master 1323, and the storage section 1324 are configured in the same manner as the corresponding respective blocks in other embodiments described above, and detailed descriptions thereof are omitted.

The data verification section 1325 verifies validity of a nonce value or a message count value transmitted from the image sensor 1211 to the application processor 1212.

The security section 1326 derives a session key inside the application processor 1212 corresponding to the session key inside the image sensor 1211, and verifies (verifies completeness) or decrypts the first protected data of image data using the session key inside the application processor 1212.

In the application processor 1212 thus configured, in a case where data to be verified is a count value, the data verification section 1325 is able to verify the continuity thereof. In addition, the data verification section 1325 may be configured to be provided with a counter to update a count value in the same manner as the image sensor 1211, thereby perform comparison and verification. It is to be noted that, in a case where the data to be verified is a random number, the data verification section 1325 may verify its randomness. It is to be noted that the data verification section 1325 includes the nonce updating section 1309 (or a message counter), which may be used to verify or decrypt the first protected data, or which may be used to verify the data to be verified.

The image sensor 1211 and the application processor 1212 can be each configured to be mounted on a desired mobile body apparatus. For example, the mobile body apparatus may be a portable mobile apparatus, e.g., any of a mobile phone, a smartphone, a digital camera, a game machine, or the like. The mobile body apparatus may be a propulsion apparatus, e.g., any of a vehicle, a robot, a drone, or the like enabling propulsion (any of moving, traveling, walking, and flying). The mobile body apparatus may be any of an autonomous vehicle, an autonomous robot, an autonomous drone, or the like that is mounted with an AI (Artificial Intelligence) function to enable autonomous propulsion. The propulsion of the propulsion apparatus may be controlled by a user of the propulsion apparatus, and the propulsion apparatus may notify the user of an instruction or warning as needed. Meanwhile, the propulsion apparatus may be configured to allow the propulsion apparatus to automatically control the propulsion of the propulsion apparatus.

The security sections 1310 and 1326 may each include, for example, a security arithmetic part that executes an arithmetic operation for protecting image data. Accordingly, the security sections 1310 and 1326 can cause the security arithmetic part to perform any processing of an encryption arithmetic operation, a decryption arithmetic operation, a hash value arithmetic operation, a message authentication code arithmetic operation, a digital signature arithmetic operation, ID (identification) authentication, firmware measurement, encryption session key establishment, key exchange, key update, and the like.

Meanwhile, any of the security sections 1310 and 1326, the nonce updating section 1309, the message counter 1308, and the data verification section 1325 may be configured to be electrically coupled directly to a memory. The memory may be electrically coupled directly to a register. Any of the security sections 1310 and 1326, the nonce updating section 1309, the message counter 1308, and the data verification section 1325 may be electrically coupled directly to the register. The memory may be a memory protected from either information leakage or falsification inside the memory. Such a memory and such a register are each used as the storage sections 1307 and 1324, respectively.

The storage sections 1307 and 1324 may store any of key information (e.g., a pre-shared key, a private key, a public key, or a session key), a certificate (e.g., a root certificate, an intermediate certificate, or a leaf certificate), cryptographic algorithm information, and the like. The storage sections 1307 and 1324 may store any of functional information on the image sensor 1211 or the application processor 1212, ID information (e.g., source ID, destination ID, final destination ID, etc.) on the image sensor 1211 or the application processor 1212, firmware information on the image sensor 1211 or the application processor 1212, and the like. The storage sections 1307 and 1324 may store any of session information (e.g., session ID) described later, an arithmetic value (e.g., an initial value, an intermediate value, or a final value) of the security arithmetic part, an initialization vector, a nonce value, a message count value, a frame number (frame count value), and the like.

For example, the image sensor 1211 or the application processor 1212 stores any of nonce values of multiple times, a count value, a complete arithmetic value, and encryption information in the storage section 1307 or 1324 to thereby enable any of the security sections 1310 and 1326, the nonce updating section 1309, the message counter 1308, and the data verification section 1325 to determine the presence or absence of a failure, and to address accordingly (e.g., a request of retransmission of data at a location of a failure, transmission of an abnormality message). In addition, in case where any of the nonce value, the count value, the complete arithmetic value, and the encryption information is periodically stored in protected storage section 1307 or 1324, analysis of the protected storage section 1307 or 1324 upon occurrence of an accident in the mobile body apparatus also brings an effect of facilitating identification of the cause of the occurrence of the accident.

<Session>

A requester and a responder, i.e., the application processor 1212 and the image sensor 1211 can have one or more communication channels through a session. Hereinafter, description is given of the session by exemplifying a configuration in which the application processor 1212 is the requester and the image sensor 1211 is the responder. It is needless to say that the application processor 1212 may be the responder and the image sensor 1211 may be the requester.

In addition, the requester and the responder are able to establish a safe communication channel using a temporarily fixed encryption information. Specifically, the session supplies one of encryption or message authentication, or both of them. The session includes, for example, three phases: a session handshake phase, an application phase, and a session termination phase.

The session handshake phase starts with a key-exchange request (one of PSK_EXCHANGE or KEY_EXCHANGE) from the requester, for example, derives a session key such as a session secret or an encryption key, and protects communication using the session key. The purpose of this phase is, for example, that the responder and the requester first can build trust therebetween before one of the sides transmits application data (e.g., image data). Further, a certain degree of completeness of the handshake and synchronization with the derived handshake secret may be ensured.

In a case where an error occurs at this phase, the session may be finished immediately and proceed to the end of the session. When the handshake is successful, for example, the session is finished by a finish response (FINISH_RSP or PSK_FINISH_RSP) from the responder, and the application phase starts. Once the handshake is completed to pass all verifications, the session reaches the application phase where one of the responder or the requester may transmit the application data.

The application phase is finished, for example, in a case where an end request (END_SESSION) is issued from the requester or in a case where an error occurs. The next phase is a session termination phase.

The session termination phase is, for example, merely an internal phase, and there is no explicit message to be transmitted or received. When the session is finished, both of the requester and the responder discard or clean up all of the derived session keys such as the session secret and the encryption key. The requester and the responder may have other internal data associated with this session, which may also desire cleanup.

The session secret is used, for example, to derive an encryption key and salt to be used in an AEAD (Authenticated Encryption with Additional Data) function. The derivation of the encryption key may frequently use HMAC as defined in HKDF-Expand and RFC2104 described in RFC5869. The session secret may be configured by a single secret or multiple types of secrets. The session key may be configured by a single key or multiple types of keys.

<Processing Example of High-Speed Data Transmission and Low-Speed Command Transmission>

Figure 78:
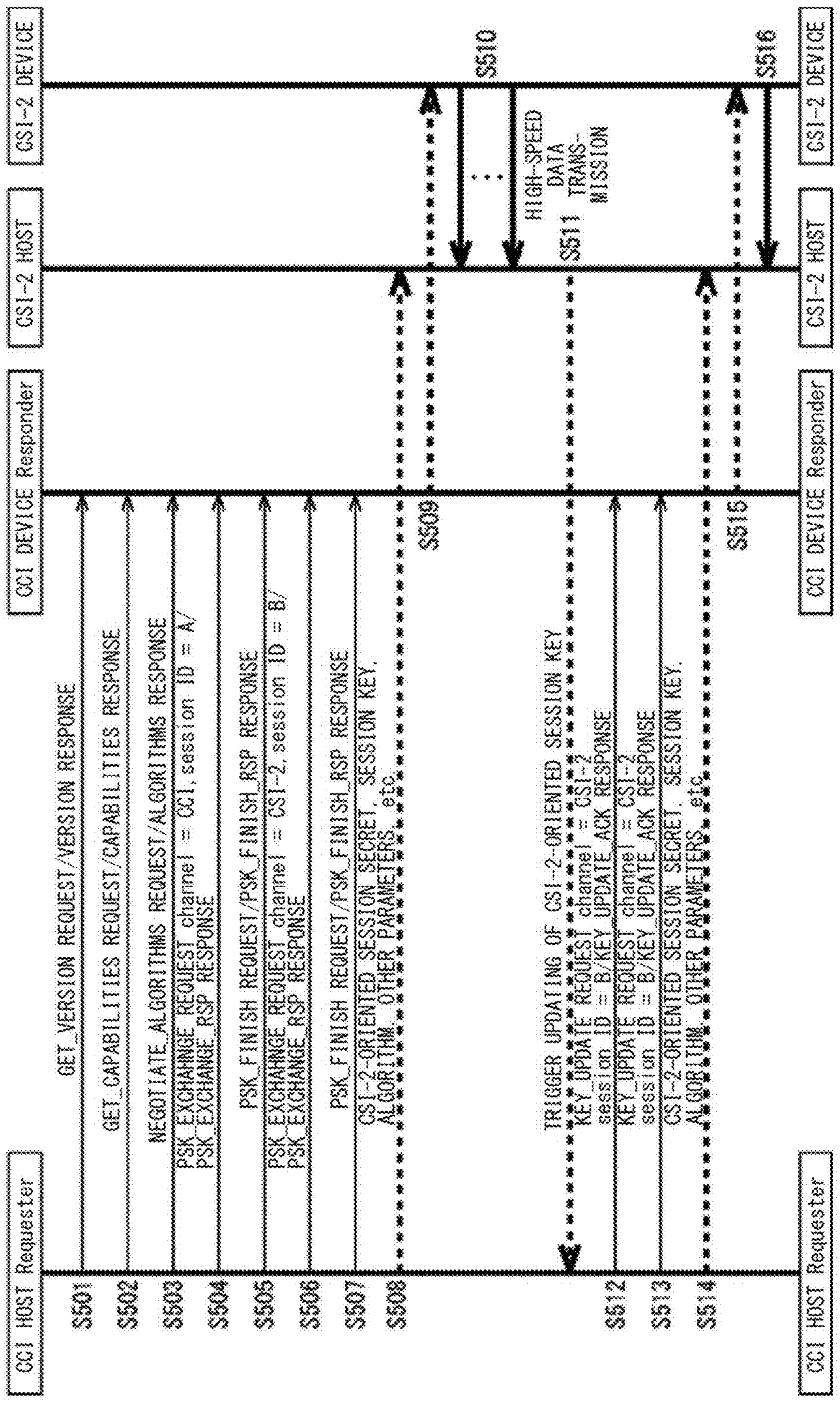
FIG. 78 is a flowchart describing a first processing example of communication processing.
Figure 79:
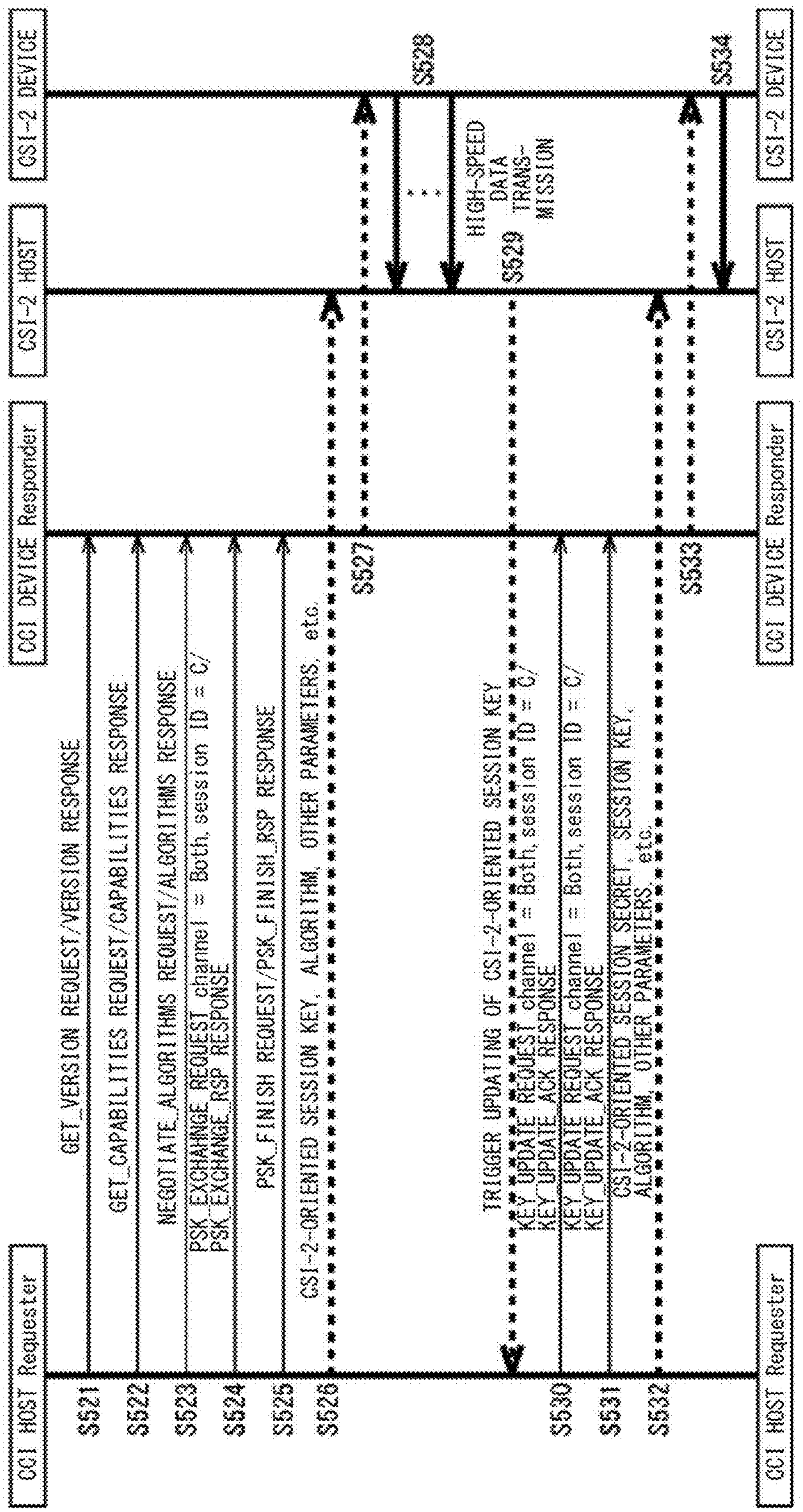
FIG. 79 is a flowchart describing the first processing example of the communication processing.
Figure 80:
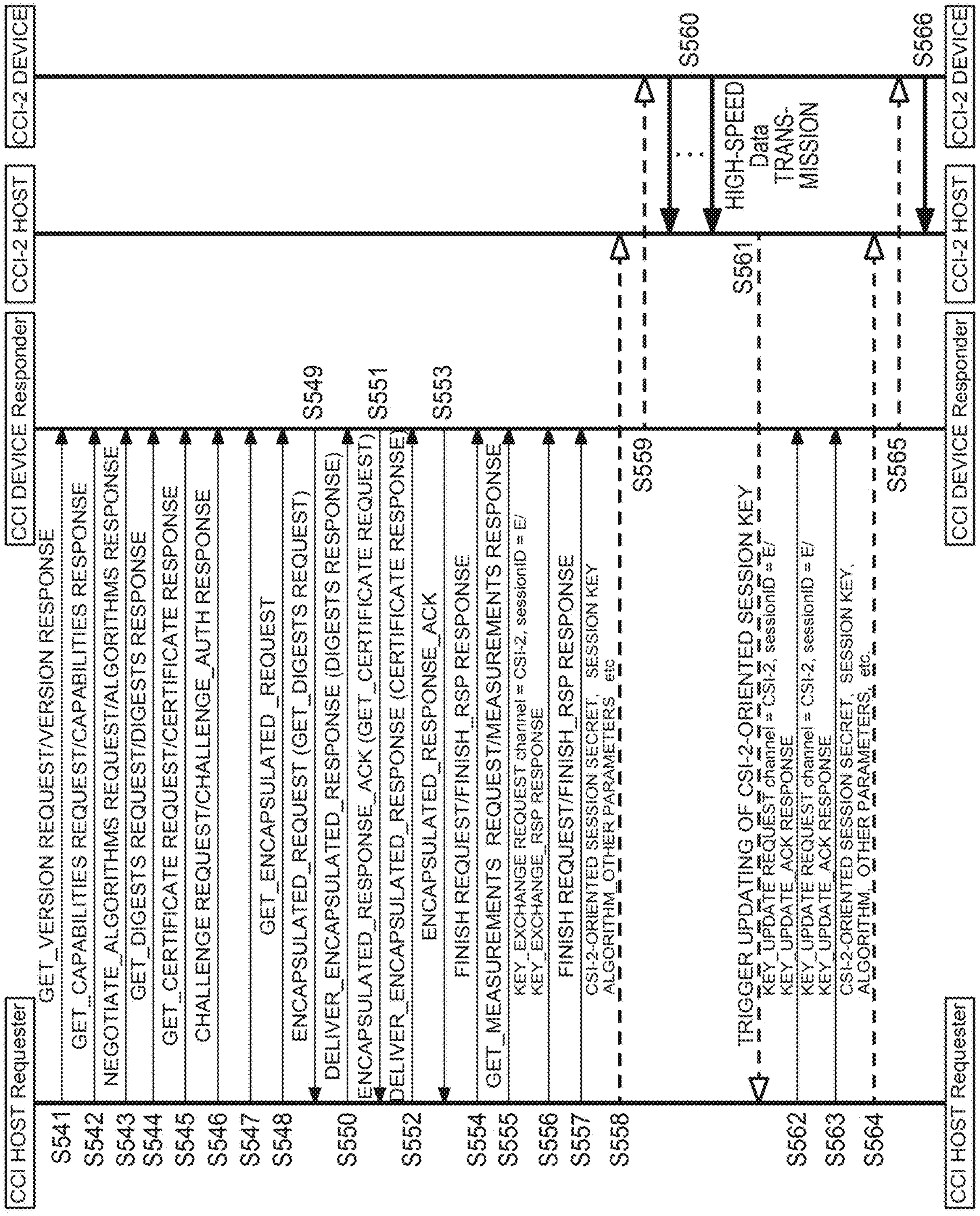
FIG. 80 is a flowchart describing the first processing example of the communication processing.

Description is given, with reference to FIGS. 78 to 80, of communication processing in which high-speed data transmission and low-speed command transmission are performed between the image sensor 1211 and the application processor 1212.

FIG. 78 is a flowchart describing a first processing example of the communication processing.

Here, the extension mode adaptive CSI-2 reception circuit 1322 of the application processor 1212 has function as a CCI host (requester) and a CSI-2 host. The extension mode adaptive CSI-2 transmission circuit 1304 of the image sensor 1211 has functions as a CCI device (responder) and a CSI-2 device. The CCI host transmits a request message to the CCI device, and, in response to reception thereof, the CCI device transmits a response message to the CCI host.

In step S501, a GET_VERSION request and a VERSION response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 to acquire an SPDM (Security Protocol and Data Model) version of an endpoint.

In step S502, a GET_CAPABILITIES request and a CAPABILITIES response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 to acquire an SPDM function of the endpoint.

In step S503, a NEGOTIATE_ALGORITHMS request and an ALGORITHMS response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 to negotiate a cryptographic algorithm with the extension mode adaptive CSI-2 transmission circuit 1304.

In step S504, a PSK_EXCHANGE request and a PSK_EXCHANGE_RSP response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 and the extension mode adaptive CSI-2 transmission circuit 1304 to derive a CCI-oriented session key such as the session secret or the encryption key.

In step S505, a PSK_FINISH request and a PSK_FINISH_RSP response are performed between the CCI host of the extension mode adaptive CSI-2 reception circuit 1322 and the CCI device of the extension mode adaptive CSI-2 transmission circuit 1304. This certifies to the responder that the extension mode adaptive CSI-2 reception circuit 1322 knows PSK (PSK: Pre-shared key) and that the CCI-oriented session key derived in step S504 is correct.

In step S506, the PSK_EXCHANGE request and the PSK_EXCHANGE_RSP response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 and the extension mode adaptive CSI-2 transmission circuit 1304 to derive a CSI-2-oriented session key such as the session secret or the encryption key.

In step S507, the PSK_FINISH request and the PSK_FINISH_RSP response are performed between the CCI host of the extension mode adaptive CSI-2 reception circuit 1322 and the CCI device of the extension mode adaptive CSI-2 transmission circuit 1304. This certifies to the responder that the extension mode adaptive CSI-2 reception circuit 1322 knows the PSK (PSK: Pre-shared key) and that the CSI-2-oriented session key derived in step S506 is correct.

Here, the certification of the session key in steps S505 and S507 is implemented by a MAC value calculated by finished_key of the requester and a message of this session. Then, the subsequent CCI communication and CSI-2 communication are protected using the session keys derived in steps S504 and S506.

In step S508, in the extension mode adaptive CSI-2 reception circuit 1322, a CSI-2-oriented session secret or session key, an algorithm, and other parameters are supplied from the CCI host to the CSI-2 host.

In step S509, in the extension mode adaptive CSI-2 transmission circuit 1304, a CSI-2-oriented session secret or session key, an algorithm, and other parameters are supplied from the CCI device to the CSI-2 device.

In step S510, the CSI-2 device of the extension mode adaptive CSI-2 transmission circuit 1304 transmits image data by the high-speed data communication to the CSI-2 host of the extension mode adaptive CSI-2 reception circuit 1322. For example, the high-speed data communication is continuously performed until a timing at which a CSI-2-oriented session key is updated.

In step S511, in the extension mode adaptive CSI-2 reception circuit 1322, a trigger to update the CSI-2-oriented session key is supplied from the CSI-2 host to the CCI host. However, the trigger may be supplied from the CSI-2 device or the CCI device to the CCI host, or a self-trigger may be supplied from the CCI host to the CCI host.

In step S512, a KEY_UPDATE request and a KEY_UPDATE_ACK response are performed between the CCI host of the extension mode adaptive CSI-2 reception circuit 1322 and the CCI device of the extension mode adaptive CSI-2 transmission circuit 1304. This allows the session key to be updated and a portion of an old session key to be discarded. It is to be noted that, in a case where the session key is configured by multiple types of keys (such as a request direction key or a response direction key), some or all of the keys may be updated. In addition, the KEY_UPDATE request may be issued from the responder using a GET_ENCAPSULATED_REQUEST mechanism described later.

In step S513, processing similar to that in step S512 is performed, and the KEY_UPDATE request and the KEY_UPDATE_ACK response are performed twice. This allows the remainder (all) of the old session key not having been discarded only by the processing in step S512 to be discarded.

In step S514, in the extension mode adaptive CSI-2 reception circuit 1322, a CSI-2-oriented session secret or session key (after update), an algorithm, and other parameters are supplied from the CCI host to the CSI-2 host.

In step S515, in the extension mode adaptive CSI-2 transmission circuit 1304, a CSI-2-oriented session secret or session key (after update), an algorithm, and other parameters are supplied from the CCI device to the CSI-2 device.

In step S516, in the same manner as step S510, the transmission of image data by the high-speed data communication is started; hereinafter, pieces of processing similar to those in steps S510 to S515 are repeatedly performed.

It is to be noted that, in the first processing example of the communication processing, the CCI-oriented session key and the CSI-2-oriented session key are different, a CCI-oriented session ID and a CSI-2-oriented session ID are different, and a CCI-oriented session secret and the CSI-2-oriented session secret are different. This is not limitative; as in a second processing example of the communication processing, the CCI-oriented session key and the CSI-2-oriented session key may be the same, the CCI-oriented session ID and the CSI-2-oriented session ID may be the same, and the CCI-oriented session secret and the CSI-2-oriented session secret may be the same.

FIG. 79 is a flowchart describing the second processing example of the communication processing.

In steps S521 to S523, pieces of processing similar to those in steps S501 to S503 in FIG. 78 are performed.

In step S524, the PSK_EXCHANGE request and the PSK_EXCHANGE_RSP response are performed between the CCI host of the extension mode adaptive CSI-2 reception circuit 1322 and the CCI device of the extension mode adaptive CSI-2 transmission circuit 1304. Here, in the second processing example of the communication processing, the CCI-oriented session secret and the CSI-2-oriented session secret, which are the same, are derived.

That is, it is possible to derive the CCI-oriented session key and the CSI-2-oriented session key from the same session secret. Alternatively, an uplink-oriented session key and a downlink (direction opposite to uplink)-oriented session key may be derived from the same session secret. Alternatively, a common session key oriented to CCI and CSI-2 may be derived from the same session secret. It is to be noted that, even in a case where the CCI-oriented session and the CSI-2-oriented session are the same, the CCI-oriented session secret, session key or the like and the CSI-2-oriented session secret, session key, or the like may be different.

Thereafter, in steps S525 to S534, pieces of processing similar to those in steps S507 to S516 in FIG. 78 are performed.

Here, a pre-shared key PSK key exchange scheme supplies an option for the requester and the responder to execute mutual authentication and session key establishment using symmetric key cryptography. This option is particularly useful for an endpoint not supporting asymmetric key cryptography or certificate processing. Even in a case where the asymmetric key cryptography is supported, this option can be used to speed up the session key establishment. This option requires the requester and the responder to know in advance a common PSK before the handshake.

Basically, the PSK functions as a basis for mutual authentication credential information and session key establishment. Therefore, only two endpoints and a potentially trusted third party that provisions the PSK to the two endpoints may know PSK values. The requester may be paired with multiple responders. Likewise, the responder may be paired with multiple requesters. A pair of the requester and the responder may be provisioned with one or more PSKs.

The endpoint may function as a requester for one device, and may also function simultaneously as a responder for another device. A transport layer needs to identify a peer (Peer) and establish communication between the two endpoints before the start of the PSK-based session key exchange.

The PSK may be provisioned within a trusted environment, e.g., during a safe manufacturing process. The PSK may be agreed upon between the two endpoints using a safe protocol in an untrusted environment. The size of the provisioned PSK is determined depending on the requirement of security intensity of the application, and should be 128 bits or more, and desirably 256 bits or more. During the PSK provisioning, an endpoint function and a supported algorithm may be communicated to the peer. Accordingly, the GET_CAPABILITIES and the NEGOTIATE_ALGORITHMS of the SPDM command are not necessary during the session key establishment using the PSK option.

In this option, there are defined two message pairs of PSK_EXCHANGE/PSK_EXCHANGE_RSP and PSK_FINISH/PSK_FINISH_RSP. The PSK_EXCHANGE message has three roles: a role to prompt the responder to acquire a particular PSK; a role to exchange contexts between the requester and the responder; and a role to certify to the requester that the responder knows correct PSK and has derived a correct session key.

FIG. 80 is a flowchart describing a third processing example of the communication processing.

In steps S541 to S543, pieces of processing similar to those in steps S501 to S503 in FIG. 78 are performed.

In step S544, a GET_DIGESTS request and a DIGESTS response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 to acquire a certificate chain digest from the extension mode adaptive CSI-2 transmission circuit 1304.

In step S545, a GET_CERTIFICATE request and a CERTIFICATE response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 to acquire a certificate chain from the extension mode adaptive CSI-2 transmission circuit 1304. It is to be noted that the acquisition of the certificate chain may be executed multiple times.

In step S546, a CHALLENGE request and a CHALLENGE_AUTH response are performed between the CCI host of the extension mode adaptive CSI-2 reception circuit 1322 and the CCI device of the extension mode adaptive CSI-2 transmission circuit 1304. This allows the extension mode adaptive CSI-2 reception circuit 1322 to authenticate the extension mode adaptive CSI-2 transmission circuit 1304 through a challenge-response protocol.

In step S547, a KEY_EXCHANGE request (channel=CCI, sessionID=D) request and a KEY_EXCHANGE_RSP response are performed between the CCI host of the extension mode adaptive CSI-2 reception circuit 1322 and the CCI device of the extension mode adaptive CSI-2 transmission circuit 1304. This allows a handshake between the requester and the responder to be started for the purpose of authentication of the responder (or optionally of both parties). Then, in addition to the content negotiated in the last NEGOTIATE_ALGORITHMS/ALGORITHMS exchange, an encryption parameter is negotiated, and shared key information is established.

In step S548, the CCI host of the extension mode adaptive CSI-2 reception circuit 1322 transmits GET_ENCAPSULATED_REQUEST to the CCI device of the extension mode adaptive CSI-2 transmission circuit 1304.

In step S549, the CCI device of the extension mode adaptive CSI-2 transmission circuit 1304 transmits ENCAPSULATED_REQUEST (GET_DIGESTS request) to the CCI host of the extension mode adaptive CSI-2 reception circuit 1322.

In step S550, the CCI host of the extension mode adaptive CSI-2 reception circuit 1322 transmits DELIVER_ENCAPSULATED_RESPONSE (DIGESTS response) to the CCI device of the extension mode adaptive CSI-2 transmission circuit 1304. This allows the CCI device of the extension mode adaptive CSI-2 transmission circuit 1304 to acquire the certificate chain digest from the CCI host of the extension mode adaptive CSI-2 reception circuit 1322.

In step S551, the CCI device of the extension mode adaptive CSI-2 transmission circuit 1304 transmits ENCAPSULATED_RESPONSE_ACK (GET_CERTIFICATE request) to the CCI host of the extension mode adaptive CSI-2 reception circuit 1322.

In step S552, the CCI host of the extension mode adaptive CSI-2 reception circuit 1322 transmits DELIVER_ENCAPSULATED_RESPONSE (CERTIFICATE response) to the CCI device of the extension mode adaptive CSI-2 transmission circuit 1304. This may allow the CCI device (responder) to acquire the certificate chain from the CCI host (requester). It is to be noted that this processing may be executed multiple times.

In step S553, the CCI device of the extension mode adaptive CSI-2 transmission circuit 1304 transmits the ENCAPSULATED_RESPONSE_ACK to the CCI host of the extension mode adaptive CSI-2 reception circuit 1322.

In step S554, the FINISH request and the FINISH_RSP response are performed between the CCI host of the extension mode adaptive CSI-2 reception circuit 1322 and the CCI device of the extension mode adaptive CSI-2 transmission circuit 1304. This completes the handshake between the CCI host of the extension mode adaptive CSI-2 reception circuit 1322 and the CCI device of the extension mode adaptive CSI-2 transmission circuit 1304, which has been started by the KEY_EXCHANGE request in step S547.

In step S555, a GET_MEASUREMENTS request and a MEASUREMENTS response are performed between the CCI host of the extension mode adaptive CSI-2 reception circuit 1322 and the CCI device of the extension mode adaptive CSI-2 transmission circuit 1304. This allows the CCI host of the extension mode adaptive CSI-2 reception circuit 1322 to acquire measurement data from the CCI device of the extension mode adaptive CSI-2 transmission circuit 1304. It is to be noted that the GET_MEASUREMENTS request may be issued from the responder using the GET_ENCAPSULATED_REQUEST mechanism described above. Likewise, another request may also be issued from the responder using the GET_ENCAPSULATED_REQUEST mechanism described above.

Thereafter, in step S556, the KEY_EXCHANGE request (channel=CSI-2, sessionID=E) and the KEY_EXCHANGE_RSP response are performed in the same manner as step S547. In step S557, the FINISH request and the FINISH_RSP response are performed in the same manner as step S554. Then, in steps S558 to S566, pieces of processing similar to those in steps S508 to S516 in FIG. 78 are performed.

<Data Verification Processing>

Figure 81:
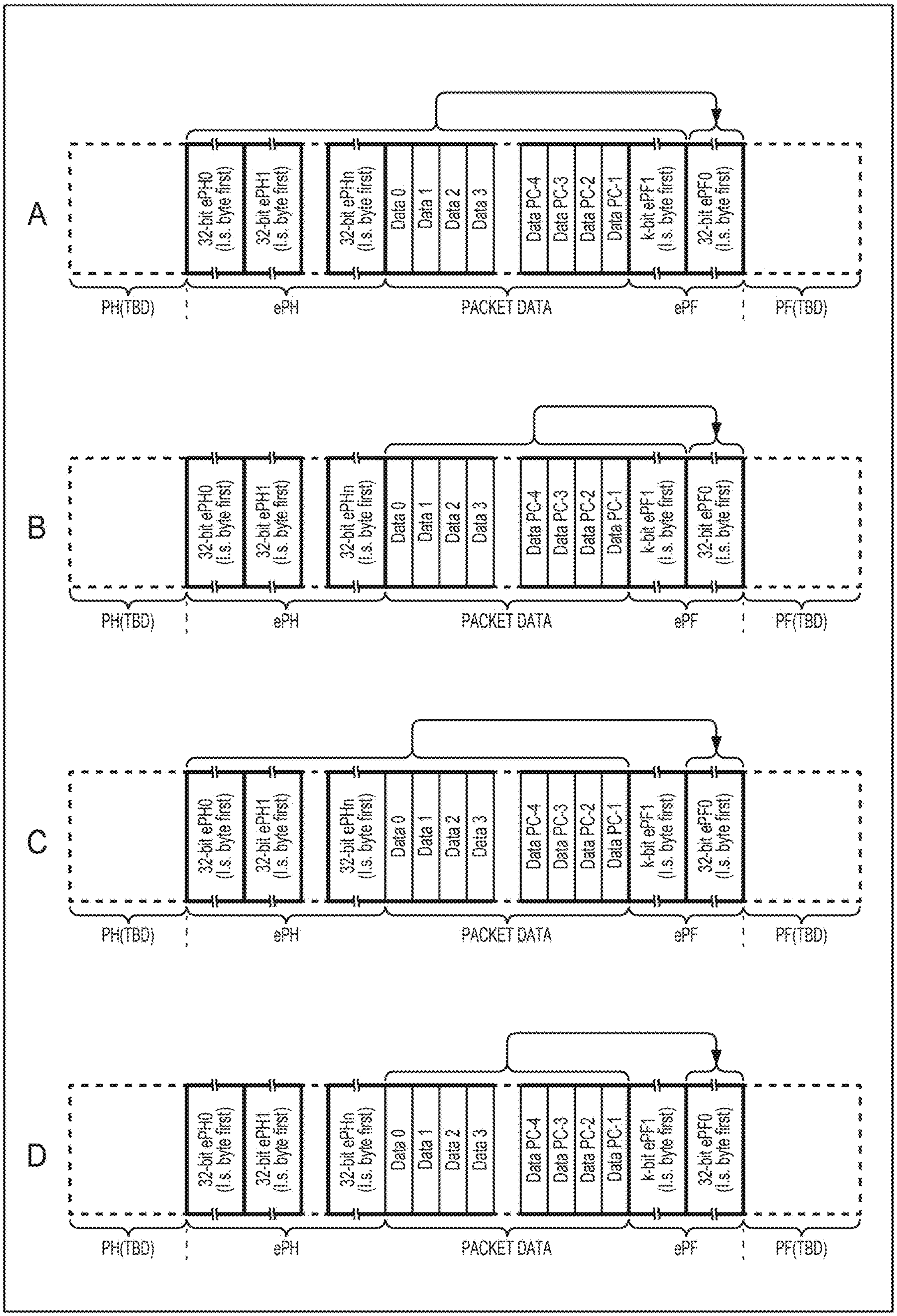
FIG. 81 is a diagram describing a verification packet and a packet to be verified.
Figure 82:
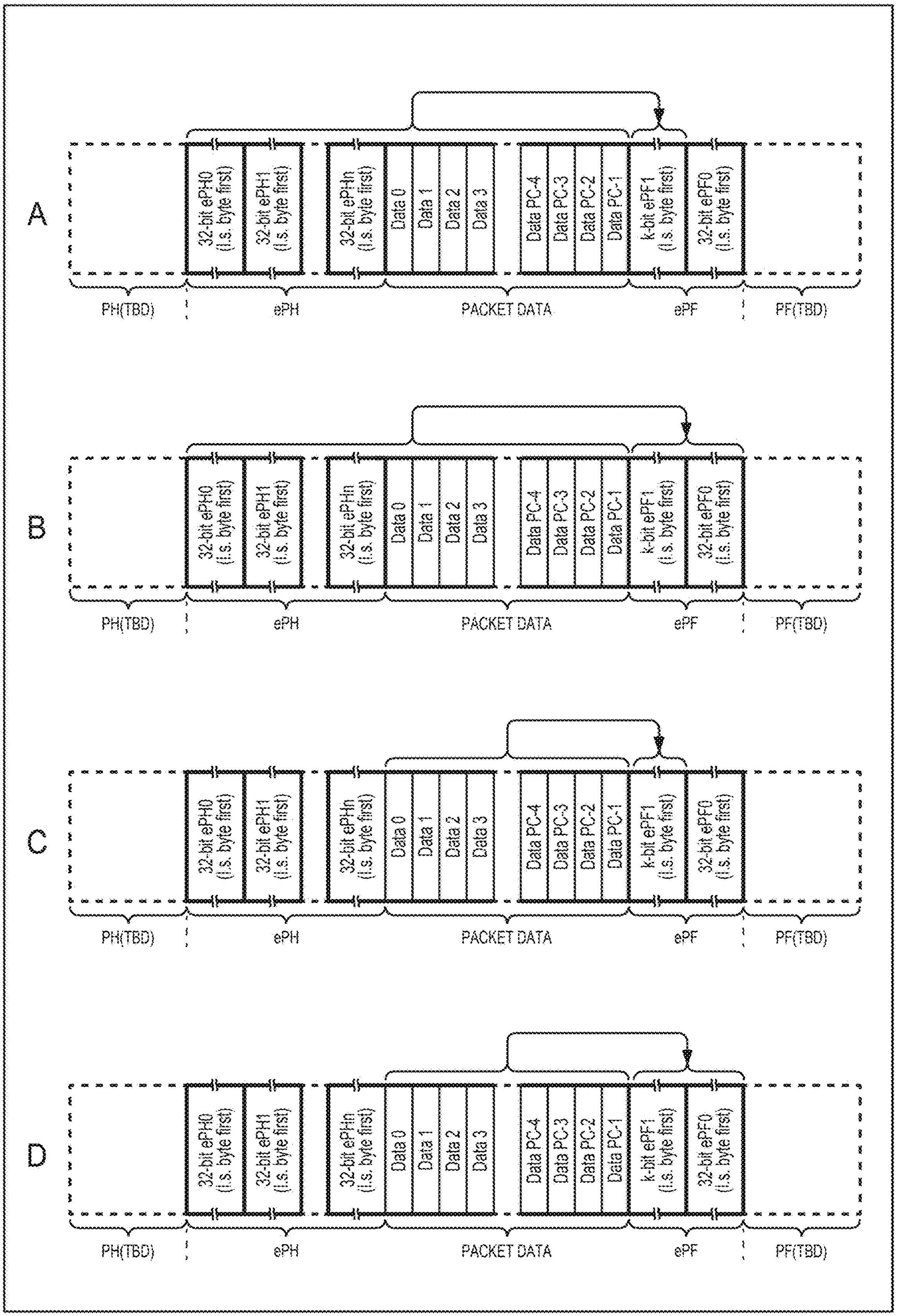
FIG. 82 is a diagram describing the verification packet and the packet to be verified.
Figure 83:
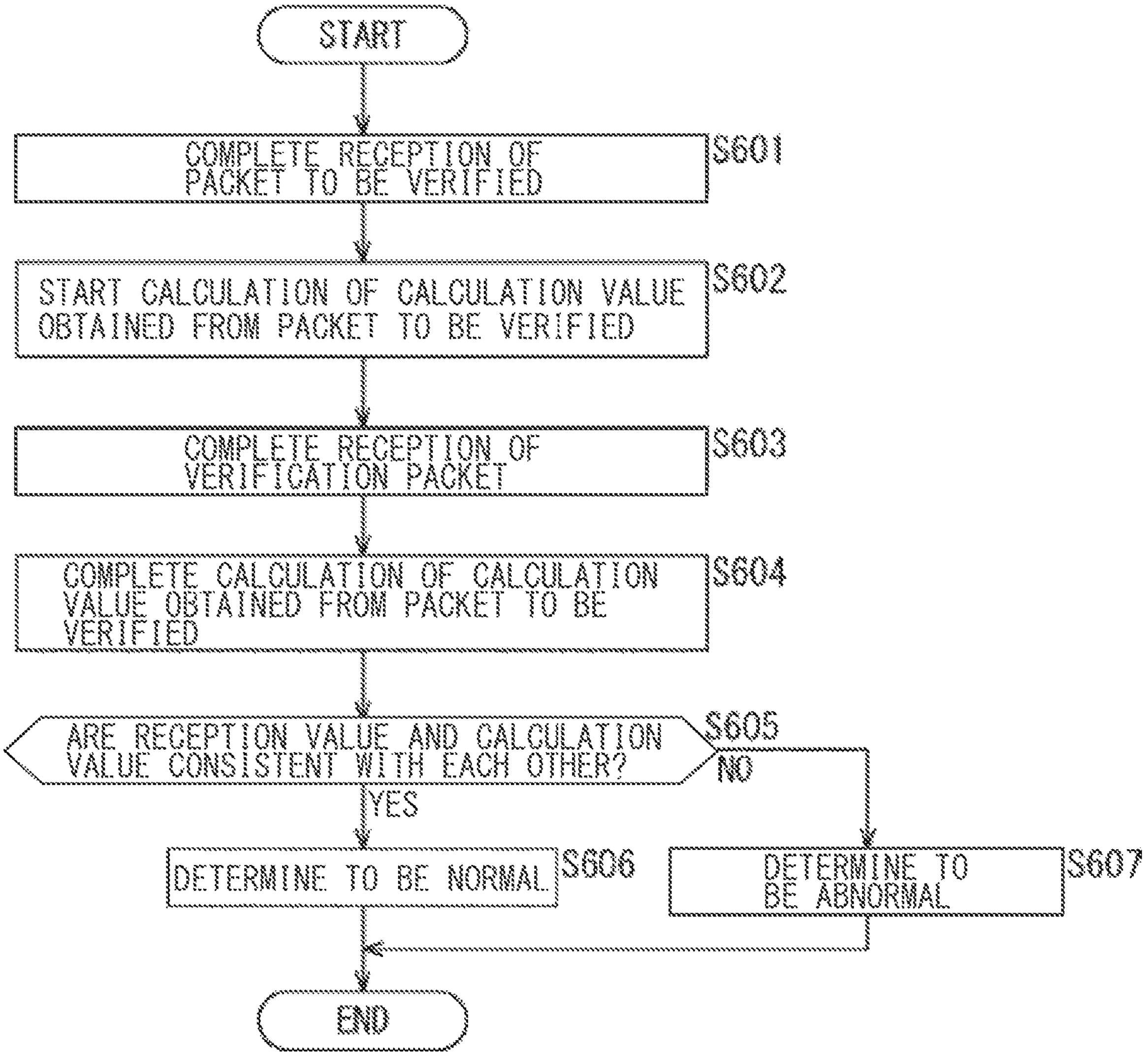
FIG. 83 is a flowchart describing data verification processing.

Description is given, with reference to FIGS. 81 to 83, of data verification processing using a verification packet and a packet to be verified.

As illustrated in FIGS. 81 and 82, the extended packet includes a packet header PH, the extended packet header ePH, packet data, the extended packet footer ePF, and a packet footer PF. The extended packet of such a configuration may constitute frame start, embedded data, image data, user-defined data, a frame end, a write command (CCI Write), a read command (CCI Read), and a read response (CCI Read return value). It is to be noted that some or all of the packet header PH, the extended packet header ePH, the packet data, the extended packet footer ePF, and the packet footer PF may be omitted. That is, a packet configuration including at least the extended packet header ePH and the packet data is defined as the extended packet.

Incidentally, there is a possibility that any of the extended packet header ePH, the packet data, and the extended packet footer ePF may not normally be received (message may disappear) due to a noise, an interference, or an attack. Therefore, it is desirable to store, inside an extended packet footer end ePF0, a verification packet to verify the completeness of the extended packet header ePH, the packet data, and the extended packet footer remainder ePF1. For the verification of the completeness, for example, a CRC32 of cyclic redundancy check is used, which is one type of error detecting codes. In addition, as a generator polynomial of CRC32, for example, X32+X26+X23+X22+X16+X12+X11+X10+X8+X7+X5+X4+X2+X+1 is used.

The packet data can be used for the packet to be verified. Alternatively, the extended packet header and the packet data can be used for the packet to be verified. Alternatively, the packet data and the extended packet footer remainder (ePF1) can be used for the packet to be verified. Alternatively, the extended packet header, the packet data, and the extended packet footer remainder (ePF1) can be used for the packet to be verified. Such a packet to be verified allows for protection of at least the packet data.

That is, the image sensor 1211 includes a second protection part (e.g., CRC arithmetic part) that generates second protected data (e.g., CRC arithmetic value) of the packet data without using the session key. For example, the second protected data is stored in the extended packet footer ePF of the high-speed data transmission. That is, the second stored data is stored in any one of the frame start, the embedded data, the image data, the user-defined data, the frame end, the write command (CCI Write), the read command (CCI Read), and the read response (CCI Read return value).

The extended packet footer ePF1 or ePF0 may have a security feature (security feature) defined therein. That is, the image sensor 1211 may include, therein, the security arithmetic part (e.g., an encryption arithmetic part, decryption arithmetic part, a hash-value arithmetic part, a message authentication code arithmetic part, or a digital signature arithmetic part). In addition, the result of the security arithmetic operation (e.g., hash value, message authentication code, of digital signature) may be stored in the extended packet footer ePF.

The result of the security arithmetic operation may be stored only inside the extended packet footer ePF1 rather than inside the extended packet footer ePF0, and may be stored outside the extended packet footer (e.g., inside the embedded data or inside the read response) rather than inside the extended packet footer. The security arithmetic part included in the image sensor 1211 is included in the security section 1310.

As the message authentication code (MAC: Message Authentication Code), there may be used any of GMAC (GaloisMAC), CMAC (Cipher-based MAC), HMAC (Hash-based MAC), and the like. For example, there may be used any of AES-GMAC, AES-CMAC, SHA2-HMAC, SHA3-HMAC, and the like to which AES (Advanced Encryption Standard) or SHA (Secure Hash Algorithm) is applied. It is to be noted that the AES has a block length of 128 bits and that any of 128 bits, 192 bits, and 256 bits is selected as a key length of the AES.

The extended packet footer may store, therein, for example, security information of any of a hash (in particular, cryptographic hash) value, a message authentication code, digital signature, and the like, with the packet data as the packet to be verified, or the extended packet header and the packet data as the packet to be verified. In that case, it is possible to have further resistance against malicious falsification from an attacker. It is to be noted that the extended packet footer “ePF1” or “ePF1 and ePF0” may store, therein, CRC of a cyclic redundancy check, which is one type of error detecting codes.

That is, the image sensor 1211 may include a complete arithmetic part (e.g., a first protection part=the security arithmetic part, the second protection part=the CRC arithmetic part), and a complete arithmetic value (e.g., first protected data, or second protected data) resulting from an arithmetic operation of completeness may be stored in the extended packet footer. It is to be noted that the CRC can be used for functional safety, and the completeness can be used to prevent a hardware failure from not being detected. Meanwhile, the completeness of the security feature can be used to detect an intentional interference or attack. That is, the security arithmetic part performs an arithmetic operation of a complete arithmetic value based on a cipher, and the CRC arithmetic part performs an arithmetic operation of a complete arithmetic value not based on a cipher.

The application processor 1212 is able to verify the completeness of the packet to be verified, for example, by using the verification packet. In a case where abnormality is determined, for example, any of the following pieces of processing may be executed, such as transmission of a request message requesting retransmission of a packet including the packet to be verified and the verification packet, transmission of a request message inquiring of the image sensor 1211 whether abnormality exists in the image sensor 1211, transmission of a request message requesting the image sensor 1211 to stop some or all of the functions of the image sensor 1211, a stop of propulsion of the propulsion apparatus, a change in propulsion control of the propulsion apparatus, and a change in priority data to be used for the propulsion control.

It is to be noted that complete arithmetic value may be stored, for example, inside any of embedded data, image data (packet data), user-defined data, a write command, a read command, a read response, and the like. In that case, the complete arithmetic value may not be stored in the extended packet footer. For example, the complete arithmetic value may be stored in the unit of frame of the image rather than in the unit of line of the image, in which case, an arithmetic operation is performed efficiently on the completeness. In that case, the complete arithmetic value is stored, for example, inside the read response or the embedded data after transmission of the image data.

The extended packet illustrated in A of FIG. 81 is a configuration example in which the extended packet header ePH, the packet data, and the extended packet footer remainder ePF1 are used as the packet to be verified, and the extended packet footer end ePF0 storing a calculation value determined by a security arithmetic operation using the packet to be verified is used as the verification packet.

The extended packet illustrated in B of FIG. 81 is a configuration example in which the packet data and the extended packet footer remainder ePF1 are used as the packet to be verified, and the extended packet footer end ePF0 storing a calculation value determined by the security arithmetic operation using the packet to be verified is used as the verification packet.

The extended packet illustrated in C of FIG. 81 is a configuration example in which the extended packet header ePH and the packet data are used as the packet to be verified, and the extended packet footer end ePF0 storing a calculation value determined by the security arithmetic operation using the packet to be verified is used as the verification packet.

The extended packet illustrated in D of FIG. 81 is a configuration example in which the packet data is used as the packet to be verified, and the extended packet footer end ePF0 storing a calculation value determined by the security arithmetic operation using the packet to be verified is used as the verification packet.

The extended packet illustrated in A of FIG. 82 is a configuration example in which the extended packet header ePH and the packet data are used as the packet to be verified, and the extended packet footer remainder ePF1 storing a calculation value determined by the security arithmetic operation using the packet to be verified is used as the verification packet.

The extended packet illustrated in B of FIG. 82 is a configuration example in which the extended packet header ePH and the packet data are used as the packet to be verified, and the extended packet footer end ePF0 and the extended packet footer remainder ePF1 storing a calculation value determined by the security arithmetic operation using the packet to be verified are used as the verification packet.

The extended packet illustrated in C of FIG. 82 is a configuration example in which the packet data is used as the packet to be verified, and the extended packet footer remainder ePF1 storing a calculation value determined by the security arithmetic operation using the packet to be verified is used as the verification packet.

The extended packet illustrated in D of FIG. 82 is a configuration example in which the packet data is used as the packet to be verified, and the extended packet footer end ePF0 and the extended packet footer remainder ePF1 storing a calculation value determined by the security arithmetic operation using the packet to be verified are used as the verification packet.

FIG. 83 is a flowchart describing data verification processing to be performed in the application processor 1212.

In step S601, when an extended packet transmitted from the image sensor 1211 is received by the extension mode adaptive CSI-2 reception circuit 1322, the security section 1326 receives a packet to be verified of the extended packet. Then, when the security section 1326 completes the reception of the packet to be verified, the processing proceeds to step S602. It is to be noted that, even when the reception of all of the packets to be verified has not been completed, the processing may proceed to step S602 as long as the reception of at least a portion thereof (e.g., 128 bits), which enables calculation of the security arithmetic operation to be started, has been completed. In that case, the remainder of the packet to be verified is continued to be received until completion of the reception of all of the packets to be verified.

In step S602, the security section 1326 starts calculation of a calculation value to be determined by the security arithmetic operation using at least a portion of the packet to be verified received in step S601.

In step S603, the security section 1326 receives a verification packet transmitted from the image sensor 1211 via the extension mode adaptive CSI-2 reception circuit 1322. Then, when the security section 1326 completes the reception of the verification packet and acquires a reception value (a calculation value calculated by the image sensor 1211) stored in the verification packet, the processing proceeds to step S604.

In step S604, when the security section 1326 completes the calculation of the calculation value determined by the security arithmetic operation using the packet to be verified started in step S602 (i.e., receives all of the packets to be verified and completes the calculation using the all thereof), the processing proceeds to step S605.

In step S605, the security section 1326 determines whether or not the reception value received in step S603 and the calculation value determined in step S604 are consistent with each other.

In a case where the security section 1326 determines in step S605 that the reception value and the calculation value are consistent with each other, the processing proceeds to step S606. In this case, in step S606, the security section 1326 determines that the extended packet received by the extension mode adaptive CSI-2 reception circuit 1322 is normal, and the processing is finished.

Meanwhile, in a case where the security section 1326 determines in step S605 that the reception value and the calculation value are not consistent with each other, the processing proceeds to step S607. In this case, in step S607, the security section 1326 determines that abnormality has occurred in the extended packet received by the extension mode adaptive CSI-2 reception circuit 1322, and the processing is finished.

<Ensuring Functional Safety Using Message Count Value>

In order to ensure functional safety (e.g., detect and properly address missing message), the image sensor 1211 is able to store a message count value to be counted by the message counter 1308 inside the extended packet header or inside the extended packet footer. For example, the message counter 1308 included in the image sensor 1211 is able to store a message count value that is incremented or decremented every time a message is transmitted from the image sensor 1211. It is to be noted that the image sensor 1211 may have a configuration in which an independent message counter 1308 is provided for each virtual channel (virtual channel), or have a configuration in which a message counter 1308 common to virtual channels is provided.

The message counter 1308 sets the message count value to an initial value (e.g., zero or a maximum value) in the first packet including the extended packet header of a certain virtual channel to increment or decrement the message count value every time data including the extended packet header of the certain virtual channel is transmitted. In addition, for example, in a case where data including no extended packet header is transmitted, the message counter 1308 does not increment or decrement the message count number, and resumes counting when data including the extended packet header is transmitted next time.

The message counter 1308 may continue counting regardless of the frame start or the frame end. Then, in a case where the message count value is counted to a specified value (e.g., a maximum value or zero), message counter 1308 returns the next message count value to the initial value (e.g., zero or a maximum value), and performs counting. It is to be noted that a portion of the extended packet header may store some of nonce values.

It is to be noted that, in a case where the message is missing, a reception side (the image sensor 1211 or the application processor 1212) receiving the message count value is able to immediately detect the missing. For example, a DoS (Denial-of-service) attack, or the like that violates the availability of the image sensor 1211 or the application processor 1212 by intentionally incorporating huge amounts of messages is also detected immediately on the reception side. Therefore, the message count value is desirably stored in the extended packet header. Enabling detection of such missing or attack in a shorter period of time enables the reception side to start to address them in a shorter period of time, which is particularly suitable, for example, for high speed movement or the propulsion apparatus being able to move at high speed.

It is to be noted that, as for a write command (CCI Write), a read command (CCI Read), or a read response (CCI Read return value) as well, the message count value or the complete arithmetic value may also be configured to be stored, and an element associated with the extended packet may be applied. In that case, it is possible to address the functional safety or to protect completeness, for example, also for the write command, the read command, or the read response as well.

Figure 84:
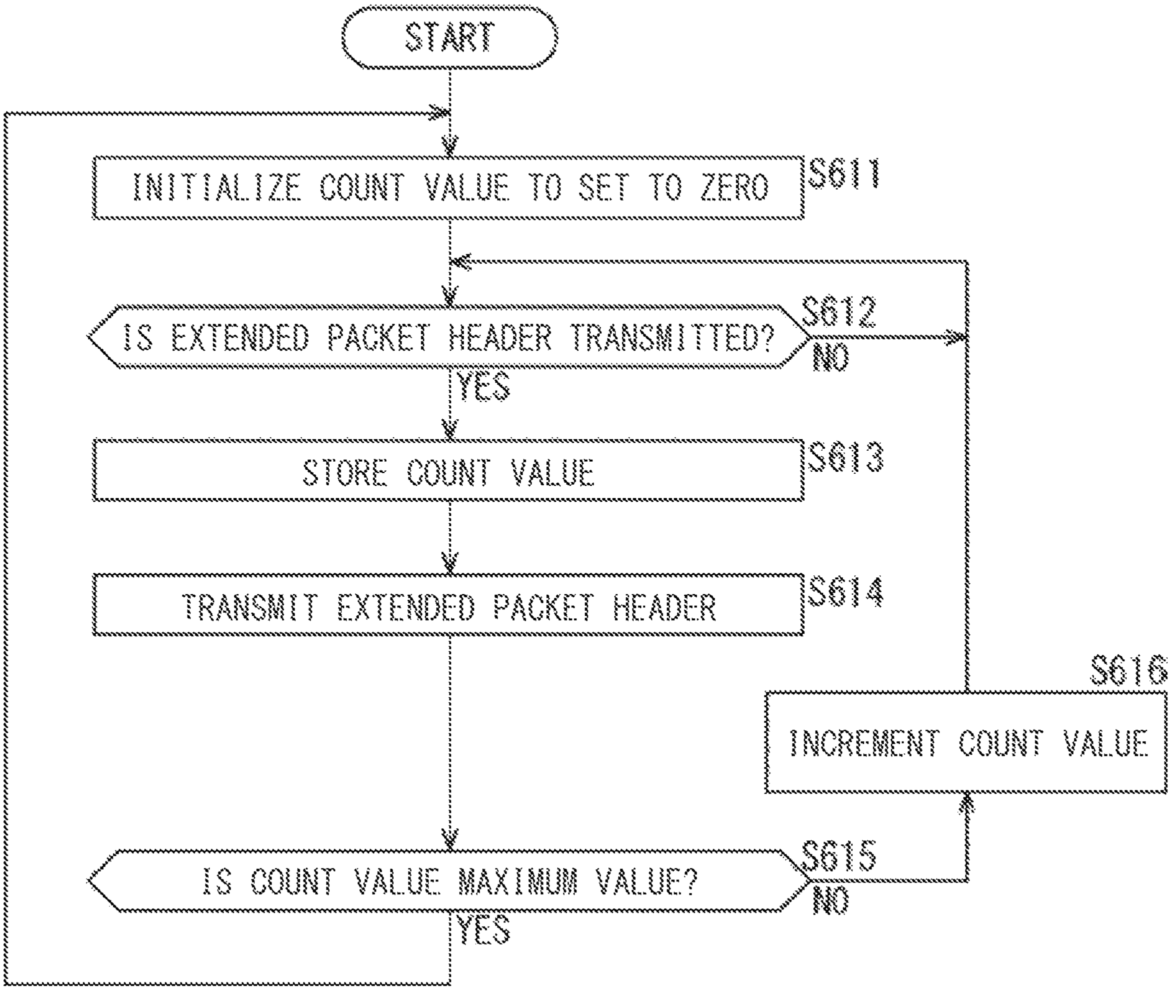
FIG. 84 is a flowchart describing message count value transmission processing.

FIG. 84 is a flowchart describing a message count value transmission processing in which the image sensor 1211 transmits a message count value.

In step S611, the message counter 1308 initializes the message count value to set to zero.

In step S612, the extension mode adaptive CSI-2 transmission circuit 1304 determines whether or not to transmit an extended packet header, and processing is waited until determination is made to transmit the extended packet header. Then, in step S612, in a case where the extension mode adaptive CSI-2 transmission circuit 1304 determines to transmit the extended packet header, the processing proceeds to step S613.

In step S613, the extension mode adaptive CSI-2 transmission circuit 1304 acquires the message count value from the message counter 1308, and stores it in the extended packet header.

In step S614, the extension mode adaptive CSI-2 transmission circuit 1304 transmits the extended packet header having stored the message count value in step S613.

In step S615, the message counter 1308 determines whether or not the message count value has been counted up to the maximum value. In a case where the message counter 1308 determines in step S615 that the message count value has not been counted up to the maximum value, the processing proceeds to step S616.

In step S616, the message counter 1308 increments the message count value. Thereafter, the processing returns to step S612, and subsequently similar processing is repeatedly performed.

Meanwhile, in a case where the message counter 1308 determines in step S615 that the message count value has been counted up to the maximum value, the processing returns to step S611 and the message count value is initialized, and subsequently similar processing is repeatedly performed.

It is to be noted that, in addition to such increment of the message count value, for example, the message count value may be initialized to be set to the maximum value for decrement.

<Concerning Embedded Data>

Description is given, with reference to FIGS. 85 to 88, of embedded data.

The image sensor 1211 can use embedded data to thereby include, in a data stream, additional information such as device setting information. The embedded data is configured by one or more lines (rows), and can include any of configuration data of the image sensor 1211, register values in compliance with the standard, vendor-specific register values, frame format descriptions, statistical values, and the like.

Figure 85:
FIG. 85 is a diagram describing embedded data.

A of FIG. 85 illustrates one-line embedded data; in a configuration thereof, embedded data of a desired data amount is successively arranged subsequent to an embedded data format code, and a padding character is arranged in the remainder thereof.

The embedded data includes information related to image data or user-defined data. Therefore, the image data or the user-defined data may be compressed data, but the embedded data is desirably uncompressed data (non-compressed data). Accordingly, in a case where data compression is used, there are, in a mixed manner, compressed data (image data or user-defined data) and non-compressed data (embedded data) inside a frame of high-speed data transmission.

The embedded data can be provided with multiple lines (rows) depending on the number of register values to be added to the embedded data In addition, the number of rows of the embedded data can be specified by a portion of the description inside a frame format in the first embedded data row inside the frame. A line length of the embedded data may be shorter than a line length of the image data or the user-defined data, but does not preferably exceed the line length of the image data or the user-defined data, and is desirably the same as the line length of the image data or the user-defined data. The first pixel value of the embedded data may exhibit a format to be used for the embedded data.

Some or all of the nonce values may be stored in at least a portion of the embedded data indicating a vendor-specific code (Vendor specific) or a reserved code (Reserved for future use) as illustrated in B of FIG. 85, and may be transmitted. Inside the frame, the embedded data is stored either between the frame start and the first image data or the user-defined data, or between the last image data or the user-defined data and the frame end. However, the embedded data between the last image data or the user-defined data and the frame end may be omitted.

Figure 86:
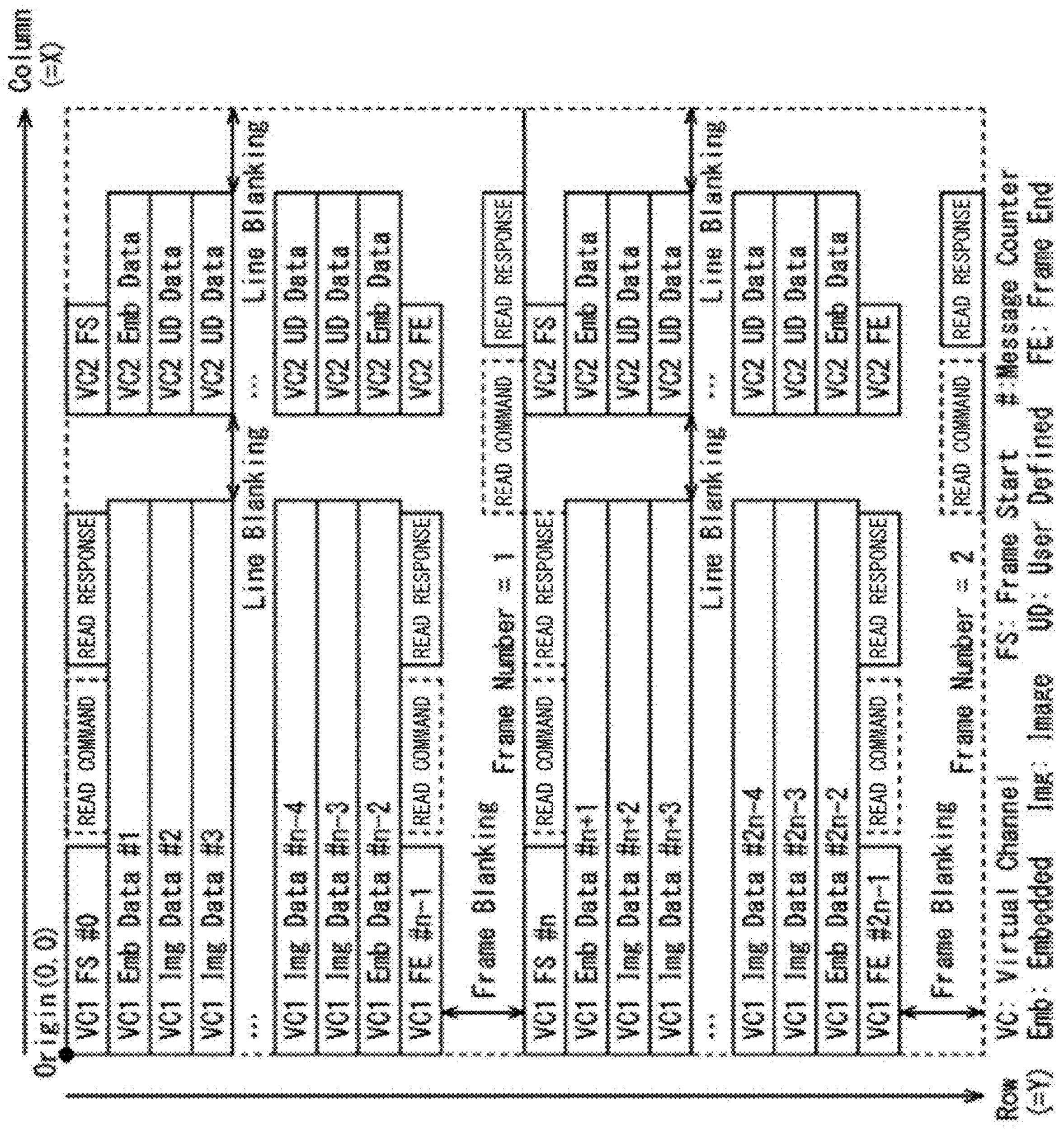
FIG. 86 is a diagram illustrating an example of a data structure of image data.

FIG. 86 illustrates an example of a data structure of image data for two frames to be transmitted from the image sensor 1211.

As illustrated in FIG. 86, after a first virtual channel frame start (VC1 FS) is transmitted, a second virtual channel frame start (VC2 FS) is transmitted, subsequent to a read command and a read response. Next, first virtual channel first embedded data (VC1 Emb Data) and second virtual channel first embedded data (VC2 Emb Data) are transmitted. Then, first virtual channel image data (VC1 Img Data) for one frame and second virtual channel user-defined data (VC2 UD Data) are transmitted. Upon completion of transmission for one frame, first virtual channel second embedded data (VC1 Emb Data) and second virtual channel second embedded data (VC2 Emb Data) are transmitted. Thereafter, after first virtual channel frame end (VC1 FE) is transmitted, second virtual channel frame end (VC2 FE) is transmitted subsequent to the read command and the read response.

FIG. 86 illustrates an example in which the message count value is commonalized between the first virtual channel and the second virtual channel. At this time, a configuration may be employed in which message counters independent of each other for the first virtual channel and the second virtual channel are provided. In addition, the user-defined data may be image data or the like.

Here, some or all of the nonce values are stored, for example, within a period of time from the frame start to the frame end, or within a period of time from the frame end to the frame start (frame blanking period). In addition, the nonce value can be stored, for example, either in the embedded data, in the image data, in non-image data or in a line blanking period, within the period of time from the frame start to the frame end. In addition, the nonce value may be stored in the second virtual channel.

Defining the frame start and the frame end makes it possible, for example, for the image sensor to notify the processor of the start and end of the high-speed data transmission. In addition, it is possible for the image sensor to maintain a frame transmission cycle to be constant. It is to be noted that the embedded data is data in which attributes representing image data, information (metadata) related to the image data, and the like are stored.

In the present embodiment, description is given of an example in which high-speed data transmission of nonce values is executed without inhibiting the high-speed data transmission of the image data. That is, description is given of an example in which the high-speed data transmission of the image data and the high-speed data transmission of the nonce values are executed not in parallel but in series. However, in a case where different communication paths are used for the high-speed data transmission of the image data and the transmission (high-speed data transmission or low-speed command transmission) of the nonce values, the transmissions may be executed in parallel.

It is to be noted that frequency-separation by a filter is possible for the high-speed data transmission and the low-speed command transmission, and thus some or all of the transmissions may be duplicated (executed in parallel) unless there is an issue in power consumption. Some or all of nonce values may be transmitted for every multiple frames, but are desirably transmitted for each frame for such a reason as frame missing. For example, the frame start (Frame Start; FS) packet includes Frame Start Code (Data Type=0x00), and the frame end (Frame End; FE) packet includes Frame End Code (Data Type=0x01).

Figure 87:
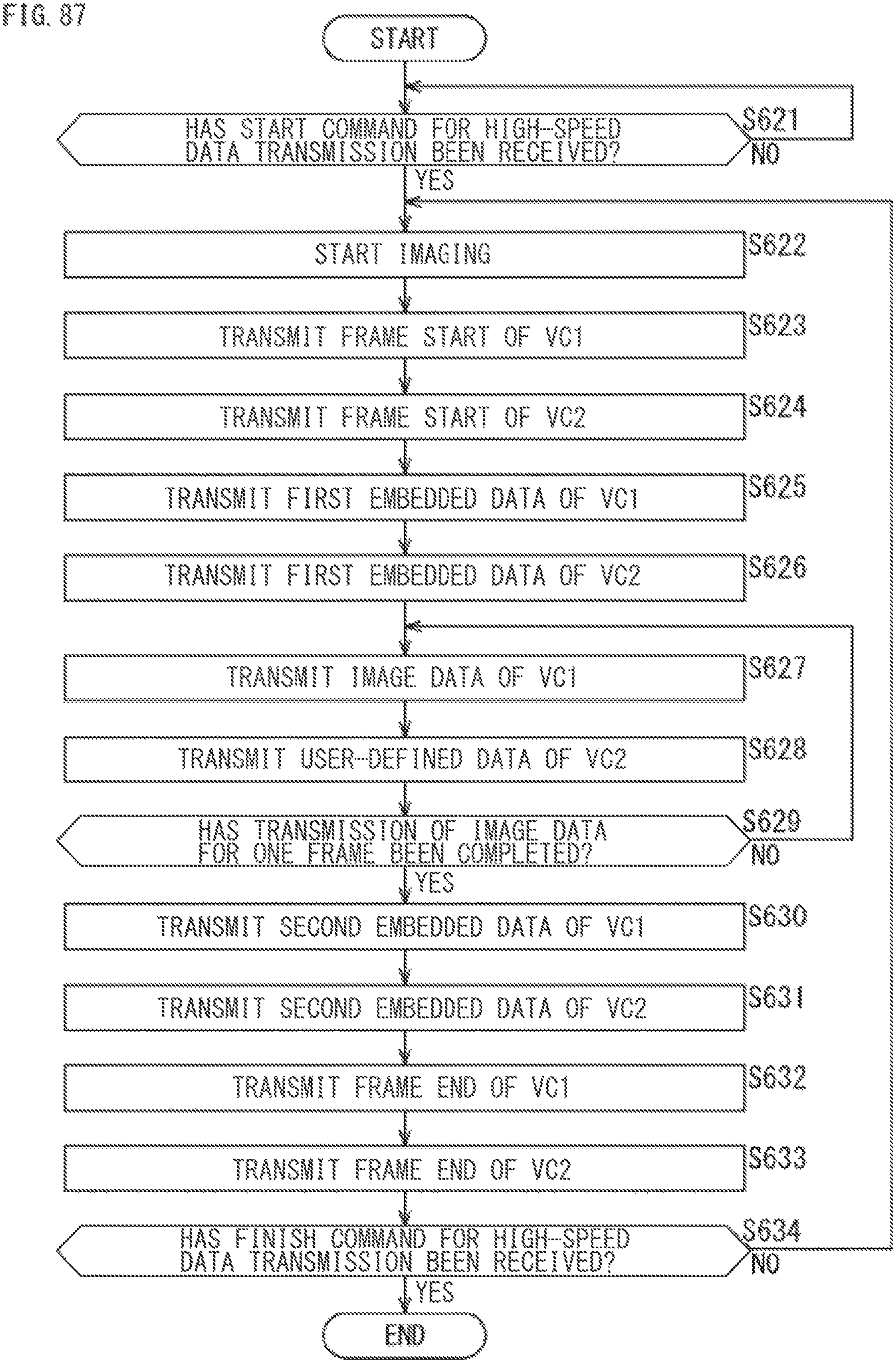
FIG. 87 is a flowchart describing image data transmission processing.

FIG. 87 is a flowchart describing image data transmission processing in which the image sensor 1211 transmits image data.

In step S621, the extension mode adaptive CSI-2 transmission circuit 1304 determines whether or not a start command for the high-speed data transmission has been received, and waits for the processing until determination is made that the start command for the high-speed data transmission has been received. Then, in a case where the extension mode adaptive CSI-2 transmission circuit 1304 determines in step S621 that the start command for the high-speed data transmission has been received, the processing proceeds to step S622.

In step S622, the pixel 1301 starts imaging, and image data outputted from the pixel 1301 is supplied to the extension mode adaptive CSI-2 transmission circuit 1304 via the AD converter 1302 and the image processing section 1303.

In step S623, the extension mode adaptive CSI-2 transmission circuit 1304 transmits the frame start of the first virtual channel.

In step S624, the extension mode adaptive CSI-2 transmission circuit 1304 transmits the frame start of the second virtual channel.

In step S625, the extension mode adaptive CSI-2 transmission circuit 1304 transmits the first embedded data of the first virtual channel.

In step S626, the extension mode adaptive CSI-2 transmission circuit 1304 transmits the first embedded data of the second virtual channel.

In step S627, the extension mode adaptive CSI-2 transmission circuit 1304 transmits the image data of the first virtual channel.

In step S628, the extension mode adaptive CSI-2 transmission circuit 1304 transmits the user-defined data of the second virtual channel.

In step S629, the extension mode adaptive CSI-2 transmission circuit 1304 determines whether or not transmission of the image data for one frame has been completed.

In a case where the extension mode adaptive CSI-2 transmission circuit 1304 determines in step S629 that the transmission of the image data for one frame has not been completed, the processing returns to step S627, and subsequently similar processing is repeatedly performed. Meanwhile, in a case where the extension mode adaptive CSI-2 transmission circuit 1304 determines in step S629 that the transmission of the image data for one frame has been completed, the processing proceeds to step S630.

In step S630, the extension mode adaptive CSI-2 transmission circuit 1304 transmits the first virtual channel second embedded data.

In step S631, the extension mode adaptive CSI-2 transmission circuit 1304 transmits the second virtual channel second embedded data.

In step S632, the extension mode adaptive CSI-2 transmission circuit 1304 transmits the first virtual channel frame end.

In step S633, the extension mode adaptive CSI-2 transmission circuit 1304 transmits the second virtual channel frame end.

In step S634, the extension mode adaptive CSI-2 transmission circuit 1304 determines whether or not a finish command for the high-speed data transmission has been received.

In a case where the extension mode adaptive CSI-2 transmission circuit 1304 determines in step S634 that the finish command for the high-speed data transmission has not been received, the processing returns to step S622, and subsequently similar processing is repeatedly performed. Meanwhile, in a case where the extension mode adaptive CSI-2 transmission circuit 1304 determines in step S634 that the finish command for the high-speed data transmission has been received, the processing is finished.

The start of the imaging may be continued to be executed until the finish command for the high-speed data transmission is received, and may be executed every time the start command for the high-speed data transmission is received.

Figure 88:
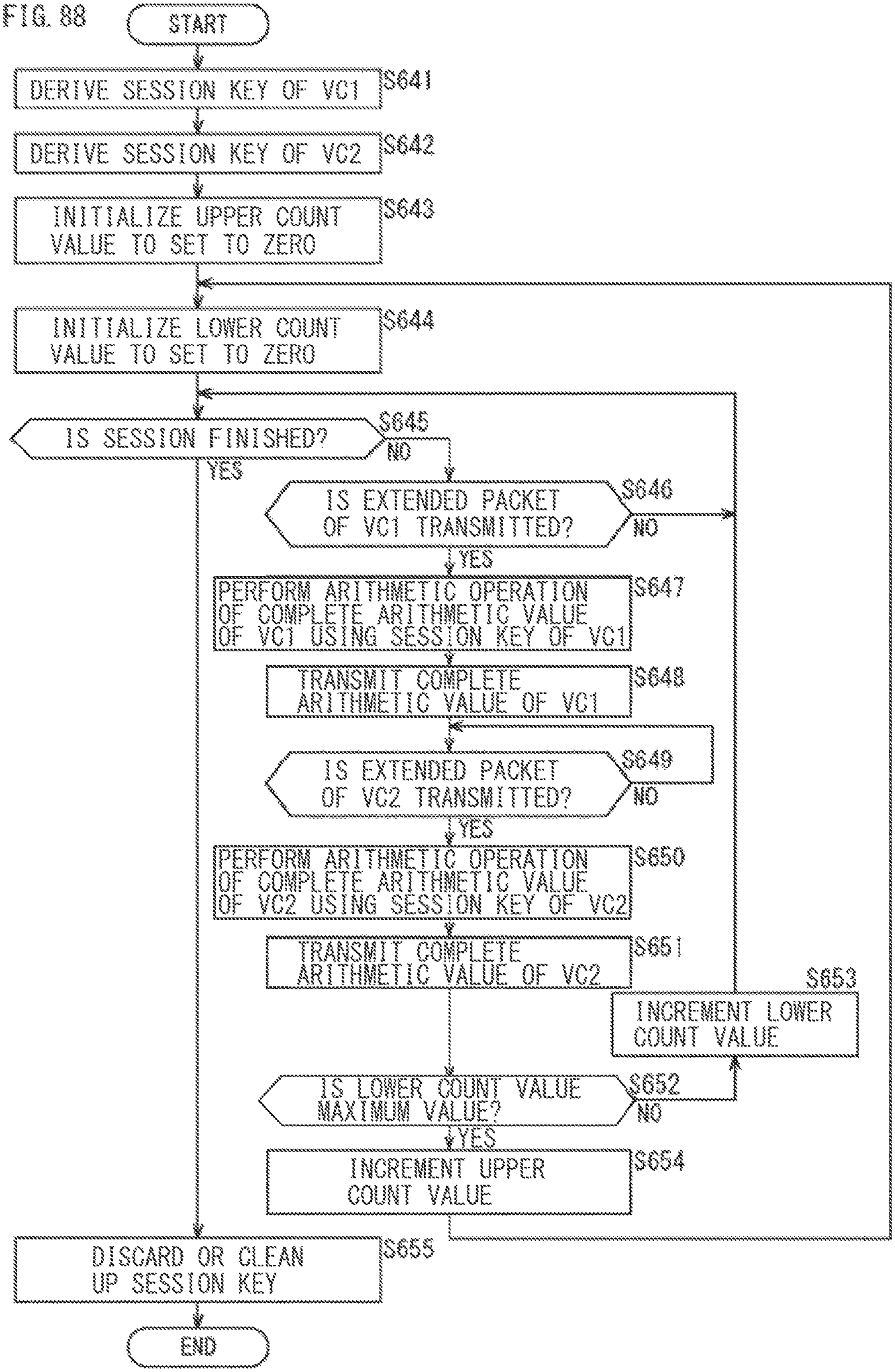
FIG. 88 is a flowchart describing complete arithmetic value transmission processing.

FIG. 88 is a flowchart describing complete arithmetic value transmission processing in which the image sensor 1211 transmits a complete arithmetic value.

In step S641, the security section 1310 derives a session key of the first virtual channel.

In step S642, the security section 1310 derives a session key of the second virtual channel.

In step S643, the message counter 1308 initializes the upper count value of the message count value to set to zero.

In step S644, the message counter 1308 initializes the lower count value of the message count value to set to zero.

In step S645, the extension mode adaptive CSI-2 transmission circuit 1304 determines whether or not to finish the session; in a case where determination is made not to finish the session, the processing proceeds to step S646.

In step S646, the extension mode adaptive CSI-2 transmission circuit 1304 determines whether or not to transmit an extended packet of the first virtual channel.

In step S646, in a case where the extension mode adaptive CSI-2 transmission circuit 1304 determines not to transmit the extended packet of the first virtual channel, the processing returns to step S645, and subsequently similar processing is repeatedly performed. Meanwhile, in a case where the extension mode adaptive CSI-2 transmission circuit 1304 determines in step S646 to transmit the extended packet of the first virtual channel, the processing proceeds to step S647.

In step S647, the security section 1310 performs an arithmetic operation of the complete arithmetic value of the first virtual channel using the session key of the first virtual channel derived in step S641.

In step S648, the extension mode adaptive CSI-2 transmission circuit 1304 arranges the complete arithmetic value calculated in step S647 in the extended packet of the first virtual channel, and transmits the extended packet of the first virtual channel.

In step S649, the extension mode adaptive CSI-2 transmission circuit 1304 determines whether or not to transmit an extended packet of the second virtual channel, and waits for the processing until determination is made to transmit the extended packet of the second virtual channel. Then, in a case where the extension mode adaptive CSI-2 transmission circuit 1304 determines in step S649 to transmit the extended packet of the second virtual channel, the processing proceeds to step S650.

In step S650, the security section 1310 performs an arithmetic operation of the complete arithmetic value of the second virtual channel using the session key of the second virtual channel derived in step S642.

In step S651, the extension mode adaptive CSI-2 transmission circuit 1304 arranges the complete arithmetic value calculated in step S650 in the extended packet of the second virtual channel, and transmits the extended packet of the second virtual channel.

In step S652, the message counter 1308 determines whether or not the lower count value of the message count value has been counted up to the maximum value.

In a case where the message counter 1308 determines in step S652 that the lower count value of the message count value has not been counted up to the maximum value, the processing proceeds to step S653. In step S653, the message counter 1308 increments the lower count value of the message count value, and then the processing returns to step S645; hereinafter, similar processing is repeatedly performed.

Meanwhile, in a case where the message counter 1308 determines in step S652 that the lower count value of the message count value has been counted up to the maximum value, the processing proceeds to step S654. In step S654, the message counter 1308 increments the upper count value of the message count value, and then the processing returns to step S644; hereinafter, similar processing is repeatedly performed.

Then, in a case where the extension mode adaptive CSI-2 transmission circuit 1304 determines in step S645 to finish the session, the processing proceeds to step S655.

In step S655, the security section 1310 discards or cleans up the session key of the first virtual channel and the session key of the second virtual channel, and thereafter the processing is finished.

<Modification Example of Data Structure of Image Data>

Figure 89:
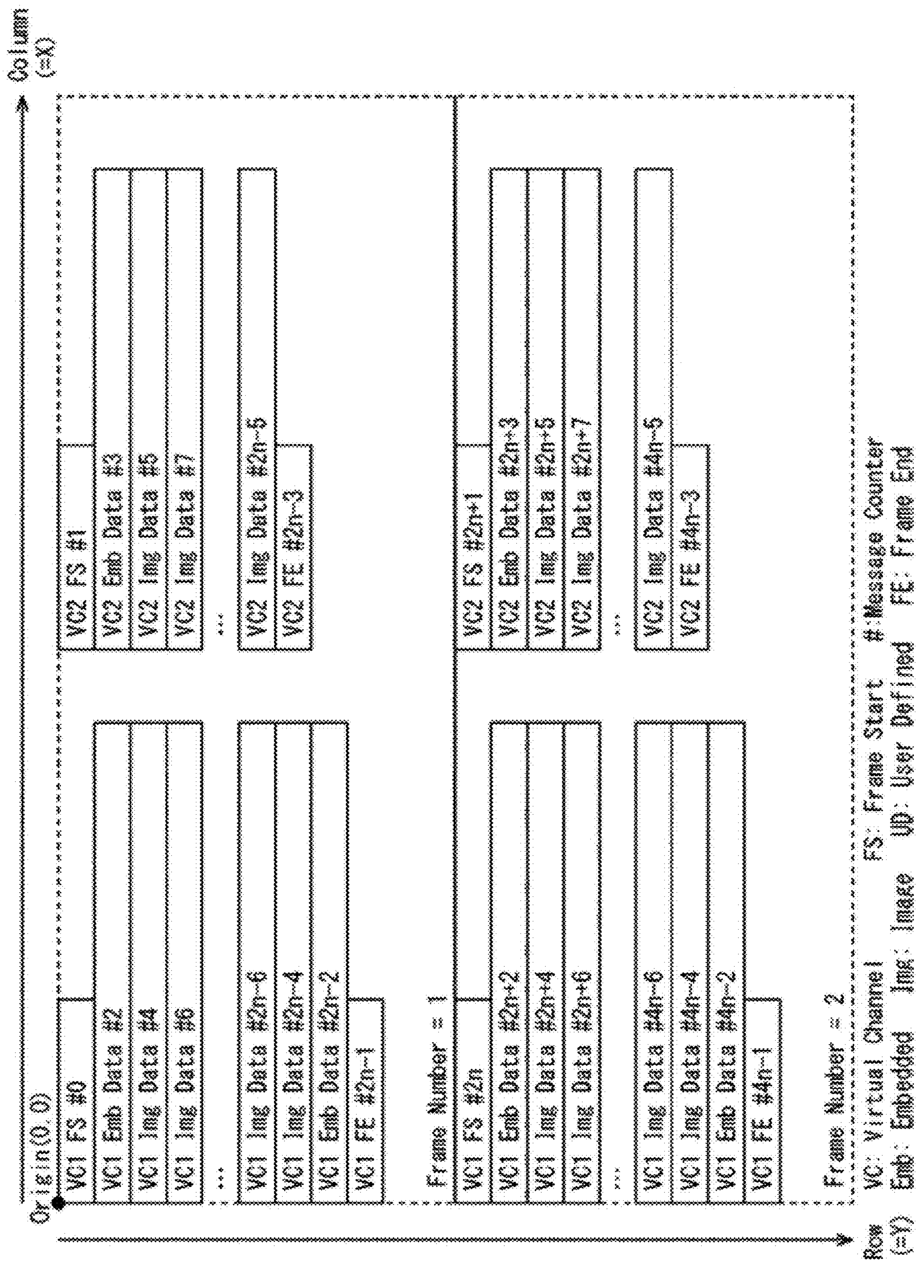
FIG. 89 illustrates a first modification example of the data structure of the image data.
Figure 90:
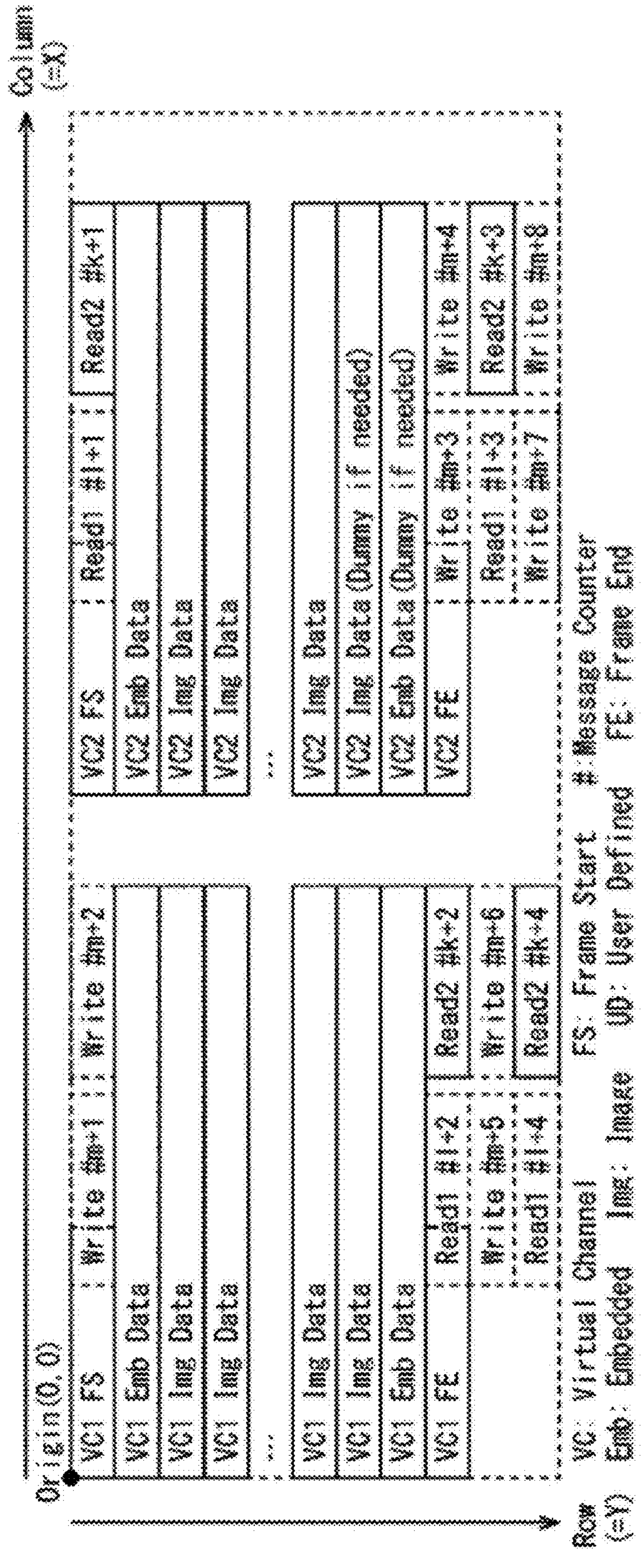
FIG. 90 illustrates a second modification example of the data structure of the image data.
Figure 91:
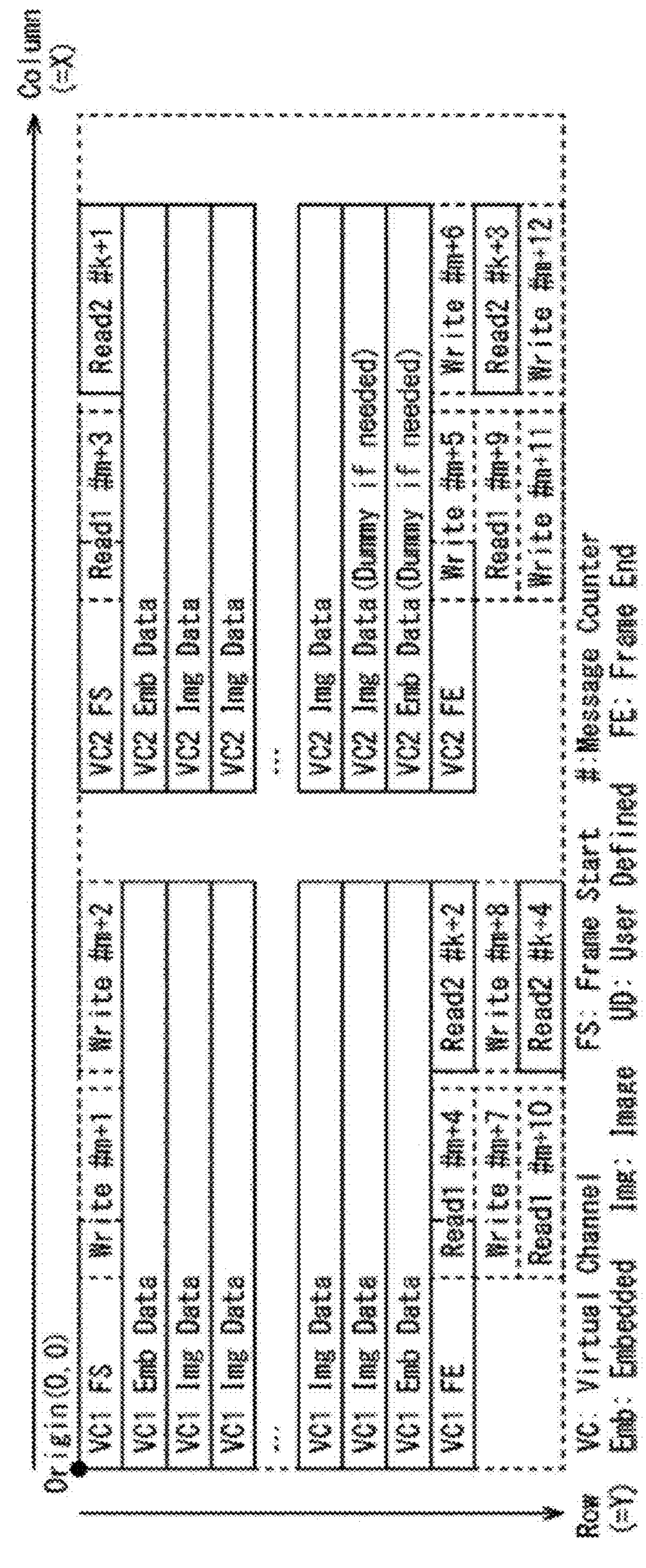
FIG. 91 illustrates a third modification example of the data structure of the image data.

Description is given, with reference to FIGS. 89 to 91, of a data structure of image data.

FIG. 89 illustrates a first modification example of the data structure of the image data.

In the data structure of the image data illustrated in FIG. 89, a message count value commonalized between the first virtual channel and the second virtual channel is used.

However, the session key or the message counter may be commonalized between the first virtual channel and the second virtual channel. In addition, the image data or the embedded data may be replaced by other data. For example, the embedded data may be replaced by image data. Meanwhile, the message counter may be commonalized by counting across the virtual channel (VC).

FIG. 90 illustrates a second modification example of the data structure of the image data.

In the data structure of the image data illustrated in FIG. 90, Write (CCI write command), Read1 (CCI read command), and Read2 (CCI read response) use message count values independent of one another.

FIG. 91 illustrates a third modification example of the data structure of the image data.

In the data structure of the image data illustrated in FIG. 91, CCI uplink (Write and Read1) and CCI downlink (Read2) are provided with message count values independent of each other. That is, the message count value may be commonalized between the Write (CCI write command) and the Read1 (CCI read command).

<Concerning Nonce Value>

For example, the nonce value is number used once to the same session key, and thus is used as some or all of initialization vectors (initialization vector) of an encryption arithmetic operation or a decryption arithmetic operation using the session key. Therefore, the nonce used by the image sensor 1211 for the encryption arithmetic operation is transmitted from the image sensor 1211 and received by the application processor 1212 to thereby enable the application processor 1212 to obtain nonce values necessary for the decryption arithmetic operation.

That is, the image sensor 1211 desirably transmits the nonce values before transmission of image data. Specifically, some or all of nonce values corresponding to image data in a certain frame are stored in any of a read response, user-defined data, embedded data (immediately after the image data), a frame end, a frame start, or embedded data (immediately before the image data), after completion of transmission of the last image data in a frame one frame before, until start of transmission of the first image data in the certain frame.

For example, the application processor 1212 which is a master of the low-speed command transmission may transmit, from the image sensor 1211 which is a slave of the low-speed command transmission, a read command requesting reading of nonce values in the image sensor 1211 to the application processor 1212, by the low-speed command transmission, in response to the start or the completion of reception of any of the frame start, the embedded data, the image data, the user-defined data, the frame end, and the like transmitted by the high-speed data transmission.

The image sensor 1211 receives the read command transmitted from the application processor 1212, and transmits nonce values in response thereto by the high-speed data transmission. Then, the application processor 1212 receives the read response to thereby enable notification of the nonce values from the image sensor 1211 to the application processor 1212.

The nonce values notified from the image sensor 1211 is used in the application processor 1212, and thus some or all of the nonce values are desirably transmitted within a frame blanking period in which image data between the frame end and the next frame start is not transmitted. However, as for the first frame (Frame Number=1), the first nonce values (initial values) may be agreed upon in advance between the image sensor 1211 and the application processor 1212, or some or all of the first nonce values may be received by the application processor 1212 by the start of transmission of the image data.

This read command corresponds, for example, to Read of the Read/Write in the I2C or I3C standard. Meanwhile, the read response corresponds to the Read return value. It is to be noted that, in order to adjust a timing of the read response, a timer that waits for a predetermined period of time may be provided between the reception of the high-speed data transmission by the application processor 1212 and the transmission of the read command.

<Concerning I2C and I3C>

An inter-integrated circuit serial bus, referred to as a I2C bus or $I^2C$ bus in some cases, is a serial single-ended computer bus intended for use in coupling a low-speed peripheral to the application processor 1212. The I2C bus is a multi-master bus in which each device is able to serve as a master and a slave for various messages transmitted on the I2C bus.

The I2C bus is able to transmit data using only two bidirectional open drain connectors including a serial data line (SDA) and a serial clock line (SCL). These connectors typically include a signal line of which the end is terminated with a pull-up resistor. A protocol that manages the operation of the I2C bus specifies the basic type of the messages, and each of the messages is started with START and is terminated with STOP. The I2C bus uses 7-bit addressing to specify two types of nodes.

A master node is a node that generates a clock and starts communication with a slave node. The slave node is a node that receives a clock and responses when being addressed by the master. The I2C bus is a multi-master bus, which means that there can be any number of master nodes. Further, the roles of the master and the slave can be changed in some cases between messages (i.e., after transmission of STOP). In the present embodiment, in which a camera is implemented, unidirectional transmission may be used to capture an image from a sensor and transmit such image data to a memory in a baseband processor. Meanwhile, control data may be exchanged between the baseband processor and the sensor as well as other peripheral devices.

In one instance, a camera control interface (CCI) protocol may be used in some cases for such control data between the baseband processor and the image sensor (or one or multiple slave nodes). In one instance, the CCI protocol may be implemented via an I2C serial bus between the image sensor and the baseband processor. An existing I2C system, i.e., a camera control interface-based camera system uses a separate interrupt (IRQ) line for each slave device in order to enable the slave node to show to the master node that the slave node desires to use the bus.

Meanwhile, an I3C communication standard is a standard in which communication is performed via two signal lines of an SDA line to transmit data and an SCL line to transmit a clock signal. In this standard, devices (such as processor) are classified into a device that operates as a master or a slave and a device that operates only as a slave. For example, the processor operates as master or a slave, and the sensor operates only as a slave.

Here, the master is a device that controls the slave, and the slave is a device that operates under the control of the master. In addition, in the I3C, multiple slaves can be coupled to one master. In addition, multiple masters can transmit signals to one slave; this communication is hereinafter referred to as “multi-master communication”. Further, communication can be performed between slaves without using a master; this communication is referred to as “peer-to-peer communication”. In addition, the slave is able to interrupt communication while the SDA line is in communication (busy) by communication of other devices in order to perform communication; this interruption is referred to as “in-band interrupt (In-Band Interrupt)”.

In the above-described multi-master communication, in-band interrupt, and peer-to-peer communication, there is a possibility that signals transmitted simultaneously by the multiple devices may collide at the SDA line. For example, when a certain slave performs in-band interrupt to transmit a signal to a master while the master transmits a signal to another slave, the signal from the master and the signal from the slave collide undesirably. Therefore, the device in the I3C has a function of detecting the collision and arbitrating the devices.

Using the above-described interrupt function makes it possible to easily synchronize with the application processor 1212. Thus, executing the interrupt at a timing determined by the image sensor 1211 allows for transmission of nonce-related information in response to the timing determined by the image sensor 1211. However, the image sensor 1211 may trigger a read command by means of in-band interrupt to transmit a read response in response thereto, or may omit a read command by means of in-band interrupt to transmit a read response.

<Processing of Complete Arithmetic Value>

Description is given, with reference to FIGS. 92 to 95, of processing of a complete arithmetic value.

Figure 92:
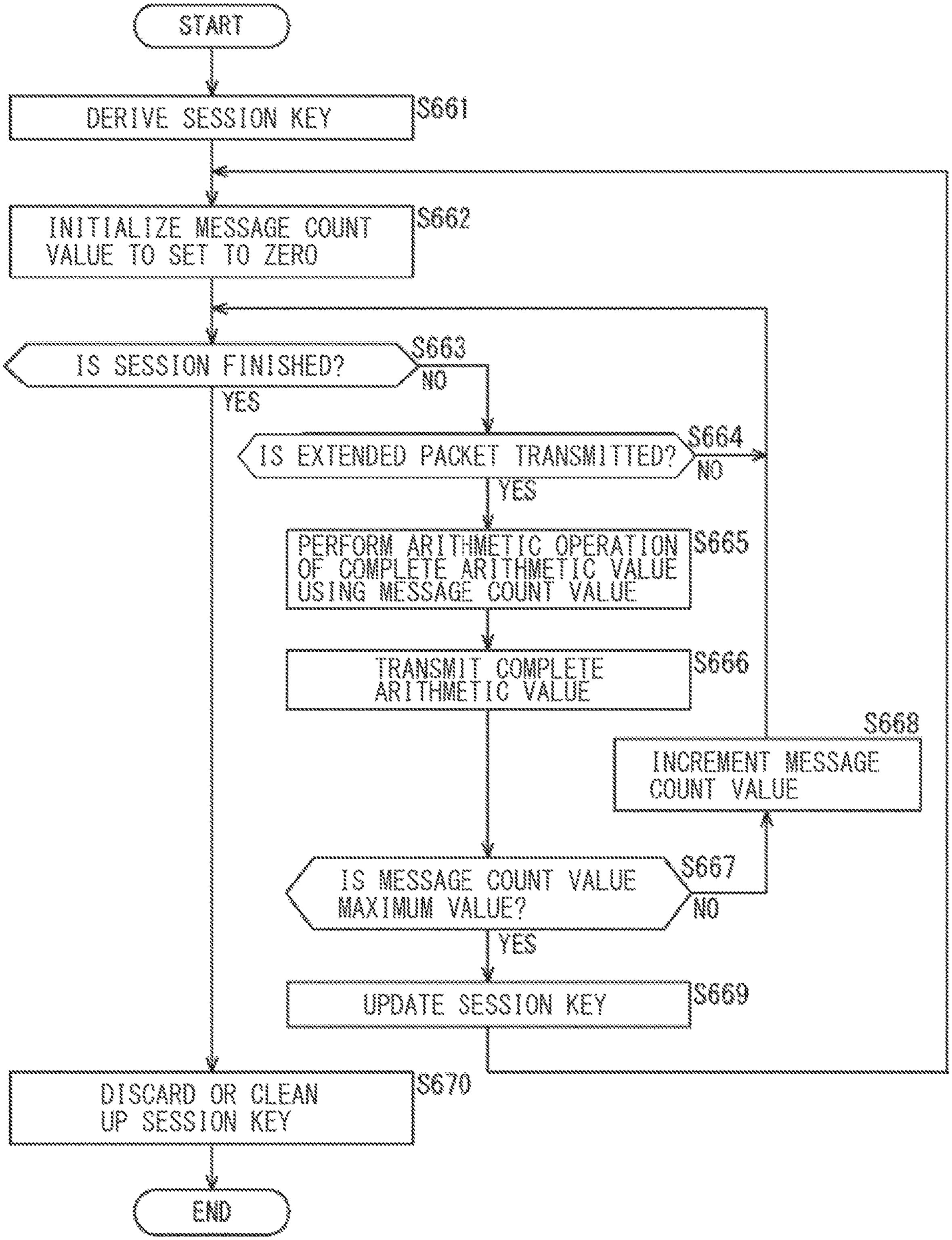
FIG. 92 is a flowchart describing a first processing example of processing of a complete arithmetic value.

FIG. 92 is a flowchart describing a first processing example of the processing of the complete arithmetic value in which the image sensor 1211 transmits the complete arithmetic value.

In step S661, the security section 1310 derives a session key.

In step S662, the message counter 1308 initializes a message count value to set to zero.

In step S663, the extension mode adaptive CSI-2 transmission circuit 1304 determines whether or not to finish the session; in a case where determination is made not to finish the session, the processing proceeds to step S664.

In step S664, the extension mode adaptive CSI-2 transmission circuit 1304 determines whether or not to transmit an extended packet.

In a case where the extension mode adaptive CSI-2 transmission circuit 1304 determines in step S664 not to transmit the extended packet, the processing returns to step S663, and subsequently similar processing is repeatedly performed. Meanwhile, in a case where the extension mode adaptive CSI-2 transmission circuit 1304 determines in step S664 to transmit the extended packet, the processing proceeds to step S665.

In step S665, the security section 1310 uses the message count value to perform an arithmetic operation of the complete arithmetic value.

In step S666, the extension mode adaptive CSI-2 transmission circuit 1304 arranges the complete arithmetic value calculated in step S665 in the extended packet, and transmits the extended packet.

In step S667, the message counter 1308 determines whether or not the message count value has been counted up to the maximum value. In a case where the message counter 1308 determines in step S667 that the message count value has not been counted up to the maximum value, the processing proceeds to step S668.

In step S668, the message counter 1308 increments the message count value. Thereafter, the processing returns to step S663, and subsequently similar processing is repeatedly performed.

Meanwhile, in a case where the message counter 1308 determines in step S667 that the message count value has been counted up to the maximum value, the processing proceeds to step S669. In step S669, the security section 1310 updates the session key, and then the processing returns to step S662; hereinafter, similar processing is repeatedly performed.

Then, in a case where the extension mode adaptive CSI-2 transmission circuit 1304 determines in step S663 to finish the session, the processing proceeds to step S670.

In step S670, the security section 1310 discards or cleans up the session key, and thereafter the processing is finished.

In this manner, in a case where a MAC value for each image line is subject to an arithmetic operation and stored in the extended packet footer for transmission, the message count value is incremented by one every time the extended packet is transmitted, and thus the message count value is cycled at $2^{16}$ times. For example, in a case where 4K data of the number of pixels of 4096×2160 (horizontal×vertical) is transmitted at a frame rate of 60 fps, when assuming that a 2163-line extended packet acquired by adding three lines of the frame start, the embedded data, and the frame end is transmitted in one frame, the message count value is cycled in $(2^{16})/(60\times2163)\approx0.5$ seconds.

For example, in a case where the image sensor 1211 uses the same initialization vector value, with the same session key, to perform an arithmetic operation of a MAC value such as Galois Message Authentication Code (GMAC) value of the message for transmission of the message and the MAC value, an attacker is able to easily obtain the session key by calculating simultaneous equations for the MAC value and the message. In that case, the attacker is able to freely falsify the MAC value, thus enabling an attack such as a spoof message, falsification, or replay. Therefore, in a case where the message count value is used as a variable portion of the initialization vector, i.e., a nonce value, it is necessary to update the session key until the message count value is cycled. For example, it is sufficient for the session key to be updated until the nonce value is cycled (rolled over) by using the frame blanking or line blanking period.

Figure 93:
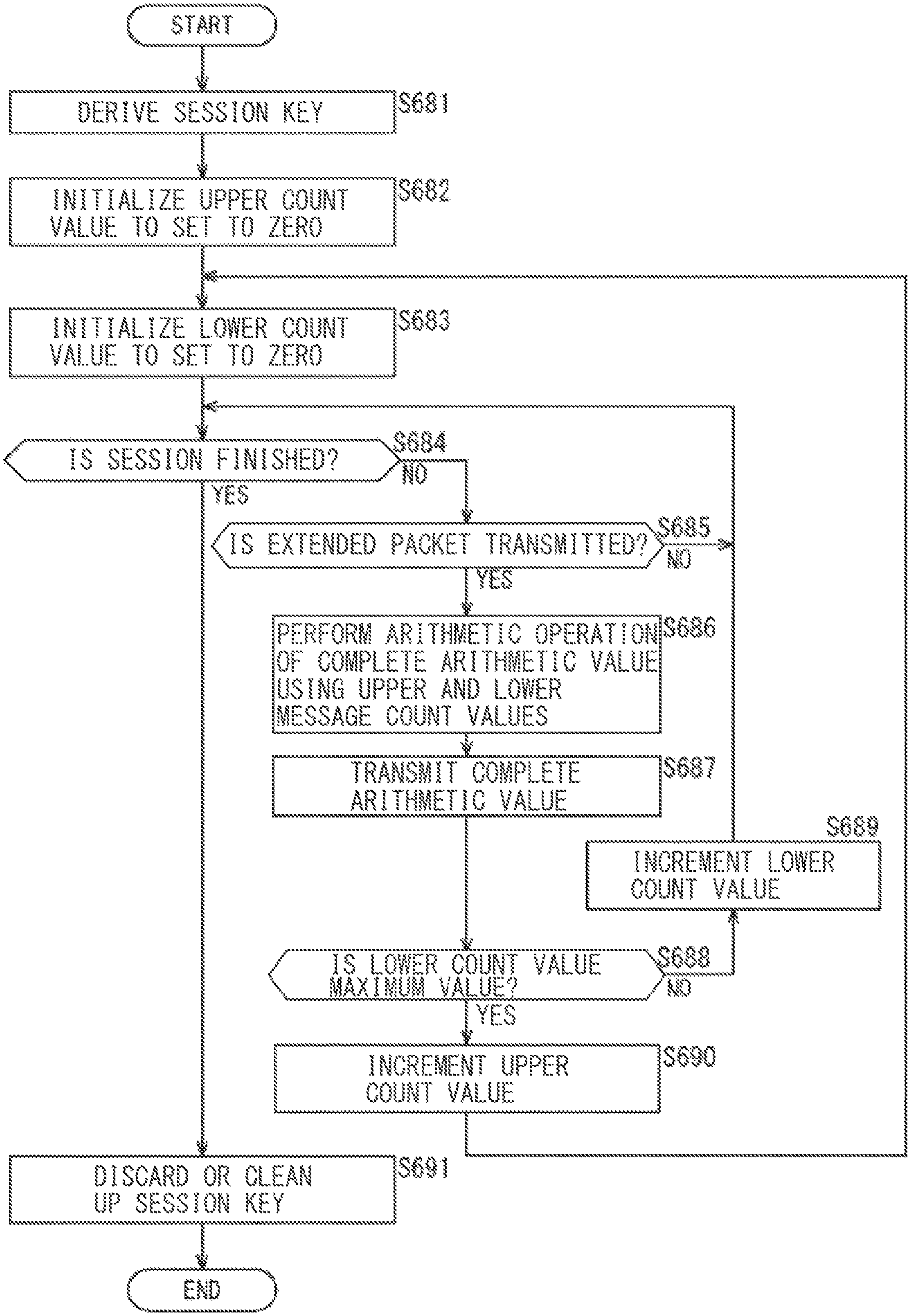
FIG. 93 is a flowchart describing a second processing example of the processing of the complete arithmetic value.

FIG. 93 is a flowchart describing a second processing example of the processing of the complete arithmetic value in which the image sensor 1211 transmits the complete arithmetic value.

In step S681, the security section 1310 derives a session key.

In step S682, the message counter 1308 initializes the upper count value of the message count value to set to zero.

In step S683, the message counter 1308 initializes the lower count value of the message count value to set to zero.

In step S684, the extension mode adaptive CSI-2 transmission circuit 1304 determines whether or not to finish the session; in a case where determination is made not to finish the session, the processing proceeds to step S685.

In step S685, the extension mode adaptive CSI-2 transmission circuit 1304 determines whether or not to transmit an extended packet.

In a case where the extension mode adaptive CSI-2 transmission circuit 1304 determines in step S685 not to transmit the extended packet, the processing returns to step S684, and subsequently similar processing is repeatedly performed. Meanwhile, in a case where the extension mode adaptive CSI-2 transmission circuit 1304 determines in step S685 to transmit the extended packet, the processing proceeds to step S686.

In step S686, the security section 1310 uses the upper count value and the lower count value of the message count value to perform an arithmetic operation of the complete arithmetic value.

In step S687, the extension mode adaptive CSI-2 transmission circuit 1304 arranges the complete arithmetic value calculated in step S686 in the extended packet, and transmits the extended packet.

In step S688, the message counter 1308 determines whether or not the lower count value of the message count value has been counted up to the maximum value. In a case where the message counter 1308 determines in step S688 that the lower count value of the message count value has not been counted up to the maximum value, the processing proceeds to step S689.

In step S689, the message counter 1308 increments the lower count value of the message count value. Thereafter, the processing returns to step S684, and subsequently similar processing is repeatedly performed.

Meanwhile, in a case where the message counter 1308 determines in step S688 that the lower count value of the message count value has been counted up to the maximum value, the processing proceeds to step S690. In step S690, the message counter 1308 increments the upper count value of the message count value, and then the processing returns to step S683; hereinafter, similar processing is repeatedly performed.

Then, in a case where the extension mode adaptive CSI-2 transmission circuit 1304 determines in step S684 to finish the session, the processing proceeds to step S691.

In step S691, the security section 1310 discards or cleans up the session key, and thereafter the processing is finished.

In this manner, in a case where the message count value is used as a portion of the initialization vector, i.e., a portion of the nonce value (e.g., lower count value), the remainder of the nonce value (e.g., upper count value) may also be used together to thereby eliminate the need for updating the session key or reduce the frequency of updating the session key.

For example, in a case where 4K data of the number of pixels of 4096×2160 (horizontal x vertical) is transmitted at a frame rate of 60 fps, in order for the nonce value to be cycled, it takes:

$2^{32}\div60\div2163\approx9$ hours when a 16-bit width upper count value is used together $2^{6}\div60\div2163\approx6$ days when a 20-bit width upper count value is used together $2^{40}\div60\div2163\approx98$ days when a 24-bit width upper count value is used together $2^{44}\div60\div2163\approx4$ years when a 28-bit width upper count value is used together $2^{48}\div60\div2163\approx69$ years when a 32-bit width upper count value is used together.

Here, in a case where the image sensor 1211 or the application processor 1212 is powered on again (turned ON after OFF), the key needs to be exchanged before retransmission of protected image data, and thus the session key is updated accordingly. For example, in a typical application to vehicle installation, the possibility of not being powered on again for 6 days or more is low, and the possibility of not being powered on again for 4 years or more is extremely low, and thus it is sufficient for the upper count value to have a width of 20 bits to 8 bits. It is needless to say that this is not limitative; other higher bit widths may be used.

For example, it is sufficient for a vehicle of a refueling type to turn the power OFF during refueling. Even for a vehicle of the refueling type or a recharging type, when the power is turned OFF during inspection of the vehicle, the key needs to be exchanged before retransmission of the protected image data, and thus the session key is updated accordingly. For example, in a case where an image sensor for IoT (Internet of Things or Intelligence of Things) is envisaged, it is assumed that the power is not turned on again, and thus it is sufficient for the upper count value to have a width of 32 bits. It is needless to say that this is not limitative; other higher bit widths may be used.

Figure 94:
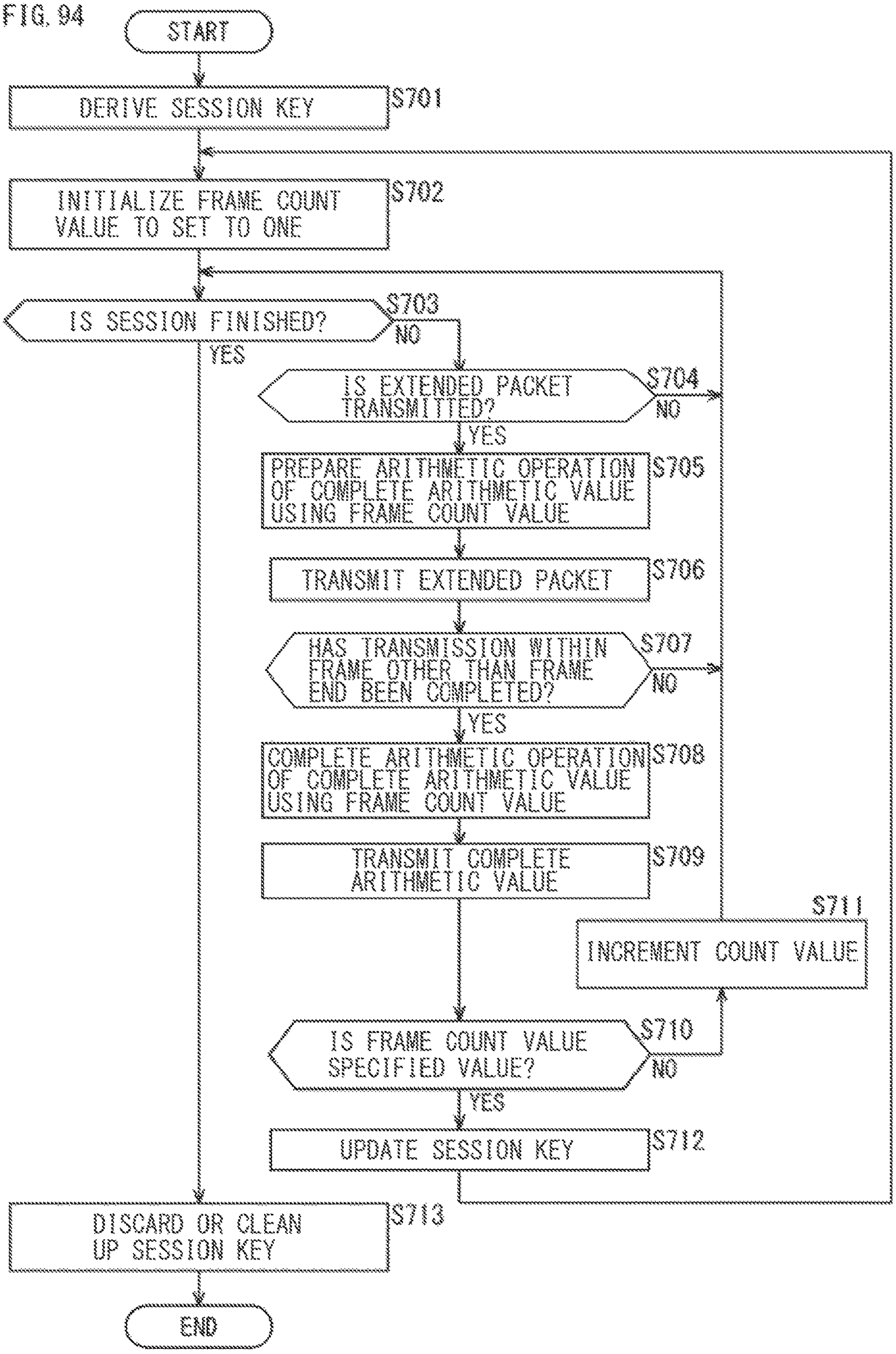
FIG. 94 is a flowchart describing a third processing example of the processing of the complete arithmetic value.

FIG. 94 is a flowchart describing a third processing example of the processing of the complete arithmetic value in which the image sensor 1211 transmits the complete arithmetic value.

In step S701, the security section 1310 derives a session key.

In step S702, the message counter 1308 initializes a frame count value to set to one.

In step S703, the extension mode adaptive CSI-2 transmission circuit 1304 determines whether or not to finish the session; in a case where determination is made not to finish the session, the processing proceeds to step S704.

In step S704, the extension mode adaptive CSI-2 transmission circuit 1304 determines whether or not to transmit an extended packet.

In a case where the extension mode adaptive CSI-2 transmission circuit 1304 determines in step S704 not to transmit the extended packet, the processing returns to step S703, and subsequently similar processing is repeatedly performed. Meanwhile, in a case where the extension mode adaptive CSI-2 transmission circuit 1304 determines in step S704 to transmit the extended packet, the processing proceeds to step S705.

In step S705, the security section 1310 prepares an arithmetic operation of the complete arithmetic value to be performed using the frame count value.

In step S706, the extension mode adaptive CSI-2 transmission circuit 1304 transmits the extended packet.

In step S707, the extension mode adaptive CSI-2 transmission circuit 1304 determines whether or not transmission other than that of the frame end in the frame has been completed. In a case where the extension mode adaptive CSI-2 transmission circuit 1304 determines in step S707 that the transmission other than that of the frame end in the frame has not been completed, the processing returns to step S703, and subsequently similar processing is repeatedly performed. Meanwhile, in a case where the extension mode adaptive CSI-2 transmission circuit 1304 determines in step S707 that the transmission other than that of the frame end in the frame has been completed, the processing proceeds to step S708.

In step S708, the security section 1310 completes the arithmetic operation of the complete arithmetic value to be performed using the frame count value.

In step S709, the extension mode adaptive CSI-2 transmission circuit 1304 transmits the complete arithmetic value together with the frame end.

In step S710, the message counter 1308 determines whether or not the frame count value has been counted up to a specified value. In a case where the message counter 1308 determines in step S710 that the frame count value has not been counted up to the specified value, the processing proceeds to step S711.

In step S711, the message counter 1308 increments the frame count value. Thereafter, the processing returns to step S703, and subsequently similar processing is repeatedly performed.

Meanwhile, in a case where the message counter 1308 determines in step S710 that the frame count value has been counted up to the specified value, the processing proceeds to step S712. In step S712, the security section 1310 updates the session key, and then the processing returns to step S702; hereinafter, similar processing is repeatedly performed.

Then, in a case where the extension mode adaptive CSI-2 transmission circuit 1304 determines in step S703 to finish the session, the processing proceeds to step S713.

In step S713, the security section 1310 discards or cleans up the session key, and thereafter the processing is finished.

In this manner, the image sensor 1211 may perform an arithmetic operation of the complete arithmetic value for each image frame for collective transmission. The complete arithmetic value in this case is stored, subsequent to the image data, in the embedded data, the user-defined data or the read response, for transmission.

The frame start or the frame end may include, for example, a 16-bit frame number. The fame number may be the same between the frame end and the frame start corresponding to a predetermined frame. In a case where the 16-bit frame number is used, the frame number does not function; in order to distinguish it from the use case of being set to and remaining zero, non-zero is desirable, but this is not limitative.

The frame number is incremented by one or two for each frame start packet having the same virtual channel, and is reset to one periodically. For example, in a case where the image frame is masked (i.e., not transmitted) due to corruption, the frame number may be incremented by two.

In order to adapt to such a case, the increment of one or two may be freely present as needed in a mixed manner in the sequence of frame numbers. That is, in a case where an increment is made by one, the frame number is cycled at $2^{16}-1$ times. In addition, in a case where the frame rate is 60 fps, the frame number is cycled in $(2^{16}-1)\div 60\approx 18$ minutes.

For example, in a case where the image sensor 1211 uses the same initialization vector value, with the same session key, to perform an arithmetic operation of a MAC value such as Galois Message Authentication Code (GMAC) value of the message for transmission of the message and the MAC value, an attacker is able to easily obtain the session key by calculating simultaneous equations for the MAC value and the message. In that case, the attacker is able to freely falsify the MAC value, thus enabling an attack such as a spoof message, falsification, or replay.

Therefore, in a case where the frame number is used as an initialization vector, i.e., a nonce value, it is necessary to update the session key until the frame number is cycled. For example, it is sufficient for the session key to be updated until the nonce value is cycled (rolled over) by using the frame blanking or line blanking period.

Figure 95:
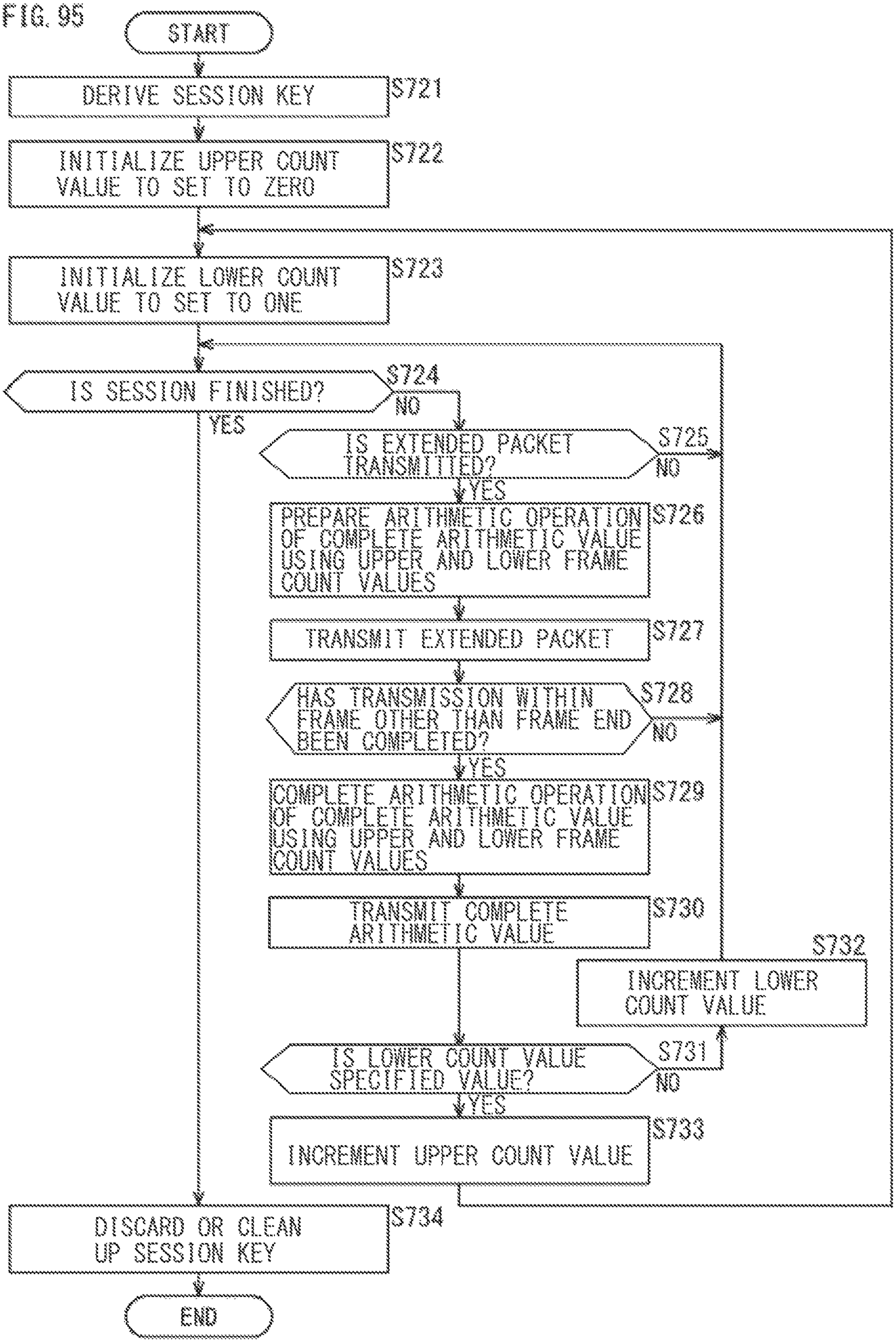
FIG. 95 is a flowchart describing a fourth processing example of the processing of the complete arithmetic value.

FIG. 95 is a flowchart describing a fourth processing example of the processing of the complete arithmetic value in which the image sensor 1211 transmits the complete arithmetic value.

In step S721, the security section 1310 derives a session key.

In step S722, the message counter 1308 initializes the upper count value of the frame count value to set to zero.

In step S723, the message counter 1308 initializes the lower count value of the frame count value to set to one.

In step S724, the extension mode adaptive CSI-2 transmission circuit 1304 determines whether or not to finish the session; in a case where determination is made not to finish the session, the processing proceeds to step S725.

In step S725, the extension mode adaptive CSI-2 transmission circuit 1304 determines whether or not to transmit an extended packet.

In step S725, in a case where the extension mode adaptive CSI-2 transmission circuit 1304 determines not to transmit the extended packet, the processing returns to step S724, and subsequently similar processing is repeatedly performed.

Meanwhile, in a case where the extension mode adaptive CSI-2 transmission circuit 1304 determines in step S725 to transmit the extended packet, the processing proceeds to step S726.

In step S726, the security section 1310 prepares an arithmetic operation of the complete arithmetic value to be performed using the upper count value and the lower count value of the frame count value.

In step S727, the extension mode adaptive CSI-2 transmission circuit 1304 transmits the extended packet.

In step S728, the extension mode adaptive CSI-2 transmission circuit 1304 determines whether or not transmission other than that of the frame end in the frame has been completed. In a case where the extension mode adaptive CSI-2 transmission circuit 1304 determines in step S728 that the transmission other than that of the frame end in the frame has not been completed, the processing returns to step S724, and subsequently similar processing is repeatedly performed. Meanwhile, in a case where the extension mode adaptive CSI-2 transmission circuit 1304 determines in step S728 that the transmission other than that of the frame end in the frame has been completed, the processing proceeds to step S729.

In step S729, the security section 1310 completes the arithmetic operation of the complete arithmetic value to be performed using the upper count value and the lower count value of the frame count value.

In step S730, the extension mode adaptive CSI-2 transmission circuit 1304 transmits the complete arithmetic value together with the frame end.

In step S731, the message counter 1308 determines whether or not the lower count value of the frame count value has been counted up to the specified value. In a case where the message counter 1308 determines in step S731 that the lower count value of the frame count value has not been counted up to the specified value, the processing proceeds to step S732.

In step S732, the message counter 1308 increments the lower count value of the frame count value. Thereafter, the processing returns to step S724, and subsequently similar processing is repeatedly performed.

Meanwhile, in a case where the message counter 1308 determines in step S731 that the lower count value of the frame count value has been counted up to the specified value, the processing proceeds to step S733. In step S733, the security section 1310 increments the upper count value of the frame count value, and then the processing returns to step S723; hereinafter, similar processing is repeatedly performed.

Then, in a case where the extension mode adaptive CSI-2 transmission circuit 1304 determines in step S724 to finish the session, the processing proceeds to step S734.

In step S734, the security section 1310 discards or cleans up the session key, and thereafter the processing is finished.

In this manner, in a case where the frame number is used as a portion of the initialization vector, i.e., a portion of the nonce value (e.g., lower count value), the remainder of the nonce value (e.g., upper count value) may also be used together to thereby eliminate the need for updating the session key or reduce the frequency of updating the session key.

For example, in the case of increment by one at 60 fps, in order for the nonce value to be cycled, it takes:

$2^4\times(2^{16}-1)\div60\approx5$ hours when a 4-bit width upper count value is used together $2^8\times(2^{16}-1)\div60\approx78$ hours when an 8-bit width upper count value is used together $2^2\times(2^{16}-1)\div60\approx52$ days when a 12-bit width upper count value is used together $2^{16}\times(2^{16}-1)\div60\approx828$ days when a 16-bit width upper count value is used together $2^{20}\times(2^{16}-1)\div60\approx36$ years when a 20-bit width upper count value is used together $2^{24}\times(2^{16}-1)\div60\approx581$ years when a 24-bit width upper count value is used together.

Here, in a case where the image sensor 1211 or the application processor 1212 is powered on again (turned ON after OFF), the key needs to be exchanged before retransmission of protected image data, and thus the session key is updated accordingly. For example, in a typical application to vehicle installation, the possibility of not being powered on again for 3 days or more is low, and the possibility of not being powered on again for 2 years or more is extremely low, and thus it is sufficient for the upper count value to have a width of 8 bits to 6 bits. It is needless to say that this is not limitative; other higher bit widths may be used.

For example, it is sufficient for a vehicle of a refueling type to turn the power OFF during refueling. Even for a vehicle of the refueling type or a recharging type, when the power is turned OFF during inspection of the vehicle, the key needs to be exchanged before retransmission of the protected image data, and thus the session key is updated accordingly. For example, in a case where an image sensor for IoT (Internet of Things or Intelligence of Things) is envisaged, it is assumed that the power is not turned on again, and thus it is sufficient for the upper count value to have a width of 20 bits to 4 bits. It is needless to say that this is not limitative; other higher bit widths may be used.

<Encryption and Decryption>

Description is given, with reference to FIGS. 96 to 100, of encryption and decryption.

Figure 96:
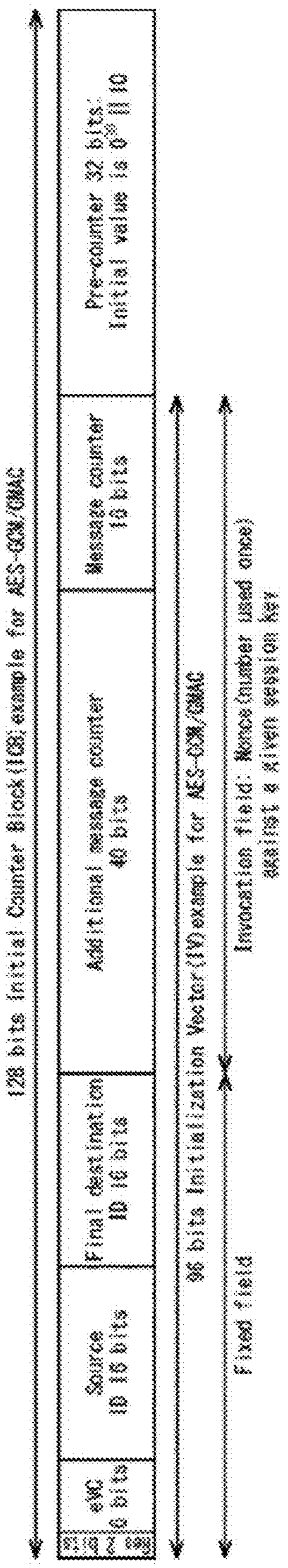
FIG. 96 is a diagram illustrating an example of an initial counter block in which an initialization vector is stored.

FIG. 96 illustrates an example of an initial counter block in which the initialization vector is stored.

As illustrated in FIG. 96, commonalizing an initialization vector structure and employing different values between virtual channels enable easier installation. In addition, a common session key or count value is used between CSI-2 virtual channels.

A 128-bit initialization counter block is used for encryption or message authentication by AES (Advanced Encryption Standard)-GCM (Galois/CounterMode) or AES-GMAC (Galois Message Authentication Code).

Figure 97:
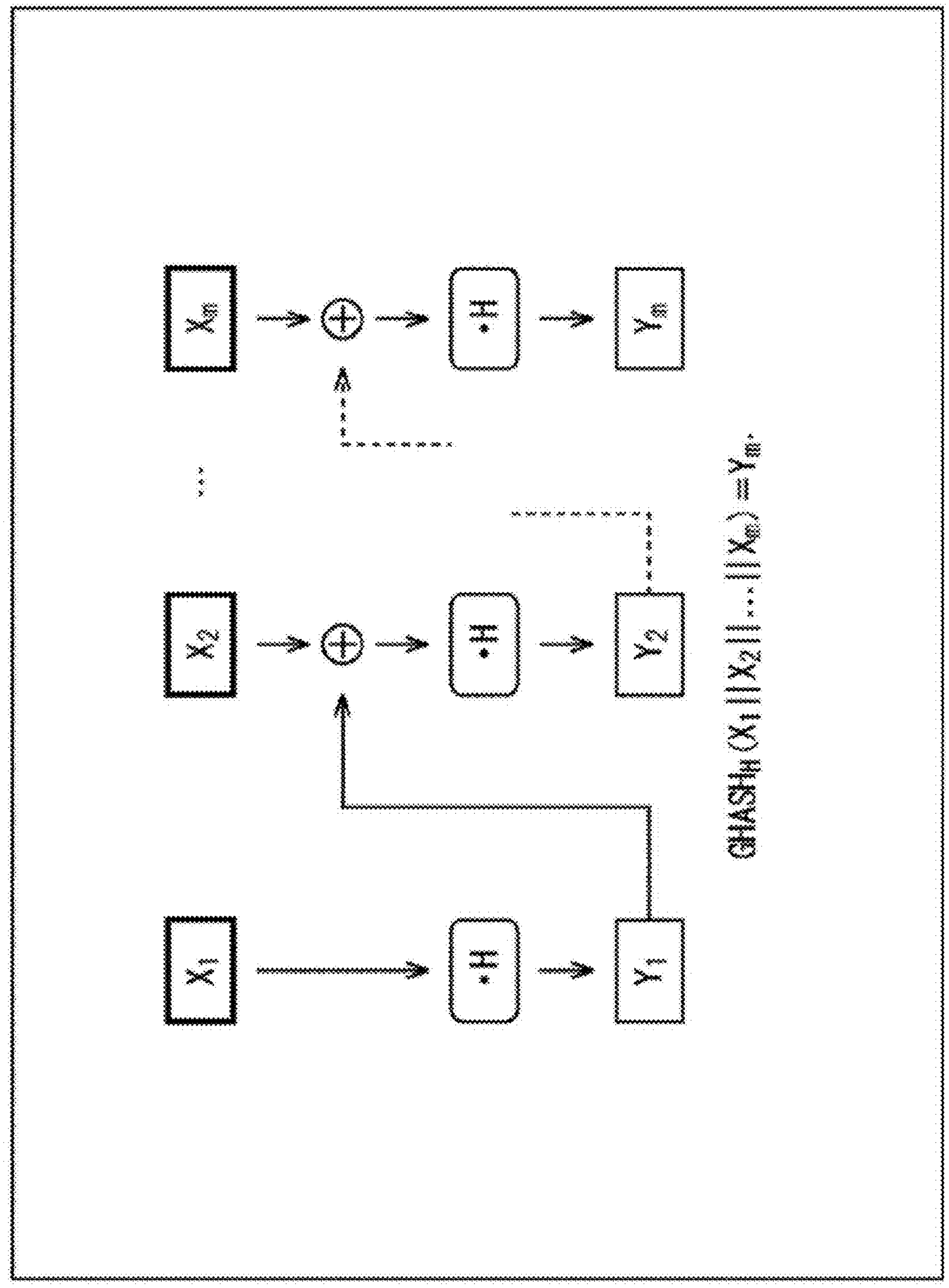
FIG. 97 is a diagram illustrating a GHASH function.
Figure 98:
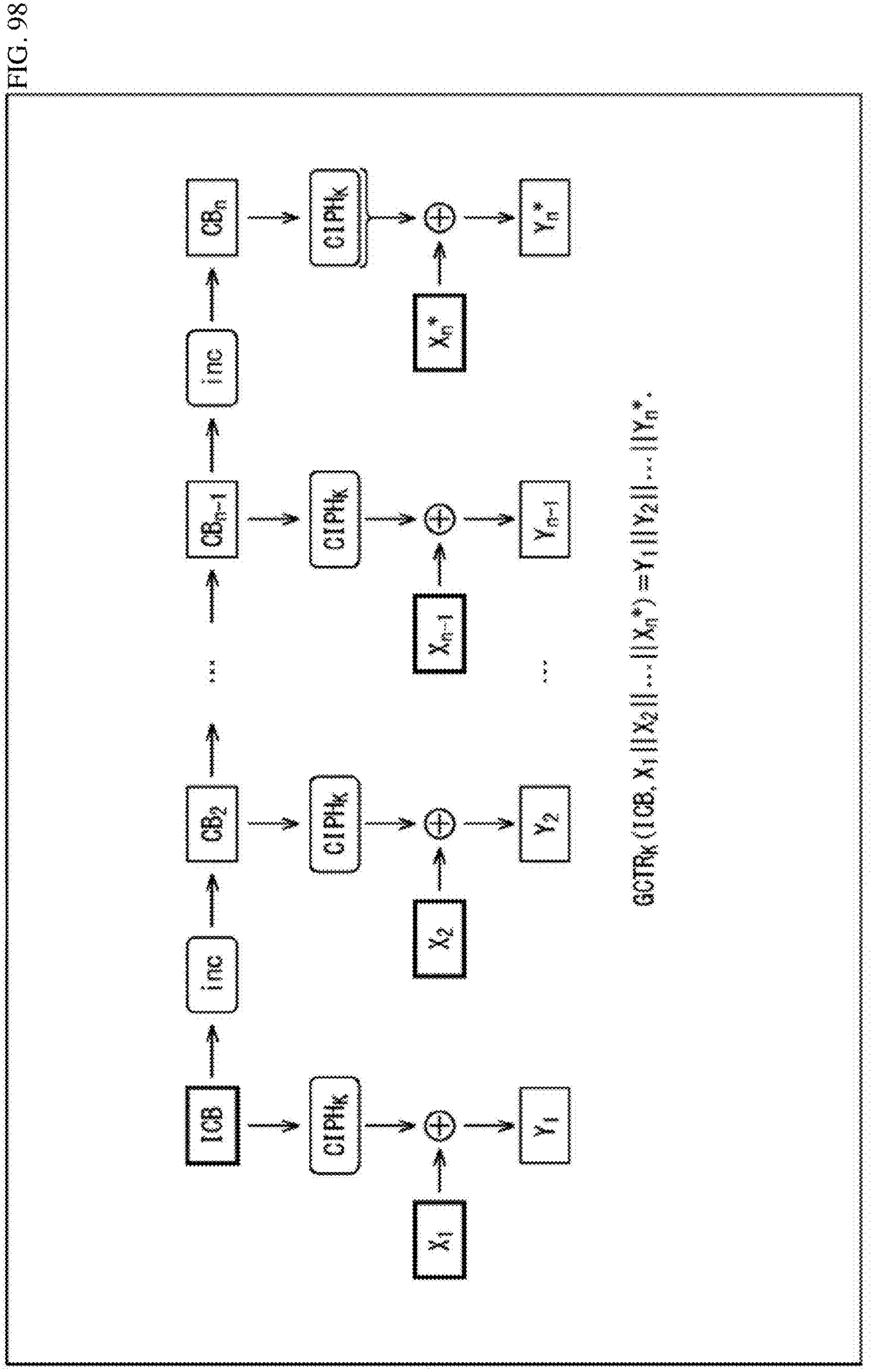
FIG. 98 is a diagram illustrating a GCTR function.

For example, for encryption of the initial counter block, a GHASH function as illustrated in FIG. 97, a GCTR function as illustrated in FIG. 98, or the like can be used.

Figure 99:
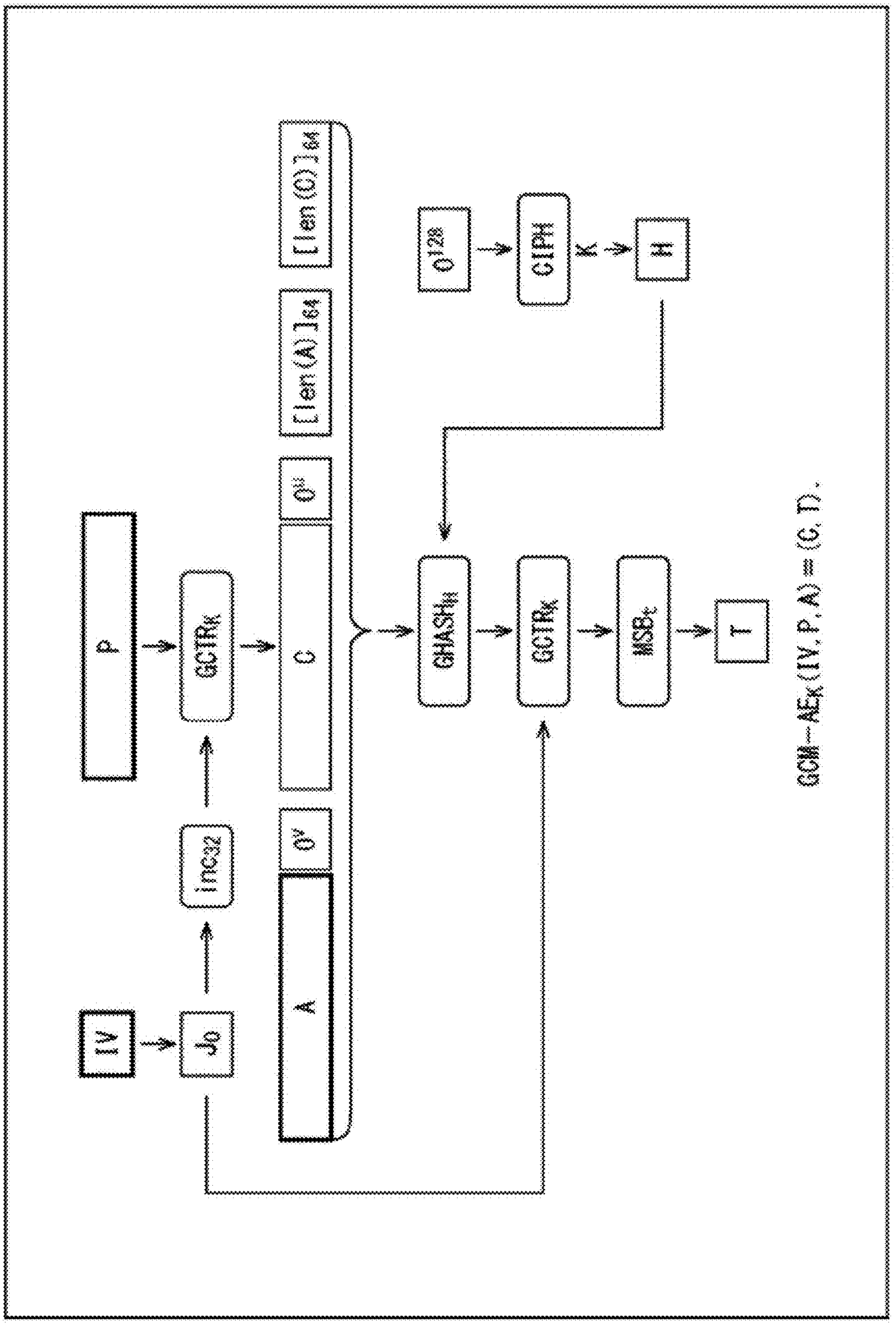
FIG. 99 is a diagram illustrating a GCM-AE function.
Figure 100:
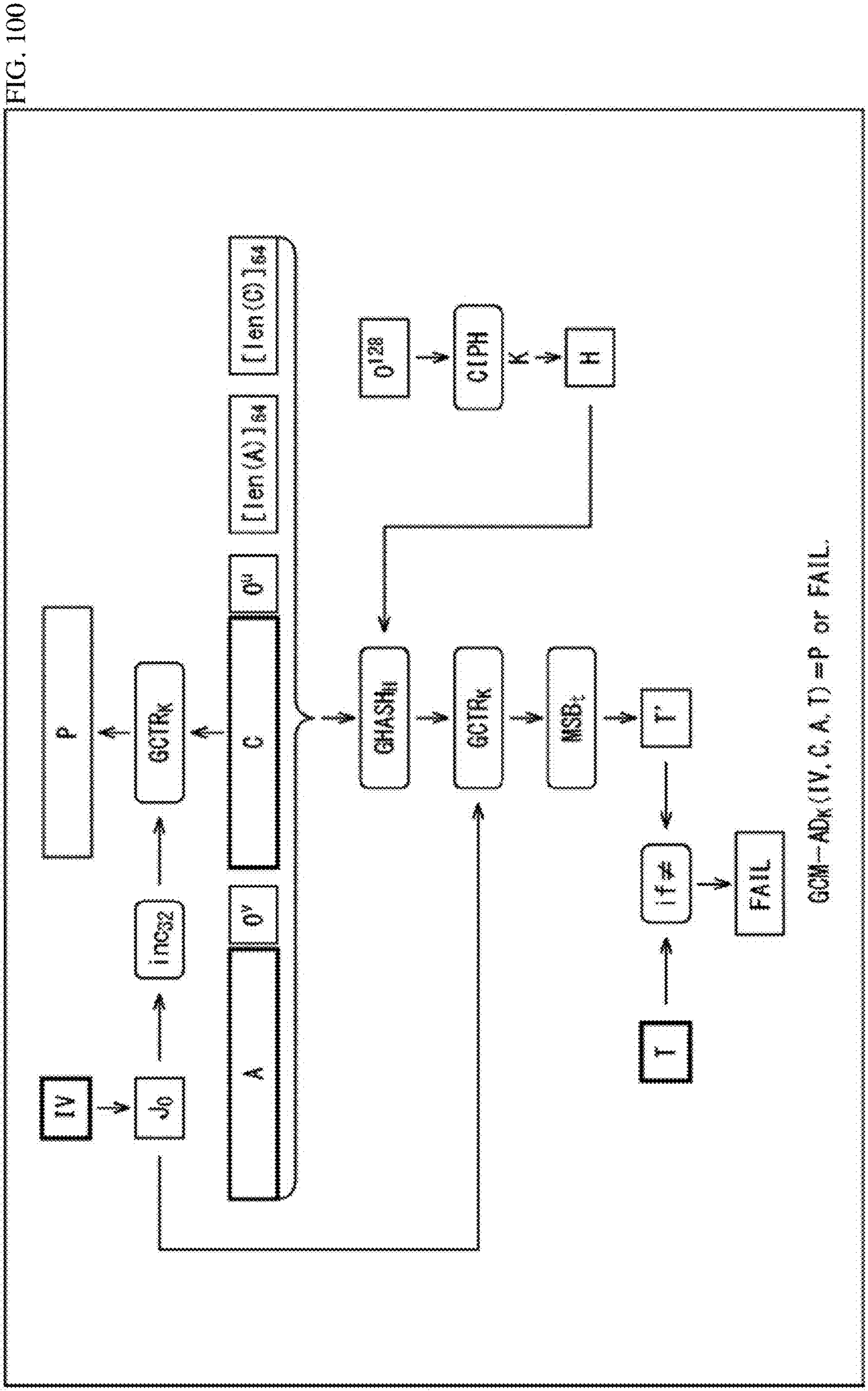
FIG. 100 is a diagram illustrating a GCM-AD function.

The initialization vector is used for encryption using a GCM-AE (Authentication Encryption) function having an authenticated encryption function as illustrated in FIG. 99 and for decryption using a GCM-AD (Authenticated Decryption) function having an authenticated decryption function as illustrated in FIG. 100. However, the initialization vector may be limited to a function of one of the encryption (decryption) or the message authentication when being used.

For example, when an initialization vector IV, a clear text P, and an additional authentication data A are inputted to the GCM-AE function, the clear text P is encrypted; as a result, an encrypted text C and an authentication tag T are outputted.

Meanwhile, when the initialization vector IV, the encrypted text C, the additional authentication data A, and the authentication tag T are inputted to the GCM-AD function, the encrypted text C is decrypted, and the clear text P is outputted; in a case where the authentication tag T and an authentication tag T' are not consistent with each other, a result (FAIL) indicating that the authentication has failed is outputted.

<First Transmission Method of Complete Arithmetic Value>

Description is given, with reference to FIGS. 101 to 105, of a first transmission method of a complete arithmetic value MAC.

Figure 101:
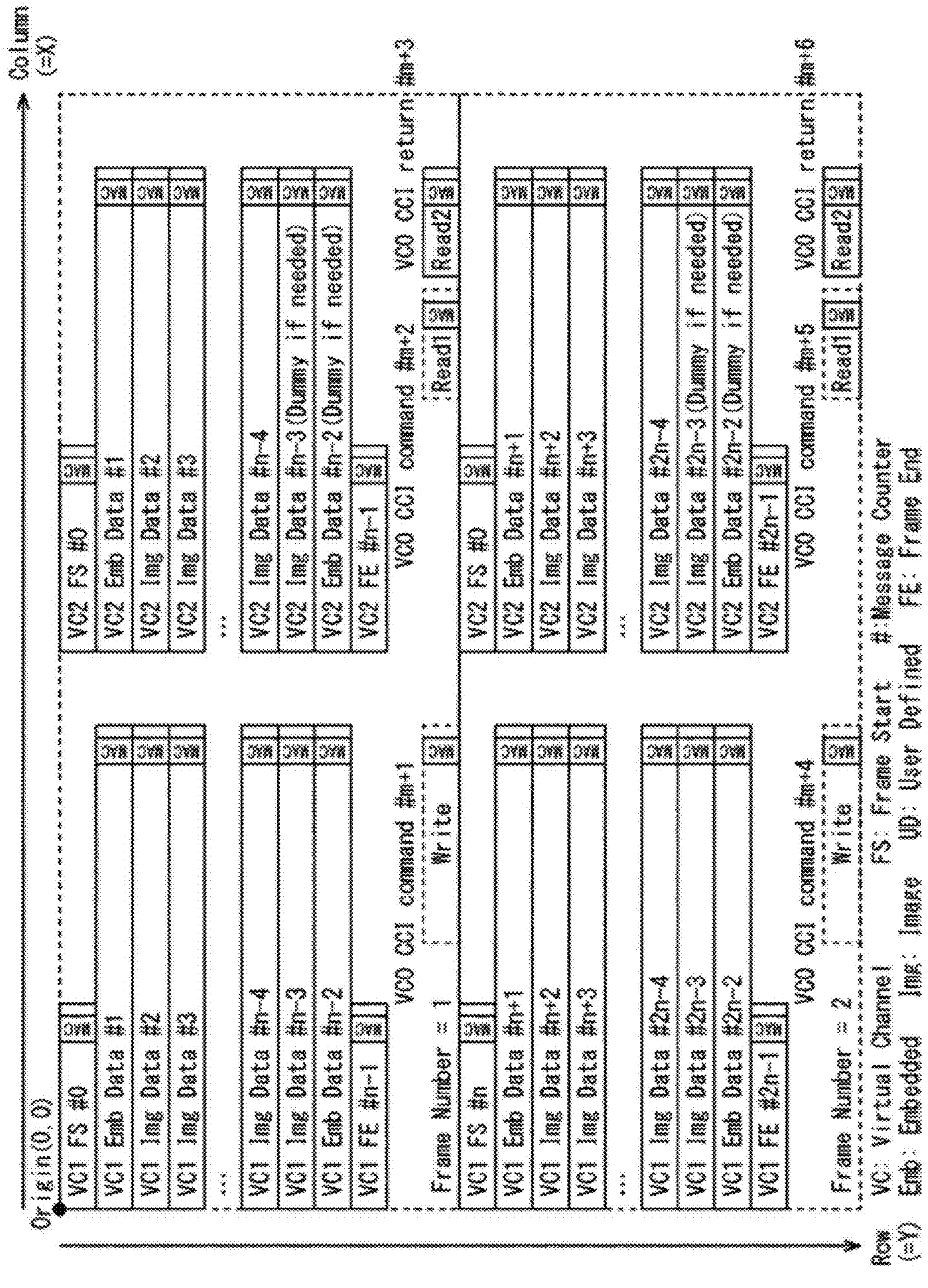
FIG. 101 is a diagram illustrating an example of a data structure of image data in which a complete arithmetic value MAC is transmitted for each line.

FIG. 101 illustrates a data structure of image data in which the complete arithmetic value MAC is transmitted for each line. The transmission method to transmit the complete arithmetic value MAC value for each line in this manner is hereinafter referred to as a line-MAC method, as appropriate As illustrated, the complete arithmetic value MAC is transmitted, for each CSI-2 line, for each CCI command, or for each CCI return. In this manner, in a case where initialization vector values are the same therebetween, more session keys are necessary.

For example, it is assumed that using the same initialization vector and the same session key may be a cause of falsification of the complete arithmetic value MAC.

Therefore, for the same initialization vector, it is proposed to use the total of four respective session keys for VC0 command, VC0 return, VC1, and VC2.

Meanwhile, it is proposed to use three or fewer session keys for different initialization vectors.

In the first case, an uplink-oriented first session key is used in the VC0 command, and a downlink-oriented second session key is used in the VC0 return, the VC1, and the VC2. In the second case, a CCI-oriented first session key is used in the VC0, and a CSI-2-oriented second session key is used in the VC1 and the VC2. In the third case, one session key for being oriented to all of them is used in the VC0, the VC1, and the VC2.

In addition, the total of two message count values are used. The message count value common to the CSI-2 is used between the VC1 and the VC2, and the message count value independent in the CCI is used in the VC0.

It is to be noted that, although the example is illustrated in which a common message counter is used between CSI-2 virtual channels, independent message counters may be used between the CSI-2 virtual channels. In that case, it is sufficient for a portion of the flowchart to be deleted. In addition, in that case, the message counters may be synchronized or asynchronous between the CSI-2 virtual channels. For example, it is desirable to commonalize message counters from the viewpoint of implementation efficiency in some cases, and it is desirable to cause message counters to be independent of each other from the viewpoint of safety in some cases.

Figure 102:
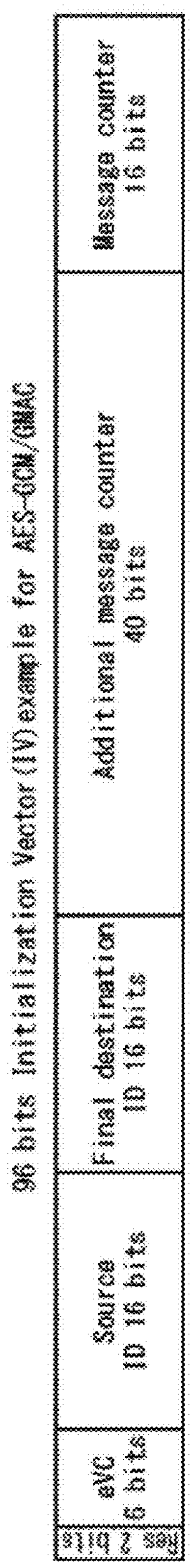
FIG. 102 is a diagram illustrating an example of an initialization vector.
Figure 103:
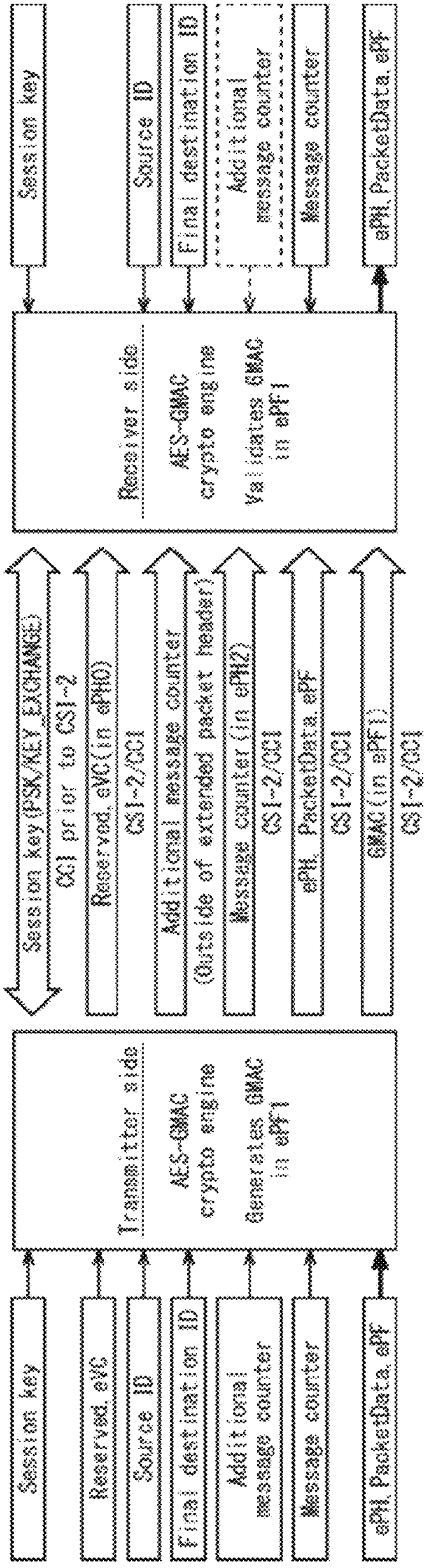
FIG. 103 is a diagram illustrating an example of transmission of an initialization vector from a transmission side to a reception side.

For example, the initialization vector of the structure illustrated in FIG. 102 is common to all the virtual channels (CSI-2 and CCI). Then, some or all of the initialization vectors are transmitted from a transmission side to the reception side as illustrated in FIG. 103. It is to be noted that a specified value (e.g., $0^2$, $1^2$) may be used as Reserved (Res) 2 bits. In addition, a pre-exchanged value may be used as the Source ID or a Final Destination ID. In addition, the reception side may use values grasped on the reception side, instead of values transmitted from the transmission side to the reception side, as some or all of the initialization vectors. In addition, in a case where some or all of the initialization vectors are transmitted from the transmission side to the reception side, it is desirable that some or all of the initialization vectors be transmitted without being encrypted (in clear text); however, this is not limitative.

FIG. 103 illustrates an example in which an additional message count value is stored outside the extended packet header for transmission, but the additional message count value and the message count value may be stored outside the extended packet header for transmission. In that case, the message count value may also be stored in the extended packet header for transmission. It is to be noted that the additional message count value may only be partially used. For example, in a case where the additional message count value in the initialization vector is 40 bits, the counter may have the actual additional message count value of 16 bits. The count value may be stored partially (e.g., 16 bits on LSB side) in the additional message count value in the initialization vector, and the specified value (e.g., $0^{24}$, $1^{24}$) may be stored in the remainder (e.g., 24 bits on MSB side) of the additional message count value in the initialization vector. In addition, as for all of the additional message count values in the initialization vector, the specified value (e.g., $0^{40}$, $1^{40}$) may be stored.

In addition, some or all of the initialization vectors transmitted from the image sensor 1211 to the application processor 1212 for setting are configured not to be transmitted from the image sensor 1211 to the application processor 1212, and may be set on the basis of pre-agreement, a register setting, or the like.

FIG. 104 illustrates an example of an extension format of the CSI-2 or the CCI.

For example, head bits (Reserved and eVC) or a quasi-head bit (eVC) of an essential extended packet header ePH0 are used as initialization vectors. Then, the application processor 1212 can start calculation of the GCTR function illustrated in FIG. 98 described above immediately after reception of the bits. That is, the transmission side and the reception side may be configured to be able to determine values of initialization vector components other than the eVC before transmission or reception of the value of the eVC.

Figure 105:
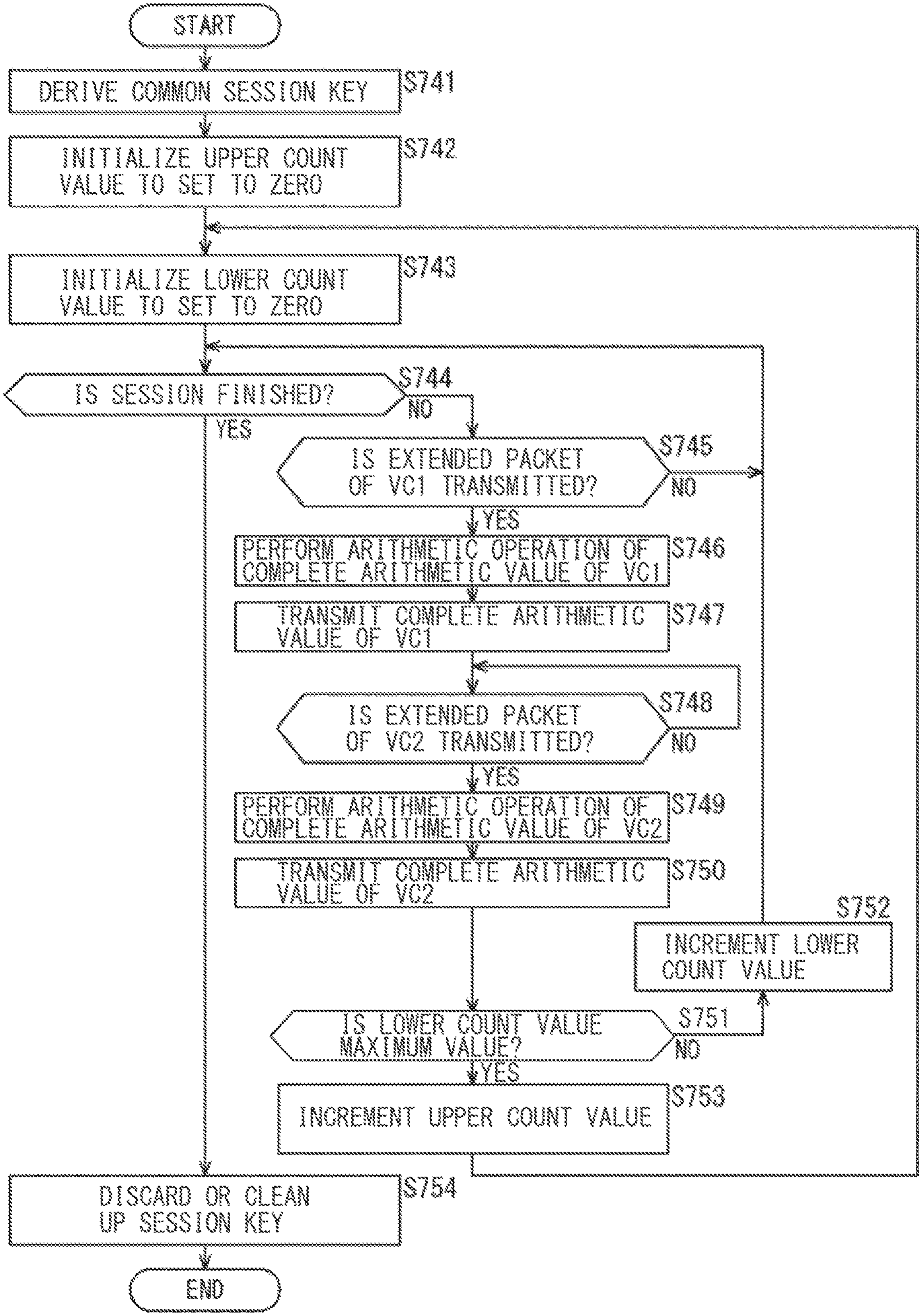
FIG. 105 is a flowchart describing transmission processing in a line-MAC method.

Description is given, with reference to a flowchart illustrated in FIG. 105, of transmission processing in a line-MAC method in which the image sensor 1211 transmits the complete arithmetic value MAC for each line.

In step S741, the security section 1310 derives a common session key.

In step S742, the message counter 1308 initializes the upper count value of the message count value to set to zero.

In step S743, the message counter 1308 initializes the lower count value of the message count value to set to zero.

In step S744, the extension mode adaptive CSI-2 transmission circuit 1304 determines whether or not to finish the session; in a case where determination is made not to finish the session, the processing proceeds to step S745.

In step S745, the extension mode adaptive CSI-2 transmission circuit 1304 determines whether or not to transmit an extended packet of the first virtual channel.

In a case where the extension mode adaptive CSI-2 transmission circuit 1304 determines in step S745 not to transmit the extended packet of the first virtual channel, the processing returns to step S744, and subsequently similar processing is repeatedly performed. Meanwhile, in a case where the extension mode adaptive CSI-2 transmission circuit 1304 determines in step S745 to transmit the extended packet of the first virtual channel, the processing proceeds to step S746.

In step S746, the security section 1310 performs an arithmetic operation of the complete arithmetic value of the first virtual channel using the common session key derived in step S741.

In step S747, the extension mode adaptive CSI-2 transmission circuit 1304 arranges the complete arithmetic value calculated in step S746 in the extended packet of the first virtual channel, and transmits the extended packet of the first virtual channel.

In step S748, the extension mode adaptive CSI-2 transmission circuit 1304 determines whether or not to transmit an extended packet of the second virtual channel, and waits for the processing until determination is made to transmit the extended packet of the second virtual channel. Then, in a case where the extension mode adaptive CSI-2 transmission circuit 1304 determines in step S748 to transmit the extended packet of the second virtual channel, the processing proceeds to step S749.

In step S749, the security section 1310 performs an arithmetic operation of the complete arithmetic value of the second virtual channel using the common session key derived in step S741.

In step S750, the extension mode adaptive CSI-2 transmission circuit 1304 arranges the complete arithmetic value calculated in step S749 in the extended packet of the second virtual channel, and transmits the extended packet of the second virtual channel.

In step S751, the message counter 1308 determines whether or not the lower count value of the message count value has been counted up to the maximum value.

In a case where the message counter 1308 determines in step S751 that the lower count value of the message count value has not been counted up to the maximum value, the processing proceeds to step S752. In step S752, the message counter 1308 increments the lower count value of the message count value, and then the processing returns to step S744; hereinafter, similar processing is repeatedly performed.

Meanwhile, in a case where the message counter 1308 determines in step S751 that the lower count value of the message count value has been counted up to the maximum value, the processing proceeds to step S753. In step S753, the message counter 1308 increments the upper count value of the message count value, and then the processing returns to step S743: hereinafter, similar processing is repeatedly performed.

Then, in a case where the extension mode adaptive CSI-2 transmission circuit 1304 determines in step S744 to finish the session, the processing proceeds to step S754.

In step S754, the security section 1310 discards or cleans up the common session key, and thereafter the processing is finished.

In this manner, the initialization vector configuration includes the extended virtual channel eVC or the virtual channel VC, thereby making it possible to commonalize the session key or the message counter among multiple types of CSI-2 virtual channels. In addition, it is possible to commonalize the session key between the CSI-2 and the CCI. It is to be noted that, in a case where the actual number of lines differs among the CSI-2 virtual channels, for example, unifying the number of lines using dummy data makes it possible to commonalize the message counter.

The processing described in FIG. 105 is an example in which the message count value is used as the lower count value and the additional message count value is used as the upper count value, and is an example in which there are two types of CSI-2 virtual channels.

Meanwhile, the initialization vector configuration may include an extended data type eDT or a data type DT. In that case, likewise, it is possible to commonalize the session key or the message counter among the multiple types of data.

It is to be noted that the Reserved, the extended virtual channel eVC, and the extended data type eDT are stored as head bits in CSI-2/CCI extension format example. Thus, when some or all thereof are received, the processor is able to start an arithmetic operation of ($CIPH_K$), a portion of GCTR arithmetic operation immediately. In addition, in a case where a frame configuration is agreed upon in advance between the image sensor 1211 and the application processor 1212, the application processor 1212 can omit the reception thereof and start the arithmetic operation of the ($CIPH_K$), a portion of the GCTR arithmetic operation. That is, these initialization vector configurations are advantageous from the viewpoint of arithmetic operation time.

It is to be noted that transmitting the additional message count value from the image sensor 1211 to the application processor 1212 enables the application processor 1212 to use this value for an initialization vector. Accordingly, the application processor 1212 may be configured not to be provided with the additional message counter from the viewpoint of implementation efficiency, or may be configured to be provided with the additional message counter from the viewpoint of safety. In addition, in a case where the application processor 1212 is configured to be provided with the additional message counter, the image sensor 1211 may be configured not to transmit the additional message count value. That is, in a case where the initialization vector includes the extended virtual channel eVC, the transmission of the additional message count value is not an essential requirement.

<Second Arrangement Configuration of Complete Arithmetic Value>

Description is given, with reference to FIGS. 106 to 109, of a second arrangement example of the complete arithmetic value MAC.

Figure 106:
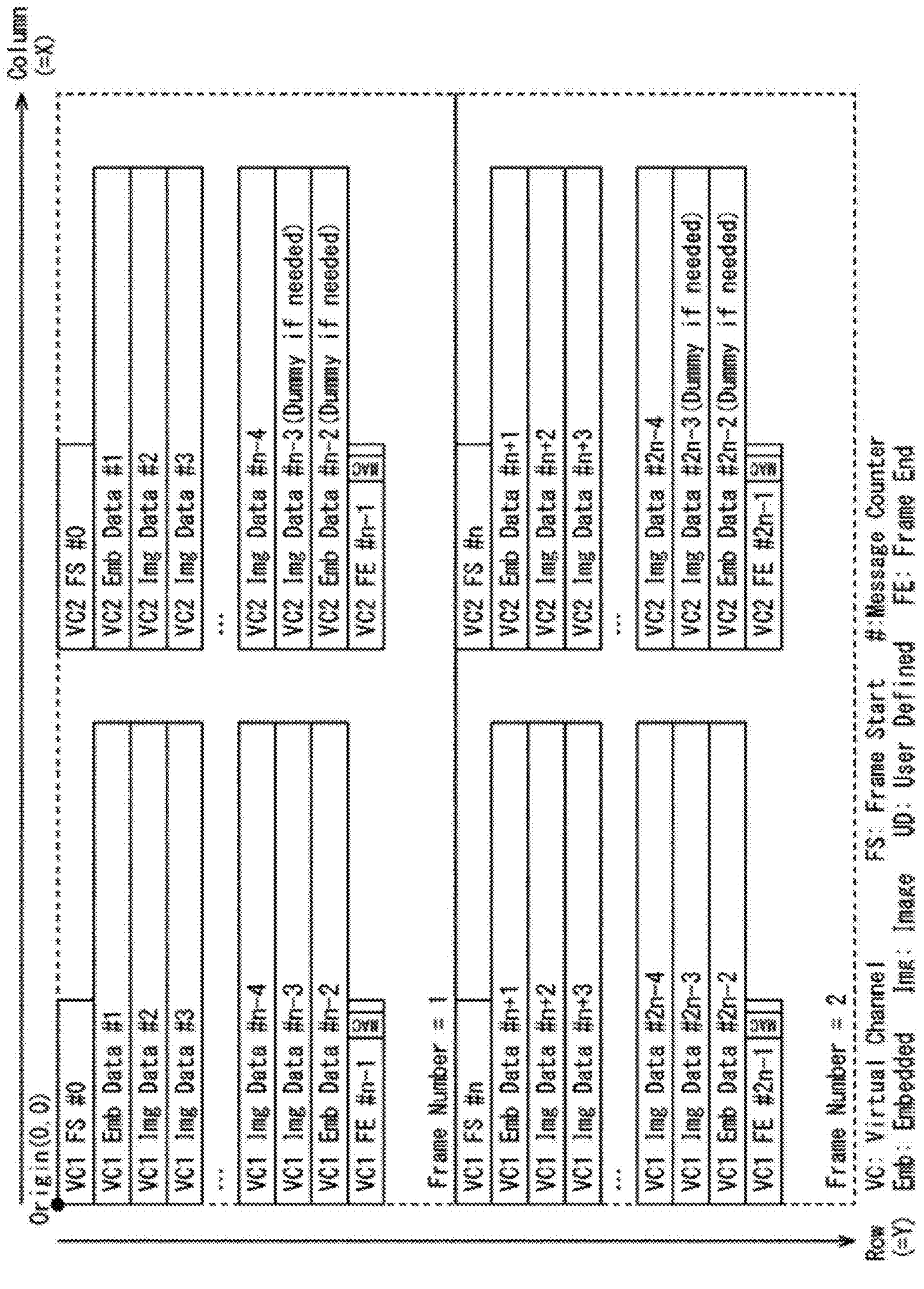
FIG. 106 is a diagram illustrating an example of a data structure of image data in which a complete arithmetic value MAC is arranged for each frame.

FIG. 106 illustrates the data structure of image data in which the complete arithmetic value MAC is arranged for each frame. In this manner a transmission method to transmit the complete arithmetic value MAC for each frame is hereinafter referred to as a frame-MAC method as appropriate.

As illustrated, only the complete arithmetic value MAC arranged in the extended packet footer remainder ePF1 of the frame end is effective, and other complete arithmetic values MAC are ineffective. In addition, the complete arithmetic value MAC is derived from the extended packet header ePH, the packet data, and the extended packet footer ePF of each line excluding the last extended packet footer ePF of the frame.

Figure 107:
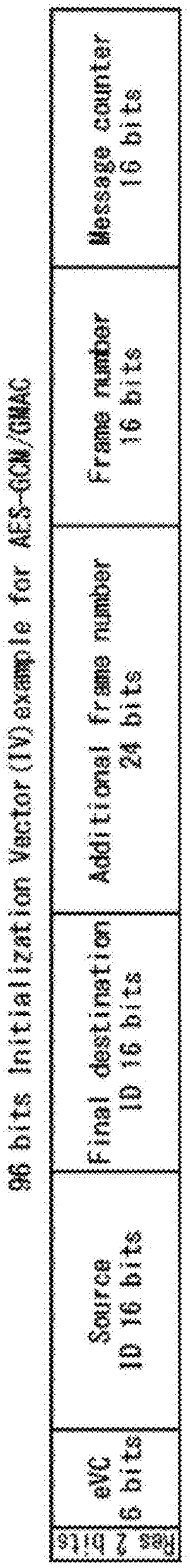
FIG. 107 is a diagram illustrating an example of an initialization vector.

For example, the initialization vector of the structure illustrated in FIG. 107 is common to the line MAC and the frame MAC (CSI-2 only). Then, the initialization vector is transmitted from the transmission side to the reception side as illustrated in FIG. 108.

Figure 108:
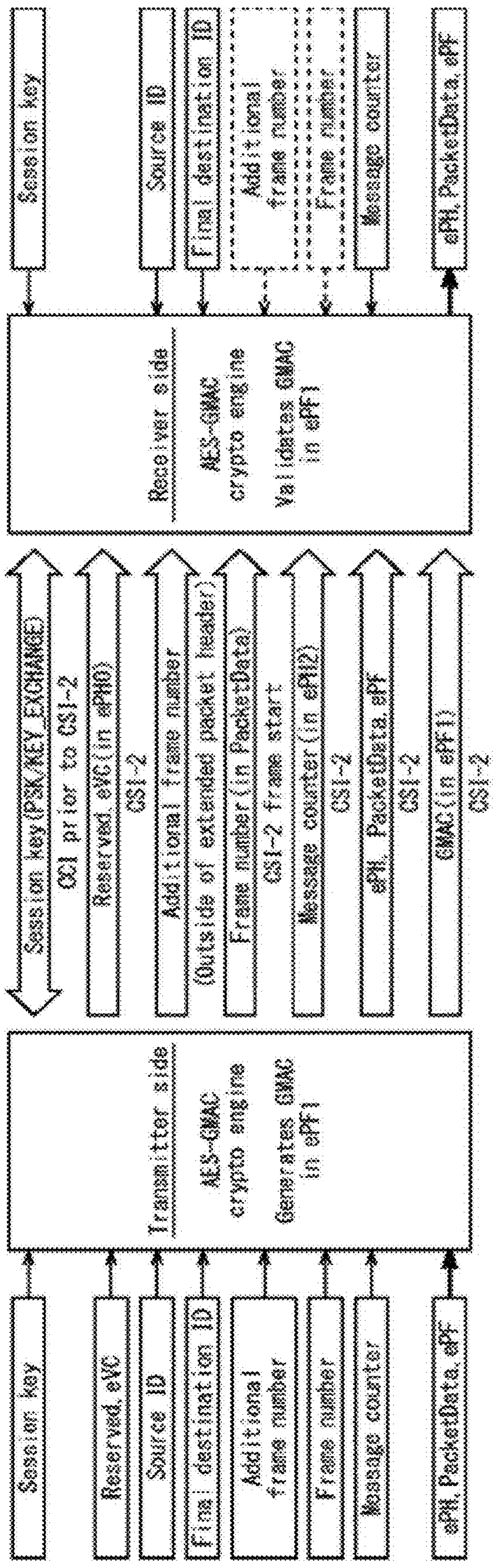
FIG. 108 is a diagram illustrating an example of transmission of an initialization vector from the transmission side to the reception side.

FIG. 108 illustrates an example in which an additional frame number is stored outside the extended packet header for transmission. In addition thereto, the additional frame number and the frame number may be stored outside the extended packet header for transmission. In that case, the frame number may also be stored in the frame start for transmission. It is to be noted that the additional frame number may only be partially used. For example, in a case where the additional frame number in the initialization vector is 24 bits, the counter may have the actual additional frame number of 16 bits. The count value may be stored partially (e.g., 16 bits on the LSB side) in the additional frame number in the initialization vector, and the specified value (e.g., $0^1$, $1^8$) may be stored in the remainder (e.g., 8 bits on the MSB side) of the additional frame number in the initialization vector. In addition, as for all of the additional frame numbers in the initialization vector, the specified value (e.g., $0^{24}$, $1^{24}$) may be stored.

In addition, some or all of the initialization vectors transmitted from the image sensor 1211 to the application processor 1212 for setting are configured not to be transmitted from the image sensor 1211 to the application processor 1212, and may be set on the basis of pre-agreement, a register setting, or the like.

Figure 109:
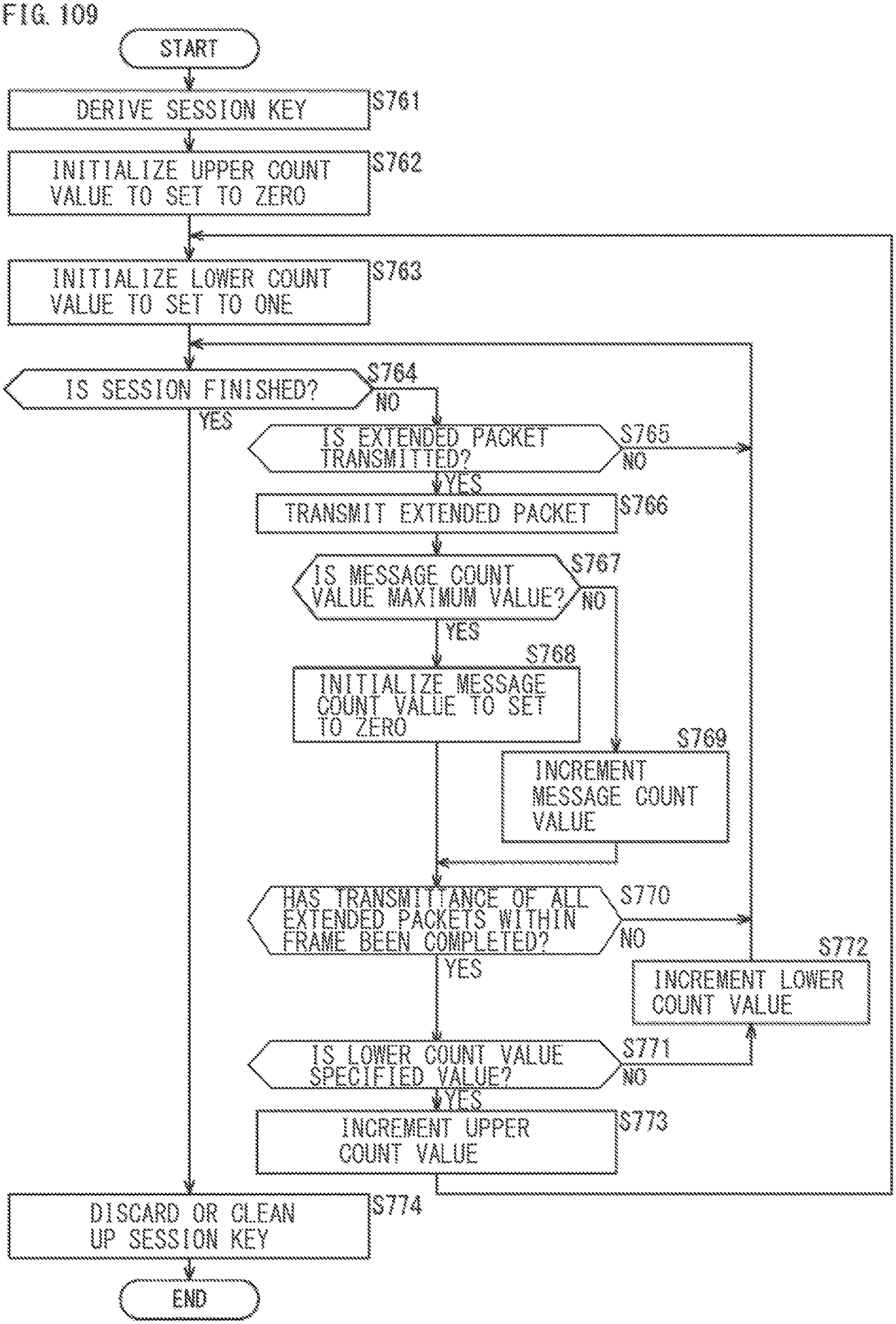
FIG. 109 is a flowchart describing transmission processing in a frame-MAC method.

Description is given, with reference to a flowchart illustrated in FIG. 109, of transmission processing in the frame-MAC method in which the image sensor 1211 transmits the complete arithmetic value MAC for each frame.

In step S761, the security section 1310 derives a session key.

In step S762, the message counter 1308 initializes the upper count value for which the additional frame number is used, and sets to zero.

In step S763, the message counter 1308 initializes the lower count value for which the frame number is used, and sets to one.

In step S764, the extension mode adaptive CSI-2 transmission circuit 1304 determines whether or not to finish the session; in a case where determination is made not to finish the session, the processing proceeds to step S765.

In step S765, the extension mode adaptive CSI-2 transmission circuit 1304 determines whether or not to transmit an extended packet.

In a case where the extension mode adaptive CSI-2 transmission circuit 1304 determines in step S765 not to transmit the extended packet, the processing returns to step S764, and subsequently similar processing is repeatedly performed. Meanwhile, in a case where the extension mode adaptive CSI-2 transmission circuit 1304 determines in step S765 to transmit the extended packet, the processing proceeds to step S766.

In step S766, the extension mode adaptive CSI-2 transmission circuit 1304 transmits the extended packet.

In step S767, the message counter 1308 determines whether or not the message count value has been counted up to the maximum value.

In a case where the message counter 1308 determines in step S767 that the message count value has been counted up to the maximum value, the processing proceeds to step S768. In step S768, the message counter 1308 initializes the message count value to set to zero.

Meanwhile, in a case where the message counter 1308 determines in step S767 that the message count value has not been counted up to the maximum value, the processing proceeds to step S769. In step S769, the message counter 1308 increments the message count value.

After the pieces of processing in step S768 and step S769, the processing proceeds to step S770, and the extension mode adaptive CSI-2 transmission circuit 1304 determines whether or not all the extended packets in the frame have been completed to be transmitted.

In step S770, in a case where the extension mode adaptive CSI-2 transmission circuit 1304 determines that all the extended packets in the frame have not been completed to be transmitted, the processing returns to step S764, and subsequently similar processing is repeatedly performed.

Meanwhile, in a case where the extension mode adaptive CSI-2 transmission circuit 1304 determines in step S770 that all the extended packets in the frame have been completed to be transmitted, the processing proceeds to step S771.

In step S771, the message counter 1308 determines whether or not the lower count value has been counted up to the specified value.

In a case where the message counter 1308 determines in step S771 that the lower count value has not been counted up to the specified value, the processing proceeds to step S772. In step S772, the message counter 1308 increments the lower count value, and then the processing returns to step S764; hereinafter, similar processing is repeatedly performed.

Meanwhile, in a case where the message counter 1308 determines in step S771 that the lower count value has been counted up to the specified value, the processing proceeds to step S773. In step S773, the message counter 1308 increments the upper count value, and then the processing returns to step S763; hereinafter, similar processing is repeatedly performed.

Then, in a case where the extension mode adaptive CSI-2 transmission circuit 1304 determines in step S764 to finish the session, the processing proceeds to step S774.

In step S774, the security section 1310 discards or cleans up the common session key, and thereafter the processing is finished.

As described above, the processing described in FIG. 109 is an example in which the frame number is used as the lower count value and the additional frame number is used as the upper count value. However, although the arithmetic operation and the transmission of the complete arithmetic value, the virtual channel, the session key update, and the like are omitted, they may be combined with some or all of the flowcharts described above. The same applies to other flowcharts.

It is to be noted that, in a case where the lower count value is the specified value (e.g., the maximum value or a value of the maximum value −1), it is desirable to increment the upper count value, because there is a possibility that the increment of one or two may be present in a mixed manner in the frame number. However, when the increment in the frame number is only one, it is sufficient for the upper count value to be incremented in a case where lower count value is the maximum value.

It is to be noted that transmitting the frame number from the image sensor 1211 to the application processor 1212 enables the application processor 1212 to use this value for the initialization vector. Accordingly, the application processor 1212 may be configured not to be provided with a frame counter from the viewpoint of implementation efficiency, or may be configured to be provided with the frame counter from the viewpoint of safety. In addition, in a case where the application processor 1212 is configured to be provided with the frame counter, the image sensor 1211 may be configured not to transmit the frame number. That is, in a case where the initialization vector includes the extended virtual channel eVC, the transmission of the frame number is not an essential requirement.

In addition, transmitting the additional frame number from the image sensor 1211 to the application processor 1212 enables the application processor 1212 to use this value for the initialization vector. Accordingly, the application processor 1212 may be configured not to be provided with an additional frame counter from the viewpoint of implementation efficiency, or may be configured to be provided with the additional frame counter from the viewpoint of safety. In addition, in a case where the application processor 1212 is configured to be provided with the additional frame counter, the image sensor 1211 may be configured not to transmit the additional frame number.

In the case of the frame-MAC method, as for the message count value in the initialization vector, a specified value (e.g., $0^{16}$, $1^{16}$) may be stored, or the message count value of a particular extended packet (e.g., frame start or frame end) may be stored. Meanwhile, in the case of the line-MAC method, as for the message count value in the initialization vector, the message count value is stored.

<Selection of Transmission Method of Complete Arithmetic Value MAC>

Figure 110:
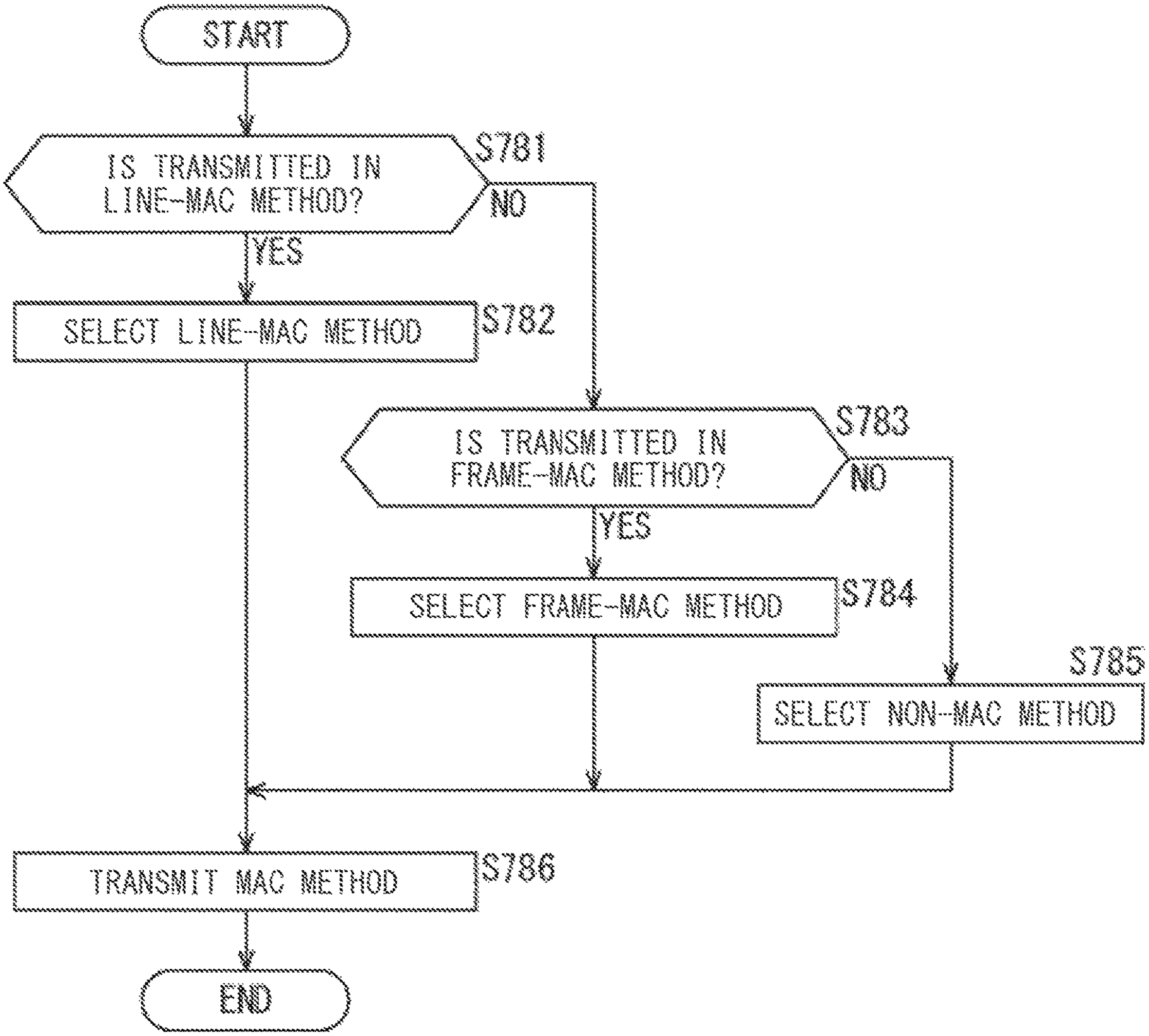
FIG. 110 is a flowchart describing selection processing.

Description is given, with reference to FIGS. 110 and 111, of selection of a transmission method of the complete arithmetic value MAC.

FIG. 110 is a flowchart describing selection processing in which the image sensor 1211 selects a transmission method of the complete arithmetic value MAC.

In step S781, the extension mode adaptive CSI-2 transmission circuit 1304 determines whether or not to transmit the complete arithmetic value MAC in the line-MAC method.

In a case where the extension mode adaptive CSI-2 transmission circuit 1304 determines in step S781 to transmit the complete arithmetic value MAC in the line-MAC method, the processing proceeds to step S782. In step S782, the extension mode adaptive CSI-2 transmission circuit 1304 selects the line-MAC method.

Meanwhile, in a case where the extension mode adaptive CSI-2 transmission circuit 1304 determines in step S781 not to transmit the complete arithmetic value MAC in the line-MAC method, the processing proceeds to step S783.

In step S783, the extension mode adaptive CSI-2 transmission circuit 1304 determines whether or not to transmit the complete arithmetic value MAC in the frame-MAC method.

In a case where the extension mode adaptive CSI-2 transmission circuit 1304 determines in step S783 to transmit the complete arithmetic value MAC in the frame-MAC method, the processing proceeds to step S784. In step S784, the extension mode adaptive CSI-2 transmission circuit 1304 selects the frame-MAC method.

Meanwhile, in a case where the extension mode adaptive CSI-2 transmission circuit 1304 determines in step S783 not to transmit the complete arithmetic value MAC in the frame-MAC method, the processing proceeds to step S785. In step S785, the extension mode adaptive CSI-2 transmission circuit 1304 selects a non-MAC method in which the complete arithmetic value MAC is not transmitted.

After the pieces of processing in step S782, step S784, or step S785, the processing proceeds to step S786. In step S786, the extension mode adaptive CSI-2 transmission circuit 1304 transmits security MAC information (see FIG. 111) indicating any of the line-MAC method, the frame-MAC method, or the non-MAC method, and then the processing is finished. However, although FIG. 111 illustrates a security MAC information with 2-bit allocation, allocation of different bit counts (e.g., 1 bit or 8 bits) may also be employed. In addition, no transmission of a MAC value (e.g., No MAC) may be allocated to Reserved region Data (Reserved for future use).

As described above, the image sensor 1211 is able to freely select whether to transmit a MAC value using the line-MAC method (select the line-MAC method), to transmit a MAC value using the frame-MAC method (select the frame-MAC method), or not to transmit a MAC value (select the non-MAC method). Alternatively, the image sensor 1211 may make pre-agreement with the application processor 1212 to select any of them. For example, the image sensor 1211 may initially select the line-MAC method and switch to another method (e.g., the frame-MAC method) in a case where a predetermined condition is satisfied. For example, the frame-MAC method may be initially selected, and switching may be made to another method (e.g., the line-MAC method) in a case where a predetermined condition is satisfied. For example, the non-MAC method may be initially selected, and switching may be made to another method (e.g., the frame-MAC method) in a case where a predetermined condition is satisfied.

Further, the selection of whether the line-MAC method, the frame-MAC method, or the non-MAC method is stored, for example, in the Security Descriptor in the extended packet header (e.g., an ePH2), the embedded data, the user-defined data, or the read response, and is transmitted from the image sensor 1211. In response to reception thereof, the application processor 1212 is able to adapt to the switching of the transmission method for the complete arithmetic value MAC.

It is to be noted that, in order to avoid confusion in the initialization vector, upon switching the transmit method of the complete arithmetic value MAC, it is desirable that the transmission method after the switching be transmitted from the image sensor, during a period of time from the start of the transmission of the frame end to the completion of the transmission of the frame start; however, this is not limitative.

It is to be noted that the security MAC information that is able to identify whether the line-MAC method or the frame-MAC method may be included in the initialization vector. In that case, the initialization vectors do not surely overlap between the line-MAC method and the frame-MAC method, thus smoothing the switching of the transmission method of the complete arithmetic value MAC. No security MAC information may necessitate specifying of a value to be stored in the message counter 1308, in some cases, in order to avoid overlapping of the initialization vectors, for example, depending on the timing of switching the transmission method of the complete arithmetic value MAC.

<Concerning Message Count Value and Frame Count Value>

Description is given, with reference to FIGS. 112 to 115, of the message count value and the frame count value.

FIG. 112 illustrates an example of a cycle in which the message count value and the frame count value are rolled over.

As illustrated in A of FIG. 112, in the case of pixels in 2160 lines at 60 fps, the message count value is rolled over in about 9 hours, with the upper count value being set to 16 bits and the lower count value being set to 16 bits. Likewise, the message count value is rolled over in about 6 days, with the upper count value of 20 bits and the lower count value of 16 bits. The message count value is rolled over in about 96 days, with the upper count value of 24 bits and the lower count value of 16 bits. The message count value is rolled over in about 4 years, with the upper count value of 28 bits and the lower count value of 16 bits. The message count value is rolled over in about 69 years, with the upper count value 32 bits and the lower count value of 16 bits.

As illustrated in B of FIG. 112, in the case of increment by one at 60 fps, the frame count value is rolled over in about 5 hours, with the upper count value being set to 4 bits and the lower count value being set to 16 bits. Likewise, the frame count value is rolled over in about 78 hours, with the upper count value of 8 bits and the lower count value of 16 bits. The frame count value is rolled over in about 52 days, with the upper count value of 12 bits and the lower count value of 16 bits. The frame count value is rolled over in about 828 days, with the upper count value of 16 bits and the lower count value of 16 bits. The frame count value is rolled over in about 36 years, with the upper count value of 20 bits and the lower count value of 16 bits. The frame count value is rolled over in about 581 years, with the upper count value of 24 bits and the lower count value of 16 bits.

Figure 113:
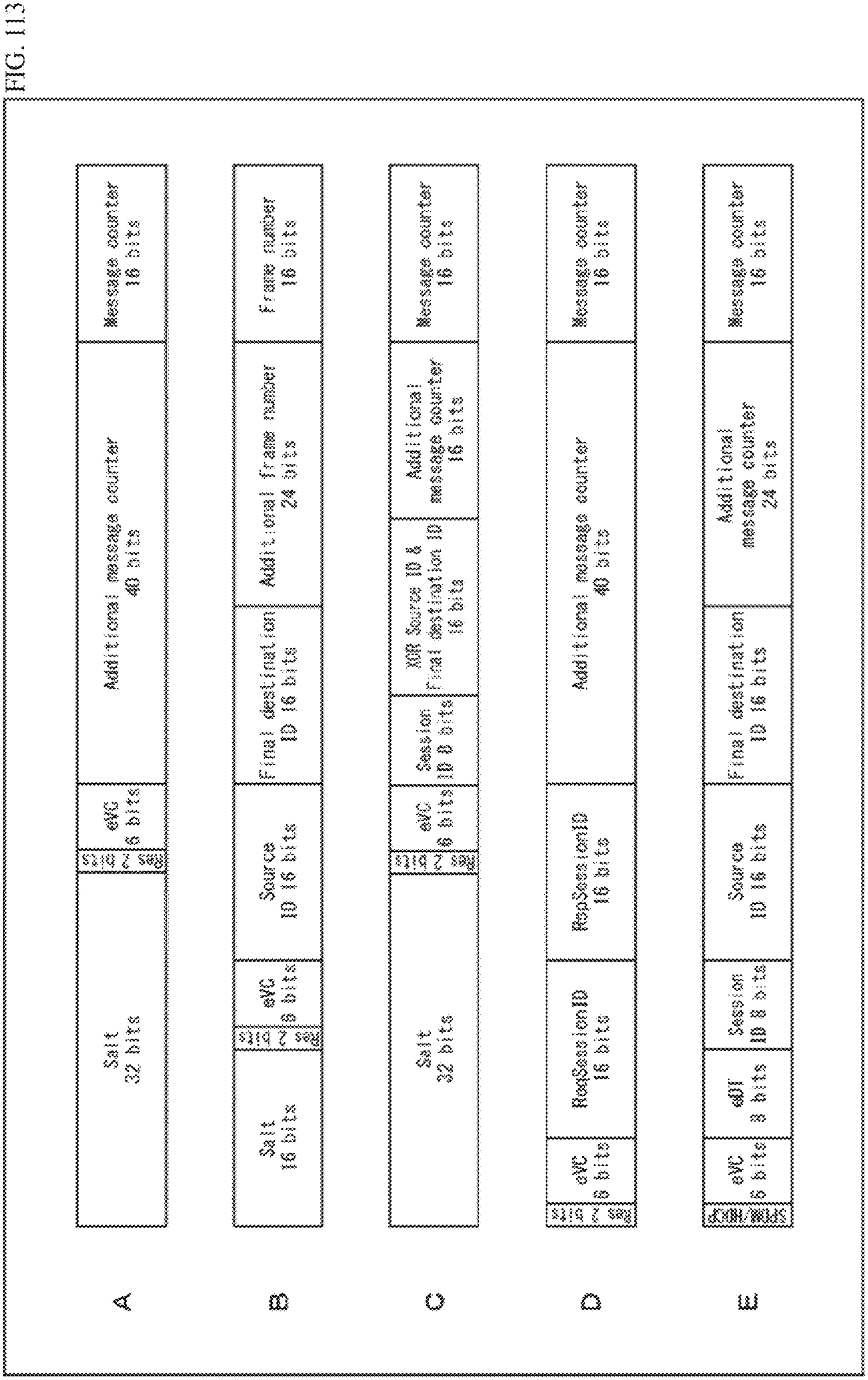
FIG. 113 is a diagram describing a configuration of an initialization vector.

As illustrated in A of FIG. 113, the initialization vector configuration may be a configuration including salt configured by a random number. However, in a case where the random number is not generated, for example, the salt may be a specified value (e.g., $0^{32}$, $1^{32}$).

As illustrated in B of FIG. 113, the initialization vector configuration may be configured not to include the message count value (include the frame count value). In addition, the initialization vector may be configured to include the Source ID or the Final destination ID. It is to be noted that the initialization vector may be configured to include the additional frame number, the frame number, the additional message count value, and the message count value.

As illustrated in C of FIG. 113, the initialization vector configuration may include an SPDM session ID. Meanwhile, the initialization vector may include XOR results of the Source ID and the Final destination ID in which bit widths can be saved.

As illustrated in D of FIG. 113, the SPDM session ID may be configured by a ReqSessionID and a RspSessionID described later.

As illustrated in E of FIG. 113, the initialization vector configuration may include security protocol information (e.g., SPDM/HDCP), an extended data type, or a data type.

It is to be noted that the order of elements in line illustrated in FIG. 133 may be interchanged. The MSB side (upper count value) and the LSB side (lower count value) may be interchanged. Some of the elements may be replaced by other elements (e.g., some or all of the salt, an intra-ePH parameter, the above-described initialization vector component, etc.).

Figure 114:
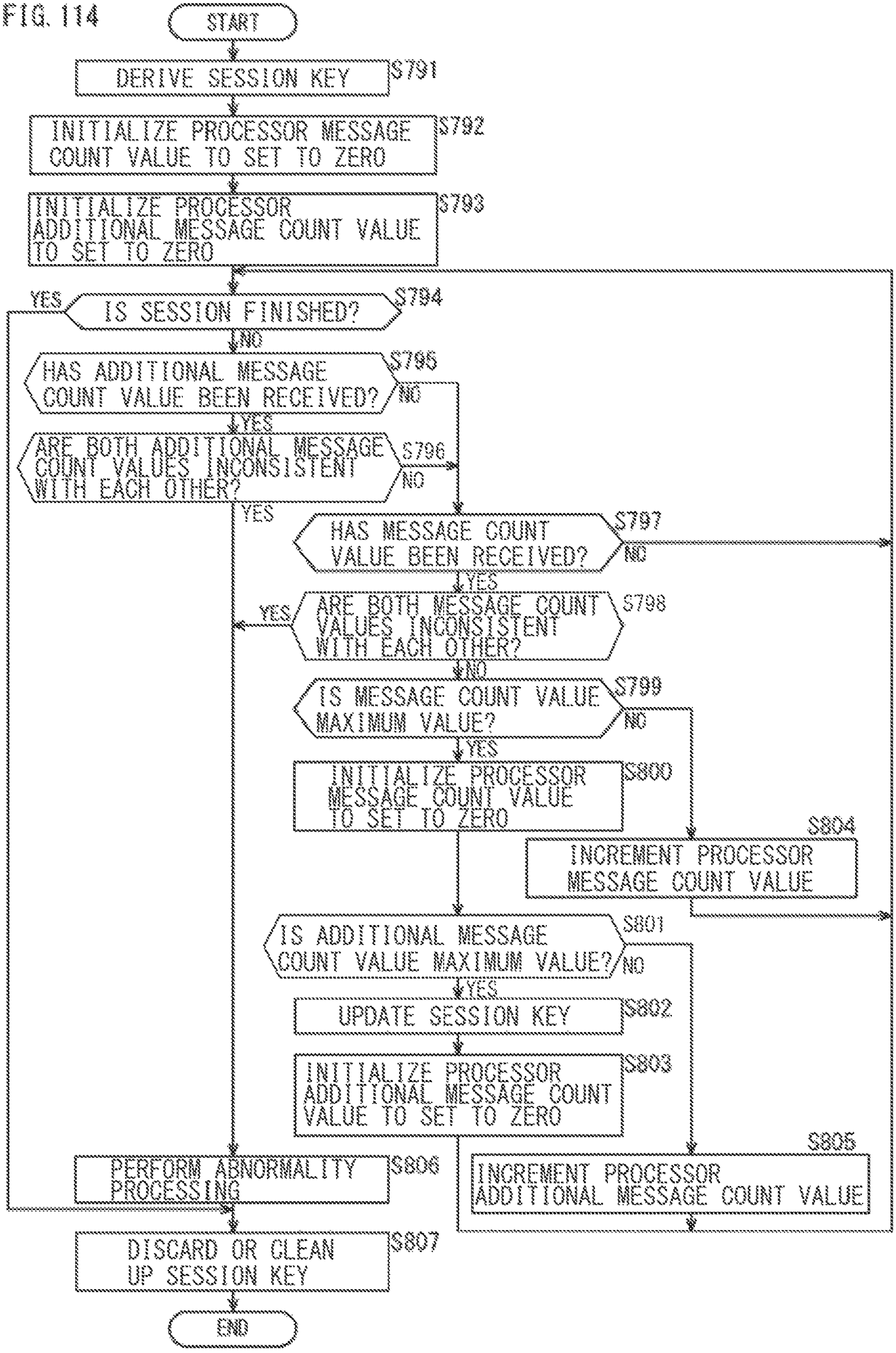
FIG. 114 is a flowchart describing data verification processing.

FIG. 114 is a flowchart describing data verification processing in which the application processor 1212 performs data verification using a message count value.

In step S791, the security section 1326 derives a session key.

In step S792, the data verification section 1325 initializes a processor message count value to set to zero.

In step S793, the data verification section 1325 initializes a processor additional message count value to set to zero.

In step S794, the extension mode adaptive CSI-2 reception circuit 1322 determines whether or not to finish the session; in a case where determination is made not to finish the session, the processing proceeds to step S795.

In step S795, the data verification section 1325 determines whether or not the additional message count value has been received from the image sensor 1211. In a case where the data verification section 1325 determines in step S795 that the additional message count value has been received from the image sensor 1211, the processing proceeds to step S796.

In step S796, the data verification section 1325 determines whether or not both the processor additional message count value and the additional message count value of the image sensor 1211 are inconsistent with each other.

In a case where the data verification section 1325 determines in step S796 that both the processor additional message count value and the additional message count value of the image sensor 1211 are not inconsistent (consistent) with each other, the processing proceeds to step S797. Meanwhile, also in a case where the data verification section 1325 determines in step S795 that the additional message count value has not been received from the image sensor 1211, the processing proceeds to step S797.

In step S797, the data verification section 1325 determines whether or not the message count value has been received from the image sensor 1211. In a case where the data verification section 1325 determines in step S797 that the message count value has been received from the image sensor 1211, the processing proceeds to step S798.

In step S798, the data verification section 1325 determines whether or not both the processor message count value and the message count value of the image sensor 1211 are inconsistent with each other.

In a case where the data verification section 1325 determines in step S798 that both the processor message count value and the message count value of the image sensor 1211 are not inconsistent (consistent) with each other, the processing proceeds to step S799.

In step S799, the data verification section 1325 determines whether or not the processor message count value has been counted up to the maximum value. In a case where the data verification section 1325 determines in step S799 that the processor message count value has been counted up to the maximum value, the processing proceeds to step S800.

In step S800, the data verification section 1325 initializes the processor message count value to set to zero.

In step S801, the data verification section 1325 determines whether or not the processor additional message count value has been counted up to the maximum value. In a case where the data verification section 1325 determines in step S801 that the processor additional message count value has been counted up to the maximum value, the processing proceeds to step S802.

In step S802, the security section 1326 updates the session key.

In step S803, the data verification section 1325 initializes the processor additional message count value to set to zero. Thereafter, the processing returns to step S794, and subsequently similar processing is repeatedly performed.

Meanwhile, in a case where the data verification section 1325 determines in step S797 that the message count value has not been received from the image sensor 1211, the processing returns to step S794, and subsequently similar processing is repeatedly performed.

Meanwhile, in a case where the data verification section 1325 determines in step S799 that the processor message count value has not been counted up to the maximum value, the processing proceeds to step S804. In step S804, the data verification section 1325 increments the processor message count value, and thereafter the processing returns to step S794; subsequently similar processing is repeatedly performed.

Meanwhile, in a case where the data verification section 1325 determines in step S801 that the processor additional message count value has not been counted up to the maximum value, the processing proceeds to step S805. In step S805, the data verification section 1325 increments the processor additional message count value, and thereafter processing returns to step S794; hereinafter, similar processing is repeatedly performed.

Meanwhile, in a case where the data verification section 1325 determines in step S796 that both the processor additional message count value and the additional message count value of the image sensor 1211 are inconsistent with each other, the processing proceeds to step S806. In addition, also in a case where the data verification section 1325 determines in step S798 that both the processor message count value and the message count value of the image sensor 1211 are inconsistent with each other, the processing proceeds to step S806.

In step S806, the data verification section 1325 performs abnormality processing on the assumption that abnormality has occurred, and the processing proceeds to step S807. In addition, also in a case where the extension mode adaptive CSI-2 reception circuit 1322 determines in step S794 to finish the session, the processing proceeds to step S807.

In step S807, the security section 1326 discards or cleans up the session key, and thereafter the processing is finished.

Figure 115:
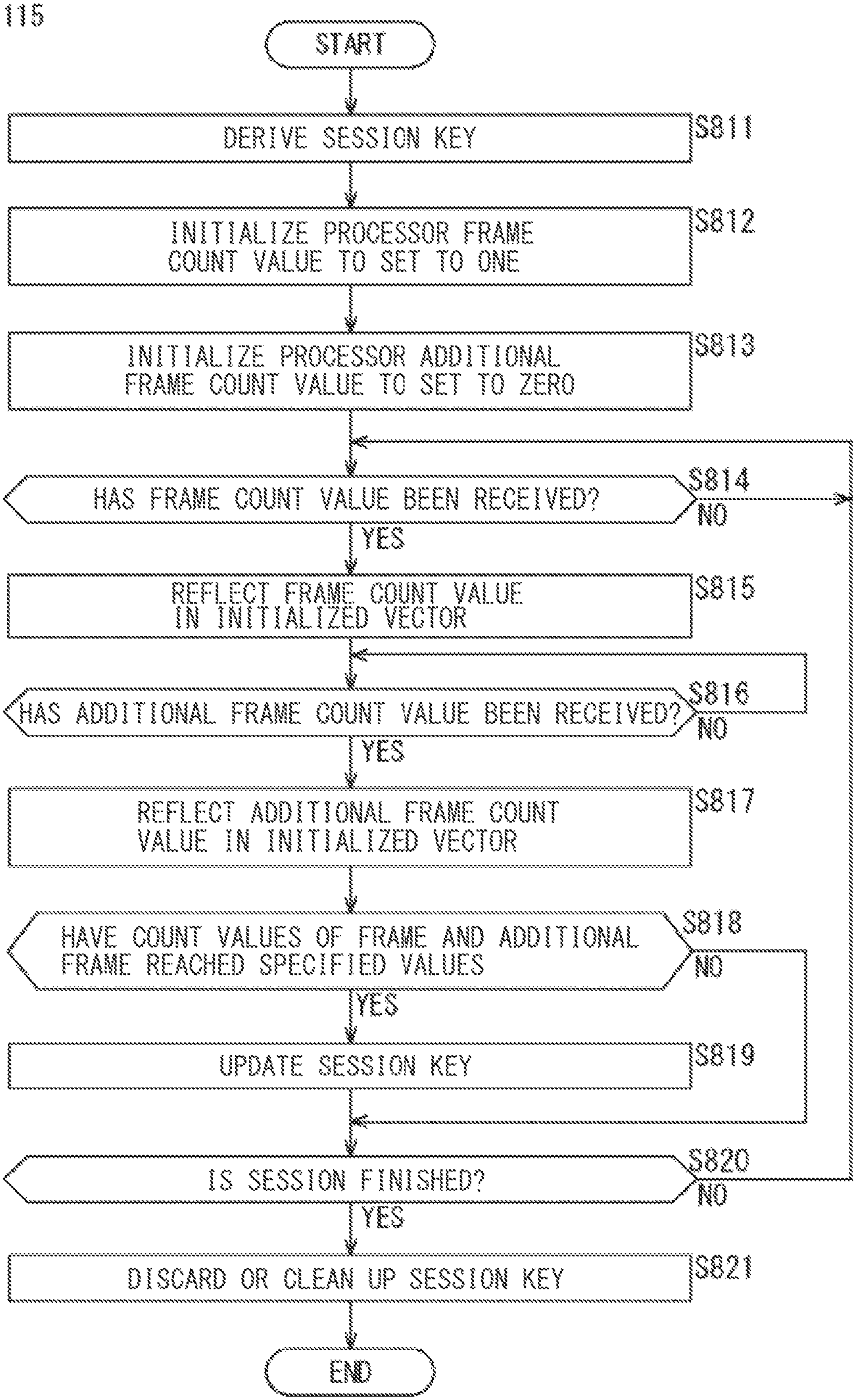
FIG. 115 is a diagram describing reflection processing.

FIG. 115 is a diagram describing reflection processing in which the application processor 1212 reflects the frame count value and an additional frame count value in the initialization vector.

In step S811, the security section 1326 derives a session key.

In step S812, the data verification section 1325 initializes a processor frame count value to set to one.

In step S813, the data verification section 1325 initializes a processor addition frame count value to set to zero.

In step S814, the data verification section 1325 determines whether or not the frame count value has been received from the image sensor 1211, and waits for the processing until determination is made that the frame count value has been received from the image sensor 1211. Then, in a case where the data verification section 1325 determines in step S814 that the frame count value has been received from the image sensor 1211, the processing proceeds to step S815.

In step S815, the security section 1326 reflects the frame count value in the initialization vector.

In step S816, the data verification section 1325 determines whether or not the additional frame count value has been received from the image sensor 1211, and waits for the processing until determination is made that the additional frame count value has been received from the image sensor 1211.

Then, in a case where the data verification section 1325 determines in step S816 that the frame additional count value has been received from the image sensor 1211, the processing proceeds to step S817.

In step S817, the security section 1326 reflects the additional frame count value in the initialization vector.

In step S818, the data verification section 1325 determines whether or not the frame count value and the additional frame count value have been counted up to the specified value. In a case where the data verification section 1325 determines in step S818 that the frame count value and the additional frame count value have been counted up to the specified value, the processing proceeds to step S819.

In step S819, the security section 1326 updates the session key.

After the processing in step S819 or in step S818, in a case where the data verification section 1325 determines that the frame count value and the additional frame count value have not been counted up to the specified value, the processing proceeds to step S820.

In step S820, the extension mode adaptive CSI-2 reception circuit 1322 determines whether or not to finish the session; in a case where determination is made not to finish the session, the processing returns to step S814, and subsequently similar processing is repeatedly performed.

Meanwhile, in a case where the extension mode adaptive CSI-2 reception circuit 1322 determines in step S820 to finish the session, the processing proceeds to step S821.

In step S821, the security section 1326 discards or cleans up the session key, and thereafter the processing is finished.

It is to be noted that the message count value is incremented by one; however, as for an increment of the frame count value (frame number), there is a possibility that the increment of one or two may be freely present in a mixed manner in the sequence. Therefore, it is desirable that a value transmitted from the image sensor be preferentially used for the frame count value and the additional frame count value.

Meanwhile, in order for a decryption arithmetic operation of the message count value and the additional message count value to be started quickly, the value counted by the application processor 1212 may be used in preference to the value transmitted from the image sensor 1211. It is to be noted that the processing described with reference to the flowcharts of FIGS. 114 and 115 may be configured not to update the session key.

Abbreviations are as follows: eP: extended Packet; eVC: extended Virtual Channel; and eDT: extended Data Type. Although the examples of the initialization vector for AES-GCM/GMAC has been illustrated, the present technology may also be applied, by adjusting components, arrangement orders, and numerical values as needed, to block cipher other than AES, (e.g., DES: Data Encryption Standard, triple DES), to algorithms other than GCM/GMAC (e.g., CCM: Counter with Cipher block chaining-MAC), to different key lengths (e.g., other than 128 bits), and to different IV lengths (e.g., other than 96 bits).

In SPDM specification by publicly available DMTF (Distributed Management Task Force), some or all of RandomData or OpaqueData in the KEY_EXCHANGE request message, RandomData in Successful KEY_EXCHANGE_RSP response message, RequesterContext or OpaquePSKData in PSK_EXCHANGE request message, or ResponderContext in PSK_EXCHANGE_RSP message may be used as the salt.

Meanwhile, the session ID is stored in 1 Byte, for example, in a Param2 in the KEY_EXCHANGE_RSPresponse message or in the PSK_EXCHANGE_RSP message, and is transmitted from a SPDM responder (e.g., an image sensor) to an SPDM requester. It is to be noted that the PSK_EXCHANGE_RSP message and the KEY_EXCHANGE_RSP response message are SPDM options; however, in order to derive an SPDM session key, the PSK_EXCHANGE_RSP message adaptive to the common-key cryptosystem or the KEY_EXCHANGE_RSP response message adaptive to the public-key cryptosystem is substantially essential, and the session ID may be included in the initialization vector. However, the session ID desirably differs from an active session or the previous five sessions for the same endpoint.

In addition, the PSK_EXCHANGE request message or the KEY_EXCHANGE request message may include the ReqSessionID (e.g., 2 bytes) as a requester-side session ID, and a PSK_EXCHANGE_RSP response message or the Successful KEY_EXCHANGE_RSP response message may include the RspSessionID (e.g., 2 bytes) as a responder-side session ID; session ID (e.g., 4 bytes)=Concatenate (ReqSessionID, RepSessionID), in which the two IDs are concatenated, may be used as a unique session ID between the requester and the responder. In that case, it is possible to commonalize the session key or the message counter among the multiple types of sessions.

Meanwhile, for a display application (e.g., DSI-2), HDCP (High-bandwidth Digital Content Protection) instead of the SPDM may be used as a security protocol, and thus security protocol information (see FIG. 116) that is able to identify whether the SPDM or the HDCP may be included in the initialization vector. However, although FIG. 116 illustrates security protocol information with 2-bit allocation, allocation of different bit counts (e.g., 1 bit or 8 bits) may also be employed. In addition, no adaptation to the security protocol (e.g., No security protocol) may be allocated to the Reserved region Data (Reserved for future use).

For example, a bit exclusively for the SPDM or the HDCP may be allocated into either a new format, an ePH format (e.g., Reserved, eVC, eDT, Security Descriptor), or the session ID, and defined, which may be included in the initialization vector. In that case, it is possible to commonalize the session key or the message counter among multiple types of security protocols. Likewise, a portion in the extended packet header may be included in the initialization vector; for example, the Security Descriptor (which may be referred to as Service Descriptor, for example) may be included in the initialization vector. In that case, it is possible to commonalize the session key or the message counter between different Security Descriptors.

Figure 117:
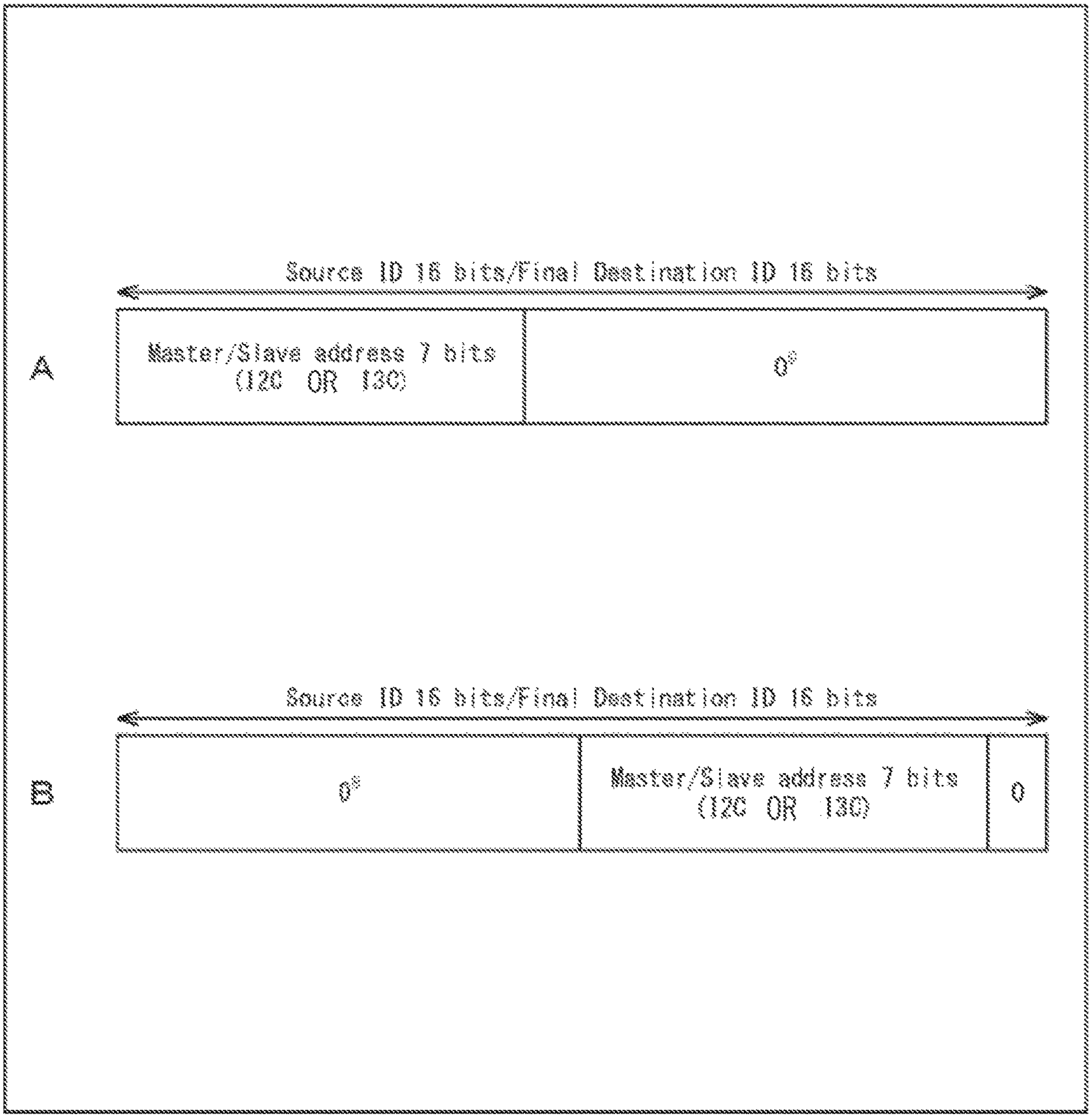
FIG. 117 is a diagram illustrating an example of a Source ID or a Final Destination ID.

In the image sensor 1211 or the application processor 1212, a value stored and received in the extended packet header (e.g., ePH4) may be used, instead of the pre-exchanged value, as the Source ID or the Final Destination ID, as illustrated in FIG. 117.

It is to be noted that, as a coupling mode in which three or more apparatuses (e.g., multiple cameras, or multiple displays) are linked via a cable, there is a daisy-chain system in which the next apparatus is concatenated to the previous apparatus in a "string of beads" manner; the inclusion of the Source ID (Source ID) and the Final Destination ID (Final Destination ID) in the initialization vector makes it possible to commonalize the session key or the message counter among multiple apparatuses.

However, the Source ID and the Final Destination ID are replaced depending on, for example, whether they are a command to the image sensor or data from the image sensor. In order to avoid this replacement, the Source ID and the Final Destination ID in the initialization vector may be defined as Host ID and Device ID, for example. However, for example, the image sensor can be either a host or a device (non-host), and thus it may be desirable to define them as the Source ID and the Final Destination ID in some cases.

Therefore, for example, an ID subject to a logical arithmetic operation (e.g., XOR) of the Source ID and the Final destination ID may be used. In that case, there is also an effect in which a bit width defined in the initialization vector may be saved. It is to be noted that, in the case of I2C or I3C, Master address or Slave address may be stored as illustrated in FIG. 117 described above, as for the Source ID or the Final Destination ID.

It is to be noted that, in a case where image data is transmitted from the image sensor 1211 to the application processor 1212 in the data structure in FIG. 86 described above, for example, in order to implement the E2E protection, the device ID of the image sensor 1211 is stored as the Source ID and the device ID of the application processor 1212 is stored as the Final Destination ID.

Meanwhile, for example, in a case where a command instruction is transmitted from the application processor 1212 to the image sensor 1211 in the data structure in FIG. 86 described above, for example, in order to implement the E2E protection, the device ID of the application processor 1212 is stored as the Source ID and the device ID of the image sensor 1211 is stored as the Final Destination ID. In that case, the device ID of the SerDes device 25 or the SerDes device 26 as illustrated in FIG. 2 is an intermediate Destination ID and may be desirably distinguished from the Final Destination ID in some cases. However, depending on cases, the Final Destination ID of the IV format may be replaced by the Destination ID. In addition, the eVC may be replaced by the VC, and the eDT may be replaced by the DT.

In addition, the eVC or the VC may be an ID (Stream ID) of any of Video stream, Audio stream, Camera stream, DisplayStream, or the like. In addition, the Audio stream instead of the Video stream may be used as a stream, and thus stream information that is able to identify whether the Video stream or the Audio stream may be included in the initialization vector. In that case, it is possible to commonalize the session key or the message counter between the Video stream and the Audio stream.

Some or all of the nonce values may be stored in data of different virtual channels (e.g., in the frame start, the embedded data, the image data, or the frame end) for transmission. This is effective, for example, in a case where there is no room for storing some or all of the nonce values in the data of a particular virtual channel.

Meanwhile, some or all of the nonce values may be stored at least partially in packet data (Generic Short Packet Data Types, Generic Long Packet Data Types), user-defined data (User Defined Byte-based Data) or reserved region data (Reserved for future use) of a virtual channel different from the virtual channel for the image data transmission, for transmission. That is, they may be stored in non-image data.

It is to be noted that, in the above description, the start of imaging is specified, but the end of imaging is not specified. One reason for this is that it varies depending on, for example, whether the imaging method is a global shutter method or a rolling shutter method. For example, in the case of the global shutter method, all pixels can be captured at once, and thus the imaging may be finished before the next processing, or the imaging may be finished before the transmission of the first image data in the frame. Meanwhile, in the case of the rolling shutter method, the imaging and the high-speed data transmission to be executed in each row of the pixels may be executed in an overlapped manner (executed in parallel) at least partially, and thus the imaging may only be finished before the transmission of the last image data in the frame. In addition, the position of the start of imaging is only exemplary, and may be delayed to a position before the transmission of the first image data in the frame for execution thereof.

<Detailed Configuration Example of Image Sensor to Detect Presence or Absence of Abnormality and Transmit Message in Response to Detection Result as Specific Message to Application Processor>

A technique is disclosed which relates to an imaging device that is mounted on a vehicle and configured to detect a failure in an imaging element of a stacked structure of multiple substrates, in which the failure is detected depending on whether or not a timing at which a row drive section provided in a second substrate outputs a control signal to control accumulation and reading of a pixel signal of a pixel array provided in a first substrate and a timing at which the control signal outputted by the row drive section passes through the pixel array to be detected are consistent with each other (see International Publication No. WO2017/209221).

However, in the case during driving assistance processing or during automated driving processing, abnormality in a sensor may cause a state that directly leads to a fatal accident. Therefore, when abnormality in a sensor is detected by the above-described failure detection, a vehicle needs to be warned from the sensor as soon as possible. In addition, in a case where the above-described failure detection is executed, sudden stopping of image data stream by the sensor upon detection of abnormality in the sensor may result in interruption of the image data while driving depending on the timing. This interrupts the driving assistance processing and the automated driving processing, which may possibly cause a serious state.

Meanwhile, there is disclosed a technique to provide a solid-state imaging device, that is able to output a signal for detecting abnormality with higher accuracy, the solid-state imaging device including: a pixel that outputs a pixel signal which is an analog signal; a reading section that converts the pixel signal to a digital signal to generate a digital pixel signal; a storage section that stores the digital pixel signal; and a first test signal output section that outputs a first test signal to the storage section to cause the storage section to store the signal, in which the first test signal stored in the storage section is outputted from the storage section during a period of time from an end of an output of a digital pixel signal of a certain frame to a start of an output of a digital pixel signal of a next frame (see Japanese Unexamined Patent Application Publication No. 2018-121325).

In a case where such a technique is applied, the image processing section outside the imaging device determines consistency between the first test signal and an expected value, but it takes time to determine the consistency. Further, the determination result of the image processing section is unrecognizable to the imaging device. In addition, there is a possibility that the first test signal may be falsified by at least one of a noise, an interference, or an attack by an attacker, and that determination may be made that there is abnormality despite being normal or determination may be made to be normal despite being abnormal.

That is, in any case, a propulsion apparatus that controls propulsion of a vehicle, a robot, a drone, or the like enabling propulsion such as driving, walking, and flying is not able to address the abnormality in the sensor appropriately, thus possibly resulting in decreased safety.

Therefore, the image sensor 1211 may detect the presence or absence of abnormality, and transmit, as a specific message, a message corresponding to a detection result to the application processor 1212 by high-speed data communication for transmission of image data.

Such a configuration makes it possible to quickly notify the application processor 1212 of a specific message which is a message related to the presence or absence of the abnormality in the image sensor 1211.

As a result, it is possible for the application processor 1212 to implement a quick and appropriate response to the abnormality in the image sensor 1211, thus making it possible to further enhance the safety.

Figure 118:
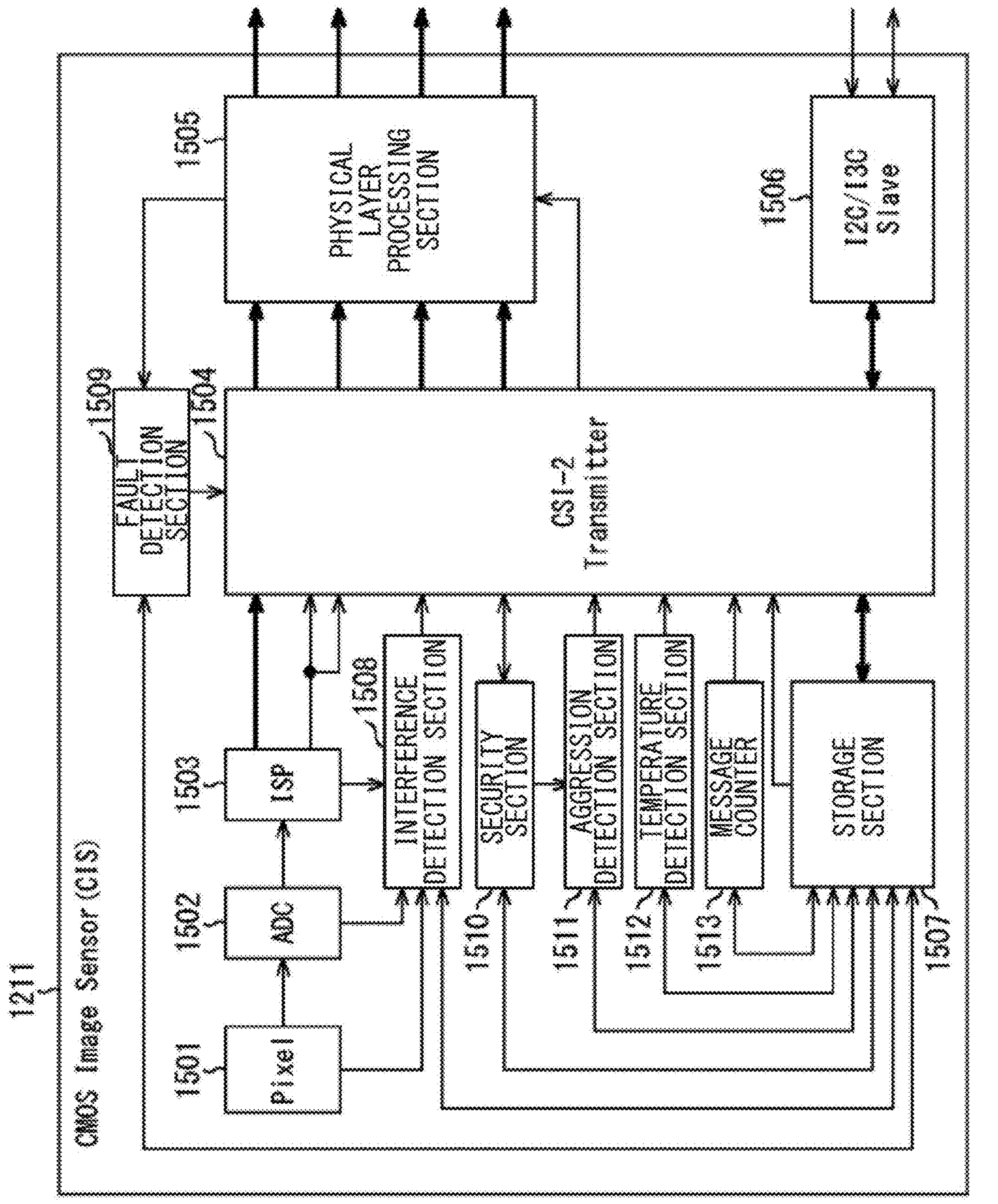
FIG. 118 is a block diagram illustrating a detailed configuration example of an image sensor that diagnoses presence or absence of its own abnormality.

Now, description is given, with reference to FIG. 118, of a detailed configuration example of the image sensor 1211 that detects the presence or absence of abnormality and transmits, as a specific message, the message corresponding to the detection result to the application processor. FIG. 118 is a block diagram illustrating the detailed configuration example of the image sensor 1211 that detects the presence or absence of abnormality and transmits, as a specific message, the message corresponding to the detection result to the application processor.

The image sensor 1211 in FIG. 118 includes a pixel 1501, an AD converter 1502, an image processing section 1503, an extension mode adaptive CSI-2 transmission circuit 1504, a physical layer processing section 1505, an I2C/I3C slave 1506, a storage section 1507, an interference detection section 1508, a fault detection section 1509, a security section 1510, an aggression detection section 1511, and a temperature detection section 1512.

It is to be noted that the pixel 1501, the AD converter 1502, the image processing section 1503, the extension mode adaptive CSI-2 transmission circuit 1504, the physical layer processing section 1505, the I2C/I3C slave 1506, and the storage section 1507 have configurations provided with functions similar to those of the pixel 1301, the AD converter 1302, the image processing section 1303, the extension mode adaptive CSI-2 transmission circuit 1304, the physical layer processing section 1305, the I2C/I3C slave 1306, and the storage section 1307, which correspond thereto in the other embodiment, and thus detailed descriptions thereof are omitted.

Figure 119:
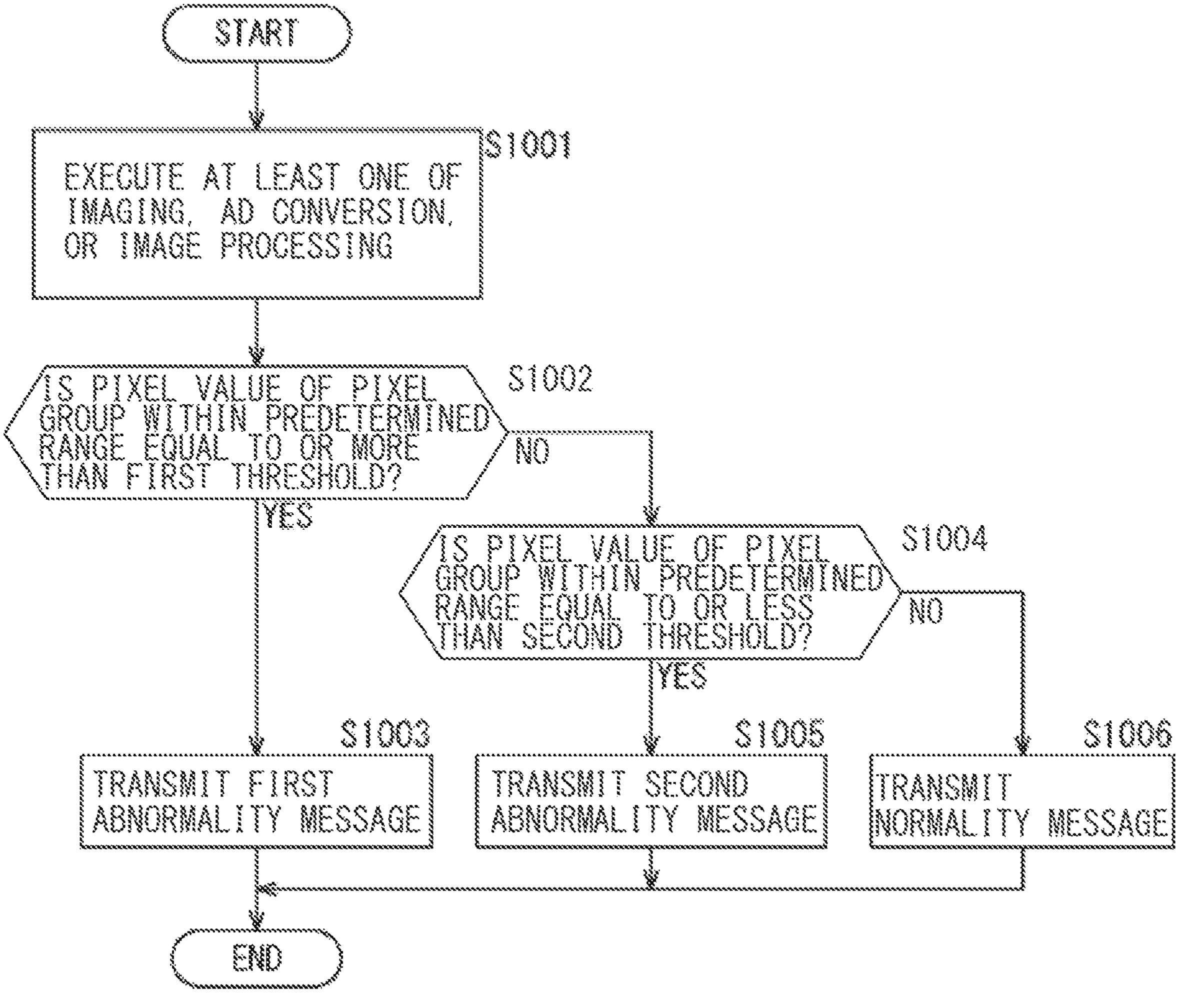
FIG. 119 is a flowchart describing interference detection processing (Part 1) by an interference detection section.

The interference detection section 1508 is electrically coupled directly or indirectly to at least one of the pixel 1501, the AD converter 1502, or the image processing section 1503. It is to be noted that FIG. 119 illustrates an example in which the interference detection section 1508 is coupled to all of the pixel 1501, the AD converter 1502, and the image processing section 1503; however, it is sufficient for the interference detection section 1508 to be coupled to at least one thereof.

On the basis of an output result of at least one of a pixel signal including an analog signal to be outputted by photoelectric conversion in response to an amount of light received by the pixel 1501, a pixel signal converted to a digital signal by the AD converter 1502, or processed image data to be outputted by the image processing section 1503, the interference detection section 1508 detects abnormality from the presence or absence of a light irradiation attack (interference) that substantially disables or falsify the image of the image sensor 1211, and notifies the application processor 1212 of a specific message based on the detection result by the high-speed data communication to transmit the image data.

Such a configuration enables the application processor 1212 to quickly address the abnormality in response to the specific message by acquiring the specific message corresponding to the presence or absence of the interference by the high-speed data communication.

The fault detection section 1509 is electrically coupled directly or indirectly to a communication path or the physical layer processing section 1505, for example.

The fault detection section 1509 detects the presence or absence of an injection attack, such as disabling or malfunctioning some or all of the operations inside the image sensor 1211, infusing false information, or leaking information, by means of, for example, one of power injection, electromagnetic irradiation (injection), or laser irradiation (injection), on the image sensor 1211, and notifies the application processor 1211 of the specific message based on the detection result, by the high-speed data communication to transmit image data.

In addition, the fault detection section 1509 detects the presence or absence of an insertion attack, such as disabling or malfunctioning some or all of the operations inside the image sensor 1211, infusing false information, or leaking information, by inserting Hardware Troy (i.e., a foreign object) that adversely affects the image sensor 1211, and notifies the application processor 1211 of the specific message based on the detection result, by the high-speed data communication to transmit image data.

Such a configuration enables the application processor 1212 to quickly address the abnormality in response to the specific message by acquiring the specific message corresponding to the presence or absence of the fault by the high-speed data communication.

The aggression detection section 1511 is electrically coupled directly or indirectly to the security section 1510, for example, detects abnormality in the security section 1510, and notifies the application processor 1212 of a specific message based on the detection result, by the high-speed data communication to transmit image data.

The security section 1510 may possibly be subject to an analysis attack (power analysis attack, electromagnetic analysis attack) that leaks information inside the image sensor 1211 by analyzing electric power to be used for the image sensor 1211 or electromagnetism generated from the image sensor 1211, for example, in addition to the injection attack, such as disabling or malfunctioning some or all of the operations inside the image sensor 1211, infusing false information, or leaking information.

Therefore, the aggression detection section 1511 logically detects the presence or absence of falsification inside the security section 1510 associated with the injection attack. The aggression detection section 1511 physically detects whether or not there is an attack object (e.g., probe) necessary for power analysis or electromagnetic analysis in the vicinity of the security section 1510. The aggression detection section 1511 notifies the application processor 1212 of a specific message based on the detection result by the high-speed data communication to transmit image data.

Such a configuration enables the application processor 1212 to quickly address the abnormality in response to the specific message by acquiring the specific message corresponding to the presence or absence of the aggression by the high-speed data communication.

The temperature detection section 1512 detects the temperature of the image sensor 1211, and notifies the application processor 1212 of a specific message, by the high-speed data communication to transmit image data, on the basis of whether or not the temperature is less than the upper limit value (first threshold) of an operation guarantee temperature and is more than the lower limit value (second threshold) thereof.

Such a configuration enables the application processor 1212 to make a quick response in response to the specific message by the image sensor 1211 receiving the specific message corresponding to the operating temperature by the high-speed data communication.

A message counter 1513 is similar to the message counter 1308 (FIG. 76) in the basic function, but further uses a first counter that performs increment or decrement and a second count that performs increment or decrement, for the message count value. Using the first counter and the second counter allows the message counter 1513 to improve resistance to failure or falsification on the message count value. It is to be noted that a detailed description of the message counter 1513 is given later with reference to FIGS. 150 to 152. It is needless to say that the message counter 1308 (only one of the first counter or the second count) may be used instead of the message counter 1513.

<Interference Detection by Interference Detection Section (Part 1)>

Irradiation of the image sensor 1211 with any of visible light of intensity more than predetermined intensity, infrared light, and laser light, for example, causes an image captured by the image sensor 1211 to be substantially disabled or falsified.

For this reason, for example, in a case where any of visible light of intensity more than predetermined intensity, infrared light, and laser light is detected, it can be considered that abnormality caused by a light irradiation attack (interference) has occurred.

Therefore, in a case where any of visible light of intensity more than predetermined intensity, infrared light, and laser light is detected on the basis of an output result, the interference detection section 1508 notifies, by the high-speed data communication to transmit image data, the application processor 1212 of a message indicating that abnormality has occurred as the specific message.

This allows the specific message indicating that abnormality has occurred in the image sensor 1211 to be notified by the high-speed data communication to transmit image data, thus enabling the application processor 1212 to make a quick response in response to the specific message.

More specifically, in a case where the image sensor 1211 is interrupted by means of disablement, a pixel value of at least one of R, G, B, IR, or the like of each of pixel groups within a predetermined range (some or all of effective pixel regions) comes closer to saturation.

That is, the pixel value of the pixel group within the predetermined range reaches the first threshold (upper limit value) or higher. Therefore, in a case where detection is made that the pixel value of the pixel group within the predetermined range is equal to or more than the first threshold (upper limit value), for example, an abnormality message indicating that the pixel value of the pixel of the image sensor 1211 comes closer to saturation is transmitted as the specific message to the application processor 1212.

It is to be noted that, in a case where the pixel value of the pixel in a wide range (predetermined range) comes closer to saturation, not just limited to the light irradiation attack, an abnormality message indicating that abnormality has occurred in pixels of the wide range may be transmitted as the specific message. Such notification of the specific message is effective, for example, also in a case where the image sensor 1211 is accidentally irradiated with interference light.

Meanwhile, for example, there is also a light shield attack (interference) in which at least one of paint, blackout curtain, smoke screen, or a shielding material shields a surface (light-receiving surface) of the image sensor 1211 to substantially disable an image captured by the image sensor 1211.

Therefore, in a case where detection is made that the surface of the image sensor 1211 is shielded, a specific message indicating abnormality is transmitted as a message from the image sensor 1211 to the application processor 1212.

This enables the application processor 1212 that receives the specific message to make a quick response in response to the specific message.

More specifically, in a case where the image sensor 1211 is interrupted by means of disablement by shielding, a pixel value of at least one of R, G, B, IR, or the like of each of pixel groups within a predetermined range comes closer to a second threshold (lower limit value).

That is, in a case where the image sensor 1211 is interfered by means of disablement by shielding, detection is made that the pixel value of the pixel group within the predetermined range reaches the second threshold or lower and that the surface has been shielded. Thus, in a case where the shielding is detected, for example, the image sensor 1211 transmits, as the specific message, an abnormality message indicating abnormality in which the pixel value comes closer to the second threshold.

It is to be noted that, in a case where the pixel value in the wide range (predetermined range) comes closer to the second threshold (lower limit value), not just limited to the light shield attack, the abnormality message may be transmitted. Such notification of the specific message is effective, for example, also in a case where the surface (light-receiving surface) of the image sensor 1211 is accidentally shielded (interrupted).

It is to be noted that, in a case where abnormality indicating the interference by means of disablement of the image sensor 1211 is not detected on the basis of the detection result of the interference detection section 1508, a message indicating normality may be transmitted as the specific message, or a specific message may not be transmitted.

In addition, the first threshold (upper limit value) and the second threshold (lower limit value) to be used by the interference detection section 1508 may be stored in advance in the storage section 1507, for example. In this case, the interference detection section 1508 may read and use the first threshold (upper limit value) and the second threshold (lower limit value) stored in the storage section 1507. In addition, the first threshold (upper limit value) and the second threshold (lower limit value) may be optionally set.

(Interference Detection Processing by Interference Detection Section (Part 1))

Next, description is given, with reference to a flowchart in FIG. 119, of interference detection processing (Part 1) by the interference detection section 1508.

In step S1001, processing of at least one of imaging processing by the pixel 1501, AD conversion processing by the AD converter 1502, or image processing by the image processing section 1503 is executed, and a processing result is outputted to the interference detection section 1508.

In step S1002, the interference detection section 1508 determines whether or not the pixel value of the pixel group within the predetermined range is equal to or more than the first threshold (upper limit value) (larger than the upper limit value), on the basis of a processing result of at least one of the imaging processing by the pixel 1501, the AD conversion processing by the AD converter 1502, or the image processing by the image processing section 1503.

In a case where determination is made in step S1002 that the pixel value of the pixel group within the predetermined range is equal to or more than the first threshold (upper limit value), the processing proceeds to step S1003.

In step S1003, the interference detection section 1508 transmits, to the application processor 1212, a specific message including a first abnormality message indicating that the pixel value of the pixel group within the predetermined range is equal to or more than the first threshold (upper limit value), that any of visible light of intensity more than predetermined intensity, infrared light, laser light, and the like is detected, and that abnormality caused by a light irradiation attack (interference) has occurred.

In addition, in a case where determination is made in step S1002 that the pixel value of the pixel group within the predetermined range is not equal to or more than the first threshold (upper limit value), the processing proceeds to step S1004.

In step S1004, the interference detection section 1508 determines whether or not the pixel value of the pixel group within the predetermined range is equal to or less than the second threshold (lower limit value) (smaller than the lower limit value), on the basis of a processing result of at least one of the imaging processing by the pixel 1501, the AD conversion processing by the AD converter 1502, or the image processing by the image processing section 1503.

In a case where determination is made in step S1004 that the pixel value of the pixel group within the predetermined range is equal to or less than the second threshold (lower limit value), the processing proceeds to step S1005.

In step S1005, the interference detection section 1508 transmits, to the application processor 1212, a specific message including a second abnormality message indicating that the pixel value of the pixel group within the predetermined range is equal to or less than the second threshold (lower limit value), that the surface (light-receiving surface) of the image sensor 1211 is shielded by at least one of paint, blackout curtain, smoke screen, or a shielding material, for example, and that abnormality caused by a light shield attack (interference) that substantially disables an image captured by the image sensor 1211 has occurred.

Further, in a case where determination is made in step S1004 that the pixel value of the pixel group within the predetermined range is not equal to or less than the second threshold (lower limit value), the processing proceeds to step S1006.

In step S1006, the interference detection section 1508 transmits, to the application processor 1212, a specific message including a normality message indicating that no abnormality caused by an attack (interference) that substantially disables an image captured by the image sensor 1211 has occurred.

With the above-described processing, in a case where an attack (interference) occurs on the image sensor 1211, notification is made by the high-speed data communication to transmit image data, thus making it possible, in the application processor 1212, to implement a quick and appropriate response.

<Interference Detection by Interference Detection Section (Part 2)>

The description has been given above of the example in which the presence or absence of an attack (interference) on the image sensor 1211 by means of a change in intensity of light is detected and notified as a specific message.

When functioning as a distance measurement sensor using a ToF (Time of Flight) method, the image sensor 1211 detects a light reception pattern corresponding to a light emission pattern of laser light irradiated from a light source to thereby recognize it as reflected light of the light source irradiated by itself and to distinguish it from the light reception pattern from another light source. At this time, the distance measurement sensor implements the distance measurement in the unit of pixel from round-trip time based on a difference between an irradiation timing of light irradiated from its own light source and a light reception timing, and generates a distance image from a distance measurement result.

Here, the distance image refers to an image including distance pixel signals based on depth-direction distances detected for each pixel from the distance measurement sensor of a subject. In that case, the distance measurement sensor is implemented as a configuration including, for example, an illumination unit, an imaging unit, a control unit, a display unit, and a storage unit.

However, when this light emission pattern (light reception pattern) is falsified for some reason, it is not possible to recognize the light emission pattern irradiated from its own light source, thus resulting in a state where it is not possible to appropriately measure a distance, i.e., a state where abnormality has occurred.

Therefore, the interference detection section 1508 may store, as a storage pattern, the light emission pattern (light reception pattern) in advance in the storage section 1507 to detect the presence or absence of the occurrence of abnormality by comparison with a light reception pattern actually received by the image sensor 1211.

The illumination unit includes an illumination controller and a laser light source. The illumination controller controls a pattern in which the laser light source irradiates irradiation light (laser light)under the control of the control unit. For example, the illumination controller controls a pattern (light emission pattern) in which the laser light source irradiates irradiation light in accordance with an irradiation code included in an irradiation signal supplied from the control unit.

The imaging unit includes a lens, an imaging element, and a signal processing circuit. The lens allows incident light to be formed on an imaging surface of the imaging element. The configuration of the lens is optional; for example, the imaging unit may be configured by multiple lens groups. The imaging element is implemented by, for example, the image sensor 1211 including a CMOS (Complementary Metal Oxide Semiconductor) image sensor using a ToF method. The imaging element performs imaging of a subject under the control of the control unit, and supplies a resulting image signal to the signal processing circuit. For example, the imaging element generates a pixel signal that correlates a reference signal supplied from the control unit with received light including reflected light obtained by a subject reflecting irradiation light irradiated from the laser light source, and supplies the generated pixel signal to the signal processing circuit. It is to be noted that the reference signal includes a reference code indicating a pattern to be used to detect the correlation with the received light.

Here, in a case where there is abnormality in a result extracted by the image sensor 1211 from the received light for a light reception pattern such as a light reception waveform pattern, a light reception spot pattern, a light reception dot pattern, or a light reception trajectory pattern, an abnormality message may be transmitted to the control unit (corresponding to the application processor 1212) from the imaging unit (corresponding to the image sensor 1211) including the imaging element (corresponding to the pixel and the converter), and the signal processing circuit (corresponding to the image processing section).

Meanwhile, the light reception pattern may be transmitted as a specific message without storing the storage pattern in the storage unit inside the image sensor 1211. In that case, the storage pattern is stored in the storage unit (e.g., the application processor 1212) outside the image sensor 1211, thereby making a comparison with the light reception pattern and allowing for determination as to whether normality or abnormality.

<Concerning Light Reception Pattern>

Figure 120:
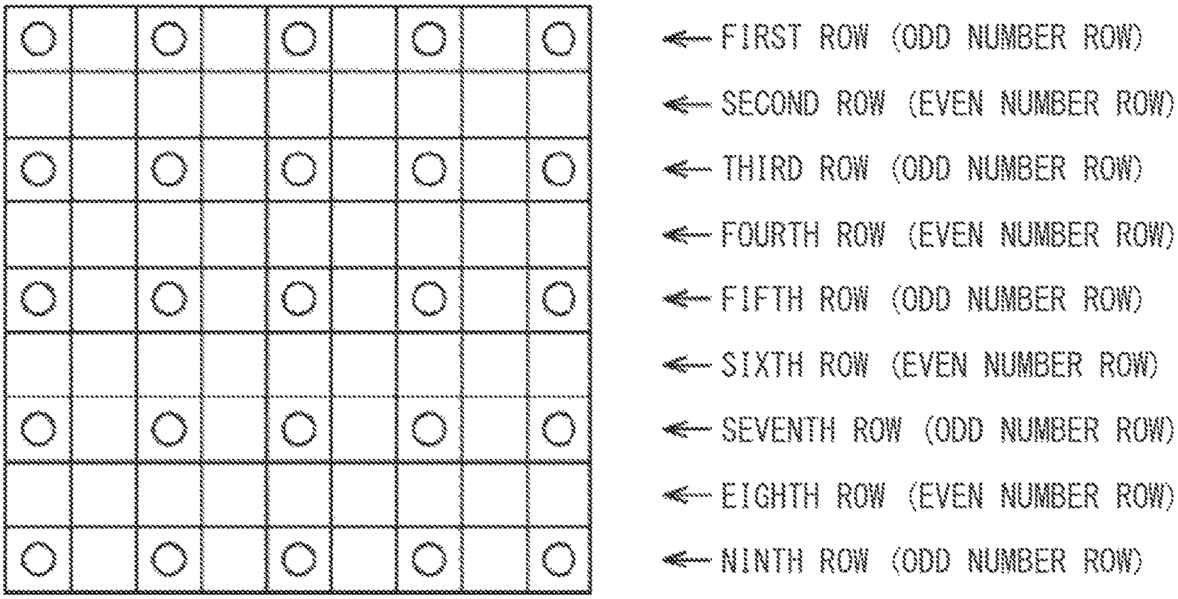

In a case where the light reception pattern itself is transmitted, information related to a pixel not having received light may not be subject to the high-speed data transmission. For example, in the case of a dot pattern in which a pixel indicated by a white circle as illustrated in FIG. 120 indicates a pixel to receive light, only information related to a dot pattern of light reception indicated by the white circle may be subject to the high-speed data transmission. For example, a pixel not having received light is used to determine whether or not the light reception spot pattern or the light reception dot pattern is normal or abnormal. In that case, the image sensor 1211 is able to determine whether the light reception pattern is normal or abnormal while minimizing the amount of data to be subject to the high-speed data transmission.

Figure 121:
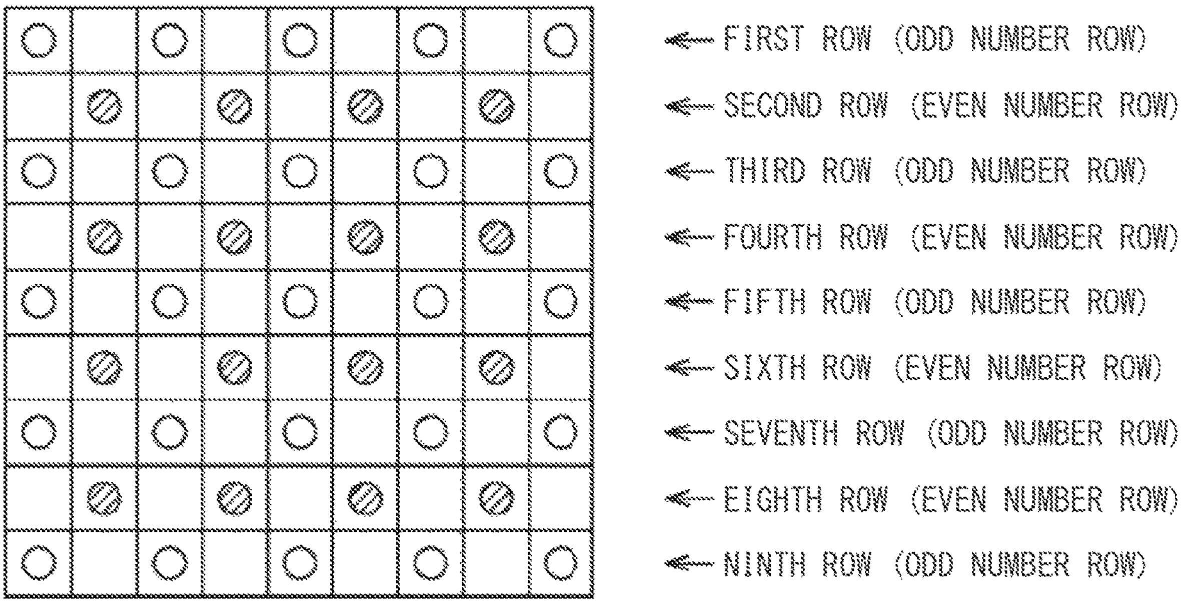

In addition, it is possible for a cyclic light reception dot pattern to reduce the types of storage patterns stored in the storage unit. For example, in the case of a dot pattern in which, as illustrated in FIG. 121, a pixel to receive light at a first pixel value indicated by a white circle and a pixel to receive light at a second pixel value indicated by a hatched circle indicate pixels to receive light, by storing dot patterns of a dot pattern in an odd number row and a dot pattern in an even number row in the storage section 1507, it is possible to determine whether the actual light reception pattern is normal or abnormal. In this manner, for the cyclic light reception dot pattern or the like, storing only the dot patterns for repeated row numbers in the storage section 1507 allows the storage pattern to be stored, thus making it possible to reduce the storage capacity.

Further, the light reception waveform pattern may be determined to be normal or abnormal, by the storage section 1507 storing, therein, the storage pattern, but the light reception waveform pattern is irrelevant to image data or an image pattern. Therefore, determination of the presence or absence of abnormality using the light reception waveform pattern makes it possible to reduce an influence on the capacity of the storage section 1507, even when any of the patterns such as the light reception spot pattern, the light reception dot pattern, and the light reception trajectory pattern is complicated.

(Interference Detection Processing by Interference Detection Section (Part 2))

Figure 122:
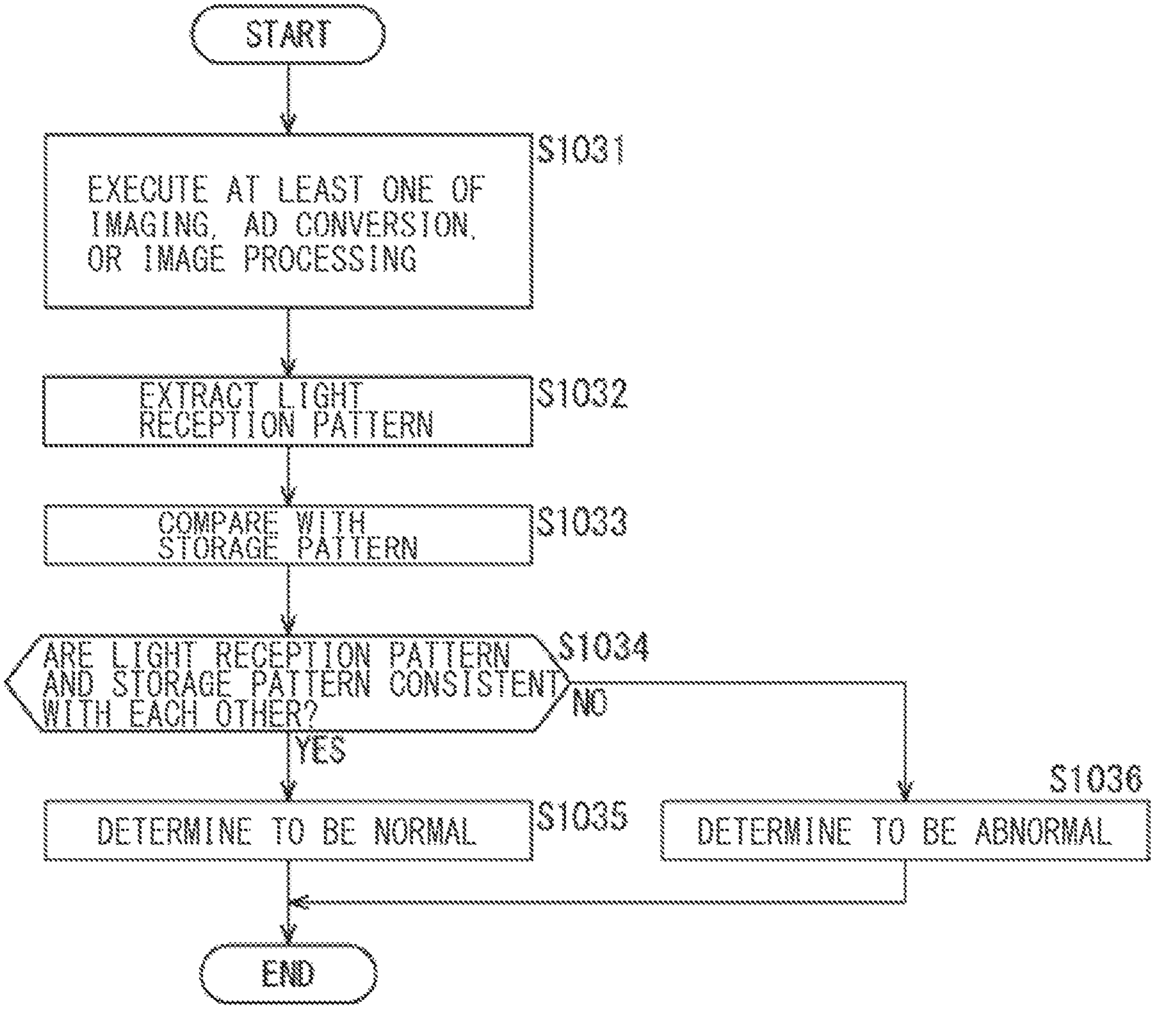

Next, description is given, with reference to a flowchart in FIG. 122, of interference detection processing (Part 2) using a light reception pattern by the interference detection section 1508.

In step S1031, processing of at least one of the imaging processing by the pixel 1501, the AD conversion processing by the AD converter 1502, or the image processing by the image processing section 1503 is executed, and a processing result is outputted to the interference detection section 1508.

In step S1032, the interference detection section 1508 extracts a light reception pattern, on the basis of a processing result of at least one of the imaging processing by the pixel 1501, the AD conversion processing by the AD converter 1502, or the image processing by the image processing section 1503.

In step S1033, the interference detection section 1508 reads a storage pattern which is the light reception pattern at normal time stored in advance in the storage section 1507 to compare it with the light reception pattern.

In step S1034, the interference detection section 1508 determines whether or not the light reception pattern and the storage pattern are consistent with each other on the basis of a result of the comparison between the light reception pattern and the storage pattern.

In a case where determination is made in step S1034 that the light reception pattern and the storage pattern are consistent with each other, the processing proceeds to step S1035.

In step S1035, the interference detection section 1508 considers that no abnormality has occurred in the distance measurement sensor implemented by the image sensor 1211, and transmits, to the application processor 1212, a specific message including a normality message indicating that no abnormality has occurred.

In a case where determination is made in step S1034 that the light reception pattern and the storage pattern are not consistent with each other, the processing proceeds to step S1036.

In step S1036, the interference detection section 1508 considers that abnormality has occurred in the distance measurement sensor implemented by the image sensor 1211, and transmits, to the application processor 1212, a specific message including an abnormality message indicating that abnormality has occurred.

In a case where the distance measurement sensor is implemented by the image sensor 1211, the above-described processing allows a corresponding specific message to be notified to the application processor 1212 by the high-speed data communication to transmit image data upon occurrence of abnormality in the light reception pattern. As a result, it is possible for the application processor 1212 to implement a quick and appropriate response to abnormality having occurred in the image sensor 1211.

<Fault Detection by Fault Detection Section>

Next, description is given of fault detection by the fault detection section 1509.

In a case where the image sensor 1211 is subject to an injection attack, such as disabling or malfunctioning some or all of the operations inside the image sensor 1211, infusing false information, or leaking information, an abnormal change occurs in a voltage state or a clock state of the physical layer.

The Presence or Absence of

Therefore, the fault detection section 1509 detects a change in the voltage state or a change in the clock state of the physical layer.

In a case of having detected an abnormal change in the voltage state of the physical layer, for example, the fault detection section 1509 notifies, by the high-speed data communication to transmit image data, the application processor 1212 of a specific message including the first abnormality message indicating that power abnormality, voltage abnormality (e.g., voltage amplitude, voltage polarity, or IR drop), or the like has occurred in the image sensor 1211.

In addition, in a case of having detected an abnormal change in the clock state of the physical layer, the fault detection section 1509 notifies, by the high-speed data communication to transmit image data, the application processor 1212 of a specific message including the second abnormality message indicating that clock abnormality (e.g., clock frequency, cyclic nature, number of times, or jitter) has occurred.

It is to be noted that, also in a case where abnormality occurs due to accidental noise, interference, or the like, not just limited to the injection attack, the fault detection section 1509 may transmit a message indicating abnormality as the specific message.

Further, there is, for example, an insertion attack, such as disabling or malfunctioning some or all of the operations inside the image sensor 1211, infusing false information, or leaking information, by activating and inserting Hardware Troy (i.e., a foreign object) that adversely affects the image sensor 1211, in a case where a particular condition is satisfied.

In a case where the image sensor 1211 is subject to the insertion attack, an abnormal change occurs in electric characteristics (e.g., Z value of an impedance value, R value of a resistance value, L value of an inductance value, C value of a capacitance value, Q value of a quality factor), transmission characteristics (e.g., data transmission quality, insertion loss, reflection loss), or the like.

Therefore, in a case of detecting electric characteristics and detecting an abnormal change in the electric characteristics, for example, the fault detection section 1509 notifies, by the high-speed data communication to transmit image data, the application processor 1212 of a third abnormality message indicating that abnormality in the electric characteristics has occurred in the image sensor 1211, as the specific message.

In addition, in a case of detecting transmission characteristics and detecting an abnormal change in the transmission characteristic, for example, the fault detection section 1509 notifies, by the high-speed data communication to transmit image data, the application processor 1212 of a fourth abnormality message indicating that abnormality in the transmission characteristic has occurred in the image sensor 1211, as the specific message.

It is to be noted that the fault detection section 1509 may detect the presence or absence of opening or shorting, i.e., disconnection or compression or the possibility thereof in a communication path or the physical layer processing section 1505, and may transmit a specific message indicating that abnormality has occurred in response to a detection result in a case where abnormality has occurred.

In addition, also in a case where abnormality occurs due to any of accidental damage, aged deterioration, temperature change, and the like, not just limited to the insertion attach, the fault detection section 1509 may transmit a message indicating abnormality as the specific message.

It is to be noted that, in a case where no abnormality has been detected, the fault detection section 1509 may transmit a specific message including the normality message, or may not transmit a specific message.

(Fault Detection Processing by Fault Detection Section)

Figure 123:
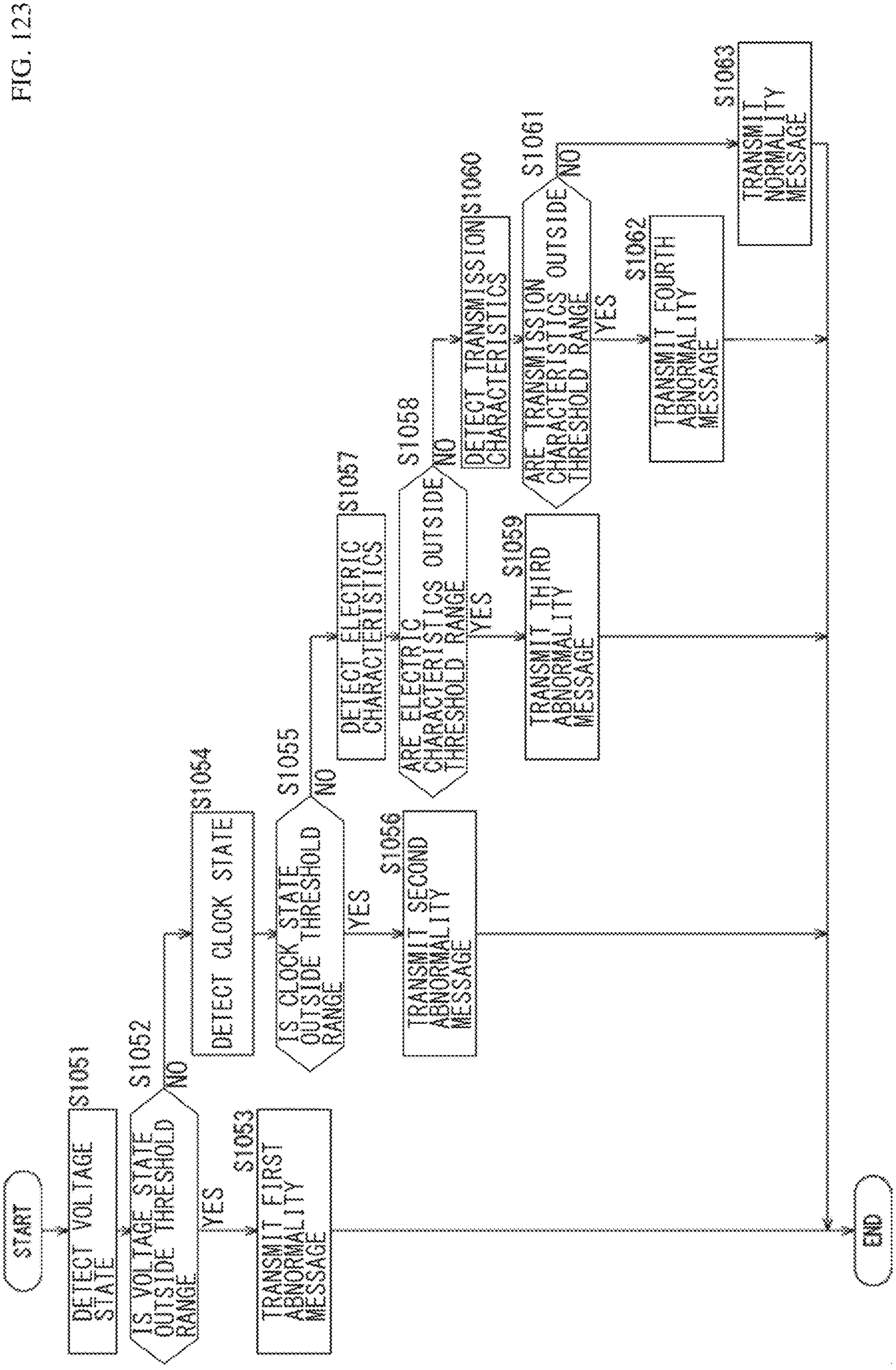

Next, description is given, with reference to a flowchart in FIG. 123, of a fault detection processing by the fault detection section 1509.

In step S1051, the fault detection section 1509 detects a voltage state of the physical layer.

In step S1052, the fault detection section 1509 determines whether or not the voltage state of the physical layer is outside a threshold range, i.e., whether or not an abnormal change has occurred.

In a case where determination is made in step S1052 that the voltage state of the physical layer is outside the threshold range and an abnormal change has occurred, the processing proceeds to step S1053.

In step S1053, the fault detection section 1509 notifies, by the high-speed data communication to transmit image data, the application processor 1212 of a specific message including the first abnormality message indicating that power abnormality or voltage abnormality (e.g., voltage amplitude, voltage polarity, or IR dropping) has occurred in the image sensor 1211.

In addition, in a case where determination is made in step S1052 that the voltage state of the physical layer is not outside the threshold range, the processing proceeds to step S1054.

In step S1054, the fault detection section 1509 detects a clock state of the physical layer.

In step S1055, the fault detection section 1509 determines whether or not the clock state of the physical layer is outside the threshold range, i.e., whether or not an abnormal change has occurred.

In a case where determination is made in step S1055 that the clock state of the physical layer is outside the threshold range and an abnormal change has occurred, the processing proceeds to step S1056.

In step S1056, the fault detection section 1509 notifies, by the high-speed data communication to transmit image data, the application processor 1212 of a specific message including the second abnormality message indicating that clock abnormality (e.g., clock frequency, cyclic nature, number of times, or jitter) has occurred.

Further, in a case where determination is made in step S1055 that the clock state of the physical layer is not outside the threshold range, the processing proceeds to step S1057.

In step S1057, the fault detection section 1509 detects electric characteristics.

In step S1058, the fault detection section 1509 determines whether or not the electric characteristics are outside the threshold range, i.e., whether or not an abnormal change has occurred.

In a case where determination is made in step S1058 that the electric characteristics are outside the threshold range and an abnormal change has occurred, the processing proceeds to step S1059.

In step S1059, the fault detection section 1509 notifies, by the high-speed data communication to transmit image data, the application processor 1212 of the third abnormality message indicating that abnormality in the electric characteristics has occurred in the image sensor 1211, as the specific message.

Further, in a case where determination is made in step S1058 that an abnormal change in the electric characteristics has not occurred, the processing proceeds to step S1060.

In step S1060, the fault detection section 1509 detects transmission characteristics.

In step S1061, the fault detection section 1509 determines whether or not the transmission characteristics are outside the threshold range, i.e., whether or not an abnormal change has occurred.

In a case where determination is made in step S1061 that the transmission characteristics are outside the threshold range and an abnormal change has occurred, the processing proceeds to step S1062.

In step S1062, the fault detection section 1509 notifies, by the high-speed data communication to transmit image data, the application processor 1212 of the fourth abnormality message indicating that abnormality in the transmission characteristics has occurred in the image sensor 1211, as the specific message.

Further, in a case where determination is made in step S1061 that an abnormal change in the transmission characteristics has not occurred, the processing proceeds to step S1063.

In step S1063, the fault detection section 1509 notifies, by the high-speed data communication to transmit image data, the application processor 1212 of a message indicating that the image sensor 1211 is normal, as the specific message.

In a case of detecting the presence or absence of the injection attack or the insertion attack and of detecting the injection attack or the insertion attack, the above-described processing makes it possible to notify the application processor 1212 of the specific message including a message indicating that abnormality has occurred.

As a result, the application processor 1212 acquires the specific message in response to the presence or absence of a fault by the high-speed data communication, thereby making it possible to implement a quick and appropriate response in response to the specific message.

<Abnormal Detection in Security Section by Aggression Detection Section>

Next, description is given of abnormality detection in the security section 1510 by the aggression detection section 1511.

The security section 1510 may possibly be subject to an analysis attack (power analysis attack, electromagnetic analysis attack) that leaks information inside the image sensor 1211 by analyzing electric power to be used for the image sensor 1211 or electromagnetism generated from the image sensor 1211, for example, in addition to the injection attack, such as disabling or malfunctioning some or all of the operations inside the image sensor 1211, infusing false information, and leaking information.

Therefore, in addition to the above-described abnormality detection, the aggression detection section 1511 logically detects the presence or absence of falsification inside the security section 1510 associated with the injection attack, and physically detects whether or not there is an attack object (e.g., probe) necessary for power analysis or electromagnetic analysis in the vicinity of the security section 1510, to thereby detect the presence or absence of abnormality associated with an aggression and transmit an abnormality message as the specific message in a case where abnormality is detected.

(Processing of Abnormality Detection in Security Section by Aggression Detection Section)

Figure 124:
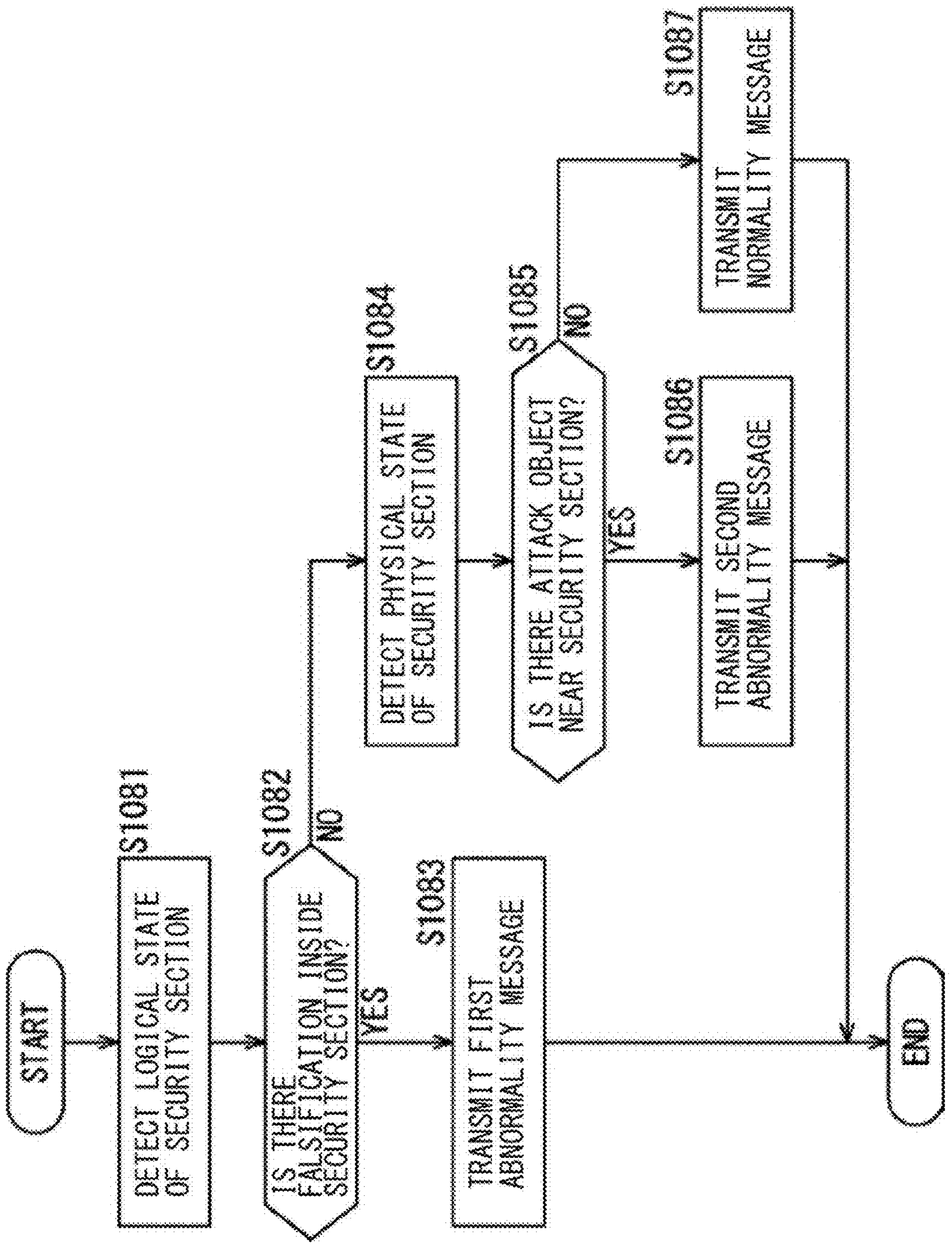

Next, description is given, with reference to a flowchart in FIG. 124, of processing of abnormality detection in the security section 1510 by the aggression detection section 1511.

In step S1081, the aggression detection section 1511 detects information indicating a logical state of the security section 1510.

In step S1082, the aggression detection section 1511 determines whether or not falsification has occurred inside the security section 1510 on the basis of the detected information indicating the logical state of the security section 1510.

In a case where determination is made in step S1082 that falsification has occurred inside the security section 1510, the processing proceeds to step S1083.

In step S1083, the aggression detection section 1511 notifies, by the high-speed data communication to transmit image data, the application processor 1212 of the first abnormality message indicating that falsification inside the security section 1510 associated with an injection attack has occurred, as the specific message.

In a case where determination is made in step S1082 that falsification has not occurred inside the security section 1510, the processing proceeds to step S1084.

In step S1084, the aggression detection section 1511 detects information indicating the physical state of the security section 1510.

In step S1085, the aggression detection section 1511 determines whether or not there is an attack object (e.g., probe) necessary for power analysis or electromagnetic analysis in the vicinity of the security section 1510, on the basis of the detected information indicating the physical state of the security section 1510.

In a case where determination is made in step S1085 that there is an attack object (e.g., probe) necessary for the power analysis or the electromagnetic analysis to be used for the analysis attack in the vicinity of the security section 1510, the processing proceeds to step S1086.

In step S1086, the aggression detection section 1511 notifies, by the high-speed data communication to transmit image data, the application processor 1212 of the second abnormality message indicating that there is an attack object (e.g., probe) necessary for the power analysis or the electromagnetic analysis in the vicinity of the security section 1510 and that there is a possibility of being subject to the power analysis attack or the electromagnetic analysis attack, as the specific message.

In a case where determination is made in step S1085 that there are no attack object (e.g., probe) necessary for the power analysis or the electromagnetic analysis in the vicinity of the security section 1510, the processing proceeds to step S1087.

In step S1087, the aggression detection section 1511 notifies, by the high-speed data communication to transmit image data, the application processor 1212 of a message indicating that the image sensor 1211 is normal, as the specific message.

The above-described processing allows for detection of aggression such as the presence or absence of logical falsification in the security section 1510 associated with the injection attack or the presence or absence of the possibility of the analysis attack. In a case where the aggression is detected, it is possible to notify the application processor 1212 of a specific message including a message indicating that abnormality associated with the aggression has occurred.

As a result, the application processor 1212 acquires a specific message in response to the presence or absence of aggression by the high-speed data communication, thereby making it possible to implement a quick and appropriate response in response to the specific message.

<Abnormality Detection by Temperature Detection Section>

Next, description is given of abnormality detection by the temperature detection section 1512.

There is a temperature attack in which the image sensor 1211 is caused to malfunction to allow an internal temperature of the image sensor 1211 or an external temperature, a communication path internal temperature, or a communication path external temperature of the image sensor 1211 to be intentionally forced, in order for the operation guarantee temperature of the communication path or the image sensor 1211 to be outside the range.

Therefore, the temperature detection section 1512 detects the presence or absence of a temperature attack on the image sensor 1211 or the communication path.

That is, the image sensor 1211 includes the upper limit value (first threshold) and the lower limit value (second threshold) of the operation guarantee temperature. Thus, in a case where the temperature of the image sensor 1211 is in a state of higher than the first threshold (upper limit value) or in a state of lower than the second sensor (lower limit value), the temperature detection section 1512 notifies the application processor 1212 of a message indicating that abnormality has occurred, as the specific message.

It is to be noted that, in a case where the temperature detected by the temperature detection section 1512 is within the operation guarantee range, the temperature detection section 1512 may transmit a specific message indicating that the temperature is normal, or may not transmit a specific message. In addition, instead of the abnormality message or the normality message, a detected temperature value itself may be transmitted as the specific message.

Further, multiple temperature detection sections 1512 may be provided for functional safety, and specific messages indicating abnormality may be transmitted in a case where respective detection results are outside corresponding respective thresholds. In that case, it is possible to address abnormality even when the abnormality occurs in some of the temperature detection sections 1512.

In addition, it is possible, in the application processor 1212, to grasp a range and a position where the abnormality occurs in the temperature detection section 1512, by analyses of a group of the specific message groups having been acquired multiple times.

(Abnormality Detection Processing by Temperature Detection Section)

Figure 125:
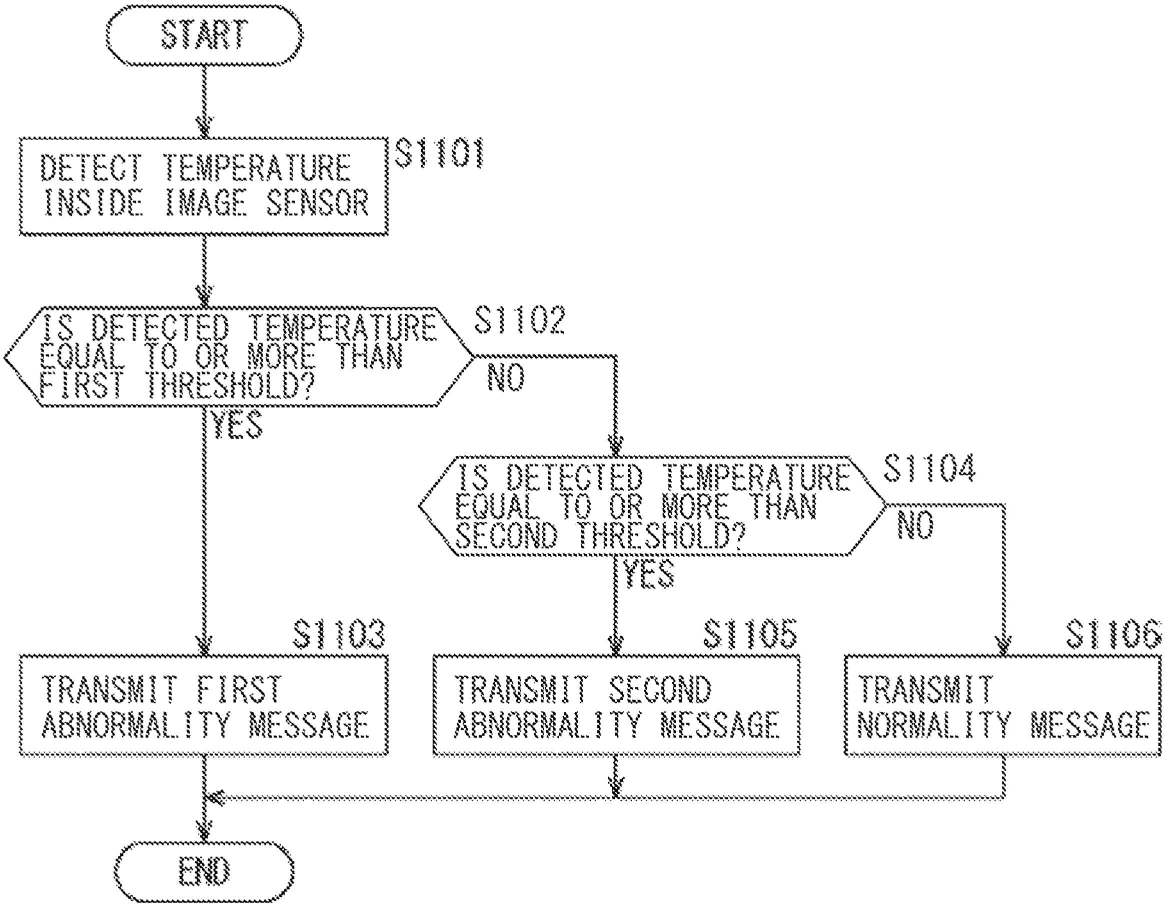

Next, description is given, with reference to a flowchart in FIG. 125, of abnormal detection processing by the temperature detection section 1512.

In step S1101, the temperature detection section 1512 detects a temperature inside the image sensor 1211.

In step S1102, the temperature detection section 1512 determines whether or not the detected temperature of the image sensor 1211 is equal to or more than the first threshold (upper limit value) (higher than the first threshold).

In a case where determination is made in step S1102 that the detected temperature of the image sensor 1211 is equal to or more than the first threshold (upper limit value), the processing proceeds to step S1103.

In step S1103, the temperature detection section 1512 notifies, by the high-speed data communication to transmit image data, the application processor 1212 of a specific message including the first abnormality message indicating that the image sensor 1211 is equal to or more than the operation guarantee temperature and that abnormality has occurred.

In addition, in a case where determination is made in step S1102 that the detected temperature of the image sensor 1211 is not equal to or more than the first threshold (upper limit value), the processing proceeds to step S1104.

In step S1104, the temperature detection section 1512 determines whether or not the detected temperature of the image sensor 1211 is equal to or less than the second threshold (lower limit value) (less than the second threshold).

In a case where determination is made in step S1104 that the detected temperature of the image sensor 1211 is equal to or less than the second threshold (lower limit value), the processing proceeds to step S1105.

In step S1105, the temperature detection section 1512 notifies, by the high-speed data communication to transmit image data, the application processor 1212 of a specific message including the second abnormality message indicating that the image sensor 1211 is equal to or less than the operation guarantee temperature and that abnormality has occurred.

In a case where determination is made in step S1104 that the detected temperature of the image sensor 1211 is not equal to or less than the second threshold (lower limit value), the processing proceeds to step S1106.

In step S1106, the temperature detection section 1512 transmits, to the application processor 1212, a specific message including a normality message indicating that the temperature of the image sensor 1211 is within the operation guarantee temperature and that no abnormality has occurred.

In a case where the temperature attack on the image sensor 121 occurs, the above-described processing allows for notification to that effect by the high-speed data communication to transmit image data, thus making it possible to implement a quick and appropriate response in the application processor 1212.

<Detailed Configuration Example of Application Processor that Detects Presence or Absence of Abnormality on the Basis of State and Characteristics of Image Sensor>

The description has been given hereinbefore of the example in which the image sensor 1211 detects the presence or absence of its own abnormality and transmits a specific message in response to a detection result to the application processor 1212.

However, the application processor 1212 may acquire a state and characteristics of the image sensor 1211 to detect the presence or absence of abnormality.

Figure 126:
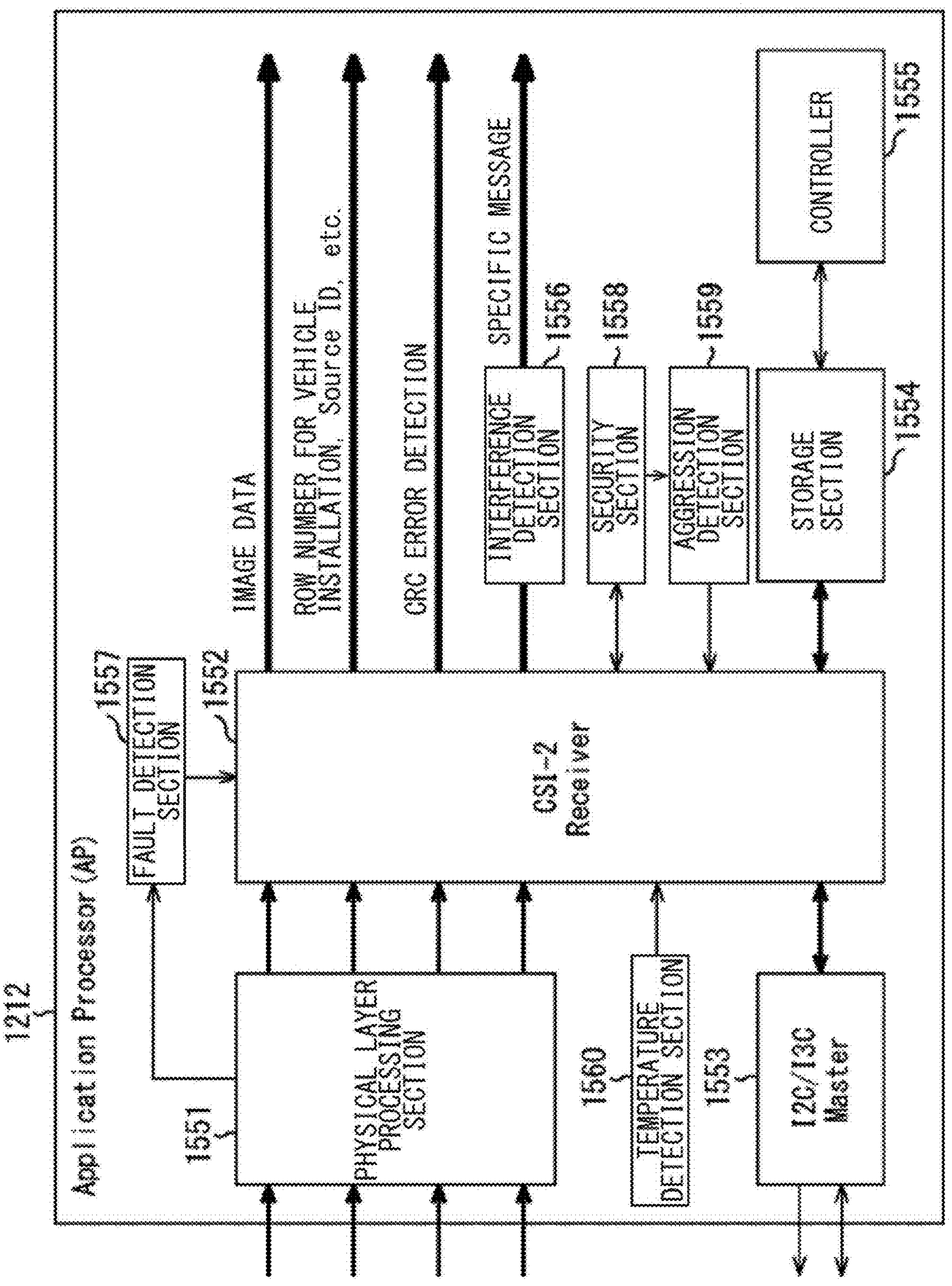

FIG. 126 illustrates a configuration example of the application processor 1212 that acquires a state and characteristics of the image sensor 1211 to detect the presence or absence of abnormality.

The application processor 1212 in FIG. 126 includes a physical layer processing section 1551, an extension mode adaptive CSI-2 reception circuit 1552, an I2C/I3C master 1553, a storage section 1554, a controller 1555, an interference detection section 1556, a fault detection section 1557, a security section 1558, an aggression detection section 1559, and a temperature detection section 1560.

It is to be noted that each of the interference detection section 1556, the fault detection section 1557, the security section 1558, the aggression detection section 1559, and the temperature detection section 1560 executes processing in response to a state and characteristics supplied from the image sensor 1211. However, respective basic functions are similar to those of the interference detection section 1508, the fault detection section 1509, the security section 1510, the aggression detection section 1511, and the temperature detection section 1512 in FIG. 118.

In addition, the physical layer processing section 1551, the extension mode adaptive CSI-2 reception circuit 1552, the I2C/I3C master 1553, the storage section 1554, the security section 1558, and the controller 1555 are configured in the same manner as respective blocks corresponding to the physical layer processing section 1321, the extension mode adaptive CSI-2 reception circuit 1322, the I2C/I3C master 1323, the storage section 1324, the security section 1326, and the controller 1327 in FIG. 77, and detailed descriptions thereof are omitted.

On the basis of image data supplied from the image sensor 1211 via the extension mode adaptive CSI-2 reception circuit 1552, the interference detection section 1556 compares any of the light reception waveform pattern, the light reception spot pattern, the light reception dot pattern, the light reception trajectory pattern, or the like with a storage pattern stored in advance in the storage section 1554, to thereby determine whether the image sensor 1211 or the image data is normal or abnormal.

The interference detection section 1556 may output, to a subsequent stage, a determination result as to whether the image sensor 1211 or the image data is normal or abnormal, as a specific message.

In addition, interference detection sections 1508 and 1577 may be provided in the image sensor 1211 and the application processor 1212, respectively. In a case where both of the interference detection sections 1508 and 1577 are provided, for example, it is possible to determine, in a doubled manner, the presence or absence of abnormality. Therefore, even when one of the interference detection section 1508 in the image sensor 1211 or the interference detection section 1577 in the application processor 1212 is attacked, it is possible to detect the presence or absence of an interference with the image sensor 1211.

The fault detection section 1557 is electrically coupled directly or indirectly to a communication path or the physical layer processing section 1551 in the application processor 1212.

In addition, the fault detection sections 1509 and 1557 may be provided in the image sensor 1211 and the application processor 1212, respectively.

For example, the image sensor 1211 measures its own electric characteristics and transmits it as a specific message to the application processor 1212 by the high-speed data communication to transmit image data.

The fault detection section 1557 measures electric characteristics in "the image sensor 1211+the communication path (physical layer)" to thereby recognize the electric characteristics in the communication path by calibration processing.

Because the Hardware Troy can be inserted into the communication path (e.g., into a wire), detection of a change in the electric characteristics in the communication path makes it possible to detect the presence or absence of the Hardware Troy with high accuracy.

Likewise, the security section 1558, the aggression detection section 1559, and the temperature detection section 1560 may be provided not only in the application processor 1212 but also in the image sensor 1211.

That is, the security sections 1510 and 1558, the aggression detection sections 1511 and 1559, and the temperature detection sections 1512 and 1560 may be provided in the image sensor 1211 and the application processor 1212, respectively.

Any of the interference detection section 1556, the fault detection section 1557, the security section 1558, the aggression detection section 1559, and the temperature detection section 1560 may be electrically coupled directly to the memory.

The memory may be electrically coupled directly to the above-described register, and any of the interference detection section 1556, the fault detection section 1557, the security section 1558, the aggression detection section 1559, and the temperature detection section 1560 may be electrically coupled directly to the register.

The memory may be a memory protected from one of information leakage or falsification in the memory. Here, the memory and the register are collectively referred to as the storage section 1554. Any of the interference detection section 1556, the fault detection section 1557, the security section 1558, the aggression detection section 1559, and the temperature detection section 1560 can be determined to have been subject to any of continuous interference, continuous fault, and continuous aggression in a short period of time, for example, and can be determined to have a temperature load for a long period of time by storing detection results of multiple times in the storage section 1554; an abnormality message indicating such a status may be transmitted.

It is to be noted that any of the storage pattern, the threshold, the first threshold, and the second threshold may be read from the storage section 1554. In addition, any of the storage pattern, the threshold, the first threshold, and the second threshold may be written by the application processor 1212 into the storage section 1507 in the image sensor 1211 at least via the I2C or the I3C.

In this manner, the periodic storage of the detection result outside the application processor 1212, e.g., in the protected storage section 1507 inside the image sensor 1211 allows the protected storage section 1507 inside the external image sensor 1211 to be analyzed when an accident occurs inside the application processor 1212, thereby making it possible to facilitate identification of the cause of the accident. Likewise, the periodic storage of the detection result outside the image sensor 1211, e.g., in the protected storage section

1554 inside the application processor 1212 allows the protected storage section 1554 inside the external application processor 1212 to be analyzed when an accident occurs in the image sensor 1211, thereby making it possible to facilitate identification of the cause of the accident.

Each of the interference detection section 1556, the fault detection section 1557, the security section 1558, the aggression detection section 1559, and the temperature detection section 1560 may be electrically coupled directly to the extension mode adaptive CSI-2 reception circuit 1552 to allow each detection result to be communicated directly from the extension mode adaptive CSI-2 reception circuit 1552.

In addition, each of the interference detection section 1556, the fault detection section 1557, the security section 1558, the aggression detection section 1559, and the temperature detection section 1560 may be electrically coupled indirectly to the extension mode adaptive CSI-2 reception circuit 1552 via the storage section 1554 or the like to allow each detection result to be communicated indirectly from the extension mode adaptive CSI-2 reception circuit 1552.

Further, the specific message may be outputted directly from the extension mode adaptive CSI-2 reception circuit 1552 or may be outputted indirectly from the extension mode adaptive CSI-2 reception circuit 1552 via the storage section 1554 or the like.

In addition, each of the interference detection section 1556, the fault detection section 1557, the security section 1558, the aggression detection section 1559, and the temperature detection section 1560 may be electrically coupled directly to the communication path or electrically coupled indirectly thereto via the storage section 1554 or the like.

It is to be noted that at least the communication path to be used for the high-speed data transmission is considered to have higher sensitivity to attack detection than a communication path used only for the low-speed command transmission because the communication path to be used for the high-speed data transmission is excellent in high-frequency characteristics.

In addition, in a case where the image sensor 1211 is supplied with power via some or all of the communication paths to be used for the high-speed data transmission, only disabling the power supply at least temporarily makes it possible to disable image data streaming or operation of the image sensor 1211.

For example, replacing some or all of the communication paths to be used in the high-speed data transmission by a communication path into which the Hardware Troy is inserted and only activating the Hardware Troy wirelessly or using a timer may possibly cause an accident of the mobile body apparatus (propulsion apparatus) to occur easily. That is, the fault detection section 1557 is more suitable to the physical layer used at least for the high-speed data transmission than a communication path specialized for the low-speed command transmission, and, further, is more particularly suitable for a physical layer to be used for power transmission.

Each of the interference detection sections 1508 and 1556, the fault detection sections 1509 and 1557, the security sections 1510 and 1558, the aggression detection section 1511 and, 1559, and the temperature detection sections 1512 and 1560 may be included in other blocks.

For example, the interference detection section 1508 may be at least partially included in any of the pixel 1501, the AD converter 1502, the image processing section 1503, the storage section 1507, and the extension mode adaptive CSI-2 transmission circuit 1504.

In addition, for example, the interference detection section 1556 may be at least partially included in any of the extension mode adaptive CSI-2 reception circuit 1552 and the storage section 1554.

Further, for example, the fault detection section 1509 may be at least partially included in any of the physical layer processing section 1505, the storage section 1507, and the extension mode adaptive CSI-2 transmission circuit 1504.

In addition, for example, the fault detection section 1557 may be at least partially included in any of the extension mode adaptive CSI-2 reception circuit 1552 and the storage section 1554.

Further, for example, each of the security section 1510, the aggression detection section 1511, and the temperature detection section 1512 may be at least partially included in any of the storage section 1507 and the extension mode adaptive CSI-2 transmission circuit 1504.

In addition, for example, each of the security section 1558, the aggression detection section 1559, and the temperature detection section 1560 may be at least partially included in any of the storage section 1554 and the extension mode adaptive CSI-2 transmission circuit 1552.

In addition, each of the pixel 1501, the AD converter 1502, the image processing section 1503, the physical layer processing section 1505, the extension mode adaptive CSI-2 transmission circuit 1504, the extension mode adaptive CSI-2 reception circuit 1552, the storage sections 1507 and 1554, the I2C/I3C slave 1506, the I2C/I3C master 1553, the interference detection sections 1508 and 1556, the fault detection sections 1509 and 1557, the security sections 1510 and 1558, the aggression detection sections 1511 and 1559, and the temperature detection sections 1512 and 1560 may be directly or indirectly controlled by the controller or a control section of the mobile body apparatus (propulsion apparatus), or an unillustrated new control section.

<Processing to Detect Presence or Absence of Abnormality in Image Sensor by Application Processor>

Figure 127:
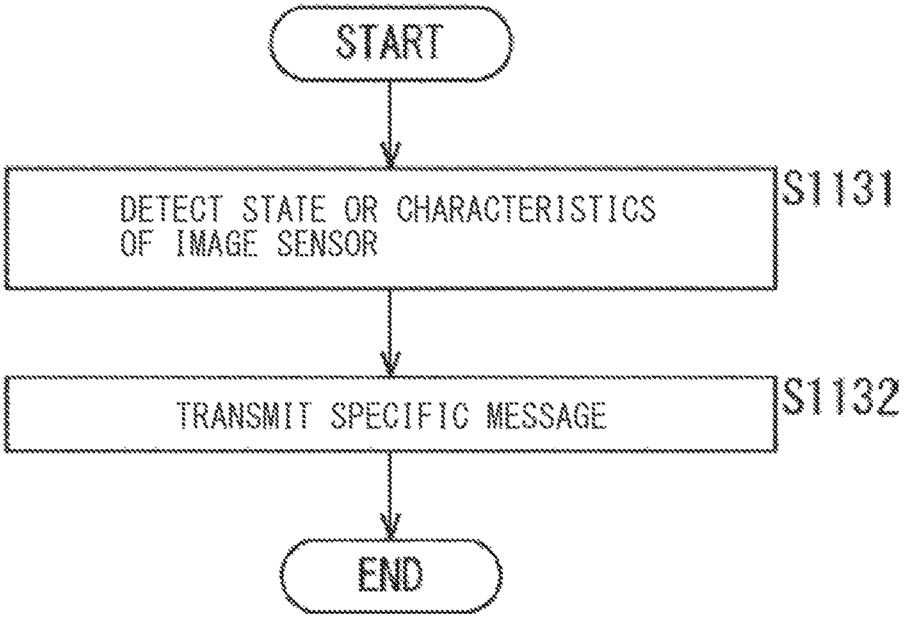
Figure 128:
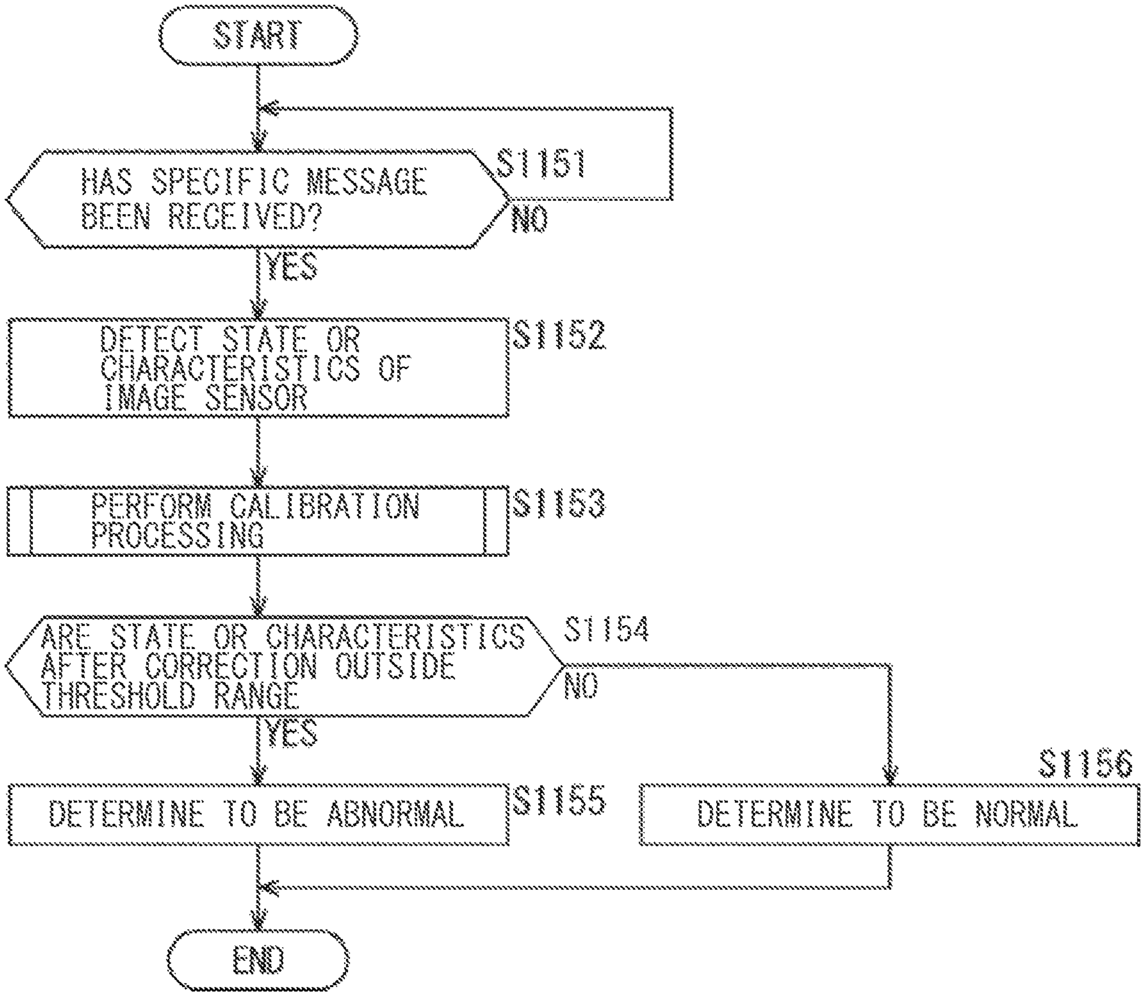

Next, description is given, with reference to flowcharts in FIGS. 127 and 128, of processing to detect the presence or absence of abnormality in the image sensor by the application processor.

It is to be noted that the flowchart in FIG. 127 illustrates processing of the image sensor 1211, and the flowchart in FIG. 128 illustrates processing of the application processor 1212.

In step S1131 (FIG. 127), the image sensor 1211 detects its own state or characteristics necessary to determine the presence or absence of abnormality.

More particularly, each of the interference detection section 1508, the fault detection section 1509, the aggression detection section 1511, and the temperature detection section 1512 described above in the image sensor 1211 detects a state or characteristics necessary in determining the presence or absence of abnormality in the image sensor 1211.

However, in this processing, only various states or characteristics are detected, and the presence or absence of the abnormality is not determined.

In step S1132, the image sensor 1211 transmits, as a specific message, detected its own state or characteristics by the high-speed data communication to transmit image data.

More particularly, each of the interference detection section 1508, the fault detection section 1509, the aggression detection section 1511, and the temperature detection section 1512 transmits, as specific message, a state or characteristics necessary in determining the presence or absence of abnormality in the image sensor 1211 by the high-speed data communication to transmit image data.

It is to be noted that the processing to be performed by the interference detection section 1508, the fault detection section 1509, the aggression detection section 1511, and the temperature detection section 1512 of the image sensor 1211 as described above is only given, hereinafter, as a simple expression that the image sensor 1211 detects its own state or characteristics and that the image sensor 1211 transmits detected its own state or characteristics to the application processor 1212.

In step S1151 (FIG. 128), the application processor 1212 determines whether or not a specific message to be transmitted from the image sensor 1211 has been received.

More particularly, determination is made as to whether or not each of the interference detection section 1556, the fault detection section 1557, the aggression detection section 1559, and the temperature detection section 1560 of the application processor 1212 has received a specific message from at least one of the interference detection section 1508, the fault detection section 1509, the aggression detection section 1511, or the temperature detection section 1512 of the image sensor 1211. However, determination may be made as to whether or not one of the security section 1558, the controller 1555, the extension mode adaptive CSI-2 reception circuit 1552, or the physical layer processing section 1551 has received a specific message from at least one of the interference detection section 1508, the fault detection section 1509, the aggression detection section 1511, or the temperature detection section 1512 of the image sensor 1211.

In a case where determination is made in step S1151 that the specific message has been received, the processing proceeds to step S1152.

In step S1152, the application processor 1212 detects a state or characteristics of the image sensor 1211 transmitted as the specific message.

More particularly, at least one of the interference detection section 1556, the fault detection section 1557, the aggression detection section 1559, or the temperature detection section 1560 of the application processor 1212 detects a state or characteristics for detecting each abnormality included in the received specific message.

In step S1153, the application processor 1212 corrects the detected state or characteristics of the image sensor 1211 by performing calibration processing thereon.

More particularly, at least one of the interference detection section 1556, the fault detection section 1557, the aggression detection section 1559, and the temperature detection section 1560 of the application processor 1212 is corrected by performing the calibration processing on the detected state or characteristics. However, one of the security section 1558, the controller 1555, the extension mode adaptive CSI-2 reception circuit 1552, or the physical layer processing section 1551 may be corrected by performing the calibration processing on the detected state or characteristics.

In step S1154, the application processor 1212 determines whether or not the state or characteristics of the image sensor 1211 corrected by the calibration processing is outside a threshold range that is considered normal.

More particularly, at least one of the interference detection section 1556, the fault detection section 1557, the aggression detection section 1559, or the temperature detection section 1560 of the application processor 1212 determines whether or not the state or characteristics corrected by the calibration processing are outside the threshold range that is considered normal. However, one of the security section 1558, the controller 1555, the extension mode adaptive CSI-2 reception circuit 1552, or the physical layer processing section 1551 may determine whether or not the state or characteristics corrected by the calibration processing are outside the threshold range that is considered normal. It is to be noted that the specific processing for determining whether or not the state or characteristics of each of them are outside the threshold range that is considered normal is processing described with reference to flowcharts in FIGS. 119 and 122 to 125.

In a case where determination is made in step S1154 that the state or characteristics are outside the threshold range that is considered normal, the processing proceeds to step S1155.

In step S1155, the application processor 1212 considers that the image sensor 1211 is abnormal.

In addition, in a case where determination is made in step S1154 that the state or characteristics are outside the threshold range that is considered normal, the processing proceeds to step S1156.

In step S1156, the application processor 1212 considers that the image sensor 1211 is normal.

That is, determination is made, in at least one of the security section 1558, the controller 1555, the extension mode adaptive CSI-2 reception circuit 1552, the physical layer processing section 1551, the interference detection section 1556, the fault detection section 1557, the aggression detection section 1559, and the temperature detection section 1560 of the application processor 1212, that the state or characteristics corrected by the calibration processing are outside the threshold range that is considered normal, the image sensor 1211 is considered abnormal. In a case where determination is made not to be outside the threshold range, the image sensor is considered normal.

The above-described processing enables the application processor 1212 to also determine the presence or absence of abnormality in the image sensor 1211; even when abnormality occurs in the image sensor 1211, it is possible for the application processor 1212 to implement a quick and appropriate response.

It is to be noted the above-described processing to determine the presence or absence of abnormality in the image sensor 1211 by the interference detection section 1556, the fault detection section 1557, the aggression detection section 1559, and the temperature detection section 1560 of the application processor 1212 is simply referred to as processing for the application processor 1212 to determine the presence or absence of abnormality in the image sensor 1211 on the basis of the state or characteristics of the image sensor 1211, or abnormality diagnosis (processing). However, the application processor 1212 may detect the presence or absence of abnormality without acquiring the state or characteristics of the image sensor 1211. That is, each of the interference detection section 1556, the fault detection section 1557, the aggression detection section 1559, and the temperature detection section 1560 of the application processor 1212 may detect a state or characteristics necessary in determining the presence or absence of abnormality in the application processor 1212, to determine the presence or absence of the abnormality.

<Example of Executing High-Speed Data Transmission of Specific Message Without Inhibiting High-Speed Data Transmission of Image Data>

It has been assumed hereinabove that the specific message is subject to the high-speed data transmission of image data; however, there is a possibility that performing the high-speed data transmission without considering a transmitting timing may inhibit the high-speed data transmission of image data.

Therefore, description is given of an example of implementing the high-speed data transmission of the specific message without inhibiting the high-speed data transmission of image data.

In order to implement the high-speed data transmission of the specific message without inhibiting the high-speed data transmission of the image data, it is necessary to perform the transmission in line with a transmission timing of various types of data in the high-speed data transmission of the image data.

Therefore, the specific message needs to be transmitted within a period of time from the frame start to the frame end or within a period of time from the frame end to the frame start (frame blanking period) upon transmitting the image data.

Figure 129:
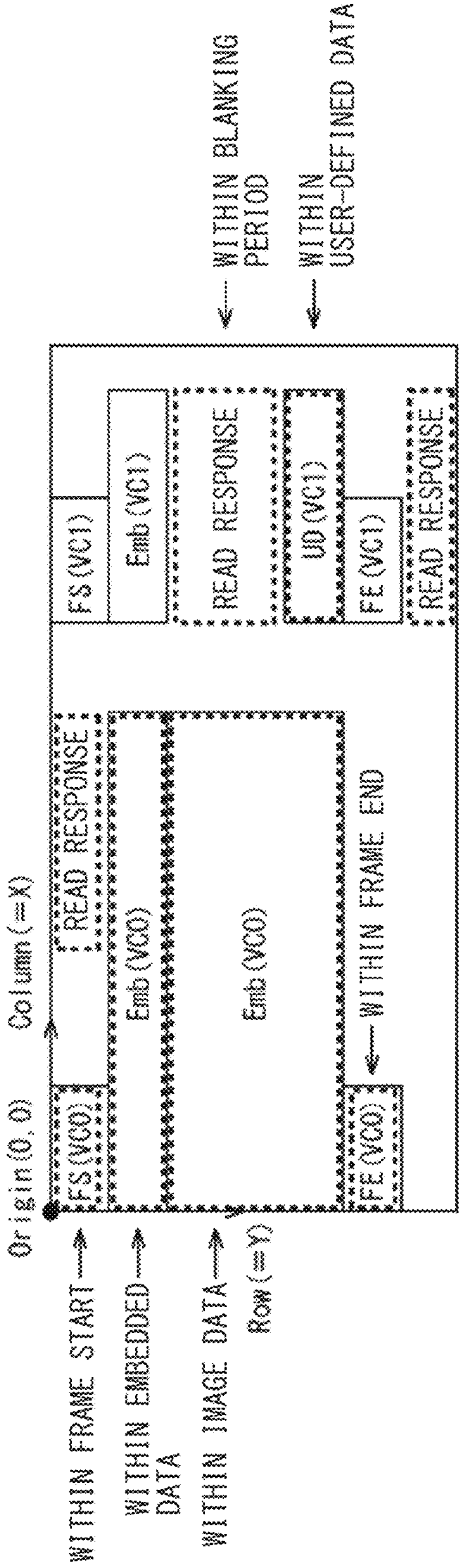

Here, among the periods of time from the frame start to the frame end, the period in which the specific message can be transmitted is, as illustrated in FIG. 129, one of periods in the frame start, the embedded data, the image data, the non-image data (the read response and the user-defined data), the frame end, or the line blanking period, for example. It is to be noted that, in a case where a CCI channel is assigned to VC0, for example, VC0 in FIG. 129 may be replaced by the VC1, and VC1 in FIG. 129 may be replaced by the VC2.

It is to be noted that description is given hereinafter of an example in which the high-speed data transmission of the image data and the high-speed data transmission of the specific message are executed in series instead of being executed in parallel. However, in a case where the high-speed data transmission of the image data and the transmission of the specific message (the high-speed data transmission or the low-speed command transmission) differ in the communication path, they may be executed in parallel.

In addition, frequency separation by a filter is possible for the high-speed data transmission and the low-speed command transmission, some or all of the transmissions may be overlapped (executed in parallel) unless power consumption is an issue.

Further, the above-described processing to detect the presence or absence of its own abnormality by the image sensor 1211 and the processing to detect the presence or absence of abnormality in the image sensor 1211 by the application processor 121 on the basis of the state or characteristics from the image sensor 1211 are hereinafter referred to, respectively, as abnormality diagnosis (processing) by the image sensor 1211 and abnormality diagnosis (processing) by the application processor 1212.

Here, as for the abnormality diagnosis (processing) in the image sensor 1211, in a case where the image sensor 1211 determines the presence or absence of abnormality on the basis of its own state or characteristics, a series of processing to determine the presence or absence of its own abnormality by the image sensor 1211 serves as the abnormality diagnosis (processing).

Meanwhile, in a case where the abnormality diagnosis (processing) of the image sensor 1211 is performed in the application processor 1212 on the basis of the state or characteristics of the image sensor 1211, the abnormality diagnosis (processing) in the image sensor 1211 is processing only to detect its own state or characteristics (without determining the presence or absence of abnormality).

In addition, abnormality diagnosis made at a predetermined time interval or at a predetermined operation interval is referred to as periodic abnormality diagnosis, and abnormality diagnosis made at the start of processing is referred to as initial abnormality diagnosis.

The specific message which is a result of the periodic abnormality diagnosis may be stored for transmission in at least a portion of embedded data indicating the vendor specific code (Vendor specific), the reserved code (Reserved for future use), or a code newly defined as a specific message from the reserved code.

In addition, the specific message may be stored for transmission in a newly defined packet, or may be stored for transmission in a user-defined region packet or a reserved region packet.

For example, some or all of the reserved regions in the extended packet header may be newly defined as a specific message. In addition, for example, a portion or all of the user-defined region (e.g., User defined metadata) in the extended packet header may be newly defined as a specific message.

In addition, for example, a portion or all of the extended packet headers or extended packet footer defined already may be appropriated as a specific message.

However, the specific message is more immediate when being stored in the extended packet header rather than in the extended packet footer (abnormality can be recognized immediately in processing of the mobile body apparatus). The specific message may be a portion or all of the extended packet footer ePF1 or ePF0. In a case where the specific message is stored in the extended packet header or the extended packet footer, it is also possible to obtain backward compatibility.

<Processing in Case of Executing High-Speed Data Transmission of Specific Message Without Inhibiting High-Speed Data Transmission of Image Data>

Figure 130:
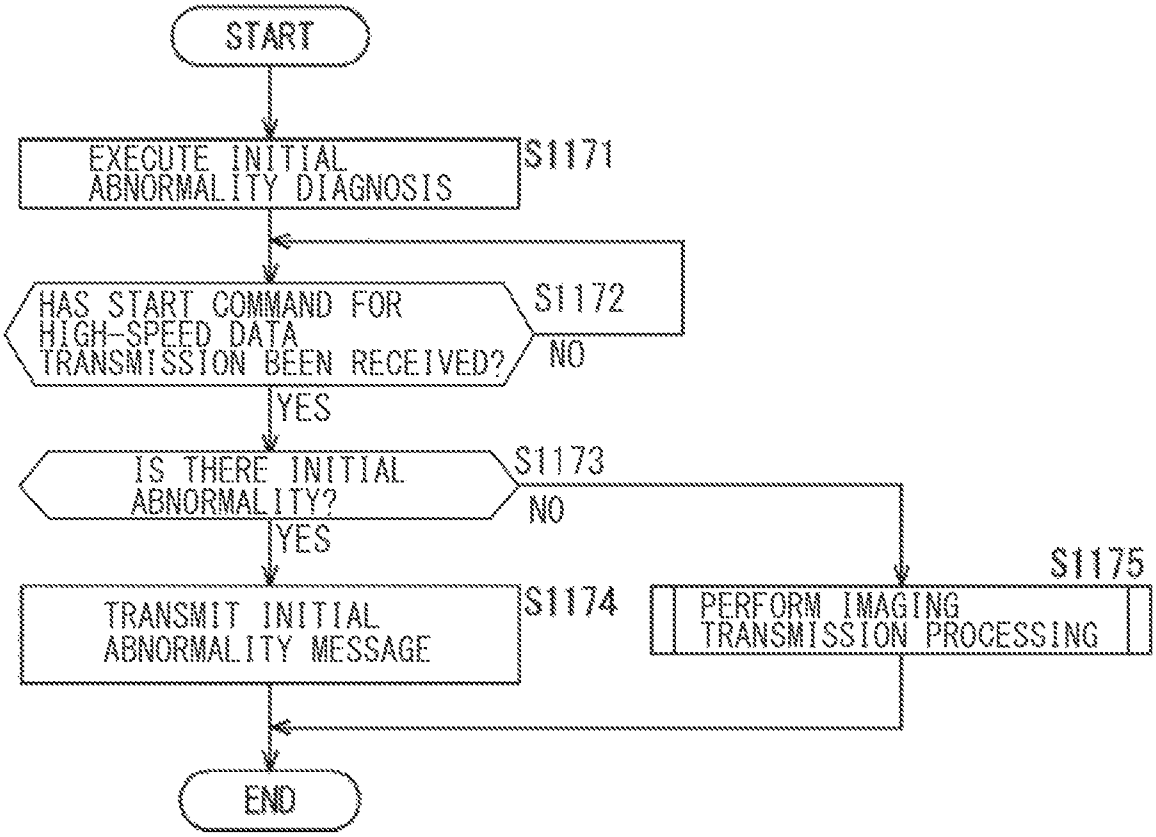

Next, description is given, with reference to a flowchart in FIG. 130, of processing of the image sensor 1211 in a case of executing high-speed data transmission of a specific message without inhibiting the high-speed data transmission of image data.

In step S1171, the image sensor 1211 executes initial abnormality diagnosis.

In step S1172, the image sensor 1211 (of which the extension mode adaptive CSI-2 transmission circuit 1504) determines whether or not a start command for the high-speed data transmission has been received, and waits for the processing until determination is made that the start command for the high-speed data transmission has been received. Then, in a case where the extension mode adaptive CSI-2 transmission circuit 1504 determines in step S1172 that the start command for the high-speed data transmission has been received, the processing proceeds to step S1173.

In step S1173, the image sensor 1211 determines whether or not initial abnormality has occurred in the image sensor 1211 in accordance with the initial abnormality diagnosis.

In a case where determination is made in step S1173 that there is initial abnormality, the processing proceeds to step S1174.

In step S1174, the image sensor 1211 (of which the extension mode adaptive CSI-2 transmission circuit 1504) transmits an initial abnormality message.

That is, in this case, imaging/transmission processing is not performed thereafter.

Meanwhile, in a case where determination is made in step S1173 that the initial abnormality has not occurred, the processing proceeds to step S1175.

In step S1175, the image sensor 1211 executes the imaging/transmission processing, in which image data captured by the pixel 1501, AD-converted by the AD converter 1502, and image-processed by the image processing section 1503 is supplied to the extension mode adaptive CSI-2 transmission circuit 1504 and transmitted to the application processor 1212.

<Imaging/Transmission Processing (Part 1)>

Figure 131:
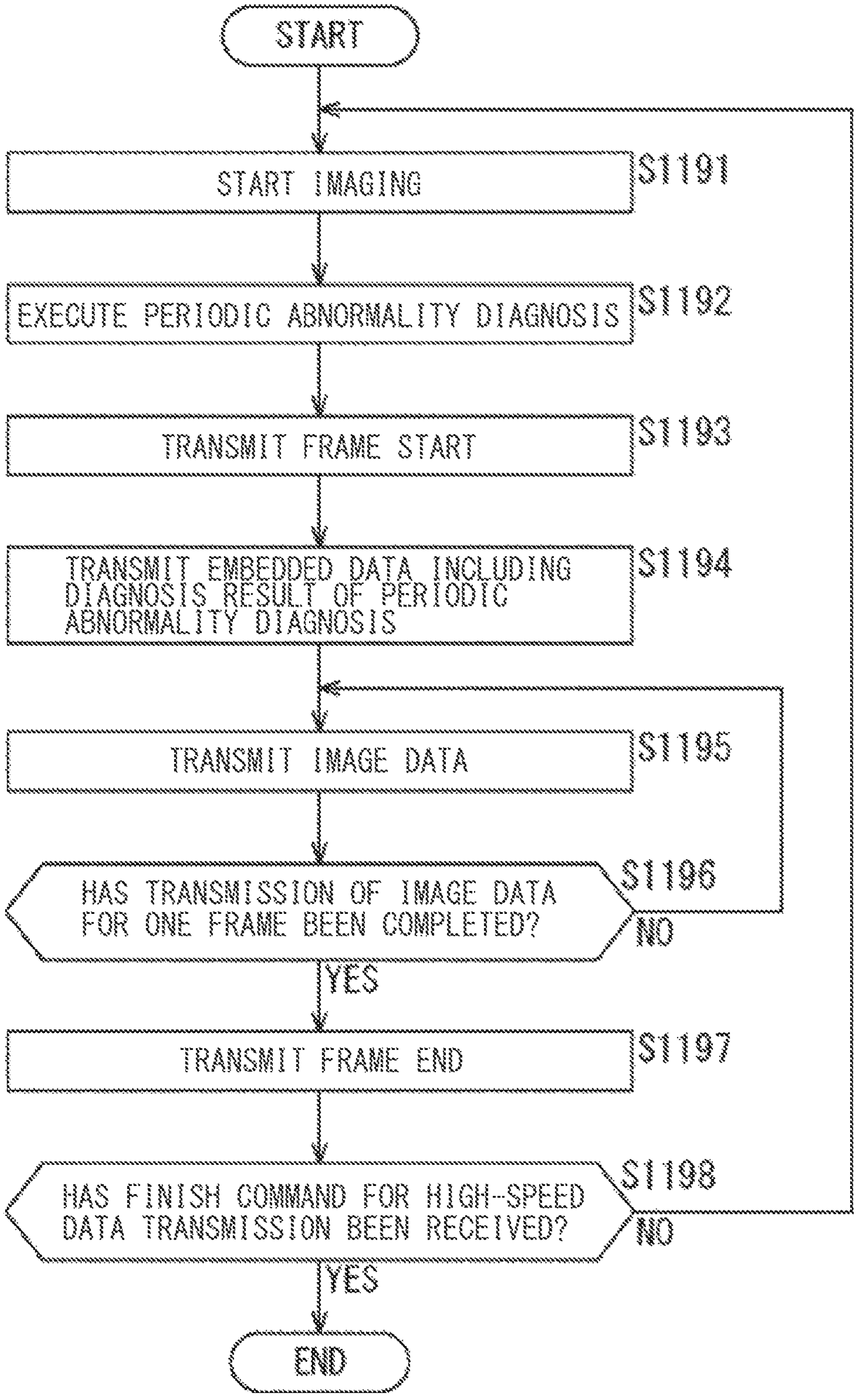

Now, description is given, with reference to a flowchart in FIG. 131, of imaging/transmission processing (Part 1).

In step S1191, the pixel 1501 starts imaging, and image data outputted from the pixel 1501 is supplied to the extension mode adaptive CSI-2 transmission circuit 1504 via the AD converter 1502 and the image processing section 1503.

In step S1192, the image sensor 1211 executes periodic abnormality diagnosis.

In step S1193, the extension mode adaptive CSI-2 transmission circuit 1504 transmits a frame start of a virtual channel.

In step S1194, the extension mode adaptive CSI-2 transmission circuit 1504 transmits embedded data of the virtual channel. At this time, the extension mode adaptive CSI-2 transmission circuit 1504 transmits a specific message that serves as a diagnosis result of the periodic abnormality diagnosis so as to be included in the embedded data of the virtual channel.

In step S1195, the extension mode adaptive CSI-2 transmission circuit 1504 transmits image data of the virtual channel.

In step S1196, the extension mode adaptive CSI-2 transmission circuit 1504 determines whether or not transmission of image data for one frame has been completed.

In a case where the extension mode adaptive CSI-2 transmission circuit 1504 determines in step S1196 that the transmission of the image data for one frame has not been completed, the processing returns to step S1195, and subsequently similar processing is repeatedly performed. Meanwhile, in a case where the extension mode adaptive CSI-2 transmission circuit 1504 determines in step S1196 that the transmission of the image data for one frame has been completed, the processing proceeds to step S1197.

In step S1197, the extension mode adaptive CSI-2 transmission circuit 1504 transmits the frame end of the virtual channel.

In step S1198, the extension mode adaptive CSI-2 transmission circuit 1504 determines whether or not a finish command for the high-speed data transmission has been received.

In a case where the extension mode adaptive CSI-2 transmission circuit 1504 determines in step S1198 that the finish command for the high-speed data transmission has not been received, the processing returns to step S1191, and subsequently similar processing is repeatedly performed. Meanwhile, in a case where the extension mode adaptive CSI-2 transmission circuit 1504 determines in step S1198 that the finish command for the high-speed data transmission has been received, the processing is finished.

The imaging/transmission processing may be continued to be executed until the finish command for the high-speed data transmission is received, or may be executed every time the start command for the high-speed data transmission is received.

The above-described processing enables the high-speed data transmission of the specific message without inhibiting the high-speed data transmission of the image data.

<Practical Application Example of Imaging/Transmission Processing>

Description has been given of the example of finishing processing in a case where the finish command for the high-speed data transmission is received in the imaging/transmission processing; however, processing may be finished in a case where the start command for the high-speed data transmission is not received.

A flowchart in FIG. 132 illustrates a practical application example of the imaging/transmission processing in which processing is finished in a case where the start command for the high-speed data transmission is not received.

It is to be noted that pieces of processing in steps S1211 to S1217 in FIG. 132 are similar to those in steps S1191 to S1197 in FIG. 131, and therefore descriptions thereof are omitted.

That is, in step S1218, in a case where the extension mode adaptive CSI-2 transmission circuit 1504 determines that the start command for the high-speed data transmission is received, the processing returns to step S1211, and subsequently similar processing is repeatedly performed. Meanwhile, in a case where the extension mode adaptive CSI-2 transmission circuit 1504 determines in step S1218 that the start command for the high-speed data transmission has not been received, the processing is finished.

The above-described processing also enables the high-speed data transmission of the specific message without inhibiting the high-speed data transmission of the image data.

<Imaging/Transmission Processing (Part 2)>

The description has been given above of the example in which the specific message that serves as a diagnosis result of the periodic abnormality diagnosis is included in the embedded data for transmission; however, second periodic abnormality diagnosis (second periodic abnormality diagnosis) may be executed so as to be included in second embedded data for transmission.

FIG. 133 is a flowchart describing imaging/transmission processing in which the second periodic abnormality diagnosis (second periodic abnormality diagnosis) is executed to allow the specific message that serves as a diagnosis result of the second periodic abnormality diagnosis to be included in the second embedded data for transmission.

It is to be noted that pieces of processing in steps S1231, S1233, S1235, S1236, S1239, and S1240 in FIG. 133 are similar to the series of processing in steps S1191, S1193, and S1195 to S1198 in FIG. 131, and therefore descriptions thereof are omitted.

That is, when the image data is supplied to the extension mode adaptive CSI-2 transmission circuit 1504 by the processing in step S1231, the image sensor 1211 executes a first periodic abnormality diagnosis (first periodic abnormality diagnosis) in step S1232.

When the frame start of the virtual channel is transmitted in step S1233, the extension mode adaptive CSI-2 transmission circuit 1504 transmits first embedded data of the virtual channel in step S1234. At this time, the extension mode adaptive CSI-2 transmission circuit 1504 a transmits specific message that serves as a diagnosis result of the first periodic abnormality diagnosis so as to be included in the first embedded data of the virtual channel.

When the transmission of the image data for one frame is completed in steps S1235 and S1236, the image sensor 1211 executes the second periodic abnormality diagnosis (second periodic abnormality diagnosis) in step S1237.

In step S1238, the extension mode adaptive CSI-2 transmission circuit 1504 transmits the second embedded data of the virtual channel. At this time, the extension mode adaptive CSI-2 transmission circuit 1504 transmits a specific message that serves as a diagnosis result of the second periodic abnormality diagnosis so as to be included in the second embedded data of the virtual channel.

Then, the frame end of the virtual channel is transmitted in step S1239, and when the finish command for the high-speed data transmission is received in step S1240, the processing is finished.

The above-described processing enables the high-speed data transmission of the specific message without inhibiting the high-speed data transmission of the image data.

In addition, in the above-described processing, the second periodic abnormality diagnosis is executed within the period of the line blanking period, which therefore does not affect the maximum value of power consumption (no periodic abnormality diagnosis is performed simultaneously with transmission). Further, the periodic abnormality diagnosis may be executed outside the line blanking period.

In addition, the specific message corresponding to the diagnosis result of the periodic abnormality diagnosis is stored in the embedded data immediately after the frame start and immediately before the frame end, thus enabling the mobile body apparatus (propulsion apparatus) to determine an abnormality occurrence timing. For example, it is possible to be determined whether the abnormality has occurred continuously, before transmission of the image data, or after the transmission of the image data. It is to be noted that the first embedded data may not be configured. In addition, a configuration may be employed in which only the second periodic abnormality diagnosis may be executed, with the first periodic abnormality diagnosis not being executed.

<Imaging/Transmission Processing (Part 3)>

The description has been given above of the example in which the second periodic abnormality diagnosis (second periodic abnormality diagnosis) is executed to allow the specific message corresponding to the diagnosis result of the second periodic abnormality diagnosis to be included in the second embedded data for transmission; however, the diagnosis result of the periodic abnormality diagnosis may be included in the read response for transmission.

That is, in a case of receiving a frame start signal transmitted by the high-speed data transmission from the image sensor 1211 which is the slave of the low-speed command transmission, the application processor 1212 which is the master of the low-speed command transmission transmits, by the low-speed command transmission, a read command requesting the application processor 1212 to read the specific message in the image sensor 1211.

The image sensor 1211 receives the read command transmitted from the application processor 1212, and transmits a read response including the specific message corresponding to the read command by the high-speed data transmission.

The application processor 1212 is able to receive the read response including the specific message to thereby receive a notification of the specific message from the image sensor 1211.

That is, the specific message may be transmitted within the line blanking period in which no image data is transmitted between the frame start and the frame end, and, in particular, is desirably transmitted within a period of time between the frame start and the image data. The read command corresponds to Read of the Read/Write in the I2C or I3C standard, for example. The read response corresponds to a Read return value. This makes it possible to quickly notify of abnormality before the transmission of the image data without affecting the maximum value of power consumption.

Now, description is given, with reference to flowcharts in FIGS. 134 and 135, of imaging/transmission processing in which the diagnosis result of the periodic abnormality diagnosis is included in the read response for transmission.

It is to be noted that the flowchart in FIG. 134 illustrates processing of the image sensor 1211, and the flowchart in FIG. 135 illustrates processing of the application processor 1212.

In addition, pieces of processing in steps S1251 to 1253 and S1257 to S1260 are similar to the pieces of processing in steps S191 to S1193 and S1195 to S1198 in FIG. 131, and therefore descriptions thereof are omitted.

That is, in steps S1251 to S1253 (FIG. 134), imaging is started, the periodic abnormality diagnosis is executed, and the frame start is transmitted. In addition, in step S1271 (FIG. 135), the extension mode adaptive CSI-2 reception circuit 1552 of the application processor 1212 determines whether or not the frame start transmitted from the image sensor 1211 has been received, and repeats similar processing until determination is made that the frame start has been received.

Then, in a case where determination is made in step S1271 that the frame start transmitted from the image sensor 1211 has been received, the processing proceeds to step S1272.

In step S1272, the extension mode adaptive CSI-2 reception circuit 1552 transmits the read command to the image sensor 1211 by the low-speed command transmission.

In response thereto, the extension mode adaptive CSI-2 transmission circuit 1504 of the image sensor 1211 determines in step S1254 (FIG. 134) whether or not the read command transmitted from the application processor 1212 has been received, and repeats similar processing until determination is made that the read command has been received.

Then, in a case where determination is made in step S1254 that the read command has been received, the processing proceeds to step S1255.

In step S1255, the extension mode adaptive CSI-2 transmission circuit 1504 transmits, by the high-speed data transmission to transmit image data, a read response including the specific message that serves as the diagnosis result of the periodic abnormality diagnosis to the application processor 1212.

In response thereto, in step S1273 (FIG. 135), the extension mode adaptive CSI-2 reception circuit 1552 of the application processor 1212 determines whether or not the read response including the specific message that serves as the diagnosis result of the periodic abnormality diagnosis transmitted from the image sensor 1211 has been received, and repeats similar processing until determination is made that the read response has been received.

Then, in a case where determination is made in step S1273 that the read response including the specific message that serves as the diagnosis result of the periodic abnormality diagnosis transmitted from the image sensor 1211 has been received, the processing proceeds to step S1274.

In step S1274, the application processor 1212 determines whether the image sensor 1211 is normal or abnormal on the basis of the specific message included in the received read response.

In step S1275, the application processor 1212 determines whether or not to transmit a finish command for the high-speed data transmission; in a case where determination is made not to finish the high-speed data transmission, the processing returns to step S1271, and subsequent processing is repeated.

Then, in a case where determination is made in step S1275 to transmit the finish command for the high-speed data transmission, the extension mode adaptive CSI-2 reception circuit 1552 transmits in step S1276 the finish command for the high-speed data transmission to the image sensor 1211, and the processing is finished.

It is to be noted that, in this processing, the specific message that serves as the diagnosis result of the periodic abnormality diagnosis may be transmitted in such a state of not being included in the embedded data in step S1256.

The above-described processing enables the diagnosis result of the periodic abnormality diagnosis to be included in the read response for transmission.

<Imaging/Transmission Processing (Part 4)>

The description has been given above of the example in which the read command is transmitted in response to the frame start, and the specific message that serves as the diagnosis result of the periodic abnormality diagnosis is included in the read response for transmission. However, the read command may be transmitted in response to the frame end, and the diagnosis result of the periodic abnormality diagnosis may be included in the read response for transmission.

In a case of receiving a frame end signal transmitted by the high-speed data transmission from the image sensor 1211 which is the slave of the low-speed command transmission, the application processor 1212 which is the master of the low-speed command transmission transmits, by the low-speed command transmission, a read command requesting the application processor 1212 to read the specific message in the image sensor 1211.

The image sensor 1211 receives the read command transmitted from the application processor 1212, and transmits a specific message (read response) corresponding to the read command by the high-speed data transmission.

Then, the application processor 1212 receives the read response to thereby acquire a notification of the specific message from the image sensor 122.

That is, the specific message is transmitted within the frame blanking period in which no image data is transmitted between the frame end and the next frame start.

Now, description is given, with reference to flowcharts in FIGS. 136 and 137, of imaging/transmission processing in which a read command is transmitted in response to the frame end, and the diagnosis result of the periodic abnormality diagnosis is included in the read response for transmission.

The flowchart in FIG. 136 illustrates processing of the image sensor 1211, and the flowchart in FIG. 137 illustrates processing of the application processor 1212.

In addition, pieces of processing in steps S1291 to S1297 and S1300 in FIG. 136 are similar to the pieces of processing in steps S1251 to S1253 and S1256 to S1260 in FIG. 134, and therefore descriptions thereof are omitted.

Further, pieces of processing in steps S1312 to S1316 in FIG. 137 are similar to the pieces of processing in steps S1272 to S1276 in FIG. 135, and therefore descriptions thereof are omitted.

That is, in the image sensor 1211, through the pieces of processing in steps S1291 to S1297 (FIG. 136), the image is captured, the periodic abnormality diagnosis is executed, and the frame start, the embedded data, the image data, and the frame end are transmitted.

In response thereto, in step S1311 (FIG. 137), the extension mode adaptive CSI-2 reception circuit 1552 of the application processor 1212 determines whether or not the frame end transmitted from the image sensor 1211 has been received, and repeats similar processing until determination is made that the frame end has been received.

Then, in a case where determination is made in step S1311 that the frame end transmitted from the image sensor 1211 has been received, the processing proceeds to step S1312.

In step S1312, the extension mode adaptive CSI-2 reception circuit 1552 transmits a read command to the image sensor 1211 by the low-speed command transmission.

In response thereto, in step S1298 (FIG. 136), the extension mode adaptive CSI-2 transmission circuit 1504 of the image sensor 1211 determines whether or not the read command transmitted from the application processor 1212 has been received, and repeats similar processing until determination is made that the read command has been received.

Then, in a case where determination is made in step S1298 that the read command has been received, the processing proceeds to step S1299.

In step S1299, the extension mode adaptive CSI-2 transmission circuit 1504 transmits, by the high-speed data transmission to transmit image data, a read response including the specific message that serves as the diagnosis result of the periodic abnormality diagnosis to the application processor 1212.

In response thereto, through pieces of processing in steps S1313 to S1316 (FIG. 135), in the application processor 1212, the read response including the specific message that serves as the diagnosis result of the periodic abnormality diagnosis transmitted from the image sensor 1211 is received, determination is made as to whether the image sensor 1211 is normal or abnormal, and the finish command for the high-speed data transmission is transmitted, and then the processing is finished.

The above-described processing enables the read command to be transmitted in response to the frame end and to transmit the diagnosis result of the periodic abnormality diagnosis so as to be included in the read response.

As a result, it is possible to transmit the specific message within the frame blanking period in which no image data is transmitted between the frame end and the next frame start.

<Imaging/Transmission Processing (Part 5)>

The description has been given of the example in which the read command is transmitted in response to the frame end, and the diagnosis result of the periodic abnormality diagnosis is included in the read response for transmission; however, the read response including the specific message may be transmitted immediately before the transmission of the frame start.

That is, for example, in the image sensor 1211, the periodic abnormality diagnosis is executed during a period of time from the start of the frame end to the transmission of the next frame start. Then, in the application processor 1212, the read command is transmitted after waiting for a predetermined period of time from the reception of the frame end to the completion of the periodic abnormality diagnosis in the image sensor 1211. It is to be noted that a timer to count time may be provided to allow the timer to count the waiting time.

Such processing enables the image sensor 1211 to notify the application processor 1212 in the shortest amount of time before transmission of image data of the second and subsequent frames, without affecting the maximum value of power consumption, that there is a possibility of occurrence of abnormality in the operation of the image sensor 1211 or that abnormality has occurred.

Now, description is given, with reference to flowcharts in FIGS. 138 and 139, of the imaging/transmission processing in which the read command is transmitted in response to the frame end and the diagnosis result of the periodic abnormality diagnosis is included in the read response for transmission.

The flowchart in FIG. 138 illustrates processing of the image sensor 1211, and the flowchart in FIG. 139 illustrates processing of the application processor 1212.

In addition, pieces of processing in steps S1331 to S1336 and S1339 to S1340 in FIG. 138 are similar to the pieces of processing in steps S1291 and S1293 to S1299 in FIG. 136, and therefore descriptions thereof are omitted.

Further, pieces of processing in steps S1351 and S1353 to S1357 in FIG. 139 are similar to the pieces of processing in steps S1311 to S1316 in FIG. 137, and therefore descriptions thereof are omitted.

That is, when the image is captured and the frame start, the embedded data, the image data and the frame are transmitted in steps S1331 to S1336 (FIG. 138), the pixel 1501 starts imaging in step S1337, and image data outputted from the pixel 1501 is supplied to the extension mode adaptive CSI-2 transmission circuit 1504 via the AD converter 1502 and the image processing section 1503.

In step S1338, the image sensor 1211 executes the periodic abnormality diagnosis.

Meanwhile, in the application processor 1212, when the frame end is received in step S1351 (FIG. 139), the processing is waited for a predetermined period of time in step S1352. This predetermined period of time is a period of time until the processing of the periodic abnormality diagnosis in step S1338 in the image sensor 1211 is completed.

Then, after waiting for processing time through the processing in step S1352, the processing proceeds to step S1353, and the read command is transmitted to the image sensor 1211.

In the image sensor 1211, through pieces of processing in steps S1339 and S1340 (FIG. 138), a read response including the specific message in response to the diagnosis result of the periodic abnormality diagnosis is transmitted to the application processor 1212, in response to the read command, by the high-speed data transmission to transmit image data. It is to be noted that, in a case where the finish command for the high-speed data transmission is not received in step S1341, the processing returns to processing in step S1332, and the subsequent processing is repeated. Then, when the finish command for the high-speed data transmission is received in step S1341, the processing is finished.

The above-described processing makes it possible to quickly notify the application processor 1212, without affecting the maximum value of power consumption, of the possibility of abnormality in the operation of the image sensor 1211 or abnormality in the operation before transmission of image data of the second and subsequent frames.

<Imaging/Transmission Processing (Part 6)>

The description has been given of the example in which the read response including the specific message is able to be transmitted immediately before the transmission of the frame start; however, the read command transmission or the read response transmission may be performed within the line blanking period after transmission of the embedded data.

Such processing makes it possible to quickly notify the application processor 1212, without affecting the maximum value of power consumption, of the possibility of abnormality in the operation of the image sensor 1211 or occurrence of abnormality in the operation before transmission of the image data.

Now, description is given, with reference to flowcharts in FIGS. 140 and 141, of the imaging/transmission processing in which the read command transmission or the read response transmission are performed within the line blanking period after transmission of embedded data.

The flowchart in FIG. 140 illustrates processing of the image sensor 1211, and the flowchart in FIG. 141 illustrates processing of the application processor 1212.

In addition, pieces of processing in steps S1371 to S1373 and S1375 to S1380 in FIG. 140 are similar to the pieces of processing in steps S1251 to S1255 and S1257 to S1260 in FIG. 134, and therefore descriptions thereof are omitted.

Further, pieces of processing in steps S1392 to S1396 in FIG. 141 are similar to the pieces of processing in steps S1272 to S1276 in FIG. 135, and therefore descriptions thereof are omitted.

That is, when an image is captured, the periodic abnormality diagnosis is executed, and the frame start is transmitted through the pieces of processing in steps S1371 to S1373 (FIG. 140), the extension mode adaptive CSI-2 transmission circuit 1504 transmits embedded data of the virtual channel in step S1374.

Meanwhile, in the application processor 1212, in step S1391 (FIG. 141), the extension mode adaptive CSI-2 reception circuit 1552 of the application processor 1212 determines whether or not a packet footer of the embedded data transmitted from the image sensor 1211 has been received, and repeats similar processing until determination is made that the packet footer has been received.

Then, in a case where determination is made in step S1391 that the packet footer of the embedded data transmitted from the image sensor 1211 has been received, the processing proceeds to step S1392.

In step S1392, the extension mode adaptive CSI-2 reception circuit 1552 transmits a read command to the image sensor 1211 by the low-speed command transmission.

In the image sensor 1211, the pieces of processing in steps S1375 and S1376 (FIG. 140) allows the read response including the specific message in response to the diagnosis result of the periodic abnormality diagnosis to be transmitted to the application processor 1212, in response to the read command, by the high-speed data transmission to transmit to image data.

The above-described processing makes it possible to quickly notify the application processor 1212, without affecting the maximum value of power consumption, of the possibility of abnormality in the operation of the image sensor 1211 or occurrence of abnormality in the operation before transmission of image data, thus making it possible to make a quick response in response to the specific message.

<Imaging/Transmission Processing (Part 7)>

The description has been given above of the example in which the read command transmission and the read response transmission are performed within the line blanking period after transmission of the embedding data, however, the read command transmission and the read response transmission may be performed within the line blanking period after transmission of image data.

In this case, the periodic abnormality diagnosis is performed in the image sensor 1211 for each line of the image data to transmit the specific message, thus making it possible to quickly notify the application processor 1212, without affecting the maximum value of power consumption, of a specific message corresponding to the image data of each row.

Now, description is given, with reference to flowcharts in FIGS. 142 and 143, of the imaging/transmission processing in which the read command transmission and the read response transmission are performed within the line blanking period after the transmission of image data.

The flowchart in FIG. 142 illustrates processing of the image sensor 1211, and the flowchart in FIG. 143 illustrates processing of the application processor 1212.

In addition, pieces of processing in steps S1411 to S1413, S1416, S1417, S1419, and S1420 in FIG. 142 are similar to the pieces of processing in steps S1371, S1373 to S1376, S1379, and S1380 in FIG. 140, and therefore descriptions thereof are omitted.

Further, pieces of processing in steps S1432 to S1436 in FIG. 143 are similar to the pieces of processing in steps 1392 to S1396 in FIG. 141, and therefore descriptions thereof are omitted.

That is, when an image is captured, the frame start is transmitted, and the embedded data is transmitted through the pieces of processing in steps S1411 to S1413 (FIG. 142), the extension mode adaptive CSI-2 transmission circuit 1504 transmits image data of the virtual channel in step S1414.

In step S1415, the image sensor 1211 executes the periodic abnormality diagnosis.

Meanwhile, in the application processor 1212, in step S1431 (FIG. 143), the extension mode adaptive CSI-2 reception circuit 1552 of the application processor 1212 determines whether or not a packet footer of the image data transmitted from the image sensor 1211 has been received, and repeats similar processing until determination is made that the packet footer has been received.

Then, in a case where determination is made in step S1431 that the packet footer of the image data transmitted from the image sensor 1211 has been received, the processing proceeds to step S1432.

In step S1432, the extension mode adaptive CSI-2 reception circuit 1552 transmits a read command to the image sensor 1211 by the low-speed command transmission.

In the image sensor 1211, the pieces of processing in steps S1416 and S1417 (FIG. 142) allows the read response including the specific message in response to the diagnosis result of the periodic abnormality diagnosis to be transmitted to the application processor 1212, in response to the read command, by the high-speed data transmission to transmit to image data.

Further, in step S1418, the extension mode adaptive CSI-2 transmission circuit 1504 determines whether or not transmission of the image data for one frame has been completed.

In step S1418, in a case where the extension mode adaptive CSI-2 transmission circuit 1504 determines that the transmission of the image data for one frame has not been completed, the processing returns to step S1414, and subsequently similar processing is repeatedly performed. Meanwhile, in a case where the extension mode adaptive CSI-2 transmission circuit 1504 determines in step S1418 that the transmission of the image data for one frame has been completed, the processing proceeds to step S1419.

The above-described processing allows the image sensor 1211 to perform the periodic abnormality diagnosis for each line of the image data to transmit the specific message, thus making it possible to quickly notify the application processor 1212, without affecting the maximum value of power consumption, of the specific message corresponding to the image data of each row.

As a result, it is possible for the application processor 1212 to make a quick response in response to the specific message.

<Imaging/Transmission Processing (Part 8)>

The description has been given above of the example in which the read command transmission and the read response transmission are performed within the line blanking period after transmission of image data; however, the specific message may be transmitted using an interrupt function.

In a case where the interrupt function is used, the image sensor 1211 is able to easily synchronize with the application processor 1212, and thus execution of interrupt at a timing determined by the image sensor 1211 makes it possible to transmit the specific message at a timing determined by the image sensor 1211.

It is to be noted that the image sensor 1211 may trigger the read command by means of in-band interrupt to transmit the read response in response thereto, or may omit the read command by means of in-band interrupt to transmit the read response.

Now, description is given, with reference to flowcharts in FIGS. 144 and 145, of the imaging/transmission processing in which the specific message is transmitted using the interrupt function.

The flowchart in FIG. 144 illustrates processing of the image sensor 1211, and the flowchart in FIG. 145 illustrates processing of the application processor 1212.

In addition, pieces of processing in steps S1451 to S1453, S1455, S1456, and S1458 to S1461 in FIG. 144 are similar to the pieces of processing in steps S1371 to S1373 and S1375 to S1380 in FIG. 140, and therefore descriptions thereof are omitted.

Further, pieces of processing in steps S1472 to S1476 in FIG. 145 are similar to the pieces of processing in steps 1392 to S1396 in FIG. 141, and therefore descriptions thereof are omitted.

That is, through the pieces of processing in steps S1451 to S1453 (FIG. 144), in the image sensor 1211, an image is captured, the periodic abnormality diagnosis is executed, and the frame start is transmitted.

In step S1454, the extension mode adaptive CSI-2 transmission circuit 1504 notifies the application processor 1212 of the start of the interrupt execution.

Meanwhile, in the application processor 1212, the extension mode adaptive CSI-2 reception circuit 1552 of the application processor 1212 determines in step S1471 (FIG. 145) whether or not a notification indicating the start of the interrupt execution transmitted from the image sensor 1211 has been received, and repeats similar processing until determination is made that the notification has been received.

Then, in a case where determination is made in step S1471 that the notification indicating the start of the interrupt execution transmitted from the image sensor 1211 has been received, the processing proceeds to step S1472.

In step S1432, the extension mode adaptive CSI-2 reception circuit 1552 transmits a read command to the image sensor 1211 by the low-speed command transmission.

In the image sensor 1211, the pieces of processing in steps S1455 and S1456 (FIG. 144) allows the read response including the specific message in response to the diagnosis result of the periodic abnormality diagnosis is transmitted to the application processor 1212, in response to the read command, by the high-speed data transmission to transmit to image data.

Further, in step S1457, the extension mode adaptive CSI-2 transmission circuit 1504 transmits embedded data.

The above-described processing enables the use of the interrupt function, and thus executing the interrupt at the timing determined by the image sensor 1211 makes it possible to transmit the specific message to the application processor 1212 at the timing determined by the image sensor 1211.

It is to be noted that the image sensor 1211 may trigger the read command by means of in-band interrupt to transmit the read response in response thereto, or may omit the read command by means of in-band interrupt to transmit the read response.

<Imaging/Transmission Processing (Part 9)>

The description has been given above of the example in which the specific message is transmitted using the interrupt function; however, the specific message may be stored in data (e.g., in embedded data) of a virtual channel, which is different from the virtual channel for the image data transmission, for transmission.

Storing the specific message in the data of the virtual channel, which is different from that in the image data transmission, for transmission makes it possible to transmit the specific message even in a case where there is no room for storing the specific message in the embedded data of the virtual channel for the image data transmission.

It is to be noted that the periodic abnormality diagnosis is executed within the frame blanking period, thereby enabling the periodic abnormality diagnosis not to be performed simultaneously with the transmission, which therefore does not affect the maximum value of power consumption. In addition, the periodic abnormality diagnosis may be executed outside the frame blanking period.

This makes it possible to quickly notify the application processor 1212 of the possibility of abnormality in the operation of the image sensor 1211 and occurrence of abnormality in the operation before transmission of image data.

Now, description is given, with reference to a flowchart in FIG. 146, of the imaging/transmission processing in which the specific message is stored in data of a virtual channel, which is different from that of the image data transmission by the image sensor 1211, for transmission.

It is to be noted that description is given here of processing in which image data is transmitted in the first virtual channel (VC1) and embedded data including the specific message is transmitted in the second virtual channel (VC2).

In step S1491, the pixel 1501 starts imaging, and image data outputted from the pixel 1501 is supplied to the extension mode adaptive CSI-2 transmission circuit 1504 via the AD converter 1502 and the image processing section 1503.

In step S1492, the image sensor 1211 executes the periodic abnormality diagnosis.

In step S1493, the extension mode adaptive CSI-2 transmission circuit 1504 transmits a frame start of the first virtual channel.

In step S1494, the extension mode adaptive CSI-2 transmission circuit 1504 transmits a frame start of the second virtual channel.

In step S1495, the extension mode adaptive CSI-2 transmission circuit 1504 transmits embedded data of the first virtual channel.

In step S1496, the extension mode adaptive CSI-2 transmission circuit 1504 transmits the embedded data of the second virtual channel. At this time, the extension mode adaptive CSI-2 transmission circuit 1504 transmits the embedded data of the second virtual channel including the specific message corresponding to the diagnosis result of the periodic abnormality diagnosis.

In step S1497, the extension mode adaptive CSI-2 transmission circuit 1504 transmits image data of the first virtual channel.

In step S1498, the extension mode adaptive CSI-2 transmission circuit 1504 determines whether or not transmission of image data for one frame has been completed.

In a case where the extension mode adaptive CSI-2 transmission circuit 1504 determines in step S1498 that the transmission of the image data for one frame has not been completed, the processing returns to step S1497, and subsequently similar processing is repeatedly performed. Meanwhile, in a case where the extension mode adaptive CSI-2 transmission circuit 1504 determines in step S1498 that the transmission of the image data for one frame has been completed, the processing proceeds to step S1499.

In step S1499, the extension mode adaptive CSI-2 transmission circuit 1504 transmits user-defined data of the second virtual channel.

In step S1500, the extension mode adaptive CSI-2 transmission circuit 1504 transmits a frame end of the first virtual channel.

In step S1501, the extension mode adaptive CSI-2 transmission circuit 1504 transmits a frame end of the second virtual channel.

In step S1502, the extension mode adaptive CSI-2 transmission circuit 1504 determines whether or not a finish command for the high-speed data transmission has been received.

In a case where the extension mode adaptive CSI-2 transmission circuit 1504 determines in step S1502 that the finish command for the high-speed data transmission has not been received, the processing returns to step S1491, and subsequently similar processing is repeatedly performed. Meanwhile, in a case where the extension mode adaptive CSI-2 transmission circuit 1504 determines in step S1502 that the finish command for the high-speed data transmission has been received, the processing is finished.

The above-described processing makes it possible to transmit the specific message even in a case where there is no room for storing the specific message in the embedded data of the virtual channel for the image data transmission.

<Imaging/Transmission Processing (Part 10)>

The description has been given above of the example in which the specific message is stored in data (e.g., in embedded data) of the virtual channel, which is different from the virtual channel for the image data transmission, for transmission; however, the specific message may be stored at least partially in non-image data of the virtual channel, which is different from the virtual channel for the image data transmission, for transmission.

The non-image data is, for example, packet data (e.g., Generic Short Packet Data Types, Generic Long Packet Data Types), user-defined data (User Defined Byte-based Data), or reserved region data (Reserved for future use).

In a case where the specific message is stored at least partially in the non-image data of the virtual channel different from the virtual channel for the image data transmission, the image sensor 1211 transmits the specific message for each line of the image data, thus making it possible to quickly transmit the specific message corresponding to the image data of each row.

This enables the application processor 1212 that receives the specific message to make a quick response in response to the specific message.

The periodic abnormality diagnosis is executed within the line blanking period before transmission of image data, thereby allowing no periodic abnormality diagnosis to be performed simultaneously with the transmission, which therefore does not affect the maximum value of power consumption. In addition, the periodic abnormality diagnosis may be executed outside the line blanking period.

Now, description is given, with reference to a flowchart in FIG. 147, of the imaging/transmission processing in which transmission is performed to allow storing at least partially in non-image data of a virtual channel different from the virtual channel of the image data transmission.

It is to be noted that description is given here of processing in which image data is transmitted in the first virtual channel (VC1) and user-defined data including the specific message is transmitted in the second virtual channel (VC2).

In addition, pieces of processing in steps S1521 to S1525 and steps S1530 to S1532 of the flowchart in FIG. 147 are similar to the pieces of processing in steps S1491 and S1493 to S1496 and S1500 to S1502 of the flowchart in FIG. 146, and therefore descriptions thereof are omitted. However, the processing in step S1525 differs from the processing in step S1496 in that the processing in step S1525 does not include the diagnosis result of the periodic abnormality diagnosis.

That is, when imaging is started and the frame start and the embedded data of each of the first virtual channel and the second virtual channel are transmitted through the pieces of processing in steps S1521 to S1525, the processing proceeds to step S1526.

In step S1526, the image sensor 1211 executes the periodic abnormality diagnosis.

In step S1527, the extension mode adaptive CSI-2 transmission circuit 1504 transmits image data of the first virtual channel.

In step S1528, the extension mode adaptive CSI-2 transmission circuit 1504 transmits the user-defined data of the second virtual channel. At this time, the extension mode adaptive CSI-2 transmission circuit 1504 transmits the user-defined data of the second virtual channel including the specific message corresponding to the diagnosis result of the periodic abnormality diagnosis.

In step S1529, the extension mode adaptive CSI-2 transmission circuit 1504 determines whether or not transmission of image data for one frame has been completed.

In a case where the extension mode adaptive CSI-2 transmission circuit 1504 determines in step S1529 that the transmission of the image data for one frame has not been completed, the processing returns to step S1526, and subsequently similar processing is repeatedly performed. Meanwhile, in a case where the extension mode adaptive CSI-2 transmission circuit 1504 determines in step S1529 that the transmission of the image data for one frame has been completed, the processing proceeds to step S1530.

Then, in steps S1530 and S1531, the first virtual channel and the frame end of the first virtual channel are transmitted.

The above-described processing enables the image sensor to transmit the specific message for each line of the image data, thus making it possible to quickly transmit the specific message corresponding to the image data of each row.

As a result, it is possible for the application processor 1212 that receives the specific message to make a quick response in response to the specific message.

In addition, the description has been given above of the example in which the user-defined data including the specific message is transmitted. However, the user-defined data may not be used as long as non-image data including the specific message is used; for example, reserved region data or packet data including the specific message may be used.

<Imaging/Transmission Processing (Part 11)>

The description has been given above of the example in which the specific message is stored at least partially in the non-image data of the virtual channel, which is different from the virtual channel for the image data transmission, for transmission; however, the specific message may be stored in image data for transmission.

In a case where the specific message is stored in the image data for transmission, the image sensor 1211 transmits the specific message for each line of the image data, thus making it possible to quickly transmit the specific message corresponding to the image data of each row.

This enables the application processor 1212 that receives the specific message to make a quick response in response to the specific message.

In addition, the periodic abnormality diagnosis is executed within the line blanking period, thereby allowing the periodic abnormality diagnosis not to be performed simultaneously with the transmission, which therefore does not affect the maximum value of power consumption.

Further, the periodic abnormality diagnosis may be executed outside the line blanking period.

In addition, in a case where the specific message is stored in the image data, a visible digital watermark message or an invisible digital watermark message may be stored in a superimposed manner.

For example, the visible digital watermark may be used to store a predetermined message (e.g., warning indication) as the specific message. In addition, the visible digital watermark may be used to store a count message (predetermined message) indicating a count-down or a count-up until the image sensor 1211 finishes the high-speed data transmission.

These may be expressions (e.g., fixed patterns) which can be recognized by a person or expressions which cannot be recognized by a person (e.g., random patterns). In addition, the message may be stored using the invisible digital watermark, which is difficult to be visually observed by the naked eye due to a minute change in the image.

Now, description is given, with reference to a flowchart in FIG. 148, of the imaging/transmission processing in which the specific message is stored in image data for transmission.

It is to be noted that pieces of processing in steps S1551 and S1552 and steps S1557 and S1558 of the flowchart in FIG. 148 are similar to the pieces of processing in steps S1191, S1193, S1197, and S1198 of the flowchart in FIG. 131, and therefore the descriptions thereof are omitted.

That is, when imaging is started and the frame start is transmitted through the pieces of processing in steps S1551 and S1552, and the embedded data is transmitted through the processing in step S1553, the processing proceeds to step S1554.

In step S1554, the image sensor 1211 executes the periodic abnormality diagnosis.

In step S1555, the extension mode adaptive CSI-2 transmission circuit 1504 transmits image data of the virtual channel. At this time, the extension mode adaptive CSI-2 transmission circuit 1504 includes the specific message corresponding to the diagnosis result of the periodic abnormality diagnosis, for transmission of the image data of the virtual channel.

In step S1556, the extension mode adaptive CSI-2 transmission circuit 1504 determines whether or not the transmission of the image data for one frame has been completed.

In a case where the extension mode adaptive CSI-2 transmission circuit 1504 determines in step S1556 that the transmission of the image data for one frame has not been completed, the processing returns to step S1554, and subsequently similar processing is repeatedly performed. Meanwhile, in a case where the extension mode adaptive CSI-2 transmission circuit 1504 determines in step S1556 that the transmission of the image data for one frame has been completed, the processing proceeds to step S1557.

Then, in step S1557, the frame end of the virtual channel is transmitted.

The above-described processing enables the image sensor 1211 to transmit the specific message for each line of the image data, thus making it possible to quickly transmit the specific message corresponding to the image data of each row to the application processor 1212.

This enables the application processor 1212 that receives the specific message to make a quick response in response to the specific message.

It is to be noted that, in the above description, the start of imaging is specified, but the end of the imaging is not specified. One reason for this is that the imaging method varies depending on, for example, whether the imaging method is a global shutter method or a rolling shutter method.

For example, when the imaging method is the global shutter method, it is possible to capture all pixels at once; therefore, the imaging may be finished before the next processing, or the imaging may be finished before transmission of the first image data in the frame.

Meanwhile, when the imaging method is the rolling shutter method, the high-speed data transmission and the imaging executed in each row of the pixels may be executed in an overlapping manner (executed in parallel) at least partially, and thus it is sufficient for the imaging to be finished before transmission of the last image data in the frame.

In addition, the timing to start the imaging is exemplary; for example, the imaging may be executed in a manner delayed until the timing before the transmission of the first image data in the frame.

Further, the timing of the periodic abnormality diagnosis is also exemplary; for example, the periodic abnormality diagnosis may be executed in a manner delayed until the timing before transmission of the specific message.

<Concerning Message Count Value>

The message counter 1513 generates a message counter (message count value) by incrementing or decrementing one of HD (Humming Distance)≥1 count (binary code) or HD=1 count (gray code).

It is to be noted that FIG. 149 illustrates an example of message count values including binary codes of HD (Humming Distance: hamming distance)≥1 on the left side of the diagram, and an example of message count values including gray codes of HD=1 on the right side of the diagram; both of which are incremented downward in the diagram.

In particular, in a case where the message counter (message count value) is a gray code, the hamming distance associated with the increment or decrement becomes constant, thus making it possible to improve resistance to a power observation attack or an electromagnetic observation attack.

As for a counting method of the message count value, a first code method and a second code method (e.g., binary code method and gray code method) may be switched therebetween.

In addition, in a case where the counting method of the message count value is switched as needed, additional information can be communicated from the image sensor 1211 to the application processor 1212 without changing a data amount itself to be transmitted.

For example, in a case where abnormality is detected in the image sensor 1211, the counting method of the message count value may be switched, thus making it possible to communicate abnormality information (e.g., the presence or absence of abnormality) from the image sensor 1211 to the application processor 1212 in accordance with the counting method.

In particular, in a case where the binary code and the gray code are switched therebetween, it is possible to communicate the additional information while maintaining the increment or decrement of the message counter.

In a case where the image sensor 1211 switches between the binary code and the gray code, it is desirable to perform switching at a timing in consideration of a code cycle (example of 4 bits and a code cycle of 16 counts on the left) in order to enable the application processor 1212 to determine whether switching of the count or a failure in the transmission/reception of the message; however, this is not limitative.

In a case where the image sensor 1211 includes a first counter and a second counter that are related to each other, it is possible to verify the presence or absence of failure or falsification of the message counter.

For example, the presence or absence of failure or falsification of the counter may be verified from results of an arithmetic operation (e.g., addition) of the first counter that performs increment and the second counter that performs decrement.

That is, for example, in a case where the first counter that increments the binary code and the second counter that performs decrement are used, each addition result is always "1111" unless failure or falsification is present as illustrated in FIG. 150. Therefore, in a case where each addition result is "1111", the first counter and the second counter are each a normal value, thus making it possible to verify the presence or absence of failure or falsification on the basis of whether or not the addition result is a normal value including "1111".

In addition, the presence or absence of failure or falsification of the counter may be verified from the result of the arithmetic operation (e.g., subtraction) of the first counter and the second counter having the same counting direction.

That is, for example, in the case of the first counter that increments the gray code and the second counter that performs decrement, each subtraction result is always "0000" unless failure or falsification is present as illustrated in FIG. 151. Therefore, in a case where each subtraction result is "0000", the first counter and the second counter are each a normal value, thus making it possible to verify the presence or absence of failure or falsification on the basis of whether or not the subtraction result is a normal value including "0000".

<Message Count Processing>

Next, description is given, with reference to a flowchart in FIG. 152, of message count processing.

In step S1571, the message counter 1513 initializes a first count value and a second count value.

In step S1572, the extension mode adaptive CSI-2 transmission circuit 1504 determines whether or not to transmit the extended packet header, and waits for the processing until determination is made to transmit the extended packet header.

In a case where determination is made in step S1572 to transmit the extended packet header, the processing proceeds to step S1573.

In step S1573, the extension mode adaptive CSI-2 transmission circuit 1504 acquires the first count value as the message count value from the message counter 1513, and stores it in the extended packet header.

In step S1574, the extension mode adaptive CSI-2 transmission circuit 1504 transmits the extended packet header to the application processor 1212.

In step S1575, the message counter 1513 determines whether or not the first count value is the maximum value.

In a case where determination is made in step S1575 that the first count value is the maximum value, the processing returns to step S1571, in which the first count value and the second count value are initialized.

In addition, in a case where determination is made in step S1575 that the first count value is not the maximum value, the processing proceeds to step S1576.

In step S1576, the message counter 1513 updates (increments or decrements) the first count value of the first message counter.

In step S1577, the message counter 1513 updates (increments or decrements) the second count value of the second message counter.

In step S1578, the message counter 1513 performs an arithmetic operation (addition or subtraction) on the first count value and the second count value.

In step S1579, the message counter 1513 determines whether or not a result of the arithmetic operation is a normal value.

In a case where determination is made in step S1579 that the result of the arithmetic operation is a normal value, the processing proceeds to step S1580.

In step S1580, the message counter 1513 determines that the first count value and the second count value are normal.

In a case where determination is made in step S1579 that the result of the arithmetic operation is not a normal value, the processing proceeds to step S1581.

In step S1581, the message counter 1513 determines that at least one of the first count value or the second count value is abnormal.

The above-described processing makes it possible to improve the resistance to the failure or falsification in the count value of the message counter.

It is to be noted that the image sensor 1211 may transmit, as the specific message, a normality message in a case where determination is made to be normal and an abnormality message in a case where determination is made to be abnormal. In addition, the message count value may be appropriated as the specific message such as the abnormality message.

Meanwhile, the specific message may be stored in the extended packet footer outside the frame end (e.g., in the frame start, in the embedded data, or in the image data). In addition, the complete arithmetic value based on encryption of data including the specific message may be stored in the extended packet footer in the frame end. Further, the completeness arithmetic operation based on the encryption of data including the specific message may be stored in the packet data in the embedded data, instead of being in the extended packet footer The description has been given above referring to the example in which the specific message or the additional information is communicated from the image sensor 1211 to the application processor 1212; however, the specific message or the additional information may be communicated from the application processor 1212 to the image sensor 1211 or the display 1213 in accordance with a similar concept.

<Concerning Storage of Information to Identify Abnormality>

The extended packet header or the extended packet footer may store Warning Descriptor (specific message) defined to be able to identify, for example, any of Fatal warning (detecting critical abnormality), Sensor-internal warning (detecting abnormality caused by sensor interior), Sensor-external warning (detecting abnormality caused by sensor exterior), Power-source warning (detecting abnormality caused power source), Clock-source warning (detecting abnormality caused by clock source), The others warning (detecting abnormality caused by others), Physical warning (detecting physical abnormality), Logical warning (detecting logical abnormality), Power warning (detecting power abnormality), Voltage warning (detecting voltage abnormality), Current warning (detecting current abnormality), Electromagnetic warning (detecting electromagnetic abnormality), Clock warning (detecting clock abnormality), Thermal warning (detecting thermal abnormality), Channel warning (detecting transmission path abnormality), Message warning (detecting message abnormality), Attack warning (detecting attack), Tamper warning (detecting aggression, for example), Blind warning (detecting interference, for example), Saturation warning (detecting interference, for example), Fake warning (detecting interference, for example), Foreign object warning (detecting fault, for example), Probe warning (detecting aggression or fault, for example), DOS warning (detecting message count abnormality, for example), and the like.

The Warning Descriptor (specific message) may be stored at least partially in a vendor-specific region (Vendor specific), the user-defined region (User Defined), or the reserved region (Reserved for future use).

In addition, any of the items in the Warning Descriptor (specific message) may be defined in any of the extended packet header (e.g., Security Descriptor), the extended packet footer (e.g., ePF1), the embedded data, and the read response.

It is to be noted that FIG. 153 illustrates a configuration example of the extended packet header ePH2 at the time when the Warning Descriptor is set in the reserved region (Reserved) in the extended packet header ePH2 in FIG. 58.

In addition, FIG. 154 illustrates a description example of identification information using each bit of the Warning Descriptor (specific message).

<Separation of Specific Message>

The transmission of specific message may be separated into transmission of a first specific message and transmission of a second specific message.

The extended packet header is transmitted by each high-speed data transmission of a line (row) of image data or the like, and thus desirably has a short bit width. However, because of its immediacy, for example, a portion of warning information or a warning flash report (e.g., Physical attack detection) may be assigned as the first specific message thereto for storing.

Meanwhile, for example, information indicating details of the warning information (warning detail) is assigned to the second specific message, for storing outside the extended packet header and for transmission.

FIG. 155 illustrates an example in which a warning flash report (e.g., Physical attack detection) is set as the first specific message in the extended packet header.

<Transmission Processing when Transmitting Specific Message Separately>

Next, description is given, with reference to flowcharts in FIGS. 156 and 157, of transmission processing when transmitting the specific message separately.

It is to be noted that the flowchart in FIG. 156 illustrates processing of the image sensor 1211, and the flowchart in FIG. 157 illustrates processing of the application processor 1212.

In step S1591 (FIG. 156), the image sensor 1211 performs abnormality diagnosis.

In step S1592, the extension mode adaptive CSI-2 transmission circuit 1504 transmits an extended packet header including a warning flash report which is the first specific message.

In step S1593, the extension mode adaptive CSI-2 transmission circuit 1504 transmits a warning detail which is the second specific message so as to be included outside the extended packet header, e.g., in the embedded data.

Meanwhile, in step S1611, the application processor 1212 determines whether or not the extended packet header including the warning flash report has been received, and repeats similar processing until the extended packet header including the warning flash report is received.

In a case where determination is made in step S1611 that the extended packet header including the warning flash report has been received, the processing proceeds to step S1612.

In step S1612, the application processor 1212 starts abnormality processing on the basis of the warning flash report.

In step S1613, the application processor 1212 determines whether or not the extended packet header such as embedded data including the warning detail has been received, and repeats similar processing until determination is made that the extended packet header has been received.

Then, in a case where determination is made in step S1613 that the extended packet header such as the embedded data including the warning detail has been received, the processing proceeds to step S1614.

In step S1614, the application processor 1212 reflects information on the warning detail in the abnormality processing.

The above-described processing makes it possible to quickly transmit the warning flash report (e.g., Physical attack detection) of high immediacy to the application processor 1212 in a case where abnormality is detected by the abnormality diagnosis, thus making it possible to quickly start the abnormality processing.

<Modification Example of Transmission Processing when Transmitting Specific Message Separately>

The description has been given above of the example in which the warning flash report is transmitted as the first specific message; however, further, after the transmission of the warning flash report, a read command for the warning detail may be transmitted to allow the warning detail to be transmitted as a read response from the image sensor 1211.

Next, description is given, with reference to a flowchart in FIG. 158, of transmission processing when transmitting the specific message separately in a case of transmitting the read command for the warning detail after the transmission of the warning flash report.

It is to be noted that pieces of processing in steps S1631, S1632, S1634, and S1635 in the flowchart in FIG. 158 are similar to the pieces of processing in steps S1611 to S1613 in the flowchart in FIG. 157, and therefore descriptions thereof are omitted.

That is, when the warning flash report is received and the abnormality processing is started through the pieces of processing in steps S1631 and S1632, the application processor 1212 transmits a read command in step S1633.

In response thereto, the image sensor 1211 transmits a read response to the application processor 1212 in response to the read command.

Then, through the pieces of processing in steps S1634 and S1635, the warning detail is received and reflected in the abnormality processing.

The above-described processing makes it possible to quickly transmit the warning flash report (e.g., Physical attack detection) of high immediacy to the application processor 1212 in a case where abnormality is detected by the abnormality diagnosis, and makes it possible to quickly reflect the warning detail in the abnormality processing.

<Security Descriptor>

The extended packet header or the extended packet footer may store Security Descriptor (may be referred to as the Service Descriptor, for example) that defines any of the presence or absence of encryption of packet data (payload), a hash value in the extended packet footer, the presence or absence of a message authentication code or digital signature, a hash value in the extended packet footer, the algorithmic type of the message authentication code or the digital signature, and the like.

In addition, the image sensor 1211 may use this Security Descriptor to notify the application processor 1212 of any specific message, such as the presence or absence of abnormality inside or outside the image sensor 1211 or the presence or absence of an interference or an attack on the image sensor 1211.

Examples of the message authentication code (MAC. Message Authentication Code) that is available may include any of GMAC (GaloisMAC), CMAC (Cipher-based MAC), HMAC (Hash-based MAC), and the like. For example, any of AES-GMAC, AES-CMAC, SHA2-HMAC, SHA3-HMAC, and the like, to which AES (Advanced Encryption Standard) or SHA (Secure Hash Algorithm) is applied, may be used.

FIG. 159 illustrates an example in which a specific message such as any of the presence or absence of abnormality inside or outside the image sensor 1211 and the presence or absence of an interference or an attack on the image sensor 1211 is set in the Security Descriptor in FIG. 153.

<Example of Implementation in Propulsion Apparatus>

The image sensor 1211 and the application processor 1212 may be configured to be mounted on a desired propulsion apparatus.

For example, the propulsion apparatus may be any of a vehicle, a robot, a drone, and the like enabling propulsion (any of moving, traveling, walking, and flying). The propulsion apparatus may be any of an autonomous vehicle, an autonomous robot, or an autonomous drone that is mounted with an AI (Artificial Intelligence) function to enable autonomous propulsion.

The propulsion of the propulsion apparatus may be controlled by a user of the propulsion apparatus, and the propulsion apparatus may notify the user of an instruction or warning as needed. Meanwhile, the propulsion apparatus may be configured to allow the propulsion apparatus itself to automatically control its own propulsion.

FIG. 160 is a block diagram illustrating a schematic configuration example of a propulsion control system which is an example of a control system of the propulsion apparatus mounted with the image sensor 1211 and the application processor 1212 described above.

A propulsion control system 1600 includes multiple electronic control units coupled via a communication network 1601. In the example illustrated in FIG. 160, the propulsion control system 1600 includes a driving system control unit 1615, a body system control unit 1616, an outside information detecting unit 1617, an inside information detecting unit 1619, and an integrated control unit 1611. In addition, there are illustrated, as functional configurations of the integrated control unit 1611, a microcomputer 1631, a sound/image output section 1632, and a vehicle-mounted network I/F (interface) 1633.

The driving system control unit 1615 controls operations of devices related to a driving system of the propulsion apparatus in accordance with various programs.

The body system control unit 1616 controls operations of various devices provided in the propulsion apparatus in accordance with various programs.

The outside information detecting unit 1617 detects information on the outside of the propulsion apparatus mounted with the propulsion control system 1600. For example, an imaging section 1618 is coupled to the outside information detecting unit 1617. The outside information detecting unit 1617 causes the imaging section 1618 to capture an image outside the propulsion apparatus, and receives the captured image. The outside information detecting unit 1617 may perform distance detection processing or object detection processing for a person, a car, an obstacle, a sign, or a character on a road surface, on the basis of the received image. In addition, the outside information detecting unit 1617 may be configured to correspond to the application processor 1212.

The imaging section 1618 is a configuration corresponding to the image sensor 1211, and is an optical sensor that receives light and outputs an electric signal corresponding to a light receiving amount of the light. The imaging section 1618 can output an electric signal as an image or as information on distance measurement. In addition, light to be received by the imaging section 1618 may be visible light or may be non-visible light such as infrared light.

The inside information detecting unit 1619 detects information inside the propulsion apparatus. A detecting section 1620 that detects information inside the propulsion apparatus may be coupled to the inside information detecting unit 1619. Here, the information inside the propulsion apparatus is, for example, information such as temperature or ambient humidity of the propulsion apparatus.

The microcomputer 1631 may performs an arithmetic operation of various control target values on the basis of the information inside or outside the propulsion apparatus acquired by the outside information detecting unit 1617 or the inside information detecting unit 1619 to output a control command to the driving system control unit 1615. In addition, the microcomputer 1631 may be a configuration corresponding to the application processor 1212.

In addition, the microcomputer 1631 controls the propulsion on the basis of the information around the propulsion apparatus acquired by the outside information detecting unit 1617 or the inside information detecting unit 1619, thereby making it possible to perform cooperative control for the purpose of automated driving or the like that allows for autonomous traveling without depending on the operation of the user.

As described above, the imaging section 1618 is a configuration corresponding to the image sensor 1211, and the outside information detecting unit 1617 and/or the microcomputer 1631 are/is a configuration corresponding to the application processor 1212. Thus, the imaging section 1618 and the outside information detecting unit 1617 and/or the microcomputer 1631 implement the high-speed data communication with each other.

Further, the microcomputer 1631 is able to output a control command to the body system control unit 1616 on the basis of information outside the propulsion apparatus acquired by the outside information detecting unit 1617.

The sound/image output section 1632 transmits an output signal of at least one of a sound or an image to an output device being able to notify a passenger of the propulsion apparatus or the outside of the propulsion apparatus of visual or auditory information. The example of FIG. 160 exemplifies, as an output device, an audio speaker 1612, a display section 1613, and an instrument panel 1614. The display section 1613 may include, for example, at least one of an on-board display or a head-up display.

<Propulsion Control Processing (Part 1)>

In the propulsion apparatus, in a case where an abnormality message is received (e.g., received once, received multiple times, or received continuously), the propulsion control system 1600 in FIG. 160 may investigate a propulsion status (e.g., a propulsion speed of the propulsion apparatus or the presence or absence of an obstacle around the propulsion apparatus) of the propulsion apparatus, to finish the high-speed data transmission when the propulsion status satisfies a safety condition, and to change the propulsion control (e.g., slow down or guide the propulsion apparatus to a position with less obstacle) when the propulsion status does not satisfy the safety condition.

Now, description is given, with reference to a flowchart in FIG. 161, of the above-described propulsion control processing by the propulsion control system 1600.

In step S1651, the outside information detecting unit 1617 and/or the microcomputer 1631 corresponding to the application processor 1212 determine(s) whether or not (a specific message including) an abnormality message indicating that abnormality has occurred has been received from the imaging section 1618 corresponding to the image sensor 1211, and repeat(s) similar processing until determination is made that the abnormality message has been received.

In this processing, determination may be made as to whether or not the specific message including the abnormality message has been received on the basis of whether it has been received once, multiple times, or continuously.

In a case where determination is made in step S1651 that the abnormality message has been received, the processing proceeds to step S1652.

In step S1652, the outside information detecting unit 1617 and/or the microcomputer 1631 investigate(s) a propulsion status. More specifically, for example, the outside information detecting unit 1617 and/or the microcomputer 1631 investigate(s), as the propulsion status, a propulsion speed of the propulsion apparatus, the presence or absence of an obstacle around the propulsion apparatus, and the like.

In step S1653, the outside information detecting unit 1617 and/or the microcomputer 1631 determine(s) whether or not the propulsion status satisfies the safety condition. That is, determination is made as to whether or not the propulsion status satisfies the safety condition, on the basis of whether or not the propulsion speed of the propulsion apparatus is higher than a predetermined speed, whether or not an obstacle around the propulsion apparatus is present within a predetermined distance, and the like.

In a case where determination is made in step S1653 that the propulsion status does not satisfy the safety condition, the processing proceeds to step S1654.

In step S1654, the outside information detecting unit 1617 and/or the microcomputer 1631 change(s) the propulsion control to allow the propulsion status to satisfy the safety condition, and the processing returns to step S1652.

That is, for example, the outside information detecting unit 1617 and/or the microcomputer 1631 controls the driving system control unit 1615 and the body system control unit 1616 until the propulsion status satisfies the safety condition, and repeats processing, for example, to change the propulsion control to allow the propulsion speed of the propulsion apparatus to be lower than a predetermined speed, or to allow an obstacle around the propulsion apparatus not to be present within a predetermined distance.

Then, in a case where determination is made in step 1653 that the propulsion status satisfies the safety condition, the processing proceeds to step S1655.

In step S1655, the outside information detecting unit 1617 and/or the microcomputer 1631 corresponding to the application processor 1212 finish(es) the high-speed data transmission to and from the imaging section 1618 corresponding to the image sensor 1211.

Through the above-described processing, even when an abnormality message is supplied from the imaging section 1618 corresponding to the image sensor 1211, the outside information detecting unit 1617 and/or the microcomputer 1631 corresponding to the application processor 1212 do(es) not immediately finish the high-speed data transmission, but change(s) the propulsion control until the propulsion status satisfies the safety condition, and then finishes the high-speed data transmission.

This makes it possible to prevent immediate end of the high-speed data transmission which suddenly leads to a state where image data necessary for the propulsion control is not transmitted, which causes the propulsion control to fall into a fatal state, even when it is known that abnormality has occurred in the imaging section 1618 corresponding to the image sensor 1211.

<Propulsion Control Processing (Part 2)>

The application processor 1212 of the propulsion control system 1600 that controls the propulsion apparatus may include an image device (a first sensor communicating with a first information processor or a first processor) that captures or displays image data and another data device (a second sensor communicating with a second information processor, the first processor or a second processor) that acquires or displays another data.

The propulsion control system 1600 investigates a status of the image device (first sensor); in a case where no abnormality occurs in the image device (first sensor), the propulsion control system 1600 may preferentially use image data (data acquired by the first sensor) of the image device for the propulsion control.

In addition, in a case where abnormality occurs in the image device (first sensor), the propulsion control system 1600 may notify the user of the propulsion apparatus of a minor warning. Then, the propulsion control system 1600 investigates a status of the other data device (second sensor); in a case where no abnormality occurs in the other data device (second sensor), another data of the other data device (data acquired by the second sensor) may be preferentially used for the propulsion control.

Further, in a case where abnormality occurs in the other data device (second sensor), the propulsion control system 1600 may notify the user of the propulsion apparatus of a major warning, and then leaves the propulsion control to the user to finish the high-speed data transmission.

It is to be noted that the image device (first sensor) and the other data device (second sensor) may have the same type of configuration or different types of configurations. That is, the image device (first sensor) and the other data device (second sensor) may be any of an image sensor such as a visible light sensor, an infrared light sensor, an ultraviolet light sensor, a polarization sensor, a distance measurement sensor, a ToF sensor, or a LiDAR sensor, a millimeter wave radar sensor, an ultrasonic radar sensor, a GPS sensor, a GNSS sensor, an RF distance measurement sensor, and an RF position sensor.

Now, description is given, with reference to a flowchart in FIG. 162, of the above-described propulsion control processing by the propulsion control system 1600.

In step S1671, the outside information detecting unit 1617 and/or the microcomputer 1631 corresponding to the application processor 1212 investigate(s) a status of the image device (first sensor). More particularly, the outside information detecting unit 1617 and/or the microcomputer 1631 acquire(s) a diagnosis result of abnormality diagnosis in the image device (first sensor), for example, to thereby investigate the status.

In step S1672, the outside information detecting unit 1617 and/or the microcomputer 1631 determine(s) whether or not abnormality has occurred in the image device (first sensor) on the basis of the status of the image device (first sensor).

In a case where determination is made in step S1672 that no abnormality has occurred in the image device (first sensor), the processing proceeds to step S1673.

In step S1673, the outside information detecting unit 1617 and/or the microcomputer 1631 preferentially use(s) the data acquired in the image device (first sensor) to control the propulsion of the propulsion apparatus, and the processing returns to step S1671 and the subsequent processing is repeated.

That is, the data acquired in the image device (first sensor) is used to control the propulsion of the propulsion apparatus unless abnormality occurs in the image device (first sensor).

In a case where determination is made in step S1672 that abnormality has occurred in the image device (first sensor), the processing proceeds to step S1674.

In step S1674, the outside information detecting unit 1617 and/or the microcomputer 1631 control(s) the sound/image output section 1632 to present information on a minor warning indicating that abnormality has occurred in the image device (first sensor) to the user of the propulsion apparatus, using at least one of the audio speaker 1612, the display section 1613, or the instrument panel 1614 and using at least one of a sound or an image.

In step S1675, the outside information detecting unit 1617 and/or the microcomputer 1631 investigate(s) a status of the other data device (second sensor). More particularly, the outside information detecting unit 1617 and/or the microcomputer 1631 acquire(s) a diagnosis result of abnormality diagnosis in the other data device (second sensor) to thereby investigate the status.

In step S1676, the outside information detecting unit 1617 and/or the microcomputer 1631 determine(s) whether or not abnormality has occurred in the other data device (second sensor) on the basis of the status of the other data device (second sensor).

In a case where determination is made in step S1676 that no abnormality has occurred in the other data device (second sensor), the processing proceeds to step S1677.

In step S1677, the outside information detecting unit 1617 and/or the microcomputer 1631 preferentially use(s) the data acquired in the other data device (second sensor) to control the propulsion of the propulsion apparatus, and the processing returns to step S1671 and the subsequent processing is repeated.

That is, even in a case where abnormality occurs in the image device (first sensor), the propulsion of the propulsion apparatus is controlled using the data acquired in the other data device (second sensor)unless abnormality occurs in the other data device (second sensor).

In a case where determination is made in step S1676 that abnormality has occurred in the other data device (second sensor), the processing proceeds to step S1678.

In step S1678, the outside information detecting unit 1617 and/or the microcomputer 1631 control(s) the sound/image output section 1632 to present information on a major warning indicating that abnormality has occurred in both of the image device (first sensor) and the other data device (second sensor) to the user of the propulsion apparatus, using at least one of the audio speaker 1612, the display section 1613, or the instrument panel 1614 and using at least one of a sound or an image.

At this time, the autonomous propulsion is in a difficult state, and thus information may be presented, using a major warning, to urge the user to execute the propulsion control of the propulsion apparatus.

In step S1679, the outside information detecting unit 1617 and/or the microcomputer 1631 shift(s) the propulsion control of the propulsion apparatus to the one to be operated in accordance with an operation signal generated by an operation by the user on an unillustrated operation unit or the like. However, the propulsion control of the propulsion apparatus may be shifted to the one to be operated in accordance with an operation signal generated by the operation by the user on the unillustrated operation unit or the like, before the processing in step S1679.

In step S1680, the outside information detecting unit 1617 and/or the microcomputer 1631 finish(es) the high-speed data transmission to and from the image device (first sensor) and the other data device (second sensor) corresponding to the image sensor 1211, and come(s) into a state of not accepting input of image data from the image device (first sensor) or data from the other data device (second sensor).

Through the above-described processing, when abnormality occurs in the imaging device (first sensor) corresponding to the image sensor 1211, a minor warning is presented to indicate that abnormality has occurred, and the propulsion control is executed on the basis of the data acquired in the other data device (second sensor).

Further, when abnormality occurs in the other data device (second sensor) in addition to the imaging device (first sensor), a major warning is presented to indicate that abnormality occurs to bring the autonomous propulsion control into an unable state, and the autonomous propulsion control is switched to a propulsion control to be operated by the user, and the high-speed data communication is finished.

This enables propulsion control on the basis of data to be acquired by the other sensor (the other data device (second sensor)) even when abnormality occurs in some of the sensors (the image device (first sensor)) that acquires data necessary for the propulsion control, thus making it possible to implement propulsion control with higher safety.

In addition, in a case where abnormality occurs in both of the sensors, the propulsion control is shifted to the user, and thus propulsion control using uncertain data acquired by a sensor in which abnormality occurs is not continued, making it possible to implement safe propulsion control.

<Propulsion Control Processing (Part 3)>

In a case where an abnormality message is received (e.g., received once, received multiple times, received continuously) as the specific message, (the outside information detecting unit 1617 and/or the microcomputer 1631 corresponding to the application processor 1212 of) the propulsion control system 1600 that controls the propulsion of the propulsion apparatus investigates the propulsion status; in a case where the high-speed data transmission can be finished, the high-speed data transmission may be finished.

In addition, in a case where the high-speed data transmission cannot be finished, (the outside information detecting unit 1617 and/or the microcomputer 1631 corresponding to the application processor 1212 of) the propulsion control system 1600 that controls the propulsion of the propulsion apparatus may request the image sensor 1211 to maintain the high-speed data transmission.

This allows the high-speed data transmission to be finished by the outside information detecting unit 1617 and/or the microcomputer 1631 (corresponding to the application processor 1212) controlling the propulsion of the propulsion apparatus, rather than the imaging section 1618 (corresponding to the image sensor 1211) of the propulsion control system 1600, thus making it possible to avoid a failure that occurs by unilaterally finishing the high-speed data transmission on a side of the image sensor 1211.

In addition, in a case where the high-speed data transmission needs to be finished, the imaging section 1618 corresponding to the image sensor 1211 transmits an abnormality message as the specific message. After the abnormality message satisfies a predetermined condition (e.g., after a predetermined period of time has elapsed, after abnormality messages have been transmitted predetermined number of times, or after an abnormality message with a count-down function or a count-up function has reached a predetermined value), the high-speed data transmission may be finished in a case where the high-speed data transmission is not requested to be maintained from the propulsion apparatus.

Meanwhile, in a case where the high-speed data transmission is requested to be maintained from the propulsion apparatus (the outside information detecting unit 1617 and/or the microcomputer 1631 (corresponding to the application processor 1212)), the imaging section 1618 corresponding to the image sensor 1211 may extend scheduled finish of the high-speed data transmission. For example, the predetermined period of time or the predetermined number of times may be extended, and count values indicating count-down or count-up may be reset (e.g., reset to an initial value).

It is to be noted that, for example, (the imaging section 1618 corresponding to) the image sensor 1211 may desire to finish the high-speed data transmission, in some cases, in order to execute processing of disabling the high-speed data transmission, such as updating, initialization, resetting, restarting, or complete shutdown of a certain function. However, when the high-speed data transmission is finished without notifying the outside information detecting unit 1617 and/or the microcomputer 1631 corresponding to the application processor 1212, there is a possibility that an accident may occur in the propulsion apparatus due to the end of the high-speed data transmission without the notification.

The above-described processing allows the imaging section 1618 corresponding to image sensor 1211 not to finish the high-speed data transmission without notifying the outside information detecting unit 1617 and/or the microcomputer 1631 corresponding to the application processor 1212, thus avoiding a failure caused by sudden finish of the high-speed data transmission from the imaging section 1618 to the application processor 1212.

As described above, the image device and the processor may be a portion of the propulsion apparatus including a propulsion unit in which the propulsion is directly or indirectly controlled as needed using the image data.

Next, description is given, with reference to flowcharts in FIGS. 163 and 164, of the above-described propulsion control processing.

It is to be noted that the flowchart in FIG. 163 illustrates processing of the outside information detecting unit 1617 and/or the microcomputer 1631 corresponding to the application processor 1212, and the flowchart in FIG. 164 illustrates processing of the imaging section 1618 corresponding to the image sensor 1211.

In step S1691 (FIG. 163), the outside information detecting unit 1617 and/or the microcomputer 1631 determine(s) whether or not (a specific message including) an abnormality message has been received from the imaging section 1618 corresponding to the image sensor 1211, and repeat(s) similar processing until determination is made that the abnormality message has been received.

In a case where determination is made in step S1691 that the abnormality message has been received, the processing proceeds to step S1692.

In step S1692, the outside information detecting unit 1617 and/or the microcomputer 1631 investigate(s) a propulsion status.

In step S1693, the outside information detecting unit 1617 and/or the microcomputer 1631 determine(s) whether or not the high-speed data transmission can be finished on the basis of the propulsion status.

In step S1693, in a case where the high-speed data transmission can be finished, the processing proceeds to step S1694.

In step S1694, the outside information detecting unit 1617 and/or the microcomputer 1631 finish(es) the high-speed data communication, and come(s) into a state of not accepting supply of image data from the imaging section 1618 corresponding to the image sensor 1211 to finish the processing.

Meanwhile, in a case where the high-speed data transmission cannot be finished in step S1963, the processing proceeds to step S1695.

In step S1695, the outside information detecting unit 1617 and/or the microcomputer 1631 transmit(s) information requesting to maintain the high-speed data transmission to the imaging section 1618 corresponding to the image sensor 1211.

Meanwhile, in step S1711, the imaging section 1618 corresponding to the image sensor 1211 determines whether or not abnormality has occurred and the high-speed data transmission needs to be finished, and repeats similar processing until determination is made that the high-speed data transmission needs to be finished.

In a case where determination is made in step S1711 that determination is made that the high-speed data transmission needs to be finished, the processing proceeds to step S1712.

In step S1712, the imaging section 1618 transmits the specific message including the abnormality message to the outside information detecting unit 1617 and/or the microcomputer 1631 corresponding to the application processor 1212.

In step S1713, the imaging section 1618 determines whether or not the abnormality message satisfies a predetermined condition. Examples of the predetermined condition include: whether a predetermined period of time has elapsed; whether abnormality messages have been transmitted predetermined number of times; whether an abnormality message with a count-down function or a count-up function has reached a predetermined value; and the like.

In a case where determination is made in step S1713 that the abnormality message satisfies the predetermined condition, the processing proceeds to step S1714.

In step S1714, the imaging section 1618 determines whether or not there is a request to maintain the high-speed data transmission from the outside information detecting unit 1617 and/or the microcomputer 1631 corresponding to the application processor 1212.

In a case where determination is made in step S1714 that there is a request to maintain the high-speed data transmission, the processing proceeds to step S1715.

In step S1715, the imaging section 1618 extends the scheduled finish of the high-speed data transmission, and the processing returns to step S1711.

Meanwhile, in a case where determination is made in step S1714 that there is no request to maintain the high-speed data transmission, the processing proceeds to step S1716.

In step S1716, the imaging section 1618 finishes the high-speed data transmission, and comes into a state of not transmitting image data to the outside information detecting unit 1617 and/or the microcomputer 1631 corresponding to the application processor 1212.

The above-described processing allows the high-speed data transmission to be finished, not by the imaging section 1618 (corresponding to the image sensor 1211), but by the outside information detecting unit 1617 and/or the microcomputer 1631 (corresponding to the application processor 1212) of the propulsion control system 1600 that controls the propulsion of the propulsion apparatus, thus making it possible to avoid a failure caused by unilaterally finishing the high-speed data transmission on the side of the image sensor 1211.

It is to be noted that the description has been given by referring to the example of issuing a warning that abnormality (negative status) may possibly occur or has occurred in the imaging section 1618 corresponding to the image sensor 1211; however, this is not limitative.

For example, it may be communicated that a positive status may occur or has occurred in the imaging section 1618 corresponding to the image sensor 1211. In addition, it may be communicated that a status change, which is neither negative nor positive, may possibly occur or has occurred in the imaging section 1618 corresponding to the image sensor 1211.

Therefore, the above-described abnormality message may be a message different from that in the normal time or the usual time, such as an upturn message or a change message. As described above, a normality message or a usual message may be transmitted as the specific message in the normal time or the usual time. In addition, the specific message may be transmitted only in a case different from the normal time or the usual time. In addition, the description has been given by referring to the example in which the specific message is used for the propulsion control system 1600 in the propulsion apparatus, but this is not limitative; the specific message may be used in any mobile device such as a smartphone or a digital camera. In addition, the description has been given by referring to the example in which the specific message is transmitted while maintaining image data streaming, but this is not limitative; for example, the specific message may be configured to be transmitted after the transmission of image data is stopped.

The timing or the position of the components included in any drawing such as a block diagram or a flowchart is exemplary, and may be configured differently. There are various modification examples for the embodiments described in each of the examples described above. That is, as for the components of each of the examples described above, some of the components may be omitted, some or all of the components may be changed, or some or all of the components may be modified.

In addition, some of the components may be replaced by other components, or other components may be added to some or all of the components. Further, some or all of the components may be divided into multiple components, and some or all of the components may be separated into multiple components, or at least some of the multiple divided or separated components may have different functions or features.

Further, at least some of the components may be moved to form different embodiments. Furthermore, a binding element or a relay element may be added to a combination of at least some of the components to form a different embodiment.

In addition, a switching function may be added to a combination of at least some of the components to form a different embodiment. The present embodiment is not limited to the configurations exhibited in the above-described examples, and may be modified in a wide variety of ways without departing from the gist of the present technology. It is to be noted that the effects described herein are merely exemplary and non-limiting, and may have other effects.

In the present specification, processing performed in accordance with a program by a computer need not necessarily be performed in time series in the order described as a flowchart. That is, the processing performed in accordance with the program by the computer also includes processing (e.g., parallel processing or object-based processing) to be executed in parallel or individually.

In addition, the program may be processed by one computer (processor) or may be subject to distributed processing by multiple computers. Further, the program may be transferred to a remote computer and executed. Further, as used herein the term "system" means a set of multiple components (apparatuses, modules (parts), etc.), regardless of whether all the components are in the same housing.

Therefore, multiple apparatuses contained in separate housings and coupled together via a network and one apparatus containing multiple modules in one housing are each a system.

In addition, for example, the configuration described as one apparatus (or processor) may be divided into multiple configurations, which may be employed as multiple apparatuses (or processors). Conversely, the configurations described above as multiple apparatuses (or processors) may be integrated to be configured as one apparatus (or processor).

Further, a configuration other than the above-described configuration may be added, as a matter of course, to the configuration of each apparatus (or each processor). In addition, when the configuration and the operation as the entire system are substantially the same, some of the configurations of a certain apparatus (or processor) may be included in the configuration of another apparatus (or another processor).

Further, for example, the present technology can employ a cloud computing configuration in which one function is shared and jointly processed by multiple apparatuses via a network. In addition, for example, the above-described program can be executed in any apparatus.

In that case, it is sufficient for the apparatus to have a necessary function (such as a function block) to be able to obtain necessary information. In addition, for example, the steps described in the above-described flowcharts can be executed by one apparatus, and can also be shared and executed by multiple apparatuses.

Further, in a case where multiple pieces of processing are included in one step, the multiple pieces of processing included in the one step can be executed by one apparatus, and can also be shared and executed by multiple apparatuses. In other words, the multiple pieces of processing included in one step may also be executed as processing of multiple steps. Conversely, the processing described as the multiple steps may be collectively executed as one step.

It is to be noted that, as for the program to be executed by a computer, pieces of processing of steps describing the program may be executed in time series in the order described herein, or may be executed in parallel or individually at a necessary timing such as when a call is made. That is, the pieces of processing of the respective steps may be executed in an order different from the above-described order unless contradiction occurs.

Further, the processing of steps describing this program may be executed in parallel with processing of another program, or may be executed in combination with processing of another program.

In addition, the present multiple technologies described herein may be implemented alone independently of one another unless contradiction occurs. It is needless to say that any present multiple technologies may be used together. For example, some or all of the present technologies described in any of the embodiments may be implemented in combination with some or all of the present technologies described in other embodiments. In addition, some or all of any of the above-described present technologies may be implemented together with other technologies not described above.

<Method of Stopping Data Stream>

(HEARTBEAT Function)

In a case of being supported by both a requester and a responder, a HEARTBEAT function can be used to determine whether or not a session needs to be continued.

Here, the requester and the responder are configurations corresponding to the application processor 1212 and the image sensor 1211, respectively, and are able to have one or more communication channels depending on the session.

Hereinafter, description is given of an example in which a session is formed, by exemplifying a configuration of the propulsion control system 1600 that controls the propulsion of the propulsion apparatus, in which the outside information detecting unit 1617 and/or the microcomputer 1631 corresponding to the application processor 1212 are/is the requester, and the imaging section 1618 corresponding to the image sensor 1211 is the responder. It is needless to say that the outside information detecting unit 1617 and/or the microcomputer 1631 may also be the responder and the imaging section 1618 may also be the requester.

The requester or the responder transmits a HEARTBEAT request message within a HEARTBEAT cycle (Heartbeat Period) while being in the session. The Heartbeat Period is stored by Responder, for example, in a Param1 in the Successful KEY_EXCHANGE_RSP response message or in the PSK_EXCHANGE_RSP response message, and specified.

In a case where a HEARTBEAT_ACK response message or an ERROR response message from a HEARTBEAT request message reception side is not received within a "predetermined value (e.g., 2)×HEARTBEAT cycle (=first time)", a HEARTBEAT request message transmission side finishes the session.

The HEARTBEAT request message transmission side may retry transmission of the HEARTBEAT request message, and waits, for a predetermined period of time, for a response from the HEARTBEAT request message reception side before the retrying.

In a case where the HEARTBEAT request message is not received within a "predetermined value (e.g., 2) x HEARTBEAT cycle", the HEARTBEAT request message reception side finishes the session.

In such a case, there is a possibility that an attack on or a malfunction of the imaging section 1618 corresponding to the image sensor 1211 may cause data stream to be stopped due to the operation of the imaging section 1618.

For example, in a case where the propulsion apparatus such as a car, a drone, or a robot is mounted with the imaging section 1618 corresponding to the image sensor 1211, and the data stream from the imaging section 1618 is used in the outside information detecting unit 1617 and/or the microcomputer 1631 of the propulsion control system 1600 that controls the propulsion of the propulsion apparatus, sudden stop of the data stream affects the propulsion control, which may possibly cause a fatal accident in the worst case.

Therefore, in a case where the stop of the data stream occurs, HEARTBEAT functions are disabled (HBEAT_CAP=0) to allow the data stream not to be stopped by the responder (the imaging section 1618 corresponding to the image sensor 1211) without notifying the requester (the outside information detecting unit 1617 and/or the microcomputer 1631 corresponding to the application processor 1212).

Preventing the requester (the outside information detecting unit 1617 and/or the microcomputer 1631 corresponding to the application processor 1212) from stopping the data stream without notification makes it possible to avoid stopping of the data stream due to the operation of the responder (the imaging section 1618 corresponding to the image sensor 1211).

In addition, the requester (the outside information detecting unit 1617 and/or the microcomputer 1631 corresponding to the application processor 1212) may determine whether or not the session needs to be continued on the basis of a count value (e.g., a message counter value) transmitted from the responder (the imaging section 1618 corresponding to the image sensor 1211).

Further, in a case where the data stream is suddenly stopped, the HEARTBEAT function may be enabled (HBEAT_CAP=1) to allow the session end related to the HEARTBEAT cycle not to be an essential requirement (e.g., expressed as "shall" or "must"), but to be outside an essential requirement (e.g., an optional requirement expressed as "should" or "may"). Specifically, the session end related to the HEARTBEAT cycle may be an essential requirement on the HEARTBEAT request message transmission side, and may be outside the essential requirement on the HEARTBEAT request message reception side. In addition, the session end related to the HEARTBEAT cycle may be outside the essential requirement on the HEARTBEAT request message transmission side, and may be the essential requirement on the HEARTBEAT request message reception side. In addition, the session end related to the HEARTBEAT cycle may be outside the essential requirement on the HEARTBEAT request message transmission side, and may be outside the essential requirement on the HEARTBEAT request message reception side. It is to be noted that a publicly available SPDM standard may define the session end related to the HEARTBEAT cycle not as the essential requirement but as outside the essential requirement. A security standard referring to some or all of the SPDM standards may define the session end related to the HEARTBEAT cycle not as the essential requirement but as outside the essential requirement. The security standard not referencing to the SPDM standard may define the session end related to the HEARTBEAT cycle not as the essential requirement but as outside the essential requirement.

In addition, the responder (the imaging section 1618 corresponding to the image sensor 1211) may be provided with a detection circuit or a prediction circuit for an attack on itself or a malfunction to detect or predict a possibility that a specific status may occur in itself or in image data (also including a specific status having already occurred).

For example, when the responder (the imaging section 1618 corresponding to the image sensor 1211) transmits a HEARTBEAT_NAK response message to the requester (the outside information detecting unit 1617 and/or the microcomputer 1631 corresponding to the application processor 1212) which is a communication host, it is possible to notify the occurrence of a failure of the responder (imaging section 1618). Thus, it is possible for the requester (the outside information detecting unit 1617 and/or the microcomputer 1631) to determine whether or not its own data stream needs to be stopped (e.g., as Value, Reserved regions of 0x00, 0x05-0x5F, 0x62, and 0x6D-0x7D can be newly assigned).

When determination is made to stop the data stream, the requester (the outside information detecting unit 1617 and/or the microcomputer 1631) transmits an END_SESSION request to the responder (imaging section 1618) to stop the high-speed data communication to transmit data stream. However, the transmission of the END_SESSION request may be executed after elapse of a predetermined period of time from the determination of stopping of the data stream (e.g., reception of the HEARTBEAT_NAK response message, reception of the ERROR response message, and elapse of the first time), or may be suspended until the propulsion status satisfies the safety condition.

This enables the requester (the outside information detecting unit 1617 and/or the microcomputer 1631) to stop the data stream after a safe status is secured even when the data stream is stopped, for example, thus making it possible to suppress a fatal accident caused by an influence on the propulsion control.

FIG. 165 illustrates a configuration example of Responder flag fields definitions to set enablement (HBEAT_CAP=1) or disablement (HBEAT_CAP=0) of the HEARTBEAT function. This is a configuration example of the responder; however, likewise, the requester may adapt to the Requester flag fields definition, and may also adapt to the HBEAT_CAP in which Value in the Responder flag fields definitions is replaced by Requester from Responder. FIG. 166 illustrates a configuration example of the HEARTBEAT request message. FIG. 167 illustrates a configuration example of the HEARTBEAT_ACK response message. FIG. 168 illustrates a configuration example of the HEARTBEAT_NAK response message. FIG. 169 illustrates a configuration example of an END_SESSION request message. It is to be noted that, although a configuration example is illustrated in which Value of SPDM Version is V1.1 or TBD, another Value (e.g., V1.2 (=0x12), V1.3 (=0x13), or V2.0 (=0x20)) may be employed. In addition, in a case where there is a change from SPDM Version 1.1.0 that is publicly available, e.g., in a case where the session end related to the HEARTBEAT cycle is not set as the essential requirement, but as outside the essential requirement, the SPDM Version may be set as another Value. That is, the description of at least one of Offset, Bytes, or Value of the SPDM Version may conform to the latest version of the SPDM standard which is publicly available. Likewise, the description of at least one of Offset, Field, Bytes (Size in bytes), Value, Size, Bit, Description, Name, Error code, Error data, Extended-ErrorData, ID, Vendor ID length, Registry or standards body name, bit assign, Remarks, eDT, eVC, Addr, Initial Value, Setting Data, Attribute, Detail, Embedded Data Format Code, Security MAC, or Security protocol used in the diagrams or descriptions associated with this application may conform to the latest version of the SPDM standard, a standard in DMTF, a standard in MIPI, or other standards.

The HEARTBEAT_NAK response message is a specific message of abnormality message. In addition, as for the HEARTBEAT_NAK response message, for example, newly defining a region such as Param1 or Param2 to allocate a corresponding bit thereto may allow a specific status to be notified. That is, another specific message among those described above may be stored in the HEARTBEAT_NAK response message.

<HEARTBEAT Processing (Part 1)>

Next, description is given, with reference to a timing chart in FIG. 170, of HEARTBEAT processing (Part 1).

Here, FIG. 170 illustrates, on the left part, operation timings of the outside information detecting unit 1617 and/or the microcomputer 1631 corresponding to the application processor 1212 which is the CCI host (requester).

In addition, FIG. 170 illustrates, on the right part, operation timings of the imaging section 1618 corresponding to the image sensor 1211 which is the CCI device (responder).

That is, through pieces of processing in steps S1731 and 1751, the CCI host (requester) transmits a PSK_FINISH request message to the CCI device (responder) (partially similar to step S507 or S525).

Through pieces of processing in steps S1752 and 1732, the CCI device (responder) transmits a PSK_FINISH_RSP response message to the CCI host (requester) (partially similar to step S507 or S525).

This processing brings the HEARTBEAT function into an enabled state.

Through pieces of processing in steps S1733 and S1753, the CCI host (requester) transmits the HEARTBEAT request message to the CCI device (responder)

In response thereto, through pieces of processing in steps S1754 and 1734, the CCI device (responder) transmits the HEARTBEAT_ACK response message to the CCI host (requester).

Thereafter, the CCI host (requester) transmits the HEARTBEAT request message to the CCI device (responder) for each HEARTBEAT cycle (Heartbeat Period); in response thereto, the processing is repeated in which the CCI device (responder) transmits the HEARTBEAT_ACK response message to the CCI host (requester).

That is, as illustrated in steps S1733 to S1736 and S1753 to S1756, it is appreciated that the communication state is in a normally stablished state, as long as this processing is continually repeated.

Here, a case is assumed where, detection of abnormality in the CCI device (responder) leads to a state, i.e., no establishment of a communication state. Then, through pieces of processing in steps S1737 and S1757, the CCI device (responder) transmits the HEARTBEAT_NAK response message to the CCI host (requester), as in the pieces of processing in steps S1758 and S1738, in response to the HEARTBEAT request message transmitted to the CCI host (requester). However, in a state where the communication state has been established, the HEARTBEAT_NAK response message may be transmitted as an abnormality message to the CCI host (requester).

When the CCI host (requester) receives the HEARTBEAT_NAK response message through the processing in step S1738, the END_SESSION request message declaring the end of the session (and high-speed data communication) is transmitted to the CCI device (responder) through the processing in step S1739 to discard or clean up the session key. However, the CCI host (requester) may discard or clean up the session key, in a case such as, after elapse of a predetermined period of time from the transmission of the END_SESSION request message, or after reception of an END_SESSION_ACK response message, an END_SESSION_NAK response message, or the ERROR response message described later from the CCI device (responder).

In response thereto, when the CCI device (responder) receives the END_SESSION request message in step S1759, the END_SESSION_ACK response message is transmitted to the CCI host (requester) in step S1760 to discard or clean up the session key, and the session (and the high-speed data communication) is finished.

This processing brings the HEARTBEAT function into a disabled state.

Through the series of processing described above, even when abnormality occurs in the CCI device, the HEARTBEAT_NAK response message is supplied to the CCI host, and the series of processing is performed. Thereafter, the session (and the high-speed data communication) is finished, and the data stream is stopped. This prevents the CCI device from stopping the data stream without notifying the CCI host.

It is to be noted that, in a case where the HEARTBEAT request message cannot be received by the CCI device (responder) for each HEARTBEAT cycle (Heartbeat Period) for some reason, the CCI host (requester) transmits the END_SESSION request message to the CCI device (responder) to finish the session (and the high-speed data communication).

That is, also in this case, the end of the session (and the high-speed data communication) is implemented by the determination of the CCI host (requester) through the transmission of the END_SESSION request message. This still prevents the CCI device from stopping the data stream without notifying the CCI host.

<HEARTBEAT Processing (Part 2)>

Also in a case where the CCI device (responder) detects abnormality or in a case where the HEARTBEAT request message is not received within a predetermined period of time (=first time), the CCI device (responder) may sometimes not be able to receive the END_SESSION request message from the CCI host (requester) within a predetermined period of time (=second time). Here, the first time is time equivalent to a "predetermined value (e.g., 2)×HEARTBEAT cycle (Heartbeat Period)", and the second time is further elapsed time from the elapse of time equivalent to the "predetermined value (e.g., 2)×HEARTBEAT cycle (Heartbeat Period)" until transmission of the END_SESSION request message.

Therefore, in a case where the END_SESSION request message is not received by the CCI device (responder) within the predetermined period of time (=second time), the END_SESSION_NAK response message may be defined that indicates that the END_SESSION request message is not received by the CCI device (responder) within the predetermined period of time (=second time) to enable the CCI device (responder) to notify the CCI host (requester).

FIG. 171 illustrates a configuration example of the END_SESSION_NAK response message indicating that the END_SESSION request message is not received by the CCI device (responder) within the predetermined period of time (=second time).

In addition, as for the END_SESSION_NAK response message, for example, newly defining a region such as Param1 or Param2 in FIG. 171 to allocate corresponding bits thereto may notify of a specific status. That is, any specific message or abnormality message among those described above or additional information may be stored.

Next, description is given, with reference to flowcharts in FIGS. 172 and 173, of HEARTBEAT processing (Part 2).

It is to be noted that the flowchart in FIG. 172 illustrates processing of the CCI host (requester), and the flowchart in FIG. 173 illustrates processing of the CCI device (responder).

In step S1771 (FIG. 172), the CCI host (requester)transmits the PSK_FINISH request message to the CCI device (responder).

In response thereto, in step S1791 (FIG. 173), the CCI device (responder) determines whether or not to transmit the PSK_FINISH_RSP response message to the CCI host (requester) on the basis of whether or not the PSK_FINISH request message has been transmitted, and repeats similar processing until determination is made to transmit the PSK_FINISH_RSP response message.

Then, in a case where determination is made in step S1791 to transmit the PSK_FINISH_RSP response message, the CCI device (responder) transmits the PSK_FINISH_RSP response message to the CCI host (requester) in step S1792.

Here, in step S1772, the CCI host (requester) determines whether or not the PSK_FINISH_RSP response message from the CCI device (responder) has been received, and repeats similar processing until determination is made that the PSK_FINISH_RSP response message has been received.

In a case where determination is made in step S1772 that the PSK_FINISH_RSP response message has been received, the processing proceeds to step S1773.

In step S1773, the CCI host (requester) transmits the HEARTBEAT request message to the CCI device (responder).

In response thereto, in a step S1793 (FIG. 173), the CCI device (responder) determines whether or not the HEARTBEAT request message has been received.

In a case where determination is made in step S1793 that the HEARTBEAT request message has been received, the processing proceeds to step S1794.

In step S1794, the CCI device (responder) transmits the HEARTBEAT_ACK response message to the CCI host (requester), and the processing returns to step S1793.

Here, in step S1774 (FIG. 172), the CCI host (requester) determines whether or not the HEARTBEAT_ACK response message has been received.

In a case where determination is made in step S1774 that the HEARTBEAT_ACK response message has been received, the processing returns to step S1773.

As long as the CCI host (requester) transmits HEARTBEAT request to the CCI device (responder) and the CCI device (responder) repeats processing to return the HEARTBERAT_ACK response message to the CCI host (requester) in response thereto, pieces of processing in steps S1773 and S1774 (FIG. 172) and steps S1793 and S1794 (FIG. 173) are repeated.

That is, as long as the CCI host (requester) and the CCI device (responder) maintain established communication therebetween, the CCI host (requester) transmits the HEARTBEAT request message to the CCI device (responder) at the HEARTBEAT cycle (Heartbeat Period), and the CCI device (responder) repeats processing to return the HEARTBERAT_ACK response message to the CCI host (requester) in response thereto.

Meanwhile, in a case where determination is made in step S1793 (FIG. 173) not to receive the HEARTBEAT request message, the processing proceeds to step S1795.

In step S1795, the CCI device (responder) determines whether or not abnormality has been detected by abnormality diagnosis.

In a case where determination is made in step S1795 that abnormality has been detected, the processing proceeds to step S1796.

In step S1796, the CCI device (responder) transmits the HEARTBERAT_NAK response message to the CCI host (requester).

Meanwhile, in a case where determination is made in step S1774 (FIG. 172) not to receive the HEARTBERAT_ACK response message, the processing proceeds to step S1775.

In step S1775, the CCI device (responder) determines whether or not the HEARTBERAT_NAK response message has been received.

In a case where determination is made in step S1775 that the HEARTBERAT_NAK response message has been received, the processing proceeds to step S1777.

In step S1777, the CCI host (requester) transmits the END_SESSION request message to the CCI device (responder).

In step S1778, the CCI host (requester) discards or cleans up the session key to finish the session (and the high-speed data communication).

Meanwhile, in step S1798 (FIG. 173), the CCI device (responder) determines whether or not the END_SESSION request message has been received after elapse of the first time until further elapse of the second time.

In a case where determination is made in step S1798 that the END_SESSION request message has been received, the processing proceeds to step S1799.

In step S1799, the CCI device (responder) transmits the END_SESSION_ACK response message to the CCI host (requester).

In step S1800, the CCI device (responder) discards or cleans up the session key to finish the session (and the high-speed data communication).

That is, when abnormality is detected in the CCI device (responder), the HEARTBERAT_NAK response message is transmitted to the CCI host (requester), and the END_SESSION request message is transmitted to the CCI device (responder). In response thereto, an ENDSESSION_ACK response message is transmitted to the CCI host (requester), and the session key is discarded or cleaned up in both of the CCI host (requester) and the CCI device (responder) to finish the session (and the high-speed data communication).

In addition, in a case where no abnormality has been detected in step S1795 (FIG. 173), the processing proceeds to step S1797.

In step S1797, the CCI device (responder) determines whether or not the first time has elapsed after reception of the HEARTBERAT request message immediate before.

In a case where determination is made in step S1797 that the first time has not elapsed after the reception of the HEARTBERAT request message immediate before, the processing returns to step S1793.

Meanwhile, in a case where no HEARTBERAT_NAK response message is received in step S1775, the processing proceeds to step S1776.

In step S1776, the CCI device (responder) determines whether or not the first time has elapsed after transmission of the HEARTBERAT request immediate before.

In a case where determination is made in step S1776 that the first time equivalent to the "predetermined value (e.g., 2)×HEARTBEAT cycle (Heartbeat Period)" has not elapsed after the transmission of the HEARTBERAT request message immediate before, the processing returns to step S1774.

That is, in a case where no abnormality is detected in a state of being unable to receive the HEARTBEAT request message in the CCI device (responder), pieces of processing in steps S1774 to S1776 (FIG. 172) and pieces of processing in steps S1793, S1795, and S1797 (FIG. 173) are repeated until the first time elapses.

Then, when the first time has elapsed in step S1776 (FIG. 172), the processing proceeds to steps S1777 and S1778, in which the CCI host (requester) transmits the END_SESSION request message, and discards or cleans up the session key to finish the session (and the high-speed data communication).

In addition, in the CCI device (responder), in a case where the first time has elapsed in step S1797 (FIG. 173), the processing proceeds to step S1798.

In this case, as for the processing, pieces of processing in steps S1798 to S1800 are performed.

Therefore, even in a state where no abnormality has been detected in the CCI device (responder), when the state of being unable to receive the HEARTBEAT request message continues in the CCI device (responder) for the first time or longer, the session (and the high-speed data communication) is finished on the basis of the END_SESSION request message from the CCI host (requester).

Further, in a case where, determination is made in step S1798 not to receive the END_SESSION request message after elapse of the first time since the previous reception of the HEARTBEAT request message until further elapse of the second time, the processing proceeds to step S1801.

In step S1801, the CCI device (responder) transmits the END_SESSION_NAK response message to the CCI host (requester).

Accordingly, in a case where the state of being unable to receive the END_SESSION request message in the CCI device (responder) further continues, for some reason, for the second time or longer after elapse of the first time since the previous reception of the HEARTBEAT request message, the END_SESSION_NAK response message is transmitted to the CCI host (requester) to finish the session (and the high-speed data communication).

In this case, the CCI device (responder) finishes the high-speed data communication at its own discretion, but the END_SESSION_NAK response message is transmitted to the CCI host (requester), thus enabling the CCI host (requester) to recognize that the high-speed data communication has been finished in the CCI device (responder).

In addition, in this processing, in a case where abnormality is detected, the CCI device (responder) immediately notifies the CCI host (requester) of the abnormality before waiting for a predetermined period of time (=first time). Further, the HEARTBEAT_NAK response message may be replaced by the above-described specific message, abnormality message or additional information. It is to be noted that processing similar to that in step S1796 (transmitting HEARTBEAT_NAK response) may be added between the processing in step S1797 (has first time elapsed?) and the processing in step S1798 (has the END_SESSION request been received within the second time?). That is, in a case where the first time has elapsed, the HEARTBEAT_NAK response may be transmitted. In addition, some (e.g., Param1, Param2) or all of the messages may be different between the HEARTBEAT_NAK response in a case where abnormality is detected and the HEARTBEAT_NAK response in a case where the first time has elapsed.

<HEARTBEAT Processing (Part 3)>

At least one of the HEARTBEAT_NAK response or the END_SESSION_NAK response message may be omitted.

Now, description is given, with reference to flowcharts in FIGS. 174 and 175, of HEARTBEAT Processing (Part 3) in which both of the HEARTBEAT_NAK response message and the END_SESSION_NAK response message are omitted.

It is to be noted that the flowchart in FIG. 174 illustrates processing of the CCI host (requester), and the flowchart in FIG. 175 illustrates processing of the CCI device (responder).

Here, pieces of processing in steps S1811 to S1817 in FIG. 174 correspond to the pieces of processing in steps S1771 to S1774 and S1776 to S1778 in FIG. 172, and therefore descriptions thereof are omitted. In addition, pieces of processing in steps S1831 to S1838 in FIG. 175 correspond to the pieces of processing in steps S1791 to S1794 and S1797 to S1800 in FIG. 173, and therefore descriptions thereof are omitted.

That is, in a case where the first time has elapsed after the previous reception of the HEARTBEAT request message regardless of the presence or absence of abnormality based on the abnormality diagnosis result, the processing of the CCI host (requester) in FIG. 174 is considered to be brought into a state of being unable to communicate with the CCI device (responder), and the END_SESSION request message is transmitted to finish the session (and the high-speed data communication).

In addition, in a case where the next HEARTBEAT_ACK response message cannot be received after the previous reception of the HEARTBEAT_ACK response message until elapse of the first time, the processing of the CCI device (responder) in FIG. 175 is considered to be brought into a state of being unable to communicate with the CCI host (requester). When the END_SESSION request message is transmitted before further elapse of the second time, the END_SESSION_ACK response message is transmitted to finish the session (and the high-speed data communication).

Meanwhile, when no END_SESSION request message is transmitted before further elapse of the second time, the session (and the high-speed data communication) is finished as is.

Also in the above-described processing, in a case where the HEARTBEAT request message cannot be received by the CCI device (responder) for each HEARTBEAT cycle (Heartbeat Period) for some reason, it is possible to finish the session (and the high-speed data communication).

In addition, also in this processing, the end of the session (and the high-speed data communication) is basically implemented by the determination of the CCI host (requester) through the transmission of the END_SESSION request message. This still prevents the CCI device from stopping the data stream without notifying the CCI host. However, in this processing, in a case where the END_SESSION request message cannot be received for the second time or longer, the session including the high-speed data communication is finished by the determination of the CCI device (responder).

<Practical Application Example 1 of HEARTBEAT Processing>

The CCI device (responder) may transmit the ERROR response message to the CCI host (requester) in a case where abnormality such as an error or a failure occurs.

That is, the CCI device (responder) may transmit, to the CCI host (requester), the ERROR response message adaptive to an error or a failure associated with the HEARTBEAT function instead of at least one of the HEARTBEAT_NAK response message or the END_SESSION_NAK response message.

The ERROR response message is configured as illustrated in FIG. 176, for example. As illustrated in FIG. 176, for example, corresponding bits may be allocated to the ERROR response message to allow regions of the Param1 (Error code), the Param2 (Error data) and the ExtendedErrorData to be defined to thereby notify of a specific status.

That is, at least one of the above-described specific message, abnormality message, or additional information may be stored. In addition, an existing Error code (e.g., Unspecified, InvalidSession (Value:0x02, Description: The record layer used an invalid session ID, Error data: This shall be the invalid session ID, ExtendedErrorData: No extended error data is provided.)) may be used as the ERROR response message adaptive to an error or a failure associated with the HEARTBEAT function, the END_SESSION request message, or the like.

FIG. 177 illustrates a setting example of Error code and Error data. However, the Reserved region or a Vendor/Other Standards Defined region may be newly defined as error regions adaptive to an error or a failure associated with the HEARTBEAT function or the END_SESSION request message. In addition, setting in an Error code and error data table in the SPDM specification defined by the publicly available SPDM standard may be used. In addition, FIG. 178 illustrates a setting example of the ExtendedErrorData.

<Practical Application Example 2 of HEARTBEAT Processing>

The HEARTBEAT request message may be defined by a VENDOR_DEFINED_REQUEST message in a pseudo manner, and the HEARTBEAT_ACK response (and the HEARTBEAT_NAK response) message may be defined by a VENDOR_DEFINED_RESPONSE response message in a pseudo manner, thereby implementing the HEARTBEAT function in a pseudo manner by using them instead of the HEARTBEAT request and the HEARTBEAT_ACK response.

Hereinafter, the HEARTBEAT function being pseudo implemented by the VENDOR_DEFINED_REQUEST message and the VENDOR_DEFINED_RESPONSE response message is simply referred to as a pseudo HEARTBEAT function.

That is, in a case where the pseudo HEARTBEAT function is used, it is possible to disable the HEARTBEAT function (HBEAT_CAP=0).

It is to be noted that FIG. 179 illustrates a setting example of Registry or standards body ID in a case where the pseudo HEARTBEAT function is implemented. However, setting in a Registry or standards body ID table in the SPDM specification defined by the publicly available SPDM standard may be used. That is, the present technology may be applied into a standard defined by at least one of standardsbody such as DMTF (Distributed Management Task Force), TCG (Trusted Computing Group), USB (Universal Serial Bus), PCI-SIG (Peripheral Component Interconnect Special Interest Group), IANA (Internet Assigned Numbers Authority), HDBaseT, MIPI (Mobile Industry Processor Interface), CXL (Compute Express Link), or JEDEC (Joint Electron Device Engineering Council), or may be applied to a HEARTBEAT equivalent function or an END_SESSION equivalent function in the standards defined by at least one of these described above or other standards body. In addition, FIGS. 180 and 181 illustrate setting examples of the VENDOR_DEFINED_REQUEST request message and the VENDOR_DEFINED_RESPONSE response message in a case where respective pseudo HEARTBEAT functions are implemented. However, the pseudo HEARTBEAT function may be defined by another message conforming to the SPDM standard, a message conforming to a CCI standard, a message conforming to another standard, or the like. Likewise, the END_SESSION request message may be defined by a VENDOR_DEFINED_REQUEST request message in a pseudo manner, and the END_SESSION_ACK response (and the END_SESSION_NAK response) message may be defined by the VENDOR_DEFINED_RESPONSE response message in a pseudo manner, thereby implementing the END_SESSION function in a pseudo manner by using them instead of the END_SESSION request and the END_SESSION_ACK response. Hereinafter, the END_SESSION function being pseudo implemented by the VENDOR_DEFINED_REQUEST request message and the VENDOR_DEFINED_RESPONSE response message is simply referred to as a pseudo END_SESSION function. However, the pseudo END_SESSION function may be defined by another message conforming to the SPDM standard, a message conforming to the CCI standard, a message conforming to other standards, or the like.

<Key Update in Image Communication>

The present technology discloses key update of a session key (encryption key or MAC value key) suitable for application to, for example, a CSI (Camera Serial Interface) standard or a DSI (Display Serial Interface) standard of a MIPI (Mobile Industry Processor Interface) Alliance. The present technology is particularly suitable to application to the CSI-2 standard or a DSI-2 standard. It is to be noted that the CSI-2 standard or the DSI-2 standard includes control-system communication (referred to as CCI communication) and image-system communication (referred to as controlled-system communication, CSI-2 communication, or DSI-2 communication). The control-system communication is bidirectional communication including transmission of any of a write command (CCI Write), a read command (CCI Read), and a read response (CCI Read return value). The image-system communication is unidirectional communication including transmission of any of frame start, embedded data, image data, user-defined data, and frame end. Further, the present technology is suitable for application of a session key (encryption key or MAC key) derived using the control-system communication to the image-system communication. Meanwhile, it is possible to apply an SPDM (Security Protocol and Data Model) standard according to DMTF (Distributed Management Task Force) in order to add a security feature to the control-system communication and the image-system communication. Therefore, the present technology is suitable for application of the SPDM standard to the control-system communication which is bidirectional communication and the controlled-system communication which is unidirectional communication, but does not need to conform to the SPDM standard.

<SPDM>

As illustrated in FIG. 182, in the SPDM standard according to the DMTF described in NPTL 1, it is possible to derive, from a key schedule, four major secrets (Major secrets) (S0: Request-direction handshake secret, S1: Response-direction handshake secret, S2: Request-direction data secret, and S3: Response-direction data secret), and it is possible to derive at least one export master secret (Export Master Secret). Further, it is possible to derive a session key (encryption key or MAC key) from these secrets (session secrets).

Each secret is applied to a particular transmission direction, and is effective only within a particular timeframe. Each of these four major secrets is used to derive a session key (encryption key or MAC key) to be used in an AEAD function selected in the ALGORITHMS response. In addition, the four major secrets may also be used to derive an initialization vector (IV) to be used in the AEAD function.

S0 and S1 are used only in the session handshake phase (Session handshake phase); it is possible for S0 to be applied to all requests after KEY_EXCHANGE or PSK_EXCHANGE to FINISH or PSK_FINISH, and it is possible for S1 to be applied to all responses thereof. In addition, S0 and S1 are used to derive Finished_key which is used to calculate, respectively, a RequesterVerifyData region in the SPDM message and a ResponderVerifyData region in the SPDM message.

It is possible to use S2 and S3 for all of data to be transmitted during the application phase (Application phase) of the session. S2 is applied only to all data which moves from the requester to the responder, and S3 is applied only to all data which moves from the responder to the requester.

In a case of updating these four Major secrets, it is sufficient to apply 12.8 Major secrets update described in NPTL 1.

After successful SPDM key exchange, it is possible to derive an additional session key (encryption key or MAC key) from the Export Master Secret. In a case of updating the Export Master Secret, a definition acquired by modifying or finely modifying the 12.8 Major secrets update described in NPTL 1 may be applied, or a new definition may be applied.

<Update of Export Master Secret>

For example, as illustrated in FIG. 183, the Export Master Secret may be updated, and a new session key (encryption key or MAC key) may be derived for application to the image-system communication.

In the SPDM standard according to the DMTF described in NPTL 1, the Export Master Secret cannot be updated, and thus an Operation (e.g., UpdateExportMaster) for updating the Export Master Secret is added as KEY_UPDATE operations as illustrated in FIG. 183. Value and Description are exemplary; different Value may be further defined, and, when there is another Export Master Secret, Operation for updating the other Export Master Secret (e.g., Export Master Secret 1, Export Master Secret 2, . . . ) may be added.

<Key Use Start Timing Undetermined, Non-Adaptive to Key Verification Function>

In a case where the SPDM standard according to the DMTF described in NPTL 1 is applied to the image-system communication in such a manner that the Export Master Secret can be updated as described above, a timing to start using a new secret and session key (encryption key or MAC key) is determined by a KEY_UPDATE request message and a KEY_UPDATE_ACK response message, for a request direction data secret and a response direction data secret. In contrast, there is a possibility that a timing to start using a new secret and session key (encryption key or MAC key) may not be determined for the export master secret.

In addition, an Operation of VerifyNewKey can be used to verify whether a new session key (encryption key or MAC key) has been correctly derived for the request direction data secret and the response direction data secret. However, there is a possibility that it may not be possible for the Operation of the VerifyNewKey to verify whether a new session key (encryption key or MAC key) has been correctly derived for the export master secret.

Therefore, the timing to start using the new session key is specified. In addition, the new session key is verified.

<Specification of Timing to Start Using New Session Key>

FIG. 184 is a flowchart illustrating an example of communication processing using a session key between the image sensor 1211 and the application processor 1212 illustrated in A of FIG. 75. The image sensor 1211 has a configuration as illustrated in FIG. 76. The application processor 1212 has a configuration as illustrated in FIG. 77.

In the application processor 1212, the extension mode adaptive CSI-2 reception circuit 1322 and/or the security section 1326 have/has a function as the CCI host (requester), and the extension mode adaptive CSI-2 reception circuit 1322 and/or the security section 1326 have/has a function as the CSI-2 host. In the image sensor 1211, the extension mode adaptive CSI-2 transmission circuit 1304 and/or the security section 1310 have/has a function as the CCI device (responder), and the extension mode adaptive CSI-2 transmission circuit 1304 and/or the security section 1310 have/has a function as the CSI-2 device. The CCI host transmits a request message to the CCI device, and, in response to reception thereof, the CCI device transmits a response message to the CCI host.

The CCI host and the CSI-2 host are integrated or separated, and the CCI device and the CSI-2 device are integrated or separated. In addition, bidirectional low-speed command transmission is performed between the CCI host and the CCI device, and unidirectional high-speed data transmission is performed between the CSI-2 host and the CSI-2 device.

In step S2001 and step S2011, the GET_VERSION request and the VERSION response are performed between the CCI host(s) of the extension mode adaptive CSI-2 reception circuit 1322 and/or the security section 1326 and the CCI device(s) of the extension mode adaptive CSI-2 transmission circuit 1304 and/or the security section 1310. This allows the extension mode adaptive CSI-2 reception circuit 1322 and/or the security section 1326 to acquire an SPDM version of the endpoint.

In step S2002 and step S2012, the GET_CAPABILITIES request and the CAPABILITIES response are performed between the CCI host(s) of the extension mode adaptive CSI-2 reception circuit 1322 and/or the security section 1326 and the CCI device(s) of the extension mode adaptive CSI-2 transmission circuit 1304 and/or the security section 1310. This allows the extension mode adaptive CSI-2 reception circuit 1322 and/or the security section 1326 to acquire the SPDM function of the endpoint.

In step S2003 and step S2013, the NEGOTIATE_ALGORITHMS request and the ALGORITHMS response are performed between the CCI host(s) of the extension mode adaptive CSI-2 reception circuit 1322 and/or the security section 1326 and the CCI device(s) of the extension mode adaptive CSI-2 transmission circuit 1304 and/or the security section 1310. This allows the extension mode adaptive CSI-2 reception circuit 1322 and/or the security section 1326 to negotiate a cryptographic algorithm with the extension mode adaptive CSI-2 transmission circuit 1304 and/or the security section 1310.

In step S2004 and step S2014, the PSK_EXCHANGE request and the PSK_EXCHANGE_RSP response are performed between the CCI host(s) of the extension mode adaptive CSI-2 reception circuit 1322 and/or the security section 1326 and the CCI device(s) of the extension mode adaptive CSI-2 transmission circuit 1304 and/or the security section 1310. This allows the extension mode adaptive CSI-2 reception circuit 1322 and/or the security section 1326 and the extension mode adaptive CSI-2 transmission circuit 1304 and/or the security section 1310 to derive a CCI-oriented session key such as the session secret or the encryption key.

In step S2005 and step S2015, the PSK_FINISH request and the PSK_FINISH_RSP response are performed between the CCI host(s) of the extension mode adaptive CSI-2 reception circuit 1322 and/or the security section 1326 and the CCI device(s) of the extension mode adaptive CSI-2 transmission circuit 1304 and/or the security section 1310. This certifies to the responder that the extension mode adaptive CSI-2 reception circuit 1322 and/or the security section 1326 know(s) PSK (PSK: Pre-shared key) and that the CCI-oriented session key derived in step S2004 and step S2014 is correct.

In step S2006, the CCI host(s) of the extension mode adaptive CSI-2 reception circuit 1322 and/or the security section 1326 supply/supplies information such as the CSI-2-oriented session key, algorithms, or other parameters to the CSI-2 host(s) of the extension mode adaptive CSI-2 reception circuit 1322 and/or the security section 1326. In step S2021, the CSI-2 host(s) of the extension mode adaptive CSI-2 reception circuit 1322 and/or the security section 1326 acquire(s) the information.

In step S2016, the CCI device(s) of the extension mode adaptive CSI-2 transmission circuit 1304 and/or the security section 1310 supply/supplies information such as the CSI-2-oriented session key, algorithms, or other parameters to the CSI-2 device(s) of the extension mode adaptive CSI-2 transmission circuit 1304 and/or the security section 1310. In step S2031, the CSI-2 device(s) of the extension mode adaptive CSI-2 transmission circuit 1304 and/or the security section 1310 acquire(s) the information.

Thereafter, the CSI-2 host(s) of the extension mode adaptive CSI-2 reception circuit 1322 and/or the security section 1326 and the CSI-2 device(s) of the extension mode adaptive CSI-2 transmission circuit 1304 and/or the security section 1310 perform communication using the session key (arrows of step S2022 and step S2032 and thereafter).

For the CCI, the KEY_UPDATE request and the KEY_UPDATE_ACK response to which Operation of UpdateKey or UpdateAllKeys is applied and the KEY_UPDATE request and the KEY_UPDATE_ACK response to which Operation of the VerifyNewKey is applied allow the session secret and the session key to be updated between the CCI host and the CCI device.

For CSI-2, for example, when the CCI host is triggered to update the CSI-2-oriented session key, the KEY_UPDATE request and the KEY_UPDATE_ACK response to which Operation of UpdateExportMaster is applied allow the session secret and the session key to be updated between the CCI host and the CCI device, and the updated session key (new session key) is applied between the CSI-2 host and the CSI-2 device (step S2008 and step S2017). That is, in the update of the CSI-2-oriented key, a set of the KEY_UPDATE request and the KEY_UPDATE_ACK response can be omitted.

However, for the convenience of application of the new session key updated using the low-speed command transmission between the CCI host and the CCI device to the high-speed data transmission between the CSI-2 host and the CSI-2 device, it is desirable to specify a timing to start using the new session key in order to avoid misuse between new and old session keys.

The image-system communication (CSI-2) is generally faster than some or all of the control-system communication (CCI), and the total amount of data to be transmitted is generally larger. Therefore, in a case where the new session key (encryption key or MAC key) updated by the control-system communication is applied to the image-system communication, there is a possibility that the timing to start using the new session key may be inconsistent between the sensor and the processor.

Therefore, in order to avoid the timing inconsistency, the packet is extended, and the timing to start using the new session key is specified. For example, in the packet header of the extended packet, as illustrated in FIG. 185, transmission of the extended packet of ePH2[TBD]=1'b1 allows the timing to start using the new session key to be specified.

Description is given, with reference to a flowchart in FIG. 186, of an example of a flow of processing in such a case. The CSI-2 host derives a session key in step S2051, and the CSI-2 device derives a session key in step S2061. Thereafter, communication is performed using the session key (current session key). The CSI-2 device uses the current session key to transmit a VC1 extended packet by ePH2[TBD]=1'b0 (step S2062), and the CISI-2 host receives the VC1 extended packet (step S2052). The subsequent communication is performed in the same manner.

Thereafter, at predetermined timings, the CSI-2 host and the CSI-2 device derive respective new session keys (S2053 and S2063). The CSI-2 device uses the current session key to transmit the VC1 extended packet by ePH2[TBD]=1'b1 (step S2064), and the CSI-2 host receives the VC1 extended packet (S2054). This allows the timing to start using the new session key to be specified.

Thereafter, the new session key is used to perform communication. That is, in response to the above-described timing specification of the start of use, the session key is updated, and the new session key is started to be used. The CSI-2 device uses the new session key to transmit the VC1 extended packet by ePH2[TBD]=1'b0 (step S2066), and the CSI-2 host receives the VC1 extended packet (S2055). The subsequent communication is performed in the same manner.

It is to be noted that, at predetermined timings, the CSI-2 host and the CSI-2 device discard respective session keys before update (old session keys) (S2056 and S2065).

It is possible to specify the timing to start using the new session key in this manner, thus making it possible to update the session key at an appropriate timing. In addition, by specifying the timing to start using the new session key by the extended packet header in this manner, it is possible to start using the new session key at any line (any timing).

The description has been given above of the example in which the timing to start using the new session key is specified by the extended packet header; however, the timing to start using the new session key may be specified by embedded data, read response (including in-band interrupt), or the like.

It is to be noted that, although FIG. 186 illustrates the fastest timing at which the old session key can be discarded, the timing to discard the old session key may be delayed. In that case, the new session key and the old session key are held, which is adaptive to a possible status in which the old session key is needed. For example, the timing to discard the old session key may be delayed until immediately before deriving the next new session key. In that case, the sensor and the processor always or almost always hold two types of session keys. The same applies also to other examples.

It is to be noted that, although the description has been given by referring to the example in which the virtual channel of extended packet is VC1, the same applies also to the case of another virtual channel. That is, the VC1 may be replaced by VC2, VC3, or the like, or the VC1 may be omitted.

The extended packet header may cause the sensor to specify the timing to start using the new session key. Description is given, with reference to a flowchart in FIG. 187, of an example, in that case, of a flow of processor processing which is processing of the application processor 1212.

When the processor processing is started, in step S2101, the extension mode adaptive CSI-2 reception circuit 1322 and/or the security section 1326 of the application processor 1212 determine(s) whether or not a VC1 key needs to be updated, and wait(s) until the update is necessary. In a case where determination is made that the VC1 key needs to be updated, the processing proceeds to step S2102.

In step S2102, the extension mode adaptive CSI-2 reception circuit 1322 and/or the security section 1326 transmit(s) a VC1 key update command. In addition, in step S2103, the extension mode adaptive CSI-2 reception circuit 1322 and/or the security section 1326 derive(s) a new session key.

In step S2104, the extension mode adaptive CSI-2 reception circuit 1322 and/or the security section 1326 determine(s) whether or not a VC1 extended packet of ePH2[TBD]=1'b1 has been received, and wait(s) until determination is made that it has been received. In a case where determination is made that it has been received, the processing proceeds to step S2105.

In step S2105, the extension mode adaptive CSI-2 reception circuit 1322 and/or the security section 1326 determine(s) whether or not a VC1 extended packet of ePH2[TBD]=1'b0 has been received, and wait(s) until determination is made that it has been received. In a case where determination is made that it has been received, the processing proceeds to step S2106.

In step S2106, the extension mode adaptive CSI-2 reception circuit 1322 and/or the security section 1326 start(s) discarding or cleaning up the old session key.

In step S2107, the extension mode adaptive CSI-2 reception circuit 1322 and/or the security section 1326 start(s) using a new session key.

When the processing of S2107 is finished, the processor processing is finished.

Description is given, with reference to a flowchart in FIG. 188, of an example of a flow of sensor processing which is processing of the image sensor 1211. This sensor processing is processing corresponding to the processor processing in FIG. 187.

When the sensor processing is started, in step S2141, the extension mode adaptive CSI-2 transmission circuit 1304 and/or the security section 1310 of the image sensor 1211 determine(s) whether or not the VC1 key update command transmitted from the application processor 1212 in step S2102 in FIG. 187 has been received, and wait(s) until determination is made that it has been received. In a case where determination is made that the VC1 key update command has been received, the processing proceeds to step S2142.

In step S2142, the extension mode adaptive CSI-2 transmission circuit 1304 and/or the security section 1310 derive(s) a new session key.

In step S2143, the extension mode adaptive CSI-2 transmission circuit 1304 and/or the security section 1310 determine(s) whether or not to transmit the VC1 extended packet, and wait(s) until determination is made to transmit it. In a case where determination is made to transmit it, the processing proceeds to step S2144.

In step S2144, the extension mode adaptive CSI-2 transmission circuit 1304 and/or the security section 1310 transmit(s) the VC1 extended packet by ePH2[TBD]=1'b1. This VC1 extended packet is received by the application processor 1212 in step S2104.

In step S2145, the extension mode adaptive CSI-2 transmission circuit 1304 and/or the security section 1310 determine(s) whether or not to transmit the VC1 extended packet, and wait(s) until determination is made to transmit it. In a case where determination is made to transmit it, the processing proceeds to step S2146.

In step S2146, the extension mode adaptive CSI-2 transmission circuit 1304 and/or the security section 1310 start(s) discarding or cleaning up the old session key.

In step S2147, the extension mode adaptive CSI-2 transmission circuit 1304 and/or the security section 1310 start(s) using the new session key.

In step S2148, the extension mode adaptive CSI-2 transmission circuit 1304 and/or the security section 1310 transmit(s) the VC1 extended packet by ePH2[TBD]=1'b0.

When the processing in step S2148 is finished, the sensor processing is finished.

The application processor 1212 performs the processor processing as described above, and the image sensor 1211 performs the sensor processing as described above, thereby making it possible to specify the timing to start using the new session key and thus to update the session key, as in the flowchart in FIG. 186.

<Verification of Session Key>

The Operation of the VerifyNewKey in the KEY_UPDATE operations in the KEY_UPDATE request message is applicable to the control-system communication (CCI) of bidirectional communication, but is not applicable to the image-system communication (CSI-2) of unidirectional communication. Therefore, verification is made in the image-system communication that a new session key (encryption key or MAC key) updated in the control-system communication is correctly derived.

Specifically, for example, the sensor performs an arithmetic operation of a MAC value of a portion of the embedded data (second embedded data) using the new session key derived by the sensor, and transmits the second embedded data stored in the packet data and the MAC value stored in the extended packet footer to the processor. Then, the processor receives the second embedded data and the MAC value, and performs an arithmetic operation of the MAC value of the second embedded data using the new session key derived by the processor; in a case where a result of the arithmetic operation of the MAC value and a reception result are consistent with each other, determination is made that the new session key is correctly derived. This verification of the new session key is suitable for the line-MAC method.

Description is given, with reference to a flowchart in FIG. 189, of an example of a flow of processing in such a case. The CSI-2 host derives a session key in step S2201, and the CSI-2 device derives a session key in step S2221. Thereafter, communication is performed using the session key (current session key). The CSI-2 device uses the current session key to transmit a VC1 extended packet by ePH2 [TBD]=1'b0 (step S2222), and the CISI-2 host receives it (step S2202). The subsequent communication is performed in the same manner.

Thereafter, at predetermined timings, the CSI-2 host and the CSI-2 device derive respective new session keys (S2203 and S2223). The CSI-2 device uses the current session key to transmit VC1 first embedded data by ePH2[TBD]=1'b0 (step S2224), and the CSI-2 host receives it (S2204). This allows the timing to start using the new session key to be specified.

Then, the CSI-2 device uses the new session key to transmit VC1 second embedded data by ePH2[TBD]=1'b0 (step S2225), and the CSI-2 host receives it (step S2205). This second embedded data is used to start verification of the new session key. That is, in step S2206, the CSI-2 host verifies the new session key.

That is, as described above, the CSI-2 device performs an arithmetic operation of a MAC value of a portion of the embedded data (second embedded data) using the new session key derived by the CSI-2 device, and transmits the second embedded data stored in the packet data and the MAC value stored in the extended packet footer to the CSI-2 host. Then, the CSI-2 host receives the second embedded data and the MAC value, and performs an arithmetic operation of the MAC value of the second embedded data using the new session key derived by the CSI-2 host to compare a result of the arithmetic operation of the MAC value and a reception result with each other. In a case where they are consistent with each other, the CSI-2 host determines that the new session key has been correctly derived.

In a case where determination is made that the new session key has been correctly derived, the session key is updated. That is, the new session key is started to be used.

Therefore, the CSI-2 device uses the current session key to transmit a VC1 frame end by ePH2[TBD]=1'b1 (step S2226), and the CSI-2 host receives it (step S2207).

Then, the CSI-2 device uses the new session key to transmit a VC1 frame start by ePH2[TBD]=1'b0 (step S2228), and the CSI-2 host receives it (step S2208). Thereafter, the CSI-2 device uses the new session key to transmit the VC1 extended packet by ePH2[TBD]=1'b0 (step S2229), and the CSI-2 host receives it (step S2210). The subsequent communication is performed in the same manner.

It is to be noted that, at predetermined timings, the CSI-2 host and the CSI-2 device discard respective session keys before update (old session keys) (S2209 and S2227).

It is possible to verify the new session key in this manner, thus making it possible to make an update to a correct session key. That is, it is possible to update the session key more accurately.

It is to be noted that the procedure to verify the session key is not limited to this example. For example, the sensor encrypts a portion of the embedded data (second embedded data) using the new session key derived by the sensor to transmit it to the processor. Then, the processor receives the second embedded data, decrypts the second embedded data using the new session key derived by the processor, and determines, when the result is as expected, that the new session key has been correctly derived. Such a procedure may be used to verify the session key.

Incidentally, the order of transmission of the first embedded data and the second embedded data may be differentiated. In addition, third embedded data (session key, ePH2 [TBD]=1'b0) may be transmitted after the second embedded data. In addition, the number of rows of the embedded data may be variable or fixed, depending on the presence or absence of the verification of the new session key. In addition, the description has been given by referring to the example of verifying the new session key using a portion of the embedded data (second embedded data). However, likewise, a portion or all of data in the image-system communication (in particular, packet data in the extended packet), such as a portion of the image data (second image data) or a portion of the user-defined data (second user-defined data) may also be used to verify the new session key.

Description is given, with reference to a flowchart in FIG. 190, of an example of a flow of the processor processing in this case. In a case where the extended packet header is used, the VerifyNewKey of the SPDM is not applicable to CSI-2, and thus a portion of the embedded data is used in the CSI-2 framework to verify the new session key.

When the processor processing is started, in step S2301, the extension mode adaptive CSI-2 reception circuit 1322 and/or the security section 1326 of the application processor 1212 determine(s) whether or not the VC1 key needs to be updated, and wait(s) until the update is necessary. In a case where determination is made that the VC1 key needs to be updated, the processing proceeds to step S2302.

In step S2302, the extension mode adaptive CSI-2 reception circuit 1322 and/or the security section 1326 transmit(s) a VC1 key update command. In addition, in step S2303, the extension mode adaptive CSI-2 reception circuit 1322 and/or the security section 1326 derive(s) a new session key.

In step S2304, the extension mode adaptive CSI-2 reception circuit 1322 and/or the security section 1326 determine(s) whether or not the VC1 second embedded data has been received, and wait(s) until determination is made that it has been received. In a case where determination is made that it has been received, the processing proceeds to step S2305.

In step S2305, the extension mode adaptive CSI-2 reception circuit 1322 and/or the security section 1326 verify/verifies the second embedded data tentatively using the new session key. Then, in step S2306, the extension mode adaptive CSI-2 reception circuit 1322 and/or the security section 1326 determine(s) whether or not the new session key is correct on the basis of a result of the verification. In a case where determination is made that the new session key is not correct, the processing proceeds to step S2307.

In step S2307, the extension mode adaptive CSI-2 reception circuit 1322 and/or the security section 1326 start(s) discarding or cleaning up the new session key. In step S2308, the extension mode adaptive CSI-2 reception circuit 1322 and/or the security section 1326 transmit(s) a command to continue the current session key. That is, the update of the session key is stopped. When the processing in step S2308 is finished, the processor processing is finished.

In addition, in a case where determination is made in step S2306 that the new session key is correct, the processing proceeds to step S2309. In step S2309, the extension mode adaptive CSI-2 reception circuit 1322 and/or the security section 1326 determine(s) whether or not the VC1 frame end of ePH2[TBD]=1'b1 using the current session key has been received. In a case where determination is made that it has not been received, the processing returns to step S2306, and the subsequent processing is repeated.

In addition, in a case where determination is made in step S2309 that the VC1 frame end of ePH2[TBD]=1'b1 has been received, the processing proceeds to step S2310. In step S2310, the extension mode adaptive CSI-2 reception circuit 1322 and/or the security section 1326 determine(s) whether or not the VC1 frame start of ePH2[TBD]=1'b0 using the new session key has been received, and wait(s) until determination is made that it has been received. In a case where determination is made that it has been received, the processing proceeds to step S2311.

In step S2311, the extension mode adaptive CSI-2 reception circuit 1322 and/or the security section 1326 start(s) discarding or cleaning up the old session key.

In step S2312, the extension mode adaptive CSI-2 reception circuit 1322 and/or the security section 1326 start(s) fully using the new session key.

When the processing of S2312 is finished, the processor processing is finished.

Description is given, with reference to a flowchart in FIG. 191, of an example of a flow of the sensor processing in this case. This sensor processing is processing corresponding to the processor processing in FIG. 190.

When the sensor processing is started, in step S2351, the extension mode adaptive CSI-2 transmission circuit 1304 and/or the security section 1310 of the image sensor 1211 determine(s) whether or not the VC1 key update command transmitted from the application processor 1212 in step S2302 in FIG. 190 has been received, and wait(s) until determination is made that it has been received. In a case where determination is made that the VC1 key update command has been received, the processing proceeds to step S2352.

In step S2352, the extension mode adaptive CSI-2 transmission circuit 1304 and/or the security section 1310 derive(s) a new session key.

In step S2353, the extension mode adaptive CSI-2 transmission circuit 1304 and/or the security section 1310 determine(s) whether or not to transmit the VC1 embedded data, and wait(s) until determination is made to transmit it. In a case where determination is made to transmit it, the processing proceeds to step S2354.

In step S2354, the extension mode adaptive CSI-2 transmission circuit 1304 and/or the security section 1310 transmit(s) the VC1 first embedded data to the application processor 1212.

In step S2355, the extension mode adaptive CSI-2 transmission circuit 1304 and/or the security section 1310 transmit(s) the VC1 second embedded data tentatively using the new session key. This VC1 second embedded data is received by the application processor 1212 in step S2304.

In step S2356, the extension mode adaptive CSI-2 transmission circuit 1304 and/or the security section 1310 determine(s) whether or not the command to continue the session key transmitted from the application processor 1212 in step S2308 has been received. In a case where determination is made that it has been received, the processing proceeds to step S2357. In this case, the update of the session key is stopped, and the current session key is continued to be used. Thus, in step S2357, the extension mode adaptive CSI-2 transmission circuit 1304 and/or the security section 1310 start(s) discarding or cleaning up the new session key. When the processing in step S2357 is finished, the sensor processing is finished.

In addition, in a case where determination is made in step S2356 that the command to continue the session key has not been received, the processing proceeds to step S2358. In step S2358, the extension mode adaptive CSI-2 transmission circuit 1304 and/or the security section 1310 determine(s) whether or not to transmit the VC1 frame end. In a case where determination is made to transmit it, the processing proceeds to step S2359. In step S2359, the extension mode adaptive CSI-2 transmission circuit 1304 and/or the security section 1310 transmit(s) the VC1 frame end by ePH2 [TBD]=1'b1. This VC1 frame end is received by the application processor 1212 in step S2309.

When the processing in step S2359 is finished, the processing proceeds to step S2360. In addition, in a case where determination is made in step S2358 not to transmit the VC1 frame end, the processing proceeds to step S2360.

In step S2360, the extension mode adaptive CSI-2 transmission circuit 1304 and/or the security section 1310 determine(s) whether or not to transmit the VC1 frame start. In a case where determination is made not to transmit it, the processing returns to step S2356, and the subsequent processing is repeated.

In addition, in a case where determination is made in step S2360 to transmit the VC1 frame start, the processing proceeds to step S2361. In step S2361, the extension mode adaptive CSI-2 transmission circuit 1304 and/or the security section 1310 start(s) discarding or cleaning up the old session key.

In step S2362, the extension mode adaptive CSI-2 transmission circuit 1304 and/or the security section 1310 start(s) fully using the new session key.

In step S2363, the extension mode adaptive CSI-2 transmission circuit 1304 and/or the security section 1310 transmit(s) the VC1 frame start by ePH2[TBD]=1'b0. This VC1 frame start is received by the application processor 1212 in step S2310.

When the processing in step S2363 is finished, the sensor processing is finished.

The application processor 1212 performs the processor processing as described above, and the image sensor 1211 performs the sensor processing as described above, thereby making it possible to verify the new session key as in the flowchart in FIG. 189.

<Omission of Specification of Timing to Start Using New Session Key>

The specification of the timing to start using the new session key may be omitted to verify the new session key. The new session key may be tentatively used to verify the extended packet. For example, the new session key is tentatively used to verify decryption or the MAC value of the extended packet. In a case where the result of the verification is FAIL, the decryption or the MAC value of the extended packet is verified using the session key which is fully used. Then, in a case where the result of the verification is also FAIL, the END_SESSION request is transmitted, and the new session key and the session key are discarded or cleaned up to thereby finish the session. In a case where determination can be made that the new session key has been correctly derived, the session key is started to be discarded or cleaned up to fully start the new session key.

Description is given, with reference to a flowchart in FIG. 192, of an example of a flow of the processor processing in this case. When the processor processing is started, in step S2401, the extension mode adaptive CSI-2 reception circuit 1322 and/or the security section 1326 of the application processor 1212 determine(s) whether or not the VC1 key needs to be updated, and wait(s)until the VC1 key needs to be updated. In a case where determination is made that the VC1 key needs to be updated, the processing proceeds to step S2402.

In step S2402, the extension mode adaptive CSI-2 reception circuit 1322 and/or the security section 1326 transmit(s) the VC1 key update command. In addition, in step S2403, the extension mode adaptive CSI-2 reception circuit 1322 and/or the security section 1326 derive(s) a new session key.

In step S2404, the extension mode adaptive CSI-2 reception circuit 1322 and/or the security section 1326 determine(s) whether or not the VC1 extended packet has been received, and wait(s) until determination is made that it has been received. In a case where determination is made that it has been received, the processing proceeds to step S2405.

In step S2405, the extension mode adaptive CSI-2 reception circuit 1322 and/or the security section 1326 tentatively use(s) the new session key to verify the VC1 extended packet. In step S2406, the extension mode adaptive CSI-2 reception circuit 1322 and/or the security section 1326 determine(s) whether or not the new session key is correct on the basis of the result of the verification.

In a case where determination is made that the new session key is correct, the processing proceeds to step S2407. In step S2407, the extension mode adaptive CSI-2 reception circuit 1322 and/or the security section 1326 start(s) discarding or cleaning up the old session key. Then, in step S2408, the extension mode adaptive CSI-2 reception circuit 1322 and/or the security section 1326 start(s) fully using the new session key. When the processing in step S2408 is finished, the processor processing is finished.

In addition, in a case where determination is made in step S2406 that the new session key is not correct, the processing proceeds to step S2409. In step S2409, the extension mode adaptive CSI-2 reception circuit 1322 and/or the security section 1326 verify/verifies the VC1 extension packet using the current session key.

In step S2410, the extension mode adaptive CSI-2 reception circuit 1322 and/or the security section 1326 determine(s) whether or not the result of the verification is FAIL. In a case where determination is made that the result of the verification is not FAIL, the processing returns to step S2404, and the subsequent processing is repeated.

In a case where determination is made in step S2410 that the result of the verification is FAIL, the processing proceeds to step S2411. In step S2411, the extension mode adaptive CSI-2 reception circuit 1322 and/or the security section 1326 transmit(s) the END_SESSION request. Then, in step S2412, the extension mode adaptive CSI-2 reception circuit 1322 and/or the security section 1326 discard(s) or clean(s) up the current session key together with the new session key. This allows the session to be finished. When the processing in step S2412 is finished, the processor processing is finished.

Description is given, with reference to a flowchart in FIG. 193, of an example of a flow of the sensor processing in this case. This sensor processing is processing corresponding to the processor processing in FIG. 192.

When the sensor processing is started, in step S2451, the extension mode adaptive CSI-2 transmission circuit 1304 and/or the security section 1310 of the image sensor 1211 determine(s) whether or not the VC1 key update command transmitted from the application processor 1212 in step S2402 in FIG. 192 has been received, and wait(s) until determination is made that it has been received. In a case where determination is made that the VC1 key update command has been received, the processing proceeds to step S2452.

In step S2452, the extension mode adaptive CSI-2 transmission circuit 1304 and/or the security section 1310 derive(s) a new session key.

In step S2453, the extension mode adaptive CSI-2 transmission circuit 1304 and/or the security section 1310 determine(s) whether or not to transmit the VC1 extended packet, and wait(s) until determination is made to transmit it. In a case where determination is made to transmit it, the processing proceeds to step S2454.

In step S2454, the extension mode adaptive CSI-2 transmission circuit 1304 and/or the security section 1310 start(s) discarding or cleaning up the current session key.

In step S2455, the extension mode adaptive CSI-2 transmission circuit 1304 and/or the security section 1310 start(s) using the new session key.

In step S2456, the extension mode adaptive CSI-2 transmission circuit 1304 and/or the security section 1310 transmit(s) the VC1 extended packet. This VC1 extended packet is received by the application processor 1212 in step S2404.

When the processing in step S2456 is finished, the sensor processing is finished.

The application processor 1212 performs the processor processing as described above, and the image sensor 1211 performs the sensor processing as described above, thereby making it possible to verify the new session key.

This example is an example in which the processor verifies that the new session key has been correctly derived. In this manner, the processor processing becomes heavy, but the sensor processing becomes light, which is preferable in a case where the resource of the sensor is limited more than the resource of the processor.

It is to be noted that, although the configuration example suitable for the line MAC is illustrated, a portion thereof (e.g., the VC1 extended packet being received) can be modified to have a configuration example suitable for the frame MAC. In addition, timing specification for the start of the use may be used together.

<Selection of Session Key in Response to Instruction from Processor>

The sensor may select the session key in response to an instruction from the processor. For example, the image sensor may tentatively use the new session key to transmit an extended packet (data to be verified) and start reusing the session key in response to the result of the verification of the extended packet by the processor.

In addition, the processor may transmit a session-key-unnecessary command or a new-session-key-unnecessary command in response to the result of the verification of the extended packet. In contrast, the image sensor may select whether to start fully using the new session key or to start reusing the session key depending on the session-key-unnecessary command or the new-session-key-unnecessary command. As long as the image sensor can select the session key or the new session key, the session-key-unnecessary command and the new-session-key-unnecessary command may be separate commands.

Description is given, with reference to a flowchart in FIG. 194, of an example of a flow of the sensor processing in that case. When the sensor processing is started, in step S2501, the extension mode adaptive CSI-2 transmission circuit 1304 and/or the security section 1310 of the image sensor 1211 determine(s) whether or not the VC1 key update command has been received, and wait(s) until determination is made that it has been received. In a case where determination is made that the VC1 key update command has been received, the processing proceeds to step S2502.

In step S2502, the extension mode adaptive CSI-2 transmission circuit 1304 and/or the security section 1310 derive(s) a new session key.

In step S2503, the extension mode adaptive CSI-2 transmission circuit 1304 and/or the security section 1310 determine(s) whether or not to transmit the VC1 extended packet, and wait(s) until determination is made to transmit it. In a case where determination is made to transmit it, the processing proceeds to step S2504.

In step S2504, the extension mode adaptive CSI-2 transmission circuit 1304 and/or the security section 1310 tentatively use(s) the new session key to transmit the VC1 extended packet.

In step S2505, the extension mode adaptive CSI-2 transmission circuit 1304 and/or the security section 1310 determine(s) whether or not a current-session-key-unnecessary command has been received. In a case where determination is made that it has been received, the processing proceeds to step S2506. In this case, the session key is updated.

In step S2506, the extension mode adaptive CSI-2 transmission circuit 1304 and/or the security section 1310 start(s) discarding or cleaning up the current session key.

In step S2507, the extension mode adaptive CSI-2 transmission circuit 1304 and/or the security section 1310 start(s) fully using the new session key. When the processing in step S2507 is finished, the sensor processing is finished.

In addition, in a case where determination is made in step S2505 that the current-session-key-unnecessary command has not been received, the processing proceeds to step S2508.

In step S2508, the extension mode adaptive CSI-2 transmission circuit 1304 and/or the security section 1310 determine(s) whether or not the new-session-key-unnecessary command has been received. In a case where determination is made that it has not been received, the processing returns to step S2503, and the subsequent processing is repeated.

In addition, in a case where determination is made in step S2508 that the new-session-key-unnecessary command has been received, the processing proceeds to step S2509.

In step S2509, the extension mode adaptive CSI-2 transmission circuit 1304 and/or the security section 1310 start(s) discarding or cleaning up the new session key.

In step S2510, the extension mode adaptive CSI-2 transmission circuit 1304 and/or the security section 1310 start(s) reusing the current session key. When the processing in step S2510 is finished, the sensor processing is finished.

Performing the sensor processing in this manner enables the image sensor 1211 to select whether to start fully using the new session key or to start reusing the session key, depending on the session-key-unnecessary command or the new-session-key-unnecessary command supplied from the application processor 1212.

<Use of KeyUpdateReq or KeySwitchTiming>

For example, as illustrated in FIG. 195, KeyUpdateReq or KeySwitchTiming may be used to specify the timing to start using the new session key.

The KeyUpdateReq or the KeySwitchTiming is stored, for example, in the embedded data for transmission. However, the KeyUpdateReq or the KeySwitchTiming may be stored in any of the image data, the user-defined data, and the read response (including in-band interrupt) for transmission. In addition, any of Field name, Bits allocation, Value definition, and the like of the KeyUpdateReq or the KeySwitchTiming may be different. In addition, the KeyUpdateReq is transmitted to trigger the KEY_UPDATE request message by the CCI host, but the transmission of the KeyUpdateReq may be unnecessary. In that case, the KEY_UPDATE request message is triggered not by the CSI-2 device, but by the CSI-2 host or the CCI host. In addition, in a case of using the GET_ENCAPSULATED_REQUEST mechanism, the CSI-2 device may trigger the KEY UPDATE request message by the CCI device. In addition, the transmission of the second embedded data and the verification of the new session key may be unnecessary.

Description is given, with reference to a flowchart in FIG. 196, of an example of a flow of processing in a case of using the KeyUpdateReq and the KeySwitchTiming. The CSI-2 host derives the session key in step S2601, and the CSI-2 device derives a session key in step S2621. Thereafter, communication is performed using the session key (the current session key). The CSI-2 device uses the current session key to transmit the VC1 extended packet (step S2622), and the CSI-2 host receives it (step S2602). The subsequent communication is performed in the same manner.

Thereafter, at a predetermined timing, in step S2623, the CSI-2 device transmits embedded data in which the KeyUpdataReq is stored using the current session key. In step S2603, the CSI-2 host receives it.

Then, the CSI-2 host and the CSI-2 device derive respective new session keys (S2604 and S2624).

In step S2625, the CSI-2 device transmits VC1 first embedded data using the current session key. In step S2605, the CSI-2 host receives it.

Then, in step S2626, the CSI-2 device temporarily uses the new session key to transmit VC1 second embedded data. In step S2606, the CSI-2 host receives it. In step S2607, the CSI-2 host verifies the new session key.

In a case where determination is made that the new session key has been correctly derived, the session key is updated at a specified timing. That is, the new session key is started to be used.

Therefore, in step S2627, the CSI-2 device uses the current session key to transmit KeySwitchiming=1'b1. In step S2608, the CIS-2 host receives it.

In step S2629, the CSI-2 device fully uses the new session key to transmit a VC1 frame start. In step S2609, the CSI-2 host receives it.

In step S2630, the CSI-2 device fully uses the new session key to transmit the VC1 extended packet. In step S2611, the CSI-2 host receives it. The subsequent communication is performed in the same manner.

It is to be noted that, at predetermined timings, the CSI-2 host and the CSI-2 device discard respective session keys before update (old session keys) (S2610 and S2628).

In this manner, it is possible to specify the timing to start using the new session key using the KeyUpdateReq and the KeySwitchTiming.

Description is given, with reference to a flowchart in FIG. 197, of an example of a flow of the processor processing in this case. When the processor processing is started, in step S2651, the extension mode adaptive CSI-2 reception circuit 1322 and/or the security section 1326 of the application processor 1212 determine(s) whether or not the VC1 key needs to be updated, and wait(s) until the update is necessary. In a case where determination is made that the VC1 key needs to be updated, the processing proceeds to step S2652.

In step S2652, the extension mode adaptive CSI-2 reception circuit 1322 and/or the security section 1326 transmit(s) the VC1 key update command. In addition, in step S2653, the extension mode adaptive CSI-2 reception circuit 1322 and/or the security section 1326 derive(s) a new session key.

In step S2654, the extension mode adaptive CSI-2 reception circuit 1322 and/or the security section 1326 determine(s) whether or not the VC1 first embedded data of KeySwitchTiming=1'b1 has been received, and wait(s)until determination is made that it has been received. In a case where determination is made that it has been received, the processing proceeds to step S2655.

In step S2655, the extension mode adaptive CSI-2 reception circuit 1322 and/or the security section 1326 verify/verifies the second embedded data tentatively using the new session key. Then, in step S2656, the extension mode adaptive CSI-2 reception circuit 1322 and/or the security section 1326 determine(s) whether or not the new session key is correct on the basis of a result of the verification. In a case where determination is made that the new session key is not correct, the processing proceeds to step S2657.

In step S2657, the extension mode adaptive CSI-2 reception circuit 1322 and/or the security section 1326 start(s) discarding or cleaning up the new session key. In step S2658, the extension mode adaptive CSI-2 reception circuit 1322 and/or the security section 1326 transmit(s) a command to continue the current session key. When the processing in step S2658 is finished, the processor processing is finished.

In addition, in a case where determination is made in step S2656 that the new session key is correct, the processing proceeds to step S2659. In step S2659, the extension mode adaptive CSI-2 reception circuit 1322 and/or the security section 1326 determine(s) whether or not the VC1 frame start has been received. In a case where determination is made that it has not been received, the processing returns to step S2656, and the subsequent processing is repeated.

In addition, in a case where determination is made in step S2659 that the VC1 frame start has been received, the processing proceeds to step S2660. In step S2660, the extension mode adaptive CSI-2 reception circuit 1322 and/or the security section 1326 start(s) discarding or cleaning up the current session key.

In step S2661, the extension mode adaptive CSI-2 reception circuit 1322 and/or the security section 1326 start(s) fully using the new session key. When the processing in step S2661 is finished, the processor processing is finished.

Description is given, with reference to a flowchart in FIG. 198, of an example of a flow of the sensor processing in this case. This sensor processing is processing corresponding to the processor processing in FIG. 197.

When the sensor processing is started, in step S2681, the extension mode adaptive CSI-2 transmission circuit 1304 and/or the security section 1310 of the image sensor 1211 determine(s) whether or not the VC1 key update command transmitted from the application processor 1212 in step S2652 in FIG. 197 has been received, and wait(s) until determination is made that it has been received. In a case where determination is made that the VC1 key update command has been received, the processing proceeds to step S2682.

In step S2682, the extension mode adaptive CSI-2 transmission circuit 1304 and/or the security section 1310 derive(s) a new session key.

In step S2683, the extension mode adaptive CSI-2 transmission circuit 1304 and/or the security section 1310 determine(s) whether or not to transmit the VC1 embedded data, and wait(s) until determination is made to transmit it. In a case where determination is made to transmit it, the processing proceeds to step S2684.

In step S2684, the extension mode adaptive CSI-2 transmission circuit 1304 and/or the security section 1310 transmit(s) the VC1 first embedded data by KeySwitchTiming='b1.

In step S2685, the extension mode adaptive CSI-2 transmission circuit 1304 and/or the security section 1310 transmit(s) the VC1 second embedded data tentatively using the new session key.

In step S2686, the extension mode adaptive CSI-2 transmission circuit 1304 and/or the security section 1310 determine(s) whether or not the command to continue the session key transmitted from the application processor 1212 in step S2658 has been received. In a case where determination is made that it has been received, the processing proceeds to step S2687. In step S2687, the extension mode adaptive CSI-2 transmission circuit 1304 and/or the security section 1310 start(s) discarding or cleaning up the new session key. When the processing in step S2687 is finished, the sensor processing is finished.

In addition, in a case where determination is made in step S2686 that the command to continue the session key has not been received, the processing proceeds to step S2688. In step S2688, the extension mode adaptive CSI-2 transmission circuit 1304 and/or the security section 1310 determine(s) whether or not to transmit the VC1 frame start. In a case where determination is made not to transmit it, the processing returns to step S2686, and the subsequent processing is repeated.

In addition, in a case where determination is made in step S2688 to transmit the VC1 frame start, the processing proceeds to step S2689. In step S2689, the extension mode adaptive CSI-2 transmission circuit 1304 and/or the security section 1310 start(s) discarding or cleaning up the current session key.

In step S2690, the extension mode adaptive CSI-2 transmission circuit 1304 and/or the security section 1310 start(s) fully using the new session key. When the processing in step S2690 is finished, the sensor processing is finished.

The application processor 1212 performs the processor processing as described above, and the image sensor 1211 performs the sensor processing as described above, thereby making it possible to verify the new session key as in the flowchart in FIG. 196.

It is to be noted that, in a case where the sensor or the processor includes an additional message counter, an additional message count value is initialized to be set to zero before the new session key is started to be used or fully used (excluding temporary use). However, in that case, it is desirable that the message count value not be initialized.

In a case where a new session key is further used temporarily, for example, the additional message count value may be set to the maximum value to allow the new session key to be temporarily used. Alternatively, for example, the additional message count value may be set to zero to allow the new session key to be temporarily used, and the additional message count value may be set to one when the new session key is started to be fully used.

In contrast, the new session key may be started to be used or fully used (excluding temporary use) at a timing when the message count value is an initial value (e.g., zero). In that case, the number of times in which the new session key can be used is maximized.

In addition, in a case where the sensor or the processor includes an additional frame counter, an additional frame count value is initialized to be set to zero when the new session key is started to be used or fully used (excluding temporary use).

However, in that case, it is desirable that the frame count value not be initialized. Further, in a case where the new session key is temporarily used, for example, the additional frame count value may be set to the maximum value to allow the new session key to be temporarily used. Alternatively, for example, the additional frame count value may be set to zero to allow the new session key to be temporarily used, and the additional frame count value may be set to one when the new session key is started to be fully used.

In contrast, the new session key may be started to be used or fully used (excluding temporary use) at a timing when the frame count value is an initial value (e.g., one). In that case, the number of times in which the new session key can be used is maximized.

<Specification of Timing to Start Using New Session Key by Embedded Data or Read Response>

The timing to start using the new session key may be specified by the embedded data or the read response. The message specifying the timing to start the use (timing specification for the start of use) may be stored in the embedded data, the image data, the user-defined data, or the read response (including in-band interrupt) for transmission. The timing specification for the start of use may include the message count value (the value of the message counter). In that case, the new session key may be started to be used from some or all of the extended packets of the message count values specified as the timing to start the use. In addition, the timing specification for the start of use may include the frame number (frame count value). In that case, the new session key may be started to be used from some or all of the extended packets of the frame number specified as the timing to start the use. In addition, the timing specification for the start of use may include the value of the eDT (extended data type) or the DT (data type). In that case, the new session key may be started to be used from some or all of the extended packets of the eDT or the DT specified as the timing to start the use, transmitted at the next line or thereafter.

Description is given, with reference to a flowchart in FIG. 199, of an example of a flow of the processor processing in this case. When the processor processing is started, in step S2701, the extension mode adaptive CSI-2 reception circuit 1322 and/or the security section 1326 of the application processor 1212 determine(s) whether or not the VC1 key needs to be updated, and wait(s)until the VC1 key needs to be updated. In a case where determination is made that the VC1 key needs to be updated, the processing proceeds to step S2702.

In step S2702, the extension mode adaptive CSI-2 reception circuit 1322 and/or the security section 1326 transmit(s) the VC1 key update command. In addition, in step S2703, the extension mode adaptive CSI-2 reception circuit 1322 and/or the security section 1326 derive(s) a new session key.

In step S2704, the extension mode adaptive CSI-2 reception circuit 1322 and/or the security section 1326 determine(s) whether or not timing specification has been received, and wait(s) until determination is made that it has been received. In a case where determination is made that the timing specification has been received, the processing proceeds to step S2705.

In step S2705, the extension mode adaptive CSI-2 reception circuit 1322 and/or the security section 1326 determine(s) whether or not the VC1 extended packet header of the timing specification has been received, and wait(s) until determination is made that it has been received. In a case where determination is made that the VC1 extended packet header of the timing specification has been received, the processing proceeds to step S2706.

In step S2706, the extension mode adaptive CSI-2 reception circuit 1322 and/or the security section 1326 start(s) discarding or cleaning up the current session key.

In step S2707, the extension mode adaptive CSI-2 reception circuit 1322 and/or the security section 1326 start(s) using the new session key.

When the processing in step S2707 is finished, the processor processing is finished.

Description is given, with reference to a flowchart in FIG. 200, of an example of a flow of the sensor processing which is processing of the image sensor 1211. This sensor processing is processing corresponding to the processor processing in FIG. 199.

When the sensor processing is started, in step S2721, the extension mode adaptive CSI-2 transmission circuit 1304 and/or the security section 1310 of the image sensor 1211 determine(s) whether or not the VC1 key update command has been received, and wait(s) until determination is made that it has been received. In a case where determination is made that the VC1 key update command has been received, the processing proceeds to step S2722.

In step S2722, the extension mode adaptive CSI-2 transmission circuit 1304 and/or the security section 1310 derive(s) a new session key.

In step S2723, the extension mode adaptive CSI-2 transmission circuit 1304 and/or the security section 1310 determine(s) whether or not to transmit the VC1 embedded data, and wait(s) until determination is made to transmit it. In a case where determination is made to transmit the VC1 embedded data, the processing proceeds to step S2724.

In step S2724, the extension mode adaptive CSI-2 transmission circuit 1304 and/or the security section 1310 transmit(s) the VC1 embedded data including the timing specification for the start of use.

In step S2725, the extension mode adaptive CSI-2 transmission circuit 1304 and/or the security section 1310 determine(s) whether or not to transmit the VC1 extended packet header of the timing specification, and wait(s) until determination is made to transmit it. In a case where determination is made to transmit the VC1 extended packet header of the timing specification, the processing proceeds to step S2726.

In step S2726, the extension mode adaptive CSI-2 transmission circuit 1304 and/or the security section 1310 start(s) discarding or cleaning up the current session key.

In step S2727, the extension mode adaptive CSI-2 transmission circuit 1304 and/or the security section 1310 start(s) using the new session key.

When the processing in step S2727 is finished, the sensor processing is finished.

The application processor 1212 performs the processor processing as described above, and the image sensor 1211 performs the sensor processing as described above, thereby making it possible to specify the timing to start using the new session key by the embedded data or the read response.

<Specification of Timing to Start Using New Session Key by Write Command>

The timing to start using the new session key may be specified by the processor using a write command. That is, the message specifying the timing to start the use (timing specification for the start of use) may be stored in the write command for transmission. The timing specification for the start of use may include the message count value (the value of the message counter). In that case, the new session key may be started to be used from some or all of the extended packets of the message count values specified as the timing to start the use. In addition, the timing specification for the start of use may include the frame number (frame count value). In that case, the new session key may be started to be used from some or all of the extended packets of the frame number specified as the timing to start the use. In addition, the timing specification for the start of use may include the value of the eDT (extended data type) or the DT (data type). In that case, the new session key may be started to be used from some or all of the extended packets of the eDT or the DT specified as the timing to start the use, transmitted upon or after the read response OKed by the timing specification for the start of use.

Description is given, with reference to a flowchart in FIG. 201, of an example of a flow of the processor processing in this case. When the processor processing is started, in step S2741, the extension mode adaptive CSI-2 reception circuit 1322 and/or the security section 1326 of the application processor 1212 determine(s) whether or not the VC1 key needs to be updated, and wait(s)until the VC1 key needs to be updated. In a case where determination is made that the VC1 key needs to be updated, the processing proceeds to step S2742.

In step S2742, the extension mode adaptive CSI-2 reception circuit 1322 and/or the security section 1326 transmit(s) the VC1 key update command. In addition, in step S2743, the extension mode adaptive CSI-2 reception circuit 1322 and/or the security section 1326 derive(s) a new session key.

In step S2744, the extension mode adaptive CSI-2 reception circuit 1322 and/or the security section 1326 transmit(s) a write command including the timing specification for the start of use.

In step S2745, the extension mode adaptive CSI-2 reception circuit 1322 and/or the security section 1326 transmit(s) a read command indicating whether or not to specify a timing to start the use.

In step S2746, the extension mode adaptive CSI-2 reception circuit 1322 and/or the security section 1326 determine(s) whether or not a read response has been received, and wait(s) until determination is made that it has been received. In a case where determination is made that the read response has been received, the processing proceeds to step S2747.

In step S2747, the extension mode adaptive CSI-2 reception circuit 1322 and/or the security section 1326 determine(s) whether or not the response is OKed by the timing specification for the start of use. In a case where the response is not OKed by the timing for the start of use, the processing returns to step S2744, and the subsequent processing is repeated.

In addition, in a case where determination is made in step S2747 that the response is OKed by the timing specification for the start of use, the processing proceeds to step S2748.

In step S2748, the extension mode adaptive CSI-2 reception circuit 1322 and/or the security section 1326 determine(s) whether or not the VC1 extended packet header of the timing specification has been received, and wait(s) until determination is made that it has been received. In a case where determination is made that the VC1 extended packet header of the timing specification has been received, the processing proceeds to step S2749.

In step S2749, the extension mode adaptive CSI-2 reception circuit 1322 and/or the security section 1326 start(s) discarding or cleaning up the current session key.

In step S2750, the extension mode adaptive CSI-2 reception circuit 1322 and/or the security section 1326 start(s) using the new session key.

When the processing in step S2750 is finished, the processor processing is finished.

Description is given, with reference to a flowchart in FIG. 202, of an example of a flow of the sensor processing which is processing of the image sensor 1211. This sensor processing is processing corresponding to the processor processing in FIG. 201.

When the sensor processing is started, in step S2771, the extension mode adaptive CSI-2 transmission circuit 1304 and/or the security section 1310 of the image sensor 1211 determine(s) whether or not the VC1 key update command has been received, and wait(s) until determination is made that it has been received. In a case where determination is made that the VC1 key update command has been received, the processing proceeds to step S2772.

In step S2772, the extension mode adaptive CSI-2 transmission circuit 1304 and/or the security section 1310 derive(s) a new session key.

In step S2773, the extension mode adaptive CSI-2 transmission circuit 1304 and/or the security section 1310 determine(s) whether or not a write command has been received, and wait(s) until determination is made that it has been received. In a case where determination is made that the write command has been received, the processing proceeds to step S2774.

In step S2774, the extension mode adaptive CSI-2 transmission circuit 1304 and/or the security section 1310 determine(s) whether or not a read command has been received, and wait(s) until determination is made that it has been received. In a case where determination is made that the read command has been received, the processing proceeds to step S2775.

In step S2775, the extension mode adaptive CSI-2 transmission circuit 1304 and/or the security section 1310 determine(s) whether or not it is OK by the timing specification for the start of use. In a case where determination is made that it is not OK by the timing for the start of use, the processing proceeds to step S2776.

In step S2776, the extension mode adaptive CSI-2 transmission circuit 1304 and/or the security section 1310 perform(s) a read response that is NG by the timing specification for the start of use. When the processing in step S2776 is finished, the processing returns to step S2773, and the subsequent processing is repeated.

In step S2775, in a case where determination is made that it is OK by the timing for the start of use, the processing proceeds to step S2777.

In step S2777, the extension mode adaptive CSI-2 transmission circuit 1304 and/or the security section 1310 perform(s) a read response OKed by the timing specification for the start of use.

In step S2778, the extension mode adaptive CSI-2 transmission circuit 1304 and/or the security section 1310 determine(s) whether or not to transmit the VC1 extended packet header of the timing specification, and wait(s) until determination is made to transmit it. In a case where determination is made to transmit the VC1 extended packet header of the timing specification, the processing proceeds to step S2779.

In step S2779, the extension mode adaptive CSI-2 transmission circuit 1304 and/or the security section 1310 start(s) discarding or cleaning up the current session key.

In step S2780, the extension mode adaptive CSI-2 transmission circuit 1304 and/or the security section 1310 start(s) using the new session key.

When the processing in step S2780 is finished, the sensor processing is finished.

The application processor 1212 performs the processor processing as described above, and the image sensor 1211 performs the sensor processing as described above, thereby making it possible to specify the timing to start using the new session key by the write command.

<Specification of Timing to Start Using New Session Key by Key ID Information>

Key ID information to be updated (e.g., incremented or decremented or random number) in response to the start of use of the next session key (new session key) may be transmitted to thereby specify a timing to start using the next session key (new session key).

Description is given, with reference to FIG. 203, of an example of a flow of the processor processing in that case. When the processor processing is started, the extension mode adaptive CSI-2 reception circuit 1322 and/or the security section 1326 of the application processor 1212 initialize(s) the key ID to zero in step S2801.

In step S2802, the extension mode adaptive CSI-2 reception circuit 1322 and/or the security section 1326 start(s) using the session key.

In step S2803, the extension mode adaptive CSI-2 reception circuit 1322 and/or the security section 1326 determine(s) whether or not to finish the session. In a case where determination is made to finish the session, the processing proceeds to step S2804.

In step S2804, the extension mode adaptive CSI-2 reception circuit 1322 and/or the security section 1326 transmit(s) an END_SESSION request.

In step S2805, the extension mode adaptive CSI-2 reception circuit 1322 and/or the security section 1326 determine(s) whether or not a response has been received from the image sensor 1211. In a case where determination is made that no response has been received, the processing returns to step S2804, and the subsequent processing is repeated. In a case where determination is made in step S2805 that a response has been received, the processing proceeds to step S2806.

In step S2806, the extension mode adaptive CSI-2 reception circuit 1322 and/or the security section 1326 discard(s) or clean(s) up all the session keys and the next session key (new session key). When the processing in step S2806 is finished, the processor processing is finished.

In addition, in a case where determination is made in step S2803 not to finish the session, the processing proceeds to step S2807.

In step S2807, the extension mode adaptive CSI-2 reception circuit 1322 and/or the security section 1326 determine(s) whether or not key ID information has been received. In a case where determination is made that it has not been received, the processing returns to step S2803, and the subsequent processing is repeated. In a case where determination is made in step S2807 that the key ID information has been received, the processing proceeds to step S2808.

In step S2808, the extension mode adaptive CSI-2 reception circuit 1322 and/or the security section 1326 determine(s) whether or not the key ID information has been updated. In a case where determination is made that it has not been updated, the processing returns to step S2803, and the subsequent processing is repeated. In a case where determination is made in step S2808 that the key ID information has been updated, the processing proceeds to step S2809.

In step S2809, the extension mode adaptive CSI-2 reception circuit 1322 and/or the security section 1326 start(s) using the next session key (new session key).

In step S2810, the extension mode adaptive CSI-2 reception circuit 1322 and/or the security section 1326 update(s) the key ID. When the processing in step S2810 is finished, the processing returns to step S2803, and the subsequent processing is repeated.

Description is given, with reference to a flowchart in FIG. 204, of an example of a flow of the sensor processing which is processing of the image sensor 1211. This sensor processing is processing corresponding to the processor processing in FIG. 203.

When the sensor processing is started, in step S2831, the extension mode adaptive CSI-2 transmission circuit 1304 and/or the security section 1310 of the image sensor 1211 initialize(s) the key ID to zero.

In step S2832, the extension mode adaptive CSI-2 transmission circuit 1304 and/or the security section 1310 start(s) using the session key.

In step S2833, the extension mode adaptive CSI-2 transmission circuit 1304 and/or the security section 1310 determine(s) whether or not the END_SESSION request has been received. In a case where determination is made that the END_SESSION request has not been received, the processing proceeds to step S2834.

In step S2834, the extension mode adaptive CSI-2 transmission circuit 1304 and/or the security section 1310 determine(s) whether or not to start using the next session key (new session key). In a case where determination is made to start the use, the processing proceeds to step S2835.

In step S2835, the extension mode adaptive CSI-2 transmission circuit 1304 and/or the security section 1310 start(s) using the next session key (new session key).

In step S2836, the extension mode adaptive CSI-2 transmission circuit 1304 and/or the security section 1310 update(s) the key ID. When the processing in step S2836 is finished, the processing proceeds to step S2837. In addition, in a case where determination is made in step S2834 not to start using the next session key (new session key), the processing proceeds to step S2837.

In step S2837, the extension mode adaptive CSI-2 transmission circuit 1304 and/or the security section 1310 transmit(s) the key ID information. When the processing in step S2837 is finished, the processing returns to step S2833, and the subsequent processing is repeated.

In addition, in a case where determination is made in step S2833 that the END_SESSION request has been received, the processing proceeds to step S2838.

In step S2838, the extension mode adaptive CSI-2 transmission circuit 1304 and/or the security section 1310 transmit(s) a response to the application processor 1212.

In step S2839, the extension mode adaptive CSI-2 transmission circuit 1304 and/or the security section 1310 discard(s) or clean(s)up all the session keys and the next session key (new session key).

When the processing in step S2839 is finished, the sensor processing is finished.

The application processor 1212 performs the processor processing as described above, and the image sensor 1211 performs the sensor processing as described above, thereby making it possible to specify the timing to start using the new session key by the key ID information.

The key ID information may be a value of the key ID itself, or may be information indicating whether key ID used this time or key ID to be used next time is an even number (Even key) or an odd number (Odd key), for example, as illustrated in FIG. 205. In addition, it may be information indicating that the key ID is an even number (Even key) or an odd number (Odd key). However, the key ID information may be configured only by zero (even number) and one (odd number).

<Derivation of Multiple Session Keys>

Multiple session keys (encryption keys or MAC keys) may be derived from one Export Master Secret. This is effective, for example, in a case where the session key is desired to be differentiated for each virtual channel or for each extended virtual channel.

In addition, as illustrated in FIGS. 206 and 207, multiple Export Master Secrets (0 . . . N) may be derived, and then a session key (encryption key or MAC key) may be derived from each of them. In that case, the Export Master Secret to be updated may be specified to thereby update only some of the Export Master Secrets. Export-Master-Secret, bin_str8_1, . . . , bin_str8_N, and the like in HKDF-Expand are exemplary, and another character may be stored.

Definitions such as HKDF-Expand, Hash.Length, bin_str3, bin_str4, bin_str8, BinConcat, Version, and TH2 are as described in NPTL 1. Examples of definitions of bin_str8_0, . . . , bin_str8_N to be applicable include bin_str8_0=BinConcat (Hash.Length, Version, "exp master 0", tH2); . . . , bin_str8_N=BinConcat (Hash.Length, Version, "exp master N", TH2); however, another definition may also be applicable.

Incidentally, for example, the control-system communication configured by the CCI host (control-system communication host) and the CCI device (control-system communication device) is also referred to as Control Plane (Configuration, status, capabilities, not application data. Options include CCI out-of-band (I2C/I3C), USL in-band, and ACMD/ACMP using mailbox registers). For example, the image-system communication configured by the CSI-2 host (image-system communication host) and the CSI-2 device (image-system communication device) is also referred to as Data Plane (Pixels, content, application data.). In addition, the control-system communication host and the image-system communication host may be integrated or separated. In addition, the control-system communication device and the image-system communication device may be integrated or separated. In addition, in a case where the image-system communication host is the DSI-2 host and the image-system communication device is a display (DSI-2 device), directions of arrows between the image-system communication host (CSI-2 host in the diagram) and the image-system communication device (CSI-2 device in the diagram) in FIGS. 78, 79, 80, 184, 186, 189, 196, etc. are opposite.

Incidentally, the description has been given above by referring to the example in which the session key or the new session key between the image-system communication and the image-system communication device is derived from an SPDM key schedule; however, the present technology is not limited thereto. For example, a key generated by SSMC (Secure Session Manager Controller) which is also the control-system communication host and the image-system communication host or the application processor (also referred to as SoC or System on Chip) and received by the control-system communication device via a protected session (e.g., SPDM session) between the control-system communication host and an image sensor, a display, or a bridge (Bridge) one end which is also the control-system communication device and the image-system communication device may be used as a session key or a new session key between the image-system communication host and the image-system communication device. In addition, a key generated by the SSMC which is the control-system communication host or the application processor and received by the control-system communication device via a protected session (e.g., SPDM session) between the control-system communication host and the bridge one end, the image sensor, the display, or a bridge another end which is the control-system communication device may be used as a session key or a new session key between the bridge one end or the application processor which is the image-system communication host and the bridge one end which is the image-system communication device (with the proviso that in a case where the bridge one end is not the image-system communication host), the image sensor, the display, or the bridge another end. In addition, a key generated by the SSMC which is the control-system communication host and received by the control-system communication device via a protected session (e.g., SPDM session) between the control-system communication host and the application processor, the bridge one end, the image sensor, the display, or the bridge another end which is the control-system communication device may be used as a session key or a new session key between bridge one end or the application processor which is the image-system communication host and the bridge one end which is the image-system communication device (with the proviso that in a case where the bridge one end is not the image-system communication host), the image sensor, the display, or the bridge another end. It is to be noted that some or all of the SSMC and the application processor may be integrated or separated. In addition, the transmission of the session key or the new session key for the image-system communication via the protected session (e.g., SPDM session) between the control-system communication host and the control-system communication device may be transmitted by a Vendor defined SPDM message (e.g., the VENDOR_DEFINED_REQUEST request message or the VENDOR_DEFINED_RESPONSE response message). That is, in a case where the control-system communication host generates the session key or the new session key between the image-system communication host and the image-system communication device, the control-system communication device need not derive the Export Master Secret, and the KEY_UPDATE request and the KEY_UPDATE_ACK response in FIG. 184 can be omitted. In addition, the control-system communication host may generate the session key or the new session key between the image-system communication host and the image-system communication device by derivation from the Export Master Secret; by derivation from a secret different from that in the Export Master Secret; by an intrinsic random number generator or a pseudo random number generator; or by using measures different therefrom. In addition, the session key or the new session key between the image-system communication host and the image-system communication device may be a group key usable among a first image-system communication host, a first image-system communication device, and a second image-system communication host or a second image-system communication device (among three or more). That is, the image-system communication host or the image-system communication device may adapt to not only unicast (one-to-one) transmission or reception, but also multicast (one-to-many) transmission or reception.

Incidentally, in a case where the control-system communication host and the image-system communication host are separated, there is an issue in the timing to start using the session key or the new session key oriented for the image-system communication. For example, in a case where the image-system communication host is the application processor or the bridge one end and the image-system communication device is the image sensor or the bridge another end, there is an issue in which the image sensor or the bridge another end does not perceive whether a session key or a new session key for the image-system communication has been received (whether the use can be started) by the application processor or the bridge one end which is the image-system communication host. This can be solved when the control-system communication host first transmits a session key or a new session key for the image-system communication to the control-system communication device (e.g., the application processor, the display, the bridge one end corresponding to the image sensor) which is an image-system data reception side, and then transmits the same session key or the same new session key to the control-system communication device (e.g., the application processor, the bridge one end (with the proviso that in a case where the bridge one end is not the image-system data reception side), or the bridge another end corresponding to the image sensor or the display) which is an image-system data transmission side. Alternatively, this can be solved when: the control-system communication host manages the timing to start using the session key or the new session key oriented for the image-system communication; information indicating that the session key or the new session key oriented for the image-system communication can be started to be used is transmitted from the control-system communication host to the control-system communication device which is the image-system data transmission side; and the image-system data transmission side starts using the session key or the new session key oriented for the image-system communication in response to reception thereof.

Incidentally, a protection section that protects first communication (e.g., the control-system communication) and second communication (e.g., the image-system communication) faster than the first communication may include a first security arithmetic part and a second security arithmetic part. In addition, the same cryptographic algorithm may be applied to the first security arithmetic part and the second security arithmetic part, or different cryptographic algorithms may be applied thereto. For example, any of AES-GCM, AES-GMAC, a block cipher CCM mode, the HMAC, or the CMAC may be applied to the first security arithmetic part for being oriented to the image-system communication, and a combination of any of a block cipher CBC (Cipher Block Chaining) mode or a block cipher CTR (Counter) mode and any of the HMAC or the CMAC may be applied to the second security arithmetic part for being oriented to the control-system communication. In addition, a combination of any of the block cipher CBC mode or the block cipher CTR mode and any of the HMAC or the CMAC may be applied to the first security arithmetic part for being oriented to the image-system communication, and any of the AES-GCM or the block cipher CCM mode may be applied to the second security arithmetic part for being oriented to the control-system communication. That is, although it is sufficient for the protected session (e.g., a non-SPDM session) between the image-system communication host and the image-system communication device to be protected by at least message authentication, transmission of a session key or a new session key via the protected session (e.g., SPDM session) between the control-system communication host and the control-system communication device needs to be protected by encryption and message authentication. However, even when being in the protected session (e.g., SPDM session) between the control-system communication host and the control-system communication device, a message irrelevant to the session key or the new session key may be protected by message authentication without encryption, or may be protected by encryption and message authentication. For example, some or all of the Vendor defined SPDM message (e.g., the VENDOR_DEFINED_REQUEST request message or the VENDOR_DEFINED_RESPONSE response message) may be protected by encryption and message authentication, and the HEARTBEAT request message, the HEARTBEAT_ACK response message, the HEARTBEAT_NAK response message, the ERROR response message, the KEY UPDATE request, the KEY_UPDATE_ACK response, the remainder of the Vendor defined SPDM message, or the like may be protected by message authentication without encryption or may be protected by encryption and message authentication. In addition, the message to be transmitted from the control-system communication host to the control-system communication device may be protected by encryption and message authentication, and the message to be transmitted from the control-system communication device to the control-system communication host may be protected by message authentication without encryption, or may be protected by encryption and message authentication.

Incidentally, FIG. 159 illustrates a case where the Service Descriptor in the extended packet header includes a bit flag of message authentication ON/OFF (Enable/Disable); however, there is a possibility that this bit flag may be falsified by an attacker. That is, there is a risk that the message authentication in the image-system communication may be disabled by the attacker. In addition, the same holds true also for the case where the Service Descriptor in the extended packet header includes a bit flag of ON/OFF of the security feature including the message authentication, rather than a bit flag of ON/OFF of the message authentication. In addition, for example, definition may be made, as follows: ePH2[27:25]=Service Descriptor[3:1]=0b000: with no message authentication/with no encryption (security feature disabled); ePH2[27:25]=Service Descriptor[3:1]=0b001: with message authentication/with encryption (security feature enabled); and ePH2[27:25]=Service Descriptor [3:1]=0b010: with message authentication/with no encryption (security feature enabled). However, these bit allocations and expressions may be different. However, an implementer may switch between enablement and disablement of message authentication or the security feature including the message authentication in the image-system communication, in some cases, taking account of the risk. In that case, it is desirable to transmit information indicating whether or not to permit disablement of message authentication or the security feature including the message authentication in the image-system communication (e.g., 1'b1: permit disablement of message authentication or the security feature including the message authentication by the Service Descriptor, and 1'b0: not to permit disablement of message authentication or the security feature including the message authentication by the Service Descriptor) from the control-system communication host to the control-system communication device via the protected session (e.g., SPDM session) between the control-system communication host and the control-system communication device. However, as for these bit allocations (1'b1/1'b0), bits may be allocated in reverse, or may be allocated not to a region of 1 bit, but to a region of 2 bits or more. Another implementer who does not tolerate the risk that the message authentication in the image-system communication may be disabled by an attacker is able to take a countermeasure against the disablement (falsification) of the message authentication in the image-system communication by the attacker by not permitting the disablement of the message authentication or the security feature including the message authentication in the image-system communication. That is, the information (information related to disablement) indicating whether or not to permit the disablement of the message authentication or the security feature including the message authentication in the image-system communication may be transmitted from the control-system communication host or received by the control-system communication device (e.g., as a portion or all of another parameter information) using the control-system communication protected by a control-system communication-oriented session key before the start of the image-system communication (e.g., transmission or reception of an extended packet of image-system communication), and information indicating the disablement or enablement of some or all of the message authentication or the security feature including the message authentication in the image-system communication may be stored in the extended packet (e.g., extended packet header, Service Descriptor, or packet data) of the image-system communication to be received on the image-system data reception side or to be transmitted from the image-system data transmission side. In addition, the information (information related to the disablement) indicating whether or not to permit the disablement of the message authentication or the security feature including the message authentication in the image-system communication may be transmitted from the control-system communication host or received by the control-system communication device (e.g., as a portion or all of another parameter information) using the control-system communication protected by the control-system communication-oriented session key before the session key or the new session key oriented to the image-system communication is started to be used on the image-system data transmission side, and the information indicating the disablement or enablement of some or all of the message authentication or the security feature including the message authentication in the image-system communication may be stored in the extended packet (e.g., extended packet header, Service Descriptor, or packet data) of the image-system communication to be received on the image-system data reception side or to be transmitted from the image-system data transmission side, in response to the start of use of the session key or the new session key oriented to the image-system communication on the image-system data transmission side (alternatively, after the start of the use on the image-system data transmission side). However, the transmission or the reception of the information (information related to the disablement) indicating whether or not to permit the disablement of the message authentication or the security feature including the message authentication in the image-system communication may be substituted by pre-agreement (Private contract) between the image-system communication host and the image-system communication device. That is, the information indicating the disablement or enablement of some or all of the message authentication or the security feature including the message authentication in the image-system communication may be stored in the extended packet (e.g., extended packet header, Service Descriptor, or packet data) of the image-system communication, in accordance with the pre-agreed information, to be transmitted from the image-system data transmission side and to be received on the image-system data reception side; in a case where the pre-agreed information and the received information differ from each other, the image-system data reception side may determine that the extended packet has been falsified. Meanwhile, enabling the message authentication or the security feature including the message authentication in the image-system communication may be permitted. That is, the information indicating the enablement of some or all of the message authentication or the security feature including the message authentication in the image-system communication may be stored in the extended packet (e.g., extended packet header, Service Descriptor, or packet data) of the image-system communication to be transmitted from the image-system data transmission side or to be received on the image-system data reception side, in response to the start of use of the session key or the new session key oriented to the image-system communication on the image-system data transmission side (alternatively, after the start of the use on the image-system data transmission side), after the information indicating the disablement of the message authentication or the security feature including the message authentication in the image-system communication is stored in the extended packet (e.g., extended packet header, Service Descriptor, or packet data) of the image-system communication to be transmitted from the image-system data transmission side or to be received on the image-system data reception side. In addition, the information (information related to the disablement) commanding or requiring the disablement of the message authentication or the security feature including the message authentication in the image-system communication may be transmitted from the control-system communication host to the control-system communication device via the protected session (e.g., SPDM session) between the control-system communication host and the control-system communication device. That is, the information (information related to the disablement) commanding or requiring the disablement of the message authentication or the security feature including the message authentication in the image-system communication may be transmitted from the control-system communication host or received by the control-system communication device, (e.g., as a portion or all of another parameter information) using the control-system communication protected by the control-system communication-oriented session key, before the start of the image-system communication (e.g., transmission or reception of an extended packet of the image-system communication). In addition, the message authentication or the security feature including the message authentication in the image-system communication may be enabled by using the extended packet of the image-system communication (e.g., extended packet header, Service Descriptor, or packet data), and may be disabled by using the control-system communication protected by the control-system communication-oriented session key. Also in this case, it is possible to take a countermeasure against the disablement (falsification) of the message authentication in the image-system communication by the attacker.

Incidentally, in a case where a combination of any of the block cipher CBC mode or the block cipher CTR mode and any of the HMAC or the CMAC is applied to the security arithmetic part for being oriented to the image-system communication, the encryption key and the MAC key are necessary. The above-described specification of the timing to start using the session key or the new session key may be configured by a first timing specification for the start of use for the encryption key (e.g., for authenticated cryptography, for the block cipher CBC mode, for the block cipher CTR mode) and a second timing specification for the start of use for MAC key (e.g., for the HMAC, for the CMAC). For example, the first timing specification for the start of use may include information related to a first key ID (e.g., for the authenticated cryptography, for the block cipher CBC mode, for the block cipher CTR mode), and the second timing specification for the start of use may include information related to a second key ID (e.g., for the HMAC, for the CMAC). For example, in response to the start of use of the encryption key (session key or new session key) on the image-system data transmission side, the first timing specification for the start of use may be transmitted from the image-system data transmission side to the image-system data reception side (i.e., the encryption key may be started to be used in response to the timing specification for the start of use), and, in response to the start of use of the MAC key (session key or new session key) on the image-system data transmission side, the second timing specification for the start of use may be transmitted from the image-system data transmission side to the image-system data reception side (i.e., the MAC key may be started to be used in response to the timing specification for the start of use). In addition, on the image-system data transmission side or the image-system data reception side, in response to the first timing specification for the start of use, the encryption key (session key or new session key) may be started to be used, and, in response to the second timing specification for the start of use, the MAC key (session key or new session key) may be started to be used. However, on the image-system data transmission side or the image-system data reception side, in response to the first timing specification for the start of use (i.e., timing specification for the start of use) without providing the second timing specification for the start of use, the encryption key and the MAC key (session key or new session key) may be started to be used.

Incidentally, the session key and the new session key for being oriented to the image-system communication may be transmitted from the control-system communication host to the control-system communication device via the protected session (e.g., SPDM session) between the control-system communication host and the control-system communication device before the start of protected image-system communication (transmission of the image-system data). However, when the session key and two or more new session keys for being oriented to the image-system communication are transmitted from the control-system communication host to the control-system communication device before the start of the protected image-system communication (transmission of the image-system data), three or more key slots (e.g., memory regions) are necessary in order to hold the key on a control-system communication host side or a control-system communication device side. Therefore, it is desirable that latest session keys be written alternately into two key slots on the control-system communication host side every time the latest session keys are transmitted from the control-system communication host, or that latest session keys be written alternately into two key slots on the control-system communication device side every time the latest session keys are received by the control-system communication device, to thereby allow the session keys or the new session keys to be transmitted (or received) and discarded so that the control-system communication host side or the control-system communication device side has the maximum of two keys; however, this is not limitative.

Incidentally, information such as the session key (also including the new session key) for being oriented to the image-system communication, an algorithm, or another parameter is transmitted from the control-system communication host to the control-system communication device via the protected session (e.g., SPDM session) between the control-system communication host and the control-system communication device; however, the algorithm information may include information on cryptographic algorithm, and the other parameter information may include key ID information corresponding to the session key or the new session key for being oriented to the image-system communication. The key ID information may be, for example, as follows: first session key (session key)=0, second session key (new first session key)=1, third session key (new second session key)=2, fourth session key (new third session key)=3, and . . . ; first session key (session key)=1'b0, second session key (new first session key)=1'b1, third session key (new second session key)=1'b0, fourth session key (new third session key)=1'b1, and . . . ; first session key (session key)=1, second session key (new first session key)=2, third session key (new second session key)=3, fourth session key (new third session key)=4, and . . . ; first session key (session key)=1'b1, second session key (new first session key)=1'b0, third session key (new second session key)=1'b1, fourth session key (new third session key)=1'b0, and . . . ; and values of the key ID information may be rolled over. In addition, the key ID information may be, for example, numbers of key slots into which the session key or the new session key is written. Then, the image-system communication device or the image-system communication host which is the control-system communication device is able to start using the session key or the new session key for being oriented to the image-system communication, in response to information related to the key ID (e.g., information corresponding to the key ID of a key to be started to be used or having been started to be used among the session keys or the new session keys for being oriented to the image-system communication, or information indicating whether the key ID of the key to be started to be used or having been started to be used among the session keys or the new session keys for being oriented to the image-system communication is an even number (Even key) or an odd number (Odd key)) transmitted from the image-system data transmission side to the image-system data reception side, via any of the extended packet header, the packet data, the Service Descriptor, or the like. However, the extended packet header or the Service Descriptor is transmitted a huge number of times for each line to which the extended packet corresponds (has a large total amount of data), and thus has a severe constraint on the storable amount of information, as compared with the Vendor defined SPDM message (having a small total amount of data) of which the number of times of use is less in a case of transmitting the session key or the new session key for being oriented to the image-system communication. Therefore, it is desirable that the information amount of the key ID information to be stored in the extended packet header or the Service Descriptor be equal to or less than the information amount of the key ID information to be stored in the Vendor defined SPDM message; however, this is not limitative. That is, the information related to key ID (e.g., a portion or all of the key ID information, information corresponding to the key ID of the key to be started to be used or having been started to be used among the session keys or the new session keys for being oriented to the image-system communication, or information indicating whether or not the key ID of the key to be started to be used or having been started to be used among the session keys or the new session keys for being oriented to the image-system communication is an even number (Even key) or an odd number (Odd key)) may be transmitted from the control-system communication host or received by the control-system communication device (e.g., as a portion or all of another parameter information) using the control-system communication protected by the control-system communication-oriented session key, before the session key or the new session key for being oriented to the image-system communication is started to be used on the image-system data transmission side, and may be stored in the extended packet of the image-system communication to be received by the image-system data reception side or transmitted from the image-system data transmission side, in response to the start of use of the session key or the new session key for being oriented to the image-system communication on the image-system data transmission side (alternatively, after the start of the use on the image-system data transmission side). In addition, the information related to key ID (e.g., a portion or all of the key ID information) may be transmitted from the control-system communication host or received by the control-system communication device (e.g., as a portion or all of another parameter information)

using the control-system communication protected by the control-system communication-oriented session key, before the session key or the new session key for being oriented to the image-system communication is started to be used on the image-system data transmission side, and information of which the information amount of information related to the key ID is compressed (e.g., information corresponding to the key ID of the key to be started to be used or having been started to be used among the session keys or the new session keys for being oriented to the image-system communication, or information indicating whether or not the key ID of the key to be started to be used or having been started to be used among the session keys or the new session keys for being oriented to the image-system communication is an even number (Even key) or an odd number (Odd key)) may be stored in the extended packet of the image-system communication to be received by the image-system data reception side or transmitted from the image-system data transmission side, in response to the start of use of the session key or the new session key for being oriented to the image-system communication on the image-system data transmission side (alternatively, after the start of the use on the image-system data transmission side). In addition, in a case where the latest image-system communication-oriented session key and information (e.g., a portion or all of the key ID information) related to the key ID corresponding thereto are transmitted from the control-system communication host and received by the control-system communication device using the control-system communication (e.g., the VENDOR_DEFINED_REQUEST request message) protected by the control-system communication-oriented session key, information (e.g., portion or all of the key ID information) related to two key IDs corresponding to two session keys or new session keys for being oriented to the image-system communication held by the control-system communication device may be transmitted, as its response, from the control-system communication device to the control-system communication host using the control-system communication (e.g., the VENDOR_DEFINED_RESPONSE response message). In addition, in a case where the latest image-system communication-oriented new session key and information (e.g., a portion or all of the key ID information) related to the key ID corresponding thereto are transmitted from the control-system communication host and received by the control-system communication device using the control-system communication (e.g., the VENDOR_DEFINED_REQUEST request message) protected by the control-system communication-oriented session key, information indicating the presence or absence of a failure related to two key IDs (e.g., whether or not the two key IDs are discontinuous, whether or not the two key IDs are both even numbers, whether or not the two key IDs are both odd numbers, and whether or not they are unexpected key slot numbers) may be transmitted, as its response, from the control-system communication device to the control-system communication host using the control-system communication (e.g., the VENDOR_DEFINED_RESPONSE response message). In these cases, it is possible for the control-system communication host to confirm in advance that the information related to the image-system communication-oriented key ID held by the control-system communication device (e.g., information corresponding to the key ID of the key to be started to be used or having been started to be used among the session keys or the new session keys for being oriented to the image-system communication, or information indicating whether or not the key ID of the key to be started to be used or having been started to be used among the session keys or the new session keys for being oriented to the image-system communication is an even number (Even key) or an odd number (Odd key)), of which the information amount is compressed, has no failure, and thus it is possible to avoid erroneous encryption (decryption) or message authentication by the image-system communication device or the image-system communication host which is the control-system communication device. For example, in a case where the control-system communication host determines that the two session keys or new session keys for being oriented to the image-system communication being held by the control-system communication device have a failure on the basis of information transmitted from the control-system communication device and received by the control-system communication host using the control-system communication (e.g., VENDOR_DEFINED_RESPONSE response message), the control-system communication host may further derive or generate a novel new session key (latest session key) to transmit a latest session key and information related to a key ID corresponding to the latest session key from the control-system communication host to the control-system communication device using the control-system communication (e.g., VENDOR_DEFINED_REQUEST request message) protected by the control-system communication-oriented session key. In addition, for example, in a case where the control-system communication host determines that the two new image-system communication-oriented session keys held by the control-system communication device have no failure on the basis of information transmitted from the control-system communication device and received by the control-system communication host using the control-system communication (e.g., VENDOR_DEFINED_RESPONSE response message), information indicating that latest image-system communication-oriented new session key may be started to be used may be transmitted from the control-system communication host to the control-system communication device (in particular, the image-system data transmission side) using the control-system communication (e.g., VENDOR_DEFINED_REQUEST request message) protected by the control-system communication-oriented session key. However, for example, definitions may be given as follows: ePH2[27:25]=Service Descriptor [3:1]=0b001: with message authentication/with encryption/Key1 (Even key); ePH2[27:25]=Service Descriptor [3:1]=0b010: with message authentication/without encryption/Key2 (Even key); ePH2[27:25]=Service Descriptor[3:1]=0b100: with message authentication/with encryption/Key3 (Odd key); and ePH2[27:25]=Service Descriptor [3:1]=0b101: with message authentication/without encryption/Key4 (Odd key). In addition, for example, definitions may be given as follows: ePH2[27:25]=Service Descriptor [3:1]=0b001: with message authentication/with encryption/Key1 (Odd key); ePH2[27:25]=Service Descriptor [3:1]=0b010: with message authentication/without encryption/Key2 (Odd key); ePH2[27:25]=Service Descriptor [3:1]=0b100: with message authentication/with encryption/Key3 (Even key): and ePH2[27:25]=Service Descriptor [3:1]=0b101: with message authentication/without encryption/Key4 (Even key). In these cases, the session key needs to be changed by switching between enablement and disablement (ON/OFF) of the encryption. Thus, for example; definitions of ePH2[27:25]=Service Descriptor[3:1]=0b011: with message authentication/without encryption/Key1 and ePH2[27:25]=Service Descriptor[3:1]=0b110: with message authentication/without encryption/Key3 may allow for switching between enablement and disablement (ON/OFF) of the encryption using the same session key. Specifically, switching "0b001/0b011" or "0b100/0b110" enables switching of "enablement/disablement (ON/OFF)" of the encryption using the same session key, but the bit allocation or expression thereof may be varied. For example, ePH2[27:25]=Service Descriptor[3:1]=0b010: with message authentication/without encryption/Key1, and ePH2[27:25]=Service Descriptor[3:1]=0b101: with message authentication/without encryption/Key3 may also be employed; Key1 or Key3 may be replaced by Key0, or Key2 or Key4 may be replaced by Key1. Likewise, for example, definitions of ePH2[27:25]=Service Descriptor [3:1]=0b011: with message authentication/with encryption/Key2, and ePH2 [27:25]=Service Descriptor [3:1]=0b110: with message authentication/with encryption/Key4 may allow for switching between enablement and disablement (ON/OFF) of the encryption using the same session key. Specifically, the switching of "0b011/0b010" or the switching of "0b110/0b101" enables switching of "enablement/disablement (ON/OFF)" of the encryption using the same session key, but the bit allocation or expression thereof may be varied. In addition, information indicating whether or not the Key1 and the Key2 are the same (e.g., 1'b1: Key1 and Key2 are different, 1'b0:Key1 and Key2 are the same) or information indicating whether or not the Key3 and the Key4 are the same (e.g., 1'b1: Key3 and Key4 are different, 1'b0:Key3 and Key4 are the same) may be transmitted from the control-system communication host to the control-system communication device via the protected session (e.g., SPDM session) between the control-system communication host and the control-system communication device, thereby allowing for switching between enablement and disablement (ON/OFF) of the encryption using the same session key. However, these bit allocations (1'b1/1'b0) may be performed in reverse, or the allocations may be performed to a region of 2 bits or more rather than a region of 1 bit. That is, the information indicating whether or not the Key1 and the Key2 are the same or the information indicating whether or not the Key3 and the Key4 are the same may be transmitted from the control-system communication host or received by the control-system communication device (e.g., as a portion or all of another parameter information) using the control-system communication protected by the control-system communication-oriented session key, before the image-system communication is started (e.g., the extended packet of the image-system communication is transmitted or received), and information corresponding to the key ID of the key (e.g., specification of any of Key1, Key2, Key3 or Key4) to be started to be used or having been started to be used among the session keys or the new session keys for being oriented to the image-system communication may be stored in the extended packet (e.g., extended packet header, Service Descriptor, or packet data) of the image-system communication to be received by the image-system data reception side or transmitted from the image-system data transmission side. In addition, the information indicating whether or not the Key1 and the Key2 are the same or the information indicating whether or not the Key3 and the Key4 are the same may be transmitted from the control-system communication host or received by the control-system communication device (e.g., as a portion or all of another parameter information) using the control-system communication protected by the control-system communication-oriented session key, before the session key or the new session key for being oriented to the image-system communication is started to be used on the image-system data transmission side, and information corresponding to the key ID of the key (e.g., specification of any of Key1, Key2, Key3 or Key4) to be started to be used or having been started to be used among the session keys or the new session keys for being oriented to the image-system communication may be stored in the extended packet (e.g., extended packet header, Service Descriptor, or packet data) of the image-system communication to be received by the image-system data reception side or transmitted from the image-system data transmission side, in response to the start of use of the session key or the new session key for being oriented to the image-system communication on the image-system data transmission side (alternatively, after the start of the use on the image-system data transmission side). In addition, the transmission or the reception of the information indicating whether or not the Key1 and the Key2 are the same or the information indicating whether or not the Key3 and the Key4 are the same may be substituted by pre-agreement (Private contract) between the image-system communication host and the image-system communication device. That is, the image-system communication host and the image-system communication device may each determine whether or not the Key1 and the Key2 are the same or whether or not the Key3 and the Key4 are the same in accordance with the pre-agreed information, and may perform switching between enablement and disablement (ON/OFF) of the encryption using the same session key in accordance with the pre-agreed information. Specifically, in a case where the pre-agreement is made that the Key1 and the Key2 are the same or the Key3 and the Key4 are the same, the switching of "0b001/0b010" or the switching of "0b100/0b101" enables switching of "enablement/disablement (ON/OFF)" of the encryption using the same session key, but the bit allocation or expression thereof may be varied.

<Grasp of State of Session Key>

A communication system 3100 illustrated in FIG. 208 includes an application processor 3110 and an image sensor 3120. The application processor 3110 and the image sensor 3120 are coupled to each other by one communication path 3130, for example. The communication path 3130 serves as a control-system communication path and an image the communication path (e.g., A-PHY, or D-PHY or C-PHY in compliance with USL, etc.). It is to be noted that the application processor 3110 and the image sensor 3120 may be coupled to each other by multiple communication paths 3130. In addition, the application processor 3110 and the image sensor 3120 may be coupled to each other by multiple communication paths in which the control-system communication path and the image-system communication path are configured separately.

The application processor 3110 includes a communication control section **3110*a* and abridge (Bridge) one end 3110*b*. The communication control section 3110*a* serves as the SSMC (Secure Session Manager Controller) or the application processor (also referred to as SoC or System on Chip). The communication control section 3110*a* includes, for example, an SPDM requester 3111 (e.g., CCI master), a Control Plane host 3112 (e.g., CCI master), and a Data Plane host 3113** (image data reception section).

The image sensor 3120 includes a sensor section **3120*a* having a communication control function and a bridge another end 3120*b*. The sensor section 3120*a* includes, for example, an imaging part, an SPDM responder 3121 (e.g., CCI slave), a Control Plane device 3122 (e.g., CCI slave), and a Data Plane device 3123 (image data transmission part). The bridge one end 3110*b* and the bridge another end 3120*b*** may be omitted.

For example, in the communication path 3130, an SPDM session is established between the SPDM requester 3111 and the SPDM responder 3121. In addition, for example, in the communication path 3130, a Control Plane session is established between the Control Plane host 3112 and the Control Plane device 3122. In addition, for example, in the communication path 3130, a Data Plane session is established between the Data Plane host 3113 and the Data Plane device 3123.

The Control Plane session is established using a Control Plane session key. A Control communication control section 3110*a* generates the Control Plane session key, and transmits it to the sensor section 3120*a* via the SPDM session. The sensor section 3120*a* receives the Control Plane session key via the SPDM session. In this manner, the Control Plane session is established using the Control Plane session key passed to the sensor section 3120*a* from the communication control section 3110*a*.

The Data Plane session is established using a Data Plane session key. The communication control section 3110*a* generates the Data Plane session key, and transmits it to the sensor section 3120*a* via the SPDM session. The sensor section 3120*a* receives the Data Plane session key via the SPDM session. In this manner, the Data Plane session is established using the Data Plane session key passed to the sensor section 3120*a* from the communication control section 3110*a*.

Between the SPDM requester 3111 and the SPDM responder 3121, a request message in compliance with the SPDM is transmitted from the SPDM requester 3111 to the SPDM responder 3121, and a response message in compliance with the SPDM is transmitted from the SPDM responder 3121 to the SPDM requester 3111.

Between the Control Plane host 3112 and the Control Plane device 3122, a Write Command (CCI Write) or a Read Command (CCI Read) protected by the Control Plane session key is transmitted from the Control Plane host 3112 to the Control Plane device 3122. In addition, between the Control Plane host 3112 and the Control Plane device 3122, a Read Response (CCI Read return value) protected by the Control Plane session key is transmitted from the Control Plane device 3122 to the Control Plane host 3112.

Between the Data Plane host 3113 and the Data Plane device 3123, the frame start, the embedded data, the image data, the user-defined data, or the frame end protected by the Data Plane session key is transmitted from the Data Plane device 3123 to the Data Plane host 3113.

Performing such data transmission and reception enables the communication control section 3110*a* to determine whether or not the session key needs to be updated on the basis of information (e.g., specification of the timing to start using a new session key) transmitted by the sensor section 3120*a* and to generate the latest session key for transmission to the sensor section 3120*a*. It is to be noted that a display may be provided instead of the image sensor 3120, and a display panel may be provided instead of the sensor section 3120*a*. In this case, between the Data Plane host 3113 and the Data Plane device 3123, the frame start, the embedded data, the image data, the user-defined data or the frame end protected by the Data Plane session key is transmitted from the Data Plane host 3113 to the Data Plane device 3123. It is to be noted that Host or Device may be referred to as an expression that includes Agent. In addition, Control plane may be referred to as an expression including a portion or all of ESS CCI (Enhanced Safety and Security Camera Control Interface) or as an expression including a portion or all of ACMP (A-PHY Control & Management Protocol). In addition, Data plane may be referred to as an expression including a portion or all of SEP (Service Extension Packet). The Control plane or the Data plane may be applied not only to image-related applications, but also to non-image-related applications such as Power Management, IoT (Internet of Things), GNSS (Global Navigation Satellite System), or GPS (Global Positioning System or Global Positioning Satellite).

Next, description is given of modification examples of the communication system 3100.

Modification Example A

FIG. 209 is a diagram illustrating a modification example of blocks of the communication system 3100. In the present modification example, the application processor 3110 and the image sensor 3120 are coupled to each other by one control-system communication path 3131 and one image-system communication path 3132. The control-system communication path 3131 is, for example, the CCI. The image-system communication path 3132 is, for example, the C-PHY or the D-PHY. It is to be noted that, in the present modification example, the application processor 3110 and the image sensor 3120 may be coupled to each other by multiple control-system communication paths 3131 and multiple image-system communication paths 3132. In addition, the application processor 3110 and the image sensor 3120 may be coupled to each other by one communication path 3130.

In the present modification example, the communication control section 3110*a* includes the SPDM requester 3111*a* and the Control Plane host 3112, and the bridge one end 3110*b* includes the Data Plane host 3113 and an SPDM responder 3114. In the present modification example, the sensor section 3120*a* includes the SPDM responder 3121*a* and the Control Plane device 3122, and the bridge another end 3120*b* includes an SPDM responder 3124 and the Data Plane device 3123.

For example, in the communication path 3131, the SPDM session is established between the SPDM requester 3111*a* and the SPDM responder 3121*a*, 3124, or 3114. In addition, for example, in the communication path 3131, the Control Plane session is established between the Control Plane host 3112 and the Control Plane device 3122. In addition, for example, in the communication path 3132, the Data Plane session is established between the Data Plane host 3113 and the Data Plane device 3123.

The Control Plane session is established using the Control Plane session key. The Control communication control section 3110*a* generates the Control Plane session key, and transmits it to the sensor section 3120*a* via the SPDM session. The sensor section 3120*a* receives the Control Plane session key via the SPDM session. In this manner, the Control Plane session is established using the Control Plane session key passed to the sensor section 3120*a* from the communication control section 3110*a*.

The Data Plane session is established using the Data Plane session key. The communication control section 3110*a* generates the Data Plane session key, and transmits it to the sensor section 3120*a* via the SPDM session. The sensor section 3120*a* receives the Data Plane session key via the SPDM session. In this manner, the Data Plane session is established using the Data Plane session key passed to the sensor section 3120*a* from the communication control section 3110*a*. It is desirable that the Data Plane session key and the Control Plane session key differ from each other.

Between the SPDM requester 3111*a* and the SPDM responder 3121*a*, 3124, or 3114, a request message in compliance with the SPDM is transmitted from the SPDM requester 3111*a* to the SPDM responders 3121*a*, 3124, and 3114, and a response message in compliance with the SPDM is transmitted from the SPDM responders 3121*a*, 3124, and 3114 to the SPDM requester 3111*a*.

Between the Control Plane host 3112 and the Control Plane device 3122, the Write Command (CCI Write) or the Read Command (CCI Read) protected by the Control Plane session key is transmitted from the Control Plane host 3112 to the Control Plane device 3122. In addition, between the Control Plane host 3112 and the Control Plane device 3122, the Read Response (CCI Read return value) protected by the Control Plane session key is transmitted from the Control Plane device 3122 to the Control Plane host 3112.

Between the Data Plane host 3113 and the Data Plane device 3123, the frame start, the embedded data, the image data, the user-defined data or the frame end protected by the Data Plane session key is transmitted from the Data Plane device 3123 to the Data Plane host 3113.

In the present modification example, the control-system communication between the communication control section 3110*a* and the sensor section 3120*a* is protected by the Control Plane session key, and the image-system communication between the bridge one end 3110*b* and the bridge another end 3120*b* is protected by the Data Plane session key. However, the image-system communication between the communication control section 3110*a* and the bridge one end 3110*b* and the image-system communication between the bridge another end 3120*b* and the sensor section 3120*a* are not protected by the Data Plane session key. Therefore, for example, even when the specification of the timing to start using a new Data Plane session key is voluntarily transmitted from the bridge another end 3120*b* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the bridge another end 3120*b* are not able to receive the latest session key at an appropriate timing.

Modification Example B

FIG. 210 is a diagram illustrating a modification example of blocks of the communication system 3100. In the present modification example, a Control Plane host 3112 is provided in the bridge one end 3110*b* in the communication system 3100 according to Modification Example A. In this case, the control-system communication between the bridge one end 3110*b* and the sensor section 3120*a* is protected by the Control Plane session key. However, the control-system communication between the communication control section 3110*a* and the bridge one end 3110*b* is not protected by the Control Plane session key. Further, the image-system communication between the communication control section 3110*a* and the bridge one end 3110*b* and the image-system communication between the bridge another end 3120*b* and the sensor section 3120*a* are not protected by the Data Plane session key. Therefore, for example, even when the specification of the timing to start using the new Data Plane session key is voluntarily transmitted from the bridge another end 3120*b* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the bridge another end 3120*b* are not able to receive the latest session key at an appropriate timing.

Modification Example C

FIG. 211 is a diagram illustrating a modification example of blocks of the communication system 3100. In the present modification example, the Data Plane device 3123 is provided in the sensor section 3120*a*, and the SPDM responder 3124 of the bridge another end 3120*b* is omitted, in the communication system 3100 according to Modification Example A. The bridge another end 3120*b* may be omitted. In this case, the control-system communication between the communication control section 3110*a* and the sensor section 3120*a* is protected by the Control Plane session key. In addition, the image-system communication between the bridge one end 3110*b* and the sensor section 3120*a* is protected by the Data Plane session key. However, the image-system communication between the communication control section 3110*a* and the bridge one end 3110*b* is not protected by the Data Plane session key. Therefore, for example, even when the specification of the timing to start using the new Data Plane session key is voluntarily transmitted from the sensor section 3120*a* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the sensor section 3120*a* are not able to receive the latest session key at an appropriate timing.

Modification Example D

FIG. 212 is a diagram illustrating a modification example of blocks of the communication system 3100. In the present modification example, the Control Plane host 3112 is provided in the bridge one end 3110*b* in the communication system 3100 according to Modification Example C. The bridge another end 3120*b* may be omitted. In this case, the control-system communication between the bridge one end 3110*b* and the sensor section 3120*a* is protected by the Control Plane session key, and the image-system communication between the bridge one end 3110*b* and the sensor section 3120*a* is protected by the Data Plane session key. However, the control-system communication between the communication control section 3110*a* and the bridge one end 3110*b* is not protected by the Control Plane session key. In addition, the image-system communication between the communication control section 3110*a* and the bridge one end 3110*b* is not protected by the Data Plane session key. Therefore, for example, even when the specification of the timing to start using the new Data Plane session key is voluntarily transmitted from the sensor section 3120*a* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the sensor section 3120*a* are not able to receive the latest session key at an appropriate timing.

Modification Example E

FIG. 213 is a diagram illustrating a modification example of blocks of the communication system 3100. In the present modification example, the Control Plane device 3122 is provided in the bridge another end 3120*b*, and the SPDM responder 3121*a* of the sensor section 3120*a* is omitted, in the communication system 3100 according to Modification Example A. In this case, the control-system communication between the communication control section 3110*a* and the bridge another end 3120*b* is protected by the Control Plane session key, and the image-system communication between the bridge one end 3110*b* and the bridge another end 3120*b* is protected by the Data Plane session key. However, the control-system communication between the bridge another end 3120*b* and the sensor section 3120*a* is not protected by the Control Plane session key. In addition, the image-system communication between the communication control section 3110*a* and the bridge one end 3110*b* and the image-system communication between the bridge another end 3120*b* and the sensor section 3120*a* are not protected by the Data Plane session key. Therefore, for example, even when the specification of the timing to start using the new Data Plane session key is voluntarily transmitted from the bridge another end 3120*b* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the bridge another end 3120*b* are not able to receive the latest session key at an appropriate timing.

Modification Example F

FIG. 214 is a diagram illustrating a modification example of blocks of the communication system 3100. In the present modification example, the Control Plane host 3112 is provided in the bridge one end 3110*b* in the communication system 3100 according to modification example E. In this case, the control-system communication between the bridge one end 3110*b* and the bridge another end 3120*b* is protected by the Control Plane session key, and the image-system communication between the bridge one end 3110*b* and the bridge another end 3120*b* is protected by the Data Plane session key. However, the control-system communication between the communication control section 3110*a* and the bridge one end 3110*b* and the control-system communication between the bridge another end 3120*b* and the sensor section 3120*a* are not protected by the Control Plane session key. In addition, the image-system communication between the communication control section 3110*a* and the bridge one end 3110*b* and the image-system communication between the bridge another end 3120*b* and the sensor section 3120*a* are not protected by the Data Plane session key. Therefore, for example, even when the specification of the timing to start using the new Data Plane session key is voluntarily transmitted from the bridge another end 3120*b* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the bridge another end 3120*b* are not able to receive the latest session key at an appropriate timing.

Modification Example G

FIG. 215 is a diagram illustrating a modification example of blocks of the communication system 3100. In the present modification example, the application processor 3110 further includes a communication control section 3110*c* in the communication system 3100 according to Modification Example D. In the present modification example, the SPDM requester 3111*a* is provided in the communication control section 3110*a*, and the SPDM responder 3114, the Control Plane host 3112, and the Data Plane host 3113 are provided in the communication control section 3110*c*. In the present modification example, the communication control section 3110*a* serves as the SSMC or the application processor (Root SoC), and the communication control section 3110*c* serves as the application processor (SoC). The bridge one end 3110*b* and the bridge another end 3120*b* may be omitted.

In the present modification example, the control-system communication between the communication control section 3110*a* and the communication control section 3110*c* may be performed by, for example, the CCI (I2C or I3C) or the A-PHY, or may be performed by Ethernet or the USB (Universal Serial Bus).

The Control Plane session is established using the Control Plane session key. The Control communication control section 3110*a* generates the Control Plane session key, and transmits it to the communication control section 3110*c* and the sensor section 3120*a* via the SPDM session. The communication control section 3110*c* and the sensor section 3120*a* receive the Control Plane session key via the SPDM session. In this manner, the Control Plane session is established using the same Control Plane session key passed to each of the communication control section 3110*c* and the sensor section 3120*a* from the communication control section 3110*a*.

The Data Plane session is established using the Data Plane session key. The communication control section 3110*a* generates the Data Plane session key, and transmits it to the communication control section 3110*c* and the sensor section 3120*a* via the SPDM session. The communication control section 3110*c* and the sensor section 3120*a* receive the Data Plane session key via the SPDM session. In this manner, the Data Plane session is established using the same Data Plane session key passed to each of the communication control section 3110*c* and the sensor section 3120*a* from the communication control section 3110*a*.

In this case, the communication control section 3110*a* is not able to determine whether or not the Data Plane session key needs to be updated. Therefore, for example, even when the specification of the timing to start using the new Data Plane session key is voluntarily transmitted from the sensor section 3120*a* to the communication control section 3110*c*, the communication control section 3110*a* is not able to determine whether or not the Data Plane session key needs to be updated. As a result, the communication control section 3110*a* is not able to generate and transmit the latest session key at an appropriate timing. That is, the communication control section 3110*c* and the sensor section 3120*a* are not able to receive the latest session key at an appropriate timing.

Modification Example H

FIG. 216 is a diagram illustrating a modification example of blocks of the communication system 3100. In the present modification example, the Data Plane host 3113 is provided in the bridge one end 3110*b*, and an SPDM responder 3115 is further provided in the bridge one end 3110*b*, in the communication system 3100 according to Modification Example G. The bridge another end 3120*b* may be omitted.

The Data Plane session is established using the Data Plane session key. The communication control section 3110*a* generates the Data Plane session key, and transmits it to the bridge one end 3110*b* and the sensor section 3120*a* via the SPDM session. The bridge one end 3110*b* and the sensor section 3120*a* receive the Data Plane session key via the SPDM session. In this manner, the Data Plane session is established using the same Data Plane session key passed to each of the bridge one end 3110*b* and the sensor section 3120*a* from the communication control section 3110*a*.

In this case, the communication control section 3110*a* is not able to determine whether or not the Data Plane session key needs to be updated. Therefore, for example, even when the specification of the timing to start using the new Data Plane session key is voluntarily transmitted from the sensor section 3120*a* to the bridge one end 3110*b*, the communication control section 3110*a* is not able to determine whether or not the Data Plane session key needs to be updated. As a result, the communication control section 3110*a* is not able to generate and transmit the latest session key at an appropriate timing. That is, the bridge one end 3110*b* and the sensor section 3120*a* are not able to receive the latest session key at an appropriate timing.

<Replay Attack Countermeasure>

Incidentally, two or more MAC modes may be provided for the Control Plane. The sensor section 3120*a* or the bridge another end 3120*b* may store a MAC value in the embedded data for the high-speed data transmission of the next frame or in the data of the next CCI command, and transmit it to the communication control section 3110*a* or 3110*c* or the bridge one end 3110*b*, or receive it from the communication control section 3110*a* or 3110*c* or the bridge one end 3110*b*. As for the MAC value at this time, some or all of the write command, the read command, and the read response (i.e., CCI command) transmitted within a predetermined period of time or within a predetermined bit width between the communication control section 3110*a* or 3110*c* or the bridge one end 3110*b* and the sensor section 3120*a* or the bridge another end 3120*b* are to be the protection target of the message authentication. The MAC mode at this time is referred to as a Running mode.

Meanwhile, the sensor section 3120*a* or the bridge another end 3120*b* may transmit a MAC value to the communication control section 3110*a* or 3110*c* or the bridge one end 3110*b* or receive it from the communication control section 3110*a* or 3110*c* or the bridge one end 3110*b*, as some of the write command or as some of the read command and the read response. As for the MAC value at this time, some or all of the write command, the read command, and the read response transmitted within a predetermined period of time or within a predetermined bit width between the communication control section 3110*a* or 3110*c* or the bridge one end 3110*b* and the sensor section 3120*a* or the bridge another end 3120*b* are to be the protection target of the message authentication. The MAC mode at this time is referred to as an Individual mode.

The Running mode and the Individual mode may be used simultaneously, or may be switched time-divisionally for use. The MAC mode at this time is referred to as a Dual mode (Running/Individual). In addition, a MAC mode in which some or all of the read command and the read response are to be the protection target of the message authentication is referred to as a Read mode. In addition, a MAC mode in which some or all of the write command is to be the protection target of the message authentication is referred to as a Write mode. In addition, a MAC mode in which some or all of a series of combinations of the read command as well as the read response and the write command are to be the protection target of the message authentication is referred to as a Dual mode (Read/Write).

Incidentally, in the GMAC or the GCM, a unique initialization vector IV is used for a sufficiently long time in the Individual mode (FIG. 217). Therefore, this initialization vector IV can be used as a replay attack countermeasure. Heretofore, a Control Plane initialization vector IV includes, for example, a 32-bit Control Plane salt (random number), a 56-bit Control Plane addition message counter, and an 8-bit Control Plane message counter, as illustrated in (A) of FIG. 218.

In the communication system 3100 described above, the Control Plane initialization vector IV may include, for example, 32-bit Control Plane salt (random number), 52-bit Control Plane addition message counter, 8-bit Control Plane message counter, information indicating a MAC mode of 2-bit Control Plane, and information indicating a Read/Write mode of the 2-bit Control Plane, as illustrated in (B) of FIG. 218. Examples of the information indicating the MAC mode of the Control Plane include information indicating the Running mode, the Individual mode, or the Dual mode (Running/Individual). In addition, examples of the information indicating the Read/Write mode of the Control Plane include information indicating the Read mode, the Write mode, or the Dual mode (Read/Write). These bit widths (e.g., 32 bits, 56 bits, and 52 bits) are exemplary, and different bit widths may be employed for configuration.

In this manner, in a case where the Control Plane initialization vector IV includes the information illustrated in (B) of FIG. 218, the same session key or the same message counter can be used regardless of whether the MAC mode or the Read/Write mode. The communication control section 3110*a* may generate or derive a salt to be used for the Control Plane initialization vector IV to transmit the salt to the communication control section 3110*c*, the bridge one end 3110*b*, the bridge another end 3120*b*, or the sensor section 3120*a* by the VENDOR_DEFINED_REQUEST request message (Control Plane salt setting request). The communication control section 3110*c*, the bridge one end 3110*b*, the bridge another end 3120*b*, or the sensor section 3120*a* may transmit a Control Plane salt setting response to the communication control section 3110*a* by the VENDOR_DEFINED_RESPONSE response message (e.g., ACK, NACK, same salt storage) or the ERROR response message, in response to the Control Plane salt setting request.

Likewise, the communication control section 3110*a* may generate or derive a salt to be used for a Data Plane initialization vector IV to transmit the salt to the communication control section 3110*c*, the bridge one end 3110*b*, the bridge another end 3120*b*, or the sensor section 3120*a* by the VENDOR_DEFINED_REQUEST request message (Data Plane salt setting request). The communication control section 3110*c*, the bridge one end 3110*b*, the bridge another end 3120*b*, or the sensor section 3120*a* may transmit a Data Plane salt setting response to the communication control section 3110*a* by the VENDOR_DEFINED_RESPONSE response message (e.g., ACK, NACK, same salt storage) or the ERROR response message, in response to the Data Plane salt setting request.

It is assumed that the communication control section 3110*a*, the communication control section 3110*c*, or the bridge one end 3110*b* and the bridge another end 3120*b* or the sensor section 3120*a* perform an arithmetic operation of a MAC value such as a GMAC value of the message using the same initialization vector value IV with the same session key to transmit the message and the MAC value. At this time, for example, as illustrated in FIG. 219, the communication control section 3110*a*, the communication control section 3110*c*, the bridge one end 3110*b*, the bridge another end 3120*b*, or the sensor section 3120*a* may use, as a MAC value, a value incremented or decremented by one from the initialization vector value IV beyond a period during which the message count value (MC value) is cycled. In this manner, it is possible to eliminate the possibility of the replay attack.

However, in a case where the CMAC or the HMAC is used as the message authentication code (MAC), the message counter may sometimes not serve as a countermeasure against the replay attack, for example, as illustrated in FIG. 220. Therefore, in the CMAC or the HMAC, the byte width or the bit width of the message counter may be extended (variable) in the Individual mode (FIG. 221).

The communication control section 3110*a* may set the byte width or the bit width of a CCI message counter in the communication control section 3110*c*, the sensor section 3120*a* or the bridge by the VENDOR_DEFINED_REQUEST request message, a CCI extended header (EXTENDED HEADER), or pre-agreement (Private contract) between a Control plane host and a Control plane device. The VENDOR_DEFINED_REQUEST request message (Control plane message counter setting request) may have a format configuration as illustrated in FIG. 222, for example.

It is to be noted that the CCI extended header may have a configuration similar to the format configuration as illustrated in FIG. 222. The CCI extended header includes, for example, the necessity of functional safety (ON/OFF), the necessity of security feature (ON/OFF), the necessity of encryption (ON/OFF), the necessity of message counter (MC) (ON/OFF), the necessity of message authentication code (MAC), or the necessity of CRC (ON/OFF).

FIG. 223 illustrates an example of a write command. In response to the Control plane message counter setting request, the communication control section 3110*c*, the sensor section 3120*a*, or the bridge may transmit a Control plane message counter setting response to the communication control section 3110*a*, by the VENDOR_DEFINED_RESPONSE response message (e.g., ACK, NACK, same message counter set value storage) or the ERROR response message. At this time, the communication control section 3110*c*, the sensor section 3120*a*, or the bridge increments or decrements the message counter every time STOP Condition satisfying a predetermined condition is transmitted, with the initial value being set to zero or one, for example.

Incidentally, the message authentication of the extended packet header and the CCI extended header or ON/OFF of the security feature including the message authentication involves the risk of falsification. Therefore, for example, as illustrated in FIG. 224, it is desirable to set a MAC tag length by a Vendor Defined SPDM message. In addition, it is desirable to set information indicating whether or not to tolerate disablement of the message authentication or the security feature including the message authentication using the Vendor Defined SPDM message. Whether or not to tolerate the above-described disablement may be substituted by pre-agreement between the Control plane and the Control plane device. The information (information indicating whether or not to tolerate the disablement of message authentication or the security feature including the message authentication) related to MAC disablement in the image-system communication or the control-system communication may be a message authentication policy described later or may be defined by a functional register described later.

FIG. 225 illustrates an example of the read command and the read response. The communication control section 3110*a* may set the byte width or the bit width of a CCI message authentication code in the communication control section 3110*c*, the sensor section 3120*a* or the bridge by a VENDOR_DEFINED_RESPONSE request message, the CCI extended header (EXTENDED HEADER), or the pre-agreement (Private contract) between the Control plane host and the Control plane device. The CCI extended header may have a format configuration as illustrated in FIG. 224, for example.

The communication control section 3110*c*, the sensor section 3120*a*, or the bridge may transmit a Control plane message authentication code setting response to the communication control section 3110*a* in response to a Control plane message authentication code setting request by the VENDOR_DEFINED_RESPONSE response message (e.g., ACK, NACK, same MAC set value storage) or the ERROR response message. Likewise, the communication control section 3110*a* may have a format configuration in which the byte width or the bit width of a image-system communication MAC is variable, to allow the byte width or the bit width of the image-system communication MAC in the communication control section 3110*c*, the sensor section 3120*a*, or the bridge to be set by the VENDOR_DEFINED_REQUEST request message, the extended packet header, or the pre-agreement (Private contract) between the Data plane and the Data plane device.

In FIG. 224, when the CCI of the example of the VENDOR_DEFINED_REQUEST request message is changed to another expression (e.g., CSI2, DSI2), a Data plane message authentication code setting request is obtained. In response to the Data plane message authentication code setting request, the communication control section 3110*c*, the sensor section 3120*a*, or the bridge may transmit the Control plane message authentication code setting response to the communication control section 3110*a* by the VENDOR_DEFINED_RESPONSE response message (e.g., ACK, NACK, same MAC set value storage) or the ERROR response message.

It is to be noted that the line feed in the command examples in FIGS. 223 and 225 is for the convenience of the drawings, and the command sequences of respective rows may be transmitted continuously or intermittently. The end of the first row of the command examples in FIGS. 223 and 225 may be P (STOP condition) instead of A (Acknowledge). In that case, the head of the second row of the command in FIGS. 223 and 225 may be S (START condition) instead of Sr (REPEATED START condition). In that case, the first row of the command examples in FIGS. 223 and 225 may be omitted.

The write command in FIG. 223 is an example in which two rows of write data (WRITE DATA) are transmitted, but may be configured to allow only one row or three or more rows of the write data (WRITE DATA) to be transmitted. The read command and the read response in FIG. 225 are examples in which one row of the write data (WRITE DATA) and one row of read data (READ DATA) are transmitted, but may be configured to allow transmission of the write data (WRITE DATA) to be omitted, or may be configured to allow the third row and the fourth row of the command example in FIG. 225 may be repeatedly transmitted (although some or all of addresses or data stored in each row may be different), to thereby allow for transmission of two or more rows of the read data (READ DATA). Some or all of the write commands in FIG. 223 and some or all of the read commands and the read responses in FIG. 225 may be configured to be combined for transmission.

All of the write data (WRITE DATA) or the read data (READ DATA) may be set as an encryption OFF region, or all of the write data (WRITE DATA) or the read data (READ DATA) may be set as an encryption ON region. Some of the write data (WRITE DATA) or the read data (READ DATA) may be set as the encryption OFF region, and some or all of the remainder of the write data (WRITE DATA) or the read data (READ DATA) may be set as the encryption ON region.

For example, in a case where the CBC mode is used for encryption, it is desirable that an initialization vector value (e.g., 16 bytes) configured by random numbers to be used for the encryption in the CBC mode be transmitted in some or all of the encryption OFF region (desirably a message authentication target) prior to the encryption ON region (desirably a message authentication target). For example, the initialization vector value (e.g., 16 bytes) configured by random numbers to be used for the encryption in the CBC mode may be configured to be transmitted in some or all of the row (second row in FIG. 223 or 225) subsequent to the extended packet header (EXTENDED HEADER) to be used for the Control plane.

In that case, some or all of the WRITE DATA on the third row in FIG. 223 may be encrypted in the CBC mode, or some or all of the READ DATA on the fourth row in FIG. 223 may be encrypted. In this case, a CCI Master side transmits the initialization vector value, and thus the CCI Master side needs to generate a random number for the initialization vector. Meanwhile, a CCI Slave side (e.g., image sensor) does not need to generate a random number for the initialization vector.

However, the initialization vector value (e.g., 16 bytes) configured by random numbers to be used for the encryption in the CBC mode may be configured to be stored in the READ DATA for transmission. In that case, the CCI Slave side (e.g., image sensor) needs to generate a random number for the initialization vector. Encryption in a mode other than the CBC mode does not require transmission of the initialization vector value configured by random numbers. Definition or specification of the encryption OFF region and the encryption ON region may be made by the extended packet header to be used for the Control plane or the Data plane. In addition, the definition or specification of the encryption OFF region and the encryption ON region may be made by the pre-agreement (Private contract) between the communication host and the communication device. This allows for selection of a suitable format depending on an implemented algorithm selected from among multiple algorithm options. For example, in a case where a portion or all of algorithm information transmitted by the Vendor defined SPDM message is information related to the CBC mode, the Control plane host or the Control plane device is able to determine that data received in the Control plane session on or after the reception of the algorithm information has been encrypted in the CBC mode. That is, in response to algorithmic information transmitted by the Vendor defined SPDM message, the Control plane host or the Control plane device may determine whether or not to transmit the initialization vector value configured by random numbers to be used for the encryption in the CBC mode to switch circuits or processing, or may determine whether or not the initialization vector value configured by random numbers has been transmitted to switch circuits or processing. In response to the definition or specification by the extended packet header (e.g., the Service Descriptor) to be used for the Control plane, the Control plane host or the Control plane device may determine whether or not to transmit the initialization vector value configured by random numbers to be used for the encryption in the CBC mode to switch circuits or processing, or may determine whether or not the initialization vector value configured by random numbers has been transmitted to switch circuits or processing. However, the definition or specification by the extended packet header to be used for the Control plane may be the presence or absence (ON/OFF) of the security feature, the presence or absence (ON/OFF) of the encryption, the presence or absence (ON/OFF) of the CBC mode, the presence or absence (ON/OFF) of transmission of random numbers, the presence or absence (ON/OFF) of transmission of the initialization vector, or the like. Although the description has been given of the case where messages (data) of the Control plane session is encrypted, some or all thereof may also be applied to a case where the Vendor defined SPDM message (data) is encrypted; for example, some or all of expressions including the Control plane of a content described as the Control plane may be replaced by expressions including the SPDM. Some or all of the contents described as the Control plane may be applied to the Data plane in one case, and some or all of the contents described as the Data plane may be applied to the Control plane in the other case. Therefore, some or all of the expressions including the Control plane of the contents described as the Control plane may be replaced by expressions including the Data plane, and some or all of the expressions including the Data plane of the contents described as the Data plane may be replaced by expressions including the Control plane. As for REG ADDRESS (register address) in FIG. 223 or 225, some of the REG ADDRESS and others of the REG ADDRESS may be the same in the address, or some of the REG ADDRESS and others of the REG ADDRESS may be different in the address.

The extended packet header to be used in the Control plane may be referred to as an expression including a portion or all of ESS CCI Service Descriptor. The extended packet header to be used in the Control plane may store definitions corresponding to a portion of the Security Descriptor or a portion of the Service Descriptor. The extended packet header to be used in the Control plane may be defined not only to be of a total of 1 byte as illustrated but also to be of a total of 2 bytes or more.

The extended packet header (e.g., extended header, EXTENDED HEADER) to be used for the Control plane may specify whether the currently used session key (a new session key or the like may be employed, as a matter of course) or the session key to be used subsequently is an Even key or an Odd key. That is, the extended packet header to be used in the Control plane may include information related to the session key, or may include information related to whether the session key is the Even key or the Odd key. In response to the specification of the extended packet header to be used for the Control plane, the Even key or the Odd key may be discarded or overwritten.

The message counters to be used for the Control plane such as ESS CCI (Enhanced Safety and Security Camera Control Interface) or ACMP (A-PHY Control & Management Protocol) may be configured to increase the byte count, with 0 byte or 1 byte set as a default value. The message counter to be used for the Control plane may be able to transmit 1 byte in a case of only adapting to the functional safety, or may be able to transmit 1 byte or more in a case of adapting to the security. It is sufficient for the session key used for the Control plane to be updated until the message counter for the Control plane is cycled.

In FIG. 223 or 225, some or all of the messages transmitted in a period of time from the START condition to MAC value n−1 [7:0] are to be message authentication targets (messages that are subject to MAC calculation and are to be protected by the message authentication). FIG. 223 or 225 is an example of transmission of all of the message counters to be used for the Control plane. However, all of the message counters to be used for the Control plane may be configured to be subject to message authentication of the CMAC or the HMAC (or GMAC or GCM) to transmit a portion (not to transmit a portion) of the message counters to be used for the Control plane. That is, the message counter to be used in the Control plane may be configured by, for example, an 8-bit (1-byte) Control plane message counter and a Control plane additional message counter that varies (e.g., increments or decrements) in response to the Control plane message counter. At this time, the value of the Control plane message counter and the value of the Control plane addition message counter may be a portion of the message authentication target of the CMAC or the HMAC (or GMAC or GCM). Further, the value of the Control plane message counter is transmitted by the Control plane session, but the value of the Control plane additional message counter may be configured not to be transmitted by the Control plane session (i.e., to be an implicit message).

For example, the Control plane message counter may be on an LSB (Least Significant Bit) side of the message counter to be used for the Control plane, and the Control plane additional message counter may be on an MSB (Most Significant Bit) side of the message counter to be used for the Control plane. The LSB side and the MSB side may be reversed. Likewise, the message counter to be used in the Data plane is configured by, for example, a 16-bit Data plane message counter and a Data plane additional message counter that varies (e.g., increments or decrements) in response to the Data plane message counter. At this time, the value of the Data plane message counter and the value of the Data plane addition message counter may be a portion of the message authentication target of the CMAC or the HMAC (or GMAC or GCM). Further, the value of the Data plane message counter is transmitted by the Data plane session, but the value of the Data plane additional message counter may be configured not to be transmitted by the Data plane session (i.e., to be an implicit message).

For example, the Data plane message counter may be on the LSB (Least Significant Bit) side of the message counter to be used for the Data plane, and the Data plane additional message counter may be on the MSB (Most Significant Bit) side of the message counter to be used for the Data plane. The LSB side and the MSB side may be reversed. Calculation may be made on an MAC value of a message authentication target that is configured by an explicit message and an implicit message, in which an implicit message is inserted in the middle of the Control plane message or the Data plane message, that is an explicit message to be transmitted or having been transmitted. It is to be noted that the above term “middle” refers to, for example, a location before or after the Control plane message counter or the Data plane message counter. The above term “implicit message” refers to, for example, a value of the Control plane addition message counter or the Data plane addition message counter.

Calculation may be made on an MAC value of a message authentication target that is configured by an explicit message and an implicit message, in which an implicit message is inserted in a location before or after the Control plane message or the Data plane message, that is an explicit message to be transmitted or having been transmitted. Also in these cases, a countermeasure is taken against the replay attack. It is to be noted that the above phrase “before or after the Control plane message or the Data plane message” refers to, for example, a location immediately before the explicit message or a location between the explicit message and the MAC value n−1 [7:0] message or an ePF1 message. The above term “implicit message” refers to, for example, a value of the Control plane addition message counter or the Data plane addition message counter.

As described above, in the CMAC or the HMAC, it is desirable to include the value of the additional message counter in the message authentication target for the countermeasure against the replay attack. However, in the GMAC or the GCM, it is not necessary to include the value of the additional message counter in the message authentication target; in the GMAC or the GCM, it is desirable to include the value of the additional message counter in the initialization vector. Therefore, in a case where MAC algorithm is the CMAC or the HMAC, some or all of the values of the additional message counter are included as the message authentication target. In a case where the MAC algorithm is the GMAC or the GCM, the presence of a protection section configured to allow some or all of the additional message counter values to be included at least in the initialization vector makes it possible to adapt to the MAC algorithm such as the CMAC, the HMAC, the GMAC, and the GCM, only with the minimum of one additional message counter (without providing multiple additional message counters).

The variable message counter (Variable message counter) may be a fixed message counter (extended message counter). The description has been given of the replay attack countermeasure by the variable message counter. In a case of the fixed message counter, it may be interpreted as a replay attack countermeasure by the additional message counter.

A CCI-MAC tag length may be 12 bytes. For example, in Field of CCI_MAC, definitions may be made as follows: 0b000: CCI-MAC tag length is 04 bytes; 0b001: CCI-MAC tag length is 08 bytes; and 0b010: CCI-MAC tag length is 12 bytes.

It is assumed that the initialization vector of random numbers is used for message authentication or encryption (or decryption) in the SPDM session, the Control plane session, or the Data plane session. In this case, the initialization vector may be transmitted, for example, by the Vendor defined SPDM message (e.g., the VENDOR_DEFINED_REQUEST request message or the VENDOR_DEFINED_RESPONSE response message).

Some or all of the messages described as the message transmitted by the Vendor defined SPDM message, the VENDOR_DEFINED_REQUEST request, or the VENDOR_DEFINED_RESPONSE response may be transmitted as Secured Message in compliance with DSP0277 (Secured Messages using SPDM) specification issued by the DMTF. In addition, the some or all of the messages may be transmitted as Vendor defined Secured Message (in compliance with or in non-compliance with DSP0277 specification) of which some or all of the DSP0277 specification are changed by a standardization organization other than the DMTF (e.g., MIPI alliance) or by Vendor. At this time, the phrase “a portion or all of the messages”, as this Secured Message, may be interpreted as the Vendor defined SPDM message, the VENDOR_DEFINED_REQUEST request, or the VENDOR_DEFINED_RESPONSE response. Some or all of the messages described as the message transmitted by the Vendor defined SPDM message, the VENDOR_DEFINED_REQUEST request, or the VENDOR_DEFINE- D_RESPONSE response may be transmitted not in the SPDM session, but in a protected Control plane session. The Secured Message in compliance with the DSP0277 specification is a format adapted to an AEAD algorithm such as AES-128-GCM, AES-256-GCM, or CHACHA20_POLY1305. The Secured Message in compliance with the DSP0277 specification does not adapt to a combination of the MAC algorithm (e.g., GMAC, CMAC, or HMAC) and an encryption algorithm (e.g., CTR mode or CBC mode). Therefore, some or all of the DSP0277 specification may be changed to adapt to the combination of the MAC algorithm and the encryption algorithm. The Secured Message format is configured in the order of Session ID (4 Bytes), Sequence Number (Variable), Length (2 Bytes), Application Data Length (2 bytes), Application Data (Variable Bytes), Random Data (Variable Bytes), and Message Authentication Code (MAC value Length). The Session ID, the Sequence Number, and the Length are each a message authentication target (MAC Coverage), a clear text (Clear Text), and a header. The application Data Length is a message authentication target, an encryption target (Encrypted Data), and a header. The application Data and the Random Data are each a message authentication target and an encryption target. A vendor-specific region (Vendor specific), a vendor-defined region (Vendor Defined), a user-defined region (User Defined), a reserved region (Reserved for future use), or the like may be added to the regions of the message authentication target, the clear text, and the header. The value of the initialization vector configured by random numbers to be used for the encryption in the CBC mode is stored to enable transmission. The Secured Message format is provided with any of additional regions to be a format to adapt to the CBC mode. In response to the SPDM session-oriented algorithm selected between the SPDM requester and the SPDM responder, the SPDM requester or the SPDM responder may switch the corresponding Secured Message format or may change a portion or all of the corresponding Secured Message format by the NEGOTIATE_ALGORITHMS request, the ALGORITHMS response, and the like, for example. In response to the SPDM session-oriented algorithm selected between the SPDM requester and the SPDM responder, the SPDM requester or the SPDM responder may determine whether or not to transmit the value of the initialization vector configured by random numbers to be used for the encryption in the CBC mode to switch circuits or processing, or may determine whether or not the value of the initialization vector configured by random numbers has been transmitted to switch circuits or processing, for example, by the NEGOTIATE_ALGORITHMS request and the ALGORITHMS response.

The initialization vector configuration may include a vendor-specific (Vendor specific) or vendor-defined (Vendor defined) bit region. Some or all of the initialization vector configurations described above with reference to FIG. 96, 102, 107, or 113, or (B) of FIG. 218 may be assigned to the vendor-specific region or the vendor-defined region of the initialization vector configuration. For example, the vendor-specific region or the vendor-defined region of the initialization vector configuration may include the extended virtual channel eVC or the virtual channel VC.

Each of the encryption key and the MAC key, which differs from each other, may be transmitted by the Vendor defined SPDM message, or the like. In addition, each of the encryption key and the MAC key, which differs from each other, may be derived from one session key or session secret that is transmitted or is to be transmitted by the Vendor defined SPDM message, or the like.

In Special Publication 800-108 (Recommendation for Key Derivation Using Pseudorandom Functions) issued by National Institute of Standards and Technology, KDF (Key Derivation Function) using the HMAC and the KDF using the CMAC are defined. In the SPDM key schedule described above, a key schedule is configured on the basis of the KDF using the HMAC. The key schedule configured on the basis of the KDF using the CMAC may be applied instead of the SPDM key schedule described above (which, however, may be in compliance with the SPDM, or may be in non-compliance with the SPDM). In a case where the following items (1) to (4) are applied, the system configured by these items is configured only by AES, and is particularly suitable for Resource constrained sensor. However, the GCM, the GMAC, or the HMAC may be applied instead of some or all thereof. In addition, some or all of these encryption functions may be omitted (only message authentication function). The CTR mode is advantageous in that the CTR mode has less communication overhead and can be faster than the CBC mode, and the CBC mode is advantageous in that the CBC mode is easier to manage the initialization vector than the CTR mode. Therefore, a combination of the block cipher CBC mode and the CMAC is particularly suitable for the Control plane session of the Individual mode, in some cases; a combination of the block cipher CTR mode and the CMAC is particularly suitable for the Control plane session of the Running mode, in some cases; and a combination of the block cipher CTR mode and the CMAC is particularly suitable for the Data plane session, in some cases. A portion or all of the security arithmetic part to which the cryptographic algorithms (encryption algorithm, message authentication algorithm, or AEAD algorithm), some or all of which are the same, are applied may be shared between the SPDM session and the Control plane session. The same applies to the SPDM session and the Data plane session, and the same applies to the Control plane session and the Data plane session; the SPDM session and the Control plane session can be configured to include the same protocol (e.g., CCI) partially or entirely, and are particularly easy to share.

(1) Key schedule configured on the basis of the KDF using CMAC in the SPDM key schedule (2) A combination of any of the block cipher CBC mode or the block cipher CTR mode and the CMAC for the SPDM session (3 A combination of any of the block cipher CBC mode or the block cipher CTR mode and the CMAC for the Control plane session (4) A combination of any of the block cipher CBC mode or the block cipher CTR mode and the CMAC for the Data plane session <Example of Replay Attack Countermeasure>

Next, description is given of an example of the replay attack countermeasure.

For example, the initialization vector IV which is unique for a sufficiently long time to be used for GMC, CCM, or GMAC can be a replay attack countermeasure (in a thick frame in FIG. 226). FIG. 227 illustrates an example of application of the GMAC and the GCM to the Data plane. FIG. 228 is a diagram describing terms in FIG. 227. A message counter MC is included in the extended packet header ePH provided for each line of image data, and a value incremented by one from the initialization vector value IV beyond a period during which the message count value MC is cycled (one frame period) is used as a Line-MAC value. The Line-MAC value is provided between a packet footer and line data such as image data in each line. In this manner, it is possible to eliminate the possibility of the replay attack.

For example, the initialization vector IV which is unique for a sufficiently long time to be used for the GMC, the CCM, or the GMAC can be a replay attack countermeasure (in a thick frame in FIG. 229). FIG. 230 illustrates an example of application of the GMAC and the GCM to the Data plane. A value incremented by one from the initialization vector value IV for each frame of the image data is used as a Frame-MAC value. The Frame-MAC value is provided in the packet footer PF in each frame.

For example, the Frame-MAC to be used for the CMAC, the HMAC or the GMAC can be a replay attack countermeasure (in a thick frame in FIG. 231). FIG. 231 illustrates an example of application of the CMAC to the Data plane. FIG. 232 illustrates an example of application of the CMAC and the CTR mode to the Data plane. The CMAC can be replaced by the HMAC or the GMAC. FIG. 233 is a diagram describing terms in FIG. 232. One or multiple pieces of embedded data (embedded data) are provided for each frame of the image data, and a nonce value included in the embedded data is provided as the Frame-MAC value (CMAC) included in the message authentication target. The embedded data is provided, for example, between the image data and the frame start or between the image data and the frame end.

The embedded data may include the additional frame number, and may include some or all of count values or random numbers that vary for each frame; that is, the embedded data may include some or all of the nonce values. In a case where one of the CBC mode or CTR mode is combined with the GMAC, the HMAC or the CMAC, as compared with the GCM or the CCM, it is possible to freely turn ON/OFF the encryption using the extended packet header (e.g., Service Descriptor). The encryption in the CTR mode is desirably used in combination with the MAC algorithm such as the GMAC, the HMAC or the CMAC, because an intended bit can be flipped (ciphertext bit inversion attack) unless the encryption is combined with the message authentication by the MAC algorithm such as the GMAC, the HMAC or the GMAC. The encryption in the CBC mode is more resistant to the ciphertext bit inversion attack than encryption in the CTR mode but is not perfect. In order to detect falsification, it is desirable that the encryption in the CBC mode be used in combination with the message authentication by the MAC algorithm such as the GMAC, the HMAC or the CMAC. SA1 and SA2 in FIG. 227, 230, or 232 are defined as the same SA or SA of the same number; a flag (bit flag) in the extended packet header (e.g., Service Descriptor) may be used to switch ON/OFF of the encryption. The calculation, transmission, or reception of the MAC value may be performed in the unit of multiple lines, rather than in the unit of a line exemplified in FIG. 227 or the unit of a frame exemplified in FIGS. 230 and 232. As for the image data or the embedded data, a portion thereof, rather than all thereof, may be the message authentication target.

In the case of the GCM or the CCM, the order of "target region only for message authentication→target region for message authentication and encryption→MAC storage region" needs to be satisfied. Therefore, as for the GCM or the CCM, only the image data (1 mg Data) is set as the target region for the message authentication and the encryption, and the extended packet header cannot be set as the target region only for the message authentication. Meanwhile, combining one of the block cipher CBC mode or the block cipher CTR mode (encryption) and one of the GMAC, the HMAC or the CMAC (message authentication) enables only the image data (Img Data) to be set as the target region for the message authentication and the encryption and enables the extended packet header to be set as the target region only for the message authentication. Likewise, it is possible to set only optional data, rather than the image data, to be set as the target region for the message authentication and the encryption and to set another optional data to be set as the target region only for the message authentication; that is, Partial encryption is possible.

(Control Plane Session)

FIGS. 234, 235, 236, and 237 each illustrate a flowchart example of the Control plane session in the communication system 3100. The flow in FIG. 235 is a flow subsequent to that in FIG. 234.

First, the communication system 3100 establishes an SPDM session between the communication control section 3110*a* and the communication control section 3110*c*, the bridge one end 3110*b*, the sensor section 3120*a*, or the bridge another end 3120*b* (steps S3101, 3201, and 3301). Next, the communication control section 3110*a* generates a session key (step S3102).

Next, the communication control section 3110*a* transmits a Control plane session start request to the communication control section 3110*c* or the bridge one end 3110*b* by the VENDOR_DEFINED_REQUEST request message or the write command. The communication control section 3110*c* or the bridge one end 3110*b* receives the Control plane session start request (step S3203; Y). Then, in response to the Control plane session start request, the communication control section 3110*c* or the bridge one end 3110*b* may transmit a Control plane session start response to the communication control section 3110*a* by the VENDOR_DEFINED_RESPONSE response message, the ERROR response message, or the read response. However, the transmission and the reception of the Control plane session start request may be omitted, for example, by interpreting the completion of reception of the algorithmic information, the other parameter information, and the Control plane session key (MAC key or encryption key) or the completion of reception of the Control plane session key (MAC key or encryption key), as the Control plane session start request.

The communication control section 3110*a* may first transmit the algorithmic information, the other parameter information, and the Control plane session key to the sensor section 3120*a* or the bridge another end 3120*b* which is the Control plane device, and then may transmit the algorithmic information, the other parameter information, and the Control plane session key to the communication control section 3110*c* or the bridge one end 3110*b* which is the Control plane host (steps S3103 and S3104). In this case, the sensor section 3120*a* or the bridge another end 3120*b* receives the algorithmic information, the other parameter information, and the Control plane session key from the communication control section 3110*a* (step S3302; Y). In addition, the communication control section 3110*c* or the bridge one end 3110*b* receives the algorithmic information, the other parameter information, and the Control plane session key from the communication control section 3110*a* (step S3202; Y). As a result, the communication control section 3110*c* or the bridge one end 3110*b* is able to start the Control plane session (using the Control plane session key) without taking care of whether or not the sensor section 3120*a* or the bridge another end 3120*b* already has the same Control plane session key (step S3204). It is to be noted that the communication control section 3110*c* or the bridge one end 3110*b* may interpret the completion of reception of the algorithmic information, the other parameter information, and the Control plane session key or the completion of reception of the Control plane session key (MAC key or encryption key), for example, as the Control plane session start request (step S3203).

Meanwhile, the sensor section 3120*a* or the bridge another end 3120*b* receives the algorithmic information, the other parameter information, and the Control plane session key from the communication control section 3110*a*, and thereafter is able to start the Control plane session (using the Control plane session key) without taking care of whether or not the communication control section 3110*c* or the bridge one end 3110*b* already has the same Control plane session key (step S3304). It is to be noted that the sensor section 3120*a* or the bridge another end 3120*b* may receive the CCI extended header (EXTENDED HEADER) from the communication control section 3110*a* and then start the Control plane session (using the Control plane session key) (steps S3303; Y). In this case, the sensor section 3120*a* or the bridge another end 3120*b* may set the byte width or the bit width of the CCI message counter.

Conversely, the communication control section 3110*a* may first transmit the Control plane session key to the communication control section 3110*c* or the bridge one end 3110*b* which is the Control plane host, and then transmit the Control plane session key to the sensor section 3120*a* or the bridge another end 3120*b* which is the Control plane device. In this case, the communication control section 3110*a* transmits the Control plane session start request to the communication control section 3110*c* or the bridge one end 3110*b*, thereby enabling the communication control section 3110*c* or the bridge one end 3110*b* to determine that the sensor section 3120*a* or the bridge another end 3120*b* already has the same Control plane session key. As a result, the communication control section 3110*c* or the bridge one end 3110*b* is able to start the Control plane session (using the Control plane session key) (step S3204).

It is to be noted that, although omitted in the flowchart, the communication control section 3110*c* or the bridge one end 3110*b* transmits the write command or the read command protected by the Control plane session key at an appropriate timing. Further, the sensor section 3120*a* or the bridge another end 3120*b* transmits the read response protected by the Control plane session key at an appropriate timing.

The communication control section 3110*a* may hold multiple Control plane session keys (MAC keys or encryption keys). The "transmission of the algorithm information, the other parameter information, and the session key" and the "transmission of the session key" refer to, for example, transmission by the Vendor defined SPDM message (e.g., VENDOR_DEFINED_REQUEST request message or VENDOR_DEFINED_RESPONSE response message). The communication control section 3110*a* transmits the algorithmic information, the other parameter information, or the Control plane session key by the VENDOR_DEFINED_REQUEST request message. In a case where the communication control section 3110*a* transmits the VENDOR_DEFINED_REQUEST request message, the processing may proceed to the next step in response to reception of the VENDOR_DEFINED_RESPONSE response message indicating that the request message has been normally received or processed by the communication control section 3110*c*, the bridge one end 3110*b*, the bridge another end 3120*b*, or the sensor section 3120*a*.

In addition, for example, it is assumed that the communication control section 3110*a* receives the VENDOR_DEFINED_RESPONSE response message or the ERROR response message indicating that the request message has not been normally received or processed by the communication control section 3110*c*, the bridge one end 3110*b*, the bridge another end 3120*b*, or the sensor section 3120*a*. In this case, for example, the communication control section 3110*a* may retransmit the VENDOR_DEFINED_REQUEST request message as needed, and may transmit the same Control plane session key or a regenerated different Control plane session key.

Meanwhile, in a case where the VENDOR_DEFINED_REQUEST request message is normally received or processed, the communication control section 3110*c*, the bridge one end 3110*b*, the bridge another end 3120*b*, or the sensor section 3120*a* may transmit the VENDOR_DEFINED_RESPONSE response message indicating that the request message has been normally received or processed, and then the processing may proceed to the next step. In addition, in a case where the VENDOR_DEFINED_REQUEST request message is not normally received or processed, the communication control section 3110*c*, the bridge one end 3110*b*, the bridge another end 3120*b*, or the sensor section 3120*a* may transmit the VENDOR_DEFINED_RESPONSE response message or the ERROR response message indicating to that effect, or may request the SSMC to retransmit the VENDOR_DEFINED_REQUEST request message. In addition, also in a case where the processing of the request message is not completed within a predetermined period of time, the communication control section 3110*c*, the bridge one end 3110*b*, the bridge another end 3120*b*, or the sensor section 3120*a* may transmit the VENDOR_DEFINED_RESPONSE response message or the ERROR response message indicating to that effect, or may request the SSMC to retransmit the VENDOR_DEFINED_REQUEST request message.

The communication control section 3110*a* grasps whether or not the Control plane session key used by the communication control section 3110*c* or the bridge one end 3110*b* and the bridge another end 3120*b* or the sensor section 3120*a* needs to be updated. Therefore, the communication control section 3110*a* periodically transmits a Control plane session key confirmation request to the communication control section 3110*c* or the bridge one end 3110*b* by the VENDOR_DEFINED_REQUEST request message (step S3106).

The communication control section 3110*c* or the bridge one end 3110*b* receives the Control plane session key confirmation request from the communication control section 3110*a* (step S3205; Y). Then, in response to the Control plane session key confirmation request, the communication control section 3110*c* or the bridge one end 3110*b* transmits a Control plane session key confirmation response to the communication control section 3110*a* by the VENDOR_DEFINED_RESPONSE response message or the ERROR response message (step S3208). Here, the Control plane session key confirmation response includes information indicating whether or not the Control plane session key used by the communication control section 3110*c* or the bridge one end 3110*b* and the bridge another end 3120*b* or the sensor section 3120*a* needs to be updated, information indicating the number of times of use of the Control plane session key (e.g., the number of times of calculation of the MAC value), or the like.

It is assumed that, when the communication control section 3110*c* or the bridge one end 3110*b* receives the Control plane session key confirmation request by the VENDOR_DEFINED_REQUEST request message, the communication control section 3110*c* or the bridge one end 3110*b* is using the Control plane session key. At this time, the communication control section 3110*c* or the bridge one end 3110*b* may request the communication control section

3110*a* to retransmit the Control plane session key confirmation request by transmission of the VENDOR_DEFINED_RESPONSE response message or the ERROR response message.

It is assumed that the communication control section 3110*c* or the bridge one end 3110*b* desires to update the Control plane session key. In this case, the communication control section 3110*c* or the bridge one end 3110*b* desirably requests the communication control section 3110*a* to transmit the Control plane session key at a timing (e.g., after completing the calculation of the MAC value and finishing the use of the Control plane session key) when the communication control section 3110*c* or the bridge one end 3110*b* do not use the Control plane session key (step S3207). At this time, the communication control section 3110*c* or the bridge one end 3110*b* is able to perform, on the communication control section 3110*a*, a transmission request of the Control plane session key (e.g., Control plane session key confirmation response) by the VENDOR_DEFINED_RESPONSE response message or the ERROR response message (step S3208).

The communication control section 3110*a* receives the transmission request of the Control plane session key (e.g., Control plane session key confirmation response) (step S3111). Then, the communication control section 3110*a* generates a new Control plane session key in a case where the Control plane session needs to be updated (step S3112; Y, S3113). The communication control section 3110*a* transmits the newly generated Control plane session key to the sensor section 3120*a*, the bridge another end 3120*b*, the communication control section 3110*c*, or the bridge one end 3110*b* (step S3114 and S3115). Thereafter, the communication control section 3110*a* transmits the Control plane Session start request to the communication control section 3110*c* or the bridge one end 3110*b* (step S3116).

The communication control section 3110*c* or the bridge one end 3110*b* receives the Control plane session key from the communication control section 3110*a* as a response of the transmission request of the Control plane session key (e.g., Control plane session key confirmation response) (step S3209; Y). When receiving the Control plane session key, the communication control section 3110*c* or the bridge one end 3110*b* updates the Control plane session key (step S3210).

The sensor section 3120*a* or the bridge another end 3120*b* receives the Control plane session key from the communication control section 3110*a* (step S3305; Y). When receiving the Control plane session key, the sensor section 3120*a* or the bridge another end 3120*b* updates the Control plane session key (step S3306).

The communication control section 3110*a* may transmit, to the communication control section 3110*c* or the bridge one end 3110*b*, a Control plane session finish request requesting the end of the Control plane session by the VENDOR_DEFINED_REQUEST request message (step S3108). At this time, the communication control section 3110*c* or the bridge one end 3110*b* may transmit, to the communication control section 3110*a*, the Control plane session finish response responding as to whether or not to finish the Control plane session by the VENDOR_DEFINED_RESPONSE response message or the ERROR response message in response to the Control plane session finish request.

The communication control section 3110*a* may further transmit the Control plane session finish request to the sensor section 3120*a* or the bridge another end 3120*b* by the VENDOR_DEFINED_REQUEST request message (step S3109). At this time, the sensor section 3120*a* or the bridge another end 3120*b* may transmit, to the communication control section 3110*a*, the Control plane session finish response responding as to whether or not to finish the Control plane session by the VENDOR_DEFINED_RESPONSE response message or the ERROR response message in response to the Control plane session finish request.

In a case of finishing the Control plane session, the communication control section 3110*a* first transmits the Control plane session finish request to the communication control section 3110*c* or the bridge one end 3110*b* which is the Control plane host. Then, the communication control section 3110*a* causes the communication control section 3110*c* or the bridge one end 3110*b* to finish using the Control plane session key. Thereafter, the communication control section 3110*a* transmits the Control plane session finish request to the sensor section 3120*a* or the bridge another end 3120*b* which is the Control plane device. Then, the communication control section 3110*a* causes the sensor section 3120*a* or the bridge another end 3120*b* to finish using the Control plane session key. In the case of this order, the session is finished immediately or safely.

The communication control section 3110*a*, the communication control section 3110*c*, the bridge one end 3110*b*, the sensor section 3120*a*, or the bridge another end 3120*b* discards or cleans up the Control plane session key when finishing the session (steps S3110, S3213, and S3309). In this manner, the Control plane session in the communication system 3100 is executed.

(Data Plane Session)

FIGS. 238, 239, 240, and 241 each illustrate an example of a flowchart of the Data plane session in the communication system 3100. The flow in FIG. 239 is a flow subsequent to FIG. 238.

First, the communication system 3100 establishes an SPDM session between the communication control section 3110*a* and the communication control section 3110*c*, the bridge one end 3110*b*, the sensor section 3120*a*, or the bridge another end 3120*b* (steps S3401, 3501, and 3601). Next, the communication control section 3110*a* generates an Even key and an Odd key (step S3402).

Next, the communication system 3100 transmits a Data plane session start request to the sensor section 3120*a* or the bridge another end 3120*b* by the VENDOR_DEFINED_REQUEST request message or the write command (step S3405). The sensor section 3120*a* or the bridge another end 3120*b* receives the Data plane session start request (step S3603; Y). Then, the sensor section 3120*a* or the bridge another end 3120*b* may transmit a Data plane session start response to the communication control section 3110*a* by the VENDOR_DEFINED_RESPONSE response message, the ERROR response message, or the read response in response to the Data plane session start request.

However, the Data plane session start request may be an image data transmission start request or a high-speed data transmission start request. In addition, the transmission and the reception of the Data plane session start request may be omitted, for example, by interpreting the completion of reception of "the algorithmic information, the other parameter information, and the Even key and the Odd key" as the Data plane session start request. The "generation of Odd key", "transmission of Odd key", and "reception of Odd key" immediately after the establishment of the SPDM session may be omitted.

The Even key is the Data plane session key, and is at least one of the encryption key or the MAC key. Likewise, the Odd key is the Data plane session key, and is at least one of the encryption key or the MAC key. The expressions of the Even key and the Odd key in the flowchart may be reversal of the Even key/Odd key. The Even key or the Odd key may be referred to as one of Key 0, Key 1, Key 2, Key 3, or Key 4.

The communication control section 3110*a* first transmits the algorithmic information, the other parameter information, and the Data plane session key to the communication control section 3110*c* or the bridge one end 3110*b* which is the Data plane host (step S3403). Thereafter, the communication control section 3110*a* transmits the algorithmic information, the other parameter information, and the Data plane session key to the sensor section 3120*a* or the bridge another end 3120*b* which is the Data plane device (step S3404). In this case, the sensor section 3120*a* or the bridge another end 3120*b* receives the algorithmic information, the other parameter information, and the Data plane session key from the communication control section 3110*a* (step S3602; Y). In addition, the communication control section 3110*c* or the bridge one end 3110*b* receives the algorithmic information, the other parameter information, and the Data plane session key from the communication control section 3110*a* (step S3502; Y). As a result, the sensor section 3120*a* or the bridge another end 3120*b* is able to start the Data plane session (using the Data plane session key (Even key in the flowchart)) without taking care of whether or not the communication control section 3110*c* or the bridge one end 3110*b* already has the same Data plane session key (step S3605)).

Conversely, the communication control section 3110*a* may first transmit the Data plane session key to the sensor section 3120*a* or the bridge another end 3120*b* which is the Data plane device, and then transmit the Data plane session key to the communication control section 3110*c* or the bridge one end 3110*b* which is the Data plane host. In this case, the communication control section 3110*a* transmits the Data plane session start request to the sensor section 3120*a* or the bridge another end 3120*b* to thereby enable the sensor section 3120*a* or the bridge another end 3120*b* to determine that the communication control section 3110*c* or the bridge one end 3110*b* already has the same Data plane session key. As a result, the sensor section 3120*a* or the bridge another end 3120*b* is able to start the Data plane session (using the Data plane session key (Even key in the flowchart)) (step S3605).

It is to be noted that, although omitted in the flowchart, the sensor section 3120*a* or the bridge another end 3120*b* transmits the extended packet (e.g., the frame start, the embedded data, the image data, the user-defined data, or the frame end) protected by the Even key or the Odd key at an appropriate timing.

The communication control section 3110*a* may hold multiple Even keys and multiple Odd keys. The “transmission of the algorithm information, the other parameter information, the Even key, and the Odd key”, the “transmission of the Even key” and the “transmission of the Odd key” refer to, for example, transmission by the Vendor defined SPDM message (e.g., VENDOR_DEFINED_REQUEST request message or VENDOR_DEFINED_RESPONSE response message). The communication control section 3110*a* transmits the algorithmic information, the other parameter information, or the Data plane session key by the VENDOR_DEFINED_REQUEST request message. In a case where the communication control section 3110*a* transmits the VENDOR_DEFINED_REQUEST request message, the processing may proceed to the next step in response to reception of the VENDOR_DEFINED_RESPONSE response message indicating that the request message has been normally received or processed by the communication control section 3110*c*, the bridge one end 3110*b*, the bridge another end 3120*b*, or the sensor section 3120*a*.

In addition, for example, it is assumed that the communication control section 3110*a* receives the VENDOR_DEFINED_RESPONSE response message or the ERROR response message indicating that the request message has not been normally received or processed by the communication control section 3110*c*, the bridge one end 3110*b*, the bridge another end 3120*b*, or the sensor section 3120*a*. In this case, for example, the communication control section 3110*a* may retransmit the VENDOR_DEFINED_REQUEST request message as needed, and may transmit the same Data plane session key or a regenerated different Data plane session key.

Meanwhile, in a case where the VENDOR_DEFINED_REQUEST request message is normally received or processed, the communication control section 3110*c*, the bridge one end 3110*b*, the bridge another end 3120*b*, or the sensor section 3120*a* may transmit the VENDOR_DEFINED_RESPONSE response message indicating that the request message has been normally received or processed, and then the processing may proceed to the next step. In addition, in a case where the VENDOR_DEFINED_REQUEST request message is not normally received or processed, the communication control section 3110*c*, the bridge one end 3110*b*, the bridge another end 3120*b*, or the sensor section 3120*a* may transmit the VENDOR_DEFINED_RESPONSE response message or the ERROR response message indicating to that effect, or may request the SSMC to retransmit the VENDOR_DEFINED_REQUEST request message. In addition, in a case where the processing of the request message is not completed within a predetermined period of time, the communication control section 3110*c*, the bridge one end 3110*b*, the bridge another end 3120*b*, or the sensor section 3120*a* may transmit the VENDOR_DEFINED_RESPONSE response message or the ERROR response message indicating to that effect, or may request the SSMC to retransmit the VENDOR_DEFINED_REQUEST request message.

The communication control section 3110*a* grasps whether the Data plane session key used by the communication control section 3110*c* or the bridge one end 3110*b* is the Even key or the Odd key, by the VENDOR_DEFINED_REQUEST request message. Therefore, the communication control section 3110*a* periodically transmits a Data plane session key confirmation request to the communication control section 3110*c* or the bridge one end 3110*b* (steps S3406 and S3413).

The communication control section 3110*c* or the bridge one end 3110*b* receives the Data plane session key confirmation request from the communication control section 3110*a* (steps S3510 and S3514; Y). Then, in response to the Data plane session key confirmation request, the communication control section 3110*c* or the bridge one end 3110*b* transmits a Data plane session key confirmation response to the communication control section 3110*a* by the VENDOR_DEFINED_RESPONSE response message or the ERROR response message (steps S3511 and S3515). Here, the Data plane session key confirmation response includes information indicating whether or not the Data plane session key used in the communication control section 3110*c* or the bridge one end 3110*b* is the Even key or the Odd key.

It is to be noted that the Data plane session key confirmation request is desirably transmitted periodically for every one frame or for every multiple frames, and the Data plane session key confirmation response is desirably transmitted in the frame blanking period or the line blanking period.

The communication control section 3110*a* receives the Data plane session key confirmation response from the communication control section 3110*c* or the bridge one end 3110*b* (steps S3408 and S3415). In a case where the Data plane session key confirmation response includes information indicating that the Data plane session key is the Odd key, the communication control section 3110*a* generates the Even key (step S3410). The communication control section 3110*a* transmits the generated Even key to the communication control section 3110*c*, the bridge one end 3110*b*, the bridge another end 3120*b*, or the sensor section 3120*a* (steps S3411 and S3412). In a case where the Data plane session key confirmation response includes information indicating that the Data plane session key is the Even key, the communication control section 3110*a* generates the Odd key (step S3417). The communication control section 3110*a* transmits the generated Odd key to the communication control section 3110*c*, the bridge one end 3110*b*, the bridge another end 3120*b*, or the sensor section 3120*a* (steps S3418 and S3419).

The communication control section 3110*c*, the bridge one end 3110*b*, the bridge another end 3120*b*, or the sensor section 3120*a* receives the Even key from the communication control section 3110*a* (step S3504; Y and S3613; Y). Then, the communication control section 3110*c*, the bridge one end 3110*b*, the bridge another end 3120*b*, or the sensor section 3120*a* updates the Data plane session key with the received Even key (steps S3505 and S3614). The communication control section 3110*c*, the bridge one end 3110*b*, the bridge another end 3120*b*, or the sensor section 3120*a* receives the Odd key from the communication control section 3110*a* (step S3506; Y and S3607; Y). Then, the communication control section 3110*c*, the bridge one end 3110*b*, the bridge another end 3120*b*, or the sensor section 3120*a* updates the Data plane session key with the received Odd key (steps S3507 and S3608).

The bridge another end 3120*b* or the sensor section 3120*a* performs high-speed data transmission, to the communication control section 3110*c* or the bridge one end 3110*b*, of the specification of the timing to start using the Even key (step S3606). The communication control section 3110*c* or the bridge one end 3110*b* receives the specification of the timing to start using the Even key from the bridge another end 3120*b* or the sensor section 3120*a* (step S3508). Then, the communication control section 3110*c* or the bridge one end 3110*b* starts using the Even key (step S3509). The bridge another end 3120*b* or the sensor section 3120*a* performs high-speed data transmission, to the communication control section 3110*c* or the bridge one end 3110*b*, of the specification of the timing to start using the Odd key (step S3612). The communication control section 3110*c* or the bridge one end 3110*b* receives the specification of the timing to start using the Odd key from the bridge another end 3120*b* or the sensor section 3120*a* (step S3512). Then, the communication control section 3110*c* or the bridge one end 3110*b* starts using the Odd key (step S3513).

In a case of finishing continuation of the session (steps S3407 and S3414; Y), the communication control section 3110*a* transmits a Data plane session finish request to the communication control section 3110*c*, the bridge one end 3110*b*, the bridge another end 3120*b*, or the sensor section 3120*a* by the VENDOR_DEFINED_REQUEST request message (steps S3420 and S3421). The communication control section 3110*c*, the bridge one end 3110*b*, the bridge another end 3120*b*, or the sensor section 3120*a* transmits the Data plane session finish response to the communication control section 3110*a*, by the VENDOR_DEFINED_RESPONSE response message or the ERROR response message, in response to the Data plane session finish request (steps S3516 and S3617).

In a case of finishing the Data plane session, the communication control section 3110*a* first transmits the Data plane session finish request to the sensor section 3120*a* or the bridge another end 3120*b* which is the Data plane device. Then, the communication control section 3110*a* causes the sensor section 3120*a* or the bridge another end 3120*b* to finish using the Data plane session key. Thereafter, the communication control section 3110*a* transmits the Data plane session finish request to the communication control section 3110*c* or the bridge one end 3110*b* which is the Data plane host. Then, the communication control section 3110*a* causes the communication control section 3110*c* or the bridge one end 3110*b* to finish using the Data plane session key. In the case of this order, the session is finished immediately or safely. Incidentally, although the description has been given of the Control plane session key by referring to the example in which one Control plane session key is used, the Control plane session key may also be configured by the Even key and the Odd key.

The communication control section 3110*a*, the communication control section 3110*c*, the bridge one end 3110*b*, the sensor section 3120*a*, or the bridge another end 3120*b* discards or cleans up the Even key and the Odd key when the session is finished (steps S3422, S3517 and, S3618). In this manner, the Data plane session in the communication system 3100 is executed.

FIG. 242 illustrates a modification example of the communication system 3100.

The communication control section 3110*c* or the bridge one end 3110*b* may be able to execute in-band interrupt. In this case, the Control plane session key confirmation request or the Data plane session key confirmation request need not be transmitted periodically. The communication control section 3110*a* may transmit the Control plane session key confirmation request or the Data plane session key confirmation request in response to the in-band interrupt. In addition, the communication control section 3110*c* or the bridge one end 3110*b* may transmit the Control plane session key confirmation response or the Data plane session key confirmation response as the in-band interrupt. In this case, the Control plane session key confirmation request or the Data plane session key confirmation request can be omitted.

In addition, a second Control plane host (e.g., CCI master) may be added in the communication control section 3110*c* or the bridge one end 3110*b*, and a second Control plane device (e.g., CCI slave) may be added in the communication control section 3110*a*. In this case, Information can be transmitted as needed from the communication control section 3110*c* or the bridge one end 3110*b* to the communication control section 3110*a*. This eliminates the need for the Control plane session key confirmation request or the Data plane session key confirmation request to be transmitted periodically. However, the communication between the second Control plane host and the second Control plane device is desirably protected by at least the message authentication, but this is not limitative. A first Control plane host and the second Control plane host may be separated or integrated. In addition, the second Control plane host may be replaced by the SPDM requester, and the second Control plane device may be replaced by the SPDM responder.

Incidentally, another parameter information of the VENDOR_DEFINED_REQUEST request message or the VENDOR_DEFINED_RESPONSE response message may include at least one of Control plane message counter information, Control plane message authentication code information, Control plane salt (random number) information, Control plane session key cycle information, Data plane message authentication code information, Data plane salt (random number) information, and Data plane session key cycle information. The session key cycle information may be information on a cycle (e.g., lower limit cycle, standard cycle, or upper limit cycle) in which the communication control section 3110*a* confirms the session key. In addition, the session key cycle information may be information on a cycle (e.g., lower limit cycle, standard cycle, or upper limit cycle) in which the communication control section 3110*c*, the bridge one end 3110*b*, the bridge another end 3120*b*, or the sensor section 3120*a* updates the session key.

Some or all of the Control plane session start (request or response), the Control plane session key confirmation (request or response), a Control plane session stop (request or response), and the Control plane session finish (request or response) may be stored in the same VENDOR_DEFINED_REQUEST request message or in the same VENDOR_DEFINED_RESPONSE response message. Likewise, some or all of the Data plane session start (request or response), the Data plane session key confirmation (request or response), and the Data plane session finish (request or response) may be stored in the same VENDOR_DEFINED_REQUEST request message or in the same VENDOR_DEFINED_RESPONSE response message.

Incidentally, the session start request by the Vendor defined SPDM message may be interpreted as a session key use start request, an Even key use start request, or an Odd key use start request. Likewise, the session stop request by the Vendor defined SPDM message may be interpreted as a session key use stop request, an Even key use stop request, or an Odd key use stop request. Likewise, the session finish request by the Vendor defined SPDM message may be interpreted as a session key use finish request, an Even key use finish request, or an Odd key use finish request.

Incidentally, the Control plane host and the Control plane device may adapt not only to unicast (one-to-one) transmission or reception, but also to multicast (one-to-many) transmission or reception. That is, although the description has been given by referring to the example in which one SoC is used, multiple SoCs may be provided. In addition, the Data plane host and the Data plane device may adapt not only to unicast (one-to-one) transmission or reception, but also to multicast (one-to-many) transmission or reception. That is, although the description has been given by referring to the example in which one SoC is used, multiple SoCs may be provided.

Specifically, for example, a first SoC includes the SPDM requester or the SPDM responder and the Control plane host or the Data plane host. Further, a second SoC includes the SPDM requester or the SPDM responder and the Control plane host or the Data plane host. At this time, the same information (e.g., image-system data, control-system command, and control-system data) may be transmitted from the Sensor or Bridge another end to the first SoC and the second SoC.

In addition, for example, the unicast may be employed between the Sensor or the Bridge another end and the Bridge one end, and the multicast may be employed for the Bridge one end to the first SoC and the second SoC (branched at the Bridge one end). In addition, for example, the SSMC may establish the SPDM session with respect to the first SoC. In addition, the SSMC may establish the SPDM session with respect to the second SoC. In addition, the SSMC may transmit the same session key to the first SoC and the second SoC and to the Sensor or the Bridge another end.

In addition, for example, in the case of the image-system communication, the SSMC first transmits the session key, the Even key, or the Odd key to the first SoC. Next, the SSMC transmits the same session key, Even key, or Odd key to the second SoC. Finally, the SSMC transmits the same session key, Even key, or Odd key to the Sensor or the Bridge another end.

In addition, for example, in the case of the control-system communication, the SSMC first transmits the session key, the Even key, or the Odd key to the Sensor or the Bridge another end. Next, the SSMC transmits the same session key, Even key, or Odd key to the second SoC. Finally, the SSMC transmits the same session key, Even key, or Odd key to the first SoC. However, the SSMC and the first SoC may be separated or integrated, and the SSMC and the second SoC may be separated or integrated.

Incidentally, the SSMC, the SoC or the Bridge one end may be included in a mobile body apparatus, and the Sensor or the Bridge another end may be included in an imaging device. The imaging device may be built into the mobile body apparatus; the imaging device may be mounted inside the mobile body apparatus, or the imaging device may be mounted outside the mobile body apparatus. At this time, it is advantageous, also from the viewpoint of power efficiency or data efficiency, to reduce the total number of times of communication or the total amount of communication data between the SSMC in the mobile body apparatus and the Sensor or the Bridge another end in the imaging device, as compared with the total number of times of communication or the total amount of communication data between the SSMC in the mobile body apparatus and the SoC or the Bridge one end in the mobile body apparatus. Therefore, the example of the flowchart has been proposed, in which the number of times of use of or the amount of data used in the VENDOR_DEFINED_REQUEST request message, the VENDOR_DEFINED_RESPONSE response message, or the ERROR response message of the control-system communication (e.g., SPDM session) between the SSMC and the Sensor or the Bridge another end is less than that of the control-system communication (e.g., SPDM session) between the SSMC and the SoC or the Bridge one end.

Likewise, the HEARTBEAT cycle between the SSMC and the SoC or the Bridge one end is set to be shorter than the HEARTBEAT cycle between the SSMC and the Sensor or the Bridge another end (with the proviso that the HEARTBEAT function may not be provided between the SSMC and the Sensor or the Bridge another end). Further, the specific message is transmitted from the Sensor or the Bridge another end to the SoC or the Bridge one end, by the image-system communication (e.g., embedded data, blank image data, extended packet header) or by second control-system communication (e.g., read response). Then, the specific message based thereon is transmitted from the SoC or the Bridge one end to the SSMC, by first control-system communication (e.g., HEARTBEAT_ACK response message, ERROR response message, or Vendor defined SPDM message). Also in such a case, the same advantage as described above is obtained.

In this case, the SSMC is able to grasp the presence or absence of abnormality (e.g., Sensor abnormality, Bridge abnormality, SoC abnormality, or communication abnormality) related to the second control-system communication or the image-system communication by the first control-system communication. It is to be noted that the specific message described above may be stored in some or all of the VENDOR_DEFINED_RESPONSE response message described above. In addition, the timing specification for the start of use may be transmitted from the SoC, the Bridge one end, the Bridge another end, or the Sensor to the SSMC, for example, not only by the Vendor defined SPDM message but also by the HEARTBEAT_ACK response message or the ERROR response message.

Incidentally, the protection section (security section) that protects the first communication (e.g., first control-system communication) and the second communication (e.g., second control-system communication or image-system communication) may include the first security arithmetic part (e.g., for the first control-system communication), the second security arithmetic part (e.g., for the second control-system communication), and a third security arithmetic part (e.g., for the image-system communication). In addition, the same cryptographic algorithm may be applied to the first security arithmetic part, the second security arithmetic part, and the third security arithmetic part, or different cryptographic algorithms may be applied thereto. For example, for the first control-system communication or for the second control-system communication, a combination of one of the block cipher CBC mode or the block cipher CTR mode and one of the HMAC, the CMAC or the GMAC may be applied to the first security arithmetic part or the second security arithmetic part. In addition, for the image-system communication, one of the AES-GCM, AES-GMAC, the block cipher CCM mode, the HMAC, or the CMAC may be applied to the third security arithmetic part.

In addition, for the first control-system communication or the second control-system communication, one of the AES-GCM or the block cipher CCM mode may be applied to the first security arithmetic part or the second security arithmetic part. In addition, for the image-system communication, a combination of one of the block cipher CBC mode or the block cipher CTR mode and one of the HMAC, the CMAC, and the GMAC may be applied to the third security arithmetic part. However, the first security arithmetic part and the second security arithmetic part may be integrated rather than separated. The extension mode adaptive CSI-2 transmission circuit and/or the security section may be interpreted as the protection section, or the extension mode adaptive CSI-2 reception circuit and/or the security section may be interpreted as the protection section.

The timing or the position of the components included in any drawing such as a block diagram or a flowchart is exemplary, and may be configured differently. There are various modification examples for the embodiments described in each of the examples described above. That is, as for the components of each of the described examples, some of the components may be omitted, some or all of the components may be changed, or some or all of the components may be modified. In addition, some of the components may be replaced by other components, or other components may be added to some or all of the components. Further, some or all of the components may be divided into multiple components. Some or all of the components may be separated into multiple components. At least some of the multiple divided or separated components may have different functions or features. Further, at least some of the components may be moved to form different embodiments. Furthermore, a binding element or a relay element may be added to a combination of at least some of the components to form a different embodiment. In addition, a switching function may be added to a combination of at least some of the components to form a different embodiment.

The present embodiment is not limited to the configurations exhibited in the described examples, and may be modified in a wide variety of ways without departing from the gist of the present technology. It is to be noted that the effects described herein are merely exemplary and non-limiting, and may have other effects. In the present specification, processing performed in accordance with a program by a computer need not necessarily be performed in time series in the order described as a flowchart. That is, the processing performed in accordance with the program by the computer also includes processing (e.g., parallel processing or object-based processing) to be executed in parallel or individually. In addition, the program may be processed by one computer (processor) or may be subject to distributed processing by multiple computers. Further, the program may be transferred to a remote computer and executed.

Further, as used herein the term "system" means a set of multiple components (apparatuses, modules (parts), etc.), regardless of whether all the components are in the same housing. Therefore, multiple apparatuses contained in separate housings and coupled together via a network and one apparatus containing multiple modules in one housing are each a system. In addition, for example, the configuration described as one apparatus (or processor) may be divided into multiple configurations, which may be employed as multiple apparatuses (or processors). Conversely, the configurations described above as multiple apparatuses (or processors) may be integrated to be configured as one apparatus (or processor). In addition, a configuration other than the described configuration may be added, as a matter of course, to the configuration of each apparatus (or each processor). Further, when the configuration and the operation as the entire system are substantially the same, some of the configurations of a certain apparatus (or processor) may be included in the configuration of another apparatus (or another processor).

In addition, for example, the present technology can employ a cloud computing configuration in which one function is shared and jointly processed by multiple apparatuses via a network. In addition, for example, the described program can be executed in any apparatus. In that case, it is sufficient for the apparatus to have a necessary function (such as a function block) to be able to obtain necessary information. In addition, for example, the steps described in the described flowcharts can be executed by one apparatus, and can also be shared and executed by multiple apparatuses. Further, in a case where multiple pieces of processing are included in one step, the multiple pieces of processing included in the one step can be executed by one apparatus, and can also be shared and executed by multiple apparatuses. In other words, the multiple pieces of processing included in one step may also be executed as processing of multiple steps. Conversely, the processing described as the multiple steps may be collectively executed as one step.

It is to be noted that, as for the program to be executed by a computer, pieces of processing of steps describing the program may be executed in time series in the order described herein, or may be executed in parallel or individually at a necessary timing such as when a call is made. That is, the pieces of processing of the respective steps may be executed in an order different from the described order unless contradiction occurs. Further, the processing of steps describing this program may be executed in parallel with processing of another program, or may be executed in combination with processing of another program.

It is noted that the present multiple technologies described herein may be implemented alone independently of one another unless contradiction occurs. It is needless to say that any present multiple technologies may be used together. For example, some or all of the present technologies described in any of the embodiments may be implemented in combination with some or all of the present technologies described in other embodiments. In addition, some or all of any of the described present technologies may be implemented together with other technologies which are not described.

Modification Example I

FIG. 243 is a diagram illustrating an example of a packet configuration of the write data (WRITE DATA; write data) in the foregoing embodiment and modification examples thereof. FIG. 244 illustrates an example of processing of the write data in the foregoing embodiment and modification examples thereof. It is to be noted that the locations indicated by the broken lines in FIGS. 243 and 244 are optional.

Hereinafter, of the Individual mode, a mode in which an arithmetic operation of the MAC value is performed for each message (or each transaction) is referred to as a first CCI mode. Of the Running mode, a mode in which am arithmetic operation of the MAC value is performed for every one or more messages (e.g., for each frame) transmitted or received within a predetermined period (e.g., within one frame) is referred to as a second CCI mode. Of the Individual mode, a mode in which an arithmetic operation of the MAC value is performed for every multiple messages is referred to as a third CCI mode. FIG. 243 illustrates an example of a write command in the Individual mode (first CCI mode) in which an arithmetic operation of the MAC value is performed for each message. FIG. 244 illustrates an example of processing for the write command in FIG. 243 to be executed on the Master side (e.g., application processor (SoC)) and on the Slave side (e.g., image sensor). Hereinafter, the bridge another end 3120*b* or the sensor section 3120*a* is able to select at least one of two types of message authentication (MAC) policies as a message authentication policy in the control-system communication or the image-system communication.

For example, execution or reflection of the write data, the read data, or decryption result is performed in one of two cases of types: always (No rejection) and only a case where MAC verification is successful (Only when MAC matched). For example, a relationship between the MAC and encryption (decryption) is only one of three types: Encrypt-then-MAC, MAC-then-Encrypt, and Encrypt-and-MAC. For example, the Encrypt-then-MAC is one of two types: first Encrypt-then-MAC (Encrypt-then-MAC-0) and second Encrypt-then-MAC (Encrypt-then-MAC-1). For example, a MAC target is one of two types: whether or not to be excluded partially from the message authentication target. For example, the type of a MAC exclusion mode is one of two or more types of the MAC exclusion modes. For example, information related to MAC disablement is one of two types: whether or not to tolerate disablement of the message authentication or the security feature including the message authentication.

A range from S (START condition) to P (STOP condition) is defined as one message (or one transaction). Write data (WRITE DATA) written by Sequential Write (FIG. 243) or Single Write (only WRITE DATA 0 being written) is defined as a one data group (one data group). In FIG. 243, multiple data groups are included in the one message. In the foregoing embodiment and modification examples thereof, it is desirable, in the bridge another end 3120*b* or the sensor section 3120*a*, that the number of data groups can be constrained in the control-system communication in a case where a portion or all of the write data is subject to the message authentication (MAC).

Normally, it is desirable that the write data be executed after the message authentication is OKed (MAC values are consistent with each other between the Master side and the Slave side, i.e., the received MAC value and a MAC value obtained from the arithmetic operation from some or all of received one or more messages are consistent with each other). In such a case, a portion or all of the write data need be held in a storage section such as a buffer memory until the message authentication is OKed. However, the buffer memory has an upper limit of a data amount that can be held, and thus a buffer overflow may occur beyond the upper limit, unless there is constraint on the data groups. Therefore, it is desirable to provide a constraint on the number of the data groups.

As a specific method to provide such a constraint, for example, it is conceivable that the Slave side (e.g., image sensor) notify the Master side (e.g., the application processor (SoC), in advance, of an upper limit number (hereinafter, referred to as an "upper limit number Nw_max") of a MAC target data group that can be held in the storage section (e.g., buffer memory) by the Slave side (e.g., image sensor) for the write data. In addition thereto, for example, it is conceivable that the Slave side may notify the Master side, in advance, of an upper limit value (hereinafter, referred to as an "upper limit amount Bw_max") of data amount (e.g., byte count and bit count) of the MAC target data group that can be held in the storage section by the Slave side for the write data.

This pre-notification may be substituted by the pre-agreement (Private contract). However, for example, the upper limit number Nw_max or the upper limit amount Bw_max may be notified from the Slave side (e.g., image sensor) to the Master side (e.g., SoC) by communication via the functional register (e.g., SPDM session, Control Plane session). Here, the functional register is a register in which functional information is stored, and is also referred to as Capability register, which is a portion or all of the storage section. The upper limit number Nw_max or the upper limit amount Bw_max may be notified to (e.g., read by) the SSMC via the functional register by the SPDM message (e.g., Vendor defined SPDM message), and may be notified (e.g., written) from the SSMC to the Master side. Implicit data (Not transmitted) illustrated in FIG. 244 may be omitted. The initialization vector IV to be used in the CBC mode may be stored at a location in any of between the MC and the MAC, between the MAC and the CRC, after the MC, after the MAC, and after the CRC.

It is to be noted that the CCI Master side and CCI Slave side may be referred to as a Controller side and a Target side, respectively. A SLAVE ADDRESS may be referred to as a TARGET ADDRESS, and the REG ADDRESS may be referred to as a SUB ADDRESS.

Max_Aggregation_Extent_Data_Groups illustrated in FIG. 245 are an example of the functional register indicating the upper limit number Nw_max. Max_Aggregation_Extent_Buffer illustrated in FIG. 246 is an example of the functional register indicating the upper limit amount Bw_max. The upper limit number Nw_max or the upper limit amount Bw_max may be integrated between the first CCI mode or the third CCI mode (Individual mode) and the second CCI mode (Running mode), or may be separated.

The second CCI mode may not be provided with the upper limit number Nw_max and the upper limit amount Bw_max. In the case of being separated, the Running mode may execute the write data without waiting for verification of the message authentication (there is no need to strictly limit the upper limit number Nw_max or the upper limit amount Bw_max), and thus is desirably set to different upper limit number Nw_max or upper limit amount Bw_max.

FIG. 247 is a diagram illustrating an example of a packet configuration of read data (READ DATA; read data) in the foregoing embodiment and modification examples thereof. FIG. 248 illustrates an example of processing of the read data in the foregoing embodiment and modification examples thereof. FIG. 247 illustrates an example of the read command and the read response in the Individual mode (first CCI mode) in which an arithmetic operation of the MAC value is performed for each message. FIG. 248 illustrates an example of processing of the read command and the read response in FIG. 247 to be executed in the Master side (e.g., application processor (SoC)) and the Slave side (e.g., image sensor). It is to be noted that the locations indicated by the broken lines in FIGS. 247 and 248 are optional.

A range from S (START condition) to P (STOP condition) is defined as one message (or one transaction). Read data (READ DATA) read by Sequential Read (FIG. 247) or Single Read (only READ DATA 0 being read) is defined as a one data group. In FIG. 247, multiple data groups are included in the one message. In the foregoing embodiment and modification examples thereof, it is desirable that the number of data groups be constrained in a case where a portion or all of the read data is subject to the message authentication (MAC).

Normally, it is desirable that the read data be executed after the message authentication is OKed (MAC values are consistent with each other between the Master side and the Master side, i.e., the received MAC value and a MAC value obtained from the arithmetic operation from some or all of received one or more messages are consistent with each other). In such a case, a portion or all of the read data need be held in a storage section such as a buffer memory. However, the buffer memory has an upper limit of a data amount that can be held, and thus a buffer overflow may occur beyond the upper limit, unless there is constraint on the data groups. Therefore, it is desirable to provide a constraint on the number of data groups. For example, in a case where a read response is transmitted or received, with a read command being omitted by in-band interrupt, it is desirable that the number of data groups be constrained.

As a specific method to provide such a constraint, for example, it is conceivable that the Master side (e.g., SoC) notify the Slave side (e.g., image sensor), in advance, of an upper limit number (hereinafter, referred to as an "upper limit number Nr_max") of a MAC target data group that can be held in the storage section (e.g., buffer memory) by the Master side (e.g., SoC) for the read data. In addition thereto, for example, it is conceivable that the Master side (e.g., SoC) may notify the Slave side (e.g., image sensor), in advance, of an upper limit value (hereinafter, referred to as an "upper limit amount Br_max") of data amount (e.g., byte count and bit count) of the MAC target data group that can be held in the storage section by the Master side (e.g., SoC) for the read data.

This pre-notification may be substituted by the pre-agreement (Private contract). However, for example, the upper limit number Nr_max or the upper limit amount Br_max may be notified from the Master side (e.g., SoC) to the Slave side (e.g., image sensor) by communication via the functional register (e.g., SPDM session, Control Plane session). Here, the functional register is a register in which functional information is stored, and is also referred to as the Capability register, which is a portion or all of the storage section. The upper limit number Nr_max or the upper limit amount Br_max may be notified to (e.g., read by) the SSMC via the functional register by the SPDM message (e.g., Vendor defined SPDM message), and may be notified (e.g., read) from the SSMC to the Slave side. In a case where the SoC and the SSMC are the same or integrated, the functional register may be omitted, and the upper limit number Nr_max or the upper limit amount Br_max may be notified (e.g., written into the write register) from the Master side (e.g., EoC) to the Slave side (e.g., image sensor) by communication (e.g., SPDM session, Control Plane session) via the write register. The Implicit data (Not transmitted) illustrated in FIG. 248 may be omitted. The initialization vector IV to be used in the CBC mode may be stored at a location in any of between the MC and the MAC, between the MAC and the CRC, after the MC, after the MAC, and after the CRC. Although the descriptions have been given, in FIGS. 244, 248, and 250, by referring to the example in which the Implicit data (MC c−1 [7:0] to MC 1 [7:0]) being Clear texts covered by MAC is inserted between the REG ADDRESS [7:0] and MC 0 [7:0], the Implicit data being Clear texts covered by MAC may be inserted into another position, or may be inserted after the MC 0 [7:0], for example. In addition, the order of the MC c−1 [7:0] to MC 1 [7:0] may be MC 1 [7:0] to MC c−1 [7:0]. Explicit MC (MC not being Implicit data) may be two or more bytes, or the explicit MC may include not only the MC 0 [7:0] but also the MC 1 [7:0] or MC [15:8], also in those including other diagrams; some or all of CRC may be omitted.

The Max_Aggregation_Extent_Data_Groups illustrated in FIG. 245 are an example of the write register or the functional register indicating the upper limit number Nr_max. The upper limit number of the MAC target data groups that can be held in the storage section by the Master side may be an upper limit of the data amount (e.g., byte count and bit count) of the MAC target data groups that can be held in the storage section by the Master side for the read data. The Max_Aggregation_Extent_Buffer illustrated in FIG. 246 is an example of the write register or the functional register indicating the upper limit amount Br_max. Some or all of expressions in FIG. 245 or 246 may be differentiated between the Master side and the Slave side, for example, to define respective appropriate numerical ranges for the Master side and the Slave side, or to prevent Fields from overlapping each other for the Master side and the Slave side. The upper limit number Nr_max or the upper limit amount Br_max may be integrated between the first CCI mode or the third CCI mode (Individual mode) and the second CCI mode (Running mode), or may be separated. The second CCI mode may not be provided with the upper limit number Nr_max and the upper limit amount Br_max. In the case of being separated, the Running mode may execute the read data without waiting for verification of the message authentication (there is no need to strictly limit the upper limit number Nr_max or the upper limit amount Br_max), and thus is desirably set to different upper limit number Nr_max or upper limit amount Br_max.

The upper limit number or the data amount upper limit of the MAC target data groups that can be held in the storage section by the Slave side or the Master side may be integrated between the write data and the read data, or may be separated. In the case of being separated, it is possible to set to a different upper limit number or data amount upper limit between the write data and the read data. As described above, the functional register stores the information (e.g., the upper limit number of the MAC target data groups, the data amount upper limit of the MAC target data groups) related to the upper limit of the data amount that can be held in the storage section by the protection section on the Master side or the Slave side of the CCI with respect to the message authentication of the control-system communication or the image-system communication. As described above, the functional register stores the information (e.g., upper limit number Nw_max, upper limit number Nr_max, upper limit amount Bw_max, upper limit amount Br_max) related to the upper limit of the data amount that can be held in the storage section by the protection section on the Master side or the Slave side of the CCI with respect to the message authentication of the control-system communication or the image-system communication. Message authentication is verified on the MAC target data groups within a range not exceeding the upper limit number or the data amount upper limit of the MAC target data groups that can be held in the storage section by the Slave side or the Master side.

It is to be noted that the buffer (e.g., CCI reception buffer) processing is desirably completed before the start of the next message authentication. Information (read response) indicating whether or not the buffer processing has been finished may be transmitted from the CCI Slave side to the Master side in response to a read command from the CCI Master side. Information indicating whether or not the buffer processing has been finished may be transmitted from the CCI Master side to the Slave side as a write command from the CCI Master side. Information such as waiting time or prohibition time for completing the buffer processing may be subject to adjustment of recognitions between the CCI Master side and the Slave side or may be subject to adjustment of recognitions between the image-system data transmission side and the image-system data reception side, for example, via the pre-agreement, the functional register, the SPDM message (e.g., Vendor defined SPDM message), the extended packet header (EXTENDED HEADER), TRIGGER DESCRIPTOR, or the like. The CCI Slave side may store, in embedded data of the image-system communication, information indicating that the buffer processing has been completed, and transmit it from the CCI Slave side to the Master side. The CCI Master side may determine, on the basis of any of these pieces of information, whether or not the buffer processing on the CCI Slave side has been completed. Likewise, the CCI Slave side may determine, on the basis of any of these pieces of information, whether or not the buffer processing on the CCI Master side has been completed.

In FIGS. 243 and 247, S (START condition), Sr (REPEATED START condition), P (STOP condition), A (Acknowledge (ACK)), and $\bar{A}$ (Negative acknowledge (NACK) are outside the message authentication target. However, S (START condition), Sr (REPEATED START condition), P (STOP condition), A (Acknowledge (ACK)), $\bar{A}$ (Negative acknowledge (NACK), or information corresponding thereto may be the message authentication target also in those including other examples. In the descriptions of Capability register example, the Vendor defined SPDM message example, or the EXTENDED HEADER example, "Bits" is Size in bits, and Offset of Bits is omitted, but Offset may be actually provided. The expressions "Field," "Bits," or "Value: Description" are exemplary. The "Field" may be referred to as an expression including at least "Name", and the "Value: Description" may be referred to as an expression including at least "Value" or "Description".

FIG. 249 illustrates an example of a packet configuration of the write data in the foregoing embodiment and modification examples thereof. FIG. 250 illustrates an example of processing of the write data in the foregoing embodiment and modification examples thereof. FIG. 249 illustrates an example of a write command in the Individual mode (third CCI mode) in which an arithmetic operation of the MAC value is performed for every multiple messages. FIG. 250 illustrates an example of processing of the write command in FIG. 249. Examples of the read command and the read response are omitted as they are self-evident from the above description. It is to be noted that the locations indicated by the broken lines in FIGS. 249 and 250 are optional.

FIG. 249 exemplifies a case where one data group is transmitted within one message. It is to be noted that multiple data groups may be transmitted within one message. In the third CCI mode, as illustrated in FIG. 251, for example, the EXTENDED HEADER may include information (e.g., bit flag) indicating whether or not a "REPEATED START condition row including MAC value" or a "MAC value" is stored in a message including the EXTENDED HEADER. The EXTENDED HEADER or the START condition row including the EXTENDED HEADER may be omitted.

FIG. 252 illustrates an example of a packet configuration of the write data in the foregoing embodiment and modification examples thereof. FIG. 252 illustrates an example of a write command in the Individual mode (third CCI mode) in which an arithmetic operation of the MAC value is performed for every multiple messages. Examples of the write response, the read command, and the read response are omitted as they are self-evident from the above description.

In a case where there is no EXTENDED HEADER, the MAC value or the REPEATED START condition row including the MAC value may be transmitted or received cyclically (e.g., for every two messages). Meanwhile, in a case where there is the EXTENDED HEADER, the MAC value or the REPEATED START condition row including the MAC value may be transmitted or received anomalously (after messages of the number less than the cycle in the case where there is no EXTENDED HEADER (e.g., after one message)).

The MAC transmission cycle (e.g., every two messages) may be subject to adjustment of recognitions between the CCI Master side and the Slave side via the pre-agreement, the functional register, or the SPDM message (e.g., Vendor defined SPDM message) to thereby omit the EXTENDED HEADER in this manner. That is, in a case where the MAC value or the REPEATED START condition row including the MAC value can be transmitted cyclically, no EXTENDED HEADER is necessary. In a case where the MAC value or the REPEATED START condition row including the MAC value cannot be transmitted cyclically, the EXTENDED HEADER may be used.

The EXTENDED HEADER may be transmitted or received only in a case where the MAC value or the REPEATED START condition row including the MAC value cannot be transmitted cyclically, in order to improve data transmission efficiency or reception efficiency (minimize overhead due to EXTENDED HEADER). For example, the EXTENDED HEADER may store information (e.g., bit flag) as to whether or not to transmit or receive the MAC value or the REPEATED START condition row including the MAC value, as to whether or not to anomalously transmit or receive the MAC value or the REPEATED START condition row including the MAC value, as to whether or not the MAC value or the REPEATED START condition row including the MAC value is included in the current message, as to whether or not the MAC value or the REPEATED START condition row including the MAC value is included in the next message, or the like.

For example, in a case where the MAC is transmitted for every N multiple messages, the EXTENDED HEADER may store information indicating whether N is fixed or variable, for example, as illustrated in FIG. 253. For example, N maximum value N_Max may be subject to adjustment of recognitions between the CCI Master side and the Slave side via the pre-agreement, the functional register, or the SPDM message (e.g., Vendor defined SPDM message). In a case where N is fixed, the MAC may be transmitted as N=N_Max, and, in a case where N is variable, the MAC may be transmitted as N≤N_Max. In addition, in a case where N is variable, the EXTENDED HEADER may be transmitted.

FIG. 254 illustrates an example of a packet configuration of the write data in the foregoing embodiment and modification examples thereof. FIG. 255 illustrates an example of processing of the write data in the foregoing embodiment and modification examples thereof. FIG. 254 illustrates an example of a write command in the Running mode (second CCI mode) in which an arithmetic operation of the MAC value is performed for every multiple messages. FIG. 255 illustrates an example of processing on the write command in FIG. 254. Examples of the read command and the read response are omitted as they are self-evident from the above description. It is to be noted that the locations indicated by the broken lines in FIGS. 254 and 255 are optional.

FIG. 254 exemplifies a case where one data group is transmitted within one message. It is to be noted that multiple data groups may be transmitted within one message. In the second CCI mode, the EXTENDED HEADER may include information (e.g., bit flag) indicating whether or not a MAC arithmetic operation or a CRC arithmetic operation can be completed (a message including the EXTENDED HEADER is the last MAC target message or CRC target message) after completion of the reception of the message including the EXTENDED HEADER. The EXTENDED HEADER or the START condition row including the EXTENDED HEADER may be omitted.

In order to improve the transmission efficiency or the reception efficiency of data, the EXTENDED HEADER may be configured to be transmitted or received only in the case of the final message in the message group. In the second CCI mode, the final message (WRITE DATA 0 to WRITE DATA?−1) in the message group transmitted within a predetermined period of time (e.g., within one frame) may include information (e.g., bit flag) indicating whether or not the MAC arithmetic operation or the CRC arithmetic operation can be completed after completion of the reception of the message (whether the message is the last MAC target message or CRC target message). The TRIGGER DESCRIPTOR (may be referred to as an expression including a portion or all of the ESS CCI Service Descriptor) may be provided. In this case, in the second CCI mode, the final message (TRIGGER DESCRIPTOR) in the message group transmitted within a predetermined period of time (e.g., within one frame) may include information (e.g., bit flag) indicating whether or not the MAC arithmetic operation or the CRC arithmetic operation can be completed after completion of the reception of the message (whether the message is the last MAC target message or CRC target message).

For example, a WRITE register address (REG ADDRESS) related to at least an operation of the Running mode (second CCI mode) may be defined; in response to write data (WRITE DATA 0 to WRITE DATA?−1 or TRIGGER DESCRIPTOR) of the WRITE register address or specification (in this case, the write data may be omitted), the Slave side may determine the operation (e.g., whether or not to complete the MAC arithmetic operation or the CRC arithmetic operation, or whether or not to start decryption processing) of the Running mode. Likewise, a READ register address (REG ADDRESS) related to at least an operation of the Running mode (second CCI mode) may be defined: in response to read data (READ DATA 0 to READ DATA?−1 or TRIGGER DESCRIPTOR) of the READ register address or specification (in this case, the read data may be omitted), the Master side may determine the operation (e.g., whether or not to complete the MAC arithmetic operation or the CRC arithmetic operation, or whether or not to start decryption processing) of the Running mode. In these manners, it is possible for the CCI Master side or the Slave side to specify, to a communication partner, a timing to complete the arithmetic operation of the MAC or the CRC.

FIG. 256 is a flowchart describing an example of arithmetic processing of the MAC or the CRC in the second CCI mode. FIG. 256 exemplifies processing in the sensor section 3120*a* or the bridge another end 3120*b*. It is to be noted that the pieces of processing indicated by the broken lines in FIG. 256 are optional.

The sensor section 3120*a* or the bridge another end 3120*b* determines whether or not to finish loop processing (step S4101). For example, in a case of receiving a finish command for the communication, the sensor section 3120*a* or the bridge another end 3120*b* finishes the loop processing (step S4101; Y). For example, in a case of not receiving the finish command for the communication, the sensor section 3120*a* or the bridge another end 3120*b* does not finish the loop processing (step S4101; N), and determines whether or not to start an arithmetic operation of the MAC value (MAC arithmetic operation) or an arithmetic operation of the CRC value (CRC arithmetic operation) (step S4102). For example, in a case of starting reception of a message of a SLAVE ADDRESS corresponding to itself, the sensor section 3120*a* or the bridge another end 3120*b* starts the arithmetic operation of the MAC value (MAC arithmetic operation) or the arithmetic operation of the CRC value (CRC arithmetic operation) (step S4102; Y and step S4103). For example, in a case of not receiving the message of the SLAVE ADDRESS corresponding to itself, the sensor section 3120*a* or the bridge another end 3120*b* does not start the above-described arithmetic operation (step S4102; N), and the processing returns to step S4101. The second CCI mode is a mode in which some or all of the write command, the read command, and the read response (i.e., CCI command) transmitted within a predetermined period of time or within a predetermined bit width are to be the protection target of the message authentication or the CRC.

In the second CCI mode, the sensor section 3120*a* or the bridge another end 3120*b* may store, for example, the MAC value or the CRC value in embedded data of the same frame or the next frame in the high-speed data transmission or in data of the next CCI command to transmit it to the communication control section 3110*a* or 3110*c* or the bridge one end 3110*b* or to receive it from the communication control section 3110*a* or 3110*c* or the bridge one end 3110*b*. The sensor section 3120*a* or the bridge another end 3120*b* determines whether or not information indicating that the arithmetic operation can be completed has been received (step S4104). In a case of having received the information indicating that the arithmetic operation can be completed (step S4104; Y), in a case where a first predetermined period T1 or a first predetermined bit width W1 has elapsed (step S4107; Y), or in a case where a second predetermined period T2 or a second predetermined bit width W2 has elapsed (step S4106; Y), the sensor section 3120*a* or the bridge another end 3120*b* desirably waits until completion of message reception when the message reception has not been completed (step S4108). It is to be noted that this wait may be omitted.

Here, in a case where this operation is the first arithmetic operation (step S4105; Y), the sensor section 3120*a* or the bridge another end 3120*b* determines whether or not the first predetermined period T1 or the first predetermined bit width W1 has elapsed (step S4107). In addition, in a case where this operation is not the first arithmetic operation (step S4105; N), the sensor section 3120*a* or the bridge another end 3120*b* determines whether or not the second predetermined period T2 or the second predetermined bit width W2 has elapsed (step S4106).

In a case where the MAC value or the CRC value is stored in the embedded data, the embedded data (embedded data) is transmitted cyclically in response to a frame rate. Therefore, it is desirable that "time equivalent to the second predetermined period T2 or the second predetermined bit width W2<frame transmission cycle" hold true. It is more desirable that "time equivalent to the second predetermined period T2 or the second predetermined bit width W2+time necessary for the message reception+delay time, etc.<frame transmission cycle" hold true. The first predetermined period T1 and the second predetermined period T2 may be the same as each other, or may be different from each other. In a case where the first predetermined period T1 and the second predetermined period T2 are different from each other, the flexibility of system designing is improved. The first predetermined bit width W1 and the second predetermined bit width W2 may be the same as each other, or may be different from each other. In a case where the first predetermined bit width W1 and the second predetermined bit width W2 are different from each other, the flexibility of system designing is improved. In a case where it takes more time than the frame transmission cycle due to setting (e.g., register setting) before the start of the frame transmission, it is sufficient that "first predetermined period T1>second predetermined period T2" or "first predetermined bit width W1>second predetermined bit width W2" hold true.

In a case where information is included that indicates whether or not the EXTENDED HEADER or the final message in the message group can complete the MAC arithmetic operation or the CRC arithmetic operation, the information may be as to whether or not to transmit the MAC, whether or not to transmit the CRC, whether or not to transmit the MAC and the CRC, or the like (FIG. 257). For example, in a case where the final message in the message group includes any information of those described above, i.e., in response to reception of the register address (REG ADDRESS) corresponding to register definition (Register definition) and on the basis of the write data received in a manner corresponding to the register address, the sensor section 3120*a* or the bridge another end 3120*b* is able to determine whether or not the MAC arithmetic operation or the CRC arithmetic operation can be completed (step S4109).

For example, in a case where the extended packet header (EXTENDED HEADER) includes any information of those described above, i.e., in response to reception of the register address (REG ADDRESS) corresponding to the TRIGGER DESCRIPTOR or the extended packet header and on the basis of the write data received in a manner corresponding to the register address, the sensor section 3120*a* or the bridge another end 3120*b* is able to determine whether or not the MAC arithmetic operation or the CRC arithmetic operation can be completed (step S4109).

It is to be noted that the expression of Field, Bits, Value, or Description may be an alternative expression, including illustrations by other tables. For example, Field may be expressed as Transmit_Tag, End_Tag, End_CRC, End_MAC, End_CRC_MAC, or the like. The sensor section 3120*a* or the bridge another end 3120*b* may execute an arithmetic operation of the MAC value or a ciphertext (encryption or decryption) and transmission or reception thereof in the first CCI mode or the third CCI mode while executing an arithmetic operation of the CRC value and transmission or reception thereof in the second CCI mode (step S4110). In this case, some or all of one or more messages to be transmitted or received in first CCI mode or the third CCI mode may be subject to an arithmetic operation of the CRC value (CRC target) in the second CCI mode. In this case, the sensor section 3120*a* or the bridge another end 3120*b* may not perform an arithmetic operation of the CRC value in the first CCI mode or the third CCI mode, and may not transmit or receive the CRC value via the control-system communication, thus making it possible to reduce the overhead of the control-system communication. In this case, the sensor section 3120*a* or the bridge another end 3120*b* need not execute an arithmetic operation of the MAC value or a ciphertext (encryption or decryption) and transmission or reception thereof in the second CCI mode, but may execute the arithmetic operation of the MAC value or a ciphertext (encryption or decryption) and transmission or reception thereof also in the second CCI mode. For example, whether or not to select such a combined mode (Dual mode) may be subject to adjustment of recognitions between the CCI Master side and the Slave side via the pre-agreement, the functional register (FIG. 257), the SPDM message (e.g., Vendor defined SPDM message), the extended packet header (EXTENDED HEADER), the TRIGGER DESCRIPTOR or the like, or may be subject to adjustment of recognitions between the image-system data transmission side and the image-system data reception side. That is, FIG. 257 may be employed as the Capability register example (functional register example).

FIG. 258 illustrates an example of a packet configuration of the write data in the foregoing embodiment and modification examples thereof. FIG. 259 illustrates an example of processing of the write data in the foregoing embodiment and modification examples thereof. FIG. 258 illustrates an example of a write command in the Running mode (second CCI mode) in which an arithmetic operation of the MAC value is performed for every multiple messages. FIG. 259 illustrates an example of processing on the write command in FIG. 258. Examples of the read command and the read response are omitted as they are self-evident from the above description. It is to be noted that the locations indicated by the broken lines in FIGS. 258 and 259 are optional.

In the GCM or the CCM of the AEAD algorithm, in a case where a portion or all of the write data or the read data are encrypted, it is not possible to execute AEAD processing on MAC verification and decryption (encryption) when the sequence remains as it is as the sequence of data string (message string)received from a CCI communication partner. One reason for this is that the GCM or the CCM is constrained by the sequence of "Clear texts covered by MAC"→"Encrypted data covered by MAC"–"MAC" in which the processing should be executed. Therefore, in a case where the data string in the CCI transmission is in the sequence of FIG. 258, the CCI Master side and the Slave side need to execute internal processing in the sequence of FIG. 259 (i.e., data sequence different from a data group to be transmitted or having been received). In the second CCI mode, the EXTENDED HEADER may include information (e.g., bit flag) indicating whether or not decryption processing can be started from a message including the EXTENDED HEADER (whether or not decryption processing can be started in response to the message including the EXTENDED HEADER). The EXTENDED HEADER or the START condition row including the EXTENDED HEADER may be omitted. In the second CCI mode, in a case of providing the TRIGGER DESCRIPTOR or the final message (WRITE DATA 0 to WRITE DATA?–1) in the message group to be transmitted within a predetermined period of time (e.g., within one frame), the TRIGGER DESCRIPTOR (final message) may include information (e.g., bit flag) indicating whether or not the decryption processing can be started from the message (whether or not the decryption processing can be started in response to the message including the final message). In these manners, it is possible for the CCI Master side or the Slave side to specify, to the CCI communication partner, a timing to start the decryption processing in the GCM or the CCM.

FIG. 260 is a flowchart describing an example of an arithmetic processing of the MAC or the CRC in the second CCI mode. FIG. 260 exemplifies processing in the sensor section 3120*a* or the bridge another end 3120*b*. It is to be noted that pieces of processing indicated by the broken lines in FIG. 260 are optional.

The sensor section 3120*a* or the bridge another end 3120*b* determines whether or not to finish the loop processing (step S4201). For example, in a case of receiving a finish command for the communication, the sensor section 3120*a* or the bridge another end 3120*b* finishes the loop processing (step S4201; Y). For example, in a case of not having received the finish command for the communication, the sensor section 3120*a* or the bridge another end 3120*b* does not finish the processing (step S4201; N), and determines whether or not to start an arithmetic operation of the MAC value (MAC arithmetic operation) (step S4202). For example, in a case of having started reception of a message of a SLAVE ADDRESS corresponding to itself, the sensor section 3120*a* or the bridge another end 3120*b* starts the arithmetic operation of the MAC value (MAC arithmetic operation) (step S4202; Y and step S4203). For example, in a case of not receiving the message of the SLAVE ADDRESS corresponding to itself, the sensor section 3120*a* or the bridge another end 3120*b* does not start the above-described arithmetic operation (step S4202; N), and the processing returns to step S4201.

In the second CCI mode, the sensor section 3120*a* or the bridge another end 3120*b* may store, for example, the MAC value or the CRC value in embedded data of the same frame or the next frame in the high-speed data transmission or in data of the next CCI command to transmit it to the communication control section 3110*a* or 3110*c* or the bridge one end 3110*b* or to receive it from the communication control section 3110*a* or 3110*c* or the bridge one end 3110*b*. The sensor section 3120*a* or the bridge another end 3120*b* determines whether or not information indicating that the decryption can be started has been received (step S4204). In a case of having received the information indicating that the decryption can be started (step S4204; Y), in a case where a first predetermined period T1 or a first predetermined bit width W1 has elapsed (step S4207; Y), or in a case where a second predetermined period T2 or a second predetermined bit width W2 has elapsed (step S4206; Y), the sensor section 3120*a* or the bridge another end 3120*b* desirably waits until completion of message reception when the message reception has not been completed (step S4208). It is to be noted that this wait may be omitted.

Here, in a case where this operation is the first arithmetic operation (step S4205; Y), the sensor section 3120*a* or the bridge another end 3120*b* determines whether or not the first predetermined period T1 or the first predetermined bit width W1 has elapsed (step S4207). In addition, in a case where this operation is not the first arithmetic operation (step S4205; N), the sensor section 3120*a* or the bridge another end 3120*b* determines whether or not the second predetermined period T2 or the second predetermined bit width W2 has elapsed (step S4206).

The start of the internal processing (e.g., decryption arithmetic operation, encryption arithmetic operation) by the Slave side on data (ciphertext) encrypted by the Master side or the start of the internal processing by the Master side on data (ciphertext) encrypted by the Slave side is defined as the start of the decryption or the decryption processing. In a case where the EXTENDED HEADER or the final message in the message group includes information indicating whether or not the decryption processing can be started, the information may be as to whether or not to start the decryption processing, whether or not to complete AAD (Additional Authenticated Data) processing, whether or not to complete AD (Associated Data) processing, or the like (FIG. 261). In a case where the final message in the message group includes any information of those described above, in response to reception of the register address (REG ADDRESS) corresponding to register definition (Register definition) and on the basis of the write data received in a manner corresponding to the register address, the sensor section 3120*a* or the bridge another end 3120*b* may determine whether or not the decryption processing can be started (step S4209). The EXTENDED HEADER example may be a TRIGGER DESCRIPTOR example, the TRIGGER DESCRIPTOR may be the EXTENDED HEADER, the EXTENDED HEADER may be the TRIGGER DESCRIPTOR, or FIG. 257 or 261 may be the TRIGGER DESCRIPTOR example.

For example, in a case where the extended packet header (EXTENDED HEADER) includes any information of those described above, in response to reception of the register address (REG ADDRESS) corresponding to the extended packet header and on the basis of the write data received in a manner corresponding to the register address, the sensor section 3120*a* or the bridge another end 3120*b* may determine whether or not the decryption processing can be started (step S4209).

It is to be noted that the expression of Field, Bits, Value, or Description may be an alternative expression, including illustrations by other tables. For example, Field may be expressed as End_AAD, End_AD, or the like. In response to the determination as to whether or not the MAC arithmetic operation or the CRC arithmetic operation by Field such as Transmit_CRC, Transmit_MAC, Transmit_CRC_MAC, Transmit_Tag, End_Tag, End_CRC, End_MAC, and End_CRC_MAC can be completed, determination may be made as to whether or not the decryption processing can be started.

For example, the sensor section 3120*a* or the bridge another end 3120*b* waits until completion of the MAC arithmetic operation and the decryption (step S4210), and then transmits a result of the MAC arithmetic operation to the communication control section 3110*a* or 3110*c* or the bridge one end 3110*b* (step S4211). Thereafter, the sensor section 3120*a* or the bridge another end 3120*b* executes step S4201.

FIG. 262 illustrates an example of a packet configuration of the write data in the foregoing embodiment and modification examples thereof. FIG. 263 illustrates an example of processing of the write data in the foregoing embodiment and modification examples thereof. FIG. 262 illustrates an example of a write command in the Running mode (second CCI mode) in which an arithmetic operation of the MAC value is performed for every multiple messages. FIG. 263 illustrates an example of processing on the write command in FIG. 262. Examples of the read command and the read response are omitted as they are self-evident from the above description. It is to be noted that the locations indicated by the broken lines in FIGS. 262 and 263 are optional.

In FIG. 262, on and after the start of transmission of the encrypted data (Encrypted data covered by MAC) or on and after the start of reception thereof, data other than the encrypted data is outside the encryption target and is outside the MAC target (Clear texts not covered by MAC) until the MAC processing (MAC generation or MAC verification) of the AEAD processing is finished. In this case, the sensor section 3120*a* or the bridge another end 3120*b* is able to start decryption (encryption) of encrypted data in response to reception of the encrypted data. In this case, the EXTENDED HEADER of second message and thereafter is brought into an unprotected state to falsification, and thus the EXTENDED HEADER or the START condition row including the EXTENDED HEADER is desirably omitted.

It is to be noted that the configuration illustrated in FIG. 262 and processing illustrated in FIG. 263 are also applicable to the Individual mode (first CCI mode) in which an arithmetic operation of the MAC value is performed for each message or the Individual mode (third CCI mode) in which an arithmetic operation of the MAC value is performed for every multiple messages.

FIG. 264 illustrates an example of a packet configuration of the write data in the foregoing embodiment and modification examples thereof. FIG. 265 illustrates an example of processing of the write data in the foregoing embodiment and modification examples thereof. FIG. 264 illustrates an example of a write command in the Individual mode (first CCI mode) in which an arithmetic operation of the MAC value is performed for each message. FIG. 265 illustrates an example of processing on the write command in FIG. 264. Examples of the read command and the read response in the first CCI mode, the write command in the third CCI mode, and the read command and the read response in the third CCI mode are omitted as they are self-evident from the above description. It is to be noted that the locations indicated by the broken lines in FIGS. 264 and 265 are optional.

In the case of the write command or the read command and the read response in the first CCI mode or the third CCI mode, the CCI Slave side is able to start decryption (encryption) in response to the completion of reception of the register address in which the message counter value, the MAC value, or the initialization vector is stored. It is to be noted that the message counter value is synonymous with a value of the message counter or the message count value. The CCI Slave side is able to start the decryption (encryption) in response to the start of reception, the completion of reception, or successful verification (values are consistent with each other between the Master side and the Slave side, i.e., the value of the reception side and the reception value of the transmission side are consistent with each other) of the message counter value, the MAC value, or the initialization vector. In a case where the algorithm is the GCM or the CCM and a message counter MC0 is included in the initialization vector, the MAC value varies when the message counter MC0 is falsified. Therefore, the message counter does not need to be the Clear texts covered by MAC. In a case of considering external transmission efficiency or internal processing efficiency, it is desirable that the message counter value be outside the message authentication target. However, in a case of considering commonalization of the implementation or switching of algorithms, it is desirable that the message counter value be the Clear texts covered by MAC and that the message counter value be outside the message authentication target. Switching (selection) may be made possible as to whether or not the message counter value is set as the message authentication target. For example, whether or not to set the message counter value as the message authentication target may be subject to adjustment of recognitions between the CCI Master side and the Slave side via the pre-agreement, the functional register, the SPDM message (e.g., Vendor defined SPDM message), the extended packet header (EXTENDED HEADER), the TRIGGER DESCRIPTOR or the like, or may be subject to adjustment of recognitions between the image-system data transmission side and the image-system data reception side.

FIG. 266 is a flowchart describing an example of an arithmetic processing of the MAC and the CRC in the first CCI mode. FIG. 266 exemplifies processing in the sensor section 3120*a*, the bridge another end 3120*b*, the communication control section 3110*a*, the bridge one end 3110*b*, the communication control section 3110*c*, or the display (hereinafter, referred to as a "predetermined device"). It is to be noted that pieces of processing indicated by the broken lines in FIG. 266 are optional.

The predetermined device determines whether or not to finish the loop processing (step S4301). For example, in a case of receiving a finish command for the communication, the predetermined device finishes the loop processing (step S4301; Y). For example, in a case of not having received the finish command for the communication, the predetermined device does not finish the loop processing (step S4301; N), and determines whether or not to start an arithmetic operation of the MAC value (MAC arithmetic operation) (step S4302). For example, in a case of having started reception of a message of the SLAVE ADDRESS corresponding to itself, the predetermined device starts the arithmetic operation of the MAC value (MAC arithmetic operation) (step S4302; Y and step S4303). For example, in a case of not receiving the message of the SLAVE ADDRESS corresponding to itself, the predetermined device does not start the above-described arithmetic operation (step S4302; N), and executes step S4301.

The predetermined device determines whether or not the message counter value has been started to be received (step S4304). In a case where the message counter value is not started to be received (step S4304; N), the predetermined device repeatedly executes step S4304. In a case where the message counter value has been started to be received (step S4304; Y), the predetermined device determines whether or not the MAC value has been started to be received (step S4305).

In a case where the MAC value is not started to be received (step S4305; N), the predetermined device repeatedly executes step S4305. In a case where the MAC value has been started to be received (step S4305; Y), the predetermined device determines whether or not verification of the message counter value has been successful (step S4306). In a case where the verification of the message counter value has not been successful (step S4306; N), the predetermined device finishes the MAC arithmetic operation (step S4307). In a case where the verification of the message counter value has been successful (step S4306; Y), the predetermined device starts decryption (step S4308). The order of step S4305 and step S4306 may be reversed. In step S4304 or step S4305, in a case where the reception is not started even after a predetermined period of time has elapsed, the processing may proceed to (step S4307) in which the MAC arithmetic operation is finished.

The predetermined device receives the CRC value to determine whether or not CRC verification has been successful (step S4309). In a case where the CRC value has not received even after a predetermined period of time has elapsed or the CRC verification has not been successful (step S4309; N), the predetermined device finishes the MAC arithmetic operation (step S4307). In a case where the CRC value has been received or the CRC verification has been successful (step S4309; Y), the predetermined device waits for completion of the MAC arithmetic operation and the decryption (step S4310).

Subsequently, the predetermined device determines whether or not the MAC verification has been successful (step S4311). In a case where the MAC verification has not been successful (step S4311; N) or in a case where the MAC arithmetic operation has been finished (step S4307), the predetermined device discards a result of the decryption (step S4312). In a case where the MAC verification has been successful (step S4311; Y), the predetermined device executes the result of the decryption (step S4313).

In a case where the result of the decryption is discarded (step S4312) or in a case where the result of the decryption is executed (step S4313), the predetermined device discards the message (step S4314). Thereafter, the predetermined device transmits verification of the message counter value, the CRC verification, and the success or failure of the MAC verification to the communication control section 3110*a* or 3110*c* or the bridge one end 3110*b* (step S4315), and executes step S4301.

Incidentally, in a case where the write data or the read data is encrypted, execution or reflection of the result of the decryption of the write data or the read data may be performed always (Always, No rejection), or may be performed only in a case where the message authentication has been successful, i.e., the MAC verification has been successful (Only when MAC matched). Meanwhile, in a case where the write data or the read data is not encrypted, the execution or reflection of the write data or the read data may be performed always (Always, No rejection), or may be performed only in a case where the message authentication has been successful (Only when MAC matched). These may be message authentication policies, and, for example, may be subject to adjustment of recognitions between the CCI Master side and the Slave side via the pre-agreement, the functional register (FIG. 267), the SPDM message (e.g., Vendor defined SPDM message) (FIG. 268), the extended packet header (EXTENDED HEADER), the TRIGGER DESCRIPTOR or the like, or may be subject to adjustment of recognitions between the image-system data transmission side and the image-system data reception side. The message authentication policy may be differentiated for each MAC mode of the image-system communication or for each MAC mode of the control-system communication, or for each CCI mode, and may be subject to adjustment of recognitions for each of them. The message authentication policy of the application processor, the image sensor, the display, the bridge one end, or the bridge another end for being oriented to the control-system communication or the image-system communication may be selected on the basis of information transmitted to or from the SSMC via the SPDM message (e.g., Vendor defined the SPDM message). The protection section of the application processor, the image sensor, the display, the bridge one end, or the bridge another end may include the functional register, and information stored in the functional register may be transmitted to or from the SSMC via the SPDM message (e.g., Vendor defined SPDM message). The functional register may store information indicating message authentication policy candidates selectable by the protection section, and the message authentication policy candidates selectable by the protection section may be at least one of a first message authentication policy (e.g., execution or reflection of the write data or the read data is always performed) or a second message authentication policy (e.g., execution or reflection of the write data or the read data is performed only in a case where the message authentication is successful). The message authentication policy for being oriented to the control-system communication or the image-system communication may be selected from among the message authentication policy candidates selectable by the protection section. For example, the SSMC is able to grasp a condition (AND condition) that satisfies both of one functional register (e.g., SSMC, application processor, or bridge one end) and another functional register (e.g., image sensor, display, or bridge another end) on the basis of information stored in the functional register of the application processor, the image sensor, the display, the bridge one end, or the bridge another end, and thus is able to notify the application processor, the image sensor, the display, the bridge one end, or the bridge another end of appropriate setting information via the SPDM message (e.g., Vendor defined SPDM message), or the like.

Regardless of the control-system communication or the image-system communication, in order to execute the CRC verification before the MAC verification, the protection section of the application processor, the image sensor, the display, the bridge one end, or the bridge another end desirably performs an arithmetic operation of the CRC value for a data group including encrypted data to be a target of the decryption processing; however, this is not limitative.

FIG. 269 illustrates an example of a packet configuration of the write data in the foregoing embodiment and modification examples thereof. FIG. 270 illustrates an example of processing of the write data in the foregoing embodiment and modification examples thereof. FIG. 269 illustrates an example of a write command in the Individual mode (first CCI mode) in which an arithmetic operation of the MAC value is performed for each message. FIG. 270 illustrates an example of processing on the write command in FIG. 269. Examples of the read command and the read response in the first CCI mode are omitted as they are self-evident from the above description. It is to be noted that the locations indicated by the broken lines in FIGS. 269 and 270 are optional.

In a case where the algorithm is the GMAC (GCM not to be encrypted), it is desirable to perform internal processing (internal processing) in the data sequence of received External transmission, because read time of the MAC arithmetic operation can be shortened. However, even in a case where the encryption is not performed, the internal processing may be performed in the same data sequence as in a case where the encryption is performed. In that case, the same internal processing can be employed regardless of the presence or absence of the encryption, and thus it is particularly suitable in a case where switching is made between the presence and the absence of the encryption in the GCM. In a case where the algorithm is the GMAC and in a case where the message counter MC0 is included in the initialization vector, falsification of the message counter MC0 causes the MAC value to be varied, and thus the message counter MC0 need not be the Clear texts covered by MAC. However, the message counter MC0 may be the Clear texts covered by MAC; it is advantageous that the same internal processing (Internal processing) can be employed both in a case where the GMAC is selected as the algorithm and in a case where an algorithm other than the GMAC (e.g., CMAC or HMAC) is selected.

FIG. 271 is a flowchart describing an example of switching processing of the internal processing in the first CCI mode. FIG. 271 exemplifies processing in the sensor section 3120*a* or the bridge another end 3120*b*. Itis to be noted that pieces of processing indicated by the broken lines in FIG. 271 are optional.

The predetermined device determines whether or not to finish the loop processing (step S4401). For example, in a case of having received a finish command for the communication, the predetermined device finishes the loop processing (step S4401; Y). For example, in a case of not receiving the finish command for the communication, the predetermined device does not finish the loop processing (step S4401; N), and determines whether or not a read request or command for functional register information on internal processing sequence has been received (step S4402). In a case where the read request or command for the functional register information on the internal processing sequence has been received, the predetermined device transmits the functional register information to the communication control section 3110*a* or 3110*c* or the bridge one end 3110*b* (step S4403).

After transmission of the functional register information or in a case where the read request or command for the functional register information on the internal processing sequence has not been received in step S4401, the predetermined device determines whether or not setting information on the internal processing sequence has been received (step S4404). In a case of not having received the setting information on the internal processing sequence (step S4404; N), the predetermined device executes step S4401. In a case of having received the setting information on the internal processing sequence (step S4404; Y), the predetermined device waits until completion of the internal processing (step S4405).

Subsequently, the predetermined device determines whether or not a second internal processing sequence has been specified (step S4406). In a case where the second internal processing sequence has not been specified (step S4406; N), the predetermined device determines whether or not the first internal processing sequence has been specified (step S4407). In a case where the first internal processing sequence has not been specified (step S4407; N), the predetermined device executes step S4401.

In a case where the first internal processing sequence has been specified (step S4407; Y), the predetermined device selects and executes the first internal processing sequence (steps S4408 and S4410). Meanwhile, in a case where the second internal processing sequence has been specified (step S4406; Y), the predetermined device selects and executes the second internal processing sequence (steps S4409 and S4410).

The protection section of the application processor, the image sensor, the display, the bridge one end, or the bridge another end may be configured to be able to select one of the first internal processing sequence or the second internal processing sequence, as an internal processing sequence for message authentication (e.g., GMAC) of the control-system communication or the image-system communication or message authentication and encryption or decryption (e.g., GCM, CCM). For example, this may be subject to adjustment of recognitions between the CCI Master side and the Slave side via the pre-agreement, the functional register (FIG. 272), the SPDM message (e.g., Vendor defined SPDM message) (FIG. 273), the extended packet header (EXTENDED HEADER), the TRIGGER DESCRIPTOR or the like, or may be subject to adjustment of recognitions between the image-system data transmission side and the image-system data reception side. The first internal processing sequence may be set as an initial setting or a default setting; when there is no specification, the first internal processing sequence may be basically selected. The internal processing sequence of the application processor, the image sensor, the display, the bridge one end, or the bridge another end for being oriented to the control-system communication or the image-system communication may be selected on the basis of information transmitted to or from the SSMC via the SPDM message (e.g., Vendor defined SPDM message). The protection section of the application processor, the image sensor, the display, the bridge one end, or the bridge another end may include the functional register, and information stored in the functional register may be transmitted to or from the SSMC via the SPDM message (e.g., Vendor defined SPDM message). The functional register may store information indicating the internal processing sequence for GMAC, GCM or CCM algorithm selectable by the protection section. The control-system communication or the image-system communication may be subject to message authentication on the basis of the internal processing sequence for the GMAC, GCM or CCM algorithm selected by the protection section.

The protection section of the application processor, the image sensor, the display, the bridge one end, or the bridge another end may be configured to be able to select whether or not the encryption processing or the decryption processing needs to be executed, and the data sequence in which the internal processing is executed for a data group to be transmitted or having been received may be varied between the time of executing the encryption processing or the decryption processing and the time of not executing the encryption processing or the decryption processing. Information indicating the necessity of the encryption may be stored in the extended packet header (EXTENDED HEADER) to be transmitted or received.

FIG. 274 is a flowchart describing an example of switching processing of the internal processing in the first CCI mode. FIG. 274 exemplifies processing in the predetermined device. It is to be noted that processing indicated by the broken line in FIG. 274 is optional.

The predetermined device determines whether or not to finish the loop processing (step S4501). For example, in a case of having received a finish command for the communication, the predetermined device finishes the loop processing (step S4501; Y). For example, in a case of not receiving the finish command for the communication, the predetermined device does not finish the loop processing (step S4501; N), and determines whether or not to transmit data (step S4502). In a case of not transmitting the data (step S4502; N), the predetermined device executes step S4501. In a case of transmitting the data (step S4502: Y), the predetermined device starts an arithmetic operation of the MAC value (MAC arithmetic operation) (step S4503).

Subsequently, the predetermined device determines whether or not the encryption is necessary (step S4504). In a case where the encryption is not necessary (step S4504; N), the predetermined device selects the first internal processing sequence (step S4505). In a case where the encryption is necessary (step S4504; Y), the predetermined device selects the second internal processing sequence (step S4506), waits for a predetermined period of time, and then starts encryption (steps S4507 and S4508). In a case of having started the encryption or in a case of having selected the first internal processing sequence, the predetermined device waits until completion of the MAC arithmetic operation and the encryption, and then transmits the data (steps S4509 and S4510).

FIG. 275 is a flowchart describing an example of switching processing of the internal processing in the first CCI mode. FIG. 275 exemplifies processing in the predetermined device. It is to be noted that pieces of processing indicated by the broken lines in FIG. 275 are optional.

The predetermined device determines whether or not to finish the loop processing (step S4601). For example, in a case of having received a finish command for the communication, the predetermined device finishes the loop processing (step S4601; Y). For example, in a case of not receiving the finish command for the communication, the predetermined device does not finish the loop processing (step S4601; N), and determines whether or not to transmit data (step S4602). In a case of not transmitting the data (step S4602; N), the predetermined device executes step S4601. In a case of transmitting the data (step S4602; Y), the predetermined device starts an arithmetic operation of the MAC value (MAC arithmetic operation) (step S4603).

Subsequently, the predetermined device determines whether or not the decryption is necessary (step S4604). In a case where the decryption is not necessary (step S4604; N), the predetermined device selects the first internal processing sequence (step S4605). In a case where the decryption is necessary (step S4604; Y), the predetermined device selects the second internal processing sequence (step S4606), waits for a predetermined period of time, and then starts decryption (steps S4607 and S4608). In a case of having started the decryption or in a case of having selected the first internal processing sequence, the predetermined device waits until completion of the MAC arithmetic operation and the encryption, and then determines whether or not the MAC verification has been successful (step S4610). In a case where the MAC verification has not been successful, the predetermined device discards a result of the decryption (step S4611). In a case where the MAC verification has been successful, the predetermined device executes the result of the decryption (step S4612). After the discarding of the result of the decryption or after the execution of the result of the decryption, the predetermined device discards the message, and transmits the success or failure of the MAC verification (steps S4613 and S4614).

The algorithm such as the GCM (or may be GMAC), the CCM, or the CTR mode requires the initialization vector. At this time, there is a possibility that inconsistency (synchronization mismatch) in the initialization vectors may occur between a transmission side and a reception side of the control-system communication (e.g., between the CCI Master side and the Slave side) or between a transmission side and a reception side of the image-system communication. In order to prepare for the inconsistency in the initialization vectors, or in order to resynchronize the initialization vectors, for example, it is desirable to notify a communication partner of some or all of the currently used latest initialization vectors as needed or cyclically. In particular, the second CCI mode is a CCI mode in which no message count value is transmitted at least from the CCI Master side. Therefore, it is highly possible for the second CCI mode to have inconsistency in the initialization vectors, as compared with other CCI modes. Therefore, it is particularly highly necessary, in the second CCI mode, to notify of the latest initialization vector.

Some or all of the latest initialization vectors to be used or having been used in any of the algorithms of the GCM (or may be GMAC), the CCM, and the CTR mode may be transmitted or received via SPDM communication (e.g., SPDM message or Vendor defined SPDM message), the control-system communication, or the image-system communication, in response to a request or a command from the SSMC, the application processor, the image sensor, the display, the bridge one end, or the bridge another end. Some or all of the latest initialization vectors for being oriented to the control-system communication to be used or having been used in any of the algorithms of the GCM (or may be GMAC), the CCM, and the CTR mode may be transmitted or received via the image-system communication (e.g., embedded data, image data, or user-defined data). The encryption in the CTR mode or the CCM requires the initialization vector configuration; some or all of the initialization vector configurations for being oriented to any GCM (or may be GMAC) described above may be included. In a case of considering commonalization of the implementation or switching of algorithms, it is desirable that some or all of the initialization vector configurations be commonalized between the GCM (or may be GMAC) and the CCM or the CTR mode.

FIG. 276 is a flowchart describing an example of switching processing of the internal processing. FIG. 276 exemplifies processing in the predetermined device.

The predetermined device determines whether or not to finish the loop processing (step S4701). For example, in a case of having received a finish command for the communication, the predetermined device finishes the loop processing (step S4701; Y). For example, in a case of not receiving the finish command for the communication, the predetermined device does not finish the loop processing (step S4701; N), and determines whether or not to use an initialization vector (step S4702). In a case of using the initialization vector (step S4702; Y), the predetermined device starts using the latest initialization vector (step S4703).

In a case of starting the use of the latest initialization vector or in a case of not using the initialization vector (step S4702; N), the predetermined device determines whether or not a request or a command to transmit the initialization vector has been received (step S4704). In a case of having received the request or the command to transmit the initialization vector (step S4704; Y), the predetermined device transmits the latest initialization vector (step S4705). In a case of transmitting the latest initialization vector, or in a case of not having received the request or the command to transmit the initialization vector (step S4704; N), the predetermined device determines whether or not the initialization vector needs to be updated (step S4706). In a case where the initialization vector does not need to be updated (step S4706; N), the predetermined device executes step S4701.

In a case where the initialization vector needs to be updated (step S4706; Y), the predetermined device updates the initialization vector (step S4707), and then executes step S4701.

FIGS. 277 and 278 each illustrate an example of a packet configurations of the write data in the foregoing embodiment and modification examples thereof. FIGS. 277 and 278 each illustrate an example of ON/OFF of the message authentication target in the message or ON/OFF of the encryption target.

The control-system communication includes transmission or reception of the register address or the extended packet header (EXTENDED HEADER) as well as transmission or reception of the write data or the read data corresponding to the register address or the extended packet header (EXTENDED HEADER). The register address or the extended packet header (EXTENDED HEADER) is protected by the message authentication of the control-system communication. The protection section of the image sensor or the bridge another end may determine whether or not the message authentication or the encryption for the write data or the read data is necessary on the basis of information on the register address or the extended packet header (EXTENDED HEADER). Excluding a portion or all of the write data or the read data from the message authentication target makes it possible to take a countermeasure against the falsification at least on the extended packet header (EXTENDED HEADER). Further, it is advantageous that the write data or the read data excluded from the message authentication target can be freely changed without affecting the MAC value. The last row in these illustrations may also be excluded from the message authentication target. Excluding a portion or all of the write data or the read data from the encryption target allows for an improvement in flexibility of partial encryption, which is advantageous.

Whether or not to partially exclude from the message authentication target is a message authentication policy, and may be subject to adjustment of recognitions between the CCI Master side and the Slave side via the pre-agreement, the functional register, the SPDM message (e.g., Vendor defined SPDM message), the extended packet header (EXTENDED HEADER), the TRIGGER DESCRIPTOR or the like, or may be subject to adjustment of recognitions between the image-system data transmission side and the image-system data reception side. This is applicable to the control-system communication or the image-system communication. In the case of the image-system communication, packet data such as frame start (FS), frame End (FE), and embedded data (Emb Data) and the extended packet header (ePH) in FIG. 227, 230, or 232, for example, are discontinuous data and thus are desirably set as MAC targets in all regions, because it is essential to take a countermeasure against the falsification. However, it is highly possible that falsification on the packet data of at least image data (Img Data) may be detected because of its continuity as the packet data is continuous data; thus, all the regions may not be a MAC target. A portion of the packet data of the image data may be a MAC target (Covered by MAC), or the remainder of the packet data of the image data may be outside a MAC target (Not covered by MAC). That is, a portion of the packet data of the image data may be excluded partially from the message authentication target. In this case, it is possible to reduce a MAC target which needs to be subject to an arithmetic operation of the MAC value within a predetermined period of time (e.g., a transmission cycle of the MAC value), thus also reducing a load on the MAC arithmetic operation, facilitating implementation of the algorithm. A portion of the packet data of the image data may be a target of the encryption or the decryption, and the remainder of the packet data of the image data may be outside the target of the encryption or the decryption. That is, a portion of the packet data of the image data may be excluded from the target of the encryption or the decryption. The MAC target region and the target region of the encryption or the decryption may be consistent with each other, or may not be consistent with each other. The MAC arithmetic operations by the CMAC or the HMAC cannot be parallelized, but arithmetic operations of encryption or decryption by the CTR mode can be parallelized, thus enabling the target region of the encryption or the decryption to be larger than the MAC target region. However, the GMAC may be applied as the MAC algorithm, the CBC mode may be applied as the encryption algorithm, and the GCM may be applied as the AEAD algorithm. A portion of the packet data of the image data may be excluded partially from the message authentication target to set the remainder of the packet data of the image data as the message authentication target and set all of the packet data of the image data as the target of the encryption or the decryption. In this case, it is possible to appropriately protect privacy information or the like included in the image data by the encryption and the decryption while facilitating implementation of the algorithm. The type of MAC exclusion modes (e.g., first MAC exclusion mode, second MAC exclusion mode, and third MAC exclusion mode) to partially exclude the packet data of the image data from the message authentication target is a message authentication policy, and may be subject to adjustment of recognitions between the CCI Master side and the Slave side via the pre-agreement, the functional register, the SPDM message (e.g., Vendor defined SPDM message), the extended packet header (EXTENDED HEADER), the TRIGGER DESCRIPTOR or the like, or may be subject to adjustment of recognitions between the image-system data transmission side and the image-system data reception side. For example, the MAC exclusion mode, in which, for respective lines in the packet data of the image data, even-numbered lines (e.g., line 0, line 2, and line 4) in a chronological order are set to be the message authentication target and odd-numbered lines (e.g., line 1, line 3, and line 5) in the chronological order are excluded from message authentication target, may be the first MAC exclusion mode (note that the even numbers and the odd numbers may be reversed). For example, the MAC exclusion mode, in which, for respective lines in the packet data of the image data, lines of multiples of three (e.g., line 0, line 3, and line 6) in the chronological order are set to be the message authentication target and lines other than that (e.g., line 1, line 2, line 4, line 5, line 7, and line 8) are excluded from message authentication target, may be the second MAC exclusion mode. For example, the MAC exclusion mode, in which, for respective lines in the packet data of the image data, lines of multiples of four (e.g., line 0, line 4, and line 8) in the chronological order are set to be the message authentication target and lines other than that (e.g., line 1, line 2, line 3, line 5, line 6, and line 7) are excluded from message authentication target, may be the third MAC exclusion mode. These MAC exclusion modes in an image vertical direction (line vertical direction) are exemplary; for example, a MAC exclusion mode in an image horizontal direction (line horizontal direction) may also be defined.

It is to be noted that, as illustrated in FIG. 279, the write data may be excluded from the message authentication target. In addition, as illustrated in FIG. 280, the write data, the SLAVE ADDRESS, and the register address (Register Address) may be excluded from the message authentication target. At this time, for example, the MAC processing target may be subject to adjustment of recognitions between the CCI Master side and the Slave side via the pre-agreement, the functional register (FIG. 281), the SPDM message (e.g., Vendor defined SPDM message) (FIG. 282), the extended packet header (EXTENDED HEADER) (FIG. 283) or the like, or may be subject to adjustment of recognitions between the image-system data transmission side and the image-system data reception side.

FIG. 284 is a flowchart describing an example of arithmetic processing by another message authentication policy (encryption policy). FIG. 284 exemplifies processing in the application processor, the image sensor, the display, the bridge one end, or the bridge another end (hereinafter, referred to as a "predetermined device"). It is to be noted that pieces of processing indicated by the broken lines in FIG. 284 are optional.

The predetermined device determines whether or not to finish the loop processing (step S4801). For example, in a case of having received a finish command for the communication, the predetermined device finishes the loop processing (step S4801; Y). For example, in a case of not receiving the finish command for the communication, the predetermined device does not finish the loop processing (step S4801; N), and predetermined device determines whether or not a read request or command for the functional register information of the message authentication policy has been received (step S4802).

In a case of having received the read request or command for the functional register information of the message authentication policy, the predetermined device transmits the functional register information (step S4802). After transmission of the functional register information or in a case where the read request or command for the functional register information of the message authentication policy has not been received (step S4802; N), the predetermined device determines whether or not setting information of the message authentication policy has been received (step S4803).

In a case of not having received the setting information of the message authentication policy (step S4804; N), the predetermined device executes step S4801. In a case of having received the setting information of the message authentication policy (step S4804; Y), the predetermined device waits until completion of the internal processing (step S4805). Subsequently, the predetermined device determines whether or not the second message authentication policy has been specified (step S4806). In a case where the second message authentication policy has been specified (step S4806; Y), the predetermined device selects the second message authentication policy (step S4807).

In a case where the second message authentication policy has not been specified (step S4806; N), the predetermined device determines whether or not the third message authentication policy has been specified (step S4808). In a case where the third message authentication policy has been specified (step S4808; Y), the predetermined device selects the third message authentication policy (step S4809). In a case where the third message authentication policy has not been specified (step S4808; N), the predetermined device determines whether or not a fourth message authentication policy has been specified (step S4810). In a case where the fourth message authentication policy has been specified (step S4810; Y), the predetermined device selects the fourth message authentication policy (step S4811). In a case where the fourth message authentication policy has not been specified (step S4810; N), the predetermined device determines whether or not the first message authentication policy has been specified (step S4812). In a case where the first message authentication policy has been specified (step S4812; Y), the predetermined device selects the first message authentication policy (step S4813). In a case where the first message authentication policy has not been specified (step S4812; N), the predetermined device executes step S4801.

In a case where the second message authentication policy, the third message authentication policy, the fourth message authentication policy, or the first message authentication policy has been selected (steps S4807, S4809, S4811, or S4813), the predetermined device starts the internal processing (step S4814), and then executes step S4801.

FIGS. 285, 286, and 287 each illustrate an example of the message authentication policy. At least one of MAC only (No encryption), the Encrypt-then-MAC, the MAC-then-Encrypt, or the Encrypt-and-MAC may be configured to be selectable as the message authentication policy (may also be referred to as the encryption policy). The details of the message authentication policy itself is as described above, and thus are omitted. As the first message authentication policy (initial setting or default setting), any of the Encrypt-then-MAC, the MAC-then-Encrypt, and the Encrypt-and-MAC may be selected. The first message authentication policy (initial setting or default setting) may depend on the algorithm. In a case where the initialization vector IV to be transmitted or received to decrypt a ciphertext in the CBC mode or the CTR mode is not the message authentication target, it is desirable to select the MAC-then-Encrypt in which the MAC verification is NG because falsification on a transmitted or received initialization vector to detect falsification made on the transmitted or received initialization vector also leads to falsification of a clear text of a decryption result. In a case where the initialization vector IV to be transmitted or received to decrypt a ciphertext in the CBC mode or the CTR mode is not the message authentication target, and in the case of the Encrypt-then-MAC, even when the initialization vector is falsified, a ciphertext is not falsified, and thus the MAC verification is OK; however, the initialization vector is falsified, and thus a clear text of the decryption result is falsified. In a case where the initialization vector IV to be transmitted or received to decrypt the ciphertext in the CBC mode or the CTR mode is the message authentication target, there is no problem whether the MAC-then-Encrypt or the Encrypt-then-MAC is selected, although it depends on Enc-then-MAC policy. In the case of encryption or decryption by the GCM, it is desirable to select the Encrypt-then-MAC.

FIG. 288 illustrates an example of the functional register. FIG. 289 illustrates an example of the Vendor defined SPDM message. In the encryption of the Encrypt-then-MAC, encryption is performed from a clear text (Plaintext) to a ciphertext (Ciphertext), and an arithmetic operation of the MAC value is performed for the ciphertext. That is, the MAC arithmetic operation is started after the encryption for the clear text is started. In the decryption of the Encrypt-then-MAC, an arithmetic operation of the MAC is performed for the ciphertext, and decryption is performed from the ciphertext to the clear text. That is, the decryption is started after the MAC arithmetic operation for the ciphertext is started. In the encryption of the Encrypt-and-MAC, an arithmetic operation of the MAC value is performed for the clear text, while encryption is performed from the clear text to the ciphertext. That is, the start of the encryption for the clear text and the start of the MAC arithmetic operation are the same or substantially the same. Alternatively, an arithmetic operation of the MAC value is performed for the clear text, and encryption is performed from the clear text to the ciphertext. That is, the encryption is started after the MAC arithmetic operation for the clear text is started. In the decryption of the Encrypt-and-MAC, decryption is performed from the ciphertext to the clear text, and an arithmetic operation of the MAC value is performed for the clear text. That is, the MAC arithmetic operation is started after the decryption for the ciphertext is started. In the encryption of the MAC-then-Encrypt, an arithmetic operation of the MAC value is performed for the clear text, and encryption is performed from the clear text and the MAC value to the ciphertext. That is, the encryption is started after the MAC arithmetic operation for the clear text is started. In the decryption of the MAC-then-Encrypt, decryption is performed from the ciphertext to the clear text and the MAC value, and an arithmetic operation of the MAC value is performed for the clear text. That is, the MAC arithmetic operation is started after the decryption for the ciphertext is started. The execution or reflection (Enc-then-MAC policy) of the result of the decryption of the write data or the read data, which is performed always (Always, No rejection), may be defined as the Encrypt-then-MAC-0, whereas execution or reflection (Enc-then-MAC policy), which is performed only in a case where the MAC verification is successful (Only when MAC matched), may be defined as the Encrypt-then-MAC-1: alternatively, these definitions may be reversed. The start of encryption or the start of decryption (Enc-then-MAC policy) of the write data or the read data, which is performed on a line-by-line basis (a message count value in the initialization vector is incremented for each line), may be defined as the Encrypt-then-MAC-0, whereas the start of encryption or the start of decryption, which is performed on a frame-by-frame basis (a frame number in the initialization vector is incremented for each frame), may be defined as the Encrypt-then-MAC-1; alternatively, these definitions may be reversed. As described above, in the Vendor defined Secured Message in compliance with or in non-compliance with DSP0277 specification, the vendor-specific region (Vendor specific), the vendor-defined region (Vendor Defined), the user-defined region (User Defined), the reserved region (Reserved for future use), or the like may be added to the regions of the message authentication target, the clear text, and the header (immediately before the region or within the region). However, when any of these regions is added to a location immediately before the regions of the message authentication target, the clear text, and the header, resulting regions are outside the DSP0277 specification, and thus the regions may be regions of the clear text and the header outside the message authentication target in some cases. In a case where the initialization vector to be used for the CBC mode or the CTR mode is stored in the regions of the clear text and the header outside the message authentication target, the MAC-the-Enc is desirable as described above. It is desirable to include, in the regions of the clear text and the header outside the message authentication target, information to identify the encryption mode (e.g., bit information or ID information (e.g., EncID) defined depending on the types of the encryption mode) to be applied to the regions of the message authentication target and the encryption target. However, in a case where the encryption mode to be applied to the regions of the message authentication target and the encryption target is subject to adjustment of recognitions (identified) between the SPDM requester and the SPDM responder by any of the NEGOTIATE_ALGORITHMS request and the ALGORITHMS response as well as the pre-agreement (Private contract), it is not necessary to include, in the regions of the clear text and the header outside the message authentication target, information to identify the encryption mode to be applied to the regions of the message authentication target and the encryption target. In these cases, for example, when the encryption mode is in the CBC mode, it is possible to select a format in which the initialization vector is stored in the regions of the clear text and the header outside the message authentication target, and, when the encryption mode is other than the CBC mode (e.g., GCM or CTR mode), it is possible to select a format in which the initialization vector is not stored in the regions of the clear text and the header outside the message authentication target, thus making it possible to reduce the overhead in a case where the encryption mode is other than the CBC mode. In addition, for example, when the encryption mode is the CBC mode, it is possible to select the MAC-then-Enc, and, when the encryption mode is other than the CBC mode (e.g., GCM or CTR mode), it is possible to select the Encrypt-then-MAC, thus making it possible to select an appropriate message authentication policy depending on the encryption mode.

FIG. 290 illustrates an example of the initialization vector (GMAC-GCM-CTR Unified-IV). The configuration of 128 bits Initialization Vector for AES-CTR-mode may include a portion or all of the configuration of 96 bits Initialization Vector for AES-GCM/GMAC. The configuration of Initial value of Pre-counter 32 bits may be the same or different between the 128 bits Initial Counter Block for AES-GCM and the 128 bits Initialization Vector for AES-CTR-mode. In the case of the AES-CTR mode, setting the Initial value (initial value) to zero enables full utilization of a 32-bit counter. Meanwhile, employing the same configuration between the Initial value (initial value) of the AES-CTR mode and the Initial value (initial value) of the AES-GCM may allow the counter to be reused.

FIGS. 291 and 292 each illustrate an example of the initialization vector. Multiple types of the initialization vector configuration to be used for the message authentication (MAC) or the encryption (or decryption) in a line unit (Per-Line), in multiple line units (Per-Multi-Line), or in a frame unit (Per-Frame) may be provided, and any of them may be selected. For example, the initialization vector configuration may be subject to adjustment of recognitions between the CCI Master side and the Slave side via the pre-agreement, the functional register, the SPDM message (e.g., Vendor defined SPDM message), the extended packet header (EXTENDED HEADER), the TRIGGER DESCRIPTOR or the like, or may be subject to adjustment of recognitions between the image-system data transmission side and the image-system data reception side. In the case of the message authentication (MAC) or the encryption (or decryption) in the multiple line unit, a message count value corresponding to the first line among line groups of the multiple line unit may also be used as the message count value in the initialization vector. In the case of the message authentication (MAC) or the encryption (or decryption) in the frame unit, a message count value corresponding to the first line among line groups of the frame unit may also be used as the message count value in the initialization vector. In the case of the image-system communication, Mode (e.g., Reserved, CCI-mode, MAC mode (Read/Write mode or CCI mode may be set as MAC mode) in the initialization vector may be set to zero (Mode=$0^2$), for example, as a fixed value. In the case of the control-system communication, the eVC in the initialization vector may be set to zero (eVC=$0^6$), for example, as a fixed value. Two bits or more (e.g., eight bits) may be allocated for the Mode in the initialization vector; in that case, the eVC may not be allocated in the initialization vector.

The order of the eVC and the Mode in the initialization vector may be interchanged. Some or all of the eVC in the initialization vector may be replaced by the Mode or zero (e.g., $0^6$). Some or all of Salt, Additional message counter, or Additional frame number in the initialization vector may be replaced by the Mode or zero (e.g., $0^{32}$, $0^{24}$). Some or all of the Mode in the initialization vector may be replaced by zero (e.g., $0^2$). FIG. 292 illustrates an example in which the same bits are allocated to CCI-mode-1-Read and CCI-mode-3-Read and the same bits are allocated to CCI-mode-1-Write and CCI-mode-3-Write; however, different bits may be allocated to the first CCI mode (CCI-mode-1) and the third CCI mode (CCI-mode-3). The Salt may be a fixed value, and may be zero ($0^{32}$), for example. For example, in the case of a system of a configuration in which the SPDM session or the SPDM message (e.g., Vendor defined SPDM message) is omitted, there are circumstances where the Salt should be a fixed value. The definition in FIG. 292 may be a definition of IV-Mode value example for Control Plane (control-system communication). As the definition of the MAC mode, the following definitions may be employed: 0b00: IV-Mode is Write-Mode with either Per-Transaction (CCI-mode-1) or Per-Multi-Transaction (CCI-mode-3); 0b01: IV-Mode is Read-Mode with either Per-Transaction (CCI-mode-1) or Per-Multi-Transaction (CCI-mode-3); 0b10: IV-Mode is Write-Mode with Per-Frame (CCI-mode-2); and 0b11: IV-Mode is Read-Mode with Per-Frame (CCI-mode-2). Here, the Per-Transaction is one transaction unit, the Per-Multi-Transaction is multiple transactions unit, and the Per-Frame is one frame unit. The definition in FIG. 292 may be a definition of IV-Mode value example for Data Plane (image-system communication). As the definition of the MAC mode, the following definitions may be employed: 0b00: IV-Mode is Per-Line (one line unit); 0b01: IV-Mode is Per-Multi-Line (multiple line unit); 0b10: IV-Mode is Per-Frame (one frame unit); and 0b11: IV-Mode is Partial-Frame-ROI (one ROI unit). The Per-Line (one line unit) may be interpreted as Per-Message (one message unit) or as Per-Transaction (one transaction unit), or the Per-Multi-Line (multiple line unit) may be interpreted as Per-Multi-Message (multiple message unit) or as Per-Multi-Transaction (multiple transaction unit), and vice versa. ROI is an abbreviation for Region of Interest. Partial-Frame-ROI MAC mode refers to a mode, in which: a partial region (limited region) being a MAC target is specified by the control-system communication (e.g., SPDM session or Control Plane session) or the pre-agreement for data in each one frame in the image-system communication; an arithmetic operation of the MAC value is performed for the region; and the MAC value is stored in the extended packet footer or the embedded data for transmission from the image-system data transmission side to the image-system data reception side. The transmission cycle of the MAC value in the Partial-Frame-ROI MAC mode may be the same as the transmission cycle of the frame, or may be shorter than the transmission cycle of the frame. In other MAC modes (Per-Line MAC mode, Per-Multi-Line MAC mode, and Per-Frame MAC mode), not just limited to the Partial-Frame-ROI MAC mode, the MAC value may be stored in the extended packet footer or the embedded data for transmission from the image-system data transmission side to the image-system data reception side. In the Per-Multi-Line (multiple line unit) MAC mode, the number of lines to be the target of the message authentication (MAC) or the encryption (or decryption) is not fixed, and may be variable. In a case where the number of lines is variable, the Per-Multi-Line (multiple line unit) MAC mode may include the message authentication (MAC) or the encryption (or decryption) in one line unit. The message counter in the initialization vector may be replaced by Defined by Mode. In the case of Pre-Line or Pre-Multi-Line MAC mode, the "message counter" may be selected; in the case of Pre-Frame MAC mode, "Always $0^{16}$" may be selected; and in the case of Partial-Frame-ROI MAC mode, "ROI Number" may be selected. In addition, the initial value of the message counter (message counter value or message count value) may be one instead of zero in the above-described one example. In these cases, the initialization vector configuration can be unified among the MAC modes of the Pre-Line, the Pre-Multi-Line, the Pre-Frame, and the Partial-Frame-ROI, thus making it possible to reduce the number of types of the initialization vector configuration to be defined in the functional register as well as to switch or simultaneously execute two or more MAC modes. The ROI Number (ROI number) is the number to identify each ROI in a case where multiple ROIs are provided in one frame.

The timing or the position of the components included in any drawing such as a block diagram or a flowchart is exemplary, and may be configured differently. There are various modification examples for the embodiments described in each of the examples described above. That is, as for the components of each of the described examples, some of the components may be omitted, some or all of the components may be changed, or some or all of the components may be modified. In addition, some of the components may be replaced by other components, or other components may be added to some or all of the components. Further, some or all of the components may be divided into multiple components, some or all of the components may be separated into multiple components, and at least some of the multiple divided or separated components may have different functions or features. Further, at least some of the components may be moved to form different embodiments. Furthermore, a binding element or a relay element may be added to a combination of at least some of the components to form a different embodiment. In addition, a switching function or a selection function may be added to a combination of at least some of the components to form a different embodiment. The present embodiment is not limited to the configurations exhibited in the described examples, and may be modified in a wide variety of ways without departing from the gist of the present technology. It is to be noted that the effects described herein are merely exemplary and non-limiting, and may have other effects. In the present specification, processing performed in accordance with a program by a computer need not necessarily be performed in time series in the order described as a flowchart. That is, the processing performed in accordance with the program by the computer also includes processing (e.g., parallel processing or object-based processing) to be executed in parallel or individually. In addition, the program may be processed by one computer (processor) or may be subject to distributed processing by multiple computers. Further, the program may be transferred to a remote computer and executed. Further, as used herein the term "system" means a set of multiple components (apparatuses, modules (parts), etc.), regardless of whether all the components are in the same housing. Therefore, multiple apparatuses contained in separate housings and coupled together via a network and one apparatus containing multiple modules in one housing are each a system. In addition, for example, the configuration described as one apparatus (or processor) may be divided into multiple configurations, which may be employed as multiple apparatuses (or processors). Conversely, the configurations described above as multiple apparatuses (or processors) may be integrated to be configured as one apparatus (or processor). In addition, a configuration other than the described configuration may be added, as a matter of course, to the configuration of each apparatus (or each processor). Further, when the configuration and the operation as the entire system are substantially the same, some of the configurations of a certain apparatus (or processor) may be included in the configuration of another apparatus (or another processor). In addition, for example, the present technology can employ a cloud computing configuration in which one function is shared and jointly processed by multiple apparatuses via a network. In addition, for example, the described program can be executed in any apparatus. In that case, it is sufficient for the apparatus to have a necessary function (such as a function block) to be able to obtain necessary information. In addition, for example, the steps described in the described flowcharts can be executed by one apparatus, and can also be shared and executed by multiple apparatuses. Further, in a case where multiple pieces of processing are included in one step, the multiple pieces of processing included in the one step can be executed by one apparatus, and can also be shared and executed by multiple apparatuses. In other words, the multiple pieces of processing included in one step may also be executed as processing of multiple steps. Conversely, the processing described as the multiple steps may be collectively executed as one step. It is to be noted that, as for the program to be executed by a computer, pieces of processing of steps describing the program may be executed in time series in the order described herein, or may be executed in parallel or individually at a necessary timing such as when a call is made. That is, the pieces of processing of the respective steps may be executed in an order different from the described order unless contradiction occurs. Further, the processing of steps describing this program may be executed in parallel with processing of another program, or may be executed in combination with processing of another program. It is noted that the present multiple technologies described herein may be implemented alone independently of one another unless contradiction occurs. It is needless to say that any present multiple technologies may be used together. For example, some or all of the present technologies described in any of the embodiments may be implemented in combination with some or all of the present technologies described in other embodiments. In addition, some or all of any of the described present technologies may be implemented together with other technologies which are not described.

<Configuration Example of Computer>

FIG. 292 is a block diagram illustrating a configuration example of hardware of a computer that executes the above-described series of processing programmatically.

In the computer, a CPU (Central Processing Unit) 2201, a ROM (Read Only Memory) 2202, a RAM (Random Access Memory) 2203, and an EEPROM (Electronically Erasable and Programmable Read Only Memory) 2204 are coupled together by a bus 2205. An input/output interface 2206 is further coupled to the bus 2205, and the input/output interface 2206 is coupled to the outside.

In the computer configured as described above, the CPU 2201 loads a program stored in the ROM 2202 and the EEPROM 2204 into the RAM 2203 via the bus 2205 to execute the program, thereby performing the above-described series of processing. In addition, the program to be executed by the computer (CPU 2201) can be written into the ROM 2202 in advance as well as installed in the EEPROM 2204 or updated from the outside via the input/output interface 2206.

Here, in the present specification, processing performed in accordance with a program by a computer need not necessarily be performed in time series in the order described as a flowchart. That is, the processing performed in accordance with the program by the computer also includes processing (e.g., parallel processing or object-based processing) to be executed in parallel or individually.

In addition, the program may be processed by one computer (processor) or may be subject to distributed processing by multiple computers. Further, the program may be transferred to a remote computer and executed.

Further, as used herein the term "system" means a set of multiple components (apparatuses, modules (parts), etc.), regardless of whether all the components are in the same housing. Therefore, multiple apparatuses contained in separate housings and coupled together via a network and one apparatus containing multiple modules in one housing are each a system.

In addition, for example, the configuration described as one apparatus (or processor) may be divided into multiple configurations, which may be employed as multiple apparatuses (or processors). Conversely, the configurations described above as multiple apparatuses (or processors) may be integrated to be configured as one apparatus (or processor). In addition, a configuration other than the above-described configuration may be added, as a matter of course, to the configuration of each apparatus (or each processor). Further, when the configuration and the operation as the entire system are substantially the same, some of the configurations of a certain apparatus (or processor) may be included in the configuration of another apparatus (or another processor).

In addition, for example, the present technology can employ a cloud computing configuration in which one function is shared and jointly processed by multiple apparatuses via a network.

In addition, for example, the above-described program can be executed in any apparatus. In that case, it is sufficient for the apparatus to have a necessary function (such as a function block) to be able to obtain necessary information.

In addition, for example, the steps described in the above-described flowcharts can be executed by one apparatus, and can also be shared and executed by multiple apparatuses. Further, in a case where multiple pieces of processing are included in one step, the multiple pieces of processing included in the one step can be executed by one apparatus, and can also be shared and executed by multiple apparatuses. In other words, the multiple pieces of processing included in one step may also be executed as processing of multiple steps. Conversely, the processing described as the multiple steps may be collectively executed as one step.

It is to be noted that, as for the program to be executed by a computer, pieces of processing of steps describing the program may be executed in time series in the order described herein, or may be executed in parallel or individually at a necessary timing such as when a call is made. That is, the pieces of processing of the respective steps may be executed in an order different from the above-described order unless contradiction occurs. Further, the processing of steps describing this program may be executed in parallel with processing of another program, or may be executed in combination with processing of another program.

It is to be noted that the present multiple technologies described herein may be implemented alone independently of one another unless contradiction occurs. It is needless to say that any present multiple technologies may be used together. For example, some or all of the present technologies described in any of the embodiments may be implemented in combination with some or all of the present technologies described in other embodiments. In addition, some or all of any of the above-described present technologies may be implemented together with other technologies not described above.

<Example of Combination of Configurations>

It is to be noted that the present technology may also have the following configurations.

(1)

An information processor including a protection section that protects first communication between a first device and a second device and second communication between a third device and the second device, in which the protection section derives or receives a first session key using the first communication, the protection section uses the first session key for encryption or decryption and message authentication of the first communication, the protection section uses the first communication protected by the first session key to receive a second session key, the protection section uses the second session key for encryption, decryption, or message authentication of the second communication, and a total number of times of communication or a total amount of communication data from a start of use to an end of the use of the second session key differs between third communication and the first communication, the third communication being between the first device and the third device.

(2)

The information processor according to (1), in which the first communication has a communication path that is longer than a communication path of the third communication, and the total number of times of communication or the total amount of communication data of the first communication is smaller than the third communication.

(3)

The information processor according to (1) or (2), in which the protection section uses the second communication to transmit or receive timing specification for the start of use of the second session key, and the protection section uses the third communication to transmit or receive the timing specification for the start of the use or information related to the timing specification for the start of the use.

(4)

The information processor according to (3), in which the timing specification for the start of the use or the information related to the timing specification for the start of the use is transmitted from the third device to the first device by at least one of an ERROR response message, a HEARTBEAT_ACK response message, and a Vendor defined SPDM message of the third communication.

(5)

The information processor according to any one of (1) to (4), in which the protection section uses the second communication to transmit or receive a specific message related to the second communication.

(6)

The information processor according to (5), in which the protection section uses the third communication to transmit or receive the specific message or information related to the specific message.

(7)

The information processor according to (5) or (6), in which the specific message or the information related to the specific message is transmitted from the third device to the first device by at least one of the ERROR response message, the HEARTBEAT_ACK response message, and the Vendor defined SPDM message of the third communication.

(8)

The information processor according to any one of (1) to (7).

(9)

The information processor according to any one of (1) to (7), in which the third device uses the third communication to receive the second session key, and uses the second session key for the encryption, the decryption, or the message authentication of the second communication, the second communication is bidirectional communication, the second device or the third device is a portion or all of a bridge device, and the second session key is transmitted or received using the first communication, and is thereafter transmitted or received using the third communication.

(10)

The information processor according to any one of (1) to (9), in which the protection section transmits or receives, in the first communication or the third communication, a random number different from the second session key.

(11)

The information processor according to any one of (1) to (10), in which the protection section transmits or receives, in the first communication or the third communication, information related to a cycle in which a status of the use of the second session key is confirmed, or information related to a cycle in which the second session key is updated.

(12)

The information processor according to any one of (1) to (11), in which the protection section transmits or receives, in the first communication or the third communication, information related to a message counter of the second communication.

(13)

The information processor according to any one of (1) to (12), in which the protection section includes a message counter and an additional message counter that varies in response to the message counter, a count value of the message counter and a count value of the additional message counter are a portion of a message to be protected by the message authentication that uses the second session key, and the protection section transmits or receives, in the second communication, the count value of the message counter.

(14)

The information processor according to any one of (1) to (13), in which the protection section transmits or receives, in the first communication or the third communication, a message requesting the start of the use of the second session key.

(15)

The information processor according to any one of (1) to (14), in which the protection section transmits or receives, in the first communication or the third communication, a message requesting the end of the use of the second session key.

(16)

The information processor according to any one of (1) to (15), in which an initialization vector including a MAC mode is used for the encryption, the decryption, or the message authentication of the second communication.

(17)

The information processor according to any one of (1) to (16), in which

- the protection section transmits or receives, in the second communication, image data and embedded data related to the image data, and
- the embedded data includes a portion or all of nonce information that varies for each frame unit.

(18)

The information processor according to (17), in which the nonce information is protected by CMAC or HMAC.

(19)

A mobile body apparatus including a protection section that protects first communication between a first device and a second device and second communication between a third device and the second device, in which

- the protection section derives or receives a first session key using the first communication,
- the protection section uses the first session key for encryption or decryption and message authentication of the first communication,
- the protection section uses the first communication protected by the first session key to receive a second session key,
- the protection section uses the second session key for encryption, decryption, or message authentication of the second communication, and
- a total number of times of communication or a total amount of communication data from a start of use to an end of the use of the second session key differs between third communication and the first communication, the third communication being between the first device and the third device.

(20)

A communication system including a protection section that protects first communication between a first device and a second device and second communication between a third device and the second device, in which

- the protection section derives or receives a first session key using the first communication,
- the protection section uses the first session key for encryption or decryption and message authentication of the first communication,
- the protection section uses the first communication protected by the first session key to receive a second session key,
- the protection section uses the second session key for encryption, decryption, or message authentication of the second communication, and
- a total number of times of communication or a total amount of communication data from a start of use to an end of the use of the second session key differs between third communication and the first communication, the third communication being between the first device and the third device.

(21)

An information processor including a protection section that protects first communication between a first device and a second device and second communication between a third device and the second device, in which

- the protection section derives or receives a first session key using the first communication,
- the protection section uses the first session key for encryption or decryption and message authentication of the first communication,
- the protection section uses the first communication protected by the first session key to receive a second session key,
- the protection section uses the second session key for message authentication of the second communication, and
- the protection section verifies the message authentication of the second communication on a basis of a message authentication policy in the second communication, the message authentication policy being one selected from among a first message authentication policy and a second message authentication policy.

(22)

The information processor according to any one of (1) to (21), in which the protection section selects the message authentication policy in the second communication on a basis of the information transmitted or received via the first communication.

(23)

The information processor according to (21) or (22), in which

- the protection section includes a functional register, and transmits or receives information stored in the functional register via the first communication,
- the functional register stores information indicating a message authentication policy candidate selectable by the protection section,
- the message authentication policy candidate is at least one of the first message authentication policy or the second message authentication policy, and
- the protection section selects the message authentication policy in the second communication from among the message authentication policy candidate stored in the functional register.

(24)

The information processor according to any one of (1) to (23), in which

- the protection section includes a functional register, and transmits or receives information stored in the functional register via the first communication,
- the functional register stores information related to an upper limit of a data amount that can be held by the protection section for the message authentication of the second communication, and
- the protection section verifies the message authentication of the second communication for a data group within a range not exceeding the upper limit of the data amount.

(25)

The information processor according to any one of (1) to (24), in which the protection section selects one of a first internal processing sequence and a second internal processing sequence as an internal processing sequence for the message authentication of the second communication.

(26)

The information processor according to any one of (1) to (25), in which the protection section uses the second communication to transmit or receive a message group or an extended packet header, and a final message in the message group or the extended packet header includes information indicating whether or not a MAC arithmetic operation or a CRC arithmetic operation can be completed.

(27)

The information processor according to any one of (1) to (26), in which the protection section uses the second session key for at least the encryption or the decryption of the second communication, and the protection section performs the encryption or the decryption on a basis of an algorithm of one of GCM, CCM, a CTR mode, or a CBC mode.

(28)

The information processor according to any one of (1) to (27), in which the protection section transmits or receives a latest initialization vector to be used or having been used for the encryption, the decryption, or the message authentication of the second communication via the first communication or the second communication in response to a request or a command from the first device or the third device.

(29)

The information processor according to any one of (1) to (28), in which the second communication is communication to control image-system communication in which the image data and the embedded data are transmitted or received, and the protection section transmits or receives the latest initialization vector to be used or having been used for the encryption, the decryption, or the message authentication of the second communication via the image-system communication.

(30)

The information processor according to any one of (1) to (29), in which the protection section uses the second communication to transmit or receive the message group or the extended packet header, and the final message in the message group or the extended packet header includes information indicating whether or not the decryption of the second communication can be started.

(31)

The information processor according to any one of (1) to (30), in which the protection section performs an arithmetic operation of a CRC value for a data group including encrypted data to be a target of the decryption of the second communication.

(32)

The information processor according to any one of (1) to (31), in which the protection section executes internal processing in a data sequence different from a data group to be transmitted or having been received.

(33)

The information processor according to any one of (1) to (32), in which the protection section starts the decryption of the second communication, in response to reception of a register address in which a message counter value, a MAC value or the initialization vector is stored, reception of the message counter value, the MAC value or the initialization vector, or successful verification of the message counter value or the MAC value.

(34)

The information processor according to any one of (1) to (33), in which the protection section sets only subsequent encrypted data as a new message authentication target during a period from a start of reception of encrypted data to completion of message authentication thereof.

(35)

The information processor according to (1) to (34), in which the protection section selects whether or not the encryption or the decryption of the second communication needs to be executed, and the protection section varies a sequence of executing the internal processing on the data group to be transmitted or having been received, between time of executing the encryption or the decryption of the second communication and time of not executing.

(36)

The information processor according to any one of (1) to (35), in which the protection section uses the second communication to transmit or receive the register address or the extended packet header, transmission or reception of write data or read data corresponding to the register address or the extended packet header is performed, the register address or the extended packet header is protected by the message authentication of the second communication, and the protection section determines, on a basis of information on the register address or the extended packet header, whether or not the message authentication or the encryption for the write data or the read data is necessary.

(37)

The information processor according to any one of (1) to (36), in which the protection section selects the message authentication policy in the second communication by pre-agreement between the third device and the second device.

(38)

The information processor according to any one of (1) to (37), in which the first device and the third device are separated from each other or the same as each other.

(39)

A mobile body apparatus including a protection section that protects first communication between a first device and a second device and second communication between a third device and the second device, in which the protection section derives or receives a first session key using the first communication, the protection section uses the first session key for encryption or decryption and message authentication of the first communication, the protection section uses the first communication protected by the first session key to receive a second session key, the protection section uses the second session key for message authentication of the second communication, the protection section selects, as a message authentication policy in the second communication, one of a first message authentication policy or a second message authentication policy, and the protection section verifies the message authentication on a basis of the selected message authentication policy.

(40)

A communication system including a protection section that protects first communication between a first device and a second device and second communication between a third device and the second device, in which the protection section derives or receives a first session key using the first communication, the protection section uses the first session key for encryption or decryption and message authentication of the first communication, the protection section uses the first communication protected by the first session key to receive a second session key, the protection section uses the second session key for message authentication of the second communication, the protection section selects, as a message authentication policy in the second communication, one of a first message authentication policy or a second message authentication policy, and the protection section verifies the message authentication on a basis of the selected message authentication policy.

(41)

The information processor according to any one of (1) to (40), in which the protection section is configured to enable switching as to whether or not to use the second communication to receive first encryption data and a first initialization vector configured by a first random number, and to use the second session key and the first initialization vector to perform the decryption of the first encryption data in the CBC mode, and the protection section is configured to enable switching as to whether or not to generate a second initialization vector configured by a second random number, to use the second initialization vector and the second session key to perform an arithmetic operation of second encryption data by the encryption using the CBC mode, and to use the second communication to transmit the second encryption data and the second initialization vector.

It is to be noted that the present embodiment is not limited to the foregoing embodiment, and may be modified in a wide variety of ways without departing from the gist of the present disclosure. In addition, the effects described herein are merely exemplary and non-limiting, and may have other effects.

This application claims the benefits of Japanese Priority Patent Application JP2021-018760 filed with the Japan Patent Office on Feb. 9, 2021, and Japanese Priority Patent Application JP2021-091938 filed with the Japan Patent Office on May 31, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processor comprising:

a memory storing a program, and at least one processor configured to execute the program to perform operations comprising:

protecting at least a portion of a first communication in which a frame is transmitted or received, wherein the frame includes first packet data of multiple lines, the frame includes a packet header and a packet data payload, and the packet data payload is separated into an extended packet header and a legacy payload including the first packet data;

performing an arithmetic operation of a first message authentication code that protects a portion or an entirety of the first packet data, on a basis of first communication message authentication policy information indicating which first communication message authentication policy is selected from alternatives including a first message authentication policy, a second message authentication policy, a third message authentication policy, and a fourth message authentication policy, wherein the first communication message authentication policy information is stored in the extended packet header within the packet data payload, the first message authentication policy is a policy that applies the protection by the first message authentication code to the entirety of the first packet data, the second message authentication policy is a policy that excludes the protection by the first message authentication code for a portion of the first packet data in a line vertical direction, the third message authentication policy is a policy that excludes the protection by the first message authentication code for a portion of the first packet data in a line horizontal direction, and the fourth message authentication policy is a policy that excludes the protection by the first message authentication code for the entirety of the first packet data;

storing, in a functional register, information related to an upper limit of a data amount that can be held for an arithmetic operation of a second message authentication code that protects at least a portion of a second communication;

verifying the second message authentication code for a data group within a range not exceeding the upper limit of the data amount; and inhibiting, by the at least one processor, execution of processing of write data, read data, or decryption in response to successful verification of the second message authentication code.

2. The information processor according to claim 1, wherein the frame includes second packet data of at least one line, and the second packet data includes some or all of a value of a source ID, a value of a virtual channel, and a value that varies for each frame.

3. The information processor according to claim 1, wherein the operations further comprise:

using an initialization vector for the arithmetic operation of the first message authentication code, wherein the initialization vector includes a value of a source ID, a value of a virtual channel, and a value of a frame count.

4. The information processor according to claim 1, wherein the operations further comprise:

using an initialization vector for the arithmetic operation of the first message authentication code, wherein the initialization vector includes a value of a source ID, a value of an extended virtual channel, and a value of a message count.

5. The information processor according to claim 1, wherein the operations further comprise:
using a first initialization vector including a value of a pre-counter to perform an arithmetic operation of at least one of encryption or decryption of the first packet data, wherein
the first message authentication code is subject to an arithmetic operation using a second initialization vector not including the value of the pre-counter, and
some or all of elements constituting the second initialization vector are same as some of elements constituting the first initialization vector.

6. The information processor according to claim 1, wherein the operations further comprise:
selecting the first message authentication policy from at least two of the first message authentication policy, the second message authentication policy, or the third message authentication policy, and performing an arithmetic operation of the first message authentication code.

7. The information processor according to claim 1, wherein the operations further comprise:
performing an arithmetic operation of a second message authentication code that protects at least a portion of second communication, wherein the first communication message authentication policy information is protected by the second message authentication code to be transmitted or received.

8. The information processor according to claim 1, wherein the operations further comprise:
performing an arithmetic operation of a second message authentication code that protects at least a portion of second communication, wherein
the second message authentication code protects at least a coupling destination address, a register address, write data, a value of an implicit additional message counter that varies in response to a message counter, and a value of the message counter.

9. The information processor according to claim 1, wherein the operations further comprise:
performing an arithmetic operation of a second message authentication code that protects at least a portion of second communication, wherein
the second message authentication code protects at least a coupling destination address, a register address, read data, a value of an implicit additional message counter that varies in response to a message counter, and a value of the message counter.

10. The information processor according to claim 1, wherein the operations further comprise:
using a second session key for an arithmetic operation of a second message authentication code that protects at least a portion of second communication; and
using a first session key for an arithmetic operation of the first message authentication code, wherein
a message requesting a start of use of the first session key is protected by the second message authentication code, in the second communication, to be transmitted or received.

11. The information processor according to claim 1, wherein the operations further comprise:
using a second session key for an arithmetic operation of a second message authentication code that protects at least a portion of second communication; and
using a first session key for an arithmetic operation of the first message authentication code, wherein
a message requesting an end of use of the first session key is protected by the second message authentication code, in the second communication, to be transmitted or received.

12. The information processor according to claim 1, wherein the operations further comprise:
using an initialization vector for an arithmetic operation to protect at least a portion of second communication, and the initialization vector includes information indicating one of a Write mode or a Read mode is employed.

13. The information processor according to claim 1, wherein the operations further comprise:
using an initialization vector for an arithmetic operation to protect at least a portion of second communication, wherein at least a portion of the initialization vector is transmitted to a communication partner of the second communication, in response to transmission of at least one of a request message or a read command from the communication partner of the second communication, or
at least a portion of the initialization vector is transmitted from the communication partner of the second communication, in response to transmission of at least one of a request message or a read command to the communication partner of the second communication.

14. The information processor according to claim 1, wherein the operations further comprise:
performing an arithmetic operation of a second message authentication code that protects at least a portion of write data to be transmitted or received via second communication; and
executing processing in response to the write data on a basis of a second communication message authentication policy selected from alternatives at least including a fifth message authentication policy and a sixth message authentication policy, wherein
the fifth message authentication policy is a policy that always permit the processing in response to the write data, and
the sixth message authentication policy is a policy that permit the processing in response to the write data only in a case where the second message authentication code is successfully verified.

15. The information processor according to claim 1, wherein the functional register stores at least information indicating whether or not the first message authentication policy can be selected.

16. The information processor according to claim 1, wherein the operations further comprise:
making selection from alternatives at least including a CBC mode and a CTR mode;
using a second session key for an arithmetic operation of at least one of encryption or decryption by which second communication is protected;
enabling switching as to whether or not to use the second communication to receive first encryption data and a first initialization vector, and to use the second session key and the first initialization vector to decrypt the first encryption data in the CBC mode; and
enabling switching as to whether or not to generate a second initialization vector, to use the second initialization vector and the second session key to perform an arithmetic operation of second encryption data by encryption using the CBC mode, and to use the second communication to transmit the second encryption data and the second initialization vector.

17. The information processor according to claim 1, wherein the functional register is a transaction sequence register.

18. An information processor comprising:

a memory storing a program, and at least one processor configured to execute the program to perform operations comprising:

protecting at least a portion of a first communication in which a frame is transmitted or received, wherein the frame includes first packet data of multiple lines, the frame includes a packet header and a packet data payload, and the packet data payload is separated into an extended packet header and a legacy payload including the first packet data;

performing an arithmetic operation of a first message authentication code that protects a portion or an entirety of the first packet data, on a basis of first communication message authentication policy information indicating which first communication message authentication policy is selected from alternatives including a first message authentication policy, a second message authentication policy, a third message authentication policy, and a fourth message authentication policy, wherein the first communication message authentication policy information is stored in the extended packet header within the packet data payload, the first message authentication policy is a policy that applies the protection by the first message authentication code to the entirety of the first packet data, the second message authentication policy is a policy that excludes the protection by the first message authentication code for a portion of the first packet data in a line vertical direction, the third message authentication policy is a policy that excludes the protection by the first message authentication code for a portion of the first packet data in a line horizontal direction, and the fourth message authentication policy is a policy that excludes the protection by the first message authentication code for the entirety of the first packet data;

executing an arithmetic operation of at least one of a second message authentication code or CRC, which protects at least a portion of second communication; and transmitting or receiving a message group in the second communication, wherein a final message in the message group includes information indicating whether or not the arithmetic operation of at least one of the second message authentication code or the CRC can be completed.

19. A non-transitory computer readable medium storing a program, the program being executable by at least one processor to perform operations comprising:

protecting at least a portion of a first communication in which a frame is transmitted or received, wherein the frame includes first packet data of multiple lines, the frame includes a packet header and a packet data payload, and the packet data payload is separated into an extended packet header and a legacy payload including the first packet data;

performing an arithmetic operation of a first message authentication code that protects a portion or an entirety of the first packet data, on a basis of first communication message authentication policy information indicating which first communication message authentication policy is selected from alternatives including a first message authentication policy, a second message authentication policy, a third message authentication policy, and a fourth message authentication policy, wherein the first communication message authentication policy information is stored in the extended packet header within the packet data payload, the first message authentication policy is a policy that applies the protection by the first message authentication code to the entirety of the first packet data, the second message authentication policy is a policy that excludes the protection by the first message authentication code for a portion of the first packet data in a line vertical direction, the third message authentication policy is a policy that excludes the protection by the first message authentication code for a portion of the first packet data in a line horizontal direction, and the fourth message authentication policy is a policy that excludes the protection by the first message authentication code for the entirety of the first packet data;

storing, in a functional register, information related to an upper limit of a data amount that can be held for an arithmetic operation of a second message authentication code that protects at least a portion of a second communication; and verifying the second message authentication code for a data group within a range not exceeding the upper limit of the data amount; and inhibiting, by the at least one processor, execution of processing of write data, read data, or decryption in response to successful verification of the second message authentication code.

20. A non-transitory computer readable medium storing a program, the program being executable by at least one processor to perform operations comprising:

protecting at least a portion of a first communication in which a frame is transmitted or received, wherein the frame includes first packet data of multiple lines, the frame includes a packet header and a packet data payload, and the packet data payload is separated into an extended packet header and a legacy payload including the first packet data;

performing an arithmetic operation of a first message authentication code that protects a portion or an entirety of the first packet data, on a basis of first communication message authentication policy information indicating which first communication message authentication policy is selected from alternatives including a first message authentication policy, a second message authentication policy, a third message authentication policy, and a fourth message authentication policy, wherein the first communication message authentication policy information is stored in the extended packet header within the packet data payload, the first message authentication policy is a policy that applies the protection by the first message authentication code to the entirety of the first packet data, the second message authentication policy is a policy that excludes the protection by the first message authentication code for a portion of the first packet data in a line vertical direction, the third message authentication policy is a policy that excludes the protection by the first message authentication code for a portion of the first packet data in a line horizontal direction, and the fourth message authentication policy is a policy that excludes the protection by the first message authentication code for the entirety of the first packet data;

executing an arithmetic operation of at least one of a second message authentication code or CRC, which protects at least a portion of second communication; and transmitting or receiving a message group in the second communication, wherein a final message in the message group includes information indicating whether or not the arithmetic operation of at least one of the second message authentication code or the CRC can be completed.

* * * * *